US006029002A

United States Patent [19]

Afifi et al.

[11] Patent Number: 6,029,002

[45] **Date of Patent: *Feb. 22, 2000**

[54] METHOD AND APPARATUS FOR ANALYZING COMPUTER CODE USING WEAKEST PRECONDITION

[75] Inventors: Ashraf Afifi, Burlington; Dominic Chan, Carlisle; Joseph J. Comuzzi, Groton; Johnson M. Hart, Weston, all of Mass.; Antonio Pizzarello, Phoenix, Ariz.

[73] Assignee: Peritus Software Services, Inc., Billerica, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/555,932

[22] Filed: Nov. 13, 1995

Related U.S. Application Data

[60] Provisional application No. 60/007,134, Oct. 31, 1995.

[51] Int. Cl.[7] .................. G06F 9/45

[52] U.S. Cl. .................. 395/707

[58] Field of Search .................. 395/704, 705, 395/707, 708, 709

[56] References Cited

U.S. PATENT DOCUMENTS

| | | | |
|---|---|---|---|
| 5,179,698 | 1/1993 | Bachman et al. | 395/600 |
| 5,193,182 | 3/1993 | Bachman et al. | 395/600 |
| 5,193,183 | 3/1993 | Bachman | 395/600 |
| 5,293,631 | 3/1994 | Rau et al. | 395/707 |
| 5,307,492 | 4/1994 | Benson | 395/707 |
| 5,315,709 | 5/1994 | Alston, Jr. et al. | 395/600 |

OTHER PUBLICATIONS

Dijkstra, E.W. "Guarded Commands, Non–determinancy and a Calculus for the Derivation of Programs", 1975 International Conference on Reliable Software, Los Angeles, California, Apr. 1975, pp. 2–2.13.

Ferrans, J.C. et al., "HyperWeb: A Framework for Hypermedia–Based Enviornments", *SIGSOFT '92*, Tyson's Corner, Virginia, Dec. 1992, pp. 1–10.

Hart, J.M., "Experience with Logical Code Analysis in Software Reuse and Re–Engineering", *American Institute of Aeronautics and Astronautics*, (1995) pp. 549–558.

Pizzarello, A., "New Method for Location of Software Defects", *AQuis '93*, Venice, Italy, Oct. 1993, pp. 143–156.

Ward, M., "Abstracting a Specification from Code", *Software Maintenance: Research and Practice*, vol. 5, 101–122 (1993).

Ward, M.P. et al., "Formal Methods for Legacy Systems", *Software Maintenance: Research and Practice*, vol. 7, 203–219 (1995).

Bernot, G. Gaudel, M–C., LeGall, P., Marre, B., "Experience with Black–box Testing from Formal Specifications," *AQuLS93* Venice, Italy, pp. 75–84 (1993).

Bijlsma, A., "Calculating with Pointers, " *Science of Computer Programming*, vol. 12, No. 2, pp. 191–205 (Jul. 1989).

Bowen, J.P., Hinchey, M.G., "Seven More Myths of Formal Methods, " *IEEE Software* pp.34–41 (Jul. 1995).

(List continued on next page.)

*Primary Examiner*—Emanuel Todd Voeltz
*Assistant Examiner*—Todd Ingberg
*Attorney, Agent, or Firm*—Townsend and Townsend and Crew LLP

[57] ABSTRACT

An analyzer for maintaining and analyzing source code is disclosed. The analyzer includes a software translator for converting conventional source code into an intermediate language, slicing capability based upon weakest precondition determination, dual direction flow analysis and incorporation of a computational model to facilitate iterative code.

22 Claims, 63 Drawing Sheets

OTHER PUBLICATIONS

Craigen, D., Gerhart, S., Ralston, T., "Formal Methods Realty Check: Industrial Usage," *IEEE Transactions on Software Engineering*, pp. 90–98 (Feb. 1995).

Fenton, N., "How Effective are Software Engineering Methods?" *J. Systems Software*, 22: 141–146 (1993).

Floyd, R.W., "Assigning Meaning to Programs, " *Proc. Symp. on Applied Math*, American Mathematical Society, vol. 19, 99. 19–32 (1967).

Gallagher, K.B. and Lyle, J.R., "Using Program Slicing in Software Maint.," *IEEE Trans. on Software Engineering*, vol. 17, No. 8, pp. 751–761 (Aug. 1991).

Hoare, C.A.R., "An Axiomatic Approach to Computer Programming, " *Comm. of the ACM*, vol. 12, No. 10, pp. 576–583 (Oct. 1969).

Hoare, C.A.R., "Proof of Correctness of Data Representations," *Acta Informatica*, vol. 1, No. 4, pp. 271–281 (1972).

Horowitz, E., and Sahne, S., "Fundamentals of Data Structures," pp. 306–309, Computer Science Press, Inc. (1976).

Humphrey, W.S., Kitson, D.H., "Prelim. Report on Conducting SEI–Assisted Assessments of Software Engineering Capability, " SEI Technical Report, SEI–87–TR–16 (Jul. 1987).

Livadas, P.E., and Croll, S., "A New Algorithm for the Calculation of Transitive Dependencies," *Software Maint: Research and Pract.*, vol. 7, pp. 151–176 ( 1995).

Manna, Z., Waldinger, R., "Problematic Features of Programming Languages: A Situational Calculus Approach, " *Acta Informatica*, vol. 16, pp. 371–426 (1981).

Misra, J., Safety Properties, U.T. Austin Report (1992).

Pizzarello, A., "Formal Methods in Corrective Software Maintenance," *Proc. of Formal Methods for Software Development, and International Seminar, AICA*, Milan, Italy (1992).

Pizzarello, A., et al., Program Maintenance Techniques, Lectures Notes, Peritus Software Services, Inc., Billerica, MA (Aug. 25, 1995).

Sharir, M., "Structural Analysis: A New Approach to Flow Analysis In Optimizing Compliers," *Computer Languages*, vol. 5, pp. 141–153 (1980).

Staskauskas, M., "Specification and Verification of Large–Scale Reactive Programs," Ph.D. Thesis from the University of Texas, Austin (May 1992).

Pizzarello, A., "An Industrial Experience in the Use of Unity," Lecture Notes in Computer Science, Springer–Verlag 574 (1991).

Pizzarello, A., "Formal Techniques For Understanding Programs," originally presented at the 8th Intl. Software Quality Week, San Francisco, CA, May 30–Jun. 2, 1995.

Weiser, M., "Programmers Use Slices When Debugging," *Commun. Ass. Comput. Mach.*, vol. 25, No. 7, pp. 446–452 (1982).

Weiser, M., "Program Slicing," *IEEE Transactions on Software Engineering*, vol. SE–10 No. 4, pp. 352–357 (1984).

Aho et al., "Compilers Principles, Techniques, and Tools," Addison–Wesley Pub. pp. 12–13, 49, 432–433, 633–636, 638–639, 643–648, 1988.

Shahmehri et al., "Semi–automatic bug localization in software maintenance," IEEE Comp. Soc. Press, pp. 30–36, Nov. 29, 1990.

Clarke et al., "Software fault trees adn weakest preconditions: a comparison and analysis," Software Eng Journal, vol 8, Iss 4, pp. 225–236, Jul. 1993.

Antonio Pizzarello, "Formal Methods for Supporting Software Maintenance: Techniques and Tools", Peritus Software Services, Inc., (Sept/Oct. (1995) ), pp. 1–14.

Antonio Pizzarello, "A New Method for Location of Software Defects", Peritus Software Services, Inc., (1994), pp. 1–15.

Antonio Pizzarello, "A New Method of Software Defects", Peritus Software Services, Inc., (1995) , pp. 1–19.

```
found := FALSE; i := 0;
do      i < N ∧ ¬found →
        found := (A.i == target);
        if      found → skip
            [ ] ¬     found → i := i + 1
        fi
od
```

FIG. 8a

```
1    found := FALSE; i := 0;
     do      i < N ∧ ¬found →
2            found := (A.i == target);
3            if      found → skip
                 [ ] ¬     found → i := i + 1
             fi
     od
```

FIG. 8b

```
initially i = 0; found = FALSE; BlockNumber = 1;
<BlockNumber = 1→              found := FALSE; 1 := 0
                               BlockNumber := 2
[ ] BlockNumber = 2 ∧ i < N ∧ ¬found →
                               found := (A.i == target);
                               BlockNumber := 3
[ ] BlockNumber = 3 ∧ found →
                               skip; BlockNumber := 2
[ ] BlockNumber = 3 ∧ ¬found →
                               i := i + 1; BlockNumber :=2
>
```

FIG. 8c

```
2207        P010-CALC-LEAP-YEAR.
2208            MOVE C-YY TO L-YEAR.
2209            DIVIDE C-YY BY 4 GIVING C-TEMP REMAINDER C-TEMP1.
2210            IF C-TEMP1 = 0
2211                    GO TO P020-LEAP-YEAR.
2212            MOVE 28 TO C-FEB.
2213            GO TO P030-CALC-DAYS.
2214        P020-LEAP-YEAR.
2215            MOVE 29 TO C-FEB.
2216        P030-CALC-DAYS.
2217            MOVE C-DD TO L-DAYS.
2218        P040-LOOP.
2219            SUBTRACT 1 FROM C-MM GIVING C-MM.
2220            IF C-MM - 0
2221              GO TO P060-EXIT.
2222            ADD C-M-ARRAY (C-MM) L-DAYS GIVING L-DAYS.
2223        P050-LOOP-END.
2224            GO TO P040-LOOP.
2225        P060-EXIT.
2226            EXIT.
```

FIG. 13b

```
type f(forward) b(backward) d(display) l(labels) c(callers) s(special)
f
enter the start line number or just hit return:
1528
enter 0 or more symbols or enter a line number:
2226
[1]********
1559.   call P010-CALC-LEAP-YEAR
2210.           condition ( C-TEMP1 = 0 )
2220.                   condition ( C-MM = 0 )
2226.                           EXIT
        -ENDLine 1-
[2]********
1559.   call P010-CALC-LEAP-YEAR
2220.           condition ( C-MM = 0 )
2226.                   EXIT
        -ENDLine 1-
```

FIG. 13d

```
0300-INTIALIZATION-RTN.

     MOVE WS-PARM-DATE TO  WS-ERR-HDG1-DATE
                           WS-ERR-HDG2B-DATE.
     PERFORM 2100-ERROR-HEADING-RTN THRU 2100-EXIT.

     MOVE CONTROL-DATE TO CONTROL-DATE-R.
     MOVE WS-BC-OF-CNY-ID TO OS-AGENCY-ID PB-AGENCY-ID.
     MOVE ZEROES TO OS-STORE-NO OS-RX-NO
               PB-STORE-NO PB-RX-NO PB-SERVICE-DATE PB-SEQ-NO.
START ORIGINAL-SCRIPT-FILE KEY IS EQUAL TO OS-AGENCY-ID.
START PREBILL-CLAIMS-FILE KEY IS EQUAL TO PB-AGENCY-ID.

     IF WS-FS-TBK031AI NOT EQUAL TO ZEROES
          MOVE 'TBK031AI' TO FILEID-401A
          MOVE WS-BC-OF-CNY-ID TO RECKEY-401A
          GO TO 0300A-STOP-ERROR.

     IF WS-FS-TBK032AU NOT EQUAL TO ZEROES
          MOVE 'TBK032AU' TO FILEID-401A
          MOVE WS-BC-OF-CNY-ID TO RECKEY-401A
          GO TO 0300A-STOP-ERROR.

     MOVE ZEROES TO  ORIG-AREA-AGCY
                     ORIG-AREA-STR
                     ORIG-AREA-RX.
     MOVE WS-PARM-DATE TO WS-CURR-DTE.
     MOVE MM-DATE TO MM-WS.
     MOVE DD-DATE TO DD-WS.
     MOVE YY-DATE TO YY-WS.
     MOVE CURR-DTE-WS TO C-DATE.
     PERFORM P010-CALC-LEAP-YEAR THRU P060-EXIT.
     GO TO 0300-EXIT.

0300A-STOP-ERROR.

     PERFORM 9900-CLOSE-WORK-FILES-RTN THRU 9900-EXIT.
     CALL 'DP030SR' USING CVS401A.
     GO TO 9999-STOP-RUN-RTN.

0300-EXIT.
     EXIT.
```

FIG. 13c

```
type f(forward) b(backward) d(display) l(labels) c(callers) s(special)
f
enter the start line number or just hit return:
2207
enter 0 or more symbols or enter a line number:
2224 2226
[1]********
2210.         condition ( C-TEMP1 = 0 )
2220.               condition ( C-MM = 0 )
2226.                     EXIT
          -ENDLine 2-
[2]********
2210.         condition ( C-TEMP1 = 0 )
2224.               goto P040-LOOP <2218>
          -ENDLine 1-
[3]********
2220.         condition ( C-MM = 0 )
2226.               EXIT
          -ENDLine 2-
[4]********
2224.     goto P040-LOOP <2218>
     -ENDLine 1-
```

FIG. 13e

```
type f(forward) b(backward) d(display) l(labels) c(callers) s(special)
f
enter the start line number or just hit return:
2207
enter 0 or more symbols or enter a line number:
C-FEB C-TEMP1 C-TEMP C-YY L-YEAR
[1]********
2208.    assign L-YEAR = C-YY
2209.    assign C-TEMP = C-YY / 4
2209.    assign C-TEMP1 = C-YY % 4
2210.    condition ( C-TEMP1 = 0 )
2215.          assign C-FEB = 29
         -END-
[2]********
2208.    assign L-YEAR = C-YY
2209.    assign C-TEMP = C-YY / 4
2209.    assign C-TEMP1 = C-YY % 4
2210.    condition ^ ( C-TEMP1 = 0 )
2210.          skip
         endif
2212.    assign C-FEB = 28
         -END-
```

FIG. 13i

```
type f(forward) b(backward) d(display) l(labels) c(callers) s(special)
f
enter the start line number or just hit return:
1558
enter 0 or more symbols or enter a line number:
2226-all
[1]********
1558.   assign C-DATE = CURR-DTE-WS
1559.   call P010-CALC-LEAP-YEAR
2208.           assign L-YEAR = C-YY
2209.           assign C-TEMP = C-YY / 4
2209.           assign C-TEMP1 = C-YY % 4
2210.           condition ( C-TEMP1 = 0 )
2215.                   assign C-FEB = 29
2217.                   assign L-DAYS = C-DD
2219.                   assign C-MM = C-MM – 1
2220.                   condition ( C-MM = 0 )
2226.                           EXIT
        -ENDLine 1-
[2]********
1558.   assign C-DATE = CURR-DTE-WS
1559.   call P010-CALC-LEAP-YEAR
2208.           assign L-YEAR = C-YY
2209.           assign C-TEMP = C-YY / 4
2209.           assign C-TEMP1 = C-YY % 4
2210.           condition ( C-TEMP1 = 0 )
2215.                   assign C-FEB = 29
2217.                   assign L-DAYS = C-DD
2219.                   assign C-MM = C-MM – 1
2220.                   condition ( C-MM = 0 )
2220.                           skip
                        endif
2222.                   assign L-DAYS = C-M-ARRAY ( C-MM ) + L-DAYS
2224.                   goto P040-LOOP <2218>
        -LOOP-
[3]********
1558.   assign C-DATE = CURR-DTE-WS
1559.   call P010-CALC-LEAP-YEAR
2208.           assign L-YEAR = C-YY
2209.           assign C-TEMP = C-YY / 4
2209.           assign C-TEMP1 = C-YY % 4
2210.           condition ^ ( C-TEMP1 = 0 )
2210.                   skip
                endif
2212.           assign C-FEB = 28
2217.           assign L-DAYS = C-DD
2219.           assign C-MM = C-MM – 1
2220.           condition ( C-MM = 0 )
2226.                   EXIT
        -ENDLine 1-
```

FIG. 13f

```
[4]********
1558.   assign C-DATE = CURR-DTE-WS
1559.   call P010-CALC-LEAP-YEAR
2208.           assign L-YEAR = C-YY
2209.           assign C-TEMP = C-YY / 4
2209.           assign C-TEMP1 = C-YY % 4
2210.           condition ^ ( C-TEMP1 = 0 )
2210.                   skip
                endif
2212.           assign C-FEB = 28
2217.           assign L-DAYS = C-DD
2219.           assign C-MM = C-MM - 1
2220.           condition ^ ( C-MM = 0 )
2220.                   skip
                endif
2222.           assign L-DAYS = C-M-ARRAY ( C-MM ) + L-DAYS
2224.           goto P040-LOOP <2218>
        LOOP
```

FIG. 13f1

```
type f(forward) b(backward) d(display) l(labels) c(callers) s(special)
f
enter the start line number or just hit return:
2207
enter 0 or more symbols or enter a line number:
C-FEB
[1]********
2210.           condition   ( C-TEMP1 = 0 )
2215.                   assign C-FEB = 29
                -END-
[2]********
2212.           assign C-FEB = 28
                -END-

type f(forward) b(backward) d(display) l(labels) c(callers) s(special)
f
enter the start line number or just hit return:
2207
enter 0 or more symbols or enter a line number:
C-TEMP1
[1]********
2209.           assign C-TEMP = C-YY / 4
2209.           assign C-TEMP1 = C-YY % 4
2210.           condition ( C-TEMP1 = 0 )
                -END-
[2]********
2209.           assign C-TEMP = C-YY / 4
2209.           assign C-TEMP1 = C-YY % 4
2210.           condition ^ ( C-TEMP1 = 0 )
2210.                   skip
                endif
                -END-
```

FIG. 13g

```
type f(forward) b(backward) d(display) l(labels) c(callers) s(special)
f
enter the start line number or just hit return:
2207
enter 0 or more symbols or enter a line number:
C-TEMP1-blk
-@2209  C-YY                          <-C-TEMP1
-@2208  L-YEAR                        <-C-YY
-@2209  C-TEMP                        <-C-YY
```

```
^ ( T-NEW-BUSINESS)  |
U-NEW-BUS-SIGNAL <= 0  |
U-PLACEMENT-OR-10164-SIGNAL ^= 2 & U-PLACEMENT-OR-10164-SIGNAL ^= 4 &
        U-PLACEMENT-OR-10164-SIGNAL ^= 6 & U-PLACEMENT-OR-10164-SIGNAL ^= 7 &
        U-PLACEMENT-OR-10164-SIGNAL ^= 8 & U-PLACEMENT-OR-10164-SIGNAL ^= 9  |
U-PLACEMENT-OR-10164-SIGNAL ^= 4 & U-PLACEMENT-OR-10164-SIGNAL ^= 6 &
        U-PLACEMENT-OR-10164-SIGNAL ^= 7 & U-PLACEMENT-OR-10164-SIGNAL ^= 8 &
        U-PLACEMENT-OR-10164-SIGNAL ^= 9 & T-9615-OR-10164-SIGNAL = 2  |
U-PLACEMENT-OR-10164-SIGNAL ^= 7 & U-PLACEMENT-OR-10164-SIGNAL ^= 8 &
        U-PLACEMENT-OR-10164-SIGNAL ^= 9 & T-9615-OR-10164-DATA = 2 &
        U-HEALTH-MAJOR-SIGNAL <= 0 & U-RETIREMENT-ANNUITY-SIGNAL <= 0 &
        U-SINGLE-PAY-A-ANNUITY-SIGNAL <= 0
```

FIG. 14c

```
void foo( int *i1,.*i2,*i3){
intj1,j2,j3;
j1 = i1 * i2;
j2 = j1*5;
if (j1 > 10) {
   j3 = bar(j1);
   *i2 = j3/j1;
   }
else {
   *i1 = j1;
   *i2 = j2;
   *i3 = j1*j2;
   }
return;
}
```

```
int foo (int i)
{
int j;
if (i < 0)
    j = i*i;
else
    j = i;
return j;
}
```

FIG. 20a

```
0 0 0 file fool.c
0 1 0 proc
0 1 0.0 L-procedure foo ( i )
0 1 0.0 var i int [ 32 ]
0 1 0.0 proc
0 3 0.0.0 var j int [ 32 ]
0 4 0.0.0 var v1$$ int [ 32 ]
0 4 0.0.0 proc
0 4 0.0.0.0 if ( i < 0 )
0 4 0.0.0.0 assign v1$$ = 1
0 4 0.0.0.1 if ^ ( i < 0 )
0 4 0.0.0.1 assign v1$$ = 0
0 4 0.0.0 proc  endif
0 4 0.0.0 proc
0 4 0.0.0.2 if ( v1$$ ^ = 0)
0 5 0.0.0.2 assign j = i * i
0 6 0.0.0.3 if ^ ( v1$$ ^ = 0 )
0 7 0.0.0.3 assign j = i
0 4 0.0.0 proc endif
0 8 0.0.0 assign result$$ = j
0 8 0.0.0 return stack
0 9 0.0.0 return stack
0 9 0.0.0 proc endblock
0 9 0 proc endL-procedure
```

FIG. 20b

```
===============================
Block:   0: Procedure foo entry ~ 2012      ⎫
if ( i < 0 ) ——— 2014                       ⎬ 2010
Predecessor: ——— 2016                       ⎪
Successors:     1 ——— 2018                  ⎭
===============================
Block:   1
assign v1$$ = 1
Predecessors: 0
Successors:   3
===============================
Block:   2
assign v1$$ = 0
Predecessors: 0
Successors:   3
===============================
Block:   3
if ( v1$$^ = 0)
Predecessor:  1, 2
Successors:   4, 5
===============================
Block:   4
assign j = i * i
Predecessor:  3
Successors:   6
===============================
Block:   5
assign j = 1
Predecessor:  3
Successors:   6
===============================
Block:   6: Procedure foo exit
assign result$$ = j
Predecessor:  4, 5
Successors:
===============================
```

FIG. 20c foo1.c

```
int foo (int i)
{
int j;
if ( i < 0 )
    j = i*i;
else
    j = i;
return j;
}
```
— 2120

FOO1.PIL

```
0 1 0.0 proc
0 3 0.0.0 var j int [ 32 ]
0 4 0.0.0 var v1$$ int [ 32 ]
0 4 0.0.0 proc
0 4 0.0.0.0 if ( i < 0 )
0 4 0.0.0.0 assign v1$$ = 1
0 4 0.0.0.1 if ^ ( i < 0 )
0 4 0.0.0.1 assign v1$$ = 0
0 4 0.0.0 proc endif
0 4 0.0.0 proc
0 4 0.0.0.2 if ( v1$$ ^ = 0 )
0 5 0.0.0.2 assign j = i * i
0 6 0.0.0.3 if ^ ( v1$$ ^ = 0 )
0 7 0.0.0.3 assign j = i
0 4 0.0.0 proc endif
0 8 0.0.0 assign result$$ = j
```

FOO1.GRP

```
Block:   0: Procedure foo entry
if ( i < 0 )
Predecessor:
Successors:   1
==============================
Block:   1
assign v1$$ = 1
Predecessors:   0
Successors:   3
==============================
Block:   2
assign v1$$ = 0
Predecessors:   0
Successors:   3
==============================
Block:   3
if ( v1$$^ = 0 )
Predecessor:   1, 2
Successors:   4, 5
==============================
Block:   4
assign j = i * i
Predecessor:   3
Successors:   6
==============================
Block:   5
assign j = 1
Predecessor:   3
Successors:   6
==============================
Block:   6: Procedure foo exit
assign result$$ = j
```

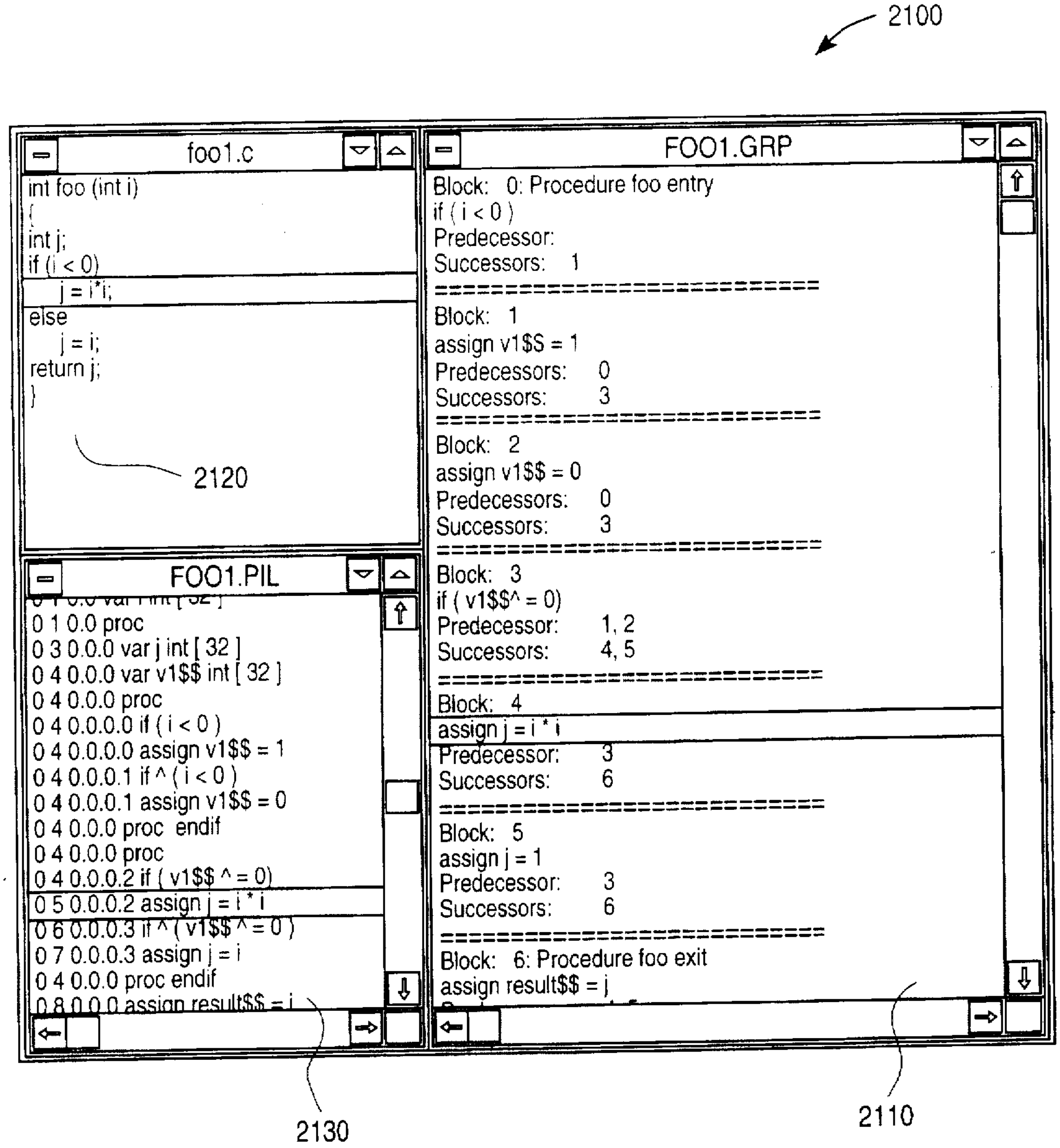

FIG. 21

```
; x, i:= A.0, 1
do while i ≠ N →
if x ≥ A.i → i := i + 1
▯ x < A.i → x := A.i ; i := i + 1
fi
od
```

FIG. 40a

```
i ≠ N ∧ x ≥ A.i → i := i + 1
i ≠ N ∧ x < A.i → x := A.i ; i := i + 1
i = N → etc. (if there is any additional code)
```

FIG. 40b

```
initially x = A.0 ∧ i = 1
< i ≠ N ∧ x ≥ A.i → i := i + 1
▯ i ≠ N ∧ x < A.i → x := A.i ; i := i + 1 >
```

FIG. 40c a) p obviously holds after initialization (recall that $N > 0$), because for $x = A.0$ and $i = 1$
$p = A.0$
$=$
$A.0 \leq A.0 \wedge 1 \leq N \equiv$ true.

b) p is also maintained at each execution of the first line: $(i \neq N \wedge x \geq A.i \rightarrow i = i + 1)$
because:
$i \neq N \wedge x \geq A.i \rightarrow wp\ (i := i + 1).\ x \geq A.\ (i - 1)$
$=$
$i \neq N \wedge x \geq A.i \rightarrow x \geq A.i$
$= \{ p \wedge q \rightarrow p \equiv \text{true} \}$
true c) p is also respected at each execution of the second line: $(i \neq N \wedge x < A.i \rightarrow x := A.i;\ i := i + 1)$
$= \{ wp.(i := i + 1).\ x \geq A.\ (i-1) = x \geq A.i \}$
$i \neq N \wedge x < A.i \wedge x \geq A.(i - 1) \rightarrow wp\ (x := A.i).\ x \geq A.i$
$=$ $i \neq N \wedge x < A.i \wedge x \geq A.(i-1) \rightarrow A.i \geq A.i$
$=$
$i \neq N \wedge x < A.i \wedge x \geq A.(i-1) \rightarrow$ true
$=$
true

FIG. 40d initially $x = A.0 \wedge i = 1$
$< i \neq N \wedge x \geq A.i \rightarrow ; i := i + 1$
$\square\ i \neq N \wedge x < A.i \rightarrow x := x + 1; i := i + 1 >$
a) initialization is still correct
b) first line is the same and is still correct
c) second line
$i \neq N \wedge x \geq A\ (i-1) \wedge x < A.i \rightarrow$ wp. $(x := x + 1).\ x \geq A.i$
=
$i \neq N \wedge x < A.i \rightarrow x + 1 \geq A.i$

FIG. 40e initially $x = A.0 \wedge i = 1$
$< x \geq A.i \wedge i \neq N \rightarrow i := i + 1$
$\square x < A.i \wedge i \neq N \rightarrow x := A.i + 1; i = i + 1 >$

FIG. 40f a) initialization still valid
b) first line is unchanged
c) second line
$i \neq N \wedge x < A.i \wedge x \geq A.(i - 1) \rightarrow$ wp. $(x := A.i + 1).\ x \geq A.i$
=
$i \neq N \wedge x < A.i \wedge x \geq A.(i - 1) \rightarrow A.i + 1 \geq A.i$
= { $A.i + 1 > A.i \equiv$ true, predicate calculus }
true

FIG. 40g a) Initially $A.0 \in A'$ is verified b) First line wp. $(i \neq N \wedge x \geq A.i \rightarrow i := i + 1)$
= { wp. $(i := i + 1)\ .x \in A' = x \in A'$}
$i \neq N \wedge x \in A' \wedge x \geq A.i \rightarrow x \in A'$ }
= { $p \wedge q \rightarrow p \equiv$ true }
true c) Second line $(i \neq N \wedge x < A.i \rightarrow x := A.i\ ; i := i + 1)$
= { wp. $(x := A.i, i := i + 1)\ .x \in A' = A.i \in A'$}
$i \neq N \wedge x \in A' \wedge x < A.i \rightarrow A.i \in A'$
= { $A.i \in A' \equiv$ true }
$(i \neq N \wedge x \in A' \wedge A.i > x \rightarrow$ true
= {predicate calculus}
true

FIG. 40h $$i \neq N \wedge x < A.i \longrightarrow wp.\ (x := A.i + 1).\ x \in A'$$
$$=$$
$$i \neq N \wedge x < A.i \longrightarrow (A.i + 1) \in A'$$

FIG. 40i

```
type f(forward) b(backward) d(display) l(labels) c(callers) s(special)
b
Enter the postcondition line number
2217
Enter the precondition line number or hit return
2207
Enter postcondition
1

*****
line 2207:
_TRUE
*****
```

FIG. 42a

```
type f(forward) b(backward) d(display) l(labels) c(callers) s(special)
b
Enter the postcondition line number
2217
Enter the precondition line number or hit return
2207
Enter postcondition
C-FEB = n

*****
line 2207:

C-YY % 4 = 0 & n = 29   |
C-YY % 4 ^= 0 & n = 28
*****
```

```
type f(forward) b(backward) d(display) l(labels) c(callers) s(special)
b
Enter the postcondition line number
2217
Enter the precondition line number or hit return
2207
Enter postcondition
C-FEB > 29

*****
line 2207:

_FALSE
*****
```

FIG. 42c

| | | |
|---|---|---|
| 0. | true | |
| 1. | $P \equiv P \equiv true$ | |
| 2. | $P \wedge P \equiv P$ | Conjunction is idempotent |
| 3. | $P \vee P \equiv P$ | Disjunction is idempotent |
| 4. | $P \wedge (Q \vee R) \equiv (P \wedge Q) \vee (P \wedge R)$ | Distribution |
| 5. | $P \vee (Q \wedge R) \equiv (P \vee Q) \wedge (P \vee R)$ | Distribution |
| 6. | $P \wedge true \equiv P$ | true is the unit for conjunction |
| 7. | $P \vee true \equiv true$ | |
| 8. | $P \wedge false \equiv false$ | false is the zero for conjunction |
| 9. | $P \vee false \equiv P$ | false is the unit for disjunction |
| 10. | $P \equiv P$ | |
| 11. | $P \wedge (P \vee Q) \equiv P$ | Absorption |
| 12. | $P \vee (P \wedge Q) \equiv P$ | Absorption |
| 13. | $false \equiv \neg true$ | |

FIG. 43a

| | | |
|---|---|---|
| 14. | $P \wedge \neg P \equiv false$ | |
| 15. | $P \vee \neg P \equiv false$ | Excluded Middle |
| 16. | $\neg\neg P \equiv P$ | |
| 17. | $\neg (P \wedge Q) \equiv \neg P \vee \neg Q$ | deMorgan |
| 18. | $\neg (P \vee Q) \equiv \neg P \wedge \neg Q$ | deMorgan |
| 19. | $\neg (P \equiv Q) \equiv \neg P \equiv Q$ | |
| 20. | $P \wedge Q \equiv (P \vee \neg Q) \wedge Q$ | Complement |
| 21. | $P \vee Q \equiv (P \wedge \neg Q) \vee Q$ | Complement |
| 22. | $(P \equiv Q) \vee R \equiv P \vee R \equiv Q \vee R$ | |
| 23. | $P \wedge Q \equiv P \equiv Q \equiv P \vee Q$ | Golden Rule |
| 24. | $(P \equiv Q) \vee \neg R \equiv P \wedge R \equiv Q \wedge R$ | |
| 25. | $\neg P \vee Q \equiv P \wedge Q \equiv Q$ | |
| 26. | $\neg P \vee Q \equiv P \wedge Q \equiv P$ | |
| 27. | $P \equiv Q \equiv (\neg P \vee Q) \wedge (\neg Q \vee P)$ | |
| 28. | $(P \rightarrow Q) \equiv P \wedge Q \equiv P$ | |
| 29. | $(P \rightarrow Q) \equiv \neg P \vee Q$ | Implication Rule |

FIG. 43b

30. $(P \rightarrow Q) \equiv P \vee Q \equiv Q$

31a. $P \equiv Q \equiv (P \rightarrow Q) \wedge (Q \rightarrow P)$

31b. $P \equiv Q \equiv (P \wedge Q) \vee (\neg P \wedge \neg Q)$

31c. $(P \vee Q) \wedge (P \vee R) \equiv (P \wedge Q) \vee (P \wedge R)$

31d. $(P \rightarrow Q) \vee R \equiv (P \vee R \rightarrow Q \vee R)$

31e. $(P \rightarrow Q) \vee \neg R \equiv (P \wedge R \rightarrow Q \wedge R)$

32. $\text{false} \rightarrow P$

33. $P \rightarrow \text{true}$

34. $P \wedge Q \rightarrow P$

35. $P \rightarrow P \vee Q$

36. $(\text{true} \rightarrow P) \equiv P$

37. $(P \rightarrow Q) \rightarrow (P \vee R \rightarrow Q \vee R)$

FIG. 43c

Universal Quantification:

$\forall i : R : T$ AND of all terms in the range.

{i : a list of dummies

R : range

T : term

{Z is a function that does not depend on the dummies} term rule:

$\forall i : R : P \wedge Q \equiv (\forall i : R : P) \wedge (\forall i : R : Q)$ range rule:

$\forall i : P \vee Q : T \equiv (\forall i : P : T) \wedge (\forall i : Q : T)$ conjunction distributes over $\forall$: (non-empty range)

$(\forall i : R : Z \wedge T) \equiv Z \wedge (\forall i : R : T)$ disjunction distributes over $\forall$:

$(\forall i : R : Z \vee T) \equiv Z \vee (\forall i : R : T)$ empty range rule:

$\forall i : false : T \equiv true$ constant term rule : (non-empty range)

$(\forall i : R : Z) \equiv Z$ implication distributes over $\forall$:

$(\forall i : R : Z \rightarrow T) \equiv Z \rightarrow (\forall i : R : T)$ trading :

$(\forall i : R : T) \equiv (\forall i : : \neg R \vee T)$

: : means that the range is identically true another form of trading :

$(\forall i : R \wedge S : T) \equiv (\forall i : R : S \rightarrow T)$

FIG. 43d

Existential Quantifications:

$\exists i : R : T$ OR of all terms in the range

<u>term rule</u> :

$(\exists i : R : P \vee Q) \equiv (\exists i : R : P) \vee (\exists i : R : Q)$ <u>range rule</u> :

$(\exists i : P \vee Q : T) \equiv (\exists i : P : T) \vee (\exists i : Q : T)$ <u>disjunction distributes over $\exists$</u> : (non-empty range)

$(\exists i : R : Z \vee T) \equiv Z \vee (\exists i : R : T)$

<u>conjunction distributes over $\exists$</u> :

$(\exists i : R : Z \wedge T) \equiv Z \wedge (\exists i : R : T)$

<u>empty range rule</u>:

$(\exists i : false : T) \equiv false$

<u>constant term rule</u> : (non-empty range)

$(\exists i : R : Z) \equiv Z$

<u>generalized deMorgan</u> :

$(\exists i : R : T) \equiv \neg(\forall i : R : \neg T)$ (dual)

$\neg(\exists i : R : \neg T) \equiv (\forall i : R : T)$

<u>last rule</u> :

$(\exists i : R : T) \equiv \exists i : : R \wedge T$

FIG. 43e

METHOD AND APPARATUS FOR ANALYZING COMPUTER CODE USING WEAKEST PRECONDITION

This application claims priority from a commonly-owned co-pending provisional application Ser. No. 60/007,134 filed Oct. 31, 1995, entitled "Code Analyzer."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PAPER APPENDIX

A Paper Appendix of a first embodiment of the invention in the form of a source code listing comprising 275 sheets is included in the provisional application identified below. A paper Appendix of a portion of a second embodiment of the invention in the form of a source code listing comprising 254 sheets is included herewith as Appendix A. Specifications for external and internal "intermediate languages" are included herewith as Appendices B and C, respectively. A specification for weakest precondition calculation in the second embodiment of the invention is included herewith as Appendix D.

RELATED ARTICLES

Material related to the following discussion is contained in Hart, J. M., "Experience with logical code analysis in software reuse and reengineering," in *AIAA Computing in Aerospace* 10, pp. 549–558 (San Antonio, Tex.) (Mar. 28–30, 1995) and Pizzarello, A., "Formal Techniques For Understanding Programs," (Originally presented at the Eighth International Software Quality Week, San Francisco, Calif., May 30–Jun. 2, 1995), both of which are hereby incorporated by reference in their entirety for all purposes.

BACKGROUND OF THE INVENTION

This application claims priority from a commonly-owned, co-pending provisional application Ser. No. 60/002,134 filed Oct. 31, 1995, entitled "Code Analyzer" (attorney docket no. 1052-30-137).

This invention relates to software maintenance.

More particularly, the invention relates to the systematic identification and verification of software characteristics.

The use of formal methods (i.e., software development techniques emphasizing the logical properties of a program rather than its operational behavior) for supporting the design of new software is recognized as desirable by some segments of the software development community. See, D. Craigen, et al., *Formal Methods Reality Check: Industrial Usage*, IEEE Transactions on Software Engineering (February 1995), and J. P. Bowen, et al., *Seven More Myths of Formal Methods*, IEEE Software (July 1995). This is particularly true where stringent demands for reliability and/or safety encourage the investment of an additional verification effort. See, G. Bernst, et al., *Experience with Black-Box Testing from Formal Specifications*, AQuIS93, Venice, Italy (1993). The suggested advantages of the use of formal methods in designing new software are, however, disputed by some as being mostly anecdotal and not supported by precise measurements. See, N. Fenton, *How Effective are Software Engineering Methods?*, AQuIS93, Venice, Italy (1993). Furthermore, the use of formal methods for supporting new developments does not take into consideration a very large portion of existing software work, i.e., software maintenance.

The use of formal methods in software maintenance has been described in recent publications, i.e., M. P. Ward, *Abstracting a Specification from Code*, Journal of Software Maintenance, Research and Practice, Vol. 5, p. 101–122 and M. P. Ward, et al., *Formal Methods for Legacy Systems*, Journal of Software Maintenance, Research and Practice, Vol. 7, p. 203–219 (1995). However, the emphasis to date has been in creating formal specifications that comprehensively describe the meaning of a particular piece of software. Once the full meaning of the software is obtained, the code will be restructured, thereby facilitating any additional maintenance work.

Such comprehensive treatment of software for purposes of maintenance is undesirable and at times simply not feasible. This is especially true when the software to be maintained consists of thousands of lines of code and a relatively narrow problem has been identified as requiring attention. To be forced to analyze an entire piece of software for the purpose of correcting only a small portion of code is inherently inefficient and expensive.

In response to this problem, techniques have been developed to "slice" large pieces of software into smaller units pursuant to a data flow technique. This method associates portions of a piece of software through data dependency. Accordingly, while data-related portions of code may be identified and collected, such association tends to be over-inclusive; identifying portions of code that may reference a variable but do not affect the value of this variable.

Finally, software maintenance cannot be limited exclusively to sequentially executed programs. In practice, many sequential programs interact with each other via permanent files (databases) or in some cases through the sharing of storage (such as is the case for Cobol programs using the linkage section features). These types of non-sequential interactions are often the cause of many problems, including data contamination and deadlocks.

Accordingly, a new method or tool for analyzing software is required that avoids the inefficiencies and limitations described above.

SUMMARY OF THE INVENTION

The present invention provides apparatus and method for maintaining and analyzing source code. The method and apparatus are not limited to any particular type of source code and offer a robust array of features for enabling efficient and effective code analysis.

According to one aspect of the invention, a method of analyzing source code includes the steps of inputting a source code file into a computer; translating the source code file into an intermediate language (IL) file; selecting a starting point at a first IL statement, wherein a second IL statement is disposed after the first IL statement; selecting a direction to traverse the first and second IL statements; and traversing the first and second IL statements in the selected direction. According to another aspect, the method includes a step of slicing the IL file based upon a weakest precondition criteria. According to yet another aspect, the method includes the step of converting portions of the IL file into a UNITY computational model to facilitate handling of iterating code.

A further understanding of the nature and advantages of the invention may be realized by reference to the remaining portions of the specification and the drawings. In the drawings, like reference numerals indicate identical or functionally similar elements.

BRIEF DESCRIPTION OF THE DRAWINGS

FIGS. 6–7a, 7b are flow charts illustrating application of the UNITY computational model;

FIGS. 8a–8c illustrate conversion of a program into the UNITY model;

FIGS. 13b–13i illustrate exemplary source code and forward analysis output;

FIGS. 14a and 14b are flow charts of weakest precondition (wp) computation carried out in backward analysis by the analyzer of FIG. 2;

FIG. 14c illustrates an exemplary statement;

FIGS. 20a–20c provide a source code function displayed in C programming language, IL and flow graph configuration;

FIG. 21 illustrates a computer display holding the information in FIGS. 20a–20c;

FIGS. 22a–24b are flow charts for semantic slicing;

FIGS. 40a–40i illustrate application of the UNITY model for verification of invariance for repeatedly executed code;

FIGS. 42a–42c illustrate exemplary backward analysis output;

FIGS. 43a–43e illustrate exemplary predicate calculus rules.

DESCRIPTION OF SPECIFIC EMBODIMENTS

Contents

I. APPARATUS
II. OPERATION
  A. System Overview
  B. Translation of Source Code
  C. UNITY
  D. Analysis Sequence: Link Lists
    1. Statement Link List
    2. Flow Analysis
    3. wp computation
    4. Simplification
  E. Analysis Sequence: Flow Graph
    1. Flow Graph Generation
    2. Slicing
    3. Flow Analysis
    4. Simplification
    5. WP Calculation Enhancements
  F. Library of Lemmas
  G. Logical Analysis of Code
    1. Analysis of Non-Iterating Programs
    2. Verification of Invariance for Repeatedly Executing Code
    3. Verification of Invariants for overlapping Code Execution (multitasking)
  H. I/O Commands Analysis and JCL Analyzer

I. APPARATUS

The code analyzer described herein is implemented in the "C" programming language and is operational on personal computers running Microsoft Windows 3.1 (or greater) operating system and UNIX™-based engineering work stations such as SUN4, IBM RS6000, and HP 700 series. The code analyzer is designed to be system independent and requires minimal change to rehost on additional work station platforms. It will be apparent to those of skill in the art that the analyzer and method described herein could be readily applied in any one of a variety of programming languages and on any one of a variety of work stations without departing from the scope of the invention. The above-described language and hardware are merely illustrative.

Figure 1:
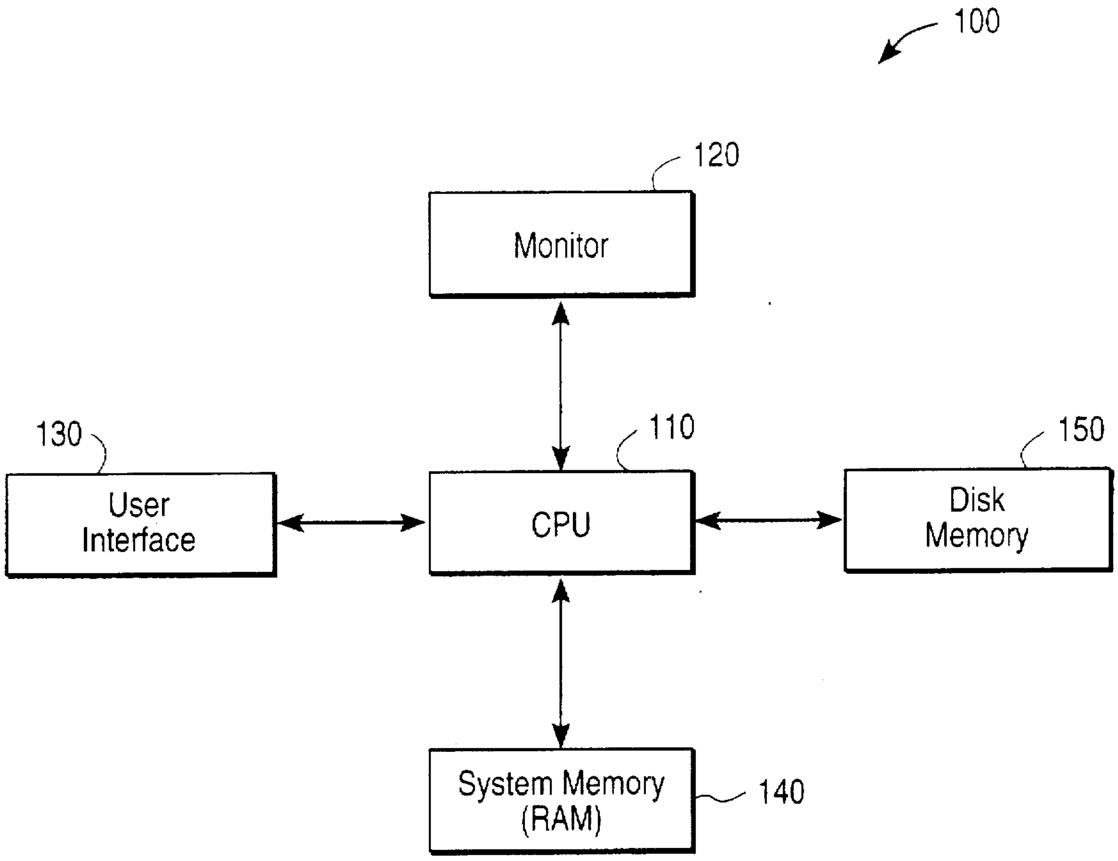
FIG. 1 is a block diagram showing the computer architecture used to support a preferred embodiment of the present invention.

A block diagram of a basic work station capable of supporting a preferred embodiment of the present invention is shown in FIG. 1. A user interface 130 includes a keyboard and/or mouse for inputting various instructions and data to a central processing unit ("CPU") 110. A disk memory 150 holds a variety of files (i.e., source language file, intermediate language file, and SYM file, each of which is described below), as well as code-analyzer executable binary code. A computer monitor 120 provides a means for displaying output data. A system memory 140 is fast access memory used by the CPU during processing. CPU 110 interconnects monitor 120, disk memory 150, system memory 140, and user interface 130. During start up, CPU 110 Accesses disk 150 and loads necessary files in code to system memory 140 for access during analysis. Processed data may be output to disk memory 150 and/or monitor 120.

II. OPERATION

A. System Overview

Figure 2:
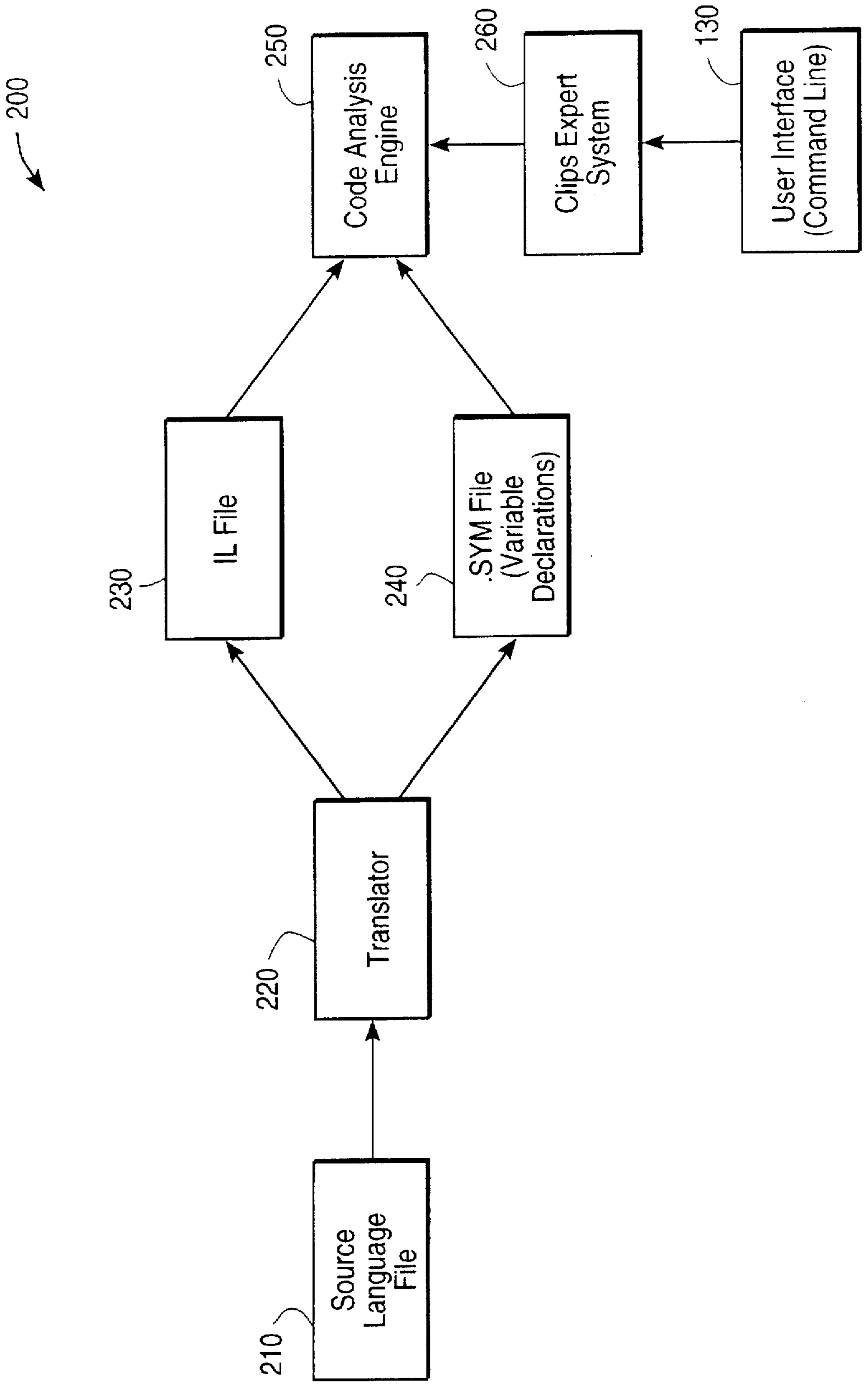
FIGS. 2 and 4 are functional block diagrams of code analyzers employing embodiments of the present invention.
Figure 4:
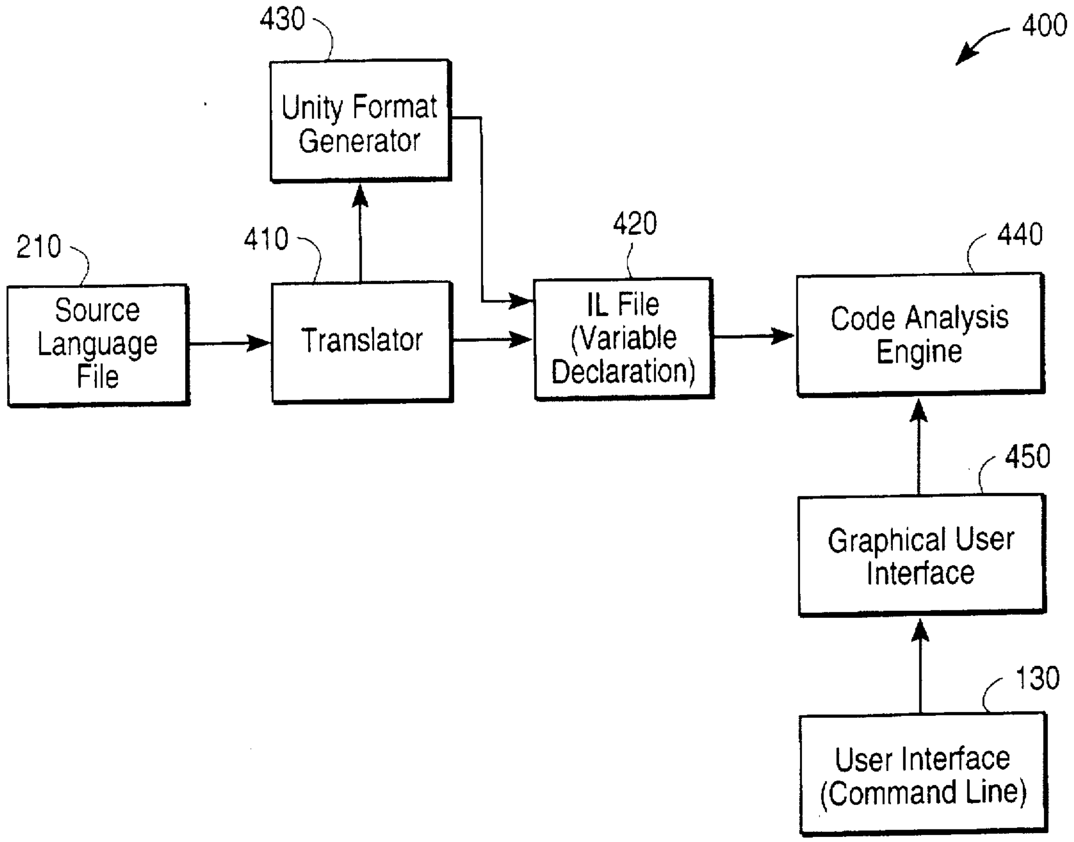

FIGS. 2 and 4 disclose two embodiments of the present invention. The embodiment in FIG. 2 has been implemented in the "C" programming language while the embodiment in FIG. 4 is currently under development. Only translator 410 of the embodiment in FIG. 4 has been reduced to source code to date.

Referring to FIG. 2, a code analyzer 200 includes a source language file 210 which is input to a translator 220. The translator converts the source language file into an intermediate language ("IL") file 230 and generates a .SYM file 240 containing variable declarations within a conventional symbol table. The intermediate language used to create IL file 230 is based upon Dijkstra's Guarded Commands ("DGC"), which typically recognize only integer and boolean variables. However, in this embodiment, the DGC-based IL file 230 is capable of handling a variety of variable types through the use of SYM file 240. (DGC is described in greater detail in E. W. Dijkstra, *A Discipline of Programming* (Prentice Hall 1976) (hereinafter "Dijkstra"), and E. Cohen, *Programming in the* 1990'*s* (Springer-Verlag 1990), both of which are hereby incorporated by reference in their entirety for all purposes.)

After translation, IL file 230 and .SYM file 240 are forwarded to code analysis engine 250, which is controlled by commands entered through a user interface 130. As shown in FIG. 2, user interface 130 is coupled to code analysis engine 250 through a C Language Integrated Production System ("CLIPS") 260. CLIPS is an expert system tool originally developed by the software technology branch at NASA's Lyndon B. Johnson Space Center and available from COSMIC at The University of Georgia, 382 E. Broad Street, Athens, Ga. 30602-4272. A detailed description of CLIPS and its operation within analyzer 200 is provided in commonly owned co-pending patent application Ser. No. 08/550,869 (attorney docket no. 5773-3 (P1)) and entitled Process and Tool for Scalable Automated Data Field Replacement, which is hereby incorporated by reference in its entirety for all purposes.

Prior to forwarding IL file 230 to engine 250, an operator may manually format certain portions of the translated source language pursuant to the "UNITY computational model." As a result of such formatting, code analysis engine 250 need not make any distinction between sequential code and (1) iterating code in a sequential program, or (2) the repeated nondeterministic execution of interacting sequential programs in the system. Application of the UNITY computational model is discussed below.

Code analysis engine 250 processes the translated code pursuant to a forward analysis and/or a backward analysis. In the forward analysis, engine 250 follows the execution path of a designated code fragment—tracing data flow from a selected starting point to ending point. The collected information may be displayed to the operator via monitor 120 or simply stored in memory 150 (FIG. 1). The operator may extract different portions of the stored code, including all statements disposed on an execution path between the starting and ending points, statements related to specific variables or conditions necessary to reach an ending point.

The general purpose of forward analysis is to help the operator obtain an informal understanding of the source code and thereby facilitate a more intelligent backward analysis.

Backward analysis is the process of determining the least restrictive condition that must hold before the execution of a program to guarantee its termination in a state identified by an operator; i.e., the determination of a "weakest precondition" based upon a particular "postcondition."

If the postcondition is always satisfied regardless of the precondition, the precondition is considered "TRUE." Alternatively, if the postcondition is never satisfied by any precondition, the precondition is considered "FALSE." If the precondition is neither TRUE nor FALSE, then it is a specific numerical and/or logical relationship determined by engine 250. In each case, the weakest precondition ("wp") value is output to the operator via monitor 120. As discussed below, this value may be used by the operator in analyzing a program to determine (1) why a defect occurs or (2) what a program does.

To perform backward analysis more efficiently, engine 250 may slice the subject code, as discussed below, to reduce the number of statements under consideration. Such slicing may be performed using conventional criteria such as textual matching and transitive closure.

FIG. 4 illustrates a second embodiment of the present invention in the form of a code analyzer 400, which is currently under development. As shown in FIG. 4, code analyzer 400 includes source language file 210 which is fed into a translator 410. Translator 410 outputs an IL file 420 containing variable declarations within a symbol table and source code that has been converted into a DGC-based language. Like analyzer 200, the DGC-based language in analyzer 400 is capable of handling a number of variable types.

Code analyzer 400 includes an automated UNITY format generator 430 which formats certain portions of a translated source language in accordance with the manual operation mentioned above. After translating and formatting, IL file 420 is forwarded to a code analysis engine 440.

Engine 440 is controlled by commands entered through user interface 130 and a conventional graphical user interface 450. Interface 450 interacts with engine 440 through the use of a "tree-writing" language known as "Sorcerer," derived from the Purdue Compiler Construction Tool Set (PCCTS). (As discussed below, analyzer 400 utilizes data structures known as "Abstract Syntax Trees" (AST) and therefore requires a language capable of manipulating such structures.) Sorcerer has been described in published articles. Source code, examples and a draft of an upcoming book on PCCTS may be found at ftp://ftp.parr-research.com/pub/pccts. Sorcerer is Free (i.e., available in the public domain) and supported by the original authors.

Like analyzer 200, analyzer 400 performs forward and backward analysis on designated portions of source code, and may slice code based upon textual matching and transitive closure. However, engine 440 may also slice code using weakest precondition analysis as a criteria. Such slicing, called "semantic slicing," enables engine 440 to more specifically identify the code statements of interest for a specific set of variables—resulting in a more efficient forward and backward analysis. The details of this operation are provided below.

B. Translation of Source Code

1. Translator 220

Figure 3:
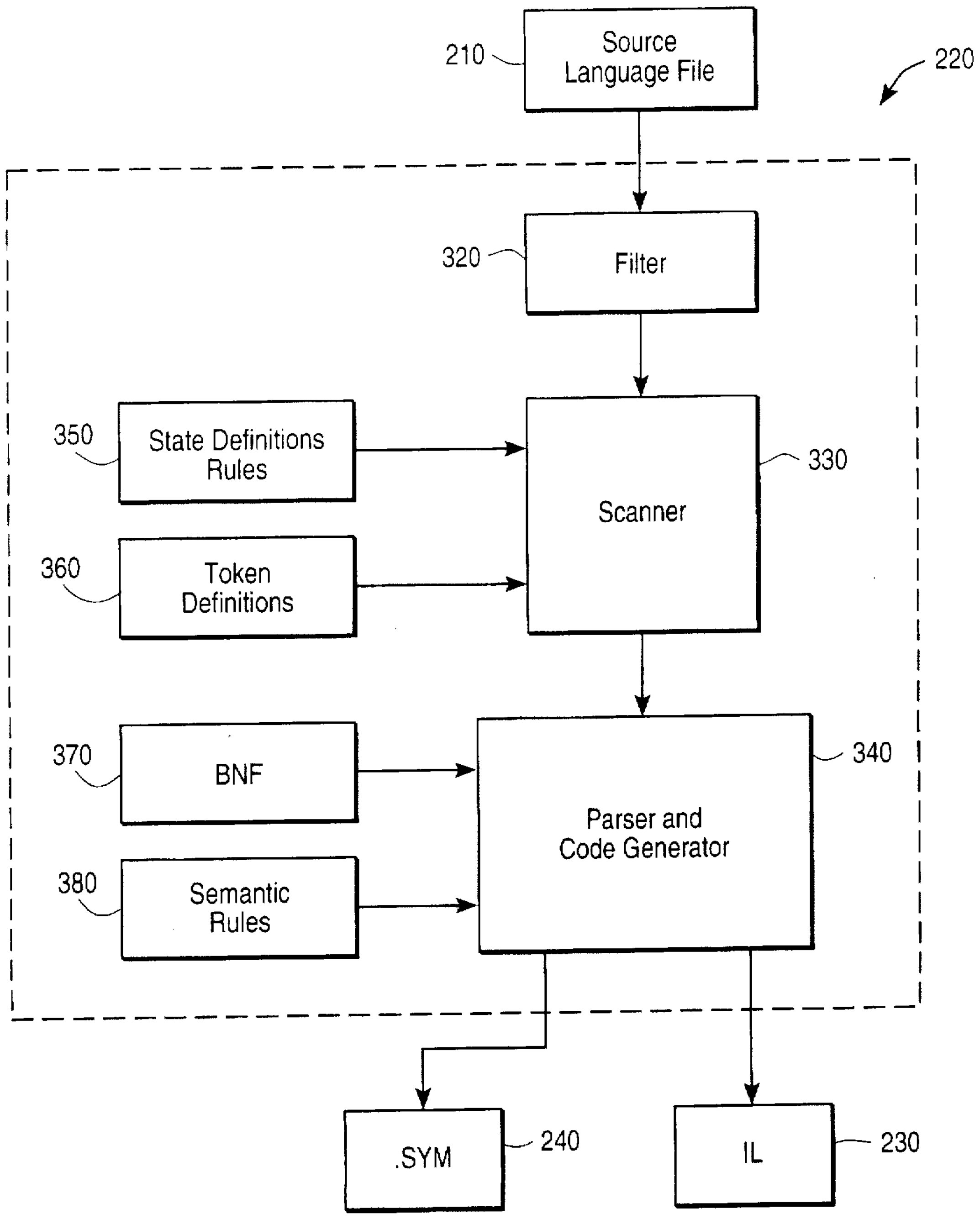
FIGS. 3 and 5a are functional block diagrams of translators used in the analyzers of FIGS. 2 and 4, respectively.

Referring to FIG. 3, translator 220 includes a filter 320 coupled to a scanner 330 which is, in turn, coupled to a parser and code generator 340. As shown in FIGS. 2 and 3, the output of translator 220 is intermediate language file 230 and SYM file 240.

In operation, source language file 210 is loaded into filter 320. In response to instructions received from a human operator of code analyzer 200 (i.e., the "code-analyzer operator" or the "operator"), filter 320 cancels select lines of code from the loaded source language file through textual matching (an operation analogous to word searching in a word processor program). In brief, filter 320 textually searches file 210 with the terms provided by the operator and discards any matching lines of code. For example, file 210 typically includes lines with directives or commands specific for the machine in which it was compiled (i.e., compiler or operating system directives). Filter 320 is used to remove these lines. The output of filter 320 is translatable (but not necessarily compilable and executable) source code that will be translated into intermediate language.

Scanner 330 may be any commercially available scanner or lexical analyzer such as "FLEX" (available from the Free Software Foundation, Cambridge, Massachusetts) and LEX (available from AT&T). Referring to FIG. 3, the scanner is "set-up" for a particular language to be translated (i.e., cobol C, C++, PL/I, Pascal, Fortran, etc.) by state definition rules 350. These are "regular expressions" that may be named for subsequent use. An exemplary set of rules 350 for use with FLEX in translating Cobol is provided in file "lexer.l", which is in the Appendix of the aforementioned provisional application from which priority is claimed (the "Provisional Appendix"). The scanner also must receive token definitions 360. These definitions are a way to define key words that parser 340 must understand for later use. An exemplary set of token definitions is provided in file "verb_table.c," which is also in the Provisional Appendix. The use of state definition rules and token definitions in connection with a scanner like FLEX is well known to those having ordinary skill in the art.

Parser and code generator 340 ("parser/generator 340") may also be any commercially available parser such as LEX and YACC (which are part of the UNIX operating system package available from a variety of developers such as AT&T, Sun Microsystems, Inc., International Business Machines, and Novelle), BISON (available from the Free Software Foundation, Cambridge, Mass.) and the ELI compiler construction system, described in Gray, et al., "ELI: A Complete Flexible Compiler Construction System," Communications of the ACM 35, pp. 121–131 (February 1992). Translator 220 has run successfully using BISON as parser/generator 340.

Parser/generator 340 receives the token definitions from scanner 330 and generates IL file 230 and a symbol table in SYM file 240. Such construction requires the syntax of the source language held in source language file 210. The parser is set up by introducing the Backus-Naur Form ("BNF") expressions for the language syntax. (BNF is a universally accepted notation for describing language syntax well-known to those having ordinary skill in the art.) An exemplary set of BNF expressions is provided in file "parser.y," included in the Provisional Appendix.

An exemplary symbol table held in SYM file 240 for a Cobol implementation is described in the co-pending application identified above. An exemplary table is also provided in file "symbol table," included in the Provisional Appendix. The generation of a symbol table is a normal compiler operation well known to those having ordinary skill in the art.

In addition to generating a symbol table, parser/generator 340 completes the translation of source language file 210 into IL file 230. Referring to FIG. 3, such translation is directed by semantic rules 380 which are provided to parser and code generator 340. These rules are written in the "C" programming language and are specific to the type of source code held in source language file 210 and the desired object language (i.e., the intermediate language used by the code analyzer of the present invention). An exemplary set of semantic rules for cobol source code using BISON as parser/generator 340 is provided in file "parser.y," which may be found in the Provisional Appendix.

Semantic rules 380 may use functions that are defined only once. In this manner, the amount of work required for parser and code generator setup is reduced since the functions are used for many different applications of translation. The use of BNF and semantic rules for a commercially available parser and code generator is well known to those having ordinary skill in the art.

The intermediate language in IL file 230 is essentially an implementation of DGC, with sufficient additional features to easily permit the representation of real programs implemented in real languages. In the present embodiment, IL statements include four fields separated by white space. A typical IL statement is provided in equation (1) below. The three fields present in equation (1) and a complete list of IL statement types for analyzer 200 are described in Tables 1 and 2, respectively.

23 0.0.1.2 assign x=y+3 (1)

TABLE 1

| Fields of Typical IL Statement | |
|---|---|
| | 23 0.0.1.2 assign x = y + 3 (1) |
| 23: | Line number within source file 210. |
| 0.0.1.2: | The source block. A block identifier uniquely identifying a block of code in the source file defining a procedure, such that "if" and "do" statements define blocks within which there may be sub-blocks. In analyzer 200 this number identifies a node containing a single IL statement in the form of a text string. In analyzer 400, this number identifies a basic block containing at least one IL statement in the form of a tree data structure. |
| assign x = Y + 3 | Instruction corresponding to the source code in the form of modified or extended DGC. |

Referring to "source block" in Table 1, block numbers are sequences of decimal numbers separated by periods. The block numbers of two different source code blocks are always different (that is, block numbers must be unique). Block numbers which represent sub-blocks of a given block have block numbers with the same leading fields as the parent block. Blocks which are siblings differ only in the last field. This permits block parent, child and sibling relationships to be quickly tested using string compare operations. Blocks are also used to delimit variable scopes (see, Appendix B).

New block numbers are created at "if" statements, "do" statements, source language blocks and procedures. "if" statements and "do" statements always create new blocks with unique numbers (within the parent block). Specifically, if the current block level is "0.1.2" and an "if" is encountered, the condition and the code in the "then" clause will get a block number of "0.1.2.n+1", where n is a previously unused decimal number at that level.

Procedures create new blocks. A "." is appended followed by a previously unused decimal number at that level. Unnamed blocks within the code (such as C's '{. . . }') are equivalent to blocks and can be implemented as a pair of proc statements.

TABLE 2

IL Statement Types

| | |
|---|---|
| assign: | basic assignment (DGC based) |
| if: | corresponding to conventional if-then-else |
| do: | standard iteration |
| call: | standard call |
| goto: | standard goto |
| return: | classic return |
| LABEL: | defines a label in the intermediate language |
| L-entry: | to introduce labeled procedure entries |
| L-procedure: | to introduce labeled procedures |
| file: | to introduce new source files analyzed |
| null: | nop (no operation) |
| proc: | general purpose no-op |
| setRet | mark the end of a paragraph as the end of a perform statement |
| SetNull: | clear the end of a paragraph |

The IL described above is processed within engine 250 as a text string contained within a statement link list, as described below. The source block number identified in Table 1 identifies a specific node for a specific IL statement (e.g., node 1200 in FIG. 7).

2. Translator 410

Figure 5A:
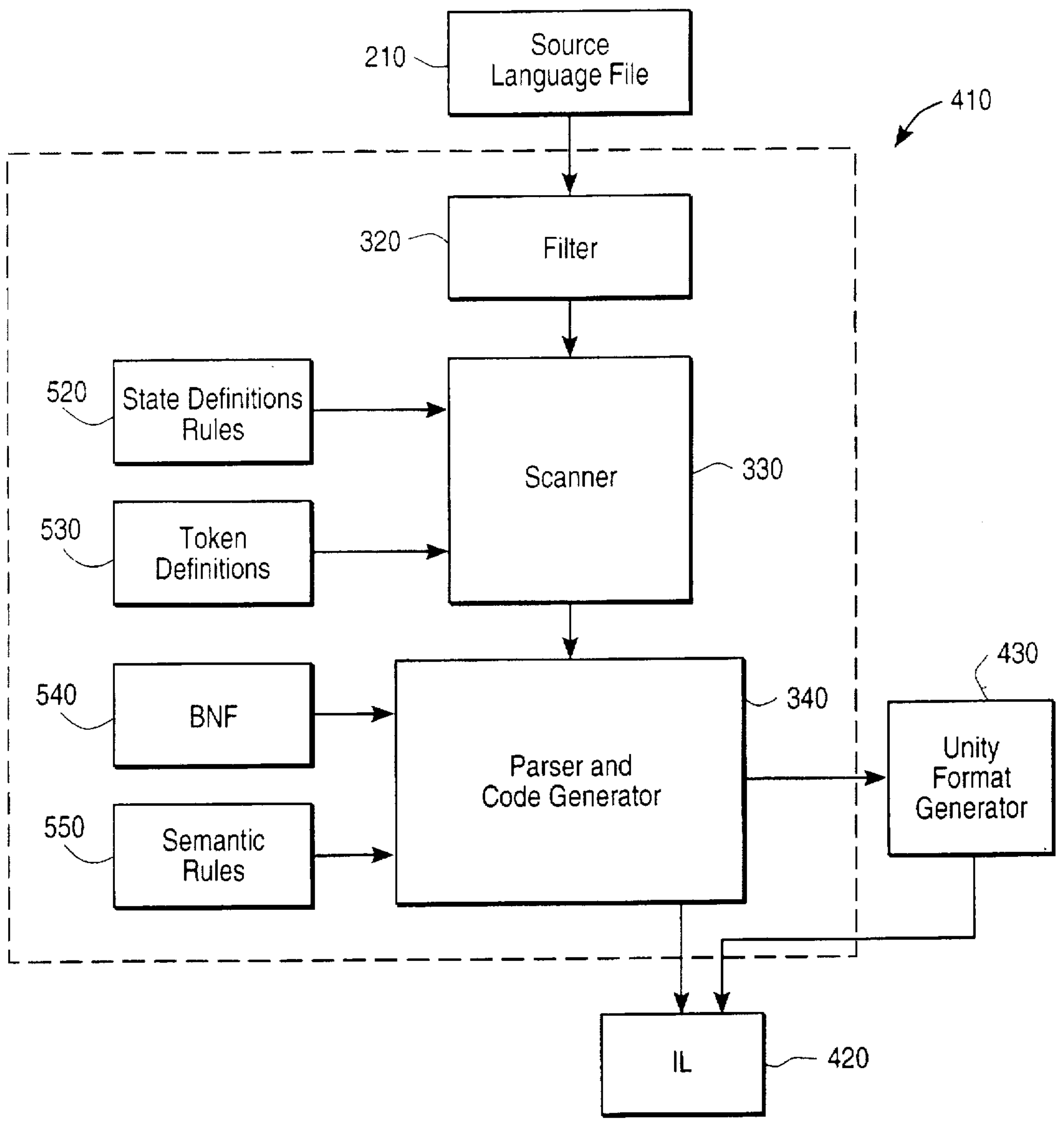

Referring to FIG. 5*a*, translator 410 includes the same functional units as translator 220, i.e., filter 320, scanner 330 and parser/code generator 340. Accordingly, the foregoing discussion applies equally to these components as used within analyzer 400. However, in this embodiment, parser/code generator 340 outputs a single file 420 containing translated source code and a symbol table. An exemplary set of rules and definitions necessary to carry out this operation for a "C" source language on a scanner and parser/code generator (i.e., Flex and BISON, respectively, as described above) are provided in the files listed in Table 3 below, and contained in Appendix A attached hereto.

TABLE 3

Exemplary rules and definitions for translator 410

| File | Description |
|---|---|
| parser.y | State definition rule 520 |
| scanner.1 | Token definitions 530 |
| parcer.y | BNF 540 |
| fns_: a2d.c, e2h.c, i2l.c, m2p.c, q2t.c, u2z.c | Semantic Rules 550 |
| Same as Semantic Rules | Symbol table |

The foregoing rules and definitions generate IL statements that correspond with Tables 1 and 2 above. Further, translator 410 also generates statement types identified in Table 4 below.

TABLE 4

Additional IL Statement Types

| | |
|---|---|
| var: | to declare variables |
| type: | to specify type information |
| member: | to declare a member of a structured type or field |
| Version: | provides information about version of language |

Moreover, the IL statement produced by translator 410 includes an extra field to identify the source file from which it comes. This field is illustrated in equation (2) below and Table 5.

TABLE 5

Extra IL Statement Field 0 23 0.0.1.2 assign x = y + 3 (2)

| | |
|---|---|
| 0: | The zero based file number of source file 210 (FIGS. 2–4) The remaining fields are described in Table 1. |

The symbol table contained in file 420 is encoded in the var, member and type statements identified above.

The IL described above (i.e., in Tables 1, 2, 4 and 5) is more accurately referred to as "external IL" since the operator can access this during code analysis. A specification setting out the parameters of the external IL language upon which files 230 and 420 are based is attached as Appendix B hereto (i.e., "Specification of PIL" ). As Tables 2 and 4 make clear, the IL of analyzer 200 is essentially a subset of the IL for analyzer 400.

Figure 5B:
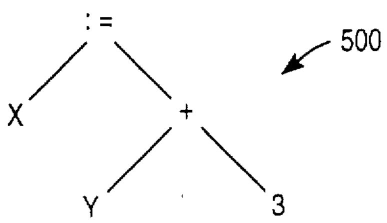
FIG. 5b is a schematic drawing of an Abstract Syntax Tree.

Translator 410 also generates a second representation of IL to facilitate processing and analysis of source code by engine 440. This second type of IL, which is also included in IL file 420, is called "internal IL". Internal IL is represented in an Abstract Syntax Tree (AST) data structure. This structure is invisible to the user and is accessed by engine 440 to carry out its operations. The AST structure is described in A. V. Aho, et al., *Compilers: Principles, Techniques, and Tools*, Addison-Wesley (1986) (hereinafter "Aho"), which is hereby incorporated by reference in its entirety for all purposes. A graphical representation of an AST 500 for the instruction in equation (1) is provided in FIG. 5*b*. Further, a specification setting out the parameters of the internal IL is attached as Appendix B hereto (i.e., "Internal PIL and Symbol Table Design").

C. UNITY

After IL conversion, the operator in analyzer 200 (via interface 130) or the UNITY format generator 430 in analyzer 400 (FIGS. 2 and 4) may organize the resulting IL file in accordance with the UNITY computational model. In analyzer 200, this operation is performed manually. Conversely, in analyzer 400, it is anticipated that this operation will be automated. The UNITY model intended to be used in these embodiments is described in J. Misra, *A Discipline of Multi-Programming*, University of Texas Austin Report (1994), which is hereby incorporated by reference in its entirety for all purposes. A copy of this report is available from the University of Texas upon request.

Code analyzers 200 and 400 may employ the UNITY computational model to represent any program that is analyzed. Through UNITY, no distinction need be made between sequential code and (1) iterating code in a sequential program or (2) the repeated non-deterministic execution of interacting sequential programs in a system. The same computational model and formalism may be used for analyzing parallel programs, multitasking and other forms of concurrence.

With the incorporation of the UNITY model, translation of source code by analyzers 200 and 400 requires two general steps:

(1) The entire source code is translated into sequences of assignments and alternation statements (i.e., intermediate language). Iterative statements (do while's and any other code that can be iterated) are isolated and presented as separate sequences.

(2) These isolated sequences are organized as non-deterministically executing portions of a UNITY program. The execution of the sequences, however, depends on some conditions for their execution. Some of these conditions may contain artificially created variables that have the sole purpose of forcing the original sequence of execution of the source program (e.g., the variable "c" in the example of Table 7 below).

These sequences represent a natural form programmers use for an informal understanding of the code. They essentially are ordered in the same way programmers mentally organize program statements when reading code with the purpose of obtaining information about its meaning.

Specifically, the UNITY model places iterating code in a more accommodating format for code analysis. Some code that iterates is contained within a program that executes sequentially. The iterating portion of this program (e.g., a loop) must ultimately end; therefore, this type of code is called "terminating." The entire program, in turn, may be iterating in the sense that it can be used repeatedly against some permanent data (i.e., information held in a data base). The iterations of the entire program can be any number (i.e., there is no coded mechanism to terminate the repeated execution of a program), therefore, this type of code is called "non-terminating."

It is anticipated the UNITY model will be applied to a subset of all iterating code. Specifically, UNITY will be applied when iterations are caused by a set of cooperating processes executing concurrently (e.g., repeated and simultaneous access to a common database) or by a program whose global framework is based upon one or more large loops. In the context of the UNITY model, small, deterministic loops presented in a sequential program are typically of simple construction and therefore can be manually substituted with specification (i.e., preconditions and postconditions) that define their meaning without being separated from the main program (i.e., the sequential code).

The study of iterating code, both terminating and non-terminating, involves the use of "invariants," as discussed below. The partitioning of sequential code into the UNITY computational model is one way to permit the verification of invariants for the entire program or its relevant portions (i.e., a loop body) using only "weakest precondition calculation" and expression simplification, as discussed below.

The UNITY computational model may be generally represented in the expression of Table 6 below.

TABLE 6

| UNITY Computational Model |
|---|
| initially x, y, z, ... = $e_1$, $e_2$, $e_3$, ... |
| <B1 --> P1 [ ] B2 --> P2 [ ] ...> |

Referring to Table 6, x, y, z, etc. are program variables that assume the initial values of the expressions $e_1$, $e_2$, $e_3$, etc. Further, P1, P2, etc. are sequential programs executing non-deterministically and repeatedly when the leading conditions (i.e., "guards") B1, B2, etc. hold (any of B1, B2, etc. may be the constant predicate true: in that case the corresponding program would execute at any time). A fat bar ("[]") separates each B-P pair. The UNITY model also requires that the non-deterministic execution is chosen fairly (this can be assumed in all practical cases: i.e., there exists no biasing for any particular P) and that P1, P2, etc. execute as a whole piece of non-interrupted code.

The UNITY logic supplies effective ways to specify and prove properties, and is a convenient way to present code to an operator for informal understanding. Therefore, it is useful to transform sequential programs that have significant portions of their code that can be iterated into a UNITY form. Such iterated code, be it a large loop body in a sequential program or a set of cooperating processes that can even execute concurrently, can be treated exactly in the same way as sequential code after transformation into the UNITY model.

The transformation of sequential code into UNITY requires (in general) the use of auxiliary variables for forcing the sequential execution of these code portions that are represented as non-deterministically executed sequences. Exemplary cases are provided below. These cases represent most of the situations found in practice. The approach can easily be generalized and extended to other more unusual situations.

Figure 6:
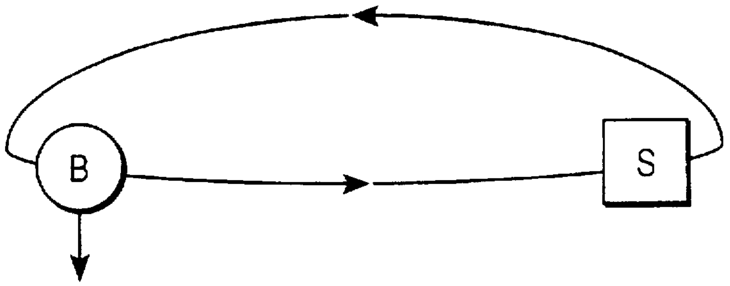

FIG. 6 provides a graphical representation of a single "do while" loop, which in UNITY form is represented as equation (3). When ¬B holds, the UNITY program reaches a Fixed Point (FP) that corresponds to the loop termination. (A FP is a state where the execution of any of the sequences $P_i$ in the program is either impossible, or does not produce any state change.)

$$<B \rightarrow S> \tag{3}$$

Figure 7A:
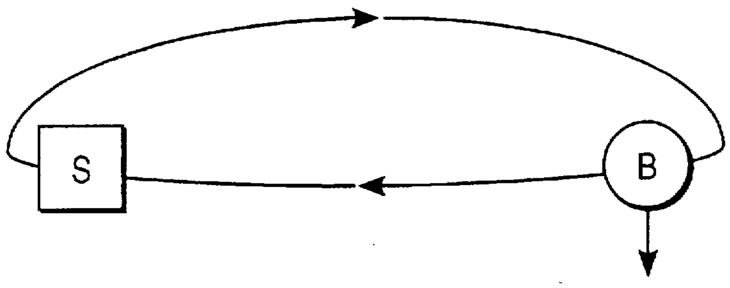
Figure 7B:
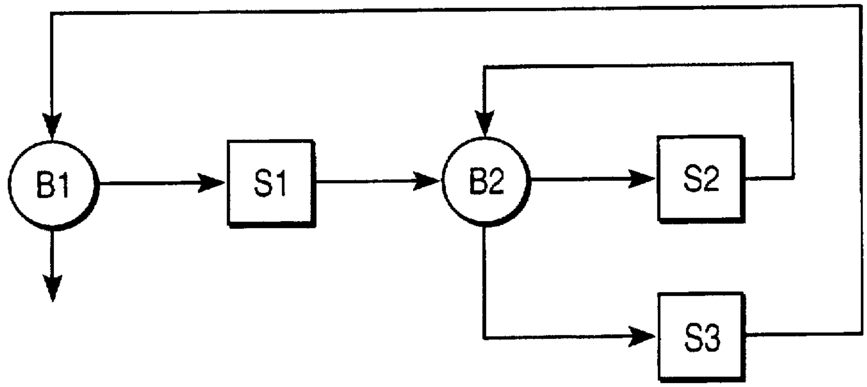

FIG. 7 provides a graphical representation of a single "do until" loop, which in UNITY form is shown in Table 7. In this table, "c" is an auxiliary variable (set initially to zero) which forces the execution sequence S; B→S; etc. The program reaches an FP when ¬B holds.

TABLE 7

| "do until" Loop |
|---|
| initially c=0 |
| <c=0 --> S; c:=1 [ ] c=1 ^B --> S> |

FIG. 8 provides a graphical representation of a "nested do while" loop, which in UNITY form is shown in Table 8. The two loops identified in Table 8 terminate at an FP when c=0 ∧¬B holds.

TABLE 8

| "nested do while" Loop |
|---|
| initially c=0 |
| <c=0 ^B1-->S1; c:=1[ ] |
| c=1 ^B2-->S2[ ] |
| c=1 ∧¬B2-->S3; c:=0> |

The mechanics for converting sequential programs into UNITY form, such as the foregoing, is relatively straight forward. The starting point is the sequential program in BLOCK form. Each block is a sequence of assign, alternation, loop, abort, and skip statements. Here are the block rules; the blocks should be created as a result of the flow analysis:

Blocks cannot be contained within blocks:

A GOTO, if any, must occur at the end of a block (this defines a block boundary, if fact):

Any label that is the target of a GOTO must be on the first statement in a block (defining the other block boundary). This is because the other basic rule for a block is that the only entrance is at the beginning:

The start of a loop body is a block:

The start of each alternation is a block:

The blocks are numbered sequentially from 1 to N as they occur in the code text.

Converting a sequential program in block form into UNITY involves the following steps:

1. Create a global variable called BlockNumber, which is initialized to 1:
2. The last statement of each block must set the next block number:
   - For a GOTO, set BlockNumber to correspond to the label that was the target of the GOTO (the GOTO does not appear in the UNITY program):
   - If the block appears at the end of a loop (immediately before the od), set BlockNumber to be the block for the beginning of the loop body:
   - If the block appears at the end of a guarded statement as part of an alternation, the set BlockNumber to number the block immediately following the alternation:
   - If the block is followed immediately by another, possibly within a loop or alternation, set BlockNumber to the number of the following block.
3. Every guard in the UNITY program tests the value of BlockNumber for equality to the guarded block, and this test is conjoined with whatever other guard (from an alternation or loop) might be associated with the block.
4. Every guarded statement in the UNITY program is the code of the block with successor BlockNumber computations added (as specified above), GOTOs removed, and all do, od, if, and fi control statements removed.

This process is graphically displayed in FIGS. 8*a*–8*c*. Specifically, FIG. 8*a* illustrates original sequential code, FIG. 8*b* shows the same code augmented with blocks, and FIG. 8*c* illustrates a UNITY program created by the foregoing rules.

An operator of code analyzer 200 or UNITY format generator 430 of code analyzer 400, breaks a program into segments as required by the UNITY model. The operator may do this through a manual review and identification of iterating portions of code. Conversely, generator 430 may carry out this operation through the use of internal IL. (Although generator 430 is shown as a separate block in FIG. 4, it may be embodied as a module in engine 440.) This representation as noted above, is in the form of an AST data structure, such as that shown in FIG. 5*b*. Generator 430 utilizes this data structure to construct a program dependency graph, a construct that is commonly used for data flow analysis of programs and is well known to those having ordinary skill in the art. The program dependency graph contains the dependency relationships among various statements within a program. These dependencies are of three types: (1) control dependencies, (2) data flow dependencies, and (3) declaration dependencies.

Figure 9:
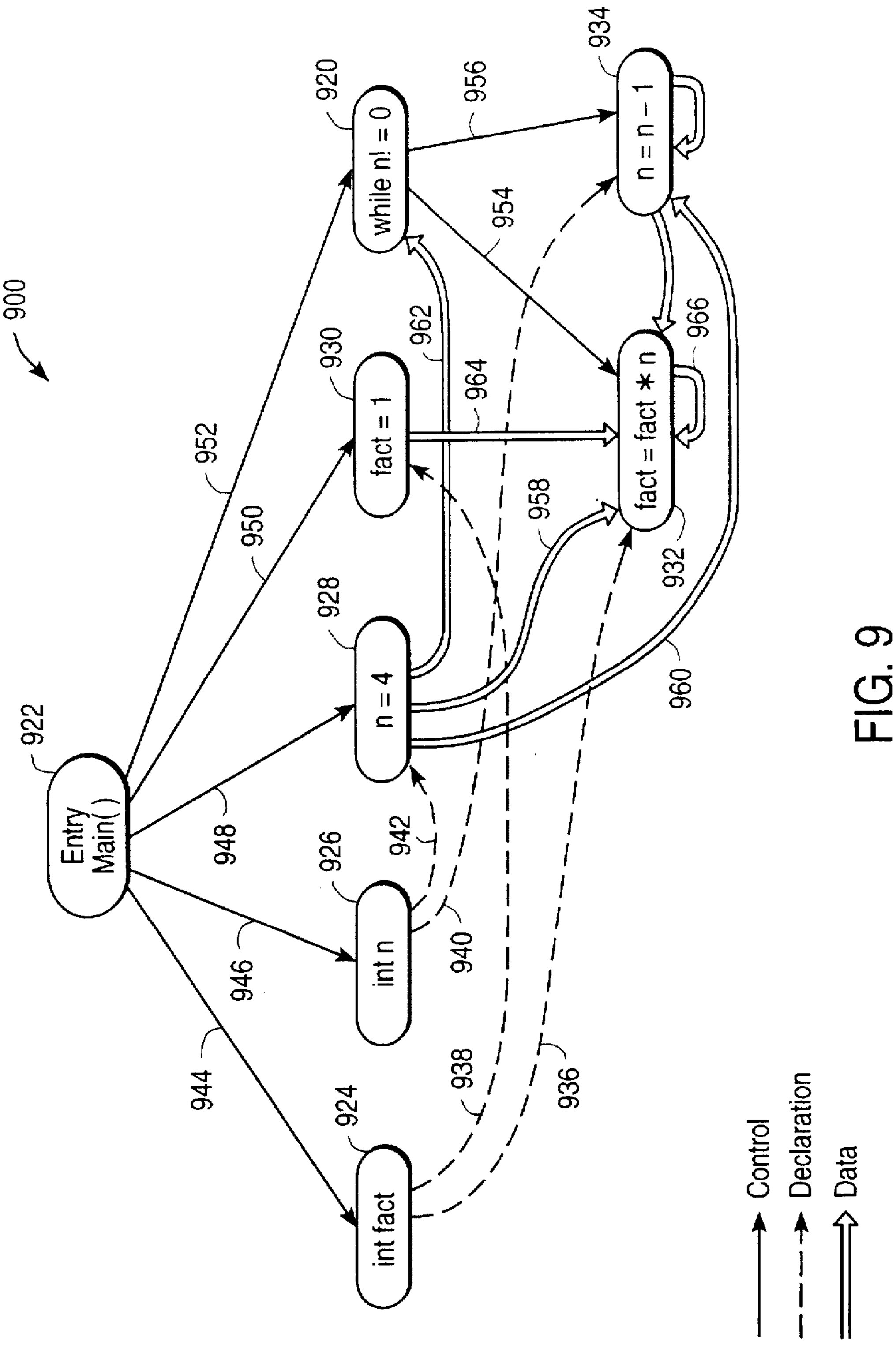
FIG. 9 is a schematic of a dependency graph.

Control dependencies indicate the order that statements may be executed. Data flow dependencies indicate how data is propagated through a dependency graph. Declaration dependencies indicate the dependency relationship between data declarations and the statements where their states are changed. FIG. 9 illustrates an example of a program dependency graph constructed from the C- language program fragment provided below in Table 9.

TABLE 9

C-Language Program Fragment

```
        main ( )
        {
[1]             int fact
[2]             int n
[3]             n=4
[4]             fact=1
[5]             While (n!=0) {
[6]             fact = fact * n
[7]             n = n-1
                }
        }
```

In the fragment of Table 9, the two declarations in lines [1] and [2] are related to equations in lines [3], [4], [6], and [7]. This relationship is graphically represented by lines 936–942 in FIG. 9. Regarding control flow, "main ()" precedes every statement while the inequality in line [5] must precede the statements of the loop body (i.e., [6] and [7]). This relationship is represented by lines 944–956 in FIG. 9. Regarding data flow, the equations in lines [6], [7], and the inequality in line [5] (i.e., n!=0) initially use the value of n set in line [3] and fact in line [4]. These equations also use the value of fact set in the previous cycle of the while loop. These relationships are represented by lines 958–966 in FIG. 9.

The use of a program dependency graph permits the separation of program segments as required by the UNITY model. In the foregoing example, the loop (lines [5], [7]) should be a separate segment because the loop iterates to termination for each use of "main ()." Moreover, this loop can be separated since it is an isolated sub-tree in the dependence graph of FIG. 9. Referring to this figure, if node 920 were removed from dependence graph 900, then the entire loop would be removed from the program fragment.

Significantly, only one statement in "main ()" must precede the loop. However, all "main ()" declarations must be carried in the separate segment because of declaration dependencies. Similarly, statements [3] and [4] just prior to the loop also depend on these declarations. This is an observation necessary for the propagation of weakest precondition calculation from one segment to another (i.e., "backwards" analysis, as discussed below).

Figure 10:
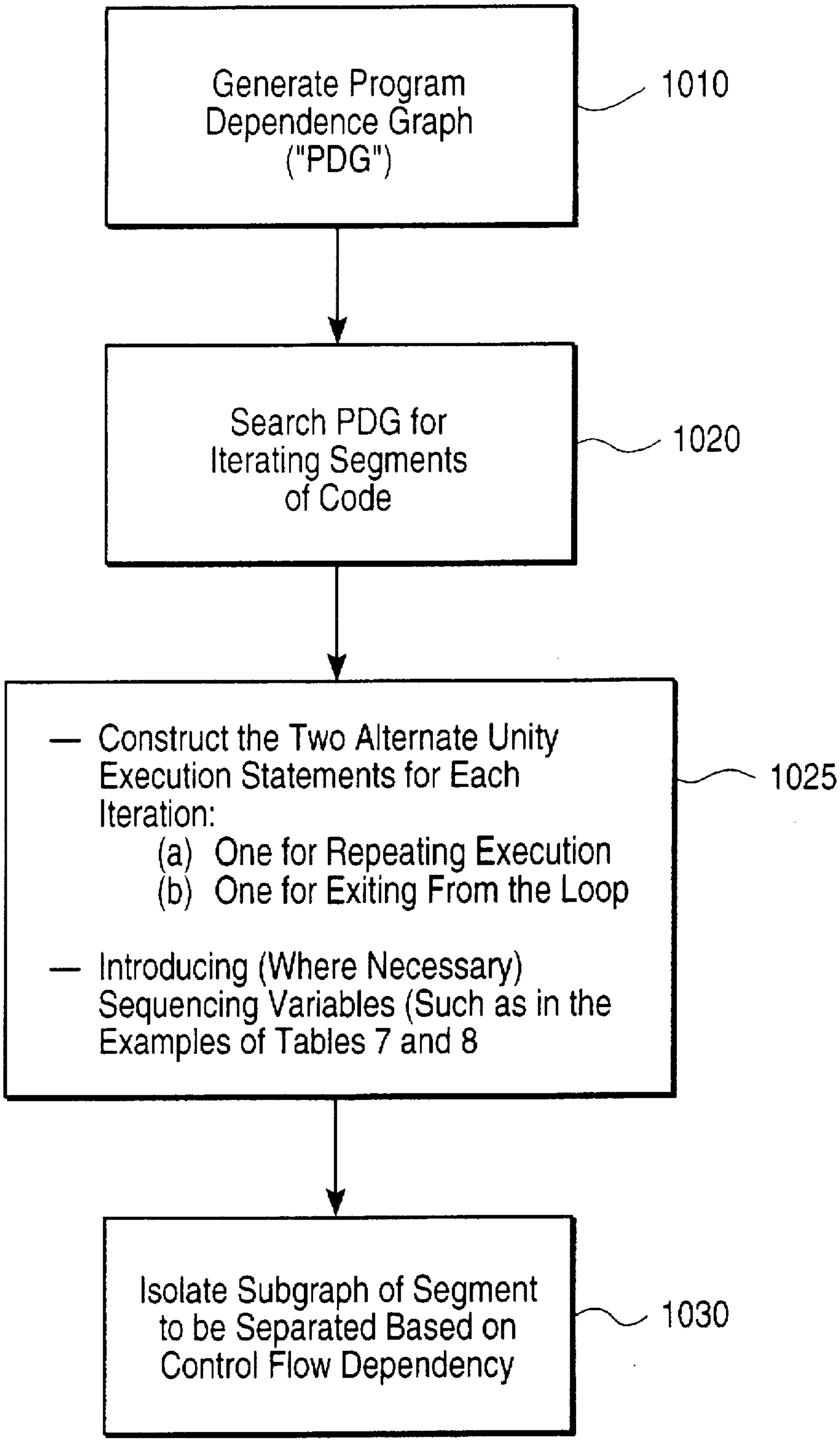
FIG. 10 is a flow chart illustrating the segmentation of iterating code.

Code analyzer 400 uses the program dependency graph data structure to segment a sequential program into UNITY segments, as illustrated in FIG. 10. Referring to FIGS. 4 and 10, IL file 420 (containing "internal IL" in AST form and a symbol table) is received by code analysis engine 440, and combined to form a program dependency graph, in accordance with block 1010 of FIG. 10. Engine 440 then searches the newly created dependency graph for statements that define iterations (e.g., "do while," "goto," etc.), as indicated in block 1020. Thereafter, engine 440 creates alternate UNITY statements for each interaction directed to repeating execution and exiting operation, pursuant to block 1025. The engine also introduces sequencing variables (e.g., variable "c", in Tables 7 and 8) where necessary. Finally, pursuant to block 1030, engine 440 utilizes the control flow dependencies of the subject dependence graph for isolating the subgraph associated with each of the iterations found in block 1020. The operations carried out in blocks 1010, 1020, and 1030 are well known to a person having ordinary skill in the art since such operations are also performed by any commercially-available compiler that optimizes program loops. These operations are also discussed in Aho.

As the foregoing illustrates, control flow dependencies are essential for isolating iterative segments. Conversely, declaration and data flow dependencies supply useful information for efficient execution of forward and backward analyses.

D. Analysis Sequence: Link Lists

Figure 11:
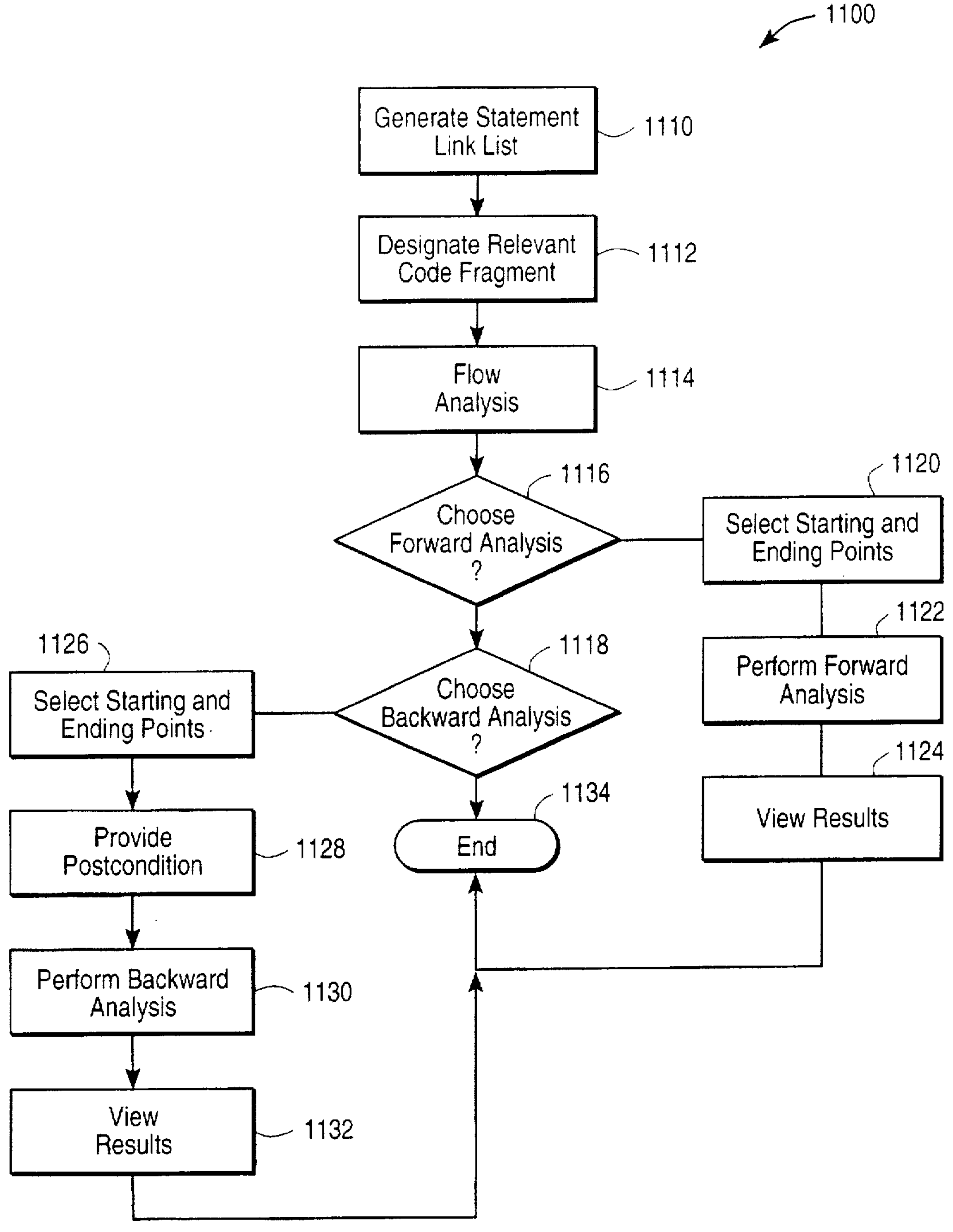
FIG. 11 is a flow chart for analysis of source code by the analyzer of FIG. 2.

FIG. 11 illustrates the software analysis sequence of code analysis engine 250 under the control of user interface 130 (FIG. 2). As a general summary of operation, engine 250 initially generates a statement link list from translated code, in accordance with block 1110. Thereafter, an operator designates the relevant code fragment to be analyzed in block 1112. Finally, flow analysis (either forward or backward) is carried out in blocks 1114–1134. Source code representing this embodiment of the invention is provided in a file entitled "PCA2 main routine," located in the Provisional Appendix.

1. Statement Link List

Analysis engine 250 builds a link list from IL File 230 and a corresponding symbol table in SYM file 240. This operation is well known to those having ordinary skill in the art. An overview of the resulting data structure is provided in FIG. 12.

Figure 12A:
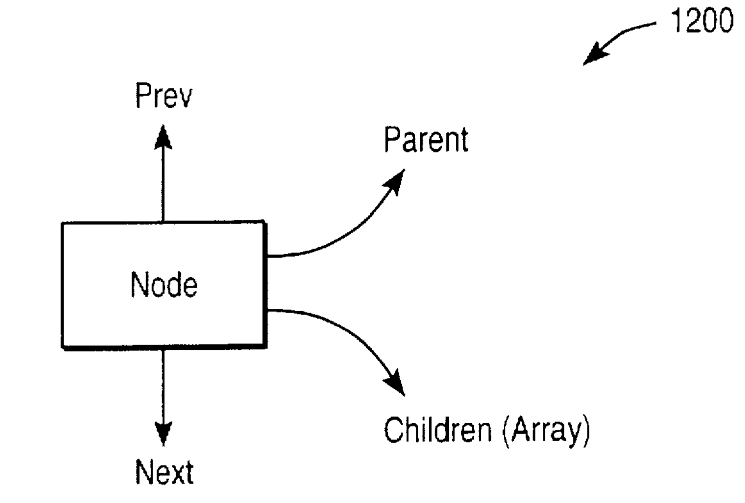
FIGS. 12a–12d illustrate linked list data structures.

FIG. 12*a* illustrates a link list node 1200. Every statement in source code file 210 is represented by a text string disposed within a node (i.e., "struct line" in the source code). A text string simply represents a statement (i.e., "y:=x+1") as a string of characters. Node 700 includes four sets of pointers (i.e., addresses to other nodes in memory) to other structures: i.e., previous node ("prev"), next node ("next"), a parent of the node ("parent"), and children ("children"). The children structure is made up of an array to facilitate any type of branching flow in the source code.

Figure 12B:
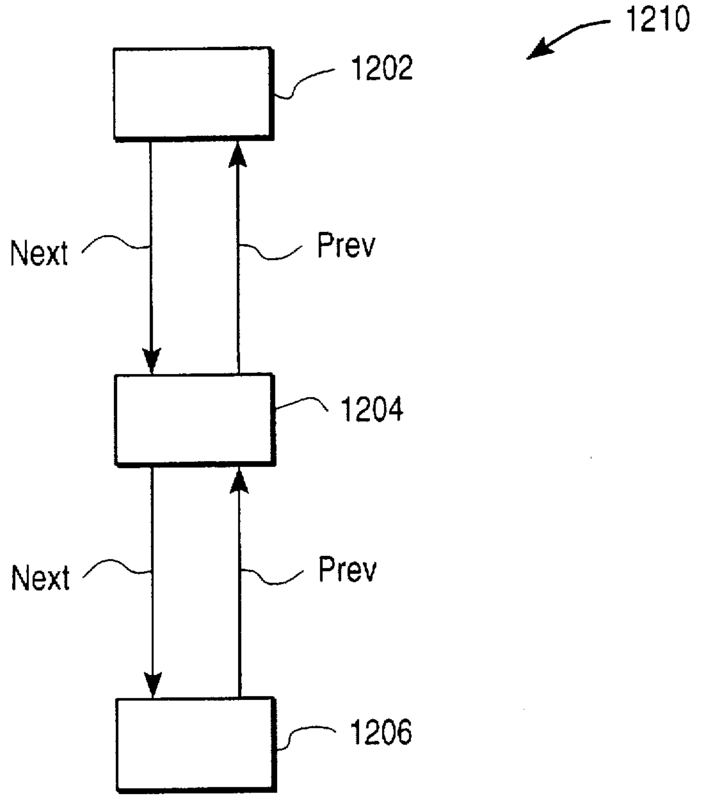

FIG. 12*b* illustrates a basic data structure of analyzer 300 using link list nodes. More specifically, FIG. 12*b* illustrates a double-link list 1210 including three nodes: 1202, 1204 and 1206. As illustrated by this data structure, code analysis engine 250 can traverse a link list of nodes representing a portion of source code by moving down a "next" pointer or up a "prev" pointer. An illustration of this data structure within a more complex source code construct is shown in FIG. 12*c*.

Figure 12C:
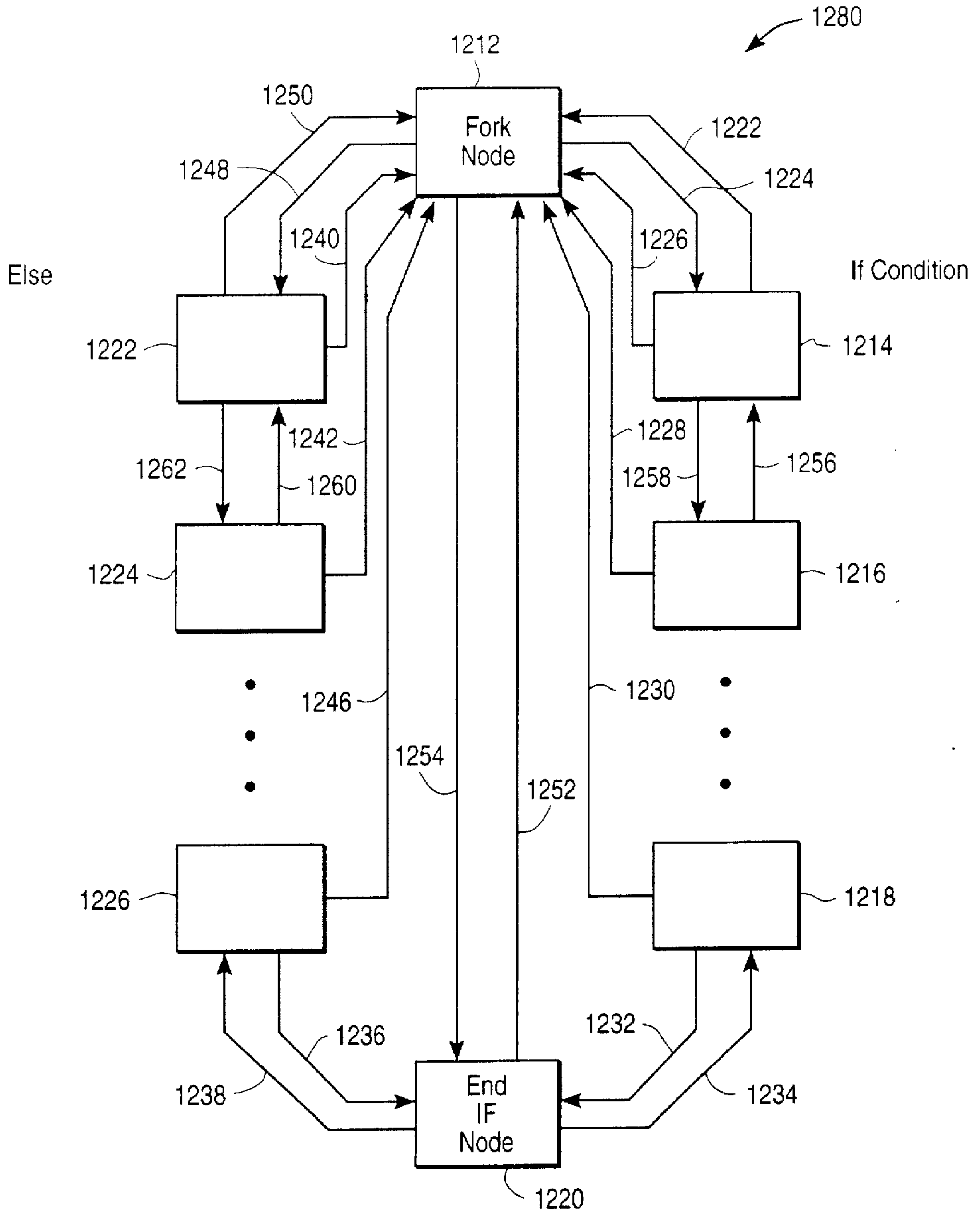

FIG. 12*c* illustrates a branch construct having multiple levels to accommodate an if-then-else statement. Referring to this figure, fork node 1212 is coupled to "end-if-node" 1220 via previous pointer 1252 and next pointer 1254. Fork node 1212 is also coupled to "if-condition" node 1214 via child pointer 1224, previous pointer 1222, and parent pointer 1226. Control flows to node 1214 when the subject if-then-else condition is true.

Node 1214 is coupled to node 1216 via previous pointer 1256 and next pointer 1258. Node 1216 is also coupled to fork node 1212 via parent pointer 1228. An identical data structure follows from node 1216 to node 1218 with any number of nodes in between. Node 1218 is the last node of this sequence, being coupled to fork node 1212 via parent pointer 1230 and to end-if-node 1220 via child pointer 1234 and next pointer 1232.

An identical data structure exists on the "else" (i.e., left-hand) side of the figure wherein nodes 1222, 1224, 1226, 1212 and 1220 are coupled to each other via previous pointers 1250, 1260; next pointers 1262, 1236; child pointers 1248, 1238; and parent pointers 1240, 1242, and 1246 as shown therein. Control flows to node 1222 when the subject if-then-else condition is false.

Engine 250 will traverse an if-then-else statement in IL file 230 on the data structure shown in FIG. 12*c*. Fork node 1212 is a "virtual" node supported by the data structure but not existing in the original source code file 210. Similarly, end-if-node 1220 is a virtual node (signifying the end of an if-then-else statement) supported by the data structure but not existing in the source code file 210.

Referring to FIG. 12*c*, engine 250 can traverse the branch statement represented by this structure simply moving down next pointer 754 or up previous pointer 752. Next or previous pointers allow for movement to the same or higher level. Conversely, child pointers allow for movements to lower levels.

The left-hand side of FIG. 12*c* (i.e., the "else" side) will be created by engine 250 even if there is no else statement within the source code file 210. Parent pointers allow for immediate movement to fork node 1212, as shown in FIG. 12*c*. Alternatively, engine 250 may traverse one or more previous pointers to return to fork node 1212. If any child node (i.e., 1214–1218 and 1222–1226) includes an if statement, the same structure as 7*c* may be found within that node.

Figure 12D:
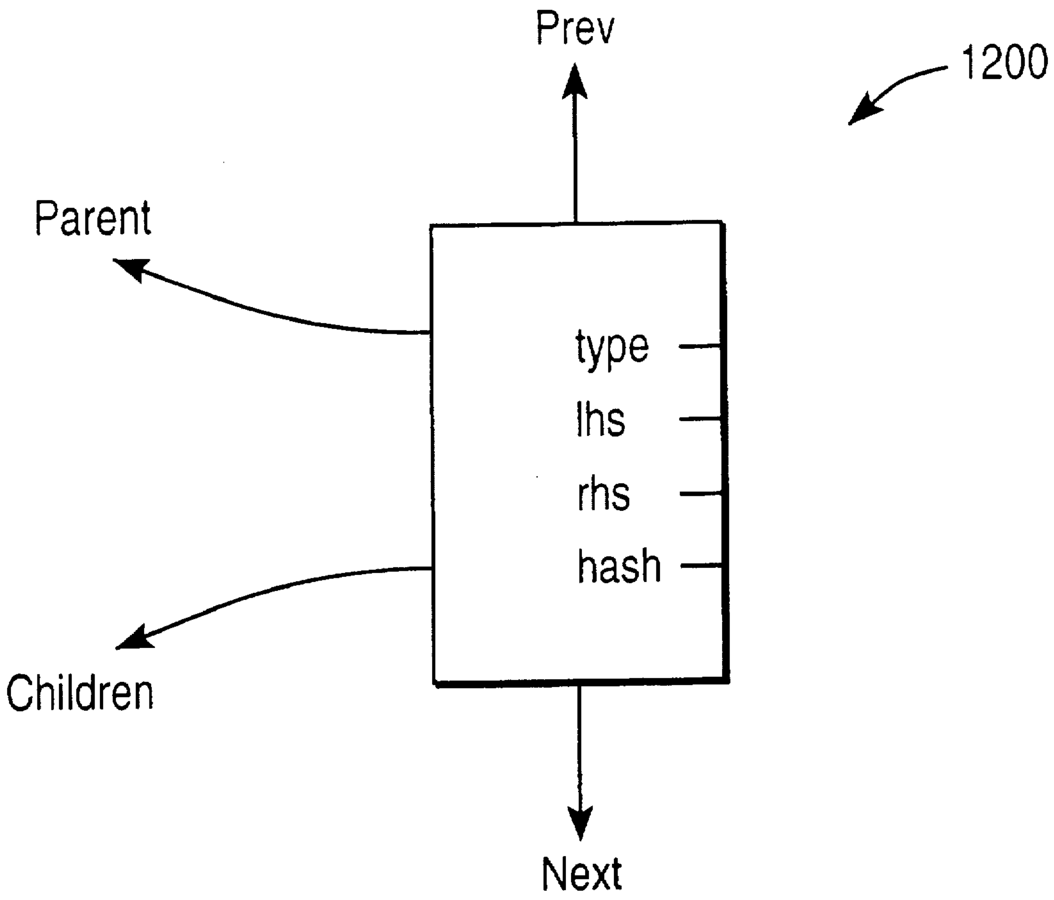

FIG. 12*d* illustrates the components of node 1200. Referring to FIG. 12*d*, node 1200 includes a type field to identify the type of intermediate language statement (i.e., if, assign, goto, etc.). This node also includes an "LHS" field to identify the left-hand side of an assignment statement and an "RHS" field to identify a right-hand side of an assignment statement. (The LHS and RHS fields are ASCII format for display to a user on monitor 120.) Finally, node 1200 includes a hash field which is an array of integers, wherein each integer is an index to a symbol table (i.e., in SYM file 240) containing attributes of the subject variable. As noted above, an exemplary symbol table may be found in co-pending application Ser. No. 08/550,869, (attorney docket no. 5773-3(P1)).

The link list data structure disclosed in FIGS. 12*a*–12*d* is of conventional type well known to those having ordinary skill in the art. Accordingly, it will be apparent to those of skill in the art that this structure may be readily applied to other source code constructs (i.e., assign, goto, etc.). Similarly, the text string data structure disposed in each node is a standard structure well known to those having ordinary skill in the art. Such structure may consist of a string of ASCII characters.

Returning to FIG. 11, once a statement link list has been generated, the code-analyzer operator may designate a relevant code fragment within that list pursuant to block 1112. Specifically, the operator may construct a desired fragment by selecting elements from an existing link list, or directly from the corresponding source or IL files. Responding to operator instructions, engine 250 constructs a code fragment by selecting a (1) starting statement and (2) ending statement.

Upon designating a relevant code fragment, the operator of code analyzer 200 has the option of performing a forward or backward analysis pursuant to blocks 1114–1134 of FIG. 11.

2. Flow Analysis

Referring to FIG. 11, upon selection of a program fragment in block 1112, the operator may now begin flow analysis pursuant to block 1114 in FIG. 11. A flow analysis begins with the operator selecting either a forward analysis in block 1116 or a backward analysis in block 1118. If forward analysis is chosen, control flows to block 1120. Conceptually, forward analysis is a classical application of data flow analysis. Forward analysis is the process of following the execution path of the code fragment being analyzed and either displaying information to the operator or building a data base described in the flow of control. In this process, engine 250 traverses a link list of nodes defining translated source code in a forward direction. At each node, engine 250 textually identifies a statement of the source code represented by a text string to determine the next node in the execution path. More specifically, engine 250 processes each node in forward analysis by interpreting associated IL statements through character matching.

To begin forward analysis, the operator must select corresponding starting and ending points pursuant to block 1120. Thereafter, control flows to block 1122 which represents forward analysis operation. A forward analysis may be used to determine the various paths of operation to get to some point downstream in the code. Variations on this operation include a display of all intervening branching conditions, a display of multiple end points and a display of the entire code and all paths between selected starting and ending points.

Forward analysis may also be used to show only those statements that are involved in the manipulation of one or more variables. This is a slice of the code that represents the path. More specifically, a slice is obtained by forward analysis under control of the operator. It begins at the starting point and continues until it reaches the ending point designated by the user, or the end of the relevant code fragment or the code fragment being analyzed. The resulting forward slice is saved for use as a relevant code fragment for slicing or weakest precondition analysis.

Figure 13A:
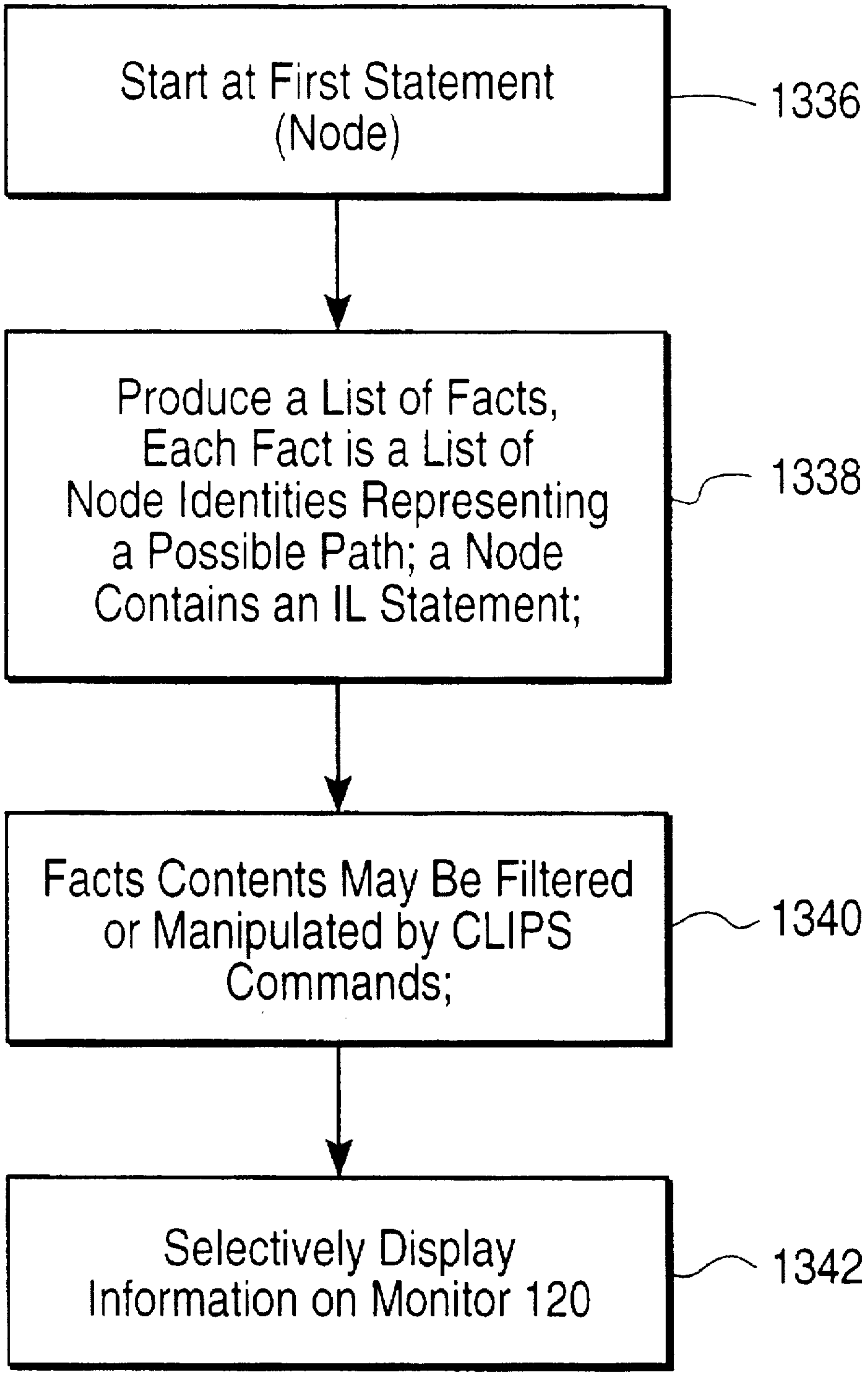
FIG. 13a is a flow chart of forward analysis performed by the analyzer of FIG. 2.

A top level flow diagram illustrating forward analysis in code analyzer 200 is provided in FIG. 13*a*. Referring to this figure, engine 250 begins forward analysis at the first selected statement pursuant to block 1336. This selected statement is defined by the starting point identified by the operator in block 1120. Engine 250 places the initial statement number (i.e., starting point) in a LIST in memory and initializes additional space in memory (pathstorage) for the first execution path to be analyzed. Control then flows to block 1338 where engine 250 produces a list of facts (i.e., data utilized by CLIPS commands), each fact being a list of node identities representing a possible path. This process is described in more detail in the pseudo code of Table 10.

TABLE 10

```
        enter initial and end statement number;
        put initial statement number in a LIST.
        initialize storage for the first path;
        position at the initial statement number in the
        source file -- this is now the current
        statement;
    repeat as long as there is a statement number
        in LIST -->
            repeat as long as next statement is not the
                end point -->
                    if current statement branches -->
                        store the statement number where flow
                        of control goes in LIST;
                    [ ] current statement does not branch -->
                        skip
                    fi;
                    put current statement in pathstorage;
                    get next statement;
                    check if next statement closes a loop
                    (isolate the whole loop in this case)
            end repeat.
    Store path in file (path is a flat list with
        condition statements linked together).
    Top element in LIST being initial statement number
        initializes storage for another path; remove top
```

TABLE 10-continued

```
        element from LIST;
    end repeat.
```

Referring to Table 10, the initial statement number (selected by the operator) is initially treated as the "current statement" for purposes of analysis. Engine 250 then enters two repeating or looping operations. The outer loop enables engine 250 to enter multiple paths, while the inner loop enables the engine to traverse a current path undergoing analysis.

Starting with the initial statement number, engine 250 processes the first path within the inner loop. If the current statement branches, the statement number is stored in the LIST. Otherwise, this step is skipped. Thereafter, the current statement is stored in memory (i.e., pathstorage) with the corresponding "condition" for continuing down the current path.

Engine 250 retrieves the next statement (i.e., link list node) along the current path and checks to determine if the statement closes a loop. If yes, the entire loop is isolated for purposes of imposing a UNITY model or for reviewing manually. The path analysis within the inner loop is then repeated, so long as the next statement is not an end point. As noted above, the IL statements are not executed in forward analysis but rather are interpreted through character matching.

Upon completing a path (i.e., reaching an end point), the entire path is stored in pathstorage as a flat list with condition statements linked together. Engine 250 then returns to the LIST and removes the top element. The top element, representing the statement number of the first branch in the previous path, is used to initialize analysis and storage for another path. Starting at this new statement number, engine 250 repeats inner loop operations; i.e., storing corresponding conditions in pathstorage and recording branches in LIST. These inner and outer loop operations are repeated until every statement and every path is processed by engine 250.

After a list of facts are produced pursuant to block 1338, control flows to block 1340 in FIG. 13*a* where the user may filter or manipulate the fact contents through the use of CLIPS commands.

More specifically, for statements disposed between starting and ending points, the operator may retrieve (1) the stored conditions and corresponding IL code (linked by statement number), (2) all the statements and (3) all the corresponding paths.

Additionally, specific variables may be identified for purposes of textually slicing the code based upon direct textual matching. This is a simple form of textual slicing —accommodating only direct hits—and therefore different from the more complex textual slicing described in FIG. 27, below.

If no end point is specified for forward analysis, analyzer 200 will continue to process code until a return (i.e., if in a procedure), the end of the program, or a termination/exit statement is reached.

Analyzer 200 also facilitates a "suppress" feature whereby all calls are ignored when performing forward analysis. Accordingly, only a single, primary path is processed.

Control then flows to block 1342 where the operator may selectively display information on monitor 120. As noted above, such display includes all intervening branching conditions, multiple end points and display of the entire code and all paths between selected starting and ending points.

Examples of forward analysis output are provided in FIGS. 13*d*–13*i*, based upon source code in FIGS. 13*b* and 13*c*. In the examples, a forward analysis is performed on a routine in "samplel.cob" called P010-CALC-LEAP-YEAR (FIG. 13*b*) which is called from another routine in the same program called 0300-INITIALIZE-RTN (FIG. 13*c*). These examples were generated on a early prototype to analyzer 200.

FIG. 13*d* illustrates forward analysis to determine the ability to reach one point from another. This example shows the conditions under which point 2226 is reached and in which lines those conditions appear in the source code. "ENDLine 1" indicates that line 2226 has been reached. Note that two paths are available to reach this point, denoted by "[1]" and "[2]."

FIG. 13*e* demonstrates that more than one end point may be identified: "ENDLine 1" indicates that a first end point is reached and "ENDLine 2" indicates a second end point is reached.

FIG. 13*f* illustrates the display of all code between the start and end points for four different execution paths.

FIG. 13*g* illustrates the textual, forward slicing of a portion of the code based upon variables "C-FEB" and "C-TEMP-1."

Figures 13H, 14A:
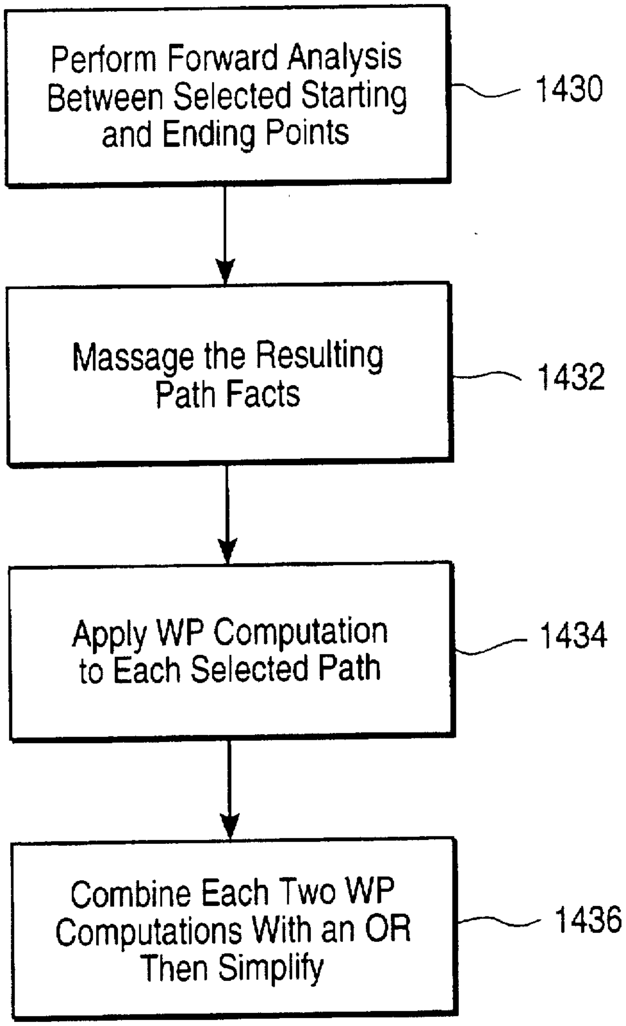

FIG. 13*h* illustrates the extraction of variables upon which C-TEMP1 is dependent. This extraction is achieved through reliance on a data dependency graph such as shown in FIG. 9, below. Significantly, the results of FIG. 13*h* may then be used in FIG. 13*i* to perform a slice of all such variables from the subject code.

Returning to FIG. 11, in addition to forward analysis, an operator may choose to perform backward analysis pursuant to block 1118. If backward analysis is selected, control flows to block 1126 wherein the operator must choose starting and ending points in the same manner as for forward analysis. Once valid starting and ending statements have been identified, engine 250 prompts the operator to enter a postcondition pursuant to block 1128. Upon presentation of the postcondition, backward analysis may begin pursuant to block 1130, wherein engine 250 traverses a link list of nodes defining translated source code in a backward direction.

Backward analysis is used in two different operations: one for calculating the "weakest precondition" (wp) of a non-iterating code segment and the other for verifying invariants for one or more iterating segments of the code. In backward analysis, each statement is processed by using the content of the statement to modify a postcondition to obtain a weakest precondition (such operation is described below). Engine 250 interprets each statement though character matching.

All program constructs included in the intermediate language are formed by a variety of statement types including alternation statements, assignments, skips, aborts and iterations connected together by the sequencing s operator (";"). Iterating code segments associated with large loops or cooperating processes executing concurrently will not be processed within the text of the main program because of the manual transformation of sequential programs into the UNITY model. Small, terminating loops, will typically be left within the main program. However, these segments may be analyzed separately requiring some operator input, such as an invariant. This determination is made through visual inspection of the code.

Verification of invariants for iterating statements uses the weakest precondition calculation code. This code represents most of the work for invariant verification. A discussion of weakest precondition computation follows.

3. wp Computation

The concept of the weakest precondition was introduced by E. W. Dijkstra (see, Dijkstra) and so far has been used primarily for theoretical work on the semantics of programming languages. Weakest precondition ("wp") may be defined as follows: given a program S and a condition P (i.e., a logical predicate which the program must satisfy when it terminates), the weakest precondition of S for P (i.e., "wp.S.P.") is the least restrictive condition Q that must hold before the execution of S to guarantee its termination in one of the states defined by P. This relationship is succinctly expressed in equation (4) below.

$$wp.S.P.=Q \tag{4}$$

The weakest precondition of many useful programming language statements is calculated by a simple syntactic manipulation of the programming language statements themselves and of the formula describing the postcondition. Several examples are provided below to illustrate the rules for wp computation of six basic statement types defined in DGC language (i.e., assignment, composition, alternation, skip, abort and repetition statements). In these examples, the definitions set out in Table 11 apply.

TABLE 11

| | |
|---|---|
| S, T: | denotes programs (statements), possibly compound statements. |
| P, Q: | denote predicates, often in simple propositional calculus and occasionally in first order predicate calculus with quantifiers. These predicates are not part of a program; rather, they are generated by the operator and used to express the state of program variables. |
| B: | denotes a predicate, or logical expression, that is part of a program and is evaluated as part of the execution of alternation and repetition statements. |

As a first example, S1 is a single assignment statement provided as equation (5) below.

$$x:=x+1 \tag{5}$$

Weakest preconditions of $S_1$ for two predicates are shown in equations (6) and (7) below.

$$wp.S_1.(x=2)=(x=1) \tag{6}$$

$$wp.S_1.(x>0)=(x>-1) \tag{7}$$

In words, program S will terminate in the state x=2 if and only if it starts in the state x=1, and it will terminate with x>0 if and only if it starts with x>−1. As a general rule, the semantics of the assignment statement x:=e, for any expression e, is defined in equation (8) where the notation P=P(x (−e) means that all occurrences of the variable x in predicate P are textually replaced by "e". If the variable does not occur in the predicate, then the predicate remains unchanged and, referring to equation (4), predicate Q=predicate P.

$$wp.(x:=e).P=P(x\rightarrow e) \tag{8}$$

As a second example, $S_2$ is the composition of two assignment statements provided as equations (9) and (10) below.

$$x:=x+1; \tag{9}$$

$$y:=y*y \tag{10}$$

Examples of weakest preconditions of $S_2$ for several predicates are shown in equations (11) through (13) below.

$$wp \cdot (x := x + 1;\ y := y * y) \cdot (x > 1) = (x > 0) \tag{11}$$

$$wp \cdot (x := x + 1;\ y := y * y) \cdot (y > 4) = (y > 2 \vee y < -2) \tag{12}$$

$$wp \cdot (x := x + 1;\ y := y * y) \cdot (x > 1 \wedge y > 4) = (x > 0 \wedge (y > 2 \vee y < -2)) \tag{13}$$

As a general rule, for any two statements $S_a$ and $S_b$, the semantics of the composition of the two statements in connection with weakest precondition is shown in equation (14).

$$Wp.S_a;S_b.P = wp.\ S_a.(wp.S_b.P) \tag{14}$$

This is a "backward computation." The wp of the last statement is the predicate used in the wp computation of the first statement.

As a third example, $S_3$ is a guarded alternation statement provided as equation (15) below.

$$\begin{aligned} &\textit{if}\ x>0 \rightarrow x:=x-1;\\ &[]x \leqq 0 \rightarrow \text{skip};\\ &\text{fi} \end{aligned} \tag{15}$$

Equation (15) is written in DGC form and in words means if x is greater than zero, x is set equal to x−1, and if x is less than or equal to zero, no operation is performed and control moves to the next statement (i.e., "skip"). Weakest precondition of $S_3$ for an exemplary predicate is provided in equation (16).

$$wp.S_3 \cdot (x>2) = (x>3) \tag{16}$$

Generally, the semantics of an alternation statement in the form of "if B then $S_a$ else $S_b$" in connection with weakest precondition is shown in equations (17) (disjunctive form) and (18) (conjunctive form).

$$wp \cdot (\text{if } B \text{ then } S_a \text{ else } S_b) \cdot P = (B \wedge wp \cdot S_a \cdot P) \vee (\neg B \wedge wp \cdot S_b \cdot P) \tag{17}$$

$$wp \cdot (\text{if } B \text{ then } S_a \text{ else } S_b) \cdot P = (B \Rightarrow wp \cdot S_a \cdot P) \wedge (\neg B \Rightarrow WP \cdot S_b \cdot P) \tag{18}$$

As a fourth example, $S_4$ is an abort statement—whose wp for any predicate is always "false" (i.e., results in program failure) because the program never reaches the end. The weakest precondition semantic is provided in equation (19).

$$\text{wp.abort.P=false} \tag{19}$$

As a fifth example, $S_5$ is a skip statement—which is always equal to the predicate "P" of equation (4) because the skip does not change anything. The corresponding weakest precondition semantic is provided in equation (20).

$$\text{wp.skip.P=P} \tag{20}$$

Finally, a repetition statement in DGC form (i.e., "do loop") is provided in equation (21) below.

$$\text{do B} \rightarrow \text{S od} \tag{21}$$

Referring to equation (21), "B" guards the loop body "S," which is repeated so long as B evaluates to true. If B is initially false, then S is never executed. To be useful, S must have "progress properties" that assure that B will eventually be false (although many systems, such as an operating system, loop forever).

Repetition semantics must be defined in terms of a "loop invariant" which is a predicate that holds before and after S; that is, S does not transform the invariant predicate. A necessary and sufficient condition for invariant predicate $P_I$ is shown in equation (22).

$$B \wedge P_I \Rightarrow wp \cdot S \cdot P_I \tag{22}$$

Equation (22) states that once past the guard, both B and the invariant hold and if the invariant is to hold after the loop body, B and $P_I$ must imply the weakest precondition.

When the loop statement terminates, the guard will be false but the invariant must still hold. Furthermore, the invariant must hold initially. These observations lead to the weakest precondition semantics of the repetition statement as shown in equation (23).

$$wp \cdot (\text{do } B \rightarrow S\ od) \cdot (\neg B \wedge P_I) \equiv P_I \tag{23}$$

FIG. 14*a* provides a top-level flow chart of backward analysis in analyzer 200. At block 1430, engine 250 performs a forward analysis between the starting and ending points selected in block 1126 of FIG. 11 to create path fact(s) (see, FIGS. 13*a*–13*i* and related discussion). In block 1432, engine 250 massages the resulting path fact(s) by performing such operations as textual or transitive-closure slicing. Such slicing of linked list data structures is well known in the art. An analogous operation for basic block data structures is provided below (i.e., FIGS. 27, 28*a*, 28*b*).

Control then flows to block 1434 where wp computation is performed on each selected path. This operation is described in FIG. 14*b* below. Finally, the wp of every two paths newly calculated are ORed together in block 1436 and then simplified pursuant to FIG. 17*a* (discussed below).

Figure 14B:
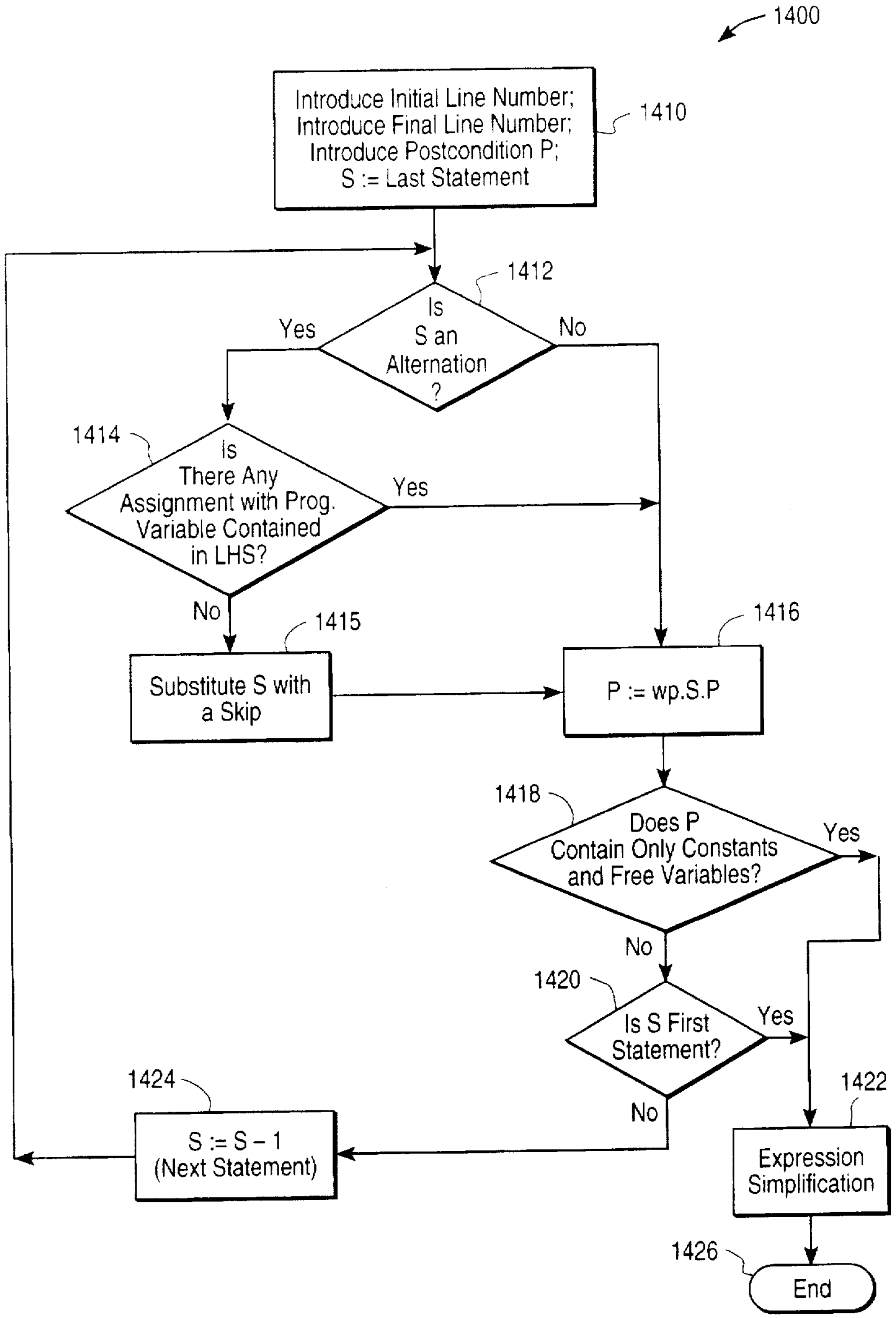

FIG. 14*b* illustrates flow chart 1400 which describes weakest precondition calculation in analyzer 200 for each program statement (S) of interest within a path defined by an initial line number and final line number. This operation may be applied to a fragment or the entire original program. In block 1410 of flow chart 1400, the operator identifies initial and final line numbers and a postcondition P. Engine 250 responds by identifying the last statement (S) contained between the initial and final line numbers. After these initial values are established, control flows to block 1412 where engine 250 determines whether S is an alternation. If S is not an alternation, control flows immediately to block 1416 where a weakest precondition is calculated based on postcondition P and statement S. Alternatively, if S is an alternation, then control flows to block 1414 where engine 250 determines whether any assignment in statement S has a left-hand side (LHS) variable in an assignment statement that is contained in the variables of P. If there is, control flows to block 1416 for weakest precondition calculation. Alternatively, if there is not, control flows to block 1415 where statement S is substituted with a skip statement and then control flows to block 1416.

In block 1416, weakest precondition is calculated based on statement S and postcondition P. Upon calculating a new precondition (which will be a postcondition for the previous statement), a new set of variables are identified based on the latest postcondition. (A flow chart describing the operation in block 1416 is provided in FIG. 15.) Control then flows to block 1418 where engine 250 determines whether P contains only constants and free variables (i.e., variables that do not occur in the program). If this is answered in the affirmative, control flows to block 1422 where expression simplification is performed and the process ends pursuant to block 1426 since any remaining statements will have no effect on P.

However, if block 1418 is answered in the negative, control then flows to block 1420 where engine 250 inquires whether S is the first statement between initial and final line numbers. If yes, control again flows to block 1422. If no, control flows to block 1424 where S is decremented by 1, thereby identifying the next statement to be processed. This operation continues until block 1418 or block 1420 is answered in the affirmative. Referring again to FIG. 14*b*, the expression simplification for block 1422 is optional and described in greater detail below.

Figure 25:
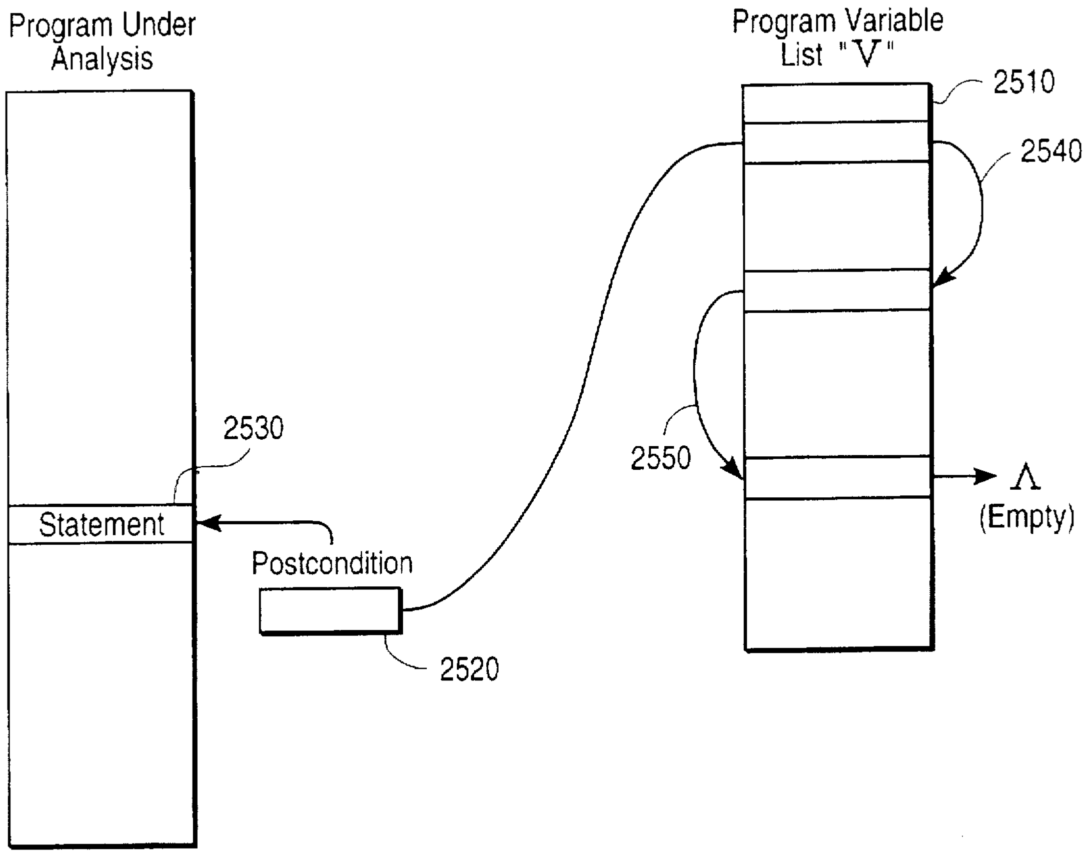
FIGS. 25 and 26 are block diagrams of program variable lists.

Rather than repeatedly inspect the postcondition P for variables of interest during wp computation, engine 250 may alternatively employ a separate list of variables ("V") in accordance with the program variable list shown in FIG. 25. If such a list were employed, the process in FIG. 14*b* would be modified only slightly. In block 1410, engine 250 would generate the list based on the initial contents of P. In block 1414, the variable list V rather than the postcondition P would be searched for matching variables with a new statement.

Use of a variable list could be significantly more efficient than a postcondition text string when performing the searching operation in block 1414, especially if the latter has a significant number of terms. For example, a statement is shown in FIG. 14*c* containing 21 terms but only 7 variables. Presumably, the time required to search a list with 7 entries is less than searching a 21-term text string.

Returning to FIG. 14*b*, upon computing a weakest precondition in block 1416, variable list V is updated by adding and deleting variables based upon the latest postcondition. In summary, incorporating a variable list such as shown in FIG. 25 would affect operations in blocks 1410, 1414 and 1416 of FIG. 14*b*.

Figure 15:
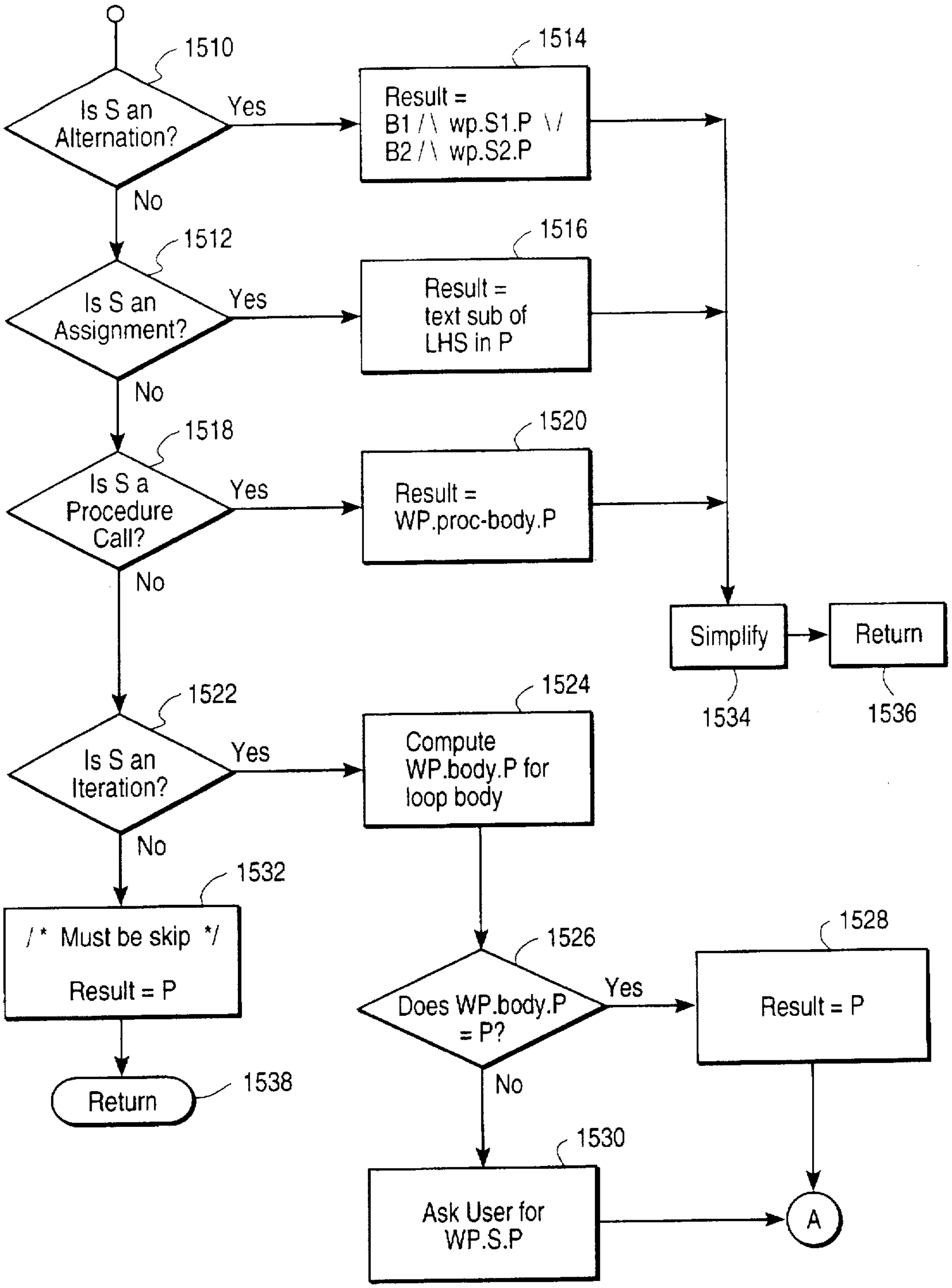
FIG. 15 is a flow chart of wp computation for various statement types by the analyzer of FIG. 2.

FIG. 15 illustrates the wp computation carried out in block 1416 of FIG. 14*b*. In this analysis, it is presumed that Hoare's axiom holds which, in a practical sense, means variable aliasing is not accommodated. Turning to FIG. 15, engine 250 determines whether S is an alternation. If yes, control flow to block 1514 where a result (i.e., weakest precondition) is equal to a guard (i.e., B1 or B2) logically ANDed with the weakest precondition of a corresponding statement (i.e., S1 or S2) based on postcondition P. As discussed above, B's are guards to their corresponding statements. The result in block 1514 assumes that only two statements are present in the associated alternation statement. In this instance, engine 250 calls the code recursively to evaluate the weakest precondition for each branch of the if (i.e., alternation). If S is not an alternation, control flows to block 1512 to determine whether S is an assignment. If yes, engine 250 performs a textual substitution of the predicate P (i.e., postcondition), replacing all occurrences of the subject variable in the predicate with the expression on the right-hand side of the assignment.

If statement is not an assignment, control flows to blocks 1518 where engine 250 determines whether statement S is a procedure call. If yes, control flows to block 1520 where the result is a product of recursively performing the weakest precondition computation with the subject procedure as its argument.

If S is not a procedure call, control flows to block 1522 where engine 250 determines whether S is an iteration. If yes, control flows to block 1524 where weakest precondition is computed for the loop body. In block 1524, this computation is performed by engine 250 processing the loop body. After which, control flows to block 1526 where it is determined whether the precondition of iteration S equals the postcondition. If yes, control flows to block 1528 where the result is set equal to P (i.e., P is a true invariant). If no, control flows to block 1530 where engine 250 asks the operator for the weakest precondition of S because the value cannot be computed. In responding to analyzer 200 in block 1530, the operator will also determine manually—by inspection—whether P is false. If S is none of the above, it is treated as a skip and the routine returns to the process in FIG. 14*b* pursuant to block 1538.

After computation is performed in blocks 1514, 1516, 1520, and 1528, expression simplification is performed pursuant to block 1534 to simplify the result before returning to block 1416 in FIG. 14*b* pursuant to block 1536.

Although not shown in FIG. 15, if S is a "goto" statement, wp calculation is performed on each associated path in a backwards flow—ultimately generating a value in accordance with the other statement types. More specifically, engine 250 performs a separate wp computation on each path associated with the goto. The individual results are ORed together (and simplified) thereby generating a single wp for the statement.

Figure 16:
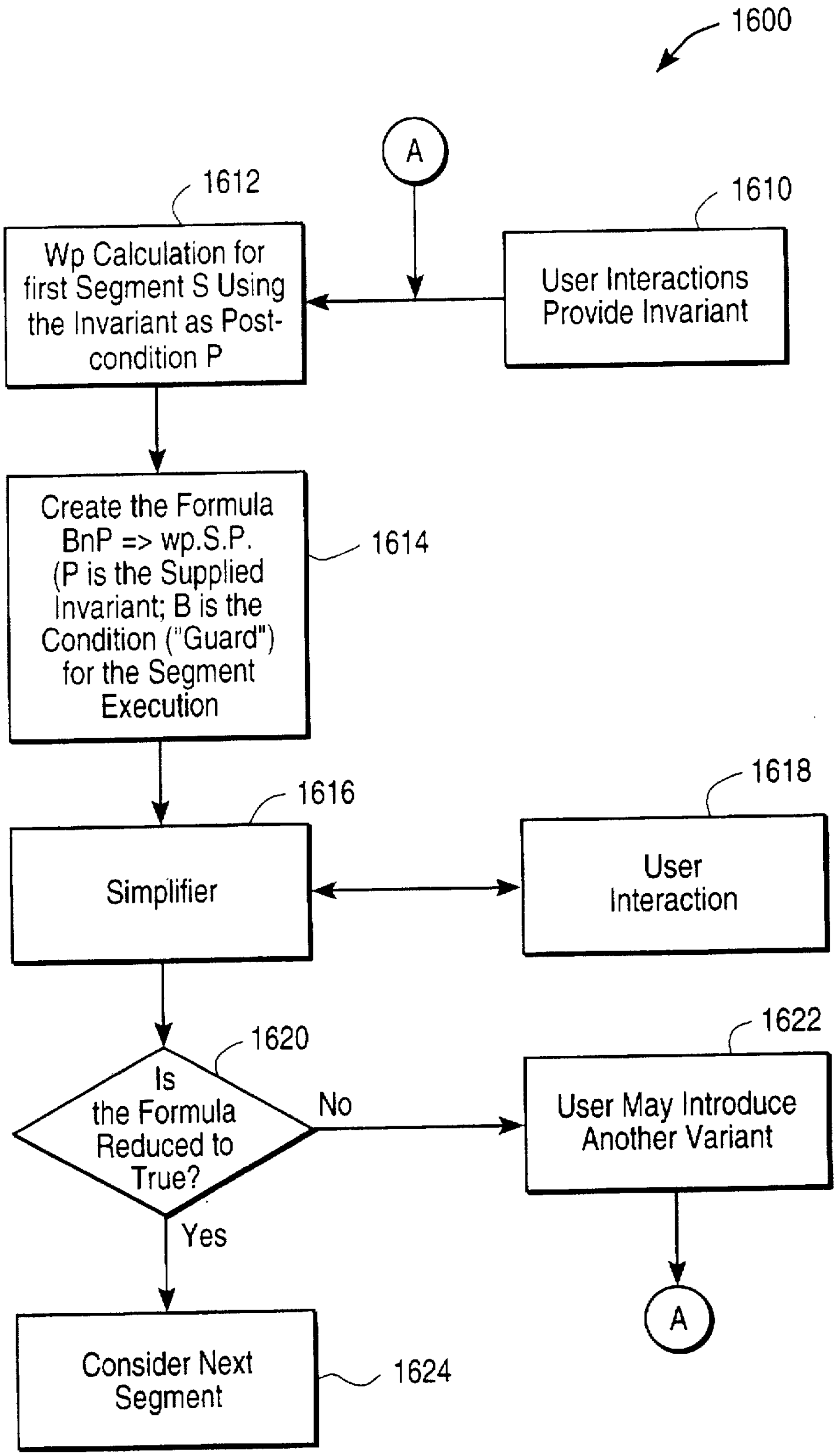
FIG. 16 is a flow chart for invariance verification.

Invariant verification, an operation performed on iterating statements, is illustrated in FIG. 16. Referring to FIG. 16, invariant verification begins at block 1610 with the operator providing an invariant. Control flows to block 1612 where weakest precondition calculation for a first segment S using the invariant as postcondition P is initialized. In block 1614, engine 250 applies the relationship for invariant calculation as shown in equation (22) below:

$$B \wedge P \Rightarrow wp\ S\ P \tag{24}$$

In equation (24), P is the supplied invariant and B is the condition (i.e., guard) for the segment execution. After performing the calculation in block 1614 (pursuant to the wp computation process of FIG. 15), engine 250 simplifies the result in block 1616. The simplification process may require user interaction as shown in block 1618. (See Library of Lemmas discussion, below) Simplification is described in greater detail below. In block 1620, engine 250 determines whether the resulting formula is reduced to "true". If no, control flows to block 1622 where the user may introduce another variant and begin the process again at block 1612. However, if the formula is reduced to true, the invariant is verified and the operator is free to consider the next segment pursuant to block 1624.

4. Simplification

Figure 17A:
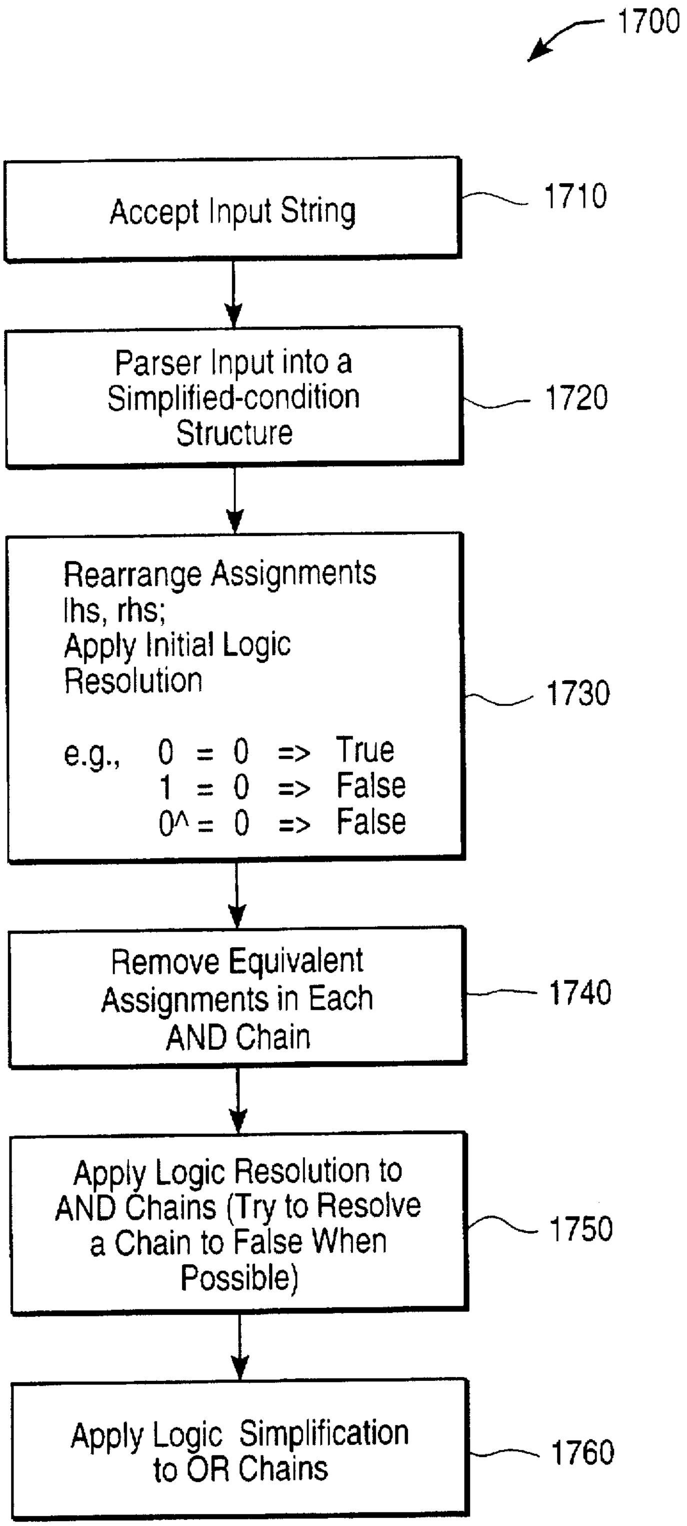
FIGS. 17a–17g illustrate predicate simplification by the analyzer of FIG. 2.

FIG. 17*a* illustrates the expression simplification process of blocks 1436 in FIG. 14*a*, 1422 in FIG. 14*b*, 1534 in FIG. 15, and 1616 in FIG. 16. The process of FIG. 17*a* is applicable to any predicate (i.e., precondition, postcondition, etc.) and is embodied in a simplifier module contained within engine 250. The source code for an exemplary simplifier is included in a file entitled "PCA2 simplifier," included in the Provisional Appendix. Referring to FIG. 17*a*, engine 250 initially accepts an input string in block 1710. This input string may represent, for example, a postcondition. The string is processed in block 1720 for ultimate reduction to a single OR chain 1773 shown in FIG. 17*f*. Processing is performed by a parser disposed within engine 250. The steps carried out in block 1720 are illustrated in FIGS. 17*b*–17*f*.

Figure 17B:
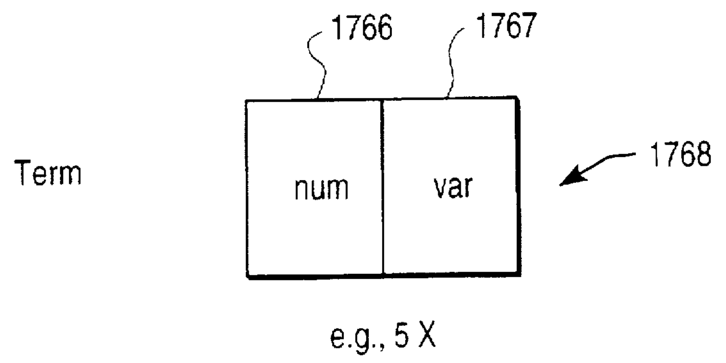
Figure 17C:
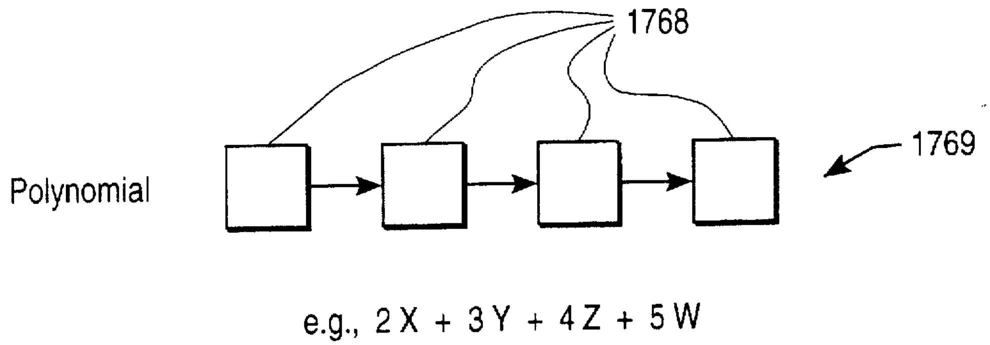

At the outset, engine 250 parses an input string into tokens; each token holding a number or a variable as shown in FIG. 17*b*. Parsing a string into tokens enables engine 250 to "understand" the expression; i.e., learn what variables are present. Engine 250 next combines tokens into "terms:" each term data structure 1768 holding a number and/or variable (i.e., a term of a polynominal). As shown in FIG. 17c, a sequence of terms 1768 added together forms polynominal 1769.

Figure 17D:
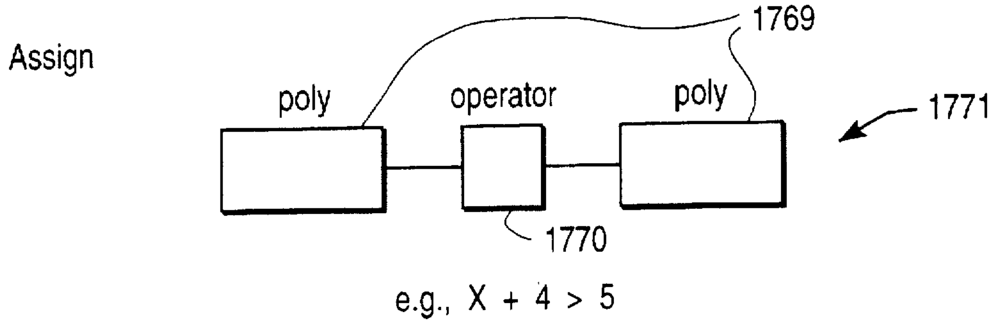

Engine 250 reads the input string at block 1710 sequentially and, therefore, can identify and situate operators (i.e., <, >, ≦, ≧, =, ≠, etc.) correctly between polynominals. As shown in FIG. 17d, when two polynominals 1769 are disposed on either side of an operator 1770, the result is an equation or "assign" 1771.

Upon identifying and assembling assigns, engine 250 concurrently places these data structures in a standardized format by moving integers to the right hand side (RHS) of the operator and variables to the left hand side (LHS) pursuant to block 1730. Engine 250 also conducts some rudimentary simplification by combining terms (i.e., same variable) and determining whether the newly created assign may logically reduce to a "TRUE" (i.e., y=y) or "FALSE" (i.e., 1=0) for all cases.

Figure 17E:
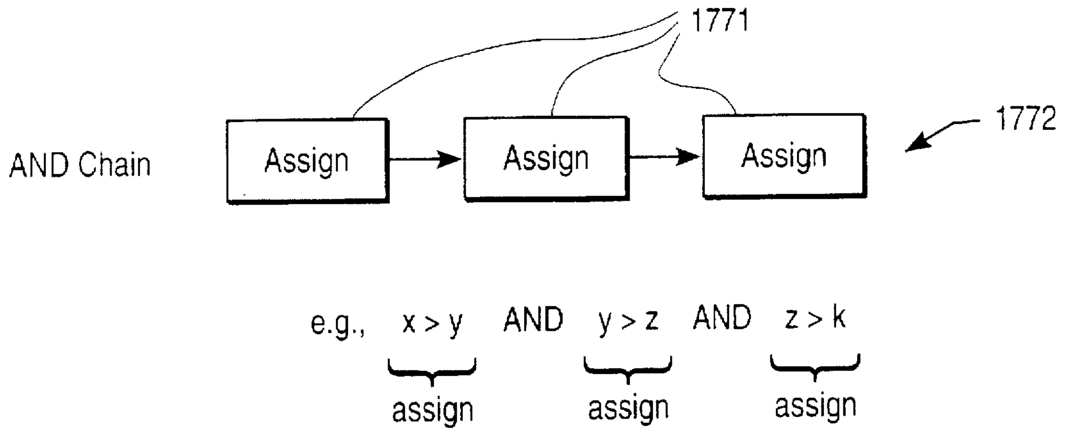
Figure 17F:
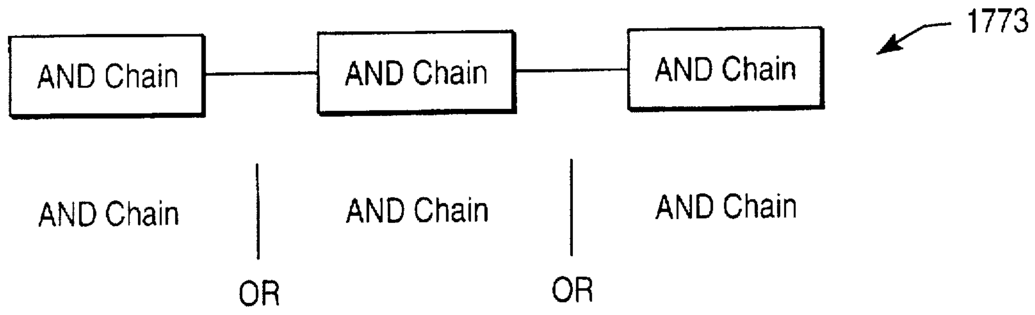

Once the current assign has been reduced to its simplest form, engine 250 applies standard YACC Grammar (See Aho) in block 1720 to link this assign with other assigns which are related via a logical AND (i.e., an ampersand). As a result, engine 250 creates an AND chain 1772 made up of two or more assigns 1771, as shown in FIG. 17e.

Upon creation of AND chain(s) 1772, engine 250 will begin the next level of simplification: (1) removal of equivalent assigns in each chain pursuant to block 1740 (i.e., eliminate redundant assigns), and (2) application of logical rules to each chain for possible reduction to false, pursuant to block 1750. As an example of the latter operation, if any assign reduced to false in block 1730, its corresponding AND chain (if any) would also reduce to false.

Concurrent with the operations in blocks 1740 and 1750, engine 250 also assembles AND chains 1772 into a single logical OR chain 1773, again pursuant to standard YACC Grammar. After AND chains 1772 are simplified, OR chain 1773 is evaluated with logical rules in block 1760 to determine whether further simplification is possible. For example, if any AND chain reduced to true, then OR chain 1773 would also reduce to true. Four fundamental boolean relationships useful for reduction are shown below in Table 12.

TABLE 12

| |
|---|
| True ^ Anything = Anything |
| True V Anything = True |
| False ^ Anything = False |
| False V Anything = Anything |

Figure 17G:
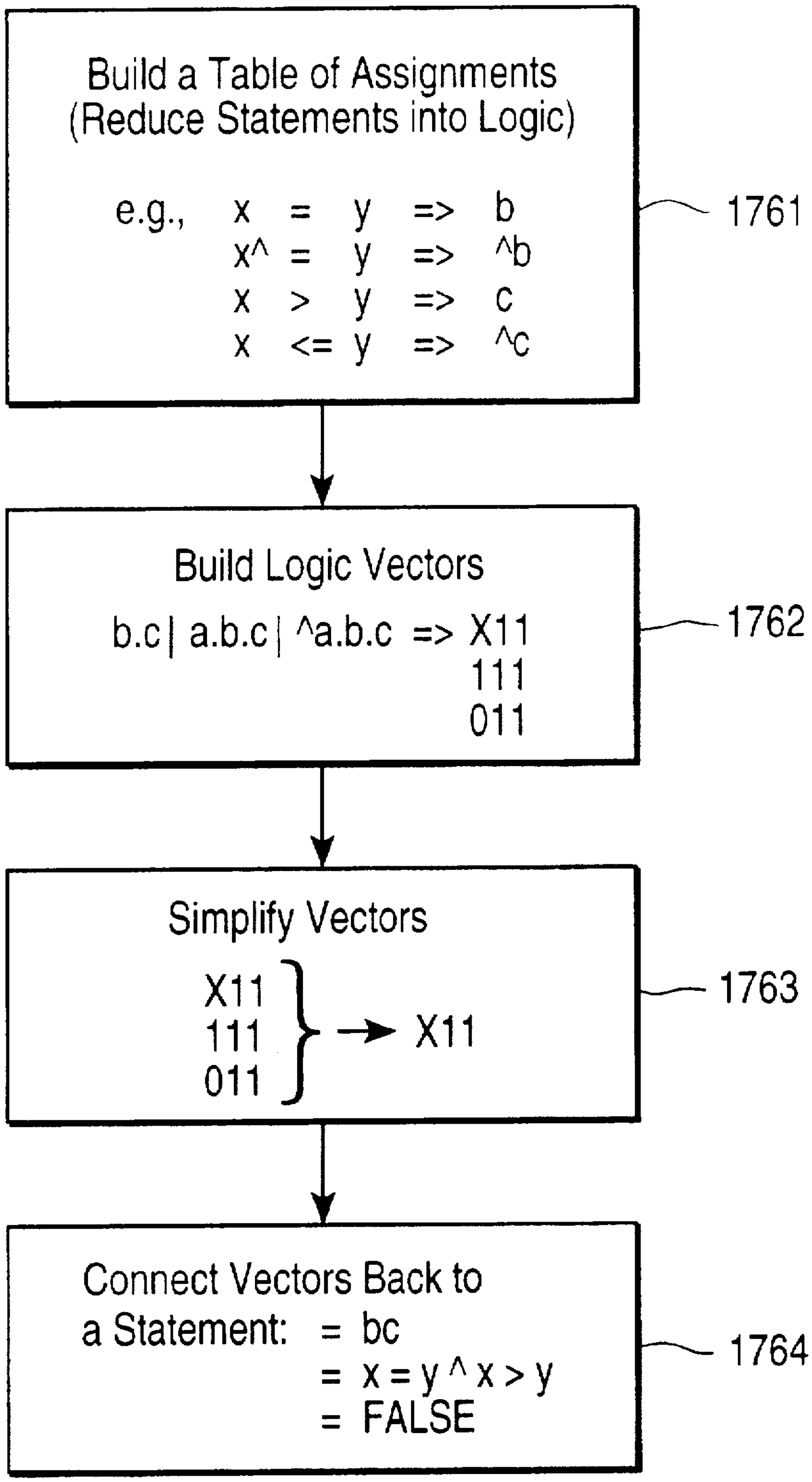

The logical simplification applied to OR chains in block 1760 is further illustrated in FIG. 17g. Referring to FIG. 17g, engine 250 builds a table of assignments in block 1761, reducing each statement (i.e., assign) to a single variable. In this way, relationships between different statements may be tracked (i.e., x= ⇒a and x≠y ⇒ NOT a).

Engine 250 then builds logic vectors in block 1762 based on the relationship between variables (i.e., statements). Karnaugh Maps may be applied here to simplify relationships. Referring to block 1762 in FIG. 17g, the relationship "b AND c OR a AND b AND c OR NOT a AND b AND c" is ultimately reduced to a series of 1's, 0's and "don't cares" (i.e., "X"). These vectors are simplified in block 1763 resulting in the vector "X11." Finally, this simplified vector is changed back to a statement (i.e., input string) through the variables b and c, pursuant to block 1764.

In the example of FIG. 17g, "X11" converts to b AND c, which becomes "x=y ^x>y." Since the relationships on either side of the conjunction cannot both be true, this statement simplifies to "false."

Alternatively, if the vectors simplified to a relationship that was true under all circumstances (i.e., x=x ^y=y), then the statement would reduce to "true."

If the input string cannot be simplified to True or False, some valid, logical relationship is output from the simplifier. The rules applied in this simplification operation include the boolean relationships provided in FIGS. 43a–43c.

How this value is subsequently used will depend upon the on-going operation. For example, if the string is simplified during the course of a wp computation pursuant to block 1532 of FIG. 15, the simplified value serves as a postcondition for the next (i.e., upstream) statement. Alternatively, if the result is a final wp computation in a backward analysis pursuant to block 1422 of FIG. 14, the simplified expression is displayed to the operator on monitor 120. Finally, if the result is a simplified invariance computation pursuant to block 1616 of FIG. 16, the expression is displayed to the operator on monitor 120 for consideration pursuant to block 1620, as described therein.

Improvements to the simplification process of FIG. 17a include inputting tokens rather than strings. Such a configuration would eliminate two transformation steps (i.e., from and to strings) within the process. A second improvement is creating a symbol table (i.e., in block 1761 of FIG. 17g) that is permanent. Current operation requires the creation of a new table for each statement that is simplified. However, it would be more efficient to maintain the table in memory and simply update when new relationships are produced through simplification of new statements. Such improvements are currently being implemented in the most recent version of analyzer 200.

Referring again to the exemplary source code in FIGS. 13b and 13c, several examples of backward analysis output are provided in FIGS. 42a–42c. In the example of FIG. 42a, the postcondition chosen was "1" (i.e., TRUE; a constant without any dependency on the source code). Accordingly, the weakest precondition is TRUE; i.e., line 2217 will always be reached from line 2207.

In the example of FIG. 42b, the variable C-FEB is assigned a free variable "n" as the postcondition. The weakest precondition tells that line 2217 can be reached from line 2207 by two different paths. One path reports that if C-YY is divisible by 4, then C-FEB will have a value of 29. The other path reports that if C-YY is not divisible by 4, the C-FEB will have a value of 28.

Finally, in the example of FIG. 42c, the postcondition is used to check at what condition C-FEB will be assigned a value greater than 29. The weakest precondition result reports that C-FEB cannot be assigned a value greater than 29 from line 2207 to line 2217. Accordingly, the weakest precondition is FALSE.

E. Analysis Sequence: Flow Graph

Figure 18A:
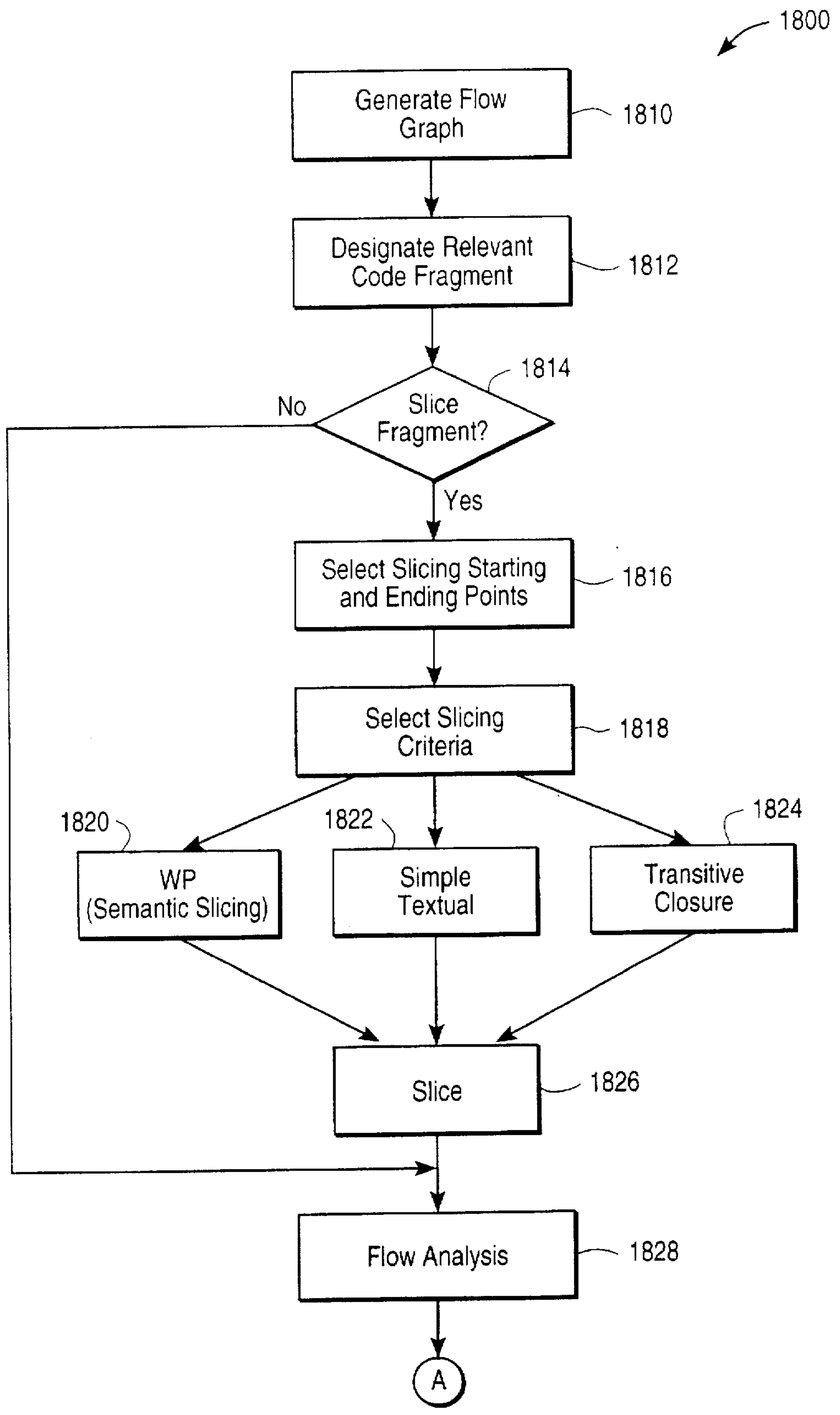
FIGS. 18a–18b are flow charts of analysis of source code by the analyzer of FIG. 4.
Figure 18B:
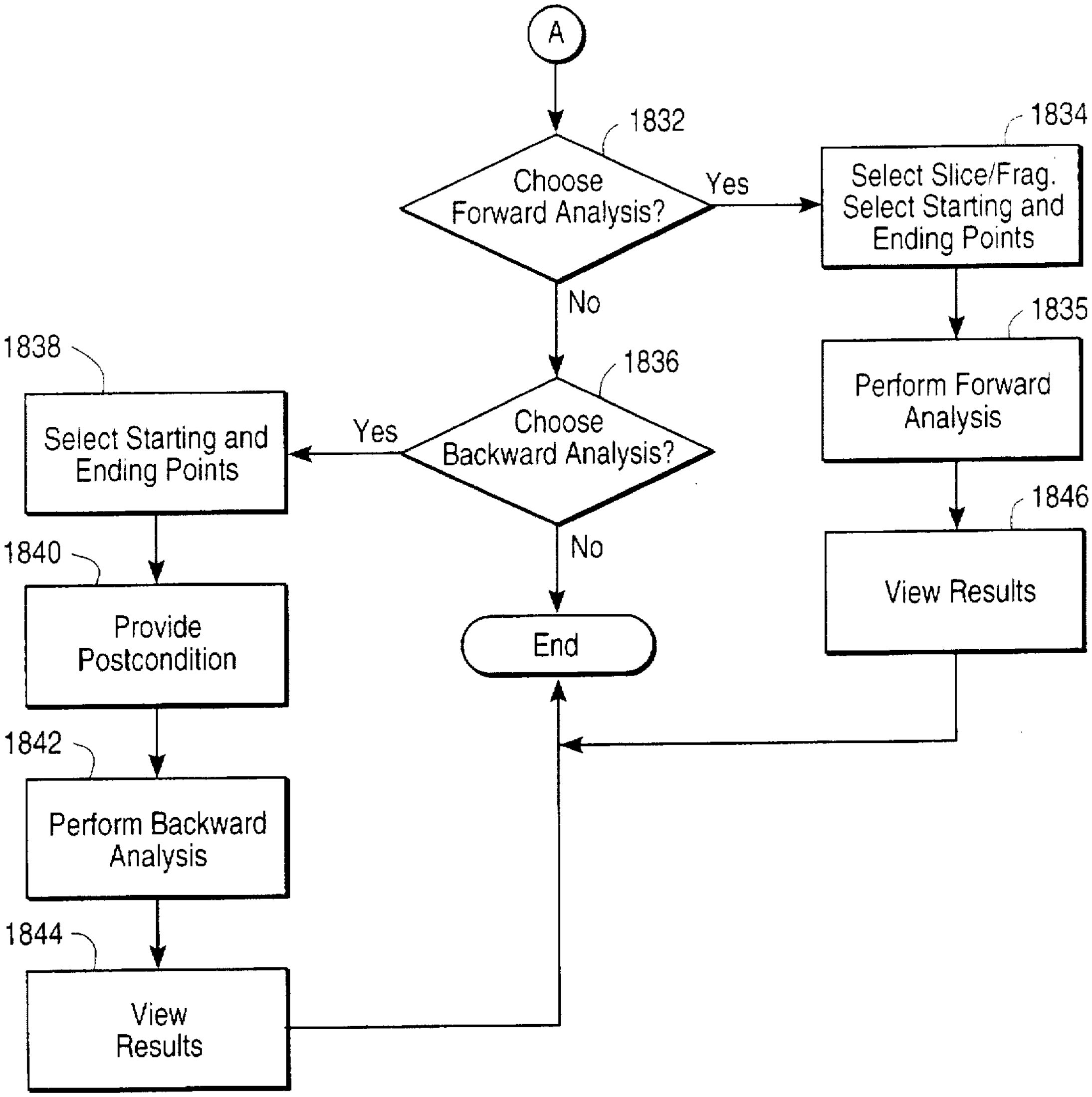

FIGS. 18a and 18b illustrate the software analysis sequence of code analysis engine 440 under the control of user interface 130 (FIG. 4). As a general summary of operation, engine 440 initially generates a flow graph from translated code, in accordance with block 1810. Thereafter, an operator designates the relevant code fragment to be analyzed in block 1812. The operator must then decide whether to slice the subject fragment and, if so, under what criteria in accordance with blocks 1814–1826. Finally, flow analysis (either forward or backward) is carried out in blocks 1828–1846.

1. Flow Graph Generation

Analysis engine 440 builds a flow graph from the internal IL and a corresponding symbol table. A flow graph is a tuple (B, E) where B is a set of "basic blocks" representing a procedure P, and E is a set of directed arcs between the basic blocks. A basic block is a data structure constructed to represent a list of statements in P such that the flow of control of P enters at the beginning of a basic block and leaves at the end without halting or branching until the last statement of the block. A basic block is represented as a structure containing a linked list of statements.

A basic block, within a flow graph, has successors and predecessors. For example, if a basic block B ends in an unconditional branch, then the basic block B2 containing the target of the branch is its only successor, and B1 will be a predecessor of B2. If B1 ends in a conditional branch then it will have two successors.

A directed arc exists from any basic block B1 to any basic block B2, if B2 is a successor of B1.

Figures 19A, 19B:
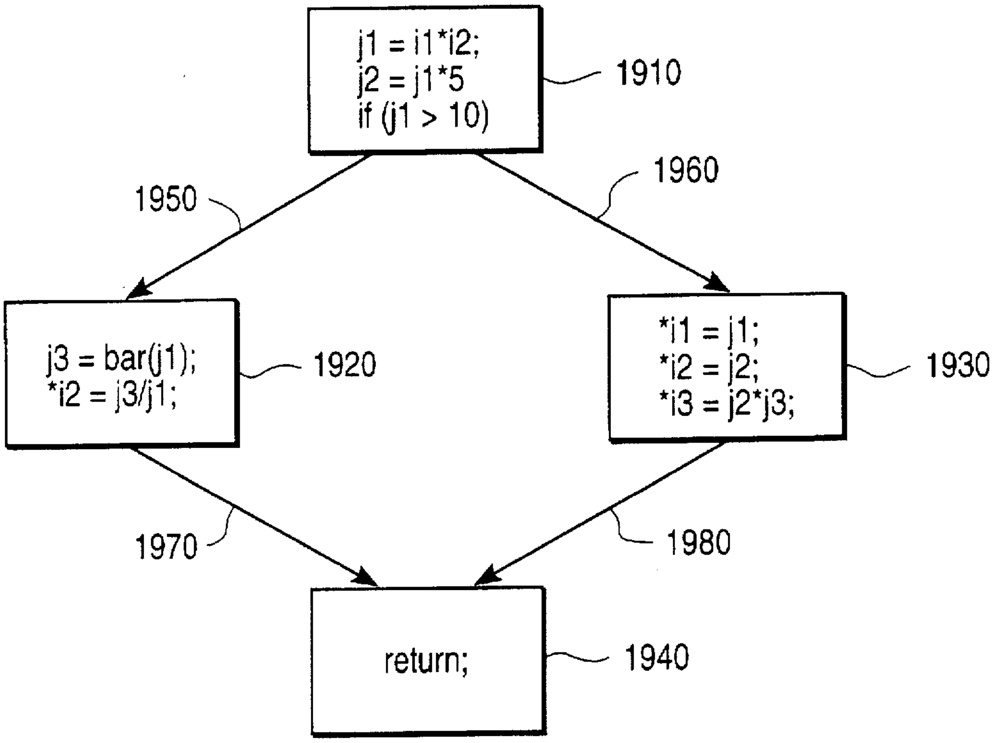
FIGS. 19a and 19b illustrate a basic block data structure.

An example of a procedure (i.e., procedure "foo") and its corresponding flow graph is shown in FIGS. 19*a* and 19*b*. Referring to FIG. 19*b*, boxes 1910 to 1940 represent the basic blocks of procedure foo while arrows 1950 to 1980 represent the arcs between the basic blocks.

The construction of basic blocks in a flow graph architecture is standard compiler technology and, therefore, well known to those having ordinary skill in the art. Additional description may be found in Aho.

FIGS. 20*a*–20*c* illustrate how a second sample C function "foo" is modified and configured within engine 440. FIG. 20 a shows foo in its native source code; C. FIG. 20*b* illustrates this function in external IL format. Finally, FIG. 20*c* shows a foo in flow graph format.

The flow graph of FIG. 20*c* is made up of a number of blocks or "graph nodes." For example, graph node 2010 is a basic block, as described above, containing a block header 2012, an internal IL statement 2014, identification of block predecessors 2016 and identification of block successors 2018. Block header consists of a block number (integer obtained by enumerating the number of basic blocks in the flow graph) and remarks (information regarding the basic block). Internal IL statement is a sequence of internal IL statements that make up the block. Block predecessors and successors are lists of block numbers of the predecessors and successors of the current basic block.

An additional datastructure that is created and is used in backward analysis is a control flow chart (i.e., control tree). This is generated using the mechanism described in Shirir, "Structual Analysis: A New Approach to Flow Analysis in Optimizing Compilers", *Computer Languages*, Vol. 5, pp. 151–153 (1980). This structure creates superblocks (Shirir refers to them as "intervals") which contain lists of basic blocks. These represent sequential (i.e., non-iterative) segments of code. These are the same segments of code described in the UNITY discussion. The control tree is further discussed in Appendix C.

Engine 440 will display the information in FIGS. 20*a*–20*c* on monitor 120 in accordance with display 2100 of FIG. 21. To help the operator correlate flow graph information with source code and IL code information, a graph window 2110 will be aligned with a source code window 2120 and an external IL window 2130 automatically, as shown in FIG. 21. Selections made between the source, IL and flow graph elements are always "in sync."

Returning to FIG. 18*a*, once a flow graph has been generated, the code-analyzer operator may designate a relevant code fragment within that flow graph pursuant to block 1812. Specifically, the operator may construct a desired fragment by selecting elements from an existing flow graph, or directly from the corresponding source or external IL files, as shown in FIG. 21. Responding to operator instructions, engine 440 constructs a code fragment by selecting a (1) starting basic block, (2) starting statement, (3) ending basic block, and (4) ending statement.

Upon designating a relevant code fragment, the operator of code analyzer 400 has the option of "slicing" the fragment, pursuant to block 1814 of FIG. 18*a*.

2. Slicing

The translation of source code into intermediate language helps disentangle the possible complex flow of control of sequential programs. In fact, the presentation of a program in intermediate-language form (i.e., in such formats as assignments, alternations, iterations, etc.) is by itself sufficient to clarify its meaning in many cases. The creation of sequences of condition-actions (i.e., B→P) as required by the UNITY computation model is a further aid to informal understanding of the code.

The latter, however, has a drawback. The number of sequences as well as their length is, in most practical cases, very large. This is of course also true for the source code of any large programs, but the condition/action sequences that can be extracted from any program are a much less compact presentation (albeit more suitable for human understanding) than source code.

For example, in a program made up only by one set of nested if statements, the number of sequences that can be extracted may only be equal to the number of conditions existing in the code itself. However, if two program fragments are connected in sequence (via the ";" operator), the number of sequences to examine for the composite program equals the product of the number of sequences of the two components. In fact, the sequential composition of program statements can produce an explosive growth on the number of sequences that need to be examined during program reading.

To cope with large size, code analyzer 400 employs a slicing function, which enables the operator to extract portions of a subject program relevant to the analysis. Condition/action sequences extracted from a slice of the program, are usually much smaller and fewer in number than those extracted from the original source code.

Referring again to FIG. 18*a*, the operator has an option of slicing a relevant code fragment at block 1814. If no slicing is requested, control flows to block 1828. However, if slicing is requested, the operator must then select starting and ending points in block 1816 (i.e., define the scope of the slicing operation).

The ending point is the last statement of the relevant code fragment considered in the computation of a slice. It is designated by the operator and must lie within the relevant code fragment. It is the statement at which backward analysis begins or forward analysis ends.

The starting point is a statement lying in the relevant code fragment and preceding the ending point in the flow of execution. It is the statement at which forward analysis begins or backward analysis ends.

Engine 440 can define a slice by selecting an appropriate (1) starting basic block, (2) starting statement, (3) ending basic block, and (4) ending statement, as designated by the operator.

After the initial slice has been defined, the operator selects desired slicing criteria in block 1818 of FIG. 18*a*. Engine 440 is capable of performing three different types of slicing operations: (1) semantic slicing using weakest precondition computation. (2) simple textural slicing. and (3) transitive closure slicing pursuant to blocks 1820. 1822. and 1824. respectively.

a. Semantic Slicing

The slicing of a program using the weakest precondition is called "semantic slicing." The precondition for slicing need not be a complex relation. It is possible to use free variables (i.e.. those that do not occur in the program at issue) in the form x=m (x is a program variable) to obtain the semantic slice for any state involving x. In fact. by calculating backward the weakest precondition of all statements preceding the starting point. all statements that do not produce a weakest precondition different from the postcondition and the calculated weakest precondition can be safely eliminated. The remaining ones are those constituting the semantic slice for x. starting at the chosen point where the precondition x=m has been assumed.

The slice thus calculated is (with the exception of a pathological case of almost no practical interest) the smallest program that shows all statements contributing to the state of x at the point where the postcondition has been assumed.

The pathological case is that of programs containing statements changing the state of a variable and then changing it back to the previous one. For example. statements (25) and (26) provided below would be left in the slice. although they are useless:

x:=x+1 (25)

;x:=x−1 (26)

In practice. the calculation of semantic slices does not require the full evaluation of the weakest precondition. This is because real world programming languages use as alternation only "if-then-else" statements. For these statements. the weakest precondition would be different only if there is an assignment to a variable named in the precondition. This may be explained by reference to the proof shown in Table 13.

TABLE 13

Example of Alternation Statement Not Affecting Postcondition

```
wp. (if B then S1 else S2). Q
=
(B ∧ wp.S1.Q) ∨ (¬ B ∧ wp.S2.Q)
= {S2 does not name any variable in Q}
(B ∧ wp.S1.Q) ∨ (¬ B ∧ Q)
= {S1 does not change the state of any variable
   named in Q}
(B ∨¬B) ∧Q
=
Q
```

Consequently. semantic slices can be effectively calculated by automatic inspection of the intermediate-language code.

Semantic slices. when applied in large programs. appear to be very effective because in many programs. those portions that are connected sequentially usually deal with different variables. These portions may contain several alternation blocks. Consequently. the number of interesting sequences is reduced. via the elimination of whole alternation blocks. Furthermore. it is likely the length of these sequences is shorter because of the elimination of many statements that do not affect the states of the variables of interest.

(1) Semantic Slice Examples

Consider the program fragment provided in Table 14 below.

TABLE 14

Exemplary Program Fragment

```
y:=x
;if x = 0 then (x:=x+1; z:=0) else z:=y end
;z:=z+1
;y:=0
```

The semantic slices for x. y and z (i.e.. those portions of the program which affect the states of x. y and z. respectively) are provided in statements (27). (28) and (29). respectively.

;if x=0 then x:=x+1 else skip end (27)

y:=0 (28)

;if x=0 then z:=0 else z:=y end ;z:=z+1 (29)

The semantic slice for a pair of variables (i.e.. x. y) is provided in statement (30).

;if x==0 then x:=x+1 else skip end ;y:=0 (30)

Note that some statements containing y are not in the semantic slice because they do not effect the states of y at the point of interest (i.e.. the end of the fragment under consideration).

(2) Program slicing operation

Code analysis engine 440 may carry out semantic slicing operations pursuant to two methods. In either case. the body of a program intended to be searched is defined as "S". where S is a composition of individual statements (i.e.. $S_1$. $S_2$ . . . $S_N$). each of which (Si) is an assignment. skip. abort. alternation. composition or repetition. Further. the goal to both methods is slicing S with respect to the slicing predicate P. In other words. engine 440 determines a member of the set "PSlice (S.P)."

In a first method. the steps carried out by engine 440 are described generally below.

1. Compute $P_i$=wp.($S_iS_{i+1}$; . . . ; $S_N$).P for 1≦i≦N.
2. Determine all pairs <i.j> with i<j such that $P_i$≡$P_j$.
3. Starting with j=N. find the smallest i so that <i.j> is one of these pairs and slice all the statements from $S_i$ to $S_j$ inclusive.
4. Set j=i−1 and repeat step (3) while j is positive.
5. Next. examine all remaining alternation statements. performing steps (1) to (5) to slice each guarded statement and loop body. If examining statement $S_i$ (in the original labeling). then $P_i$ plays the role of P (the slicing predicate). In simplifying alternations. combine guard predicates where the guarded statements are the same.

This first method. discussed in detail in FIGS. 22 and 23. has proven effective for moderately-sized code sequences. although its time complexity is O($N^2$). A second method. described in FIGS. 23 and 24. is faster although less comprehensive since step 2 only uses pairs where i=j−1 and step 3 is omitted. Both methods are described in detail below. The second method will probably be incorporated in analyzer 400.

Figure 22A:
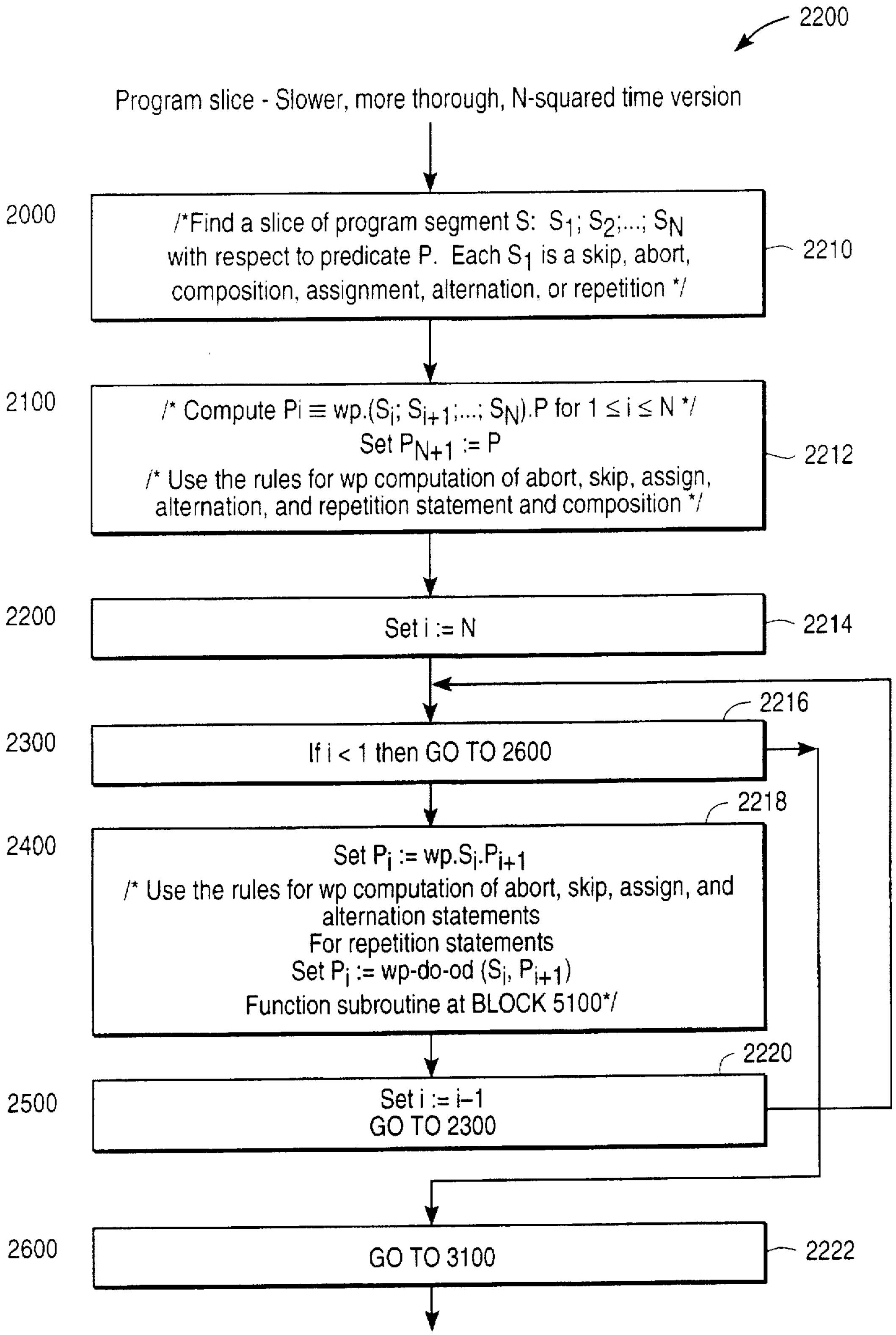
Figure 22B:
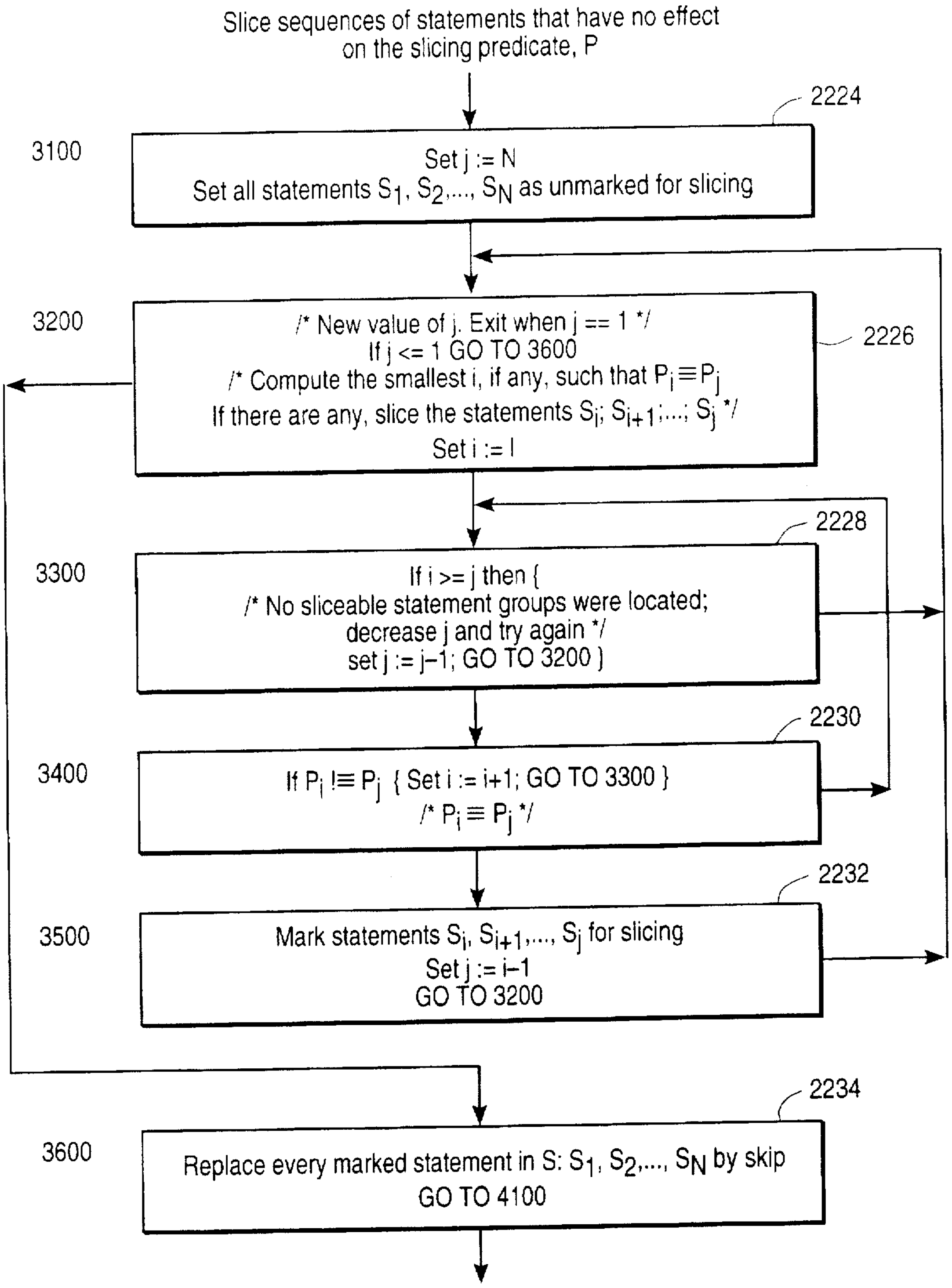
Figure 23A:
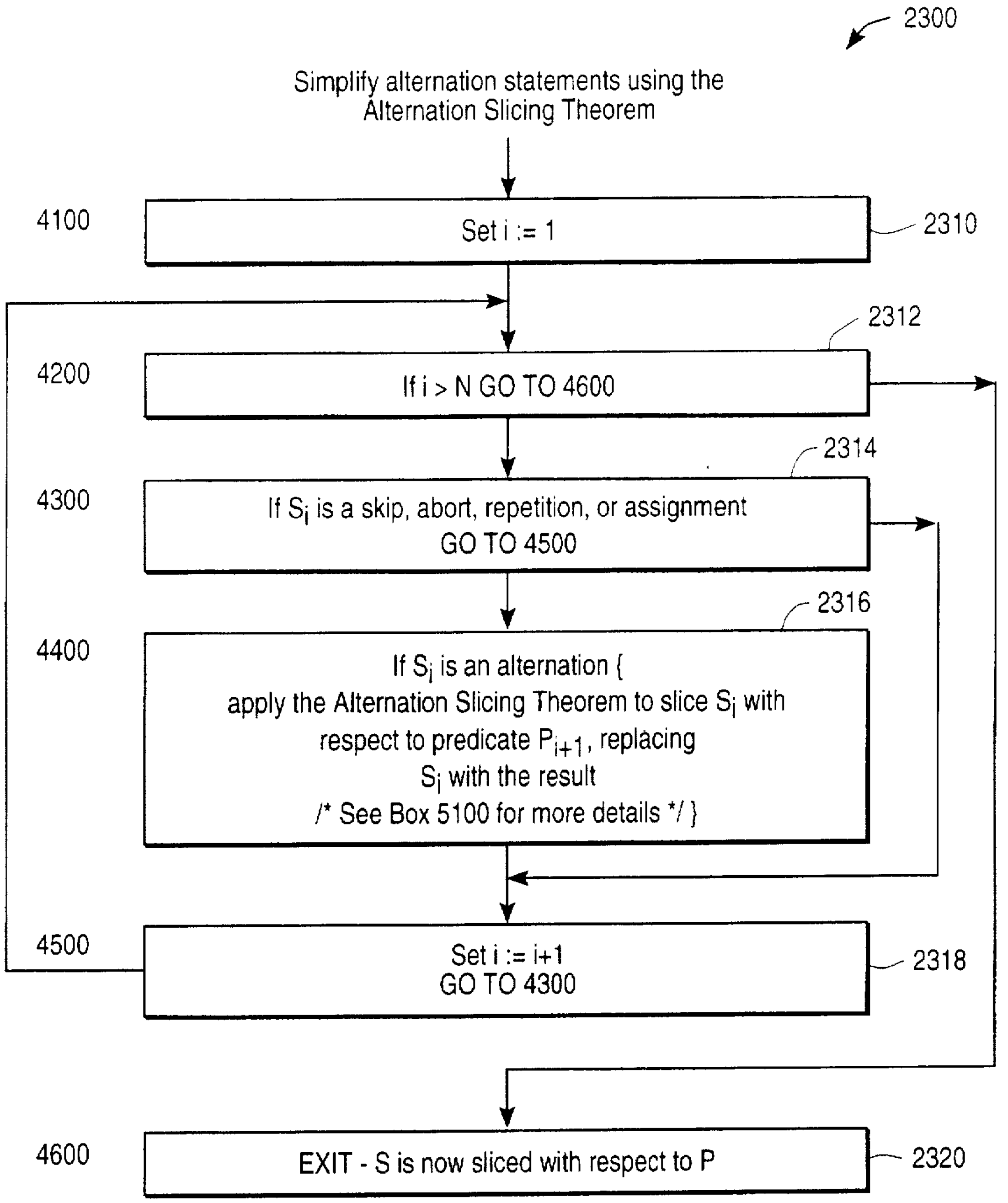

FIGS. 22*a* and 22*b* disclose flow chart 2200 which describes a first method of semantic slicing of program segment S with respect to predicate P. Each statement $S_i$ in segment S is a skip. abort. composition. assignment. alternation. or repetition. The weakest precondition for each statement within segment S is calculated based upon predicate P. The rules defined above for the various statement types are followed and $P_{N+1}$ is set equal to slicing predicate P.

The method begins at block 2214 where a counter i is set equal to N. Pursuant to blocks 2214 through 2220, engine 440 calculates the precondition predicate $P_i$ for each statement $S_i$ based upon a postcondition of $P_{i+1}$ (i.e., backwards computation). As shown in FIG. 22*a*, this operation iterates through i=N to i=1. Referring to block 2218, if a statement $S_i$ is an alternation statement, control flows to block 5100 (i.e., block 2324) in FIG. 23*b* which will perform a slicing operation in an attempt to simplify this statement. This operation is discussed further below. After the attempted simplification is complete, control returns to block 2218 where the predicate $P_i$ is calculated for the current statement.

If a statement Si is an iterative statement, and wp.(loop body).$P_{i+1}$=$P_{i+1}$, then this statement has no effect on the variables in the slicing predicate and the entire loop may be sliced. Accordingly, $P_i$ may be set equal to $P_{i+1}$. However, if this first equality does not hold, then the operator searches for a logical conjunction of the $P_{i+1}$ such that no variables are shared between that conjunction and the body of the loop or the guard of the loop. These conjunctions contribute directly to $P_i$. For each variable in the loop or in the guard, a condition of the form is added: variable=free__variable. All statements of the loop are left unsliced. For example, if $P_{i+1}$=x=7 ^y=23 and x does not appear in the body of the loop, and the only variables which appear in the loop and guard are y and z, $P_i$ would be set equal to x=7 ^=lambdaz. ^=mu. This approach results in a conservative slice. The assumption is made that any of the named variables set equal to a free variable could potentially be present in the correct weakest precondition. Therefore, slicing with this precondition results in a superset of the correct slice.

After calculating the predicate $P_i$ for each statement $S_i$ in blocks 2214–2220, control flows to blocks 2222–2232 wherein slicing operations are performed.

Referring to FIG. 22*b*, all statements $S_i$ contained within segment S are set as "unmarked" for slicing in block 2224. Blocks 2226–2232 attempt to identify equivalent predicate values ($P_i$ and $P_j$) that will establish a sequence of statements that have no effect on the variables making up the predicates. Blocks 2226 and 2232 represent a first outer loop used to sequence through values of $P_j$ where j is initially set equal to N. Blocks 2228 and 2230 represent a second inner loop where predicate values $P_i$ are sequenced through and i is initially set equal to 1. Starting with the smallest i value and largest j value, $P_i$ is compared with $P_j$ in block 2230. If there is no match, i is incremented and the equivalence check is performed again. However, if there is a match, then control flows to block 2232 which marks all statements from $S_i$ to $S_j$ for slicing. After this sequence of statements have been identified, j is decremented 1 and flow returns to block 2226 to repeat this operation.

Alternatively, if there is no corresponding equivalent $P_i$ for a particular $P_j$, then j is decremented by 1 in block 2228 and the operation repeats itself for the next j value starting at block 2226. After the j values are exhausted, (i.e., j is decremented to 1) control flows from 2226 to block 2234 where every marked statement in segment S is replaced with a skip statement. By this operation, marked statements are sliced from segment S. Upon completing the slicing operation in segment S, a secondary slicing operation may be performed on each alternation statement. This operation is carried out according to flow chart 2300 in FIGS. 23*a* and 23*b*.

In block 2310, counter i is said equal to 1 and in 2312 this value is checked to determine if all $S_i$ values have been considered. If they have, then slicing is complete and the routine may be exited via block 2320. If not, control flows to block 2314 where all skip, abort, repetition and assignment statements are passed over for secondary slicing. In which case, control flows to block 2318 where i is incremented and the exercise is repeated for the next $S_i$.

Figure 23B:
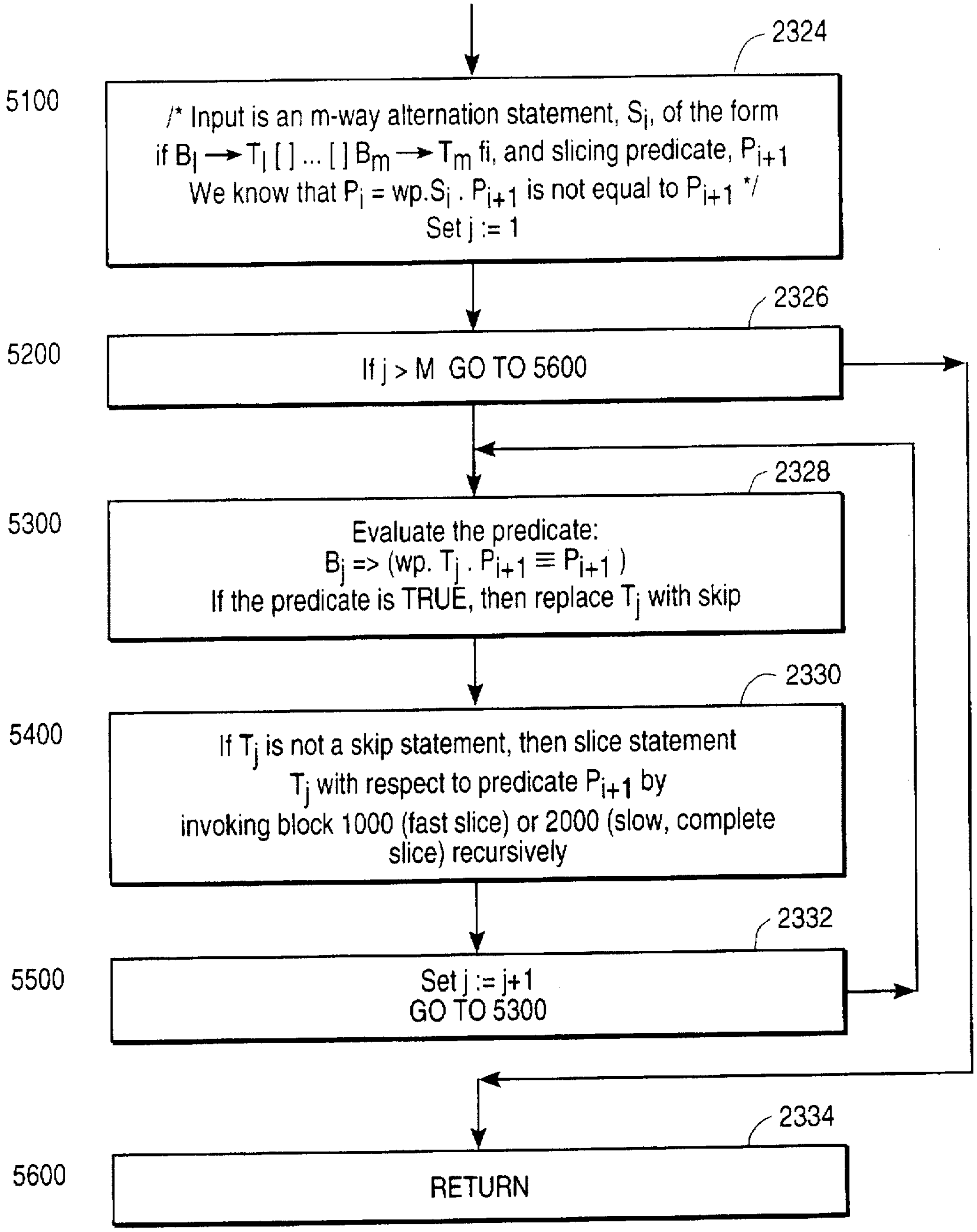

However, if $S_i$ is an alternation statement, then engine 440 will apply an alternation slicing theorem, as shown in FIG. 23*b*, to further simplify this statement pursuant to block 2316. More specifically, as shown in blocks 2316 and FIG. 23*a*, control flows to address 5100 (i.e., block 2324) to carry out alternation slicing theorem. The alternation slicing theorem provides that for any alternation statement (i.e., "if B then S1 else S2") where none of the alternative statements (i.e., neither S1 nor S2) contain any assignment to a variable listed in the postcondition predicate, its weakest precondition is equal to its postcondition (i.e., the effect of this statement is the equivalent of a skip).

Referring to FIG. 23*b*, block 2324 represents the first step in the alternation slicing theorem. As indicated in this block, the weakest precondition of $S_i$ based upon a post condition of $P_{i+1}$ does not equal $P_{i+1}$ because the alternation statement is not a skip. Had this statement been true, alternation statement $S_i$ would have been converted into a skip in block 2234 as discussed above. In blocks 2326–2332, the weakest precondition of each statement associated with a particular guard (B) is evaluated against predicate $P_{1+1}$. If the predicate is true, then statement $T_j$ is replaced with a skip as indicated in block 2328. However, if $T_j$ is not a skip statement, then statement $T_j$ is sliced with respect to predicate $P_{i+1}$ by invoking a slow complete slice starting at block 2210 (i.e., address 2000) in FIG. 22*a* or invoking a fast slice at block 2210 (i.e., address 1000) in FIG. 24.

After this operation is complete, control flows to block 2332 where j is incremented by 1 and the analysis is repeated for the next guard and statement pair. Upon completion of the operation over all, control is returned via block 2334 to block 2318 in FIG. 23*a*. In block 2318, i is incremented by 1 and the next $S_i$ statement is evaluated pursuant to the foregoing discussion. Once i exceeds the value N (i.e., the number of statements $S_i$) control flows to block 2320 which results in an exit of this routine with segment S now being sliced with respect to predicate P.

Figure 24:
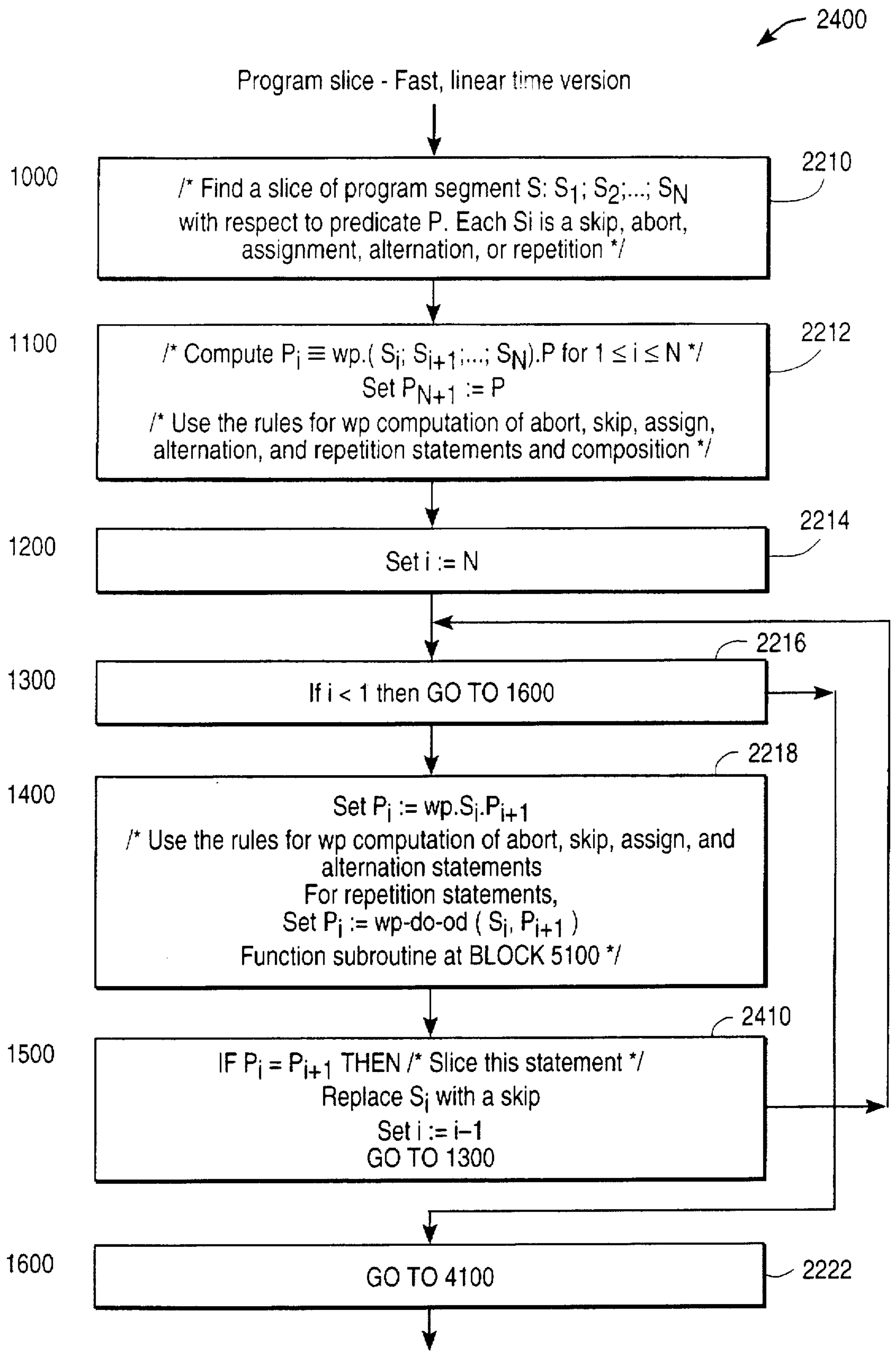

Flow chart 2400 in FIG. 24 illustrates a portion of a fast slicing operation which is similar to the first half of the slow slicing operation shown in flow chart 2200 of FIG. 22*a*. Referring to FIGS. 22 and 24, blocks 2210–2218 and block 2222 in both figures have the same meaning and function. In FIG. 24, however, block 2410 replaces block 2220 from FIG. 22*a*.

In block 2410, predicate $P_i$ (representing a precondition) is compared with predicate $P_{i+1}$ (representing a postcondition). If these values are equal, then the corresponding statement has no effect on the variables defining these predicates and the statement may be sliced from the corresponding segment S. This operation is repeated for each $P_i$ value within the segment. As shown in FIG. 24, once i is decremented to a value less than 1, control flows from block 2216 to block 2222 which then passes to block 2310 at address 4100 in FIG. 23*a*. The remaining operation is then identical to that described above for the slow slicing operation.

Figure 26:
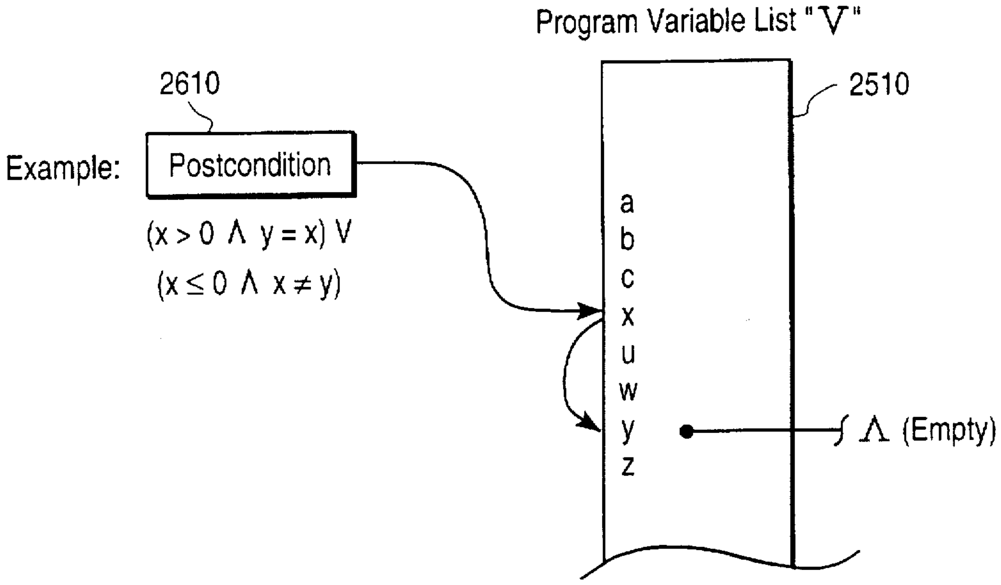

As an alternative embodiment, engine 440 may create a variable list "V" to carry out the foregoing alternation slicing theorem, pursuant to FIGS. 25 and 26. Referring again to flow charts 2200 and 2400 in FIGS. 22*a* and 24, respectively, engine 440 may create a variable list V in block 2210. During this operation, the engine places variables named in predicate P into the list. In block 2212 of FIGS. 22a and 24, engine 440 adds new variables and deletes irrelevant variables from the list after a new computation of predicate $P_i$. This list is updated again in block 2218 of FIGS. 22a and 24. An exemplary variable list and its association with a program under analysis is shown schematically in FIG. 25.

Referring to FIG. 25, statement 2530 is associated with variables listed in program variable list 2510 through postcondition 2520. The variables themselves are linked to each other within variable list 2510 as shown by arrows 2540 and 2550.

Referring to FIG. 26, an exemplary postcondition 2610 is shown associated with the variables contained therein: x and y. These variables are shown listed in variable list 2510. Significantly, postcondition contains four terms but only two variables. Engine 440 can analyze the previous statement S by verifying whether S contains on any left-hand side ("LHS") of a statement the variables x or y. The placement of these variables on the left-hand side of a statement indicates a new value is being assigned to them. The names of the variables are linked to the postcondition as shown in FIG. 26.

It is currently anticipated that engine 440 will not use a variable list "V" to carry out the foregoing alternation slicing theorem. Rather, engine 440 will check for the variables involved in a change of state for the s alternation slicing theorem directly from the postcondition b. Textual Slicing Returning to FIG. 18a, the foregoing discussion on semantic slicing covers blocks 1820 and 1826. Alternatively, the operator may choose to textual slice a selected code fragment pursuant to blocks 1822 and 1826. This operation is straightforward requiring simple textual matching of the slice criteria (i.e., "seed variables") and the program fragment. Those statements that cannot assign a value to a seed variable will simply be extracted from the slice by engine 440, as described below. This operation is analogous to a word search in a conventional word processing program.

More specifically, the operator specifies a simple textual slice by naming a set of program variables called "seed variables" and designating a code fragment as described above. The result consists of every source or IL statement lying within the designated code fragment that can assign to one or more of the seed variables. Assignments made by called procedures are included. A flow chart describing this operation is provided in FIG. 27.

Figure 27:
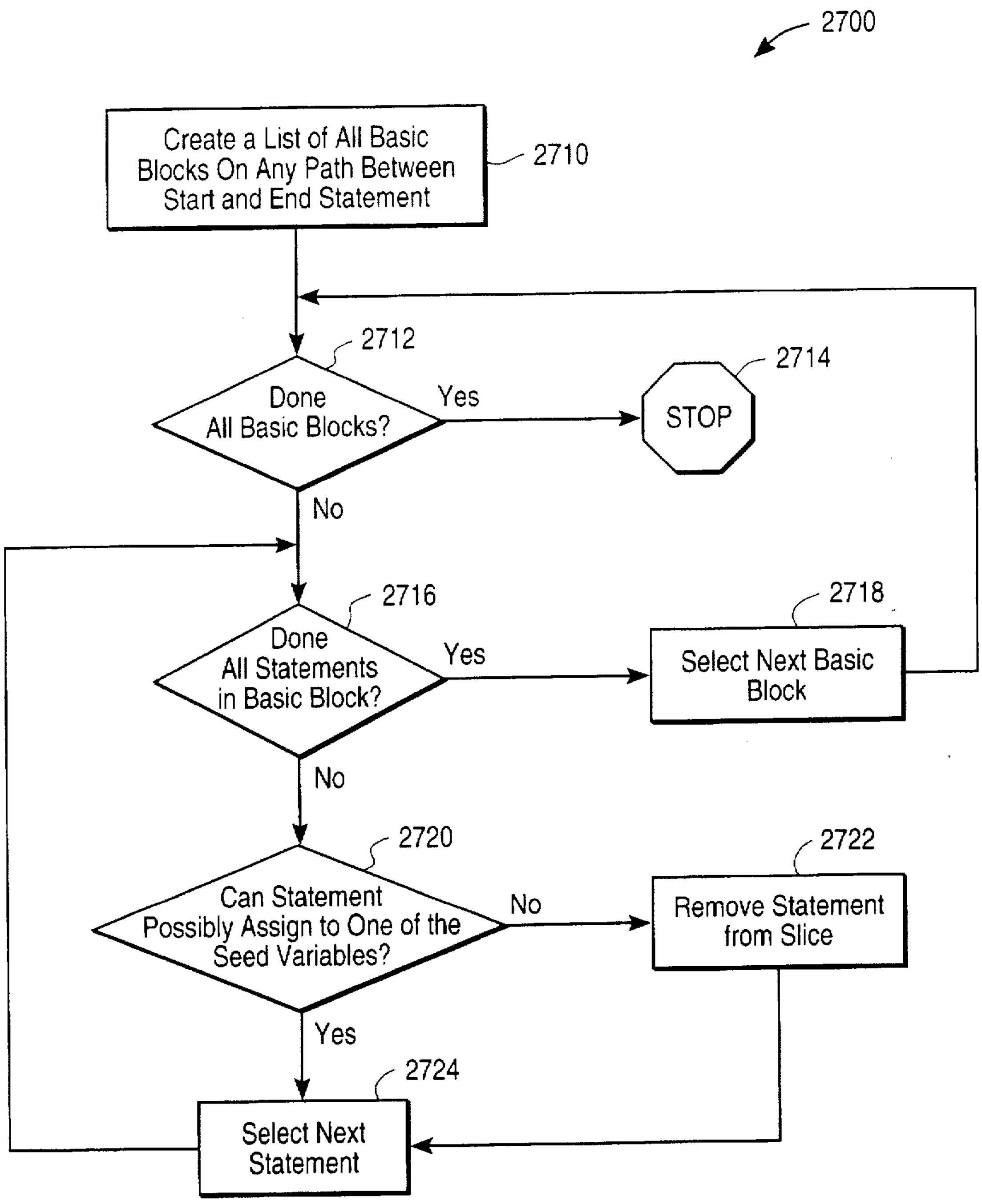
FIG. 27 is a flow chart of textual slicing.

Flow chart 2700 in FIG. 27 details the process of textual slicing. In block 2710, a list of all basic blocks in any path between a starting and ending statement (identified in block 1816 of FIG. 18a) is created by engine 440. This operation is a simple graph coloring procedure described in Aho. Upon creation of the list in block 2710, control flows to block 2712 to determine whether all basic blocks have been considered. If yes, the procedure is terminated at block 2714, resulting in a sliced fragment. This slice will then be the subject of flow analysis pursuant to blocks 1828–1846 in FIGS. 18a and 18b.

If all basic blocks are not done, control flows to block 2716 in FIG. 27 to determine whether all statements in a basic block have been considered. If yes, control flows to block 2718 where the next basic block is selected from the list created in block 2710. Thereafter, control returns to block 2712 to repeat the foregoing process.

If there is a statement in a basic block under consideration that has not yet been reviewed, control flows to block 2720 to determine whether such statement could possibly assign a value to one of the seed variables. The analysis in block 2720 is carried out in a conservative manner. As such, if an assignment is identified through a pointer, engine 440 assumes it can change one of the seed variables and, therefore, is not removed from the slice. Similarly, for a basic block in a subroutine, any statement that assigns to a formal parameter (i.e., identifier appearing in a procedure definition; called a "formal argument" in C and a "dummy argument" in Fortran) that can correspond to an actual parameter (i.e., argument passed to a called procedure) which is one of the seed variables is kept. Based on this conservative approach, if the subject statement can possibly assign to one of the seed variables, the statement remains in the slice and control flows to block 2724 where the next statement is selected. Alternatively, if no assignment can be made by the subject statement, control flows to block 2722 where the subject statement is removed from the slice and control then flows to block 2724.

As shown in FIG. 27, this operation is carried out repeatedly until all statements within all blocks of a selected list are reviewed and either kept within the slice or discarded.

c. Transitive Closure

Referring again to FIG. 18a, the operator may select yet a third choice for slicing criteria in the form of transitive closure as shown in block 1824. The operator specifies a slice for transitive closure by naming a set of program variables called seed variables. The result consists of every source or PIL statement, lying within the designated code fragment, which would be obtained by the series of steps outlined in FIGS. 28a and 28b.

Figure 28A:
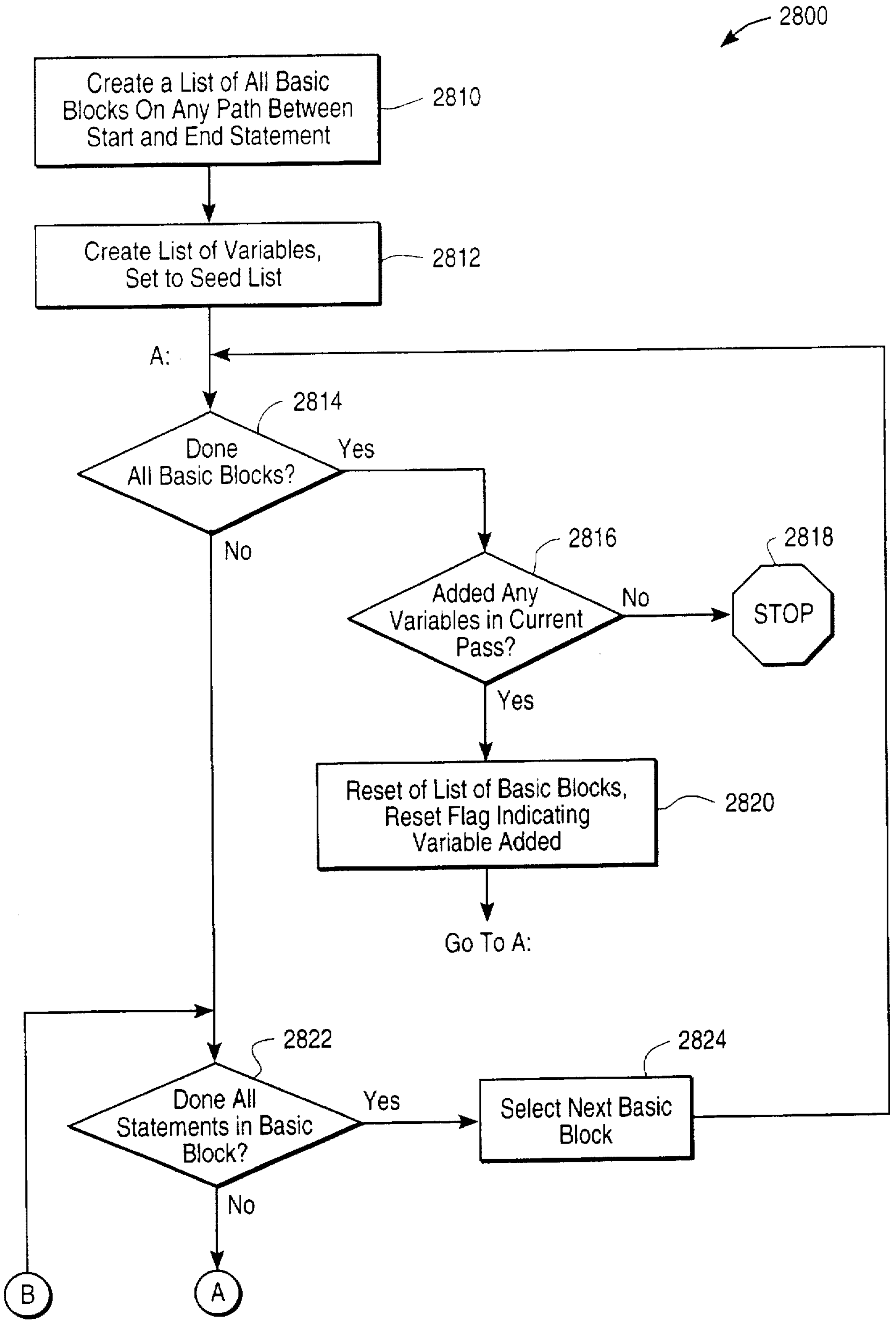
FIGS. 28a–28b are flow charts of slicing based upon transitive closure.
Figure 28B:
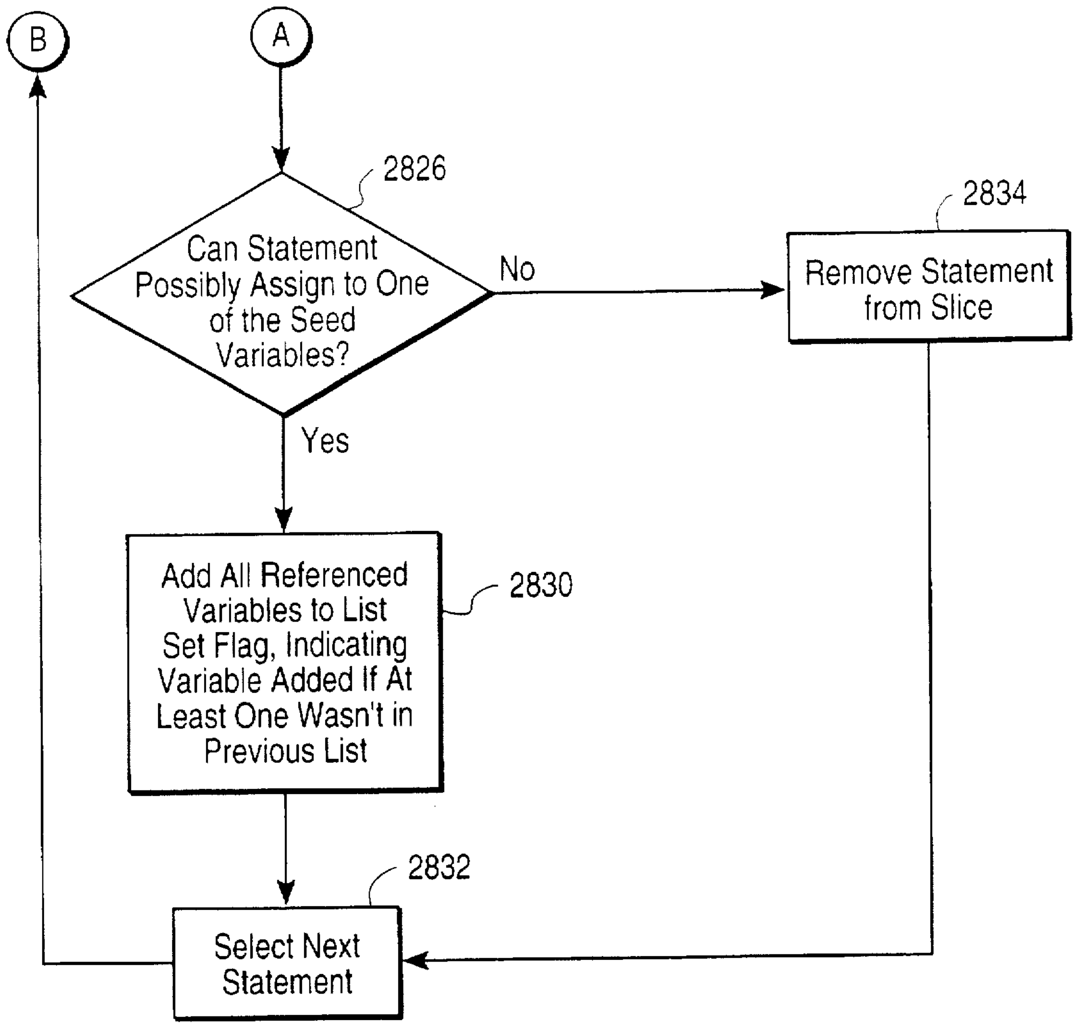

Flow chart 2800 in FIGS. 28a and 28b describe a slicing operating based upon transitive closure. In block 2810, engine 440 creates a list of all basic blocks on any path between a starting and ending statement that was designated in block 1816 of FIG. 18a. This operation is the same as block 2710 in FIG. 27. In block 2812, engine 440 creates a list of variables representing an initial seed list as defined by the operator. Every seed variable is a current working variable. Control then flows to block 2814 where engine 440 determines whether all basic blocks have been reviewed. If yes, control flows to blocks 2816–2820, which are described below. If no, control flows to block 2822 where engine 440 determines whether all statements in the current basic block undergoing review have been considered. If yes, the next basic block is selected in block 2824 and control returns to block 2814. If no, control flows to block 2826 to determine whether the subject statement could possibly assign a value to one of the seed variables. If no, the statement is removed from the slice in block 2834 and control thereafter flows to block 2832 to select the next statement. If yes, the subject statement is maintained within the slice. In brief, every source or IL statement lying within the designated slice which causes an assignment to one or more of the seed variables is added to the current slice. Assignments made by called procedures, including their side effects, are included.

Control next flows to block 2830 where all referenced variables in the statement being kept within a slice are added to the seed list initially generated in block 2812. Additionally, a flag is set indicating that a variable has been added if at least one was not in the previous list. As a result, every program variable which appears in a statement to be included in the slice and which is not a current seed variable becomes a new seed variable. Global variables and variables declared in called procedures are included.

Engine 440 selects the next statement pursuant to block 2832 and control returns to block 2822, as described above.

After all statements in all blocks have been reviewed, control flows to block 2816 to determine whether any seed variables were added to the slicing criteria. If there are no new seed variables, the result is the current slice and control flows to block 2818 which terminates the procedure and returns control to block 1828 in FIG. 18*a*. Alternatively, if new seed variables have been added to the seed list of block 2812, control flows to block 2820 where the list of basic blocks is reset (i.e., markers indicating that a basic block has been reviewed are cleared) and the flag indicating new seed variables have been added to the seed list is reset. In so doing, the new seed variables are converted to current seed variables and subsequently used as slicing criteria. Control then flows to point A where the slicing operation with the newly converted variables is repeated starting at block 2814.

As the foregoing illustrates, slicing is repeatedly executed under transitive closure until all possible variables, included within the affected statements, are used as slicing criteria. In so doing, a "closure" is obtained with respect to the affected variables.

The operation as described in flow chart 2800 cover blocks 1824 and 1826 in flow chart 1800 of FIG. 18*a*. Upon completion of transitive closure slicing pursuant to block 2818 of FIG. 28*a*, control returns to block 1828 of FIG. 18*a* to proceed with flow analysis.

3. Flow Analysis

Upon completion of the slicing operation in block 1826 or fragment designation in block 1812 (when slicing is skipped), the operator may now begin flow analysis pursuant to block 1828 in FIG. 18*a*. At a high level, the flow analysis operation of analyzer 400 (i.e., blocks 1828–1846 of FIGS. 18*a* and 18*b*) is analogous to the flow analysis operation of analyzer 200 (i.e., blocks 1114–1124 of FIG. 11).

Referring to FIGS. 18*a* and 18*b*, a flow analysis begins with the operator selecting either a forward analysis in block 1832 or a backward analysis in block 1836. If forward analysis is chosen, control flows to block 1834. Forward analysis is the process of following the execution path of the code fragment or slice being analyzed and either displaying information to the operator or building a data base described in the flow of control. In this process, engine 440 traverses a flow graph of basic blocks containing translated source code in a forward direction.

At the outset, the operator must select to use either a current relevant code fragment or slice and corresponding starting and ending points in order to begin the analysis pursuant to block 1834.

Figure 29A:
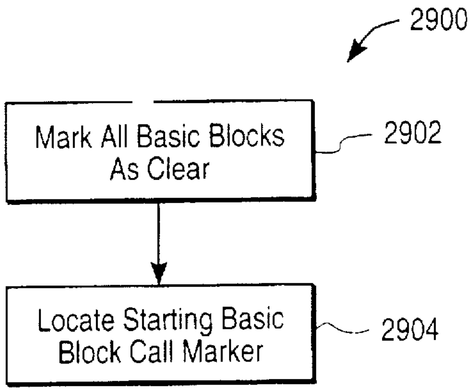
FIGS. 29a–29b are flow charts of forward analysis performed by the analyzer of FIG. 4.
Figure 29B:
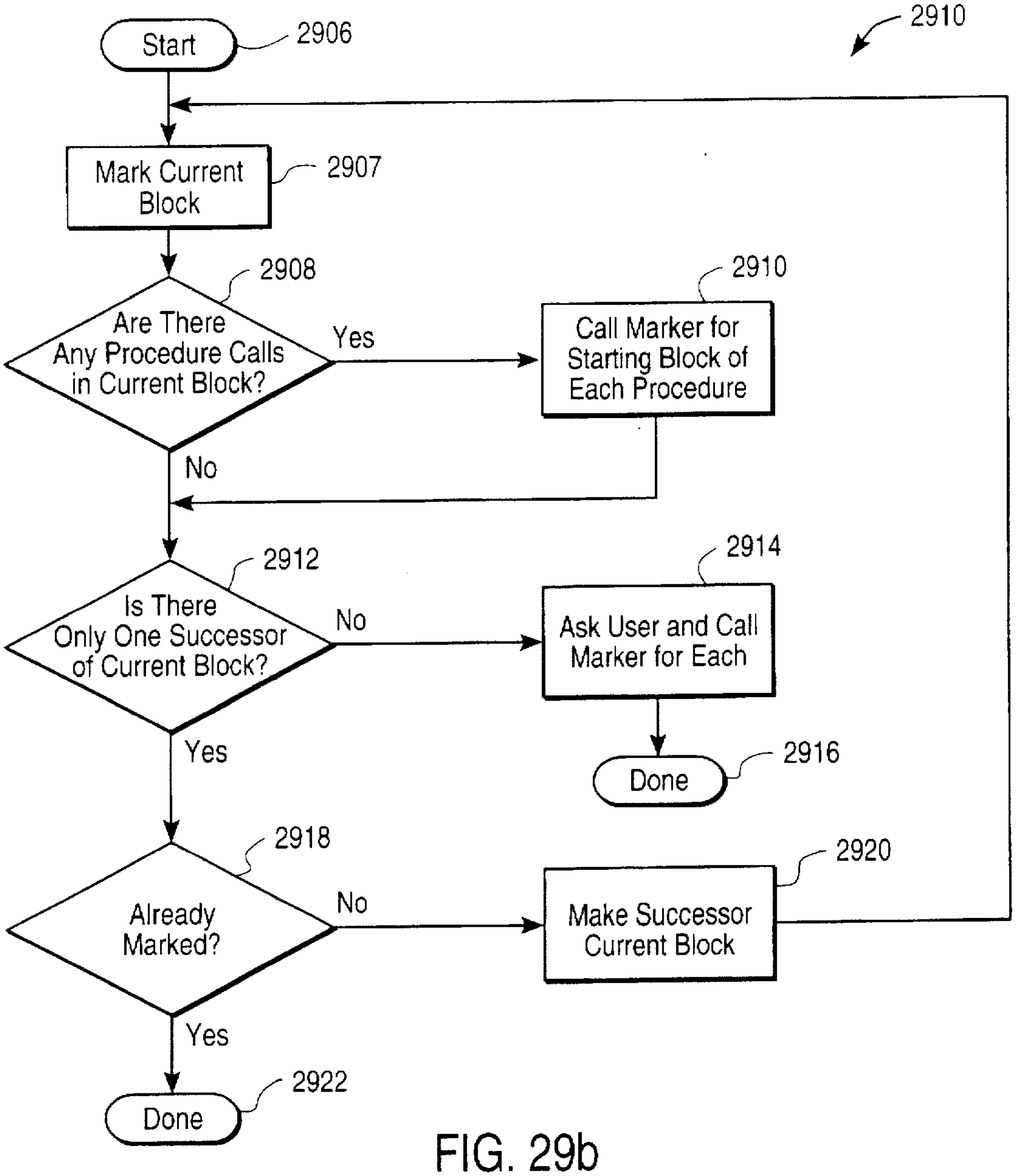

Referring again to FIG. 18*b*, block 1835 represents the performance of forward analysis within engine 440. FIGS. 29*a* and 29*b* disclose one possible implementation of forward analysis within block 1835.

FIG. 29*a* discloses a top level description of forward analysis. Referring to this figure, engine 440 initially marks all basic blocks contained within a designated fragment or slice as clear (i.e., unmarked) pursuant to block 2902. Control then flows to block 2904 where engine 440 locates a starting basic block and calls the procedure "Marker." Marker is simply a recursive procedure which marks blocks as being part of a slice. In this embodiment, each slice is associated with a data structure (i.e., a linked list) that contains information related to the blocks of the slice. Such information includes a bit for each block indicating whether the block is marked or clear. Procedure marker sets this bit. Flow chart 2910 in FIG. 29*b* illustrates the use of Marker.

Referring to block 2906 in FIG. 29*b*, engine 440 locates the starting basic block (i.e., as identified by the operator) and traverses the selected basic blocks in a forward direction for purposes of marking blocks to carry out a slicing operation. In block 2907, engine 440 marks the current block by setting an appropriate bit in an associated linked list of block attributes. In block 2908, engine 440 determines whether any procedure calls exist in the current block. If yes, control flows to block 2910 where Marker is called for the starting block of each procedure therein. Control then flows to block 2912. Alternatively, if there are no procedure calls, control flows directly to block 2912.

In block 2912, engine 440 determines whether there is only one successor to the current block. If no, (i.e., there is more than one successor to the current block), engine 440 asks the user whether one or more paths should be pursued and calls Marker for each selected block. Once the marker operation is complete for each of the selected blocks, the operation is complete pursuant to block 2916. Alternatively, if there is only one successor of the current block, control flows to block 2918 and engine 440 determines whether this block is already marked. If it is not, the successor is made the current block in 2920 and marked as being visited in block 2907. Control then flows to block 2908 to repeat the foregoing procedure. Alternatively, if the block is marked, control flows to block 2922 and the process is complete.

The result of this procedure is a set of marked basic blocks which can then be used as a starting point for a slice or wp calculation. The operator may display the content of these blocks to achieve the same function as in analyzer 200.

Returning to FIG. 18*b*, in addition to forward analysis, an operator may choose to perform backward analysis pursuant to block 1836. If backward analysis is selected, control flows to block 1838 wherein the operator must select whether to perform backward analysis on the current relevant code fragment or a slice. Additionally, the operator must choose starting and ending points in the same manner as was done for forward analysis. Once valid starting and ending statements have been identified, engine 440 prompts the operator to enter a postcondition pursuant to block 1840. Upon presentation of the postcondition, backward analysis may begin pursuant to block 1842, wherein engine 440 traverses a flow graph of basic blocks containing translated source code in a backward direction.

Backward analysis is used in two different operations: one for calculating the weakest precondition of a non-iterating code segment and the other for verifying invariants for one or more iterating segments of the code.

As previously noted, all program constructs included in the intermediate language are formed by alternation statements, assignments, skips, aborts, and iterations connected together by the sequencing operator (";"). Iterating code segments associated with large loops or cooperating processes executing concurrently may not be processed in the text of the main program because of the transformation of sequential programs into the UNITY model. Small terminating loops will typically be left within the main program. However, these segments may be analyzed separately—possibly requiring some operator input such as an invariant.

Figure 30:
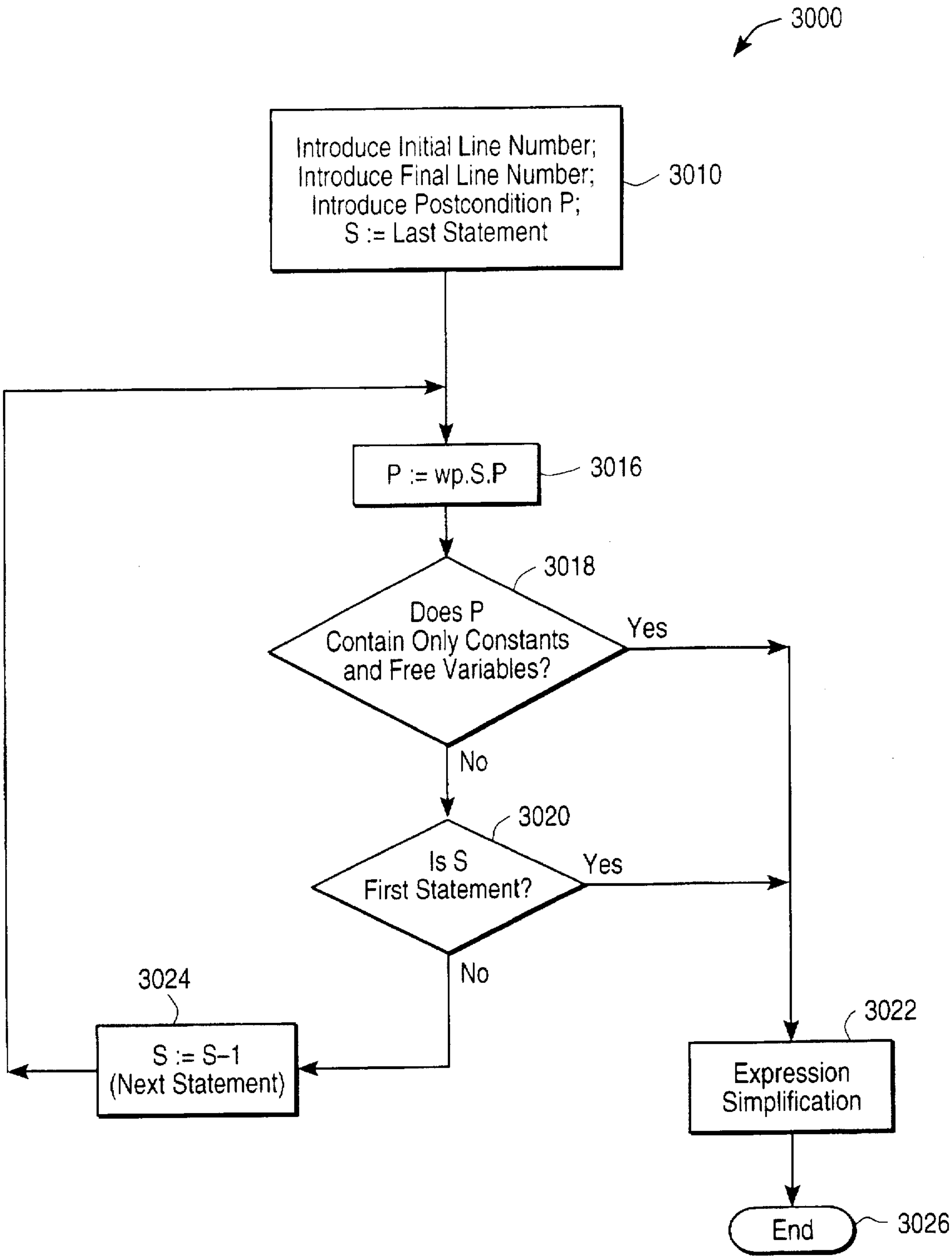
FIG. 30 is a flow chart of wp computation carried out in backward analysis by the analyzer of FIG. 4.
Figure 31:
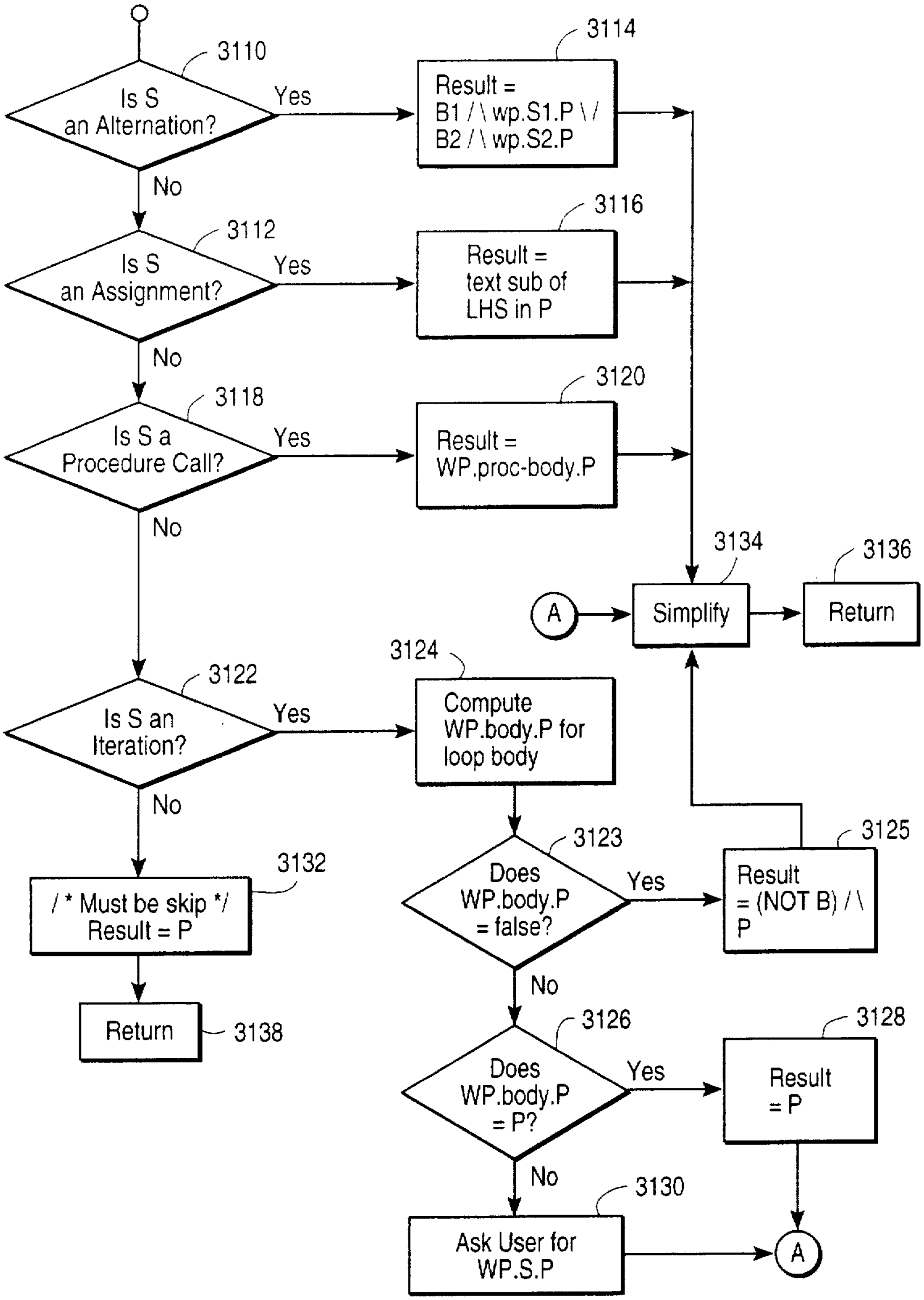
FIG. 31 is a flow chart of wp computation for various statement types by the analyzer of FIG. 4.

Verification of invariants for iterating statements uses the weakest precondition. Flow charts illustrating weakest precondition calculation and invariant verification are shown in FIGS. 30–32.

FIG. 30*a* illustrates flow chart 3000 which describes weakest precondition calculation for each program statement (S) of interest. This operation may be applied to a slice, fragment or the entire original program. In Block 3010 of flow chart 3000, the operator identifies initial and final line numbers and a postcondition P. Engine 440 responds by identifying the last statement (S) contained between the initial and final line numbers. After these initial values are established, control flows to block 3016 where a weakest precondition is calculated based on postcondition P and statement S. Upon calculating a new precondition (which will be a postcondition for the previous statement), a new set of variables are identified based on the latest postcondition. (A flow chart describing the operation in block 3016 is provided in FIG. 31.)

Control then flows to block 3018 where engine 440 determines whether P contains only constants and free variables (i.e., variables that do not occur in the program). If this is answered in the affirmative, control flows to block 2022 where expression simplification is performed. Thereafter, the process ends pursuant to block 3026 since any remaining statements will have no effect on P.

However, if block 3018 is answered in the negative, control then flows to block 3020 where engine 440 determines whether S is the first statement between initial and final line numbers. If yes, control again flows to block 3022. If no, control flows to block 3024 where S is decremented by 1, thereby identifying the next statement to be processed. This operation continues until block 3018 or block 3020 is answered in the affirmative. Referring again to FIG. 30, the expression simplification for block 3022 is optional and described in greater detail below.

FIG. 31 illustrates the wp computation carried out in block 3016 of FIG. 30. In this analysis, it is anticipated that Hoare's axiom need not hold which, in a practical sense, means variable aliasing is accommodated. This feature is discussed below.

Turning to FIG. 31, the functions carried out in blocks 3110–3122 and 3126–3138 are the same as the functions in blocks 1510–1522 and 1526–1538, respectively, in FIG. 15. Accordingly, the foregoing discussion of FIG. 15 applies equally to the corresponding blocks in FIG. 31. However, the process by which these functions are carried out differ significantly in light of the data structures employed For example, in block 3116, engine 440 executes a tree-graphing procedure shown in FIG. 32*a*–32*c* to determine the weakest precondition. (As mentioned above, the data structures for IL statements in analyzer 400 are Abstract Syntax Trees (ASTs)).

Blocks 3123 and 3125 have no counterpart in FIG. 15 because analyzer 200 does not generate false indications automatically. However, it is anticipated that analyzer 400 will have this feature. Accordingly, if P (i.e., the invariant) is determined to be false through computations in block 3124, engine 440 returns the result NOT B ^P via block 3136 after simplification via block 3134.

Although not shown in FIG. 31, if S is a "goto" statement, wp calculation is performed according to alternation statement rules if the goto does not create a loop, i.e., the statement returns operation to a subsequent location. Alternatively, a goto statement is treated as an iteration if the statement creates a loop; i.e., returning operation to a previously executed location.

Figure 32A:
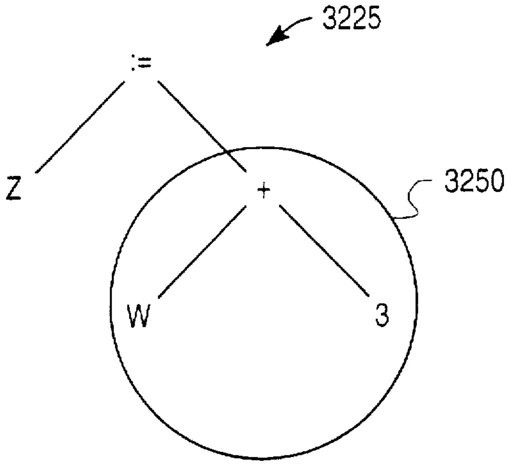
FIGS. 32a–32c are tree data structures illustrating wp calculation.
Figure 32B:
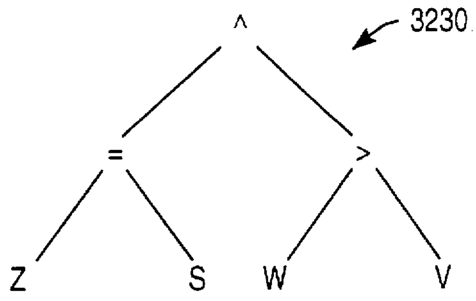
Figure 32C:
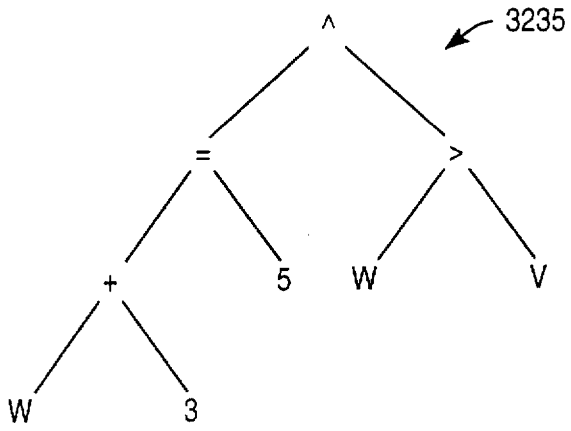

FIGS. 32*a*–32*b* illustrate the manipulation of internal IL data structures (i.e., ASTs) to carry out wp computation. FIG. 32*a* illustrates an AST for the assignment "z:=w+3." Similarly, FIG. 32*b* illustrates a parse tree for the post condition "(z=5)^(w>v)." Calculation of weakest precondition is simply the grafting of subtree 3250 in FIG. 32*a* in place of "z" in tree 3230. (As will be apparent to the skilled practitioner, this operation requires engine 440 to walk the tree 3230 and substitute the LHS for each occurrence of the variable on the RHS.) The net result is tree 3235 in FIG. 32*c* which, in its entirety, represents the precondition of the original assignment. Simplifying tree 3235, pursuant to the operation described below, will result in a simpler form of the weakest precondition.

As mentioned above, it is anticipated that the wp computation in analyzer 400 will accommodate variable aliasing. In the general case, the possibility of aliasing implies that an arbitrary assignment can affect any variables referenced in the postcondition. A general mechanism allowing a correct wp to be computed in the presence of such assignments is to treat memory as a large array using the _Mem intrinsic. (See Appendix B) Furthermore, this array is treated as a function during the wp calculation. See, Bijlsma, "Calculating With Pointers," *Science of Computer Programming*, Vol. 12, p. 191–205 (1989) (hereinafter, "Biilsma") and Gries, *The Science of Programming*, Springer-Verlag (1981).

Specifically, when accommodating aliasing, engine 440 follows the following four steps in computing wp. (x:=y) .Q. First, engine 440 replaces all occurrences of variables (such as, for example, V) which can possibly alias X in the predicate Q by _Mem(@V,type-V), where @ is the address-of operator (i.e., address of V in memory), and type-V is the type of variable V.

Second, engine 440 considers each _Mem occurrence as a function which returns the contents of the memory at the location specified as its first argument, asserting the type specified as its second argument. Following Bijlsma, engine 440 replaces each such _Mem occurrence with a new function, which returns the same value if it's first argument is not @X and returns the new value Y if its first argument is @X.

Third, engine 440 then expands all such conditional functions (which may entail significant tree-replication), starting from the innermost ones (i.e., using a depth-first tree traversal). Finally, engine 440 simplifies the result, which represents the required weakest precondition. A more detailed discussion of this process is provided in Appendix C, attached hereto.

Invariant verification, an operation performed on iterating statements, is illustrated in FIG. 16. The invariant-verification functions carried out by engine 440 Is are essentially the same as those of engine 250, as defined by flow chart 1600 (FIG. 16). Accordingly, the forgoing discussion of chart 1600 also applies to engine 440 subject to the following limitations. First, as noted above, engine 440 utilizes a different data structure for IL statements (i.e., AST) and, therefore, performs similar functions in a dissimilar method. Second, the wp computation performed in block 1614 is pursuant to the process disclosed in FIG. 31. Finally, the simplification performed in block 1616 is pursuant to FIGS. 33*a* and 33*b* (described below) and is specifically tailored for analyzer 400.

4. Simplification

Figure 33B:
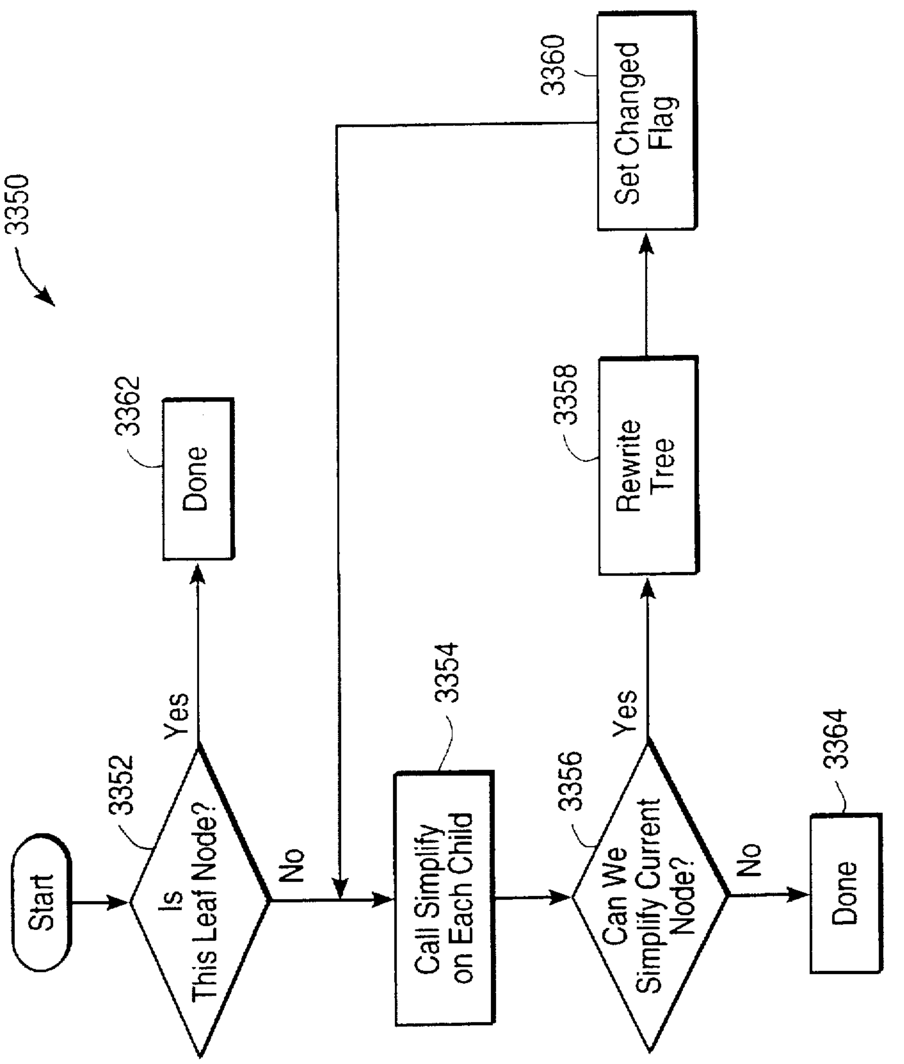
FIGS. 33a–33b illustrate predicate simplification by the analyzer of FIG. 4.
Figure 33A:
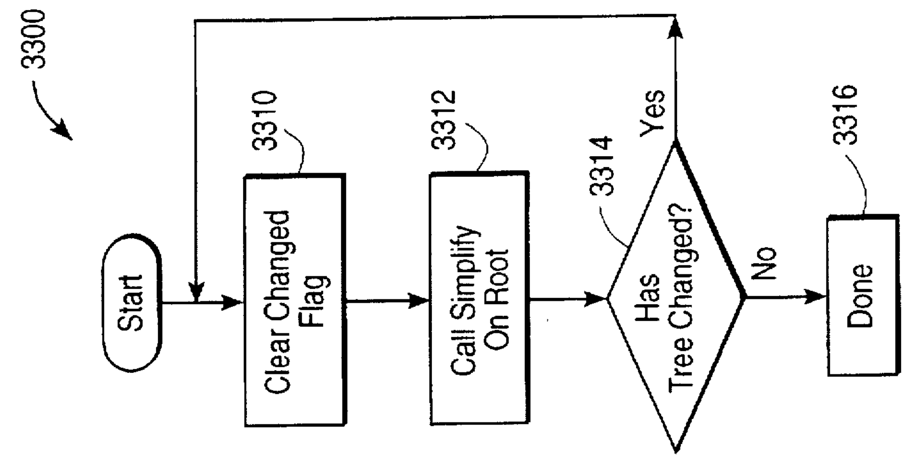
Figure 34A:
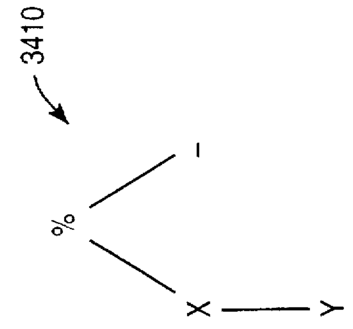
FIGS. 34a–34d illustrate tree structures undergoing simplification.
Figure 34B:
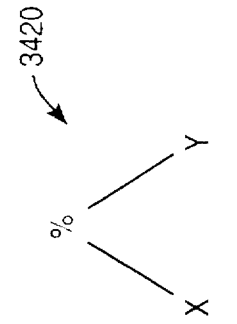
Figure 34C:
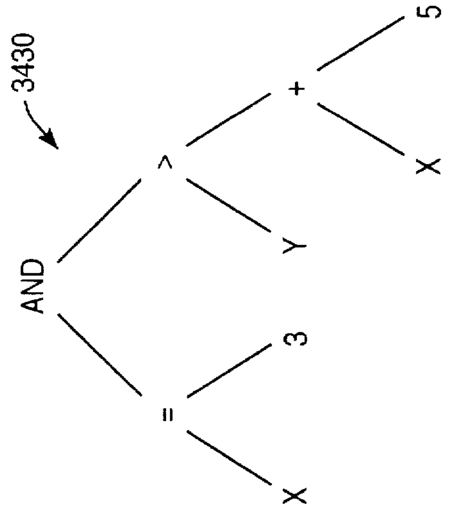
Figure 34D:
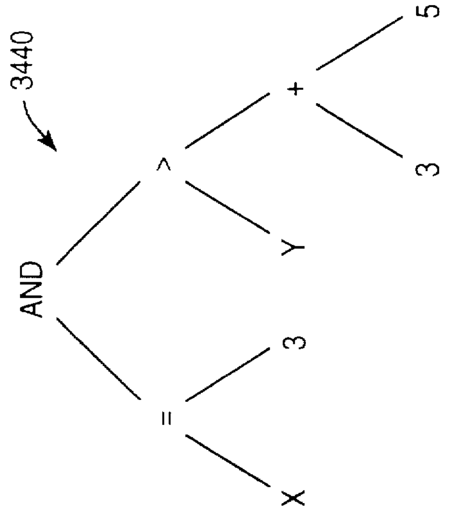

FIGS. 33*a* and 33*b* illustrate the expression simplification process of blocks 3022 in FIG. 30, 3134 in FIG. 31 and the simplification block 1616 when flow chart 1600 of FIG. 6 is applied to analyzer 400. The process of FIGS. 33*a* and 33*b* is applicable to any predicate (i.e., precondition or postcondition) in a tree data structure and will be embodied in a module of code within engine 440. In general, the simplification process is a recursive decent tree-walk. Engine 440 calls the routine recursively for each non-leaf node in a predicate tree.

Referring to FIG. 33*a*, engine 440 initially clears a changed flag (i.e., a bit) associated with a predicate tree pursuant to block 3310. Control then flows to block 3312 where engine 440 calls the routine "Simplify" on a root (i.e., the top element or node in a tree diagram, from which branches extend eventually to leaf nodes) for a subject predicate tree (e.g., see FIGS. 34*a*–34*d*). The Simplify routine is described in flow chart 3350 of FIG. 33*b*.

Referring to flow chart 3350, engine 440 first determines whether the node being investigated is a leaf node. If yes, the process is done and control returns to block 3314 of FIG. 33*a*. Alternatively, if the subject node is not a leaf, control flows to block 3354 where engine 440 calls Simplify on each child of the node (i.e., those nodes hanging from the current node). Upon completing this diversion, control flows to block 3356 where engine 440 determines whether the current node may be simplified.

The operation in block 3356 is a pattern match. Specifically, engine 440 attempts to find a rule that matches a given tree pattern. (An example of such rules is provided in FIGS. 43*a*–43*c*.) For example, tree 3410 of FIG. 34*a* may be simplified to tree 3420 of FIG. 34*b* since X%(−Y)=X%Y. Here, % is the modulus operator. The important property these rules must obey is that they all make progress towards a single cannonical form. This ensures it will not be possible for some cycle of the rules to loop forever. Some rules are non-local. For example, engine 440 may simplify tree 3430 in FIG. 34*c* to tree 3440 in FIG. 34*d*. Tree 3440 can obviously further simplify. These non-local rules require the creation of lists of common subexpressions (so that the two X's in the above tree can be seen to be identical). This can be done by the use of hashing algorithms. The actual rules to be applied in this simplification process are currently being developed.

Returning to FIG. 33*b*, if the current node can be simplified, control flows to block 3358 where engine 440 rewrites the subject tree. In block 3360, a "changed" flag associated with the tree is set to indicate the modification, and control returns to block 3354. If there are no more children to be analyzed and the current node can be simplified no further, control flows to block 3314 of FIG. 33*a* via block 3364 of block 33*b*.

Returning to the top-level simplification routine in FIG. 33*a*, engine 440 determines whether Simplify changed the subject tree in block 3314. If yes, the associated "changed" flag is cleared pursuant to block 3310, and Simplify is called for the root of the newly-changed predicate tree in block 3312: Accordingly, the simplification process is repeated on the same predicate tree bearing a new configuration. Alternatively, if the tree has not changed, the simplification process is complete and control is returned to the process running previously pursuant to block 3316.

Like the simplification process shown in FIG. 17*a* with respect to analyzer 200, how the simplified predicate (i.e., tree) is subsequently used depends upon the on-going operation (i.e., on-going wp computation, final wp computation, invariance verification, etc.). The foregoing discussion applies equally here. However, in this instance, the predicate tree data structures must be converted to text strings if display on monitor 120 is desired.

F. WP Calculation Enhancements

The weakest precondition ("wp") calculation of assignments and alternations exist in closed form and therefore merely require a simple syntactic manipulation of symbols. (This is not true for iterations.) However, the use of some data types such as arrays and pointers cause difficulties in the sense that the resulting wp formulas are somewhat complex. This is touched upon in the foregoing discussion related to variable aliasing.

The analyzer of the present invention may exploit a number of features of weakest precondition calculation to enhance operation. For example, as discussed above, any alternation statement that fails to contain any assignment to those variables named in a postcondition P, has P as its weakest precondition. Therefore, such alternation statement has no effect on the predicate at issue and may safely be ignored and sliced if desired.

Figure 35:
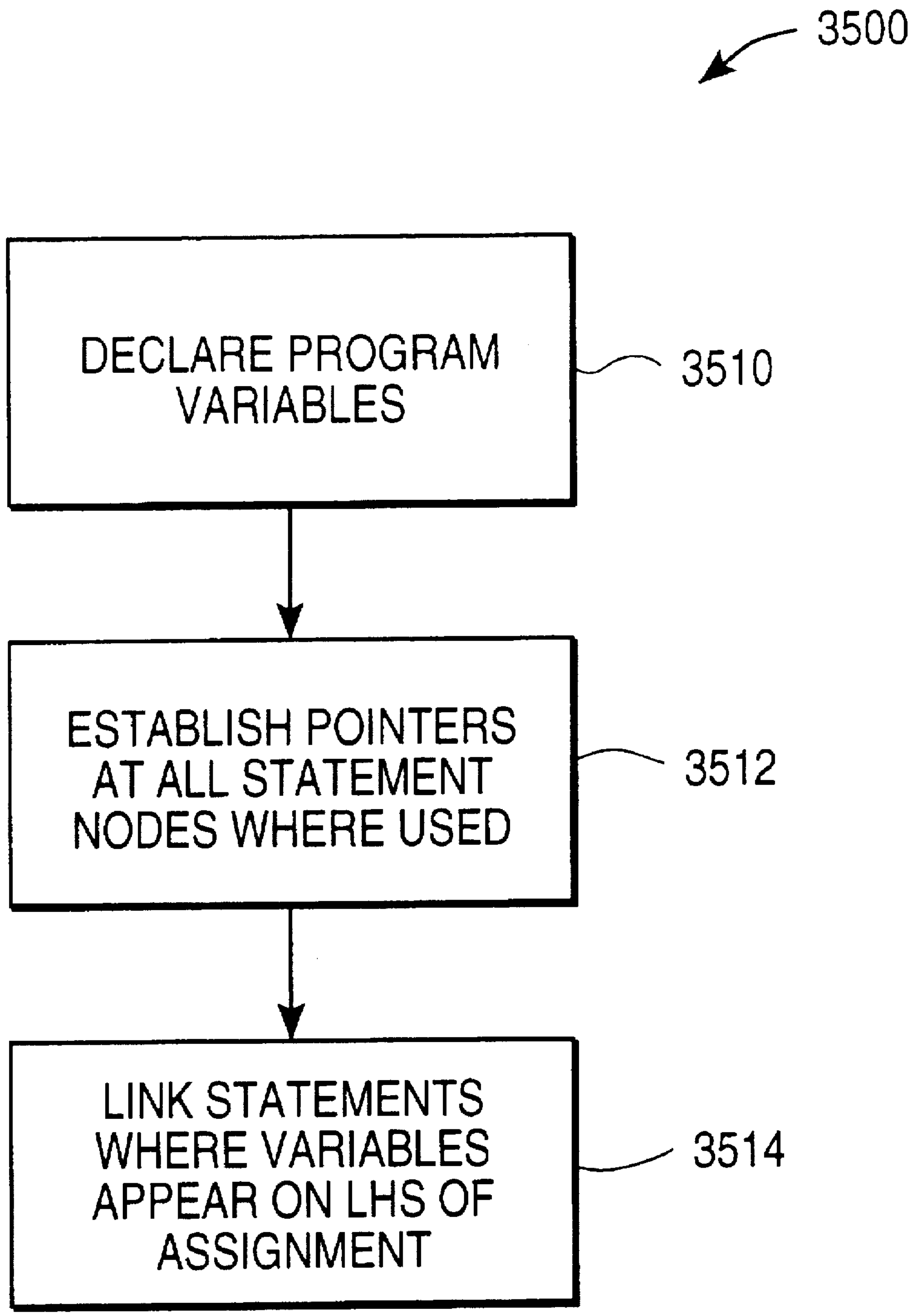
FIG. 35 is a flow chart for identification of variables in statements.

The identification of variables in statements (i.e., S1, S2) disposed within an alternation statement (i.e., if B, then S1 else S2) is immediate from an associated program dependence graph, such as that of FIG. 9. The associated identification process is illustrated in flow chart 3500 of FIG. 35. Starting at block 3510, variables contained within a program, (i.e., x, y, etc.) are declared program variables. In block 3512, pointers are established at all statement nodes where such variables are used starting from their declaration statements. Thereafter, all statements where such variables appear on the left-hand side (LHS) of an assigned statement are linked together pursuant to block 3514 and, therefore, known before the wp calculation is done. In this way, unlinked segments can be safely ignored.

During backward analysis, wp formulas (i.e., precondition and postcondition predicates) grow in size from their starting point to a final point. This phenomenon has two undesirable effects: the degradation of both performance and human readability (unless simplification is possible).

The partition of a sequential program in segments (such as through application of the UNITY computational model) provides a natural way to simplify wp calculation (i.e., it provides a convenient breaking point to simplify computation). Consider a piece of software that has a segment B followed by a segment A. Assume postcondition PA for segment A exclusively names variable x. Calculation of a weakest precondition for segment A at the top of A results in a predicate naming x and y and, for the sake of this example, is a complicated expression. The weakest precondition of segment A, referred to as $Q_A$, will now serve as a postcondition for segment B. In this new function, it is expected that $Q_A$ will capture more variables and complexity during the wp calculations performed on B. However, it is possible to start the wp calculation for B by using a much simpler postcondition predicate through the use of free variables.

Free variables, as noted above, are those that do not occur in the program. Such variables may be set equal to program variables to simplify wp computation since the true value of the variables need not be known. For example, program variables x and y may be set equal to free variables m and n, respectively. The resulting weakest precondition ($Q_B$) at the top of segment B will contain m, n and (possibly) x and y and other variables. If the user requires the weakest precondition of the sequence B:A, this will be given by $Q_B \wedge Q_A$ [x:=m, y:=n], where the $Q_A$ term is $Q_A$ with all occurrences of x, y substituted by m, n. In general, this approach reduces the number of steps by a considerable amount because the number of terms is reduced. This is true particularly for large programs.

The main reason for this improvement is that the weakest precondition expressions, as calculated in real-world programs, contain a much higher number of terms than variables. For example, consider the expression of equation (30):

$$x > y \Rightarrow = 0 \wedge ((x = 0 \vee Y = 0) \Rightarrow x \geq y) \vee x \neq 0 \qquad (31)$$

In the above expression, there are six terms (connected by logical operators) but only two variables. Experience and practice shows very similar ratios between the number of terms and the number of variables for the majority of expressions. This is particularly evident if simplification (as described below) is not done at each step.

Even if simplification is performed, however, such operation would require considerable processing which would itself reduce efficiency. Since the number of terms grows at each step of wp calculation for each statement encountered, any long segment of a program produces large expressions but not necessarily significant increases in the number of variables (this is particularly evident for alternations which multiply the number of terms by 4 for each level of if-then-else statements, i.e., B, weakest preconditions of S1, ¬B, weakest precondition of S2).

As noted above, wp calculation while moving backwards may skip any alternation statement (or a group of nested alternation statements) if there is no assignment to a variable named in the post condition. This in itself is a considerable enhancement. However, since postconditions are weakest preconditions of subsequent statements (except for the first one), such predicates are usually complex expressions that will contain more terms than variables. The checking for assignments to the named variables in these complex expressions may be time-consuming. Accordingly, as discussed above, a code analyzer may include a variable list 2510 (FIGS. 25 and 26) for identifying named variables. The list provides a standard and efficient data structure to facilitate an engine searching operations.

G. Library of Lemmas

A predicate calculus engine ("PCE") having a dynamic library of lemmas provides an extension to the foregoing simplification methods. The PCE intended for interaction with code analyzers 200 or 400 is based on the following principles: (1) interaction with the user, (2) continuous increase in the number of lemmas available and (3) support of quantification. A high-level block diagram illustrating the implementation of such an engine is provided in FIG. 36.

Figure 36:
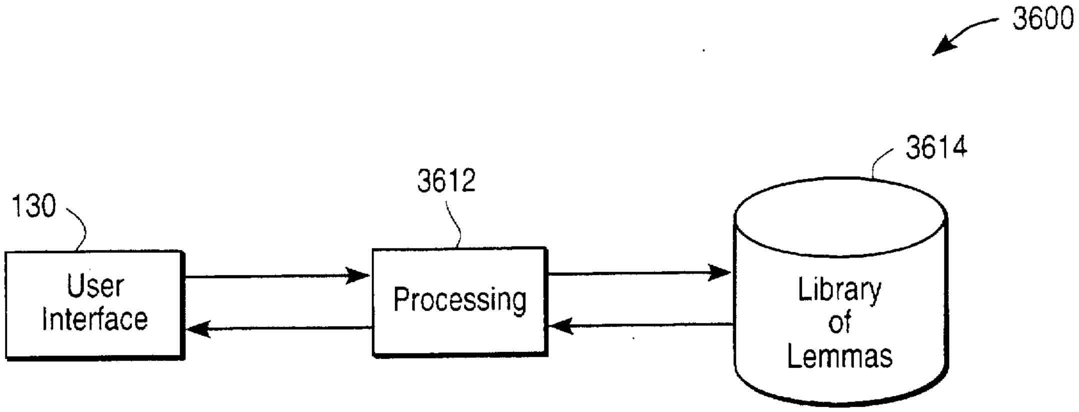
FIG. 36 is a block diagram of a predicate calculus engine.

Referring to FIG. 36, a PCE 3600 is shown which includes a user interface 130 coupled to a processing block 3612 which includes analysis engine 440. This processing block serves as an interface for a library of lemmas 3614. Library 3614 contains lemmas, i.e., relationships that are proven to hold. These relationships are constructed from symbols that represent terms or other predicates. For example, equation (31) is a known lemma that can be used during the proof of any other expression.

$$p \wedge q \Rightarrow p \qquad (32)$$

An expression may be introduced by the operator through user interface 130 shown in FIG. 1 (i.e., via a keyboard or clicking a prompt on a monitor through the use of a conventional mouse). An expression may also be passed as a parameter by another program calling the predicate calculus engine. Given an expression to prove, the predicate calculus engine will carry out the operation of flow chart 3700 shown in FIG. 37.

At the outset, PCE 3600 substitutes each "simple term" in an expression with a new symbol in block 3710. A simple term in this context means a collection of symbols that do not contain predicate calculus operators. A collection of such operators are listed in Table 15 below.

TABLE 15

| Predicate Calculus Operators | |
|---|---|
| ≡ | Equivalence |
| ∧ | Logical AND |
| ∨ | Logical OR |
| ¬ | Logical NOT |
| ⇒ | Implication |

For example, x≧0 is a simple term but X>0 ∧y>0 is not because of the presence of the logical AND operator (i.e., "∧").

Returning to FIG. 37, PCE operation moves to block 3712 wherein PCE 3600 searches lemma library 3614 for a pattern of symbols identical to the newly created expression or for a pattern containing the new expression as a subpattern. If the pattern of symbols is a perfect match, control flows from block 3714 to block 3716. If the new expression is not a "modified" expression as defined below, control flows to block 3722 and the operation terminates.

Alternatively, if the match is not perfect, control flows from block 3714 to block 3724. If a match is partial pursuant to block 3724, the patterns are displayed on monitor 120 to the operator, pursuant to block 3726, and the operator can take action by reformulating the expression or stop the process altogether pursuant to block 3728.

If there is no match, control flows to block 3730 where PCE 3600 applies predicate calculus rules to the expression in accordance with commands received from the operator. Predicate calculus rules, such as those shown in FIGS. 43*a*–43*b*, are well known to those having ordinary skill in the art. Such rules are discussed in Cohen, *Programming in the 1990's*, Springer-Verlag (1990), which is hereby incorporated by reference in its entirety for all purposes. The commands of the operator will be prompted by a conventional menu containing the applicable rules displayed on monitor 120. PCE 3600 will try the rule and display the result. (The operator in block 3730 represents the simplification process of FIGS. 33*a*–33*b*.)

Should application of the predicate calculus rules in block 3730 result in a modified expression (i.e., simplified or merely changed based upon rule application), PCE 3600 will carry out a new lemma search based upon this expression. Accordingly, PCE 3600 control flows through block 3732 to block 3712 to restart the process. Alternatively, if no modified expression is generated, the process terminates pursuant to block 3734.

When a modified lemma is proven in block 3712 by a match in 3714, the operator may choose to store the modified expression in lemma library 3614 pursuant to blocks 3716 through 3720. After which, this process terminates pursuant to block 3722.

Figure 37:
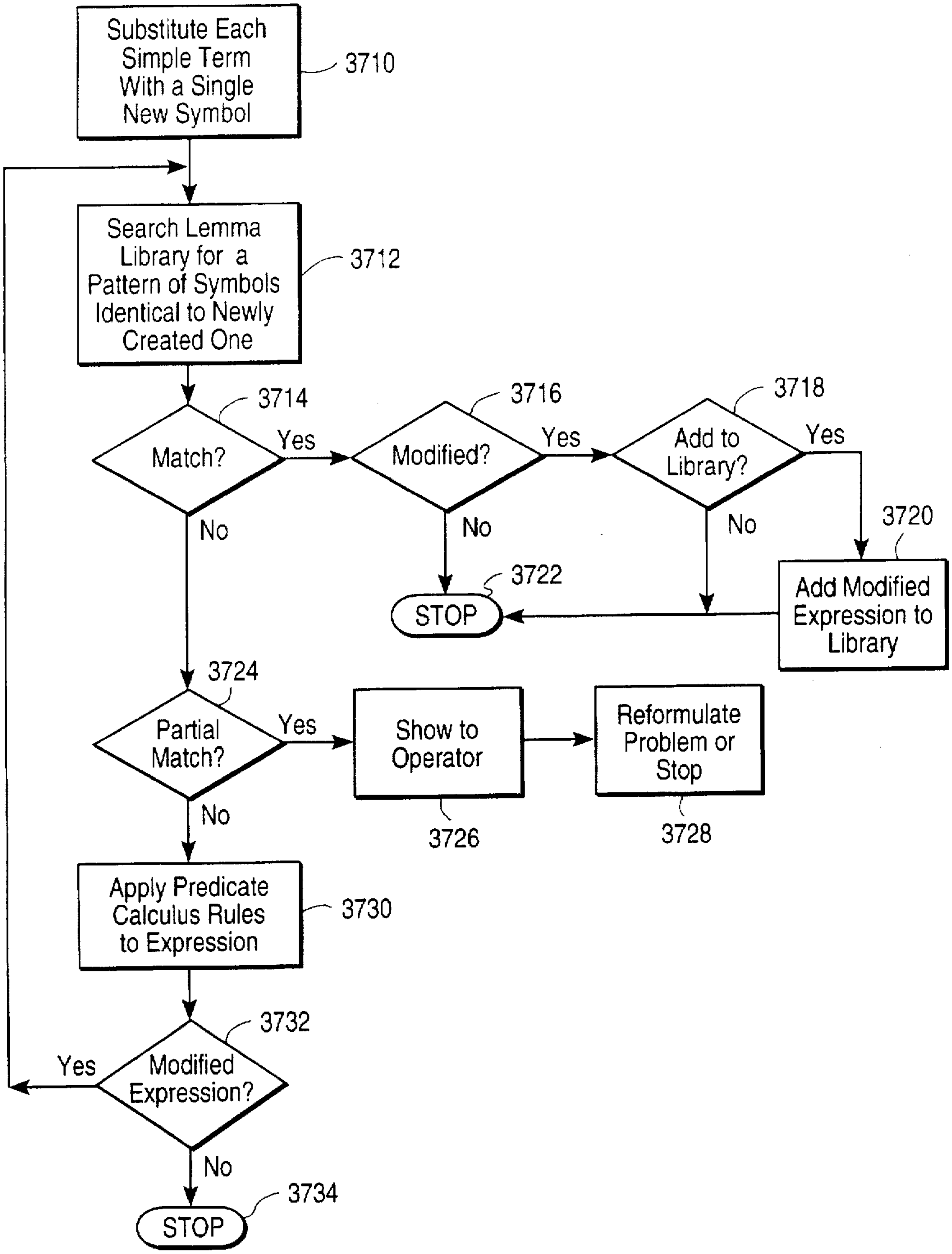
FIG. 37 is a flow chart for simplification operation using a library of lemmas.

At any time during the process illustrated in flow chart 3700 of FIG. 37, the operator may choose to revert the symbols representing simple terms (created in block 3710) into their original form. In this way it is possible to identify situations where items may be eliminated because of logical cancellation. For example, the expression shown in equation (32) below may be reduced to "p" since x≧0∨x<0 is equivalent to "true."

$$x \geq 0 \vee x < 0 \Rightarrow p \qquad (33)$$

The evaluation of the truth value of simple terms (and their combination) depend on the type of variable involved. A strategy based on a library of lemmas (as for the predicate symbols) can be used. One library per variable type is required.

H. Logical Analysis of Code

One of the most interesting practical uses of semantic slices is the study of the effect of code changes. For example, assume that the program fragment in Table 14 is changed into the fragment shown in Table 16 below.

TABLE 16

| Changed Program Fragment |
|---|
| x:=y<br>;if x=0 then (x:=x+1; z:=0) else z:=y; z:=z+1 end<br>;y:=x |

The semantic slices for x, y and z are provided in statements (33), (34) and (35), respectively.

x:=y; if x=0 then x:=x+1 else skip end;y:=x (34)

x:=y; if x=0 then x:=x+1 else skip end;y:=x (35)

if x=0 then z:=0 else z:=y end;z:=z+1 (36)

The semantic slices for x and y are different after implementing the code changes, therefore the states of x and y are affected by the changes. However, the slices for z are the same. Therefore, z is not affected by these changes.

Another example is relative to fault discovery. Assume that at the end of the program segment in Table 14, above, x must equal y. Furthermore, assume this condition has been violated. To analyze this error, a code-analyzer operator need not consider the whole program, but solely the semantic slice of x and y (as shown above). After that, the operator may observe that the execution of the last statement (y:=0) (associated with the required condition x=y), would force x also to be null. The code-analyzer operator may then ask the question under which conditions y:=O is executed. It is again not necessary to consider the whole fragment but only the semantic slice for x and y. Therefore, many assignments may be ignored; a fact that, in many practical cases, produces a substantial reduction of the size of the text that must be examined.

In the particular example under consideration, the condition for executing y:=0 is true, therefore it is expected that at the end of this program, (x=y)⇒(x=0) always holds. If this is not the desired situation, the program is erroneous. Code analyzer supports the analysis of the code for pinpointing the cause of a fault, as will be discussed below.

1. Analysis of Non-iterating Programs

The basic tool for the rigorous analysis of programs is the calculation of the weakest precondition from a given postcondition. The application of this technique to non-iterative programs has two purposes:

a) To determine faults or the effect of a change in the program as it is b) To determine or verify system properties when the program is part of a system or is the body of an iteration.

Applications in accordance with point a) require the presentation of a postcondition, which may be the description of states as they were supposed to be at some point of the program where an error was detected. Code analyzer 400 will initiate a backward construction of the weakest precondition that the erroneous program should have for reaching those desired (but not reached) states. The backward analysis may rapidly indicate either an impossibility (such as the constant predicate false) as weakest precondition or an obvious contradiction (such as one showing that a particular variable known to be always positive, to be less than zero). More subtle and domain-dependent indications may be shown in some cases.

The basic idea is that the code being erroneous cannot reach a state as defined in a postcondition describing those states that are not reached when the error was detected. The weakest precondition analysis would usually indicate where the fault is and how it affects the program behavior.

Once a correction or a modification is performed, the same analysis would supply the validation of the correctness of the change.

The backward analysis sketched above can safely be performed using only a semantic slice of the whole program, which contains all variables named in the postcondition.

As an example, consider the program fragment provided in Table 14 above. Assume that the program, during its execution, obtained a result x=3 and y=0, which is considered unsatisfactory (x=y was the desired result). An operator would use desired states formulation or, in other terms, the negation of the condition representing the error as postcondition for this program. The operator need not use the whole program, but only its semantic slice for x and y. The calculation of the weakest precondition would result in false, stating that x=y is not satisfiable by that program under any circumstance. Assume that the correction is the remotion of the last statement (y:=0). Once that is done, the calculation of the weakest precondition for x=y would bring x≠0, which is the required condition for this program fragment to satisfy the postcondition x=y.

This in turn may make the operator suspicious about the usefulness of the if statement itself and consequently may trigger a complete re-analysis of the program.

The above examples are obviously very small and simple cases. The practical application of the technique however has proven the scalability of the technique.

The greatest difficulty to the application of this method is the formulation of the violated condition. This is primarily due to the imprecise method of reporting malfunctions typically used in industry. Consequently the operationally defined malfunction must be translated into variable state violations for the effective application of the technique. This operation usually requires interacting with "product specialists;" that is, persons with application domain knowledge.

2. Verification of Invariance for Repeatedly Executed Code

Code can be repeatedly executed for many reasons. One is the repeated execution of a loop body in a sequential program for obtaining some particular purpose at termination. Another is the repeated execution of separate programs (executing uninterruptedly and one at a time), for obtaining some global purpose; that is, some desired state for some global variable. In these two cases, a particular set of states can be precisely defined as the goal of the repetition (terminating iterations).

There are other cases of repeated execution of code where it is impossible to define any particular final state as goal. Typical examples of these non-terminating executions are the executions of transactions accessing a database, or the operation of an operating system.

In both terminating and non-terminating cases, the same code is supposed to execute (i.e., initiating in certain states and terminating in some others) in such a way that each execution is correct with respect to the global purpose, which the operator knows is reached after an undetermined number of iteration, or it does not exist at all because the program never terminates. Consequently, we must require that each iteration leaves states which would allow a new execution of the program, which in turn must produce a similar termination. It is clear that this state of affairs imposes that a unique condition defining both initial and final states of these repeated executions will be necessary for correctness. These conditions are called "invariants."

If the repeated execution of code is for the purpose of reaching some final goal (terminating iterations) the invariant must be valid at termination of each execution, including the one that terminates when the goal is reached. Therefore, the goal itself is described by the conjunction of the invariant and some other condition describing the particular termination states.

Verification of invariants is the key for discovering faults caused by erroneous cooperation of s separate programs, such as is the case for programs interacting via permanent files in an MIS system, or modules of an operating system or a distributed system.

The process for verification of invariants using a code analyzer according to the present invention involves the calculation of the weakest precondition in each of the programs. For example, if a program is modified, it would be necessary to express the invariant property that may be affected by the modification. It is necessary to verify the invariant for all programs of the group.

A code analyzer according to the present invention uses the weakest precondition calculation for the verification of the invariants. The user must only supply the invariant, and then the analyzer proceeds to its verification (or notifies that the code violates it).

The invariant verification is possible for:

a) Terminating loops b) Programs cooperating via global variables, such as files, etc. In this case, the technique used for chunking (i.e., a collection of programs interacting with shared data) needs to be first applied for determining the global interactions.

The UNITY computational model is the faithful representation of the union of sequences of condition → actions that can be executed in any order, when the condition holds.

For example, the "do while" loop shown in FIG. 40*a* would be split by a code analyzer into the sequences shown in FIG. 40*b*.

The union of these sequences (only the two sequences representing the loop iterations are here considered, because this example demonstrates some invariant properties for the loop only) are in the UNITY notation of FIG. 40*c*.

For UNITY programs that are not necessarily terminating, it is impossible to establish a semantic based on pre and post conditions, as for the traditional sequential programs. It is possible, however, to define safety properties, such as the invariance of some relation, using the UNITY specifications and prove that the programs satisfy them through the use of UNITY logic. The main element for the specifications of safety properties definition (such as invariance) is the UNITY-based constrains operator, defined as p co q is defined as:

$$p \Rightarrow q \text{ and } p \Rightarrow wp.$$

(Bi→Si).q

In the case an invariant p must hold for the whole program, then:

p must hold initially, and
= {p is invariant =p co p}
p⇒p and p⇒wp(Bi→Si).p {p co q definition}
=
p is invariant = p⇒wp.(Bi→Si).p
= {wp.(Bi→Si).p=Bi⇒wp.Si.p, predicate calculus}
p is invariant = p ^Bi⇒wp.Si.p(for all i's)

As an example of application of the UNITY theory, consider the program in FIG. 40*c* (i.e., the maximum of an array with the condition that N>0). For any correct execution of the UNITY program, we must have p=x≧A.(i−1). The application of invariance p to the program in FIG. 40*b* is illustrated in FIG. 40*d*, which is shown to be true.

However, introducing an error in the program of FIG. 40*c* affects the invariance of p as shown in FIG. 40*e*. Now the second line of this program, as shown in FIG. 40*e*, cannot be further reduced.

Note that the invariant used may not be the strongest (that is, the one fully representing the meaning of the program), but only one that represents the violation shown by the error. In the case of FIG. 40*e*, only the fact x is not greater than any element in A has been considered as a violation.

However, in this particular example, the (erroneous) program of FIG. 40*f* may be present, which respects p but does not represent an intuitive understanding of the maximum of an array. The application of the invariance p to the program of FIG. 40*f* is shown in FIG. 40*g*. (The appearance of the term "predicate calculus" in these figures is an indication that a common predicate calculus identity has been used. These identities may be found in FIGS. 43*a*–43*e*.)

The problem is that the foregoing program violation is not that x is smaller than some A.i, but that x is not equal to an element of A. It is, however, possible (and easy) to define and prove a new invariant which establishes the fact (violated in the above program) that x is required to be one of the elements of A. This new invariant may be written by the operator as equation (33), where A' indicates the bag of the values contained in the array A.

$$p' = x \in A' \qquad (37)$$

Invariant p' is first proven for the correct program (i.e., FIG. 40*c*) in FIG. 40*h*.

However, p' cannot be proven for the second line of the erroneous program of FIG. 40*f*, as shown in FIG. 40*i*.

The second line in FIG. 40*i* cannot be further reduced.

The main advantage of this approach is that there is no difference in method for dealing with terminating loops, non-deterministic execution of sequential programs or parallelism. Furthermore, since the proving of properties using the UNITY approach requires the calculation of the weakest precondition of the various sequences of conditions and actions, the mechanism used by code analyzer 400 for creating semantic slices, as well as for the analysis of non-iterated code, may be used as described above for proving invariant properties. Consequently, the UNITY computational model complements the foregoing code-analyzer functions, thus permitting an extension of code-analyzer application to many different code analysis problems.

Figure 41A:
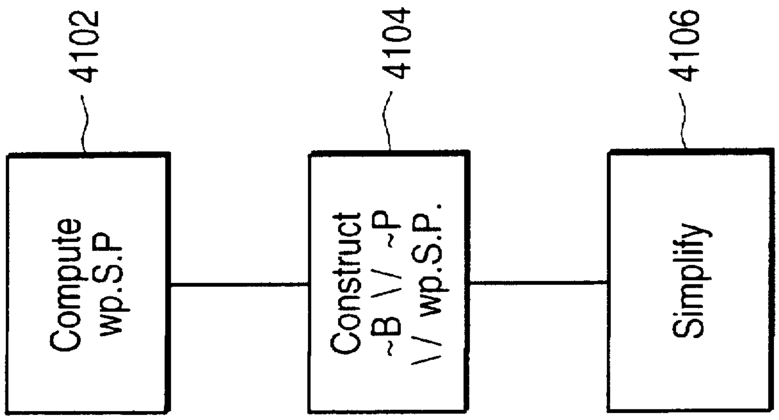
FIGS. 41a–41b illustrate verification of invariance for the analyzer of FIG. 4.
Figure 41B:
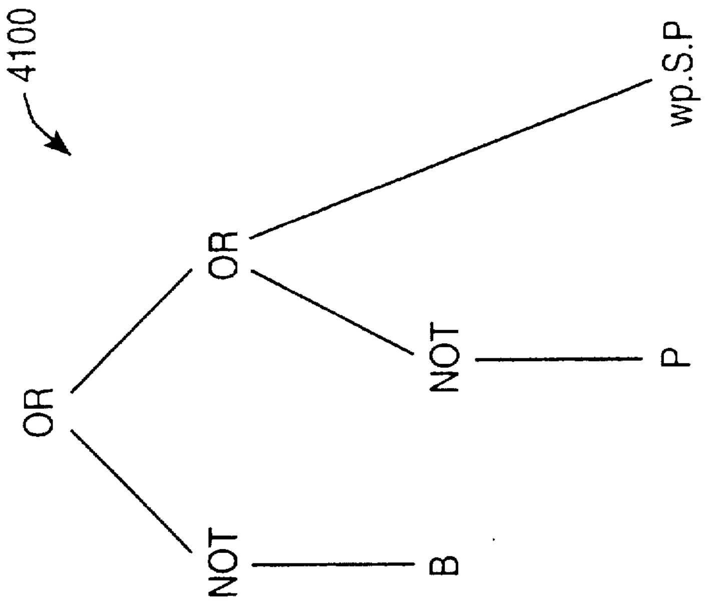

A specific application of invariant verification for analyzer 400 is provided in FIGS. 41*a* and 41*b*. Code analyzer 400 will support functionality which directly evaluates the predicate B ^P⇒wp.S.P; that is, for a given loop body S, the user will be able to evaluate this predicate. Code analyzer 400 will simplify the resulting predicate as much as it can, and present the result to the operator. If the result of the simplification is the predicate "TRUE", then the operator has confirmed that P is indeed an invariant of the given loop. If the result of the simplification is some other predicate, the user must examine the result to see if he can manually simplify it to TRUE and, thereby, again verify the invariant. If the user can establish that the result is NOT identically TRUE, he has found a counter-example to the invariance of P. He can either revise his invariant (change P), or continue the analysis of the code to locate the defect.

A flow chart for this functionality is provided in FIG. 41*a*, wherein analyzer 400 computes wp.S.P. in block 4102 and constructs $\neg B \vee \neg P \vee wp.S.P.$ in block 4104. As a result, tree 4100 in FIG. 41*b* is constructed because $B \wedge P \Rightarrow wp.S.P.$ is logically equivalent to $\neg B \vee \neg P \vee wp.S.P.$ Finally, analyzer 400 simplifies the result in block 4106.

3. Verification of Invariants for Overlapping Code Execution (multitasking)

It is common practice in operating system software to allow the execution of the same procedure by many CPU's at the same time. This is made possible by application of the concept of "process." In the parlance of operating system designers, a process is a collection of pure procedures and variables that can be considered as an independent sequential program, although some of these procedures are executing simultaneously, either accessing process private variables or shared global variables. In this latter case, mechanisms for excluding inappropriate modification of the state of global variables are clearly necessary. These modifications may be the result of overlapping execution of the same procedure on behalf of different processes (i.e., multitasking).

The definition of what are the states of global variables which are correct is an invariant relation. This relation, as all invariant relations, represents those states which are acceptable for any repeated execution of the code that accesses the global variables. Also, as for all other invariants, the obligation of respecting this relation must be enforced at the beginning, and at the end of the execution of the segment of the code accessing the global variables. Note that the invariant may be postulated from the observance of an error that has violated it. In this case, code analyzer 400 permits the analysis of the code for detecting the fault through the foregoing process of weakest precondition calculation.

In the case of multitasking, some code may be arbitrarily segmented among processes. This segmentation defines the smallest portion of the code whose execution can be considered atomic. These atomic segments must all respect the invariant. The hardware usually would enforce that each instruction is an atomic segment; other levels of atomicity are defined by the use of software construct, such as semaphore or locks.

The invariant method supported by code analyzer 400 permits verifying that the level of atomicity is such that the invariant is preserved. This is done by splitting the shared code in the atomic segments. Each of these segments must respect the invariant, and this verification can be done by using the code analyzer as described above (see, FIG. 21 and corresponding discussion). The procedure is the same as the invariant verification approach used for iterative loops and non-deterministic program execution.

It is clearly possible in this manner to determine the finest level of granularity for multitasking based upon invariant construction by the operator.

4. Logical Analysis Summary

There are four general strategies an operator may use with a code analyzer of the present invention to utilize weakest preconditions. These strategies are: (1) proving a program is correct, (2) determining why an observed defect occurs, (3) determining what a program does, and (4) proving two programs are the same.

Regarding the first strategy, assume there exists a program S and specification Q. Treating the specification as a postcondition, the relationship in equation (38) should result.

$$wp.S.Q \quad TRUE \tag{38}$$

If, instead, equation (38) generates a predicate P that is not identically true, this may be for one of three reasons: (a) program S is not correct, (b) the operator must initialize the program to make P≡ TRUE, or (c) the specification is not really correct (i.e., it does not accurately describe the desired results).

Regarding the second strategy, assume S is a program with an observed defect, such as (1) pointer p is null and should not be, (2) array A is not sorted, or (3) a search function did not find the record in the database. The observed defect should be stated as a predicate (i.e., D), such as shown in equation (39), and used to compute the weakest precondition of S (i.e., wp.S.D). If the result is false, then the defect should never occur.

$$D \equiv (p = null) \tag{39}$$

More likely, the code analyzer will generate some predicate P (i.e., wp.S.D≡P). For example, the code analyzer may indicate the predicate places a numerical limit on a program variable (i.e., P≡(N>10)). From this, the operator will know the exact conditions that caused the defect and will therefore be able to create test data cases.

Repeating the foregoing wp computation after the defect is fixed (S' being the fixed program), code analyzer should generate a FALSE precondition (i.e., wp.S'.D≡FALSE). Alternatively, code analyzer may be used to determine wp.S.¬D to determine what initialization is required to avoid the defect.

Regarding the third strategy, assume a program S modifies variables x and y but the operator does not understand the values computed. Creating two free variables $m_x$ and $m_y$ and determining the weakest precondition based on equation (40) will generate a result that specifies the x and y values exactly.

$$wp \cdot S \cdot (x = m_x \wedge y = m_y) \tag{40}$$

A variation on this strategy exists when the operator knows, under certain circumstances, that values $c_x$ and $c_y$ are assigned to x and y. Evaluating equation (41) will show the exact conditions to get these values.

$$wp \cdot S \cdot (x = c_x \wedge y = c_y) \tag{41}$$

This technique may be extended to any number of variables.

Finally, regarding the fourth strategy, assume the operator changes a program (S) to enhance one or more features (i.e., to be simpler, run faster, and/or be more maintainable), but the program is expected to behave the same as before. If S' is the new version of the program, then S and S' will have the same behavior if and only if equation (42) is satisfied for all predicates Q.

$$wp.S.Q \equiv wp.S'.Q \tag{42}$$

I. I/O Commands and JCL Analyzer

Figure 38:
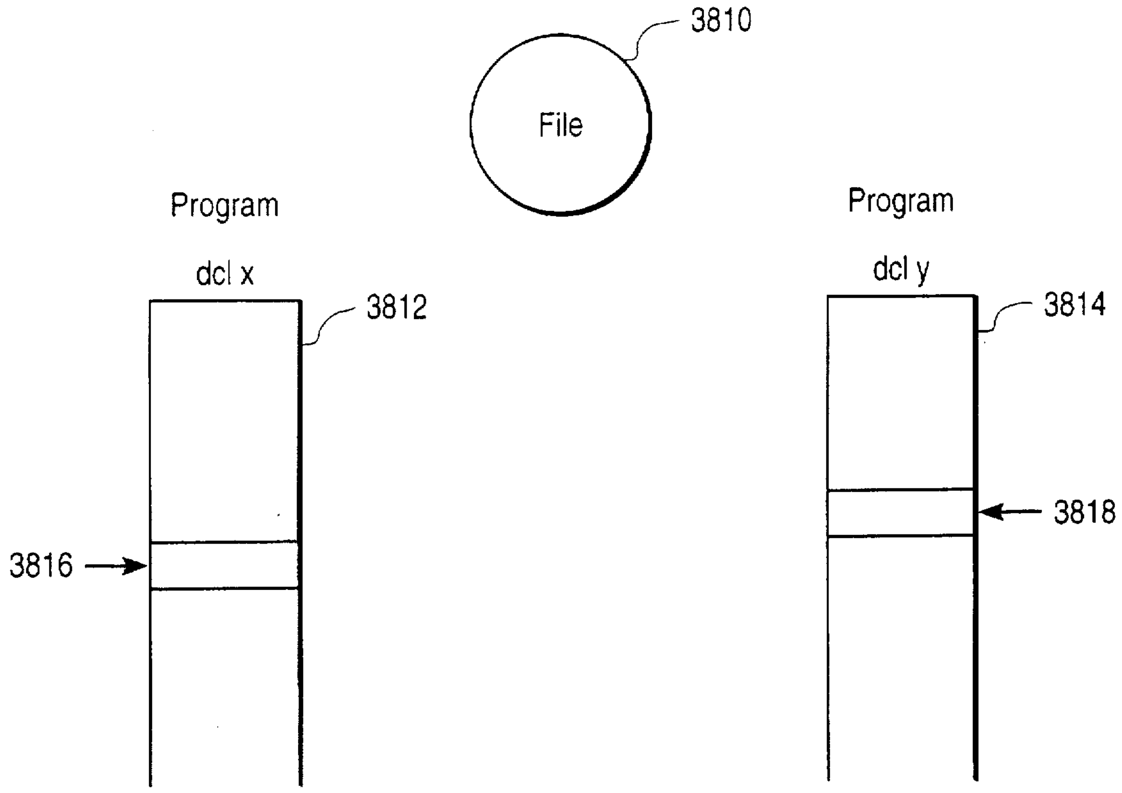
FIG. 38 is a block diagram illustrating two-program access of a single file.

It is frequently possible that one program under analysis uses a permanent file that may be used by other programs. This situation is illustrated in FIG. 38, where a file 3810 receives I/O operations from programs 3812 and 3814. For example, at point 3818, program 3814 writes a record of file 3810 from storage Y. Further, at point 3816, program 3812 reads a record of file 3810 into the storage X.

These operations create a dependency between variable X (in 3812) and variable Y (in 3814). These global dependencies are detected during the segmentation of a program into the UNITY computational model, when all I/O statements are identified and all used files are listed.

All other programs in the system have Job Control Language ("JCL") containing the file declarations used. (JCL is well known by those having ordinary skill in the art. It is a formal language that can be treated as any other source language. JCL allows programmers to specify batch processing instructions in mainframe computing.) Therefore, once one potential source global dependency is identified in a program (such as program 3812), all other users of the file are detected by JCL analysis performed by a code analyzer engine. A global dependency is thus created (i.e., data flow dependency).

If the analysis is to be extended to a number of programs (which is typical), the UNITY model of program 3812 is extended by a simple union with the UNITY model of program 3814. No sequencing variables are necessary. Only the storage variables in programs 3812 and 3814 that receive the same information from file 3810 need to be identified (i.e., renamed with a common name). This is a consequence of the UNITY union theorem which states: "an invariant property holds for the union of a number of segments when it holds for each and every one of them.

Consequently, if an invariant property is violated in a program through the use of wp calculation in that program, it is possible to identify that a "global" variable (such as X in this example) is involved. This immediately suggests to the operator that all programs that use files causing the global dependence of X must also be analyzed for that invariant.

Figure 39:
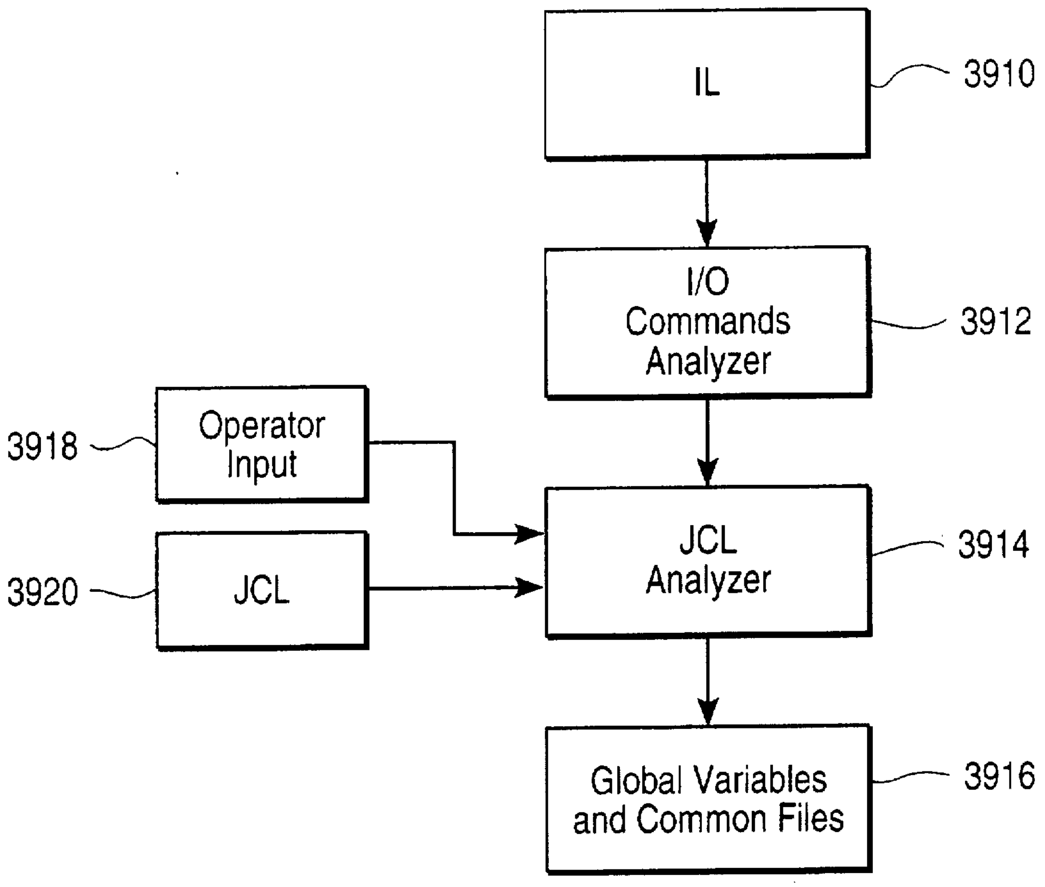
FIG. 39 is a block diagram of I/O and JCL analyzers.

FIG. 39 illustrates architecture in a code analyzer for determining global variables. I/O analyzer 3912 receives IL file 3910 and analyzes I/O statements contained therein. Commercially available I/O analyzers include Revolve (available from MicroFocus) and Cobol analyzer (available from Seek). Analyzer 3912 determines the names of files that are used by the program in file 3910 and the names of the variables (in the program working storage) that are used to store the values obtained from or written into these files. All forms of input and outputs (i.e., screens, printouts, etc.) are treated as files.

The output of I/O analyzer 3912 is fed into a commercially available JCL analyzer 3914 (such as Revolve and Cobol analyzer as identified above). Upon receiving operator commands 3918 and JCL input 3920 JCL analyzer prepares a database 3916 constructed from common files and global variables. JCL analyzer is an application-specific program or realized via scripts from commercially available rules-based systems such as CLIPS.

There are other ways besides I/O that variables can be made global. In principle, everything is the same as described above. In practice, however, the implementation differs although the basic data structure (the program dependence graph; see FIG. 9) is the same. For example, a code analyzer engine may treat COBOL linkage sections as another case of globalization of variables. The use of a program dependence graph may be applied easily to this as well as the I/O case.

The invention has now been described in terms of the foregoing embodiments with variations. Modifications and substitutions will now be apparent to persons of ordinary skill in the art. Accordingly, it is not intended that the invention be limited except as provided by the appended claims.

Attorney Docket No. 1052-30-137

APPENDIX A

CODE ANALYZER

Inventors:

Ashraf Afifi, a citizen of the United States, residing at 20 Maryvale Road, Burlington, Massachusetts 01803;

Dominic Chan, a citizen of the United States, residing at 1196 North Road, Carlisle, Massachusetts 01741;

Joseph J. Comuzzi, a citizen of the United States, residing at 14 Bayberry Road, Groton, Massachusetts 01450;

Johnson M. Hart, a citizen of the United States, residing at 7 Pond Brook Circle, Weston, Massachusetts 02193;

Antonio Pizzarello, a citizen of the United States, residing at 4647 Calle Del Norte, Phoenix, Arizona 85018

Assignee:

Peritus Software Services, Inc.
304 Concord Road
Billerica, Massachusetts 01821-3485

Hale and Dorr
60 State Street
Boston, Massachusetts 02109
(617) 526-6000

BEST AVAILABLE COPY

APPENDIX

Table of Contents

Translator c2pil.c *(c2pil's main functions)* ...................... 1 fns_a2d.c *(c2pil support functions whose name begin..... with the letters "a" through "d")* .................. 2 fns_e2h.c *(c2pil support functions whose name begin with the letters "e" through "h")* .................. 3 fns_i2L.c *(c2pil support functions whose name begin with the letters "i" through "l")* .................. 4 fns_m2p.c *(c2pil support functions whose name begin with the letters "m" through "p")* .................. 5 fns_q2t.c *(c2pil support functions whose name begin with the letters "q" through "t")* .................. 6 fns_u2z.c *(c2pil support functions whose name begin with the letters "u" through "z")* .................. 7 parser.y *("yacc" parser for the C language)* ........... 8 scanner.l *(lexical analyzer for the C language)* ........ 9 c2pil.h *(general named constants)* ..................... 10 fns_a2d.h *( )* ........................................ 11 fns_e2H.h *( )* ........................................ 12 fns_ieL.h *( )* ........................................ 13 fns_M2p.h *( )* ........................................ 14 fns_q2t.h *( )* ........................................ 15 fns_u2z.h *( )* ........................................ 16

Mach dep.h *( )* ....................................... 17 parser.h. *(externally accessible variables)* ............ 18 scanner.h ( ) ........................................ 19 version.h *(program version number used with the "-v" command line option)* .......................... 20

Makefile ( ) ........................................ 21 jcomuzzi@pss2 c2pil.c

SPARCprinter

Fri Oct 27 17:42:22 1995

NeWSprint 2.0
Openwin library 3
NeWSprint interpreter 3.000

NeWSprint 2.0

BEST AVAILABLE COPY

```
/*************************************************************************
 *                                                                       *
 *       Copyright (c) 199? Veritas Software Services, Inc.              *
 *       All Rights Reserved                                             *
 *                                                                       *
 *       THIS IS UNPUBLISHED PROPRIETARY SOURCE CODE OF                  *
 *       Veritas Software Services, Inc.                                 *
 *                                                                       *
 *       This program contains confidential and proprietary              *
 *       information of Veritas Software Services, Inc., and             *
 *       any reproduction, disclosure, or use in whole or in             *
 *       part is expressly prohibited, except as may be                  *
 *       specifically authorized by prior written agreement or           *
 *       permission of Veritas.                                          *
 *                                                                       *
 *       The copyright notice above does not evidence any                *
 *       actual or intended publication of such source code.             *
 *                                                                       *
 *************************************************************************/


/*
** This file contains "c2pil"'s main function.
*/

#include <stdio.h>
#include <stdlib.h>
#include <string.h>

#include "c2pil.h"
#include "fns_a2d.h"
#include "fns_m2p.h"
#include "parser.h"
#include "scanner.h"
#include "version.h"

/*
** Public Global Variables
*/
BOOL      ansi = FALSE;                      /* resolve conflicts for ANSI? */
int       blockIdx = 0;                      /* index of current block level */
int       blockNum[MAX_LEVELS];              /* number of each active block */
int       captureBlockCnt = 0;               /* number of capture blocks */
FILE      *captureBlockFile = NULL;          /* current capture block */
BOOL      capturePIL = FALSE;                /* controls target of writePIL() */
long      captureStackBase = 0;              /* file pos of last stack block */
FILE      *captureStackFile = NULL;          /* stack of prev capture blocks */
char      *cFileName;                        /* C source file name */
BOOL      charIsSigned = TRUE;               /* do chars default to signed? */
int       cmdArgCnt;                         /* count of cmd line args */
char      **cmdArgVec;                       /* address of cmd arg vector */
int       curFileNum;                        /* current source file number */
int       curLineNum;                        /* current source line number */
SymInfo   *hashTbl[HASH_TBL_SIZE];           /* hash table for symbol info */
FILE      *pilFile = NULL;                   /* PIL output file */
char      *pilFileName;                      /* PIL output file name */
int       sizeOfChar = SIZE_OF_CHAR;         /* sizeof(char) for target */
int       sizeOfDouble = SIZE_OF_DBL;        /* sizeof(double) for target */
int       sizeOfFloat = SIZE_OF_FLOAT;       /* sizeof(float) for target */
int       sizeOfInt = SIZE_OF_INT;           /* sizeof(int) for target */
int       sizeOfLong = SIZE_OF_LONG;         /* sizeof(long) for target */
int       sizeOfLongDouble = SIZE_OF_L_DBL;  /* sizeof(long double) for target */
int       sizeOfPointer = 0;                 /* sizeof(*type) for target */
int       sizeOfShort = SIZE_OF_SHORT;       /* sizeof(short) for target */
BOOL      suppressVersion = FALSE;           /* suppress version info */
```

BEST AVAILABLE COPY

```
/*
** File scope constant definitions
*/
#define COMMAND_ARGS \
    "[-?] [-f file] [-T] [-a] [-sdN] [-sfN] [-siN] [-sldN] [-slN] [-spN] [-ssN] [-nc] ...]"

/*
** Local function prototypes
*/
static void displayUsage ARGS((FILE *fp, char *version));

/*
** Function "main" is the main procedure for the program. It processes
** the command arguments, then either complains about the command arguments
** or proceeds to invoke the parser to translate the specified C source
** file.
*/
int                                  /* completion code: nonzero for errors */
main(argCnt, argVec)
    int     argCnt;                  /* number of command arguments + 1 */
    char    *argVec[];               /* pointers to command arguments */
{
    int     argIdx;                  /* argVec array index */
    FILE    *cFile;                  /* C source file */
    int     failure;                 /* TRUE if translation failed */

    /*
    ** Process command arguments.
    */
    cFileName = NULL;
    pFileName = NULL;
    cmdArgCnt = argCnt;
    cmdArgVec = argVec;

    for (argIdx = 1; argIdx < argCnt; argIdx += 1) {

        if (*argVec[argIdx] == '-') {        /* control argument */
            if (strcmp(argVec[argIdx], "-a") == 0) {
                ansi = TRUE;

            } else if (strncmp(argVec[argIdx], "-h", 3) == 0) {
                displayUsage(stdout, VERSION);
                exit(0);

            } else if (strncmp(argVec[argIdx], "-sd", 3) == 0) {
                sizeOfDouble = atoi(argVec[argIdx] + 3);

            } else if (strncmp(argVec[argIdx], "-sf", 3) == 0) {
                sizeOfFloat = atoi(argVec[argIdx] + 3);

            } else if (strncmp(argVec[argIdx], "-si", 3) == 0) {
                sizeOfInt = atoi(argVec[argIdx] + 3);

            } else if (strncmp(argVec[argIdx], "-sld", 4) == 0) {
                sizeOfLongDouble = atoi(argVec[argIdx] + 4);

            } else if (strncmp(argVec[argIdx], "-sl", 3) == 0) {
                sizeOfLong = atoi(argVec[argIdx] + 3);

            } else if (strncmp(argVec[argIdx], "-sp", 3) == 0) {
                sizeOfPointer = atoi(argVec[argIdx] + 3);

            } else if (strncmp(argVec[argIdx], "-ss", 3) == 0) {
                sizeOfShort = atoi(argVec[argIdx] + 3);

            } else if (strcmp(argVec[argIdx], "-nc") == 0) {
```

BEST AVAILABLE COPY

```
        hasDesigner = FALSE;

      /*
      ** After printing the version information terminate the
      ** execution, since it is unlikely further processing is
      ** warranted if the user requests this option.
      */
      } else if (strcmp(argVec[argIdx], "-v") == 0) {
        printf("C to PIL Converter Program, Version %s %s\n",
          VERSION, VERSIONDATE);
        exit(0);

      /*
      ** To allow regression test output to be easily compared
      ** with existing validated test suites, an unpublished
      ** command option "-noVersion" is provided to suppress the
      ** version information normally emitted as the first line
      ** in the PIL file.
      */
      } else if (strcmp(argVec[argIdx], "-noVersion") == 0) {
        suppressVersion = TRUE;

      } else {          /* invalid control argument */
        fprintf(stderr, "Invalid control argument: %s\n",
          argVec[argIdx]);
        displayUsage(stderr, VERSION);
        exit(1);
      }

    } else {            /* file argument */
      if (cFileName == NULL) {
        cFileName = argVec[argIdx];

      } else if (pilFileName == NULL) {
        pilFileName = argVec[argIdx];

      } else {
        fprintf(stderr, "Invalid file argument: %s\n",
          argVec[argIdx]);
        displayUsage(stderr, VERSION);
        exit(1);
      }
    }
}

/*
** Verify type sizes are consistent.
*/
if (sizeOfFloat > sizeOfDouble || sizeOfFloat > sizeOfLongDouble ||
  sizeOfDouble > sizeOfLongDouble) {
    fprintf(stderr, "Floating point type sizes are inconsistent:\n");
    fprintf(stderr,
      "sizeof(float) = %d, sizeof(double) = %d, sizeof(long double) = %d\n",
      sizeOfFloat, sizeOfDouble, sizeOfLongDouble);
    exit(1);
}

if (sizeOfShort > sizeOfInt || sizeOfShort > sizeOfLong ||
  sizeOfInt > sizeOfLong) {
    fprintf(stderr, "Integral type sizes are inconsistent:\n");
    fprintf(stderr,
      "sizeof(short) = %d, sizeof(int) = %d, sizeof(long) = %d\n",
      sizeOfShort, sizeOfInt, sizeOfLong);
    exit(1);
}
```

BEST AVAILABLE COPY

```
    /*
    ** [illegible]
    */
    if [illegible]
        [illegible];

    /*
    ** [illegible]
    */
    if [illegible] strcmp([illegible]FileName, "[illegible]") [illegible]
        [illegible]FileName = "[illegible]";          /* in case it's NULL */
        [illegible]File = stdin;
    [illegible]
        [illegible]File = fopen([illegible]FileName, "r");

        if ([illegible]File == NULL) {
            fprintf(stderr, "Cannot open [illegible] source file '%s'\n", [illegible]FileName);
            exit(1);
        }
    }

    /*
    ** Open FIL output file.
    */
    if (pilFileName == NULL || strcmp(pilFileName, "stdout") == 0) {
        pilFileName = "stdout";          /* in case it's NULL */
        pilFile = stdout;

    } else {
        pilFile = fopen(pilFileName, "wt");

        if (pilFile == NULL) {
            fprintf(stderr, "Cannot open FIL output file '%s'\n", pilFileName);
            exit(1);
        }
    }

    /*
    ** Translate the C source into FIL code.
    */
    yyin = cFile;
    failure = (yyparse() != 0);

    if (failure)
        fprintf(stderr, "Translation failed.\n");

    /*
    ** Discard all symbols in the symbol table, then exit.
    */
    discardSymbols(Labels);
    discardSymbols(Objects);
    discardSymbols(Tags);
    return failure;
}

/*
*************************************************************************
****************          Local functions          *********************
*************************************************************************
*/

/*
** Function "displayUsage" prints the usage message on the user display.
*/
static void
```

BEST AVAILABLE COPY

```
[illegible] [illegible](fp, [illegible])
    [illegible] *fp;                    /* output file pointer */
    [illegible] [illegible];            /* program version string */


    fprintf(fp, "[illegible] [illegible] [illegible] [illegible]", [illegible]);
    fprintf(fp, "    [illegible] [illegible] [illegible] FILE] [OPTIONS] [illegible]");
    fprintf(fp, "  where:\n");
    fprintf(fp, "       FILE is the [illegible] [illegible] [illegible] (default is \"stdin\")\n");
    fprintf(fp,
      "       [illegible] [illegible] [illegible] [illegible] result file (default is \"stdout\")\n");
    fprintf(fp,
      "       [illegible] [illegible] [illegible] [illegible] the following [illegible] options:\n");

    fprintf(fp, "  [illegible]  -- [illegible] [illegible] [illegible] ANSI whenever it [illegible] with K&R\n");
    fprintf(fp, "  [illegible]  -- display this help message, then exit\n");
    fprintf(fp,
      "  [illegible]  -- size of type \"double\" is N bytes (default is [illegible])\n",
      [illegible]);
    fprintf(fp,
      "  [illegible]  -- size of type \"float\" is N bytes (default is [illegible])\n",
      [illegible]);
    fprintf(fp,
      "  [illegible]  -- size of type \"int\" is N bytes (default is [illegible])\n",
      [illegible]);
    fprintf(fp,
      "  [illegible]  -- size of type \"long double\" is N bytes (default is -sld%d)\n",
      [illegible]);
    fprintf(fp,
      "  [illegible]  -- size of type \"long\" is N bytes (default is -sl%d)\n",
      [illegible]);
    fprintf(fp,
      "  -spN  -- size of a pointer is N bytes (default is size of long)\n");
    fprintf(fp,
      "  -ssN  -- size of type \"short\" is N bytes (default is -ss%d)\n",
      [illegible]_SHORT);
    fprintf(fp,
      "  -uc   -- type \"char\" is unsigned (default is \"char\" is signed)\n");
    fprintf(fp,
      "  -v    -- display the version number, then exit\n");

    return;
```

jcomuzzi@pss2 ~~c2pil.c~~ fns_a2d.c

SPARCprinter
Fri Oct 27 17:42:22 1995

NeWSprint 2.0
Openwin library 3
NeWSprint interpreter 3.000

NeWSprint 2.0

BEST AVAILABLE COPY

```
/*********************************************************  *****/
/*                                                              */
/*      Copyright (c) 1995 Peritus Software Services, Inc.      */
/*        All Rights Reserved                                   */
/*                                                              */
/*      THIS IS UNPUBLISHED PROPRIETARY SOURCE CODE OF          */
/*      Peritus Software Services, Inc.                         */
/*                                                              */
/*      This program contains confidential and proprietary      */
/*      information of Peritus Software Services, Inc., and     */
/*      any reproduction, disclosure, or use in whole or in     */
/*      part is expressly prohibited, except as may be          */
/*      specifically authorized by prior written agreement or   */
/*      permission of Peritus.                                  */
/*                                                              */
/*      The copyright notice above does not evidence any        */
/*      actual or intended publication of such source code.     */
/*                                                              */
/****************************************************************/

/*
** This file contains those "c2pil" support functions whose name begin with
** the letters "a" through "d".
*/

#include <ctype.h>
#include <limits.h>
#include <stdio.h>
#include <stdlib.h>
#include <string.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "scanner.h"

/*
** Named Constants
*/
#define DECIMAL 10
#define HEX 16
#define HOST_LARGEST_UNSIGNED_INT (unsigned long)ULONG_MAX
#define OCTAL 8

/*
**  Macro Definitions
*/
#define LASTCHAR(val)           (strlen(val)-((strlen(val)>0)? 1:0))
#define NEXTTOLASTCHAR(val)     (strlen(val)-((strlen(val)>1)? 2:1))


/*
** Function "addressOf" returns the PIL for the address of a specified object.
*/
char *                          /* NULL or PIL for address of object */
addressOf(object, type)
    char *object;               /* PIL object whose address is required */
    char *type;                 /* C type of object */
{
    char *address;              /* PIL for the address of the object */
    char *arrayRef;             /* PIL for an array reference */
```

BEST AVAILABLE COPY

```
char *cursor;                   /* cursor for "type" */
char *memCall;                  /* "_Mem" call for an array slice */
char *oldArrayRef;              /* previous value of "arrayRef" */
char *sliceAddress;             /* PIL for address of an array slice */
/*
** If the arguments are obviously invalid, just return NULL.
*/
if (object == NULL || object[strspn(object, " ")] == '\0')
    return NULL;                /* invalid object */

if (type == NULL || type[strspn(type, " ")] == '\0')
    return NULL;                /* invalid type */

/*
** If the object is not an incompletely subscripted array reference,
** we can form its address simply by prefixing the object with the "@"
** operator.
*/
if (*type != '[' || object[strlen(object) - 1] != ']') {
    address = catenate2(FullSep, "@", object);

/*
** If the object is an an incompletely subscripted array reference, we
** cannot form its address by prefixing the object with the "@" operator
** since PIL does not support incompletely subscripted array references.
** Instead we must return the address of a "_Mem" call whose base is the
** address of the array slice represented by the array reference and
** whose type is the type of the array slice.
*/
} else {
    /*
    ** Form a completely subscripted array reference by adding zero
    ** subscripts.
    */
    arrayRef = newString(DUP, object);
    cursor = type;

    while (*cursor == '[') {
        cursor += firstFieldWidth(cursor);
        oldArrayRef = arrayRef;
        arrayRef = subscriptedRef(oldArrayRef, "0");
        freeString(oldArrayRef);
    }

    /*
    ** Form a "_Mem" call whose base is the address of the completely
    ** subscripted array reference and whose type is that of the
    ** incompletely subscripted array reference.
    */
    sliceAddress = catenate2(FullSep, "@", arrayRef);
    freeString(arrayRef);
    memCall = indirectRef(sliceAddress, "0", type);
    freeString(sliceAddress);

    /*
    ** Form the address of the "_Mem" call.
    */
    address = catenate2(FullSep, "@", memCall);
    freeString(memCall);
}

return address;
}

/*
```

BEST AVAILABLE COPY

```
** Function "advanceBlockNumber" increments the block number for the
** currently active block and resets the block numbers for all future
** inferior blocks.
*/
void
advanceBlockNumber()
{
    int level;              /* blockNum array index */


    blockNum[blockIdx] += 1;

    for (level = blockIdx + 1; level < MAX_LEVELS; level += 1) {
        blockNum[level] = 0;
    }
}


/*
** Function "alignmentOfType" calculates the storage alignment required for an
** object of a specified type.  The type must be specified in the normalized
** internal representation.  The function returns -1 if it detects any errors
** in the type specification, 0 if the type has no alignment requirement (i.e.,
** is a bit-field) and the modulus of the required byte alignment otherwise.
*/
int                                  /* -1 or byte alignment of specified type */
alignmentOfType(type)
    char *type;                      /* internal representation of type */
{
    int   alignment;                 /* byte alignment of specified type */
    char *cursor;                    /* cursor for "type" string */
    int   memberAlignment;           /* alignment of a structure or union member */
    char *typeSpecs;                 /* normalized type specifiers */


    /*
    ** If type is NULL, return -1 to indicate an error.
    */
    if (type == NULL)
        return -1;

    /*
    ** Skip over any array bounds, since the alignment of an array is the
    ** alignment of an element of that array.
    */
    cursor = type + strspn(type, " ");          /* skip over any spaces */

    while (*cursor == '[') {
        cursor += firstFieldWidth(cursor);      /* skip over array */
        cursor += strspn(cursor, " ");          /* skip over any spaces */
    }

    /*
    ** If the type is a function, the alignment is not defined.
    */
    if (*cursor == '(')
        return -1;

    /*
    ** If the type is a pointer, the alignment is the size of a pointer.
    */
    if (*cursor == '*') {
        alignment = sizeOfPointer;

    /*
    ** If the type is a bit-field, the alignment is zero.
```

BEST AVAILABLE COPY

```
} else if (*cursor == ':') {
    alignment = 0;

/*
** If the type is "enum", the alignment is the size of an "int".
*/
} else if (strncmp(cursor, "enum ", sizeof("enum ") - 1) == 0) {
    alignment = sizeOfInt;

/*
** If the type is a structure or union, the alignment is that of the most
** strictly aligned member.
*/
} else if (strncmp(cursor, "struct ", sizeof("struct ") - 1) == 0 ||
  strncmp(cursor, "union ", sizeof("union ") - 1) == 0) {
    /*
    ** Locate the definition of the structure or union.
    */
    cursor = locateDefinition(cursor);

    if (cursor == NULL)
        return -1;   /* can't find a definition */

    /*
    ** Iterate through the structure's or union's definition to find the
    ** most strictly aligned member.
    */
    cursor += strspn(cursor, " ");  /* skip over any leading spaces */
    alignment = 0;

    while (*cursor != '\0') {
        cursor += strcspn(cursor, ":");      /* skip over member name */
        cursor += 1;                         /* skip over ':' */
        memberAlignment = alignmentOfType(cursor);

        /*
        ** If we cannot determine the alignment of the member, then we
        ** cannot determine the alignment of its container.
        */
        if (memberAlignment < 0)
            return -1;

        /*
        ** If the member is a bit-field, the structure or union must
        ** be aligned at least as strictly as if it were an "int".
        */
        else if (memberAlignment == 0)
            memberAlignment = sizeOfInt;

        /*
        ** If the member is more strictly aligned than any previous
        ** member, update the container's alignment to that of the member.
        */
        if (memberAlignment > alignment)
            alignment = memberAlignment;

        /*
        ** Advance the cursor to the start of the next member.
        */
        while (*cursor != ';' && *cursor != '\0')
            cursor += firstFieldWidth(cursor);

        cursor += strspn(cursor, " ;");
```

BEST AVAILABLE COPY

```
    *
    ** If we still don't know the alignment, then the type is either one
    ** of the standard types defined in "parser.h" (in which case its
    ** alignment is its size) or it is invalid.
    *
    } else {
        *
        ** Isolate the type specifiers, then compare them to the standard
        ** types.
        *
        typeSpecs = cursor;

        while (*cursor != ';' && *cursor != '\0')
            cursor += firstFieldWidth(cursor);

        typeSpecs = newString(cursor - typeSpecs, typeSpecs);

        if (strcmp(typeSpecs, Double) == 0)
            alignment = sizeOfDouble;
        else if (strcmp(typeSpecs, Float) == 0)
            alignment = sizeOfFloat;
        else if (strcmp(typeSpecs, LongDouble) == 0)
            alignment = sizeOfLongDouble;
        else if (strcmp(typeSpecs, SignedChar) == 0)
            alignment = sizeOfChar;
        else if (strcmp(typeSpecs, SignedInt) == 0)
            alignment = sizeOfInt;
        else if (strcmp(typeSpecs, SignedLong) == 0)
            alignment = sizeOfLong;
        else if (strcmp(typeSpecs, SignedShort) == 0)
            alignment = sizeOfShort;
        else if (strcmp(typeSpecs, UnsignedChar) == 0)
            alignment = sizeOfChar;
        else if (strcmp(typeSpecs, UnsignedInt) == 0)
            alignment = sizeOfInt;
        else if (strcmp(typeSpecs, UnsignedLong) == 0)
            alignment = sizeOfLong;
        else if (strcmp(typeSpecs, UnsignedShort) == 0)
            alignment = sizeOfShort;
        else
            alignment = -1;

        freeString(typeSpecs);
    }

    return alignment;
}


/*
** Function "bitSizeOfType" calculates the number of bits of storage required
** to hold an object of a specified type.  The type must be specified in the
** normalized internal representation.  The function returns -1 if it detects
** any errors in the type specification.
*/
long                              /* -1 or bit size of specified type */
bitSizeOfType(type, typeSeen)
    char        *type;            /* internal representation of type */
    TypeSeenPtr  typeSeen;        /* list of types seen so far */
{
    int    bitsPerInt;            /* number of bits in an "int" */
    long   bound;                 /* an array bound */
    int    containerBitAlignment; /* bit alignment of a "struct" or "union" */
    char  *cursor;                /* cursor for "type" string */
    long   elementCnt;            /* product of array bounds */
    long   elementSize;           /* size of an element of "type" */
```

BEST AVAILABLE COPY

```
BOOL  isStruct;                 /* TRUE when inside a structure */
int   memberBitAlignment;       /* alignment of "struct" or "union" member */
long  memberSize;               /* size of a struct or union member */
char  *typeSpecs;               /* normalized type specifiers */
TypeSeen newTypeSeen;           /* new link in list of types seen */

/*
** If type is NULL, return -1 to indicate an error.
*/
if (type == NULL)
    return -1;

newTypeSeen.type = type;
newTypeSeen.previous = typeSeen;

/*
** If we've already seen this type, report an error.
*/
for (; typeSeen != NULL; typeSeen = typeSeen->previous)
    if (typeSeen->type == type) {
        char *diagnostic;

        diagnostic = catenate2(NoSep, "Recursively defined type ", type);
        fatalError(curFileNum, curLineNum, diagnostic);
    }

/*
** If the type is an array, determine the number of elements in it.
*/
elementCnt = 1;
cursor = type + strspn(type, " ");         /* skip over any spaces */

while (*cursor == '[') {
    cursor += 1;                            /* skip over '[' */
    cursor += strspn(cursor, " ");          /* skip over any spaces */
    bound = atol(cursor);                   /* convert bound to binary */
    cursor += strspn(cursor, "0123456789"); /* skip over array bound */
    cursor += strspn(cursor, " ");          /* skip over any spaces */

    if (bound == 0 || *cursor != ']')
        return -1;                          /* invalid array indirection */

    cursor += 1;                            /* skip over ']' */
    cursor += strspn(cursor, " ");          /* skip over any spaces */
    elementCnt *= bound;
}

/*
** If the type is a function, the size is not defined.
*/
if (*cursor == '(') {
    elementSize = -1;

/*
** If the type is a pointer, the element size is the size of a pointer.
*/
} else if (*cursor == '*') {
     elementSize = sizeOfPointer*BITS_PER_BYTE;

/*
** If the type is a bit-field, the element size is the bit-field's size.
*/
} else if (*cursor == ':') {
    cursor += 1;                    /* skip over ':' */
    elementSize = atol(cursor);
```

```
/*
** If the type is "enum", the element size is that of an "int".
*/
} else if (strncmp(cursor, "enum ", sizeof("enum ") - 1) == 0) {
    elementSize = sizeOfInt*BITS_PER_BYTE;

/*
** If the type is "struct" or "union", we must recurse to determine the
** sizes of the components.
*/
} else if (strncmp(cursor, "struct ", sizeof("struct ") - 1) == 0 ||
  strncmp(cursor, "union ", sizeof("union ") - 1) == 0) {
    isStruct = (*cursor == 's');

    /*
    ** Locate the definition of the structure or union.
    */
    cursor = locateDefinition(cursor);

    if (cursor == NULL)
        return -1;   /* can't find a definition */

    /*
    ** Iterate through the structure's or union's definition to find the
    ** size of each member and the alignment of the most strictly aligned
    ** member.
    */
    cursor += strspn(cursor, " ");  /* skip over any leading spaces */
    elementSize = 0;
    bitsPerInt = sizeOfInt*BITS_PER_BYTE;
    containerBitAlignment = 0;

    while (*cursor != '\0') {
        cursor += strcspn(cursor, ":");      /* skip over member name */
        cursor += 1;                         /* skip over ':' */
        memberSize = bitSizeOfType(cursor, &newTypeSeen);

        /*
        ** Insert padding to align the member, if needed.
        */
        memberBitAlignment = alignmentOfType(cursor)*BITS_PER_BYTE;

        if (memberBitAlignment < 0) {
            return -1;

        } else if (memberBitAlignment == 0) {
            /*
            ** Pad to the next "int" boundary if the bit-field member
            ** has zero size or would overflow the current word.
            */
            if ((elementSize + memberSize + bitsPerInt - 1)/bitsPerInt !=
              (elementSize + bitsPerInt - 1)/bitsPerInt || memberSize == 0)
                elementSize = (elementSize + bitsPerInt - 1)/
                  bitsPerInt*bitsPerInt;

        } else {
            /*
            ** Pad to the required alignment boundary.
            */
            elementSize = (elementSize + memberBitAlignment - 1)/
              memberBitAlignment*memberBitAlignment;
        }

        /*
        ** If the member is more strictly aligned than any previous
        ** member, record its bit alignment.  Treat a bit-fields as
```

```
        ** an "int" for alignment purposes.
        */
        if (memberBitAlignment == 0)
            memberBitAlignment = sizeOfInt*BITS_PER_BYTE;

        if (memberBitAlignment > containerBitAlignment)
            containerBitAlignment = memberBitAlignment;

        /*
        ** Record the member's size.
        */
        if (isStruct)
            elementSize += memberSize;
        else if (memberSize > elementSize)
            elementSize = memberSize;

        /*
        ** Advance the cursor to the start of the next member.
        */
        while (*cursor != ';' && *cursor != '\0')
            cursor += firstFieldWidth(cursor);

        cursor += strspn(cursor, " ;");
    }

    /*
    ** Pad the structure or union size to a multiple of the alignment
    ** of its most strictly aligned member.
    */
    elementSize = (elementSize + containerBitAlignment - 1)/
      containerBitAlignment*containerBitAlignment;

/*
** If we still don't know the element size, then the type is either one
** of the standard typed defined in "parser.h" or it is invalid.
*/
} else {
    /*
    ** Isolate the type specifiers, then compare them to the standard
    ** types.
    */
    typeSpecs = cursor;

    while (*cursor != ';' && *cursor != '\0')
        cursor += firstFieldWidth(cursor);

    typeSpecs = newString(cursor - typeSpecs, typeSpecs);

    if (strcmp(typeSpecs, Double) == 0)
        elementSize = sizeOfDouble*BITS_PER_BYTE;
    else if (strcmp(typeSpecs, Float) == 0)
        elementSize = sizeOfFloat*BITS_PER_BYTE;
    else if (strcmp(typeSpecs, LongDouble) == 0)
        elementSize = sizeOfLongDouble*BITS_PER_BYTE;
    else if (strcmp(typeSpecs, SignedChar) == 0)
        elementSize = sizeOfChar*BITS_PER_BYTE;
    else if (strcmp(typeSpecs, SignedInt) == 0)
        elementSize = sizeOfInt*BITS_PER_BYTE;
    else if (strcmp(typeSpecs, SignedLong) == 0)
        elementSize = sizeOfLong*BITS_PER_BYTE;
    else if (strcmp(typeSpecs, SignedShort) == 0)
        elementSize = sizeOfShort*BITS_PER_BYTE;
    else if (strcmp(typeSpecs, UnsignedChar) == 0)
        elementSize = sizeOfChar*BITS_PER_BYTE;
    else if (strcmp(typeSpecs, UnsignedInt) == 0)
        elementSize = sizeOfInt*BITS_PER_BYTE;
```

```
        else if (strcmp(typeSpecs, UnsignedLong) == 0)
            elementSize = sizeOfLong*BITS_PER_BYTE;
        else if (strcmp(typeSpecs, UnsignedShort) == 0)
            elementSize = sizeOfShort*BITS_PER_BYTE;
        else
            elementSize = -1;

        freeString(typeSpecs);
    }

    if (elementSize < 0)
        return -1;

    return elementCnt*elementSize;
}


/*
** Function "catenate2" returns a string which is the catenation of two
** specified strings.  The caller may select whether consecutive nonempty
** strings should never, sometimes (i.e., when both are alphanumeric) or
** always be separated by a space.  The returned string is allocated from
** the heap, so it is the caller's responsibility to free it when it is no
** longer needed.
*/
char *                          /* catenation of the strings */
catenate2(separation, string1, string2)
    CatSep separation;          /* type of component separation desired */
    char   *string1;            /* first string in catenation */
    char   *string2;            /* second string in catenation */
{
    char *catenation;           /* catenation of the strings */

    if (string1 == NULL)
        string1 = "";           /* treat NULL first string as empty */

    if (string2 == NULL)
        string2 = "";           /* treat NULL second string as empty */

    catenation = newString(strlen(string1) + strlen(string2) + 1, string1);

    if (needSeparator(separation, catenation, string2))
        strcat(catenation, " ");

    strcat(catenation, string2);
    return catenation;
}


/*
** Function "catenate3" returns a string which is the catenation of three
** specified strings.  The caller may select whether consecutive nonempty
** strings should never, sometimes (i.e., when both are alphanumeric) or
** always be separated by a space.  The returned string is allocated from
** the heap, so it is the caller's responsibility to free it when it is no
** longer needed.
*/
char *                          /* catenation of the strings */
catenate3(separation, string1, string2, string3)
    CatSep separation;          /* type of component separation desired */
    char *string1;              /* first string in catenation */
    char *string2;              /* second string in catenation */
    char *string3;              /* third string in catenation */
{
    char *catenation;           /* catenation of the strings */
```

```
    if (string1 == NULL)
        string1 = "";               /* treat NULL first string as empty */

    if (string2 == NULL)
        string2 = "";               /* treat NULL second string as empty */

    if (string3 == NULL)
        string3 = "";               /* treat NULL third string as empty */

    catenation = newString(strlen(string1) + strlen(string2) +
      strlen(string3) + 2, string1);

    if (needSeparator(separation, catenation, string2))
        strcat(catenation, " ");

    strcat(catenation, string2);

    if (needSeparator(separation, catenation, string3))
        strcat(catenation, " ");

    strcat(catenation, string3);
    return catenation;
}


/*
** Function "catenate4" returns a string which is the catenation of four
** specified strings.  The caller may select whether consecutive nonempty
** strings should never, sometimes (i.e., when both are alphanumeric) or
** always be separated by a space.  The returned string is allocated from
** the heap, so it is the caller's responsibility to free it when it is no
** longer needed.
*/
char *                              /* catenation of the strings */
catenate4(separation, string1, string2, string3, string4)
    CatSep separation;              /* type of component separation desired */
    char *string1;                  /* first string in catenation */
    char *string2;                  /* second string in catenation */
    char *string3;                  /* third string in catenation */
    char *string4;                  /* fourth string in catenation */
{
    char *catenation;               /* catenation of the strings */

    if (string1 == NULL)
        string1 = "";               /* treat NULL first string as empty */

    if (string2 == NULL)
        string2 = "";               /* treat NULL second string as empty */

    if (string3 == NULL)
        string3 = "";               /* treat NULL third string as empty */

    if (string4 == NULL)
        string4 = "";               /* treat NULL fourth string as empty */

    catenation = newString(strlen(string1) + strlen(string2) +
      strlen(string3) + strlen(string4) + 3, string1);

    if (needSeparator(separation, catenation, string2))
        strcat(catenation, " ");

    strcat(catenation, string2);

    if (needSeparator(separation, catenation, string3))
        strcat(catenation, " ");
```

```
    strcat(catenation, string3);

    if (needSeparator(separation, catenation, string4))
        strcat(catenation, " ");

    strcat(catenation, string4);
    return catenation;
}


/*
** Function "catenate5" returns a string which is the catenation of five
** specified strings.  The caller may select whether consecutive nonempty
** strings should never, sometimes (i.e., when both are alphanumeric) or
** always be separated by a space.  The returned string is allocated from
** the heap, so it is the caller's responsibility to free it when it is no
** longer needed.
*/
char *                                  /* catenation of the strings */
catenate5(separation, string1, string2, string3, string4, string5)
    CatSep separation;                  /* type of component separation desired */
    char *string1;                      /* first string in the catenation */
    char *string2;                      /* second string in the catenation */
    char *string3;                      /* third string in the catenation */
    char *string4;                      /* fourth string in the catenation */
    char *string5;                      /* fifth string in the catenation */
{
    char *catenation;                   /* catenation of the strings */

    if (string1 == NULL)
        string1 = "";                   /* treat NULL first string as empty */

    if (string2 == NULL)
        string2 = "";                   /* treat NULL second string as empty */

    if (string3 == NULL)
        string3 = "";                   /* treat NULL third string as empty */

    if (string4 == NULL)
        string4 = "";                   /* treat NULL fourth string as empty */

    if (string5 == NULL)
        string5 = "";                   /* treat NULL fifth string as empty */

    catenation = newString(strlen(string1) + strlen(string2) +
      strlen(string3) + strlen(string4) + strlen(string5) + 4, string1);

    if (needSeparator(separation, catenation, string2))
        strcat(catenation, " ");

    strcat(catenation, string2);

    if (needSeparator(separation, catenation, string3))
        strcat(catenation, " ");

    strcat(catenation, string3);

    if (needSeparator(separation, catenation, string4))
        strcat(catenation, " ");

    strcat(catenation, string4);

    if (needSeparator(separation, catenation, string5))
        strcat(catenation, " ");

    strcat(catenation, string5);
```

```
    return catenation;
}


/*
** Function "catenate6" returns a string which is the catenation of six
** specified strings.  The caller may select whether consecutive nonempty
** strings should never, sometimes (i.e., when both are alphanumeric) or
** always be separated by a space.  The returned string is allocated from
** the heap, so it is the caller's responsibility to free it when it is no
** longer needed.
*/
char *                              /* catenation of the strings */
catenate6(separation, string1, string2, string3, string4, string5, string6)
    CatSep separation;              /* type of component separation desired */
    char *string1;                  /* first string in the catenation */
    char *string2;                  /* second string in the catenation */
    char *string3;                  /* third string in the catenation */
    char *string4;                  /* fourth string in the catenation */
    char *string5;                  /* fifth string in the catenation */
    char *string6;                  /* sixth string in the catenation */
{
    char *catenation;               /* catenation of the strings */

    if (string1 == NULL)
        string1 = "";               /* treat NULL first string as empty */

    if (string2 == NULL)
        string2 = "";               /* treat NULL second string as empty */

    if (string3 == NULL)
        string3 = "";               /* treat NULL third string as empty */

    if (string4 == NULL)
        string4 = "";               /* treat NULL fourth string as empty */

    if (string5 == NULL)
        string5 = "";               /* treat NULL fifth string as empty */

    if (string6 == NULL)
        string6 = "";               /* treat NULL sixth string as empty */

    catenation = newString(strlen(string1) + strlen(string2) +
      strlen(string3) + strlen(string4) + strlen(string5) +
      strlen(string6) + 5, string1);

    if (needSeparator(separation, catenation, string2))
        strcat(catenation, " ");

    strcat(catenation, string2);

    if (needSeparator(separation, catenation, string3))
        strcat(catenation, " ");

    strcat(catenation, string3);

    if (needSeparator(separation, catenation, string4))
        strcat(catenation, " ");

    strcat(catenation, string4);

    if (needSeparator(separation, catenation, string5))
        strcat(catenation, " ");

    strcat(catenation, string5);
```

```
    if (needSeparator(separation, catenation, string6))
        strcat(catenation, " ");

    strcat(catenation, string6);
    return catenation;
}


/*
** Function "catenate7" returns a string which is the catenation of seven
** specified strings.  The caller may select whether consecutive nonempty
** strings should never, sometimes (i.e., when both are alphanumeric) or
** always be separated by a space.  The returned string is allocated from
** the heap, so it is the caller's responsibility to free it when it is no
** longer needed.
*/
char *                                  /* catenation of the strings */
catenate7(separation, string1, string2, string3, string4, string5, string6,
  string7)
    CatSep separation;                  /* type of component separation desired */
    char *string1;                      /* first string in the catenation */
    char *string2;                      /* second string in the catenation */
    char *string3;                      /* third string in the catenation */
    char *string4;                      /* fourth string in the catenation */
    char *string5;                      /* fifth string in the catenation */
    char *string6;                      /* sixth string in the catenation */
    char *string7;                      /* seventh string in the catenation */
{
    char *catenation;                   /* catenation of the strings */

    if (string1 == NULL)
        string1 = "";                   /* treat NULL first string as empty */

    if (string2 == NULL)
        string2 = "";                   /* treat NULL second string as empty */

    if (string3 == NULL)
        string3 = "";                   /* treat NULL third string as empty */

    if (string4 == NULL)
        string4 = "";                   /* treat NULL fourth string as empty */

    if (string5 == NULL)
        string5 = "";                   /* treat NULL fifth string as empty */

    if (string6 == NULL)
        string6 = "";                   /* treat NULL sixth string as empty */

    if (string7 == NULL)
        string7 = "";                   /* treat NULL seventh string as empty */

    catenation = newString(strlen(string1) + strlen(string2) +
      strlen(string3) + strlen(string4) + strlen(string5) +
      strlen(string6) + strlen(string7) + 6, string1);

    if (needSeparator(separation, catenation, string2))
        strcat(catenation, " ");

    strcat(catenation, string2);

    if (needSeparator(separation, catenation, string3))
        strcat(catenation, " ");

    strcat(catenation, string3);

    if (needSeparator(separation, catenation, string4))
```

```
        strcat(catenation, " ");

    strcat(catenation, string4);

    if (needSeparator(separation, catenation, string5))
        strcat(catenation, " ");

    strcat(catenation, string5);

    if (needSeparator(separation, catenation, string6))
        strcat(catenation, " ");

    strcat(catenation, string6);

    if (needSeparator(separation, catenation, string7))
        strcat(catenation, " ");

    strcat(catenation, string7);
    return catenation;
}

/*
** Function "checkVar" checks to see if a variable declaration has
** occurred for a given name.  If necessary, it calls writeVar() to
** write directive to the PIL output file to declare the name and type
** of a symbol.
*/
void
checkVar(identifier)
    char *identifier;
{
    SymInfo *sym;

    sym = findSymbolInfo(identifier, Objects, MAX_LEVELS);
    if (sym != NULL && isGlobalVar(sym) && !sym->pilWritten) {
        int holdBlockIdx = blockIdx;

        blockIdx = sym->blockIdx;
        writeVar(identifier, sym->type);
        sym->pilWritten = TRUE;
        blockIdx = holdBlockIdx;
    }
}

/*
** Function "combineStrings" combines two adjacent quoted strings, possibly
** separated by whitespace, into a single unquoted string.  This routine is
** recursive.
**
** This function assumes that the framing double quotes have been removed.
** The string is modified in place.
*/
void
combineStrings(str)
    char *str;                  /* input string */
{
    char *cur;                  /* current string character */
    char *next;                 /* next string character */


    if (str == NULL)
        return;                 /* nothing to do */

    if ((cur = strchr(str, '"')) != NULL) {
        if (*(cur-1) == '\\') {
            combineStrings(cur+1);
```

```
        else {
          next = cur + 1;

          while (*next != 0) {
              if (*next != ' ' && *next != '\n' && *next != '\t')
                  *cur++ = *next;

              next++;
          }

          *cur = 0;
          combineStrings(str);
    }
}

/*
** Function "convertFromBoolean" emits a series of PIL statements to
** convert a boolean expression to a compatible type.  If the new
** type is not compatible, NULL is returned (diagnostic messages
** are left to the caller).  If the assignValue parameter is not
** NULL, then this string is used in the generated PIL to optimize
** assign statements.  This routine is not included as part of
** transformValue because of the need for this assignment optimization.
** If the assignValue parameter is not used by the caller, then
** the function "convertType" is the appropriate function to use (it
** calls "transformValue" which in turn calls this "convertFromBoolean").
**
** If successful, the return string is allocated on the heap and it
** is the responsibility of the caller to free the space.
*/
char *                              /* Converted value */
convertFromBoolean(value, newType, assignValue)
    char *value;                    /* Boolean value to convert */
    char *newType;                  /* Type to convert boolean to */
    char *assignValue;              /* Use for converted value if not NULL */
{
    char *directive;                /* PIL directive */
    char *newValue;                 /* converted value */
    char *oldValue;                 /* value with enclosing parens removed */

    /*
    ** If the new type is not compatible with a boolean type, return NULL.
    */
    if (!isIntegralType(newType) && !isFloatingType(newType))
        return NULL;

    newValue = (assignValue == NULL) ? newTempVariable(newType) :
                 newString(DUP, assignValue);

    startBlock();
    oldValue = unparenthesize(value);
    directive = catenate3(FullSep, "if (", oldValue, ")");
    writePIL(directive);
    freeString(directive);
    directive = (isIntegralType(newType)) ?
      catenate3(FullSep, "assign", newValue, "= 1") :
      catenate3(FullSep, "assign", newValue, "= 1.0");
    writePIL(directive);
    freeString(directive);
    advanceBlockNumber();
    directive = catenate3(FullSep, "if ^ (", oldValue, ")");
    writePIL(directive);
    freeString(directive);
```

```
    directive = (isIntegralType(newType)) ?
      catenate3(FullSep, "assign", newValue, "= 0") :
      catenate3(FullSep, "assign", newValue, "= 0.0");
    writePIL(directive);
    freeString(directive);
    terminateBlock("endif");
    freeString(oldValue);
    return newValue;
}


/*
** Function "convertStrToBin" receives a string of digits representing
** a (possibly negative) decimal, octal or hexadecimal number.  Following
** the negative sign, if present, octal values have a prefix '0' and
** hexadecimal values have a prefix "0x" or "0X".  Any combination of the
** standard 'C' suffixes to indicate a long value ('L' or 'l') or an
** unsigned value ('U' or 'u') can be included on the end of input string.
**
** The format of the input string is expected to be as follows:
**          [-|+][prefix][digit_string][suffix]
** Any deviation from this format may cause unexpected results.
**
** The input string is converted to an unsigned binary number and
** then the value is negated if necessary. If there is no overflow
** indicated, the binary equivalent of the input string is returned
** as a signed long. Note that this function is capable of converting
** the largest unsigned value that can be represented by the processor,
** but the caller will have to cast the return value to unsigned long
** to avoid misinterpretation of the high-order bit.
**
** A null string evaluates to binary 0.  The input string is left
** unchanged by this function.
**
** In the event of an overflow indication, an error message is written to
** stderr and the program terminates.
*/
long                                /* String value as a binary number */
convertStrToBin(value)
    char *value;                    /* Value to convert as a char string */
{
    unsigned long accum;            /* Conversion result accumulator */
    char          base;             /* Used to convert chars to digits */
    char         *diagnostic;       /* an error message */
    int           end;              /* Char position of the last digit */
    unsigned long maxValue;         /* Used to test for overflow */
    BOOL          neg;              /* TRUE if value is negative */
    BOOL          overflow;         /* TRUE if value is too large */
    int           pos;              /* Digit position in the string */
    int           radix;            /* DECIMAL, OCTAL or HEX */


    if (value == NULL)
        value = "";                 /* treat NULL value as empty */

    neg = (value[0] == '-');        /* Determine the sign of the string */

    if (neg || value[0] == '+')
        value++;                    /* Skip over the sign, if present */

    /*
    ** Determine the radix of the constant.  A leading "0x" or "0X"
    ** indicates hexadecimal, while a lone leading '0' is octal. The
    ** string "0" evaluates by length to decimal.
    */
    end = LASTCHAR(value);
```

```
    radix = (end == 0 || value[0] != '0') ? DECIMAL :
                                      (isalpha(value[1])) ? HEX : OCTAL;
    value += (radix == HEX) ? 2 : (radix == OCTAL) ? 1 : 0; /* Skip prefix */
    end = LASTCHAR(value);        /* Adjust end value */

    /*
    ** If there are no digits included, return 0
    */
    if (value[0] == 0)
        return 0L;

    /*
    ** Check for suffix characters ('L', 'U', 'UL'or 'LU')
    */
    while (end >= 0 && toupper(value[end]) >= 'L')
        end--;

    /*
    ** Convert the string to its numeric equivalent, checking for
    ** potential overflow before processing each digit/char.
    */
    accum = 0;
    overflow = FALSE;
    maxValue = HOST_LARGEST_UNSIGNED_INT/radix;

    for (pos=0; !overflow && pos <= end; pos++) {
        overflow = (accum > maxValue);

        if (!overflow) {
            accum *= radix;
            base = (toupper(value[pos]) >= '0'
              && toupper(value[pos]) <= '9') ? '0' : 'A'-10;
            overflow =
              (HOST_LARGEST_UNSIGNED_INT - accum < toupper(value[pos])-base);

            if (!overflow)
                accum += toupper(value[pos]) - base;
        }
    }

    /*
    ** Negate the result if necessary.  Note that unsigned value obtained
    ** from the string may be too large to be represented as a negative
    ** number, since the uppermost bit is needed to indicate a negative.
    ** If this is the case an overflow indication is generated.
    */
    if (!overflow && neg) {
        overflow = (accum > (unsigned long)LONG_MIN);

        if (!overflow)
            accum = -accum;
    }

    if (overflow) {
        diagnostic = catenate2(NoSep,
          "Value exceeds maximum length for this processor:  ", value);
        fatalError(0, 0, diagnostic);
        freeString(diagnostic);
    }

    return (long)accum;
}


/*
** Function "convertToCommonType" converts one or both operands of a binary
```

```
** operation to a common type so that the operation can be carried out.
*/
BOOL                                /* TRUE if conversion successful */
convertToCommonType(one, two)
    YYSTYPE one;                    /* address of left operand's rule value */
    YYSTYPE two;                    /* address of right operand's rule value */
{
    /*
    ** Indicate failure if either argument is NULL.
    */
    if (one == NULL || two == NULL)
        return FALSE;

    /*
    ** Prepare both operands for use.
    */
    prepareForUse(one);
    prepareForUse(two);

    /*
    ** Before attempting to compare the types of the operands,
    ** generate PII to convert any boolean operand to a signed integer.
    */
    if (strcmp(one->type, Boolean) == 0)
        (void) convertType(one, SignedInt);

    if (strcmp(two->type, Boolean) == 0)
        (void) convertType(two, SignedInt);

    /*
    ** If either value is a pointer and the other is an integer constant,
    ** convert the integer constant to the pointer type.
    */
    if (*one->type == '*' &&
      two->value[strspn(two->value, INT_CONSTANT_CHARS)] == '\0')
        return convertType(two, one->type);

    if (*two->type == '*' &&
      one->value[strspn(one->value, INT_CONSTANT_CHARS)] == '\0')
        return convertType(one, two->type);

    /*
    ** If both values are of the same type, and that type is not an integral
    ** type (which might need promotion), we are done.
    */
    if (strcmp(one->type, two->type) == 0 && !isIntegralType(one->type))
        return TRUE;

    /*
    ** If both values are pointers (but to different types) then convert
    ** both to void pointers.
    */
    if (*one->type == '*' && *two->type == '*')
        return convertType(one, "*void") && convertType(two, "*void");

    /*
    ** If either value is long double, convert the other to long double.
    */
    if (strcmp(one->type, LongDouble) == 0) {
        return convertType(two, LongDouble);

    } else if (strcmp(two->type, LongDouble) == 0) {
        return convertType(one, LongDouble);
    }

    /*
```

```
** If either value is double, convert the other to double.
*
if (strcmp(one->type, Double) == 0) {
    return convertType(two, Double);

} else if (strcmp(two->type, Double) == 0) {
    return convertType(one, Double);
}

/*
** If either value is float, convert the other to float.
*
if (strcmp(one->type, Float) == 0) {
    return convertType(two, Float);

} else if (strcmp(two->type, Float) == 0) {
    return convertType(one, Float);
}

/*
** If either value is unsigned long, convert the other to unsigned long.
*
if (strcmp(one->type, UnsignedLong) == 0) {
    return convertType(two, UnsignedLong);

} else if (strcmp(two->type, UnsignedLong) == 0) {
    return convertType(one, UnsignedLong);
}

/*
** If one value is signed long and the other is unsigned int, then
** convert the unsigned int to signed long providing sizeof(long) >
** sizeof(int); otherwise, convert both to unsigned long.
*/
if (strcmp(one->type, SignedLong) == 0 &&
  strcmp(two->type, UnsignedInt) == 0) {
    if (sizeOfLong > sizeOfInt) {
        return convertType(two, SignedLong);

    } else {
        return convertType(one, UnsignedLong) &&
          convertType(two, UnsignedLong);
    }

} else if (strcmp(one->type, UnsignedInt) == 0 &&
  strcmp(two->type, SignedLong) == 0) {
    if (sizeOfLong > sizeOfInt) {
        return convertType(one, SignedLong);

    } else {
        return convertType(one, UnsignedLong) &&
          convertType(two, UnsignedLong);
    }
}

/*
** If either value is signed long, convert the other to signed long.
*/
if (strcmp(one->type, SignedLong) == 0) {
    return convertType(two, SignedLong);

} else if (strcmp(two->type, SignedLong) == 0) {
    return convertType(one, SignedLong);
}

/*
```

```
    ** If either value is unsigned int, convert the other to unsigned int.
    */
    if (strcmp(one->type, UnsignedInt) == 0) {
        return convertType(two, UnsignedInt);
    } else if (strcmp(two->type, UnsignedInt) == 0) {
        return convertType(one, UnsignedInt);
    }

    /*
    ** Perform integral promotions on both values.
    */
    if (!promote(one))
        return FALSE;    /* operand one does not have an integral type */

    if (!promote(two))
        return FALSE;    /* operand two does not have an integral type */

    /*
    ** If either value is unsigned int, convert the other to unsigned int.
    */
    if (strcmp(one->type, UnsignedInt) == 0) {
        return convertType(two, UnsignedInt);
    } else if (strcmp(two->type, UnsignedInt) == 0) {
        return convertType(one, UnsignedInt);
    }

    /*
    ** Promotion must have caused both values to become signed integers.
    */
    return TRUE;
}

/*
** Function "convertType" generates the required PIL code to change the
** type of a rule value.
*/
BOOL                         /* TRUE if conversion successful */
convertType(ruleValue, newType)
    YYSTYPE  ruleValue;      /* address of rule value to be converted */
    char    *newType;        /* desired new type for rule value */
{
    char *diagnostic;        /* an error message */
    char *newValue;          /* value string for rule after conversion */

    /*
    ** Indicate failure if either argument is NULL.
    */
    if (ruleValue == NULL || newType == NULL)
        return FALSE;

    /*
    ** Prepare the rule value for use.
    */
    prepareForUse(ruleValue);

    /*
    ** Attempt to convert the value.
    */
    newValue = transformValue(ruleValue->value, ruleValue->type, newType);

    /*
    ** If the conversion failed, issue a diagnostic. Other store the new
```

```c
    ** value and type in the rule value.
    */
    if (newValue == NULL) {
        diagnostic = catenate4(NoSep, "Unable to convert type from ",
            ruleValue->type, " to ", newType);
        warning(curFileNum, curLineNum, diagnostic);
        freeString(diagnostic);
        return FALSE;

    } else {
        freeString(ruleValue->value);
        freeString(ruleValue->type);
        ruleValue->value = newValue;
        ruleValue->type = newString(DUP, newType);
        return TRUE;
    }
}

/*
** Function "countCaptureBlockLines" returns the number of lines of PIL
** in the active capture block.  If there is no active capture block,
** zero is returned.
*/
long
countCaptureBlockLines()
{
    int  captureChar;         /* a character from the capture file */
    long endOfBlock;          /* file position of end of capture block */
    long filePos;             /* file position of "captureChar" */
    long lines;               /* number of lines in the capture file */

    /*
    ** If no capture block file has been established, return 0.
    */
    if (captureBlockFile == NULL)
        return 0L;

    lines = 0;
    endOfBlock = ftell(captureBlockFile);

    if (fseek(captureBlockFile, 0L, SEEK_SET) != 0)
        fatalError(curFileNum, curLineNum,
            "Unable to rewind PIL capture block file.");

    /*
    ** Count the number of newlines in the active PIL capture file.
    */
    for (filePos = 0; filePos < endOfBlock; filePos += 1) {
        captureChar = fgetc(captureBlockFile);

        if (captureChar == EOF)
            fatalError(curFileNum, curLineNum,
                "Unable to read PIL capture block file.");

        if (captureChar == '\n')
            lines += 1;
    }

    /*
    ** Restore the file position in the capture file
    */
    if (fseek(captureBlockFile, endOfBlock, SEEK_SET) != 0)
        fatalError(curFileNum, curLineNum,
            "Unable to position PIL capture block file.");
```

```
    return lines;
}

/*
** Function "createLabel" build a PIL label string on the heap in
** the following format:
**
**            LABEL name 0.n
**               where name = the label identifier, and
**                     n = block level of the current function
**
** It is the responsibility of the caller to free the allocated string.
*/
char *                                  /* Label string */
createLabel(name)
    char *name;                         /* label name */
{
    char *functionNum;                  /* function number */
    char *label;                        /* the label string */

    functionNum = intToString(blockNum[1]);
    label = catenate4(NoSep, "LABEL ", name, " 0.", functionNum);
    freeString(functionNum);
    return label;
}


/*
** Function "declareSymbols" declares (i.e., places in the symbol table and
** emits "var" directives for) the symbols specified in a list of symbol
** declarations that are separated by semicolons.  A semicolon at the end
** of the list is optional.  Each declaration consists of an optional symbol
** name, followed by a colon, followed by optional indirections, followed by
** an optional storage class, followed by one or more type specifiers,
** optionally followed by an equal sign and an initializer.  The format of
** the initializer is the same as that present in the C source, except that
** each initializer value is prefixed by a parenthesized type specification
** for the initializer value and unneeded spaces are generally suppressed.
** Spaces are accepted between consecutive fields, but are not required except
** between two consecutive alphanumeric fields.  Thus a typical declaration
** list might be:
**
**     i:*[5]static int=(int)0;c:enum Color{R,G,B};time:typedef unsigned long
**
** When a declaration contains multiple type specifiers, they must be in the
** order of one of the standard types (such as SignedInt or LongDouble)
** defined in "parser.h" (i.e., "normalizeDeclSpecifiers" should have been
** previously called to normalize the type specification).
*/
void
declareSymbols(declarations)
    char *declarations;                 /* declarations of symbol(s) to be defined */
{
    char        *arraySize;             /* number of elements in an array */
    char        *block;                 /* block number for a container type */
    char        *cursor;                /* cursor for "declarations" */
    char        *field;                 /* copy of a declaration field */
    int          fieldWidth;            /* width of a declaration field */
    char        *indirections;          /* indirections for a symbol */
    char        *initializer;           /* initializer for a symbol */
    int          initializerCnt;        /* number of top-level initializer values */
    BOOL         isFunction;            /* TRUE if a symbol is a function */
    BOOL         isPointer;             /* TRUE if a symbol is a pointer */
    BOOL         isTypedef;             /* TRUE if a declaration is a typedef */
    long         implicitArrayBnd;      /* calculated value of implicit array bound */
```

```
char            *name;                  /* name of a symbol being declared */
char            *oldIndirections;       /* previous value of "indirections" */
char            *specifiers;            /* type specifiers for a symbol */
char            *startOfInitializer;    /* start of initializer in declaration */
char            *startOfSpecifiers;     /* start of type specifiers in declaration */
char            *storageClass;          /* storage class for a symbol */
StorageClass    tmpStorageClass;        /* enumerated value of storageClass */
char            *type;                  /* type of a symbol to be initialized */
SymInfo         *sym;                   /* most recent symbol with this name */

if (declarations == NULL)
    declarations = "";          /* treat NULL declarations as empty */

cursor = declarations;

while (*cursor != '\0') {
    /*
    ** Find start of next declaration.
    */
    cursor += strspn(cursor, " ;");         /* skip over delimiters */

    /*
    ** If the cursor is at the end of the string or if the symbol is an
    ** ellipsis ("..."), there are no further declarations to be found.
    */
    if (*cursor == '\0' || strncmp(cursor, "...", sizeof("...") - 1) == 0)
        break;          /* declarations exhausted */

    /*
    ** Extract symbol's name (if any).
    */
    if (*cursor == ':') {
        name = NULL;
        cursor += 1;                        /* skip over ':' */
    }
    else {
        fieldWidth = firstFieldWidth(cursor);
        name = newString(fieldWidth, cursor);
        cursor += fieldWidth;
        cursor += strspn(cursor, " ");      /* skip over delimiters */

        if (*cursor == ':')
            cursor += 1;                    /* skip over ':' */
    }

    cursor += strspn(cursor, " ");  /* skip over delimiters */

    /*
    ** Extract indirections (if any).  An empty array specification is
    ** only valid as the first indirection, so change any other occurrence
    ** to a pointer.
    */
    indirections = NULL;
    isFunction = FALSE;
    isPointer = FALSE;

    while (*cursor == '*' || *cursor == '[' || *cursor == '(') {
        fieldWidth = firstFieldWidth(cursor);
        field = newString(fieldWidth, cursor);
        oldIndirections = indirections;

        if (field[0] == '[' && field[1] == ']' && oldIndirections != NULL)
            indirections = catenate2(NoSep, oldIndirections, "*");
        else
            indirections = catenate2(NoSep, oldIndirections, field);
```

```
    if (!isFunction && indirections[strlen(indirections) - 1] == '*')
        isPointer = TRUE;
    else if (!isPointer && *cursor == '(')
        isFunction = TRUE;

    freeString(oldIndirections);
    freeString(field);
    cursor += fieldWidth;                   /* skip over indirection */
    cursor += strspn(cursor, " ");          /* skip over delimiters */
}

/*
** Extract storage class specifier, if present.
*/
storageClass = NULL;
fieldWidth = firstFieldWidth(cursor);

if (strncmp(cursor, "auto", fieldWidth) == 0   && (tmpStorageClass = Auto) ||
  strncmp(cursor, "register", fieldWidth) == 0 && (tmpStorageClass = Register) ||
  strncmp(cursor, "static", fieldWidth) == 0   && (tmpStorageClass = Static) ||
  strncmp(cursor, "extern", fieldWidth) == 0   && (tmpStorageClass = Extern) ||
  strncmp(cursor, "typedef", fieldWidth) == 0  && (tmpStorageClass = Typedef)) {
    storageClass = newString(fieldWidth, cursor);
    cursor += fieldWidth;                   /* skip over keyword */
    cursor += strspn(cursor, " ");          /* skip over delimiters */
}

/*
** Determine the set of type specifiers that are present.  If there
** are no specifiers, assume "int".
*/
startOfSpecifiers = cursor;

while (*cursor != '=' && *cursor != ';' && *cursor != '\0')
    cursor += firstFieldWidth(cursor);

if (cursor == startOfSpecifiers)
    specifiers = newString(DUP, SignedInt);
else
    specifiers = newString(cursor - startOfSpecifiers,
      startOfSpecifiers);

/*
** Extract initializer, if one is present.
*/
initializer = NULL;
initializerCnt = 0;

if (*cursor == '=') {
    cursor += 1;                        /* skip over '=' */
    cursor += strspn(cursor, " ");      /* skip over any spaces */
    startOfInitializer = cursor;

    if (*cursor == '{') {
        cursor += 1;                    /* skip over '{' */
        cursor += strspn(cursor, " ");  /* skip over any spaces */

        while (*cursor != '}' && *cursor != '\0') {
            initializerCnt += 1;
            cursor += firstFieldWidth(cursor);
            cursor += strspn(cursor, " ,");     /* skip delimiters */
        }

        if (*cursor == '}')
            cursor += 1;                /* skip over '}' */
```

```
} else {
    initializerCnt = 1;

    while (*cursor != ';' && *cursor != '\0')
        cursor += firstFieldWidth(cursor);
}

if (initializerCnt > 0)
    initializer = newString(cursor - startOfInitializer,
      startOfInitializer);


/*
** If no name was given, then check if this is an incomplete
** declaration of a structure or union.  If so, add an empty
** definition for it to the symbol table to mask references
** to any definition for the same symbol in an outer scope.
*/
if (name == NULL) {
    if (strncmp(specifiers, "struct ", sizeof("struct ") - 1) == 0 ||
      strncmp(specifiers, "union ", sizeof("union ") - 1) == 0) {
        name = specifiers + strcspn(specifiers, " ");
        name += strspn(name, " ");
        block = name + strcspn(name, " ");
        block += strspn(block, " ");

        if (atoi(block) != blockIdx) {
            name = newString(firstFieldWidth(name), name);
            defineStructOrUnion(*specifiers, name, "");
            freeString(name);
        }

        name = NULL;
    }

/*
** If a name was given, then define the symbol in the Objects
** namespace and emit any required initialization code.
*/
} else {
    /*
    ** If there is an initializer, emit the PIL for it before
    ** defining the symbol so that if the symbol has an implicit
    ** array bound, we can convert it to an explicit bound before
    ** defining the symbol.  Since the initialization PIL must
    ** follow the symbol's PIL declaration, we must save the
    ** initialization PIL in a capture block.
    */
    if (initializerCnt > 0) {
        startCaptureBlock();
        type = catenate2(NoSep, indirections, specifiers);
        implicitArrayBnd = initializeVariable(name, type,
          initializer);
        freeString(type);
        capturePIL = FALSE;

    } else {
        implicitArrayBnd = 0;
    }

    /*
    ** If the symbol has an implicit array bound, either convert
    ** it to an explicit array bound (if we know the size) or to
    ** a pointer indirection.
    */
```

```
if (indirections != NULL &&
  strncmp(indirections, "[]", sizeof("[]") - 1) == 0) {
    oldIndirections = indirections;

    if (implicitArrayBnd > 0) {
        arraySize = longToString(implicitArrayBnd);
        indirections = catenate3(NoSep, "[", arraySize,
          oldIndirections + 1);
        freeString(arraySize);

    } else {
        indirections = catenate2(NoSep, "*", oldIndirections + 2);
    }

    freeString(oldIndirections);
}

/*
** Add the symbol to the symbol table.
*/
if (storageClass == NULL)
    if (isFunction || blockIdx == 0) tmpStorageClass = Extern;
    else                             tmpStorageClass = Auto;

isTypedef = (tmpStorageClass == Typedef);
sym = findSymbolInfo(name, Objects, MAX_LEVELS);
if (sym != NULL && sym->blockIdx == blockIdx) {
    if (blockIdx != 0) {
        char *diagnostic;
        diagnostic =
            catenate3(NoSep, "Multiple declaration of local symbol '", name, "'")
        warning(curFileNum, curLineNum, diagnostic);
        freeString(diagnostic);
    }
    else if (tmpStorageClass != sym->storageClass) {
        char *diagnostic;
        sym->storageClass = Static;
        diagnostic =
            catenate3(NoSep, "Multiple declaration of global symbol '", name,
                "' with conflicting linkages");
        warning(curFileNum, curLineNum, diagnostic);
        freeString(diagnostic);
    }
}
else {
    defineObject(name, tmpStorageClass, indirections, specifiers);

    /*
     ** If the object is not a typedef, then emit a PIL "var"
     ** directive to describe the object.
     */
    if (!isTypedef && blockIdx != 0) {
        SymInfo *sym = findSymbolInfo(name, Objects, MAX_LEVELS);

        sym->pilWritten = TRUE;
        writeVar(name, sym->type);
    }
}

/*
** If the symbol has an initializer, dispose of the capture
** block that holds the PIL initialization code.  If the
** storage class is "static", the PIL initialization code is
** discarded (as PIL does not support static initialization);
** otherwise, it is copied to the PIL output file.
*/
```

```
        if (initializerCnt > 0) {
            if (storageClass != NULL && tmpStorageClass == Static)
                (void) terminateCaptureBlock(Discard);
            else
                (void) terminateCaptureBlock(Emit);
        }

        /*
        ** Cleanup in preparation for the next declaration.
        */
        freeString(name);
        freeString(indirections);
        freeString(storageClass);
        freeString(specifiers);
        freeString(initializer);
    }
}

/*
** Function "defineEnum" adds an "enum" definition to the symbol table's Tags
** namespace.  The members of the enumeration are added to the symbol table's
** Others namespace.  A definition is a brace-enclosed series of identifiers
** that are optionally followed by an equal-sign and a decimal integer, and
** which are separated by commas.  Spaces may (but typically do not) appear
** between tokens.  Thus a typical definition might be:
**
**      "{Red=1,Orange,Yellow,Green,Blue,Indigo,Violet}"
*/
void
defineEnum(tag, definition)
    char *tag;                  /* enumeration's name (must not be NULL) */
    char *definition;           /* enumeration's definition (not NULL) */
{
    char    *cursor;            /* cursor for "definition" */
    long     enumeratorValue;   /* integer value of an enumerator */
    int      fieldWidth;        /* width of a field in "definition" */
    char    *name;              /* a symbol table name */
    SymInfo *symbolPtr;         /* info for a symbol table entry */
    char    *type;              /* type of an enumerator */
    char    *value;             /* value of an enumerator */

    if (tag == NULL)
        tag = "";               /* treat NULL tag as empty */

    if (definition == NULL)
        definition = "";        /* treat NULL definition as empty */

    /*
    ** This definition may have already been entered into the symbol table,
    ** in which case there is no use in doing it again.
    */
    name = catenate2(PartSep, "enum", tag);
    symbolPtr = findSymbolInfo(name, Tags, MAX_LEVELS);

    if (symbolPtr != NULL && symbolPtr->blockIdx == blockIdx &&
        strcmp(symbolPtr->type, type) == 0) {    /* already defined */
        freeString(name);
        return;
    }

    /*
    ** Add the enumeration to the Tags namespace, using "enum" followed by
    ** the tag for the name and the definition for the type.
```

```
    */
    defineSymbol(name, Tags, None, definition);
    freeString(name);

    /*
    ** Add the members of the enumeration to the Objects namespace, using a
    ** type of "enum TAG N" for the type (where "TAG" is the enumeration's
    ** tag name and "N" is the value of the enumerator).
    */
    cursor = definition;
    enumeratorValue = 0;

    while (*cursor != '\0') {
        cursor += strspn(cursor, "{ ,}");           /* skip over delimiters */

        if (*cursor == NULL)
            break;      /* definition exhausted */

        fieldWidth = firstFieldWidth(cursor);
        name = newString(fieldWidth, cursor);
        cursor += fieldWidth;                       /* skip over name */
        cursor += strspn(cursor, " ");              /* skip over delimiters */

        if (*cursor == '=') {
            cursor += 1;                            /* skip over '=' */
            cursor += strspn(cursor, " ");          /* skip over delimiters */

            if (isdigit(*cursor) || *cursor == '+' || *cursor == '-') {
                enumeratorValue = atol(cursor);
                cursor += strspn(cursor, "+-0123456789");
            }
        }

        value = intToString(enumeratorValue);
        type = catenate3(FullSep, "enum", tag, value);
        defineSymbol(name, Objects, Enum, type);
        freeString(type);
        freeString(value);
        freeString(name);
        enumeratorValue += 1;
    }
}


/*
** Function "defineObject" adds a symbol to the Objects namespace of the
** symbol table.
*/
void
defineObject(name, storageClass, indirections, specifiers)
    char *name;                 /* name of symbol to be declared */
    StorageClass storageClass;  /* storageClass of Object being declared */
    char *indirections;         /* indirections for symbol */
    char *specifiers;           /* type specifiers for symbol */
{
    char *type;                 /* type of symbol */


    /*
    ** Check that we have been given both a name and type specifiers.
    */
    if (name == NULL || *name == '\0' || specifiers == NULL ||
      *specifiers == '\0')
        return;

    /*
```

```
    ** Add the symbol to the symbol table.
    */
    if (storageClass == Typedef)
        type = catenate3(PartSep, "typedef", indirections, specifiers);
    else
        type = catenate2(PartSep, indirections, specifiers);

    defineSymbol(name, Objects, storageClass, type);
    freeString(type);
}


/*
** Function "defineStructOrUnion" adds a "struct" or "union" definition to
** the Tags namespace and emits the associated PIL type definition.
*/
void
defineStructOrUnion(kind, tag, definition)
    int   kind;                     /* 's' for a struct and 'u' for a union */
    char *tag;                      /* struct or union's tag name (not NULL) */
    char *definition;               /* struct or union's definition (not NULL) */
{
    char    *name;                  /* a symbol table name */
    SymInfo *symbolPtr;             /* info for a symbol table entry */


    /*
    ** Just return if arguments are obviously invalid.
    */
    if (kind != 's' && kind != 'u')
        return;                     /* neither a struct nor a union */

    if (tag == NULL || tag[strspn(tag, " ")] == '\0')
        return;                     /* no tag */

    /*
    ** This definition may have already been entered into the symbol table,
    ** in which case there is no use in doing it again.
    */
    if (kind == 's')
        name = catenate2(PartSep, "struct", tag);
    else
        name = catenate2(PartSep, "union", tag);

    symbolPtr = findSymbolInfo(tag, Tags, MAX_LEVELS);

    if (symbolPtr != NULL && symbolPtr->blockIdx == blockIdx &&
      strcmp(symbolPtr->type, definition) == 0) {        /* already defined */
        freeString(name);
        return;
    }

    /*
    ** Add the struct or union to the Tags namespace, using "struct" or
    ** "union" followed by the tag for the name and the definition for the
    ** type.
    */
    defineSymbol(name, Tags, None, definition);

    /*
    ** Emit a PIL type definition for the structure or union.
    */
    writeTypeDefinition(name);
    freeString(name);
}
```

```
/*
** Function "defineSymbol" attempts to add a new symbol to the symbol table
** at the head of the appropriate symbol chain.  (Inserting at the head of
** the symbol chain masks any previous definition(s) of a symbol with the
** same name from the symbol table searching routines until the new symbol
** is deleted.)
*/
BOOL                              /* TRUE if symbol added to symbol table */
defineSymbol(name, nameSpace, storageClass, type)
    char         *name;           /* name of symbol (must not be NULL) */
    NameSpace    nameSpace;       /* name space to which symbol belongs */
    StorageClass storageClass;    /* storage class of symbol */
    char         *type;           /* type of symbol (may be NULL) */
{
    unsigned hashIdx;             /* hash index for symbol */
    SymInfo *symbolPtr;           /* symbol info ptr */


    if (name == NULL || *name == '\0')
        return FALSE;    /* don't accept nameless symbols */

    hashIdx = hash(name, CALC_LEN, HASH_TBL_SIZE);
    symbolPtr = newSymbol(name, nameSpace, storageClass, type);
    symbolPtr->siblingPtr = hashTbl[hashIdx];
    hashTbl[hashIdx] = symbolPtr;
    return symbolPtr != NULL;
}


/*
** Function "discardSymbols" discards from the symbol table all symbols
** from a specified name space that were declared in the current block or
** any of its descendants.
*/
void
discardSymbols(nameSpace)
    NameSpace nameSpace;          /* name space: Labels, Objects or Tags */
{
    int      hashIdx;             /* hashTbl array index */
    SymInfo *nextSymbolPtr;       /* location of successor of *symbolPtr */
    SymInfo *prevSymbolPtr;       /* location of predecessor of *symbolPtr */
    SymInfo *symbolPtr;           /* location of a symbol */


    /*
    ** Walk the symbol table, discarding symbols in the specified name
    ** space whose block level index is greater than or equal to the
    ** currently active block's level index.
    */
    for (hashIdx = 0; hashIdx < HASH_TBL_SIZE; hashIdx += 1) {
        prevSymbolPtr = NULL;

        for (
          symbolPtr = hashTbl[hashIdx];
          symbolPtr != NULL;
          symbolPtr = nextSymbolPtr) {
            nextSymbolPtr = symbolPtr->siblingPtr;

            if (symbolPtr->nameSpace == nameSpace &&
              symbolPtr->blockIdx >= blockIdx) {       /* discard symbol */
                if (prevSymbolPtr == NULL)
                    hashTbl[hashIdx] = symbolPtr->siblingPtr;
                else
                    prevSymbolPtr->siblingPtr = symbolPtr->siblingPtr;
```

BEST AVAILABLE COPY

```
            freeSymbol(symbolPtr);
        } else {        /* retain symbol */
            prevSymbolPtr = symbolPtr;
        }
```

jcomuzzi@pss2

~~c2pil.c~~
TNS_e2h.c

SPARCprinter
Fri Oct 27 17:42:22 1995

NeWSprint 2.0
Openwin library 3
NeWSprint interpreter 3.000

NeWSprint 2.0

```
/****************************************************************/
/*                                                              */
/*      Copyright (c) 1995 Peritus Software Services, Inc.     */
/*        All Rights Reserved                                   */
/*                                                              */
/*      THIS IS UNPUBLISHED PROPRIETARY SOURCE CODE OF          */
/*      Peritus Software Services, Inc.                         */
/*                                                              */
/*      This program contains confidential and proprietary      */
/*      information of Peritus Software Services, Inc., and     */
/*      any reproduction, disclosure, or use in whole or in     */
/*      part is expressly prohibited, except as may be          */
/*      specifically authorized by prior written agreement or   */
/*      permission of Peritus.                                  */
/*                                                              */
/*      The copyright notice above does not evidence any        */
/*      actual or intended publication of such source code.     */
/*                                                              */
/****************************************************************/
```

```
/*
** This file contains those "c2pil" support functions whose name begin with
** the letters "e" through "h".
*/

#include <ctype.h>
#include <stdio.h>
#include <stdlib.h>
#include <string.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "scanner.h"
#include "tokens.h"


/*
**
** If both operands are integer constants, then the expression can be
** evaluated to a single constant.  If the operation defines a function
** that is not supported directly in PIL, then the operation is replaced
** by a PIL function call.  If one or both operands are not integer
** constants, and the operation is defined for PIL, then the operands
** are concatenated around the operator.
*/
YYSTYPE                                     /* result of expression */
evalBinaryExpr(leftOp, operation, rightOp)
    YYSTYPE leftOp;                         /* left operand */
    int     operation;                      /* operator code */
    YYSTYPE rightOp;                        /* right operand */
{
    char   *base;                           /* base address of a pointer expr */
    long    byteCnt;                        /* a byte count */
    char   *diagnostic;                     /* an error message */
    long    expr;                           /* constant value of expression */
    BOOL    forcePrecision;                 /* TRUE wraps expr. with trans. func */
    BOOL    incompatible;                   /* TRUE if operands incompatible */
    char   *leftType;                       /* type of left operand */
    char   *leftValue;                      /* value of left operand */
    char   *newValue;                       /* a value string */
```

```
char    *offset;                    /* offset in a pointer expression */
char    *oldLeftType;               /* original type of left operand */
char    *oldRightType;              /* original type of right operand */
char    *operator;                  /* name of operator */
char    *reducedLeftValue;          /* simplification of left value */
char    *reducedRightValue;         /* simplification of right value */
YYSTYPE result;                     /* result of expression */
char    *resultType;                /* type of result */
char    *rightType;                 /* type of right operand */
char    *rightValue;                /* value of right operand */
char    *typeSize;                  /* size of a type */

/*
** A transfer function wrapper (cast) is only required for
** '+', '-', '*' and '/' operators, and only when one or both
** operands are not constants.
*/
forcePrecision = FALSE;

/*
** Determine name of operator in case we have to issue a diagnostic.
*/
switch (operation) {

case LEFT_OP:
    operator = "<<";
    break;

case RIGHT_OP:
    operator = ">>";
    break;

case '+':
    operator = "+";
    break;

case '-':
    operator = "-";
    break;

case '*':
    operator = "*";
    break;

case '/':
    operator = "/";
    break;

case '%':
    operator = "%";
    break;

case '&':
    operator = "&";
    break;

case '^':
    operator = "^";
    break;

case '|':
    operator = "|";
    break;

default:
    fatalError(0, 0, "Invalid operator passed to evalBinaryExpr.");
```

```
if (incompatible) {
    diagnostic = catenate4(NoSep, "Operands of ", operator,
      " operator are incompatible.");
    warning(leftOp->fileNum, leftOp->lineNum, diagnostic);
    freeString(diagnostic);
    return newRuleValue(leftOp->fileNum, leftOp->lineNum, SignedInt, "0");
}

/*
** Record the types of the operands before any promotions or conversions
** take place.
*/
oldLeftType = newString(DUP, leftType);
oldRightType = newString(DUP, rightType);

/*
** If the operation is a shift, record that the result type is that of
** the left operand.
*/
if (operation == LEFT_OP || operation == RIGHT_OP) {
    resultType = leftType;

/*
** If the operation is not a shift, convert the operands to the same type
** and record that the result type is that common type.
*/
} else if ((*leftType == '*' || *leftType == '[') &&
  (*rightType == '*' || *rightType == '[')) {
      resultType = SignedInt;        /* must be pointer - pointer */

} else if (*leftType == '*' || *leftType == '[') {
    byteCnt = sizeOfType(locateContentsType(leftType));

    if (byteCnt == 1) {
        rightValue = newString(DUP, rightValue);

    } else if (rightValue[strspn(rightValue, INT_CONSTANT_CHARS)] == '\0') {
        rightValue = longToString(byteCnt*atol(rightValue));

    } else {
        typeSize = longToString(byteCnt);

        if (isAtomic(rightValue))
            rightValue = catenate3(FullSep, typeSize, "*", rightValue);
        else
            rightValue = catenate4(FullSep, typeSize, "* (", rightValue,
              ")");

        freeString(typeSize);
    }

    freeString(rightOp->value);
    rightOp->value = rightValue;
    resultType = leftType;

} else if (*rightType == '*' || *rightType == '[') {
    byteCnt = sizeOfType(locateContentsType(rightType));

    if (byteCnt == 1) {
        leftValue = newString(DUP, leftValue);

    } else if (leftValue[strspn(leftValue, INT_CONSTANT_CHARS)] == '\0') {
        leftValue = longToString(byteCnt*atol(leftValue));

    } else {
        typeSize = longToString(byteCnt);
```

```
                if (isAtomic(leftValue))
                    leftValue = catenate3(FullSep, typeSize, "*", leftValue);
                else
                    leftValue = catenate4(FullSep, typeSize, "* (", leftValue,
                        ")");

                freeString(typeSize);

            freeString(leftOp->value);
            leftOp->value = leftValue;
            resultType = rightType;
        }
        else {
            convertToCommonType(leftOp, rightOp);
            leftType = leftOp->type;
            leftValue = leftOp->value;
            rightType = rightOp->type;
            rightValue = rightOp->value;
            resultType = leftType;
        }

        /*
        ** If both operands are constants, evaluate the expression.
        */
        if (leftValue[strspn(leftValue, INT_CONSTANT_CHARS)] == '\0' &&
            rightValue[strspn(rightValue, INT_CONSTANT_CHARS)] == '\0') {

            switch (operation) {

            case LEFT_OP:   /* left shift */
                expr = convertStrToBin(leftValue) << convertStrToBin(rightValue);
                break;

            case RIGHT_OP:  /* right shift */
                expr = convertStrToBin(leftValue) >> convertStrToBin(rightValue);
                break;

            case '+':
                expr = convertStrToBin(leftValue) + convertStrToBin(rightValue);
                break;

            case '-':
                expr = convertStrToBin(leftValue) - convertStrToBin(rightValue);

                if ((*leftType == '*' || *leftType == '[') &&
                    (*rightType == '*' || *rightType == '['))
                    expr = expr / sizeOfType(locateContentsType(leftType));

                break;

            case '*':
                expr = convertStrToBin(leftValue) * convertStrToBin(rightValue);
                break;

            case '/':
                expr = convertStrToBin(leftValue) / convertStrToBin(rightValue);
                break;

            case '%':
                expr = convertStrToBin(leftValue) % convertStrToBin(rightValue);
                break;

            case '&':
                expr = convertStrToBin(leftValue) & convertStrToBin(rightValue);
```

```
        break;

    case '^':
        expr = convertStrToBin(leftValue) ^ convertStrToBin(rightValue);
        break;

    case '|':
        expr = convertStrToBin(leftValue) | convertStrToBin(rightValue);
        break;
    }

    newValue = setConstantPrecision(expr, leftOp->type);

/*
** One or both operands are not integer constants, so there is
** no folding to be done.  Operations not defined in PIL are
** replaced with their PIL function equivalent.
*/
} else {

    switch (operation)

    case LEFT_OP:    /* Left Shift "<<" */
        newValue = (*resultType == 'u') ?
          catenate5(FullSep, "_luShift (", leftValue, ",", rightValue, ")") :
          catenate5(FullSep, "_lShift (", leftValue, ",", rightValue, ")");
        break;

    case RIGHT_OP:   /* Right Shift ">>" */
        newValue = (*resultType == 'u') ?
          catenate5(FullSep, "_ruShift (", leftValue, ",", rightValue, ")") :
          catenate5(FullSep, "_rShift (", leftValue, ",", rightValue, ")");
        break;

    case '+':
        /*
        ** If the result is a pointer type, then remove any parens from
        ** the base addr to simplify subsequent use in a "_Mem".  (This
        ** is safe since addition is a lowest priority PIL operator
        ** that can appear in a pointer expression.)
        */
        if (*resultType == '*' || *resultType == '[') {
            if (*rightType == '*' || *rightType == '[') {
                base = unparenthesize(rightValue);
                offset = leftValue;

            } else {
                base = unparenthesize(leftValue);
                offset = rightValue;
            }

            newValue = catenate3(FullSep, base, "+", offset);
            freeString(base);

        /*
        ** If neither operand is a pointer, just emit an addition,
        ** suppressing any redundant type conversion in the arguments.
        */
        } else {
            if (isRedundantConversion(leftValue, resultType))
                reducedLeftValue = unparenthesize(leftValue +
                  strcspn(leftValue, "("));
            else
                reducedLeftValue = newString(DUP, leftValue);

            if (isRedundantConversion(rightValue, resultType))
```

```
            reducedRightValue = unparenthesize(rightValue +
                strcspn(rightValue, "("));
        else
            reducedRightValue = newString(DUP, rightValue);

        newValue = catenate3(FullSep, reducedLeftValue, "+",
          reducedRightValue);
        freeString(reducedRightValue);
        freeString(reducedLeftValue);

        /*
        ** We need to limit the result precision unless the result
        ** type is bigger than the original types of both operands.
        */
        if (isIntegralType(resultType))
            forcePrecision =
              bitSizeOfType(oldLeftType, NULL) >= bitSizeOfType(resultType, NULL) |
              bitSizeOfType(oldRightType, NULL) >= bitSizeOfType(resultType, NULL);
    }

    break;

case '-':
    /*
    ** If both operands are pointers, divide the difference by the
    ** size of the type pointed to.
    */
    if ((*leftType == '*' || *leftType == '[') &&
       (*rightType == '*' || *rightType == '[')) {
        byteCnt = sizeOfType(locateContentsType(leftType));

        if (byteCnt == 1) {
            newValue = catenate3(FullSep, leftValue, "-", rightValue);

        } else {
            typeSize = longToString(byteCnt);
            newValue = catenate6(FullSep, "(", leftValue, "-",
              rightValue, ") /", typeSize);
            freeString(typeSize);
        }

        forcePrecision = TRUE;

    /*
    ** If the result is a pointer type, then remove any parens from
    ** the base addr to simplify subsequent use in a "_Mem". (This
    ** is safe since subtraction is a lowest priority PIL operator
    ** that can appear in a pointer expression.)
    */
    } else if (*resultType == '*' || *resultType == '[') {
        if (*rightType == '*' || *rightType == '[') {
            if (isAtomic(rightValue))
                base = catenate2(FullSep, "-", rightValue);
            else
                base = catenate3(FullSep, "- (", rightValue, ")");

            offset = catenate2(FullSep, "+", leftValue);

        } else {
            base = unparenthesize(leftValue);
            offset = catenate2(FullSep, "-", rightValue);
        }

        newValue = catenate2(FullSep, base, offset);
        freeString(offset);
        freeString(base);
```

```
    *
    ** If neither operand is a pointer, just emit a subtraction.
    *
     else {
        if (isRedundantConversion(leftValue, resultType))
            reducedLeftValue = unparenthesize(leftValue +
              strcspn(leftValue, "("));
        else
            reducedLeftValue = newString(DUP, leftValue);

        if (isRedundantConversion(rightValue, resultType))
            reducedRightValue = unparenthesize(rightValue +
              strcspn(rightValue, "("));
        else
            reducedRightValue = newString(DUP, rightValue);

        newValue = catenate3(FullSep, reducedLeftValue, "-",
          reducedRightValue);
        freeString(reducedRightValue);
        freeString(reducedLeftValue);


        /*
        ** We need to limit the result precision unless the result
        ** type is bigger than the original types of both operands.
        */
        if (isIntegralType(resultType))
            forcePrecision =
              bitSizeOfType(oldLeftType, NULL) >= bitSizeOfType(resultType, NULL) ||
              bitSizeOfType(oldRightType, NULL) >= bitSizeOfType(resultType, NULL);
    }

    break;

case '&':         /* Replace bitwise AND with PIL function call */
    newValue = catenate5(FullSep, "_bAnd (", leftValue, ",", rightValue, ")");
    break;

case '^':         /* Replace bitwise XOR with PIL function call */
    newValue = catenate5(FullSep, "_bXOr (", leftValue, ",", rightValue, ")");
    break;

case '|':         /* Replace bitwise OR with PIL function call */
    newValue = catenate5(FullSep, "_bOr (", leftValue, ",", rightValue, ")");
    break;

case '*':         /* Replace unsigned multiply with PIL function call */
    if (strstr(resultType, "unsigned") != NULL)
        newValue = catenate5(FullSep,
            "_uMult (", leftValue, ",", rightValue, ")");

    else {
        newValue = catenate3(NoSep, leftValue, " * ", rightValue);

        if (isIntegralType(resultType))
            forcePrecision = TRUE;  /* Cast type to limit precision */
    }

    break;

case '/':         /* Replace unsigned divide with PIL function call */
    if (strstr(resultType, "unsigned") != NULL)
        newValue = catenate5(FullSep,
            "_uDiv (", leftValue, ",", rightValue, ")");
```

```
            else
                newValue = catenate3(NoSep, leftValue, " / ", rightValue);
            break;

        case '%':           /* Replace unsigned remainder with PIL function call */
            newValue = (strstr(resultType, "unsigned") != NULL) ?
              catenate5(FullSep, "_uRem (", leftValue, ",", rightValue, ")") :
              catenate3(NoSep, leftValue, " % ", rightValue);
            break;
        }
    }

    result = newRuleValue(leftOp->fileNum, leftOp->lineNum, resultType, NULL);

    /*
    ** Put a transfer function wrapper around any expression that might
    ** evaluate under PIL's infinite precision differently than it would
    ** evaluate in C.
    */
    if (forcePrecision) {
        result->value = wrapExpr(newValue, result->type);
        freeString(newValue);

    } else
        result->value = newValue;

    freeString(oldLeftType);
    freeString(oldRightType);
    return result;
}


/*
** Function "evalComparison" examines the two comparison operands in an
** attempt to simplify the expression before PIL generation.
**
** If both operands are integer constants, then the expression can be
** evaluated to a single constant.  Otherwise a series of PIL statements
** is generated to perform the comparison.
**
** In all cases the function returns a ruleValue allocated on the heap
** containing the result of the expression evaluation. It is the
** responsibility of the caller to free the space once it is no longer
** needed.
*/
YYSTYPE                         /* evaluated expression ruleValue */
evalComparison(leftRuleValue, operation, rightRuleValue)
    YYSTYPE  leftRuleValue;     /* left operand */
    char     *operation;        /* operator string */
    YYSTYPE  rightRuleValue;    /* right operand */
{
    char     *diagnostic;       /* diagnostic message text */
    YYSTYPE  eval;              /* evaluated expression ruleValue */
    char     *leftOp;           /* left operand value */
    int      result;            /* evaluated constant expression */
    char     *rightOp;          /* right operand value */

    /*
    ** Check operands for float type and issue a warning if found
    */
    if (isFloatingType(leftRuleValue->type) ||
      isFloatingType(rightRuleValue->type))
        warningForFloatUsage();

    /*
    ** Convert the operands to a common type
```

```
*/
if (!convertToCommonType(leftRuleValue, rightRuleValue)) {
    diagnostic = catenate5(NoSep, "Cannot convert \"",
      leftRuleValue->type, "\" and \"", rightRuleValue->type,
      "\" to a common type.");
    warning(0, 0, diagnostic);
    freeString(diagnostic);
}

/*
** Issue a warning for an undeclared variable
*/
if (strcmp(leftRuleValue->type, "void") == 0) {
    diagnostic = catenate2(FullSep, "Invalid type found for",
      leftRuleValue->value);
    warning(0, 0, diagnostic);
}

if (strcmp(rightRuleValue->type, "void") == 0) {
    diagnostic = catenate2(FullSep, "Invalid type found for",
      rightRuleValue->value);
    warning(0, 0, diagnostic);
}

if (leftRuleValue == NULL || *leftRuleValue->value == '\0')
    leftOp = "";                    /* treat NULL leftOp as empty */

else
    leftOp = leftRuleValue->value;

if (rightRuleValue == NULL || *rightRuleValue->value == '\0')
    rightOp = "";                   /* treat NULL rightOp as empty */
else
    rightOp = rightRuleValue->value;

if (operation == NULL) {
    warning(0, 0, "No operation supplied in comparison expression");
    operation = "";                 /* treat NULL operation as empty */
}

/*
** Initialize the result value
*/
eval = newRuleValue(leftRuleValue->fileNum, leftRuleValue->lineNum,
           NULL, NULL);

/*
** Determine whether both operands are constants, and evaluate the
** expression if this is so
*/
if (leftOp[strspn(leftOp, INT_CONSTANT_CHARS)] == '\0' &&
        rightOp[strspn(rightOp, INT_CONSTANT_CHARS)] == '\0') {
    result = (strcmp(operation, "< =") == 0) ?
                convertStrToBin(leftOp) <= convertStrToBin(rightOp) :
             (strcmp(operation, "> =") == 0) ?
                convertStrToBin(leftOp) >= convertStrToBin(rightOp) :
             (strcmp(operation, "<") == 0) ?
                convertStrToBin(leftOp) < convertStrToBin(rightOp) :
             (strcmp(operation, ">") == 0) ?
                convertStrToBin(leftOp) > convertStrToBin(rightOp) :
             (strcmp(operation, "=") == 0) ?
                convertStrToBin(leftOp) == convertStrToBin(rightOp) :
                convertStrToBin(leftOp) != convertStrToBin(rightOp);

    eval->value = (result == 1) ? newString(DUP, "1") : newString(DUP, "0");
    eval->type = newString(DUP, leftRuleValue->type);
```

```
    } else {         /* one or more variable operands found */
        if (leftOp[0] == '\0' && rightOp[0] == '\0') {
          warning(0, 0, "No operands in comparison operation");
          eval->value = newString(DUP, "0");
          eval->type = newString(DUP, Boolean);

        else if (leftOp[0] == '\0') {
          warning(0, 0, "Left operand missing in comparison operation");
          eval->value = newString(DUP, rightOp);
          eval->type - newString(DUP, rightRuleValue->type);

        else if (rightOp[0] == '\0') {
          warning(0, 0, "Right operand missing in comparison operation");
          eval->value = newString(DUP, leftOp);
          eval->type = newString(DUP, leftRuleValue->type);

        } else
          eval->value = catenate3(FullSep, leftOp, operation, rightOp);
          eval->type = newString(DUP, Boolean);
    }

    return eval;
}


/*
** Function "evalDotOrArrowExpr" evaluates expressions of the form "c.m"
** and "p->m", where "c" is a structure or union, "p" is the address of a
** structure or union and "m" is a member of the structure or union.  If
** the left operand does not specify a structure or union, or if the right
** operand is not a member of that structure or union, a warning is issued
** and an integer zero result is returned (since that is unlikely to cause
** further diagnostics when the returned value is subsequently used).
** Otherwise, the PIL translation of a reference to the member is returned.
*/
YYSTYPE                          /* result of the expression evaluation */
evalDotOrArrowExpr(leftOp, operation, rightOp)
    YYSTYPE leftOp;              /* left operand of the "->" expression */
    int     operation;           /* either '.' or PTR_OP */
    YYSTYPE rightOp;             /* right operand of the "->" expression */
{
    char   *container;           /* struct or union specified by "leftOp" */
    char   *cursor;              /* cursor for "definition" */
    char   *definition;          /* definition of struct or union */
    char   *diagnostic;          /* an error message */
    int     fieldWidth;          /* width of a field in "definition" */
    char   *memberName;          /* name of member specified by rightOp */
    int     memberNameLen;       /* length of member's name */
    char   *memberType;          /* start of member's type in "definition" */
    char   *operator;            /* string representation of operator */
    YYSTYPE result;              /* result of expression evaluation */
    char   *selector;            /* PIL for expression's selector */


    /*
    ** Check operands for float type and issue a warning if found
    */
    if (isFloatingType(leftOp->type) || isFloatingType(rightOp->type))
        warningForFloatUsage();

    /*
    ** Determine name of operator in case we need to issue a diagnostic.
    */
    switch (operation) {
```

```
case '.':
    operator = ".";
    break;

case PTR_OP:
    operator = "->";
    break;

default:
    fatalError(0, 0, "Invalid operator passed to evalDotOrArrowExpr.");
}

/*
** Check that the left operand specifies a structure or union.
*/
if (leftOp == NULL || leftOp->type == NULL)
    container = "";             /* no type info */
else if (operation == '.')
    container = leftOp->type;
else if (leftOp->type[0] == '*' || leftOp->type[0] == '[')
    container = leftOp->type + firstFieldWidth(leftOp->type);
else
    container = "";             /* "->" operator requires an address */

if (strncmp(container, "struct ", sizeof("struct ") - 1) != 0 &&
  strncmp(container, "union ", sizeof("union ") - 1) != 0) {
    diagnostic = catenate3(NoSep, "Left operand of ", operator,
      " operator does not specify a struct or union.");
    warning(leftOp->fileNum, leftOp->lineNum, diagnostic);
    freeString(diagnostic);
    return newRuleValue(leftOp->fileNum, leftOp->lineNum, SignedInt, "0");
}

/*
** Get the definition for the specified struct or union.
*/
definition = locateDefinition(container);

if (definition == NULL) {
    diagnostic = catenate2(FullSep, "Cannot find definition of",
      container);
    warning(leftOp->fileNum, leftOp->lineNum, diagnostic);
    freeString(diagnostic);
    return newRuleValue(leftOp->fileNum, leftOp->lineNum, SignedInt, "0");
}

/*
** Scan the definition for the specified member.
*/
if (rightOp == NULL || rightOp->value == NULL) {
    cursor = '\0';

} else {
    memberName = rightOp->value;
    memberNameLen = strlen(memberName);
    cursor = definition + strspn(definition, " ");

    while (*cursor != '\0') {
        fieldWidth = firstFieldWidth(cursor);

        if (fieldWidth == memberNameLen &&
          strncmp(cursor, memberName, memberNameLen) == 0)
            break;  /* found member in definition */

        while (*cursor != ';' && cursor != '\0') {
            cursor += firstFieldWidth(cursor);
```

```
        }
        cursor += strspn(cursor, "; ");
    }

    if (*cursor == '\0') {
        diagnostic = catenate3(NoSep, "Right operand of ", operator,
          " operator is not a member of the struct or union.");
        warning(rightOp->fileNum, rightOp->lineNum, diagnostic);
        freeString(diagnostic);
        return newRuleValue(leftOp->fileNum, leftOp->lineNum, SignedInt, "0");
    }

    /*
    ** Record the start and end locations in the definition of the member's
    ** type.
    */
    cursor = cursor + memberNameLen;      /* skip over member name */
    cursor += strspn(cursor, " ");        /* skip over any spaces */

    if (*cursor == ':')
        cursor += 1;                      /* skip over ':' */

    cursor += strspn(cursor, " ");        /* skip over any spaces */
    memberType = cursor;                  /* record start of member type */

    while (*cursor != ';' && *cursor != '}' && *cursor != '\0') {
        cursor += firstFieldWidth(cursor);
    }

    /*
    ** Return a rule value whose value field is the PIL representation of
    ** the specified member and whose type field is the type of the member.
    */
    result = newRuleValue(leftOp->fileNum, leftOp->lineNum, NULL, NULL);
    result->type = newString(cursor - memberType, memberType);

    if (operation == '.')
        selector = newString(DUP, leftOp->value);
    else
        selector = indirectRef(leftOp->value, "0", container);

    result->value = catenate3(FullSep, selector,
          (container[0] == 's') ? "." : ":", memberName);
    freeString(selector);
    return result;
}


/*
** Function "evalStringLiteral" performs any conversions on
** a string literal required by PIL and assigns the result to a
** temporary variable name which is returned as a character string.
**
** The content of the string literal will be contained between enclosing
** double quotes.  The double quotes are not interpreted as part of the
** value when converted to PIL _Mem directives.
**
** The PIL directives to declare the temporary variable and convert
** the literal string are emitted by this function.
*/
char *                              /* temporary variable name */
evalStringLiteral(literal, type)
    char *literal;                  /* string literal */
    char *type;                     /* type */
```

```
char *arraySize;              /* number of elements in an array */
char *base;                   /* address of the temporary variable */
char *baseOffset;             /* an offset from the base of the temp var */
char *directive;              /* a PIL directive */
int   length;                 /* string length */
int   offset;                 /* offset into PIL literal */
char *source;                 /* source of an assignment */
char *str;                    /* string literal copy */
char *sub;                    /* literal string subset */
char *target;                 /* target of an assignment */
char *targetType;             /* type of target of an assignment */
char *tempVar;                /* PIL temporary variable name */
int   unprintable;            /* unprintable char in the literal */

if (literal == NULL)
    literal = "";                       /* treat NULL literal as empty */

if (type == NULL)
    type = Void;                        /* treat NULL type as "void" */

/*
** Create a temporary variable to represent the string literal.  This
** temporary must be added to the symbol table in case it is used in an
** initializer (so that the initializer can determine the string size).
*/
tempVar = newTempVariable(type);
defineSymbol(tempVar, Objects, Auto, type);
base = catenate2(FullSep, "@", tempVar);

str = newString(strlen(literal), NULL);
strncpy(str, literal+1, strlen(literal)-2); /* strip enclosing quotes */
offset = length = 0;

/*
** Concatenate adjacent strings (possibly separated by whitespace)
*/
combineStrings(str);
sub = str;

/*
** Scan the literal for special characters,  represented as an
** escape sequence ( '\'octal_num, '\'hex_num, or '\'char )
** or an unprintable ascii character, and emit the PIL
** directives to assign the literal, substituting ascii values
** for all special characters found
*/
while (sub[length] != 0) {
    if (sub[length] < ' ' || sub[length] > '~') {   /* unprintable char */
        unprintable = sub[length];

        if (length > 0) {    /* emit string to this point */
            sub[length] = 0;
            baseOffset = intToString(offset);
            arraySize = intToString(length);
            targetType = catenate4(NoSep, "[", arraySize, "]", SignedChar);
            target = indirectRef(base, baseOffset, targetType);
            directive = catenate5(NoSep, "assign ", target, " = \"",
              sub, "\"");
            writePIL(directive);
            freeString(directive);
            freeString(target);
            freeString(targetType);
            freeString(arraySize);
            freeString(baseOffset);
```

```
        offset += length;
    }

    arraySize = intToString(offset);
    target = subscriptedRef(tempVar, arraySize);
    source = intToString(unprintable);
    directive = catenate4(FullSep, "assign", target, "=", source);
    writePIL(directive);
    freeString(directive);
    freeString(source);
    freeString(target);
    freeString(arraySize);
    offset += 1;
    sub += length+1;
    length = 0;
  }
  else if (unprintableEscapeSeq(&(sub[length]))) {

    if (length > 0) {     /* emit string to this point */
        sub[length] = 0;
        baseOffset = intToString(offset);
        arraySize = intToString(length);
        targetType = catenate4(NoSep, "[", arraySize, "]", SignedChar);
        target = indirectRef(base, baseOffset, targetType);
        directive = catenate5(NoSep, "assign ", target, " = \"",
          sub, "\"");
        writePIL(directive);
        freeString(directive);
        freeString(target);
        freeString(targetType);
        freeString(arraySize);
        freeString(baseOffset);
        offset += length;
    }

    length += 1;
    arraySize = intToString(offset);
    target = subscriptedRef(tempVar, arraySize);
    source = intToString(
      (sub[length] == 'a') ? 7 :        /* Alert (bell) */
      (sub[length] == 'b') ? 8 :        /* Backspace */
      (sub[length] == 'f') ? 12 :       /* Form feed */
      (sub[length] == 'n') ? 10 :       /* New line */
      (sub[length] == 'r') ? 13 :       /* Carriage return */
      (sub[length] == 't') ? 9 :        /* Horizontal tab */
      (sub[length] == 'v') ? 11 :       /* Vertical tab */
      (sub[length] == '\"') ? 34 :      /* Double quote char */
       (int) sub[length]);              /* Default: Ascii value */
    directive = catenate4(FullSep, "assign", target, "=", source);
    writePIL(directive);
    freeString(directive);
    freeString(source);
    freeString(target);
    freeString(arraySize);
    offset += 1;
    sub += length+1;
    length = 0;
  }

  else
      length += 1;
}

/*
** Emit the PIL directive to complete the string literal assignment
*/
```

```
    if (length > 0) {
        sub[length] = 0;
        baseOffset = intToString(offset);
        arraySize = intToString(length);
        targetType = catenate4(NoSep, "[", arraySize, "]",
          SignedChar);
        target = indirectRef(base, baseOffset, targetType);
        directive = catenate5(NoSep, "assign ", target, " = \"", sub, "\"");
        writePIL(directive);
        freeString(directive);
        freeString(target);
        freeString(targetType);
        freeString(arraySize);
        freeString(baseOffset);
    }

    /*
    ** Append the end-of-string character.
    */
    arraySize = intToString(offset + length);
    target = subscriptedRef(tempVar, arraySize);
    directive = catenate3(FullSep, "assign", target, "= 0");
    writePIL(directive);
    freeString(directive);
    freeString(target);
    freeString(arraySize);
    freeString(str);
    freeString(base);
    return tempVar;
}


/*
** Function "evalSubscript" converts an subscript reference into a PIL array
** reference (if the base is an array) or a PIL _Mem() function call (if
** the base is a pointer).
*/
YYSTYPE                         /* result of evaluation */
evalSubscript(leftOperand, rightOperand)
    YYSTYPE leftOperand;        /* left operand of operator */
    YYSTYPE rightOperand;       /* right operand of operator */
{
    YYSTYPE base;               /* the operand that is the base */
    long    byteCnt;            /* number of bytes in a base element */
    char    *diagnostic;        /* an error message */
    char    *elementSize;       /* size of a base element */
    YYSTYPE index;              /* the operand that is the index */
    char    *offset;            /* offset of selected element from base */
    YYSTYPE result;             /* result of the evaluation */


    /*
    ** If either operand is obviously invalid, issue a diagnostic and
    ** return the integer constant 0 as the rule value (since that is
    ** unlikely to propagate further errors).
    */
    if (leftOperand == NULL || leftOperand->type == NULL ||
      leftOperand->value == NULL || rightOperand == NULL ||
      rightOperand->type == NULL || rightOperand->value == NULL) {

        if (leftOperand == NULL || rightOperand == NULL) {
            warning(curFileNum, curLineNum,
              "Ignoring invalid subscript operation.");
            return newRuleValue(curFileNum, curLineNum, SignedInt, "0");

        } else {
```

```
        diagnostic = catenate5(NoSep,
          "Ignoring invalid subscript operation: ", leftOperand->value,
          "[", rightOperand->value, "]");
        warning(leftOperand->fileNum, leftOperand->lineNum, diagnostic);
        freeString(diagnostic);
        return newRuleValue(leftOperand->fileNum, leftOperand->lineNum,
          signedInt, "0");

}

/*
** For this to be a valid subscript operation, one operand must be
** an array name or pointer and the other must be an integral type.
** If that is not the case, issue a diagnostic and return the integer
** constant 0 as the rule value, since that is unlikely to propagate
** more errors.
*/
if ((*leftOperand->type == '[' || *leftOperand->type == '*') &&
  isIntegralType(rightOperand->type)) {
    base = leftOperand;
    index = rightOperand;

} else if ((*rightOperand->type == '[' || *rightOperand->type == '*') &&
  isIntegralType(leftOperand->type)) {
    base = rightOperand;
    index = leftOperand;

} else {
    diagnostic = catenate5(NoSep, "Ignoring invalid subscript operation: ",
      leftOperand->value, "[", rightOperand->value, "]");
    warning(leftOperand->fileNum, leftOperand->lineNum, diagnostic);
    freeString(diagnostic);
    return newRuleValue(leftOperand->fileNum, leftOperand->lineNum,
      signedInt, "0");
}

/*
** If the base is an array, translate to a PIL subscript operation;
** otherwise, translate to a PIL "_Mem" function.
*/
result = newRuleValue(leftOperand->fileNum, leftOperand->lineNum,
  base->type + firstFieldWidth(base->type), NULL);
prepareForUse(index);

if (*base->type == '[') {
    result->value = subscriptedRef(base->value, index->value);

} else {
    byteCnt = sizeOfType(result->type);

    if (byteCnt == 1) {
        offset = newString(DUP, index->value);

    } else if (index->value[strspn(index->value, INT_CONSTANT_CHARS)] ==
      '\0') {
        offset = longToString(atol(index->value)*byteCnt);

    } else {
        elementSize = longToString(byteCnt);

        if (isAtomic(index->value))
            offset = catenate3(FullSep, index->value, "*", elementSize);
        else
            offset = catenate4(FullSep, "(", index->value, ") *",
              elementSize);
```

```
            freeString(elementSize);
        }

        result->value = indirectRef(base->value, offset, result->type);
        freeString(offset);
    }

    return result;
}


/*
** Function "evalUnaryExpr" evaluates a unary expression whose operator
** is one of "&", "*", "+", "-", "~", "!", prefix "++", prefix "--",
** postfix "++" or postfix "--". The prefix operators are identified by
** a leading "b", for "before", and the postfix operators are identified
** by a leading "a", for "after" (e.g., "a++" or "b--").
**
** If the operand is an integer constant, then some expression operators
** can be evaluated to produce a new constant without an operator.
** If the operation defines a function that is not supported directly
** in PIL, then the operation is replaced by a PIL function call.  In
** all other cases the operator and the operand are concatenated.
**
** In all cases the function returns a string containing the result of
** the expression evaluation. The return string is created on the heap.
** It is the responsibility of the caller to free the space once it is
** no longer needed.
*/
YYSTYPE                                     /* result of expression */
evalUnaryExpr(operand, operation)
    YYSTYPE operand;              /* operand */
    char    *operation;           /* operator */
{
    char    *bareValue;           /* value with outside parens removed */
    char    *base;                /* base address of a pointer expression */
    char    *castName;            /* Cast transfer function for integral expr. */
    char    *cursor;              /* substring pointer */
    char    *directive;           /* a PIL directive */
    char    *expression;          /* a PIL expression */
    char    *idxStr;              /* index value as a string */
    char    *offset;              /* offset in a pointer expression */
    int      opLen;               /* value length */
    char     opString[2];         /* operator string */
    YYSTYPE result;               /* result of expression */
    char    *resultType;          /* type of result */
    char    *resultValue;         /* value of result */


    /*
    ** Check that the arguments are not obviously invalid.
    */
    if (operand == NULL)
        fatalError(0, 0, "Invalid operand passed to evalUnaryExpr.");

    if (operation == NULL ||
      (strcmp(operation, "&") != 0 && strcmp(operation, "*") != 0 &&
      strcmp(operation, "+") != 0 && strcmp(operation, "-") != 0 &&
      strcmp(operation, "~") != 0 && strcmp(operation, "!") != 0 &&
      strcmp(operation, "a++") != 0 && strcmp(operation, "a--") != 0 &&
      strcmp(operation, "b++") != 0 && strcmp(operation, "b--") != 0))
        fatalError(0, 0, "Invalid operator passed to evalUnaryExpr.");

    /*
    ** Check operand for float type and issue a warning if found
    */
```

```
if (isFloatingType(operand->type))
    warningForFloatUsage();

/*
** Translate the operation into PIL.
*/
switch (*operation) {

case '&':
    /*
    ** If there is no operand type (as will be the case when initializing
    ** a member to its structure's address), then assume "void".
    */
    if (operand->type == NULL)
        operand->type = newString(DUP, Void);

    resultType = catenate2(NoSep, "*", operand->type);
    resultValue = addressOf(operand->value, operand->type);
    break;

case '*':
    prepareForUse(operand);
    resultType = newString(DUP, locateContentsType(operand->type));

    /*
    ** Remove any outside parentheses from the operand's value.
    */
    bareValue = unparenthesize(operand->value);

    /*
    ** If the first token of the unparenthesized value is an "@" or
    ** "-", we must skip over it when looking for pointer arithmetic.
    ** If the next token of the unparenthesized value is a "+" or "-",
    ** then the base address is the "@" (if present) plus the next
    ** token and the rest of the value is an offset.
    ** Otherwise, the the whole unparenthesized value is the base
    ** address and there is no offset.
    */
    cursor = bareValue;

    if (*cursor == '@' || *cursor == ' ') {
      cursor = cursor + firstFieldWidth(cursor);
      cursor += strspn(cursor, " ");
    }

    cursor = cursor + firstFieldWidth(cursor);
    opLen = cursor - bareValue;
    cursor += strspn(cursor, " ");

    if (*cursor == '+' || *cursor == '-') {
        if (*cursor == '+') {
            cursor += 1;              /* leading "+" is redundant */
            cursor += strspn(cursor, " ");
        }

        base = newString(opLen, bareValue);
        offset = newString(DUP, cursor);

    } else {
        base = newString(DUP, bareValue);
        offset = newString(DUP, "0");
    }

    /*
    ** Create a "_Mem" call with the specified base address and offset.
    */
```

```
    resultValue = indirectRef(base, offset,
      locateContentsType(operand->type));
    freeString(offset);
    freeString(base);
    freeString(bareValue);
    break;

case '+':
    prepareForUse(operand);
    resultType = newString(DUP, operand->type);
    resultValue = newString(DUP, operand->value);    /* Ignore the '+' operator */
    break;

case '-':
    prepareForUse(operand);
    resultType = newString(DUP, operand->type);

    if (operand->value[strspn(operand->value, INT_CONSTANT_CHARS)] ==
      '\0') {
        resultValue = setConstantPrecision(-convertStrToBin(operand->value),
          operand->type);

    } else if (isIntegralType(operand->type)) {
        (void) promote(operand);
        castName = catenate2(NoSep, "_", operand->type);

        /*
        ** Replace spaces in the cast function name with underscores
        */
        while ((cursor = strchr(castName, ' ')) != NULL)
            *cursor = '_';

        resultValue = catenate5(FullSep, castName, "(", operation,
          operand->value, ")");
        freeString(castName);

    } else {
        resultValue = catenate2(FullSep, operation, operand->value);
    }

    break;

case '~':
    prepareForUse(operand);
    resultType = newString(DUP, operand->type);

    if (operand->value[strspn(operand->value, INT_CONSTANT_CHARS)] == '\0')
        resultValue = setConstantPrecision(~convertStrToBin(operand->value),
          operand->type);
    else
        resultValue = catenate3(FullSep, "_bNot (", operand->value, ")");

    break;

case '!':
    prepareForUse(operand);

    if (operand->value[strspn(operand->value, INT_CONSTANT_CHARS)] ==
      '\0') {
        resultType = newString(DUP, SignedInt);
        resultValue = (convertStrToBin(operand->value) == 0) ?
          newString(DUP, "1") : newString(DUP, "0");

      } else {
        resultType = newString(DUP, Boolean);
```

```
        if (strcmp(operand->type, Boolean) != 0) {
            convertType(operand, Boolean);
            resultValue = catenate3(FullSep, "^ (", operand->value, ")");
        }

        else
            resultValue = catenate2(FullSep, "^", operand->value);
    }

    break;

case 'a':    /* ++ or -- postfix operator (code = "a++" or "a--") */
case 'b':    /* ++ or -- prefix operator (code = "b++" or "b--") */
    prepareForUse(operand);
    resultType = newString(DUP, operand->type);

    /*
    ** For a pointer type, the increment/decrement value must be
    ** equal to the byte size of the contained type.  Otherwise the
    ** increment/decrement value is 1.
    */
    idxStr = (*operand->type == '*') ?
      longToString(sizeOfType(locateContentsType(operand->type))) :
      (isFloatingType(operand->type)) ? newString(DUP, "1.0") :
      newString(DUP, "1");

    /*
    ** For a postfix operator assign the return value to a
    ** string representing the operand prior to the increment
    ** or decrement.
    */
    if (*operation == 'a') {
        resultValue = (operation[1] == '+') ?
          catenate3(FullSep, operand->value, "-", idxStr) :
          catenate3(FullSep, operand->value, "+", idxStr);

        /*
        ** As long as this is not a pointer, wrap this expression with
        ** an explicit cast function to avoid precision differences
        ** between C and PIL.
        */
        if (isIntegralType(operand->type)) {
            expression = resultValue;
            resultValue = wrapExpr(expression, operand->type);
            freeString(expression);
        }

    } else {
        resultValue = newString(DUP, operand->value);
    }

    opString[0] = operation[1];
    opString[1] = 0;
    expression = catenate3(FullSep, operand->value, opString, idxStr);
    directive = catenate4(FullSep, "assign", operand->value, "=", expression);
    writePIL(directive);
    freeString(expression);
    freeString(directive);
    freeString(idxStr);
    break;
}

result = newRuleValue(operand->fileNum, operand->lineNum, NULL, NULL);
result->type = resultType;
result->value = resultValue;
return result;
```

```
}

/*
** Function "findSymbolInfo" searches the symbol table for a specified
** symbol and returns the location of its information (if it is found)
** or NULL.  The caller must not free the returned info, as it is the
** actual symbol info rather than a copy.
*/
SymInfo *                          /* NULL or location of symbol info */
findSymbolInfo(symbolName, nameSpace, maxBlockIdx)
    char       *symbolName;        /* symbol name (must not be NULL) */
    NameSpace  nameSpace;          /* name space to which symbol belongs */
    int        maxBlockIdx;        /* max valid block index for symbol */
{
    unsigned hashIdx;              /* hash index for symbol */
    SymInfo *symbolChain;          /* chain to search */
    SymInfo *symbolPtr;            /* cursor for symbolChain */


    if (symbolName == NULL || *symbolName == '\0')
        return NULL;               /* a name is needed */

    /*
    ** Hash the symbol name to get the hash table index of the required
    ** symbol chain.
    */
    hashIdx = hash(symbolName, CALC_LEN, HASH_TBL_SIZE);
    symbolChain = hashTbl[hashIdx];

    /*
    ** Search the specified symbol chain.
    */
    for (
      symbolPtr = symbolChain;
      symbolPtr != NULL;
      symbolPtr = symbolPtr->siblingPtr) {
        if (symbolPtr->blockIdx <= maxBlockIdx &&
          symbolPtr->nameSpace == nameSpace &&
          strcmp(symbolPtr->name, symbolName) == 0)
            break;         /* found name */
    }

    return symbolPtr;
}


/*
** Function "firstFieldWidth" calculates the width of the first field in a
** string of fields.  If the string starts with a letter, digit, '.' or '_',
** the function returns the number of consecutive such characters and '$'s
** found.  If the string starts with a '(', '[' or '{', the function returns
** the number of characters up to and including the matching ')', ']' or '}'
** (or the length of the string if there is no balanced matching character).
** Otherwise, the function returns 1, unless the string is empty, in which
** case 0 is returned.
*/
int                                /* width of first field */
firstFieldWidth(string)
    char *string;                  /* string containing fields */
{
    char endChar;                  /* complementary char to '(', '[' or '{' */
    int  endCharsNeeded;           /* number end chars needed to end field */
    int  fieldWidth;               /* width of the first field */
```

```
    if (string == NULL || string[0] == '\0') {
        fieldWidth = 0;          /* no fields in null or empty strings */

    } else if (isalnum(string[0]) || string[0] == '.' || string[0] == '_') {
        fieldWidth = 1;

        while (isalnum(string[fieldWidth]) || string[fieldWidth] == '.' ||
          string[fieldWidth] == '_' || string[fieldWidth] == '$') {
            fieldWidth += 1;
        }

    } else if (string[0] == '(' || string[0] == '[' || string[0] == '{') {
        endChar = (string[0] == '(') ? ')' : (string[0] == '[') ? ']' : '}';
        endCharsNeeded = 1;
        fieldWidth = 1;

        while (string[fieldWidth] != '\0' && endCharsNeeded > 0) {
            if (string[fieldWidth] == string[0])
                endCharsNeeded += 1;
            else if (string[fieldWidth] == endChar)
                endCharsNeeded -= 1;

            fieldWidth += 1;
        }

    } else {
        fieldWidth = 1;
    }

    return fieldWidth;
}


/*
** Function "freeRuleValue" frees the storage associated with a rule value
** that was created by "newRuleValue".
*/
void
freeRuleValue(ruleValue)
    YYSTYPE ruleValue;          /* address of rule value to discard */
{
    if (ruleValue != NULL) {
        freeString(ruleValue->value);
        freeString(ruleValue->type);
        free(ruleValue);
    }
}


/*
** Function "freeString" frees the storage associated with a string that was
** created by "newString".
*/
void
freeString(string)
    char *string;               /* address of string to discard */
{
    free(string);
}


/*
** Function "freeSymbol" frees the storage associated with a specified symbol
** information element.  It is the caller's responsibility to fix up the
** linkage in the symbol chain that contains the element to be freed, since
** we do not know who the predecessor in the chain is.
```

```
*/
void
freeSymbol(symbolPtr)
    Symbol  *symbolPtr;            /* symbol to be freed (may be NULL) */
{
    /*
    ** If no symbol is specified, just return.
    */
    if (symbolPtr == NULL)
        return;

    /*
    ** Free the storage associated with the symbol.
    */
    freeString(symbolPtr->name);
    freeString(symbolPtr->type);
    free(symbolPtr);
}


/*
** Function "hash" derives a hash table index from a specified character
** string.  If a negative length is specified for the string, its length
** is calculated using "strlen".
**
** The hash table index returned is simply the remainder obtained by
** dividing the bit pattern of the string (treated as a multibyte
** unsigned integer) by the number of elements in the hash table.  In
** order to obtain the best hash distribution with this algorithm, the
** hash table must have a prime number of elements.
*/
unsigned                        /* hash table index for string */
hash(string, stringLen, hashTblSize)
    char     *string;           /* string to be hashed */
    int       stringLen;        /* string length (-ve => NUL terminated) */
    unsigned hashTblSize;       /* number of entries in hash table */
{
    long dividend;              /* partial dividend in the division */
    int  stringIdx;             /* index of the "string" array */
    long remainder;             /* remainder from the division */


    if (stringLen < 0)
        stringLen = strlen(string);

    remainder = 0;

    for (stringIdx = 0; stringIdx < stringLen; stringIdx += 1) {
        dividend = (remainder << BITS_PER_BYTE) + (unsigned) string[stringIdx];
        remainder = dividend % hashTblSize;
    }

    return (unsigned) remainder;
}
```

```
}

/*
** Prepare operands for use.
*/
prepareForUse(leftOp);
prepareForUse(rightOp);

/*
** Extract the type and value of each operand.
*/
if (leftOp == NULL || leftOp->type == NULL)
    leftType = Void;
else
    leftType = leftOp->type;

if (leftOp == NULL || leftOp->value == NULL)
    leftValue = "??";
else
    leftValue = leftOp->value;

if (rightOp == NULL || rightOp->type == NULL)
    rightType = Void;
else
    rightType = rightOp->type;

if (rightOp == NULL || rightOp->value == NULL)
    rightValue = "??";
else
    rightValue = rightOp->value;

/*
** Check the type of both values and issue a warning if a floating
** point type is found
*/
if (isFloatingType(leftType) || isFloatingType(rightType))
    warningForFloatUsage();

/*
** Check if the operands have compatible types.  If not, issue a warning
** and return an integer zero as the value of the operation (so that if
** the value is subsequently used, it won't cause another error).
*/
incompatible = *leftType == '(' || strcmp(leftType, Void) == 0 ||
      strncmp(leftType, "struct ", sizeof("struct ") - 1) == 0 ||
      strncmp(leftType, "union ", sizeof("union ") - 1) == 0 ||
      *rightType == '(' || strcmp(rightType, Void) == 0 ||
      strncmp(rightType, "struct ", sizeof("struct ") - 1) == 0 ||
      strncmp(rightType, "union ", sizeof("union ") - 1) == 0;

if (operation == LEFT_OP || operation == RIGHT_OP ||
  operation == '&' || operation == '^' || operation == '|') {
    if (!isIntegralType(leftType) || !isIntegralType(rightType))
        incompatible = TRUE;

} else if (operation == '+') {
    if ((*leftType == '*' || *leftType == '[') &&
      (*rightType == '*' || *rightType == '['))
        incompatible = TRUE;

} else if (operation != '-') {
    if (*leftType == '*' || *leftType == '[' ||
      *rightType == '*' || *rightType == '[')
        incompatible = TRUE;
}
```

jcomuzzi@pss2

~~e2pll.c~~
TNSi2C.c

SPARCprinter
Fri Oct 27 17:42:22 1995

NeWSprint 2.0
Openwin library 3
NeWSprint interpreter 3.000

NeWSprint 2.0

```
/*************************************************************/
/*                                                           */
/*      Copyright (c) 1995 Peritus Software Services, Inc.   */
/*        All Rights Reserved                                */
/*                                                           */
/*      THIS IS UNPUBLISHED PROPRIETARY SOURCE CODE OF       */
/*      Peritus Software Services, Inc.                      */
/*                                                           */
/*      This program contains confidential and proprietary   */
/*      information of Peritus Software Services, Inc., and  */
/*      any reproduction, disclosure, or use in whole or in  */
/*      part is expressly prohibited, except as may be       */
/*      specifically authorized by prior written agreement or */
/*      permission of Peritus.                               */
/*                                                           */
/*      The copyright notice above does not evidence any     */
/*      actual or intended publication of such source code.  */
/*                                                           */
/*************************************************************/
```

```
/*
** This file contains those "c2pil" support functions whose name begin with
** the letters "i" through "l".
*/

#include <ctype.h>
#include <stdio.h>
#include <stdlib.h>
#include <string.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "scanner.h"

/*
** Macro Definitions
*/
#define DIGITS(N) ((241*sizeof(N) + 99)/100)     /* max decimal digits in N */


/*
** Function "indirectRef" translates an indirect reference through a pointer
** into a PIL "_Mem" intrinsic call.  The function detects an indirect
** reference to an indirect reference and, where possible, reduces this to
** a single indirect reference.  The result string is allocated on the heap,
** so it is the caller's responsibility to free it when it is no longer
** needed.
*/
char *                          /* "_Mem ( <base> + <offset> , <type> )" */
indirectRef(base, offset, type)
    char *base;                 /* base address for indirection */
    char *offset;               /* offset from base of reference */
    char *type;                 /* type of result of indirection */
{
    char *cursor;               /* cursor for "rawBase" */
    char *oldBase;              /* base of nested "_Mem" call */
    char *rawBase;              /* unparenthesized copy of "base" */
    char *resultStr;            /* translation of indirect reference */
    char *translatedType;       /* PIL translation of "type" */
```

```
    rawBase = unparenthesize(base);
    translatedType = translateType(type);

    /*
    ** If the base is the address of a "_Mem" call, form a single "_Mem"
    ** call rather than a nested pair of "_Mem" calls by adding the new
    ** offset to the existing offset and changing the type to the new type.
    */
    cursor = rawBase + strcspn(rawBase, "(");

    if (strncmp(rawBase, "@ _Mem (", sizeof("@ _Mem (") - 1) == 0 &&
      cursor[firstFieldWidth(cursor)] == '\0') {
        cursor += 1;                        /* skip over '(' */
        oldBase = cursor;

        while (*cursor != ',' && *cursor != '\0')
            cursor += firstFieldWidth(cursor);

        oldBase = newString(cursor - oldBase, oldBase);

        if (offset == NULL || *offset == '\0' || strcmp(offset, "0") == 0)
            resultStr = catenate5(NoSep, "_Mem (", oldBase, ", ",
              translatedType, " )");
        else if (*offset == '-' && *(offset + 1) == ' ')
            resultStr = catenate6(NoSep, "_Mem (", oldBase, offset, " , ",
              translatedType, " )");
        else
            resultStr = catenate7(NoSep, "_Mem (", oldBase, "+ ", offset, " , ",
              translatedType, " )");

        freeString(oldBase);

    /*
    ** If the base is not the address of a "_Mem" call, form a "_Mem" call
    ** with the specified base and type.
    */
    } else {
        if (offset == NULL || *offset == '\0' || strcmp(offset, "0") == 0)
            resultStr = catenate5(FullSep, "_Mem (", rawBase, ",",
              translatedType, ")");
        else if (*offset == '-' && *(offset + 1) == ' ')
            resultStr = catenate6(FullSep, "_Mem (", rawBase, offset, ",",
              translatedType, ")");
        else
            resultStr = catenate7(FullSep, "_Mem (", rawBase, "+", offset, ",",
              translatedType, ")");
    }

    freeString(translatedType);
    freeString(rawBase);
    return resultStr;
}


/*
** Function "initializeVariable" emits the PIL "assign" directives needed
** to initialize a variable to the value(s) specified in an initializer
** list.  If the variable is an array with an implicit array bound, the
** function returns the value that was calculated from the initializer
** list for that bound; otherwise, it returns zero.
**
** The format of the initializer list is the same as that present in the C
** source, except that each initializer value is prefixed by a parenthesized
** type specification (in internal format) for the initializer value and
** unneeded spaces are generally suppressed.  For example, the C initializer
```

```
** "{{1, 2.0 }, {3, 4.0}}" is transformed by the parser into the string
** "{{(int)1,(double)2.0},{(int)3,(double)4.0}}".
*/
int                                 /* zero or array implicit bound */
initializeVariable(name, type, initializer)
    char *name;                     /* name of variable to initialize */
    char *type;                     /* type of variable to initialize */
    char *initializer;              /* initial value(s) for variable */
{
    static char *cursor;            /* cursor for "initializer" */

    int    arrayEnd;                /* an array bound */
    int    arrayIdx;                /* an array index */
    char *convertedValue;           /* a converted initializer value */
    char *definition;               /* a struct or union definition */
    char *diagnostic;               /* an error message */
    char *directive;                /* a PIL directive */
    char *elementName;              /* name of an array element */
    char *elementType;              /* type of an array element */
    char *fullName;                 /* full name of struct or union member */
    int    implicitArrayEnd;        /* size of an implicit array bound */
    char *initializerDefn;          /* defn of a struct or union initializer */
    char *leftBase;                 /* address of left string in assignment */
    char *leftString;               /* left string in a string assignment */
    char *memberName;               /* name of member of struct or union */
    char *memberType;               /* type of member of struct or union */
    char *number;                   /* string representation of a number */
    char *rightBase;                /* address of right string in assignment */
    char *rightString;              /* right string in a string assignment */
    char *startOfValue;             /* start of an initializer value */
    long   stringSize;              /* size of a literal string */
    char *stringType;               /* type of "leftString" and "rightString" */
    char *subscript;                /* subscript of an array reference */
    char *value;                    /* current value of initializer */
    int    valueLen;                /* length of "value" */
    char *valueType;                /* type of "value" */

    if (name == NULL || *name == '\0' || type == NULL || *type == '\0')
        return 0;           /* nothing to do if there is no name or type */

    /*
    ** If we are not recursed (i.e., if "initializer" is not NULL), then
    ** save the address of the initializer in the local static pointer
    ** "cursor", so that recursive calls can find the next initializer value.
    */
    if (initializer != NULL)
        cursor = initializer;

    /*
    ** Locate and record the start of the next initializer element. If we
    ** need to recurse because we are initializing an array, a structure or
    ** a union, we will set "cursor" back to the start of the element first.
    */
    cursor += strspn(cursor, "{, ");
    startOfValue = cursor;

    /*
    ** Isolate the type and value of the next initializer element. If there
    ** is no such element, pretend there is one that is an integer zero (i.e.,
    ** use zero as the default initialization value). If there is an element,
    ** it should consist of the element's type in parenthesis followed by the
    ** element's value.
    */
    if (*cursor == '}' || *cursor == '\0') {
        value = newString(DUP, "0");
```

```
    valueLen = strlen(value);
    valueType = newString(DUP, SignedInt);

} else {
    if (*cursor == '(') {
        valueType = newString(firstFieldWidth(cursor) - 2, cursor + 1);
        cursor += firstFieldWidth(cursor);

    } else {
        valueType = NULL;
    }

    value = cursor;

    while (*cursor != ',' && *cursor != '}' && *cursor != '\0') {
        cursor += firstFieldWidth(cursor);
    }

    value = newString(cursor - value, value);

    for (valueLen = strlen(value); valueLen > 0; valueLen -= 1) {
        if (value[valueLen - 1] != ' ')
            break;  /* found last nonblank char of value */
    }

    value[valueLen] = '\0';
}

/*
** If we are dealing with an array, initialize it, recursing if needed.
** Set "implicitArrayBnd" to zero unless we are dealing with an array
** with an implicit bound, in which case store the number of array
** elements initialized in "implicitArrayBnd".
*/
implicitArrayBnd = 0;

if (*type == '[') {
    arrayBnd = atoi(type + 1);
    elementType = type + strcspn(type, "]");
    elementType += strspn(elementType, " ]");

    /*
    ** If we are initializing a character array with a string literal,
    ** assign the string literal to the character array, padding with
    ** zeroes if the literal is shorter than the character array.
    */
    if (valueType != NULL && *valueType == '[' &&
      (strcmp(valueType + firstFieldWidth(valueType), SignedChar) == 0 ||
      strcmp(valueType + firstFieldWidth(valueType), UnsignedChar) == 0) &&
      (strcmp(elementType, SignedChar) == 0 ||
      strcmp(elementType, UnsignedChar) == 0)) {
        stringSize = atoi(valueType + 1);

        if (arrayBnd == 0) {
            arrayBnd = stringSize;
            implicitArrayBnd = arrayBnd;

        } else if (stringSize > arrayBnd) {
            /*
            ** Issue a diagnostic if more than EOS will be discarded.
            */
            if (stringSize > arrayBnd + 1)
                warning(curFileNum, curLineNum,
                  "Ignoring excess chars in string literal initializer.");

            stringSize = arrayBnd;
```

```
    }

    /*
    ** Copy the chars of the string literal to the array.
    */
    subscript = longToString(stringSize);
    stringType = catenate4(NoSep, "[", subscript, "]", SignedChar);
    leftBase = catenate2(FullSep, "@", name);
    leftString = indirectRef(leftBase, "0", stringType);
    rightBase = catenate2(FullSep, "@", value);
    rightString = indirectRef(rightBase, "0", stringType);
    directive = catenate4(FullSep, "assign", leftString, "=",
      rightString);
    writePIL(directive);
    freeString(directive);
    freeString(rightString);
    freeString(rightBase);
    freeString(leftString);
    freeString(leftBase);
    freeString(stringType);
    freeString(subscript);

    /*
    ** Zero any remaining elements of the array.
    */
    while (stringSize < arrayEnd) {
        subscript = longToString(stringSize);
        elementName = subscriptedRef(name, subscript);
        directive = catenate3(FullSep, "assign", elementName, "= 0");
        writePIL(directive);
        freeString(directive);
        freeString(elementName);
        freeString(subscript);
        stringSize += 1;
    }

/*
** If this is not a character array, or the initializer is not a
** string literal, restore the cursor to the start of the current
** initializer element, then recursively initialize each of the
** elements of the array, advancing "cursor" appropriately, until
** either all elements have been initialized or all initializers have
** been used.  If this does not initialize all the elements, emit a
** PIL loop to initialize the remainder to zero.
*/
} else {
    cursor = startOfValue;

    for (
      arrayIdx = 0;
      arrayIdx < arrayBnd || arrayBnd == 0;
      arrayIdx += 1) {
        if (*cursor == '\0' || *cursor == '}') {
            if (arrayBnd == 0)
                implicitArrayBnd = arrayIdx;

            break;
        }

        subscript = longToString(arrayIdx);
        elementName = subscriptedRef(name, subscript);
        initializeVariable(elementName, elementType, NULL);
        freeString(elementName);
        freeString(subscript);
    }
```

```
        if (arrayIdx < arrayEnd) {
            /*
            ** Emit a PIL loop to set remaining elements to zero.
            */
            subscript = newTempVariable(SignedInt);
            elementName = subscriptedRef(name, subscript);
            number = longToString(arrayIdx);
            replicate(SignedInt, number, subscript);
            freeString(number);
            startBlock();
            number = longToString(arrayEnd);
            directive = catenate5(FullSep, "do (", subscript, "<",
                number, ")");
            writePIL(directive);
            freeString(directive);
            freeString(number);
            initializeVariable(elementName, elementType, NULL);
            directive = catenate5(FullSep, "assign", subscript, "=",
                subscript, "+ 1");
            writePIL(directive);
            freeString(directive);
            terminateBlock("enddo");
            freeString(elementName);
            freeString(subscript);
        }

        if (*cursor == ',')
            cursor += 1;
    }

    /*
    ** If we are initializing a structure, we must distinguish whether the
    ** current initializer value is initializing the whole structure (in which
    ** case we replicate it) or just its first component (in which case we
    ** must recurse).
    */
    } else if (strncmp(type, "struct ", sizeof("struct") - 1) == 0) {
        /*
        ** If the initializer value has the same type as the structure, just
        ** replicate the value into the variable.
        */
        definition = locateDefinition(type);
        initializerDefn = locateDefinition(valueType);

        if (definition != NULL && initializerDefn != NULL &&
            strcmp(initializerDefn, definition) == 0) {
            replicate(valueType, value, name);

        /*
        ** If the initializer value has a different type than the structure,
        ** restore the cursor to the start of the initializer value, then
        ** initialize each named member in order by a recursive call to
        ** ourself.  This call will advance "cursor" appropriately.
        */
        } else {
            if (definition == NULL) {
                diagnostic = catenate2(NoSep,
                    "Ignoring initialization of undefined ", type);
                warning(curFileNum, curLineNum, diagnostic);
                freeString(diagnostic);

            } else {
                cursor = startOfValue;
                definition += strspn(definition, "{ ");

                while (*definition != '}' && *definition != '\0') {
```

```
                memberName = newString(strcspn(definition, ":"),
                  definition);
                definition += strlen(memberName);
                definition += 1;       /* skip over ':' */
                memberType = newString(strcspn(definition, ";"),
                  definition);
                definition += strlen(memberType);
                definition += strspn(definition, " ;");

                if (*memberName != '\0') {
                    fullName = catenate3(FullSep, name, ".", memberName);
                    initializeVariable(fullName, memberType, NULL);
                    freeString(fullName);
                }

                freeString(memberType);
                freeString(memberName);
            }

            if (*cursor == '}')
                cursor += 1;
        }

/*
** If we are initializing a union, we must distinguish whether the
** current initializer value is initializing the whole union (in which
** case we replicate it) or just its first component (in which case we
** must recurse).
*/
} else if (strncmp(type, "union ", sizeof("union ") - 1) == 0) {
    /*
    ** If the initializer value has the same type as the union, just
    ** replicate the value into the variable.
    */
    definition = locateDefinition(type);
    initializerDefn = locateDefinition(valueType);

    if (definition != NULL && initializerDefn != NULL &&
      strcmp(initializerDefn, definition) == 0) {
        replicate(valueType, value, name);

    /*
    ** If the initializer value has a different type than the union,
    ** restore the cursor to the start of the initializer value, then
    ** initialize the first member (and only the first member) by a
    ** recursive call to ourself.  This call will advance "cursor"
    ** appropriately.
    */
    } else {
        if (definition == NULL) {
            diagnostic = catenate2(NoSep,
              "Ignoring initialization of undefined ", type);
            warning(curFileNum, curLineNum, diagnostic);
            freeString(diagnostic);

        } else {
            cursor = startOfValue;
            definition += strspn(definition, "{ ");
            memberName = newString(strcspn(definition, ":"), definition);
            definition += strlen(memberName);
            definition += 1;          /* skip over ':' */
            memberType = newString(strcspn(definition, ";"), definition);
            fullName = catenate3(FullSep, name, ":", memberName);
            initializeVariable(fullName, memberType, NULL);
            freeString(fullName);
```

```
            freeString(memberType);
            freeString(memberName);

            if (*cursor == '}')
                cursor += 1;


/*
** If we are initializing a pointer, emit the appropriate "assign"
** directive.  If we cannot determine the type of the initializer value,
** we assume it is an address value and use it as is; otherwise, we run
** the value through "transformValue" to insure we are assigning the
** right type.
*/
} else if (*type == '*') {
    if (valueType == NULL)
        convertedValue = newString(DUP, value);
    else
        convertedValue = transformValue(value, valueType, type);

    directive = catenate4(FullSep, "assign", name, "=", convertedValue);
    writePIL(directive);
    freeString(directive);
    freeString(convertedValue);

/* If we are initializing an integral or floating point variable, emit the
** appropriate "assign" directive.  If we cannot determine the type of
** the initializer value, we assume that it is of the same type as the
** variable and use it as is; otherwise, if the value is a call to a
** redundant conversion function, we assign the argument of that function;
** otherwise we run the value through "transformValue" to insure we are
** assigning the right type.
*/
} else if (isIntegralType(type) || isFloatingType(type)) {
    if (valueType == NULL)
        convertedValue = newString(DUP, value);
    else if (isRedundantConversion(value, type))
        convertedValue = unparenthesize(value + strcspn(value, "("));
    else
        convertedValue = transformValue(value, valueType, type);

    directive = catenate4(FullSep, "assign", name, "=", convertedValue);
    writePIL(directive);
    freeString(directive);
    freeString(convertedValue);

/*
** If we have been asked to initialize an invalid type, issue a warning.
*/
} else {
    diagnostic = catenate2(NoSep,
      "Ignoring initialization of invalid type ", type);
    warning(curFileNum, curLineNum, diagnostic);
    freeString(diagnostic);
}

/*
** If we are not recursed, all the initializer elments should have now
** been used.  If that is not the case, issue a warning.
*/
if (initializer != NULL) {
    cursor += strspn(cursor, " ,}");

    if (*cursor != '\0')
        warning(curFileNum, curLineNum, "Ignoring excess initializers.");
}
```

```
    freeString(value);
    freeString(valueType);
    return implicitArrayBnd;
}


/*
** Function "initiateLogicalAnd" generates the PIL to represent the
** beginning of a logical AND construct.  The logical AND is split
** between this function and "terminateLogicalAnd" so that the PIL
** for the RHS can be properly placed within the outer if-then block
** generated for the LHS.  This is necessary to match the C convention
** that the RHS does not get evaluated unless the LHS does not
** determine the outcome of the entire expression (i.e. if the LHS
** evaluates to 0, then there is no need to evaluate the RHS).
**
** This function creates the temporary variable necessary to hold the
** result of the if-else PIL block generated to represent the conditional.
** The name of the variable is saved in the rule value for use in
** "terminateLogicalAnd". The new rule value returned is allocated on the
** heap and it is the responsibility of the caller to free the space once
** it is no longer needed.
*/
YYSTYPE                         /* new rule value */
initiateLogicalAnd(leftRule)
    YYSTYPE  leftRule;          /* left operand in "&&" expression */
{
    char     *directive;        /* PIL directive */
    YYSTYPE  eval;              /* evaluated expression Rule Value */

    if (leftRule == NULL)
        fatalError(0, 0, "Expression missing on left side of logical And\n");

    /*
    ** Create the return rule value with the temporary variable name
    */
    eval = newRuleValue(leftRule->fileNum, leftRule->lineNum, SignedInt, NULL);
    eval->value = newTempVariable(SignedInt);

    /*
    ** Convert an expression to a boolean representation
    */
    if (strcmp(leftRule->type, Boolean) != 0)
        convertType(leftRule, Boolean);

    /*
    ** Emit the PIL that starts off the logical AND sequence and
    ** return the boolean expression.
    */
    startBlock();
    directive = catenate3(FullSep, "if (", leftRule->value, ")");
    writePIL(directive);
    freeString(directive);

    return eval;
}


/*
** Function "initiateLogicalOr" generates the PIL to represent the
** beginning of a logical OR construct.  The logical OR is split
** between this function and "terminateLogicalOr" so that the PIL
** for the RHS can be properly placed within the outer "if ^" block
** generated for the LHS.  This is necessary to match the C convention
** that the RHS does not get evaluated unless the LHS does not
```

```
** determine the outcome of the entire expression (i.e. if the LHS
** evaluates to 1, then there is no need to evaluate the RHS).
**
** This function converts the rule representing the LHS of the logical
** OR expression to a logical value, if it is not already of that type.
** The new rule is evaluated and the result is allocated on the heap
** and returned.  It is the responsibility of the caller to free the
** space once it is no longer needed.
*/
YYSTYPE                         /* new rule value */
initiateLogicalOr(leftRule)
    YYSTYPE  leftRule;          /* left operand in "||" expression */
{
    char     *directive;        /* PIL directive */
    YYSTYPE  eval;              /* evaluated expression Rule Value */

    if (leftRule == NULL)
        fatalError(0, 0, "Expression missing on left side of logical Or\n");

    /*
    ** Initialize the return rule value for an expression
    */
    eval = newRuleValue(leftRule->fileNum, leftRule->lineNum, SignedInt, NULL);
    eval->value = newTempVariable(SignedInt);

    /*
    ** Convert an expression to a boolean representation
    */
    if (strcmp(leftRule->type, Boolean) != 0)
        convertType(leftRule, Boolean);

    /*
    ** The left operand does not define the result, so emit the PIL that
    ** starts off the logical OR sequence and return the boolean expression.
    */
    startBlock();
    directive = catenate3(FullSep, "if (", leftRule->value, ")");
    writePIL(directive);
    freeString(directive);
    directive = catenate3(FullSep, "assign", eval->value, "= 1");
    writePIL(directive);
    freeString(directive);
    advanceBlockNumber();
    directive = catenate3(FullSep, "if ! (", leftRule->value, ")");
    writePIL(directive);
    freeString(directive);

    return eval;
}


/*
** Function "intToString" returns the decimal character string equivalent
** of a binary integer number.  The return string is allocated from the
** heap, so the caller is responsible for freeing it when it is no longer
** needed.
*/
char *                          /* decimal string equivalent to num */
intToString(number)
    int number;                 /* number to convert */
{
    char result[DIGITS(number) + 2];     /* sign + digits + EOS */


    sprintf(result, "%d", number);
    return newString(DUP, result);
```

```
}

/*
** Function "isAtomic" returns TRUE if its argument is an atomic PIL value
** (i.e., is a simple variable, constant, parenthesized value, subscripted
** variable or function call).  The caller is responsible for insuring that
** there is no leading nor trailing whitespace in the argument.
*/
BOOL                            /* TRUE if argument is atomic */
isAtomic(value)
    char *value;                /* a PIL value */
{
    /*
    ** If there is not more than one token, the value is atomic.
    */
    if (value == NULL || strchr(value, ' ') == NULL)
        return TRUE;

    /*
    ** If the value is parenthesized, it is atomic.
    */
    if (*value == '(')
        return (value[firstFieldWidth(value)] == '\0');

    /*
    ** If value is a function call (i.e., a name followed by a parenthesized
    ** value) or a subscripted variable (i.e., a name followed by a bracketed
    ** value), it is atomic.
    */
    if (isalpha(*value) || *value == '_') {
        value += firstFieldWidth(value);        /* skip name */
        value += strspn(value, " ");            /* skip separator */

        if (*value == '(' || *value == '[')
            return (value[firstFieldWidth(value)] == '\0');
    }

    return FALSE;
}

/*
** Function "isFloatingType" returns TRUE if its argument specifies a
** floating point type.
*/
BOOL                            /* TRUE for floating point type */
isFloatingType(type)
    char *type;                 /* type to be tested */
{
    return type != NULL &&
      (strcmp(type, Double) == 0 || strcmp(type, Float) == 0 ||
      strcmp(type, LongDouble) == 0);
}

/*
** Function "isGlobalVar" returns TRUE if its argument specifies a
** C variable that is in file scope.
*/
BOOL
isGlobalVar(sym)
    SymInfo *sym;
{
    return (sym != NULL && sym->blockIdx == 0 &&
            (sym->storageClass == Extern || sym->storageClass == Static));
}
```

```
/*
** Function "isIntegralType" returns TRUE if its argument specifies an
** integral type.  Note that the "boolean" type evaluates as integral.
*/
BOOL                             /* TRUE for integral type */
isIntegralType(type)
    char *type;                  /* type to be tested */
{
    return type != NULL &&
      (*type == ':' || strncmp(type, "enum ", sizeof("enum ") - 1) == 0 ||
      strcmp(type, Boolean) == 0 || strcmp(type, SignedChar) == 0 ||
      strcmp(type, SignedInt) == 0 || strcmp(type, SignedLong) == 0 ||
      strcmp(type, SignedShort) == 0 || strcmp(type, UnsignedChar) == 0 ||
      strcmp(type, UnsignedInt) == 0 || strcmp(type, UnsignedLong) == 0 ||
      strcmp(type, UnsignedShort) == 0);
}


/*
** Function "isRedundantConversion" examines a value to see if it is a call
** to an integral or floating point conversion function which is redundant
** because the value is about to be used in a context that will perform the
** same or a more restrictive conversion.  For example, an "_unsigned_long",
** "_long", "_unsigned" or "_int" conversion is redundant if the result is
** going to be assigned to an integral type that is smaller than "long".
*/
BOOL                             /* TRUE if value is a redundant conversion */
isRedundantConversion(value, newType)
    char *value;                 /* value to be examined */
    char *newType;               /* type that will be forced on value */
{
    BOOL  isRedundant;           /* TRUE if redundant conversion found */
    char *cursor;                /* cursor for "value" or "oldType" */
    int   nameLen;               /* length of function name */
    char *oldType;               /* type of conversion function */

    /*
    ** Return FALSE if arguments are obviously invalid.
    */
    if (value == NULL    newType == NULL)
        return FALSE;

    /*
    ** Return FALSE if "value" does not start with "_" (as all conversion
    ** functions do) or is not a function call.
    */
    if (*value != '_')
        return FALSE;

    nameLen = firstFieldWidth(value);
    cursor = value + nameLen;
    cursor += strspn(cursor, " ");

    if (*cursor != '(' || cursor[firstFieldWidth(cursor)] != '\0')
        return FALSE;

    /*
    ** If this is a conversion function, we can form its type from its name
    ** by discarding the leading underscore and then replacing embedded
    ** underscores with spaces.
    */
    oldType = newString(nameLen - 1, value + 1);

    for (cursor = oldType; *cursor != '\0'; cursor += 1) {
```

```
        if (*cursor == '_')
            *cursor = ' ';
    }

    /*
    ** If the old type and new type are either both integral types or both
    ** floating types and if the size of the new type does not exceed that
    ** of the old type, then the conversion function is redundant.
    */
    if (isIntegralType(oldType))
        isRedundant = isIntegralType(newType) &&
          bitSizeOfType(newType, NULL) <= bitSizeOfType(oldType, NULL);
    else if (isFloatingType(oldType))
        isRedundant = isFloatingType(newType) &&
          bitSizeOfType(newType, NULL) <= bitSizeOfType(oldType, NULL);
    else
        isRedundant = FALSE;

    freeString(oldType);
    return isRedundant;
}


/*
** Function "locateContentsType" returns a pointer to the type of the
** contents of an array element or pointer.  If the type field passed in
** does not refer to an array or pointer, then the result will point to
** the start of that type string.  The caller must not free the result
** string as it is merely a pointer into the argument string.
*/
char *                          /* array/ptr contents type string */
locateContentsType(type)
    char *type;
{

    if (type == NULL)
        type = "";                      /* treat NULL type as empty */

    return ((*type == '[' || *type == '*') ?
      type + firstFieldWidth(type) : type);
}


/*
** Function "locateDefinition" attempts to find the definition for a
** structure or union.  The structure or union is specified by one of the
** keywords "struct" or "union", followed by a tag name, optionally
** followed by a block index.  If the block index is present, the structure
** or union definition that is visible from that block is retrieved;
** otherwise the most recently entered definition is retrieved.  The
** caller must not free the return value, as it is a pointer to the actual
** definition in the symbol table rather than a copy.
*/
char *                          /* NULL or the definition */
locateDefinition(specifier)
    char *specifier;            /* a structure or union specifier */
{
    int       blockIdx;         /* block index for symbol */
    char     *cursor;           /* cursor for "specifier" */
    char     *symbolName;       /* name portion of "specifier" */
    SymInfo  *symbolPtr;        /* symbol table entry for symbol */


    /*
    ** Return NULL if the argument is obviously invalid.
```

BEST AVAILABLE COPY

```
    */
    if (specifier == NULL)
        return NULL;

    if (strncmp(specifier, "struct ", sizeof("struct ") - 1) != 0 &&
      strncmp(specifier, "union ", sizeof("union ") - 1) != 0)
        return NULL;

    /*
    ** Isolate symbol name (i.e., "struct" or "union" keyword followed
    ** by tag name).
    */
    cursor = specifier;
    cursor += firstFieldWidth(cursor);  /* skip over keyword */
    cursor += 1;                        /* skip over space */

    if (!isalpha(*cursor) && *cursor != '_')
        return NULL;                    /* no tag name */

    cursor += firstFieldWidth(cursor);  /* skip over tag name */
    symbolName = newString(cursor - specifier, specifier);

    /*
    ** Isolate block index, if present.
    */
    cursor += strspn(cursor, " ");       /* skip over any spaces */

    if (isdigit(*cursor))
        blockIdx = atoi(cursor);
    else
        blockIdx = MAX_LEVELS;

    /*
    ** Look-up symbol in the symbol table's Tags name space and, if found,
    ** return its type (which is its definition).
    */
    symbolPtr = findSymbolInfo(symbolName, Tags, blockIdx);
    freeString(symbolName);

    if (symbolPtr == NULL)
        return NULL;                    /* no symbol found */

    if (symbolPtr->type == NULL || *symbolPtr->type == '\0')
        return NULL;                    /* no definition */

    return symbolPtr->type;
}


/*
** Function "locateSymbolType" searches the symbol table for a specified
** symbol and returns a pointer to the type string for that symbol (if it
** is found) or NULL.  The caller must not free the returned string, as it
** is the actual type string rather than a copy.
*/
char *                          /* NULL or symbol string */
locateSymbolType(symbolName, nameSpace, maxBlockIdx)
    char      *symbolName;      /* symbol name (may be NULL) */
    NameSpace nameSpace;        /* name space to which symbol belongs */
    int       maxBlockIdx;      /* max valid block index for symbol */
{
    SymInfo *symbolPtr;         /* address of symbol's info */


    symbolPtr = findSymbolInfo(symbolName, nameSpace, maxBlockIdx);
```

```
    if (symbolPtr == NULL)
        return NULL;        /* symbol not found */

    return symbolPtr->type;
}


/*
** Function "longToString" returns the decimal character string equivalent
** of a long binary integer number.  The return string is allocated from
** the heap, so the caller is responsible for freeing it when it is no
** longer needed.
*/
char *                          /* string equivalent of number */
longToString(number)
    long number;                /* number to be converted */
{
    char result[DIGITS(number) + 2];     /* sign + digits + EOS */


    sprintf(result, "%ld", number);
    return newString(DUP, result);
}
```

jcomuzzi@pss2

~~c2pil.c~~
fns_m2p.c

SPARCprinter
Fri Oct 27 17:42:22 1995

NeWSprint 2.0
Openwin library 3
NeWSprint interpreter 3.000

NeWSprint 2.0

```
/*************************************************************/
/*                                                           */
/*      Copyright (c) 1995 Peritus Software Services, Inc.   */
/*      All Rights Reserved                                  */
/*                                                           */
/*      THIS IS UNPUBLISHED PROPRIETARY SOURCE CODE OF       */
/*      Peritus Software Services, Inc.                      */
/*                                                           */
/*      This program contains confidential and proprietary   */
/*      information of Peritus Software Services, Inc., and  */
/*      any reproduction, disclosure, or use in whole or in  */
/*      part is expressly prohibited, except as may be       */
/*      specifically authorized by prior written agreement or */
/*      permission of Peritus.                               */
/*                                                           */
/*      The copyright notice above does not evidence any     */
/*      actual or intended publication of such source code.  */
/*                                                           */
/*************************************************************/

/*
** This file contains those "c2pil" support functions whose name begin with
** the letters "m" through "p".
*/

#include <ctype.h>
#include <stdio.h>
#include <stdlib.h>
#include <string.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "scanner.h"
#include "tokens.h"


/*
** Function mergeParameterDeclarations compares the parameter list
** and the explicit parameter declarations in an old-style C function
** definition in order to perform three operations:
**
** 1. Each parameter declaration that is contained in the parameter
** list (this allows exclusion of local variables defined within the
** parameter list, as allowed by some C compilers) has its type
** promoted if required (char, short -> int, float -> double).
** Each parameter in the declaration list is then registered in
** the symbol table and PIL declarations are emitted for the function
** definition and the parameters.
**
** 2. Each parameter that does not have a corresponding
** declaration is registered in the symbol table and a PIL declaration
** using the default type of signed int is emitted.
**
** 3. Each explicit parameter declaration that does not have a corresponding
** entry in the parameter list is registered as a local variable and
** a PIL declaration is emitted.
**
** Note:  This function is not called when the new-style function
** declarations (with typing info) is used.
*/
```

```
void
mergeParameterDeclarations (funcDecl, paramList, paramDeclList)
    char *funcDecl;                /* function Declaration */
    char *paramList;               /* parameter list */
    char *paramDeclList;           /* explicit parameter declaration list */
{
    char *cursor;                  /* current char in a string */
    char *funcName;                /* function Name */
    char *funcType;                /* function Type */
    char *paramDecls;              /* local copy of the param declaration list */
    char *pDecl;                   /* single explicit parameter declaration */
    char *mergedPDecl;             /* merged string of params and decls */
    char *nextParam;               /* next parameter name in parameter list */
    char *newFuncDecl;             /* new-style function declaration */
    char *oldPDecl;                /* temp used while merging params & decls */
    char *paramName;               /* current parameter name */
    char *subString;               /* subset of a string */

    /*
    ** Make a local copy of the declarations so they can be modified
    ** without side effects.
    */
    paramDecls = newString(DUP, paramDeclList);
    newFuncDecl = newString(DUP, funcDecl);
    mergedPDecl = NULL;

    /*
    ** If parameters are present, they must be merged with the
    ** declaration list.
    */
    if (paramList != NULL && paramList[0] != '\0') {
        paramName = paramList;

        while (*paramName != '\0') {
            for (cursor = paramName;
              *cursor != ',' && *cursor != '\0'; cursor++);

            paramName = newString(cursor - paramName, paramName);
            nextParam = (*cursor == '\0') ? cursor : cursor + 1;

            /*
            ** Search the explicit declaration list for the parameter
            ** name.  Make sure that a match is the complete parameter
            ** name, and not part of a longer name or declaration by
            ** checking that:
            **   1) the parameter name is followed by a colon AND
            **   2) the parameter name is the first item in the
            **      declaration list OR
            **   3) the parameter name is preceded by a semicolon
            */
            subString = paramDecls;

            while ((subString = strstr(subString, paramName)) != NULL) {
                if (subString[strlen(paramName)] == ':' &&
                  (subString == paramDecls || *(subString-1) == ';'))
                    break;                  /* Match found */
                else
                    subString += 1;         /* Move 1 char forward */
            }

            /*
            ** Isolate the explicit declaration and perform type promotion
            ** if necessary.  Then concatenate the result with the merged
            ** Parameter Declaration string.
            */
            if (subString != NULL) {
```

BEST AVAILABLE COPY

```
cursor = subString;

while (*cursor != ';' && *cursor != '\0')
    cursor += firstFieldWidth(cursor);

if (*cursor != '\0')
    cursor += 1;

pDecl = newString(cursor - subString, subString);

/*
** Remove the declaration that was just found from our
** local declaration list.  This allows easy recognition
** of local variables that are mixed in with the
** parameter list once all parameters have been declared.
*/
while ((*subString++ = *cursor++) != '\0')
    ;   /* copy from cursor to EOS */

/*
** Perform type promotion as needed.
** (char, short -> int, float -> double)
*/
cursor = strchr(pDecl, ':') + 1;
if (strncmp(cursor, SignedChar, strlen(SignedChar)) == 0 ||
     strncmp(cursor, UnsignedChar, strlen(UnsignedChar)) == 0 ||
     strncmp(cursor, SignedShort, strlen(SignedShort)) == 0 ||
     strncmp(cursor, UnsignedShort,
       strlen(UnsignedShort)) == 0) {
    freeString(pDecl);
    pDecl = catenate4(NoSep, paramName, ":", SignedInt, ";");

} else if (strncmp(cursor, Float, strlen(Float)) == 0) {
    freeString(pDecl);
    pDecl = catenate4(NoSep, paramName, ":", Double, ";");

/*
** If the declaration specifies an array with a size
** included, we need to discard the size specifier since
** in a parameter declaration it is not used by 'C' to
** allocate storage.  An empty array specifier will be
** subsequently converted by "declareSymbols" to a pointer.
*/
/* } else if (*cursor == '[' && *(cursor + 1) != ']') {
    cursor += 1;
    subString = strchr(cursor, ']');
    while ((*cursor++ = *subString++) != '\0'); */
}

oldPDecl = mergedPDecl;

if (pDecl[strlen(pDecl)-1] == ';')
    mergedPDecl = catenate2(NoSep, oldPDecl, pDecl);

else
    mergedPDecl = catenate3(NoSep, oldPDecl, pDecl, ",");

if (mergedPDecl[strlen(mergedPDecl)-1] == ';')
    mergedPDecl[strlen(mergedPDecl)-1] = ',';  /* change delimiter */

freeString(pDecl);
freeString(oldPDecl);

/*
** Parameters not found in the declaration list are assigned
** the default type.  Such parameters are saved so that they
```

```
** can be defined in the symbol table and declared in the PIL.
*
} else {
    oldPDecl = mergedPDecl;
    mergedPDecl = catenate5(NoSep, oldPDecl, paramName, ":",
      SignedInt,",");
    freeString(oldPDecl);
}

freeString(paramName);
paramName = nextParam;

/*
** Use the original function declaration and the merged
** parameter/declaration list to create a new style function
** declaration
*/
if (mergedPDecl != NULL) {
    mergedPDecl[strlen(mergedPDecl)-1] = '\0';  /* strip last ',' */
    funcName = newString(strchr(newFuncDecl, ':') - newFuncDecl,
      newFuncDecl);
    funcType = newString(strlen(strrchr(newFuncDecl, ')')),
      strrchr(newFuncDecl, ')'));
    freeString(newFuncDecl);
    newFuncDecl = catenate4(NoSep, funcName, ":(", mergedPDecl,
      funcType);
    freeString(funcName);
    freeString(funcType);
    freeString(mergedPDecl);
}
}

/*
** Emit the function definition and register the parameter
*/
writeLProcedure(newFuncDecl);
freeString(newFuncDecl);

/*
** Mark the end of the function definition and parameter declarations
*/
startBlock();

/*
** Any remaining declarations must be local variables, so register
** them and emit the corresponding PIL.
*/
declareSymbols(paramDecls);
freeString(paramDecls);

return;
}


/*
** Function "needSeparator" returns a Boolean value indicating whether two
** strings need a separator under a specified catentation scheme.  If "NoSep"
** separation is specified, the function always returns FALSE.  If "PartSep"
** separation is specified, the function returns TRUE if the first string
** ends with a letter, digit, '.', '_' or '$' and the second string begins
** with such a character.  If "FullSep" separation is specified, the
** function returns TRUE if both strings are nonempty.
*/
BOOL                              /* TRUE if strings require separation */
needSeparator(separation, firstString, secondString)
```

```
    CatSep separation;              /* type of separation desired */
    char   *firstString;            /* leading string */
    char   *secondString;           /* trailing string */
{
    char leftChar;                  /* last character of first string */
    char rightChar;                 /* first character of second string */


    if (separation == NoSep)
        return FALSE;

    if (firstString == NULL || firstString[0] == '\0')
        return FALSE;

    if (secondString == NULL || secondString[0] == '\0')
        return FALSE;

    if (separation == FullSep)
        return TRUE;

    leftChar = firstString[strlen(firstString) - 1];
    rightChar = secondString[0];
    return
      (isalnum(leftChar) || leftChar == '_' || leftChar == '.' ||
      leftChar == '$') && (isalnum(rightChar) || rightChar == '_' ||
      rightChar == '.' || rightChar == '$');
}


/*
** Function "newRuleValue" creates a new parser rule value of specified
** file number, line number, type and value.  The new rule value is
** allocated from the heap, so it is the caller's responsibility to free
** it when it is no longer needed.
*/
YYSTYPE                             /* address of new rule value */
newRuleValue(fileNum, lineNum, type, value)
    int    fileNum;                 /* desired file number */
    int    lineNum;                 /* desired line number */
    char *type;                     /* desired type */
    char *value;                    /* desired value */
{
    YYSTYPE newRuleValue;           /* address of new rule value */

    newRuleValue = (YYSTYPE) calloc(1, sizeof(*newRuleValue));

    if (newRuleValue == NULL)
        fatalError(fileNum, lineNum, "newRuleValue failed (heap exhausted).");

    newRuleValue->fileNum = fileNum;
    newRuleValue->lineNum = lineNum;

    if (type == NULL)
        newRuleValue->type = NULL;
    else
        newRuleValue->type = newString(DUP, type);

    if (value == NULL)
        newRuleValue->value = NULL;
    else
        newRuleValue->value = newString(DUP, value);

    return newRuleValue;
}
```

```
/*
** Function "newString" creates a new string of a specified length and
** initial value.  If a NULL initial value is specified, the empty string
** is assumed.  If a negative length is specified, the length of the
** initial value is assumed.  The created string is allocated from the
** heap, so it is the caller's responsibility to free it when it is no
** longer needed.
*/
char *                              /* address of the new string */
newString(length, value)
    int     length;                 /* length of string (-ve => strlen(value)) */
    char    *value;                 /* initial value of string (may be NULL) */
{
    char *newString;                /* address of the new string */

    if (value == NULL)
        value = "";                 /* treat a NULL value as an empty string */

    if (length < 0)
        length = strlen(value);

    newString = calloc(length + 1, sizeof(char));

    if (newString == NULL)
        fatalError(0, 0, "newString failed (heap exhausted).");

    strncpy(newString, value, length);
    return newString;
}


/*
** Function "newSymbol" creates a new symbol information element.  The element
** is created on the heap, so the caller is responsible for freeing it when
** it is no longer needed.
*/
SymInfo *                           /* new symbol information element */
newSymbol(name, nameSpace, storageClass, type)
    char         *name;             /* symbol name (may be NULL) */
    NameSpace    nameSpace;         /* nameSpace to which symbol belongs */
    StorageClass storageClass;      /* storageClass for symbol */
    char         *type;             /* symbol type (may be NULL) */
{
    SymInfo *newSymbol;             /* location of new symbol */


    newSymbol = (SymInfo *) calloc(1, sizeof(SymInfo));

    if (newSymbol == NULL)
        fatalError(0, 0, "newSymbol failed (heap exhausted).");

    newSymbol->blockIdx = blockIdx;

    if (name == NULL)
        newSymbol->name = NULL;
    else
        newSymbol->name = newString(DUP, name);

    newSymbol->nameSpace = nameSpace;
    newSymbol->storageClass = storageClass;
    newSymbol->siblingPtr = NULL;
    newSymbol->pilWritten = FALSE;

    if (type == NULL)
        newSymbol->type = NULL;
    else
```

```
        newSymbol->type = newString(DUP, type);

    return newSymbol;
}


/*
** Function "newTempVariable" creates a new temporary variable.  If a type
** is specified for the variable a "var" directive is emitted to declare it.
** The name of the variable is returned by the function.  That name is
** created on the heap, so the caller is responsible for freeing it when it
** is no longer needed.
*/
char *                          /* name of new temporary variable */
newTempVariable(type)
    char *type;                 /* type of the temporary */
{
    static int tempCnt = 0;     /* number of temporaries created so far */

    char *tempVarName;          /* name of the temporary variable */
    char *tempVarNum;           /* numeric part of temp variable name */


    /*
    ** Generate a unique name for the temporary variable.
    */
    tempVarNum = intToString(tempCnt += 1);
    tempVarName = catenate3(NoSep, "v", tempVarNum, "$$");
    freeString(tempVarNum);

    /*
    ** If a type is specified for the variable, emit a "var" directive for it.
    */
    if (type != NULL)
        writeVar(tempVarName, type);

    return tempVarName;
}


/*
** Function "normalizeDeclSpecifiers" examines a set of declaration specifiers
** and determines whether they form a valid combination.  If they do, a
** normalized representation of those specifiers is returned, where
** normalized means optional indirections, followed by an optional storage
** class specifier, followed by either one of the basic type strings defined
** in "parser.h" (such as SignedInt or Float) or one of the keywords "enum",
** "struct" or "union" followed by the associated tag name and block number,
** or a field-size specification followed by an integral basic type string.
** The return value is allocated from the heap, so the caller is responsible
** for freeing it when it is no longer needed.
*/
char *                          /* NULL or normalized declaration specifiers */
normalizeDeclSpecifiers(specifiers)
    char *specifiers;           /* declaration specifiers to be normalized */
{
    /*
    ** Define flags for testing valid declaration specifier combinations.
    */
#   define BOGUS_DECL      0x0001
#   define CHAR_TYPE       0x0002
#   define DOUBLE_TYPE     0x0004
#   define ENUM_TYPE       0x0008
#   define FLOAT_TYPE      0x0010
#   define INT_TYPE        0x0020
#   define LONG_TYPE       0x0040
```

```
#    define SHORT_TYPE     0x0080
#    define SIGNED_TYPE    0x0100
#    define STRUCT_TYPE    0x0200
#    define UNION_TYPE     0x0400
#    define UNSIGNED_TYPE  0x0800
#    define VOID_TYPE      0x1000

     char *block;                    /* block index for struct or union */
     char *cursor;                   /* cursor for "declarations" */
     int   declFlags;                /* set of flags indicating type of symbol */
     char *diagnostic;               /* an error message */
     char *field;                    /* a copy of a field in "declarations" */
     int   fieldWidth;               /* width of a declaration field */
     char *indirections;             /* list of indirections */
     char *normalizedSpecifiers;     /* normalized type specifiers for a symbol */
     char *oldIndirections;          /* previous value of "indirections" */
     char *size;                     /* a bit-field size specifier */
     char *storage;                  /* a storage class specifier */
     char *tag;                      /* tag for an enum, struct or union */
     char *type;                     /* normalized type specifiers */


     if (specifiers == NULL)
         specifiers = "";                    /* treat NULL specifiers as empty */

     /*
     ** Extract any indirections, storage class specifier or field-size
     ** specifier from the declaration and note which type specifiers are
     ** present.
     */
     block = NULL;
     declFlags = 0;
     indirections = NULL;
     size = NULL;
     storage = NULL;
     tag = NULL;
     cursor = specifiers;
     cursor += strspn(cursor, " ");          /* skip over leading spaces */

     while (*cursor != '\0') {
         fieldWidth = firstFieldWidth(cursor);

         if (*cursor == '*' || *cursor == '[' || *cursor == '(') {
             field = newString(fieldWidth, cursor);
             oldIndirections = indirections;
             indirections = catenate2(NoSep, oldIndirections, field);
             freeString(oldIndirections);
             freeString(field);
             cursor += fieldWidth;                /* skip over indirection */

         } else if (*cursor == ':') {
             if (size != NULL) {
                 declFlags |= BOGUS_DECL;          /* multiple size specs */
                 freeString(size);
             }

             size = cursor;
             cursor += 1;                          /* skip over ':' */
             cursor += strspn(cursor, "0123456789");

             if (cursor - size < 2)
                 declFlags |= BOGUS_DECL;          /* no digits after ':' */

             size = newString(cursor - size, size);

         } else if (fieldWidth == sizeof("auto") - 1 &&
```

```c
    strncmp(cursor, "auto", fieldWidth) == 0) {
    if (storage != NULL)
        declFlags |= BOGUS_DECL;
    else
        storage = newString(DUP, "auto");

    cursor += fieldWidth;        /* skip over keyword */
}
else if (fieldWidth == sizeof("extern") - 1 &&
    strncmp(cursor, "extern", fieldWidth) == 0) {
    if (storage != NULL)
        declFlags |= BOGUS_DECL;
    else
        storage = newString(DUP, "extern");

    cursor += fieldWidth;        /* skip over keyword */
}
else if (fieldWidth == sizeof("register") - 1 &&
    strncmp(cursor, "register", fieldWidth) == 0) {
    if (storage != NULL)
        declFlags |= BOGUS_DECL;
    else
        storage = newString(DUP, "register");

    cursor += fieldWidth;        /* skip over keyword */
}
else if (fieldWidth == sizeof("static") - 1 &&
    strncmp(cursor, "static", fieldWidth) == 0) {
    if (storage != NULL)
        declFlags |= BOGUS_DECL;
    else
        storage = newString(DUP, "static");

    cursor += fieldWidth;        /* skip over keyword */
}
else if (fieldWidth == sizeof("typedef") - 1 &&
    strncmp(cursor, "typedef", fieldWidth) == 0) {
    if (storage != NULL)
        declFlags |= BOGUS_DECL;
    else
        storage = newString(DUP, "typedef");

    cursor += fieldWidth;        /* skip over keyword */
}
else if (fieldWidth == sizeof("char") - 1 &&
    strncmp(cursor, "char", fieldWidth) == 0) {
    if (declFlags & CHAR_TYPE)
        declFlags |= BOGUS_DECL;      /* multiple occurrences */
    else
        declFlags |= CHAR_TYPE;

    cursor += fieldWidth;        /* skip over keyword */
}
else if (fieldWidth == sizeof("double") - 1 &&
    strncmp(cursor, "double", fieldWidth) == 0) {
    if (declFlags & DOUBLE_TYPE)
        declFlags |= BOGUS_DECL;      /* multiple occurrences */
    else
        declFlags |= DOUBLE_TYPE;

    cursor += fieldWidth;        /* skip over keyword */
}
else if (fieldWidth >= sizeof("enum") - 1 &&
    strncmp(cursor, "enum", sizeof("enum") - 1) == 0) {
    if (declFlags & ENUM_TYPE)
        declFlags |= BOGUS_DECL;      /* multiple occurrences */
```

```
        else
            declFlags |= ENUM_TYPE;

        cursor += fieldWidth;                    /* skip over keyword */
        cursor += strspn(cursor, " ");           /* skip over delimiters */

        if (isalpha(*cursor) || *cursor == '_') {
            fieldWidth = firstFieldWidth(cursor);
            freeString(tag);
            tag = newString(fieldWidth, cursor);
            cursor += fieldWidth;                /* skip over tag */
            cursor += strspn(cursor, " ");       /* skip over delimiters */

        } else {        /* no tag */
            declFlags |= BOGUS_DECL;             /* tag required */
        }

    } else if (fieldWidth == sizeof("float") - 1 &&
    strncmp(cursor, "float", fieldWidth) == 0) {
        if (declFlags & FLOAT_TYPE)
            declFlags |= BOGUS_DECL;             /* multiple occurrences */
        else
            declFlags |= FLOAT_TYPE;

        cursor += fieldWidth;           /* skip over keyword */

    } else if (fieldWidth == sizeof("int") - 1 &&
    strncmp(cursor, "int", fieldWidth) == 0) {
        if (declFlags & INT_TYPE)
            declFlags |= BOGUS_DECL;             /* multiple occurrences */
        else
            declFlags |= INT_TYPE;

        cursor += fieldWidth;           /* skip over keyword */

    } else if (fieldWidth == sizeof("long") - 1 &&
    strncmp(cursor, "long", fieldWidth) == 0) {
        if (declFlags & LONG_TYPE)
            declFlags |= BOGUS_DECL;             /* multiple occurrences */
        else
            declFlags |= LONG_TYPE;

        cursor += fieldWidth;           /* skip over keyword */

    } else if (fieldWidth == sizeof("short") - 1 &&
    strncmp(cursor, "short", fieldWidth) == 0) {
        if (declFlags & SHORT_TYPE)
            declFlags |= BOGUS_DECL;             /* multiple occurrences */
        else
            declFlags |= SHORT_TYPE;

        cursor += fieldWidth;           /* skip over keyword */

    } else if (fieldWidth == sizeof("signed") - 1 &&
    strncmp(cursor, "signed", fieldWidth) == 0) {
        if (declFlags & SIGNED_TYPE)
            declFlags |= BOGUS_DECL;             /* multiple occurrences */
        else
            declFlags |= SIGNED_TYPE;

        cursor += fieldWidth;           /* skip over keyword */

    } else if (fieldWidth >= sizeof("struct") - 1 &&
    strncmp(cursor, "struct", sizeof("struct") - 1) == 0) {
        if (declFlags & STRUCT_TYPE)
            declFlags |= BOGUS_DECL;             /* multiple occurrences */
```

```
    else
        declFlags |= STRUCT_TYPE;

    cursor += fieldWidth;                   /* skip over keyword */
    cursor += strspn(cursor, " ");          /* skip over delimiters */

    if (isalpha(*cursor) || *cursor == '_') {
        fieldWidth = firstFieldWidth(cursor);
        freeString(tag);
        tag = newString(fieldWidth, cursor);
        cursor += fieldWidth;               /* skip over tag */
        cursor += strspn(cursor, " ");      /* skip over delimiters */

    } else {      /* no tag */
        declFlags |= BOGUS_DECL;            /* tag required */
    }

    if (isdigit(*cursor)) {
        fieldWidth = firstFieldWidth(cursor);
        freeString(block);
        block = newString(fieldWidth, cursor);
        cursor += fieldWidth;               /* skip over block index */
        cursor += strspn(cursor, " ");      /* skip over delimiters */

    } else {      /* no block */
        declFlags |= BOGUS_DECL;            /* tag required */
    }

  else if (fieldWidth >= sizeof("union") - 1 &&
  strncmp(cursor, "union", sizeof("union") - 1) == 0) {
    if (declFlags & UNION_TYPE)
        declFlags |= BOGUS_DECL;            /* multiple occurrences */
    else
        declFlags |= UNION_TYPE;

    cursor += fieldWidth;                   /* skip over keyword */
    cursor += strspn(cursor, " ");          /* skip over delimiters */

    if (isalpha(*cursor) || *cursor == '_') {
        fieldWidth = firstFieldWidth(cursor);
        freeString(tag);
        tag = newString(fieldWidth, cursor);
        cursor += fieldWidth;               /* skip over tag */
        cursor += strspn(cursor, " ");      /* skip over delimiters */

    } else {      /* no tag */
        declFlags |= BOGUS_DECL;            /* tag required */
    }

    if (isdigit(*cursor)) {
        fieldWidth = firstFieldWidth(cursor);
        freeString(block);
        block = newString(fieldWidth, cursor);
        cursor += fieldWidth;               /* skip over block index */
        cursor += strspn(cursor, " ");      /* skip over delimiters */

    } else {      /* no block */
        declFlags |= BOGUS_DECL;            /* tag required */
    }

} else if (fieldWidth == sizeof("unsigned") - 1 &&
  strncmp(cursor, "unsigned", fieldWidth) == 0) {
    if (declFlags & UNSIGNED_TYPE)
        declFlags |= BOGUS_DECL;            /* multiple occurrences */
    else
        declFlags |= UNSIGNED_TYPE;
```

```
        cursor += fieldWidth;          /* skip over keyword */

    } else if (fieldWidth == sizeof("void") - 1 &&
      strncmp(cursor, "void", fieldWidth) == 0) {
        if (declFlags & VOID_TYPE)
            declFlags |= BOGUS_DECL;            /* multiple occurrences */
        else
            declFlags |= VOID_TYPE;

        cursor += fieldWidth;          /* skip over keyword */

    } else {
        declFlags |= BOGUS_DECL;      /* unknown keyword */
        cursor += fieldWidth;                  /* skip over field */
    }

    cursor += strspn(cursor, " ");   /* skip over delimiters */
}

/*
** Create a normalized representation of the type specifiers.
*/
switch (declFlags) {

case CHAR_TYPE:
    if (charIsSigned)
        type = newString(DUP, SignedChar);
    else
        type = newString(DUP, UnsignedChar);

    break;

case DOUBLE_TYPE:
    type = newString(DUP, Double);
    break;

case ENUM_TYPE:
    type = newString(DUP, SignedInt);
    break;

case FLOAT_TYPE:
    type = newString(DUP, Float);
    break;

case INT_TYPE:
case SIGNED_TYPE:
case SIGNED_TYPE | INT_TYPE:
case 0:                /* C assumes int when no type is given */
    type = newString(DUP, SignedInt);
    break;

case LONG_TYPE:
case LONG_TYPE | INT_TYPE:
case SIGNED_TYPE | LONG_TYPE:
case SIGNED_TYPE | LONG_TYPE | INT_TYPE:
    type = newString(DUP, SignedLong);
    break;

case LONG_TYPE | DOUBLE_TYPE:
    type = newString(DUP, LongDouble);
    break;

case SHORT_TYPE:
case SHORT_TYPE | INT_TYPE:
case SIGNED_TYPE | SHORT_TYPE:
```

```
case SIGNED_TYPE | SHORT_TYPE | INT_TYPE:
    type = newString(DUP, SignedShort);
    break;

case SIGNED_TYPE | CHAR_TYPE:
    type = newString(DUP, SignedChar);
    break;

case STRUCT_TYPE:
    type = catenate3(PartSep, "struct", tag, block);
    break;

case UNION_TYPE:
    type = catenate3(PartSep, "union", tag, block);
    break;

case UNSIGNED_TYPE:
case UNSIGNED_TYPE | INT_TYPE:
    type = newString(DUP, UnsignedInt);
    break;

case UNSIGNED_TYPE | CHAR_TYPE:
    type = newString(DUP, UnsignedChar);
    break;

case UNSIGNED_TYPE | LONG_TYPE:
case UNSIGNED_TYPE | LONG_TYPE | INT_TYPE:
    type = newString(DUP, UnsignedLong);
    break;

case UNSIGNED_TYPE | SHORT_TYPE:
case UNSIGNED_TYPE | SHORT_TYPE | INT_TYPE:
    type = newString(DUP, UnsignedShort);
    break;

case VOID_TYPE:
    type = newString(DUP, Void);
    break;

default:
    type = NULL;        /* type specifiers invalid */
}

if (type == NULL) {
    normalizedSpecifiers = NULL;
} else {
    if (size != NULL && (indirections != NULL || !isIntegralType(type))) {
        diagnostic = catenate3(NoSep,
          "Ignoring invalid field-size specification \"", size, "\"");
        warning(0, 0, diagnostic);
        freeString(diagnostic);
        freeString(size);
        size = NULL;
    }

    normalizedSpecifiers = catenate4(PartSep, indirections, storage,
      size, type);
}

freeString(block);
freeString(indirections);
freeString(size);
freeString(storage);
freeString(tag);
freeString(type);
return normalizedSpecifiers;
```

```
/*
** Function "performAssignment" translate a C assignment operation into the
** equivalent PIL code.
*/
void
performAssignment(leftOperand, operation, rightOperand)
    YYSTYPE leftOperand;        /* left operand of assignment */
    int     operation;          /* an assignment operator code */
    YYSTYPE rightOperand;       /* right operand of assignment */
{
    char    *argument;          /* argument of a conversion function */
    char    *diagnostic;        /* an error message */
    char    *directive;         /* a PIL directive */
    YYSTYPE leftOperandCopy;    /* a copy of the left operand */
    YYSTYPE newValue;           /* the new value for the left operand */
    char    *oldValue;          /* previous value of right operand */
    char    *operator;          /* name of operator */

    /*
    ** If either operand is invalid, just issue a warning and return.
    */
    if (leftOperand == NULL || leftOperand->type == NULL ||
      leftOperand->value == NULL) {
        diagnostic = (leftOperand == NULL) ?
          newString(DUP, "Null operand found in assign") :
          catenate3(NoSep, "Invalid operand (", leftOperand->value,
            ") found in assign");
        warning(0, 0, diagnostic);
        freeString(diagnostic);
        return;
    }

    if (rightOperand == NULL || rightOperand->type == NULL ||
      rightOperand->value == NULL) {
        diagnostic = (rightOperand == NULL) ?
          newString(DUP, "Null operand found in assign") :
          catenate3(NoSep, "Invalid operand (", rightOperand->value,
            ") found in assign");
        warning(0, 0, diagnostic);
        freeString(diagnostic);
        return;
    }

    /*
    ** Determine name of operator in case we have to issue a diagnostic.
    */
    switch (operation) {

    case '=':
        operator = "=";
        break;

    case ADD_ASSIGN:
        operator = "+=";
        break;

    case AND_ASSIGN:
        operator = "&=";
        break;

    case DIV_ASSIGN:
        operator = "/=";
        break;
```

```
case LEFT_ASSIGN:
    operator = "<<=";
    break;

case MOD_ASSIGN:
    operator = "%=";
    break;

case MUL_ASSIGN:
    operator = "*=";
    break;

case OR_ASSIGN:
    operator = "|=";
    break;

case RIGHT_ASSIGN:
    operator = ">>=";
    break;

case SUB_ASSIGN:
    operator = "-=";
    break;

case XOR_ASSIGN:
    operator = "^=";
    break;

default:
    fatalError(0, 0, "invalid operator passed to performAssignment.");
}

/*
** If the left operand cannot be assigned to, issue a diagnostic and
** return.
*/
if (*leftOperand->type == '[' || *leftOperand->type == '(' ||
  strcmp(leftOperand->type, Void) == 0) {
    diagnostic = catenate4(FullSep, "Ignoring", operator,
      "assignment to type", leftOperand->type);
    warning(0, 0, diagnostic);
    freeString(diagnostic);
    return;
}

/*
** If this is a simple assignment, then the right operand contains the new
** value for the left operand, but if the operator combines an arithmetic
** operation with assignment, we must emit the PIL code to perform the
** arithmetic operation and the result of that operation is the new value
** for the left operand.
*/
if (operation == '=') {
    newValue = newRuleValue(rightOperand->fileNum,
      rightOperand->lineNum, rightOperand->type, rightOperand->value);
    prepareForUse(newValue);

    /*
    ** If the value to be assigned is an integer constant, convert
    ** the value to represent the result type.
    */
    if (newValue->value[strspn(newValue->value, INT_CONSTANT_CHARS)]
      == '\0') {
        freeString(newValue->type);
        freeString(newValue->value);
```

```
        newValue->type = newString(DUP, leftOperand->type);
        newValue->value =
          transformValue(rightOperand->value, rightOperand->type,
            newValue->type);

} else {

    /*
    ** If the right operand is not atomic, enclose its value in
    ** parentheses to avoid operator precedence problems.
    */
    if (!isAtomic(rightOperand->value)) {
        oldValue = rightOperand->value;
        rightOperand->value = catenate(FullSep, "(", oldValue, ")");
        freeString(oldValue);


    /*
    ** Emit the FIL needed to perform the specified arithmetic operation.
    ** We need to use a copy of the left operand in the evaluation in
    ** case conversion to a common type alters it.
    */
    leftOperandCopy = newRuleValue(leftOperand->fileNum,
      leftOperand->lineNum, leftOperand->type, leftOperand->value);

    switch (operation) {

    case ADD_ASSIGN:
        newValue = evalBinaryExpr(leftOperandCopy, '+', rightOperand);
        break;

    case AND_ASSIGN:
        newValue = evalBinaryExpr(leftOperandCopy, '&', rightOperand);
        break;

    case DIV_ASSIGN:
        newValue = evalBinaryExpr(leftOperandCopy, '/', rightOperand);
        break;

    case LEFT_ASSIGN:
        newValue = evalBinaryExpr(leftOperandCopy, LEFT_OP, rightOperand);
        break;

    case MOD_ASSIGN:
        newValue = evalBinaryExpr(leftOperandCopy, '%', rightOperand);
        break;

    case MUL_ASSIGN:
        newValue = evalBinaryExpr(leftOperandCopy, '*', rightOperand);
        break;

    case OR_ASSIGN:
        newValue = evalBinaryExpr(leftOperandCopy, '|', rightOperand);
        break;

    case RIGHT_ASSIGN:
        newValue = evalBinaryExpr(leftOperandCopy, RIGHT_OP, rightOperand);
        break;

    case SUB_ASSIGN:
        newValue = evalBinaryExpr(leftOperandCopy, '-', rightOperand);
        break;

    case XOR_ASSIGN:
        newValue = evalBinaryExpr(leftOperandCopy, '^', rightOperand);
```

```
            break;

        freeRuleValue(leftOperandCopy);
    }

    /*
    ** If the new value is a redundant conversion function call, replicate
    ** the argument of that function call into the left operand.
    */
    if (isRedundantConversion(newValue->value, leftOperand->type)) {
        argument = unparenthesize(newValue->value +
          strcspn(newValue->value, "("));
        replicate(leftOperand->type, argument, leftOperand->value);
        freeString(argument);

    /*
    ** Otherwise, if the left operand and new value have identical type,
    ** replicate the new value into the left operand.
    */
    } else if (strcmp(newValue->type, leftOperand->type) == 0) {
        replicate(leftOperand->type, newValue->value, leftOperand->value);

    /*
    ** Otherwise, emit a PIL "assign" directive to assign the new value to the
    ** left operand.  If the new value is not assignment-compatible with the
    ** left operand, either convert the new value to the type of the left
    ** operand (if possible) or issue a diagnostic.
    */
    } else {
        if (isIntegralType(leftOperand->type)) {
            if (!isIntegralType(newValue->type))
                convertType(newValue, leftOperand->type);

        } else if (isFloatingType(leftOperand->type)) {
            if (!isFloatingType(newValue->type) &&
              strcmp(newValue->type, Boolean) != 0)  /* Don't convert boolean */
                convertType(newValue, leftOperand->type);

        } else {
            convertType(newValue, leftOperand->type);
        }

        /*
        ** If the right hand side evaluates to a boolean type, then
        ** call convertFromBoolean to optimize the assignment.
        */
        if (strcmp(newValue->type, Boolean) == 0) {
            freeString(convertFromBoolean(newValue->value, leftOperand->type,
              leftOperand->value));

        } else {
            directive = catenate4(FullSep, "assign", leftOperand->value, "=",
              newValue->value);
            writePIL(directive);
            freeString(directive);
        }
    }

    freeRuleValue(newValue);
}

/*
** Function "performCall" translates a C function call into the equivalent
** PIL code.  The PIL simulates the C call-by-value mechanism on top of the
```

```
** PIL back-end call-by-reference mechanism.
**
** The result returned by the PIL function is allocated on the heap, and it
** is the responsibility of the caller to free the space once it is no longer
** required.
*/
YYSTYPE                             /* PIL function result rule */
performCall(funcName, args)
    YYSTYPE  funcName;              /* function name */
    YYSTYPE  args;                  /* function argument list */
{
    char     *argCursor;            /* index into argument list */
    char     *argStart;             /* start of argument name in arg list */
    char     *argument;             /* the value of an argument */
    char     *cursor;               /* cursor for parameter declarations */
    char     *declStart;            /* start of parameter declaration */
    char     *diagnostic;           /* C2PIL diagnostic message text */
    char     *directive;            /* PIL directive text */
    char     *funcDecls;            /* function declaration with param types */
    char     *funcType;             /* function type */
    BOOL      noPrototype;          /* TRUE if function params have been declared */
    char     *oldTempArgList;       /* previous value of "tempArgList" */
    char     *tempArgList;          /* call-by-value argument list */
    char     *tempArgName;          /* temporary variable name for call-by-value */
    char     *tempArgType;          /* type of temporary argument variable */
    YYSTYPE  tempRuleValue;         /* rule value for argument type conversion */
    YYSTYPE  result;                /* return value rule */

    if (funcName == NULL)
        fatalError(curFileNum, curLineNum,
          "Missing function Name in performCall");

    /*
    ** Determine the function type, assuming "int" for undeclared
    ** functions.  In order to prevent posting of multiple error
    ** messages, we pretend a type of "int" for calls to nonfunctions
    ** or indirect calls to functions.
    */
    if (funcName->type == NULL) {        /* undeclared function */
        funcType = SignedInt;

    } else if (funcName->type[0] != '(') {       /* indirect or invalid call */
        funcType = SignedInt;

        if (strncmp(funcName->type, "*(", sizeof("*(") - 1) == 0)
            diagnostic = catenate2(NoSep,
              "Indirect function call:  ", funcName->value);
        else
            diagnostic = catenate2(NoSep,
              "Invalid function call:  ", funcName->value);

        warning(curFileNum, curLineNum, diagnostic);
        freeString(diagnostic);

    /*
    ** For functions that do not return a value, we want to generate a
    ** dummy argument that will match the "void$$" placeholder in the
    ** caller parameter list.  The "void$$" placeholder has been
    ** assigned a type of "int" in "writeLProcedure".
    */
    } else if (strcmp(funcName->type, Void) == 0) { /* Void type */
        funcType = SignedInt;

    } else {                                  /* function type */
        funcType = funcName->type + firstFieldWidth(funcName->type);
    }
```

```
/*
** If this is a call to the "exit" function, issue a PIL "return all"
** directive and return a void ruleValue.
*/
if (strcmp(funcName->value, "exit") == 0) {
    writePIL("return all");
    return newRuleValue(funcName->fileNum, funcName->lineNum, Void, "");
}

/*
** Define the temporary variable that is used to accept the return value
** of the function.
*/
result = newRuleValue(funcName->fileNum, funcName->lineNum, funcType, NULL);
result->value =  newTempVariable((strcmp(funcType, Void) == 0) ?
  SignedInt : funcType);

/*
** Create the temporary rule value used for argument type conversion
** and promotion.
*/
tempRuleValue = newRuleValue(funcName->fileNum, funcName->lineNum,
  NULL, NULL);

/*
** Initialize the new argument list that will substitute temporary
** variables for the actual arguments to simulate the C call-by-value
** mechanism.
*/
tempArgList = newString(DUP, result->value);

/*
** If there is a function prototype that specifies the parameter types,
** use those specifications; otherwise, use the types of the arguments
** (with any required promotions) as the parameter specifications.
*/
if (funcName->type != NULL &&
  funcName->type[(*funcName->type == '*') ? 1 : 0] == '(' &&
  strcspn(funcName->type, ":") < strcspn(funcName->type, ")")) {
    funcDecls = newString(DUP, funcName->type);
    noPrototype = FALSE;

} else {
    funcDecls = catenate3(NoSep, "(", args->value, ")");
    noPrototype = TRUE;
}

/*
** Use the variable information to generate the temporary call-by-value
** variables.
*/
cursor = funcDecls + strcspn(funcDecls, "(") + 1;

if (strncmp(cursor, ":void)", sizeof(":void)") - 1) == 0)
    cursor += strcspn(cursor, ")"); /* skip void parameter list */

argCursor = args->value;
declStart = NULL;

while (*argCursor != ')' && *argCursor != '\0') {
    /*
    ** If the parameters have been exhausted, issue a warning and use the
    ** actual argument types (promoted where needed) for the remaining
    ** arguments.
    */
```

```
if (*cursor == ')' || *cursor == '\0') {
    warning(curFileNum, curLineNum,
      "Function called with too many arguments.");
    noPrototype = TRUE;
    cursor = argCursor;
}
/*
** If a "..." parameter specifier is encountered, use the actual
** argument types (promoted where needed) for the remaining arguments.
*/
} else if (strncmp(cursor, "...", sizeof("...") - 1) == 0) {
    noPrototype = TRUE;
    cursor = argCursor;
}

/*
** Extract the type of the current parameter.
*/
while (*cursor != ':' && *cursor != ',' && *cursor != ')' &&
  *cursor != '\0')
      cursor += firstFieldWidth(cursor);        /* skip over name */

if (*cursor == ':') {
    /*
    ** Copy the type from the declaration, converting any array
    ** bounds to pointer indirections.
    */
    cursor += 1;          /* advance to start of type info */
    declStart = cursor;

    while (*cursor != ',' && *cursor != ')' && *cursor != '\0')
        cursor += firstFieldWidth(cursor);

    tempArgType = newString(cursor - declStart, "");

    while (*declStart == '[') {
        strcat(tempArgType, "*");
        declStart += firstFieldWidth(declStart);
    }

    strncat(tempArgType, declStart, cursor - declStart);

    /*
    ** If there is no prototype, promote the parameter type if
    ** necessary.
    */
    if (noPrototype) {
        freeString(tempRuleValue->type);
        tempRuleValue->type = tempArgType;
        freeString(tempRuleValue->value);
        tempRuleValue->value = newString(DUP, "0");

        if (isIntegralType(tempRuleValue->type))
            promote(tempRuleValue);
        else if (strcmp(tempRuleValue->type, Float) == 0)
            convertType(tempRuleValue, Double);

        tempArgType = tempRuleValue->type;
        tempRuleValue->type = NULL;
    }

} else {
    warning(curFileNum, curLineNum,
      "Parameter type not specified in prototype; int assumed");
    tempArgType = newString(DUP, SignedInt);
```

```
/*
** Extract the value of the current argument and remove the
** surrounding parentheses.
*/
argStart = argCursor;

while (*argCursor != '\0' && *argCursor != ':')
    argCursor += firstFieldWidth(argCursor);

argument = newString(argCursor - argStart, argStart);
freeString(tempRuleValue->value);
tempRuleValue->value = unparenthesize(argument);
freeString(argument);

/*
** Extract the type of the current argument.
*/
if (*argCursor == ':') {
    argCursor += 1;        /* advance to start of type info */
    declStart = argCursor;

    while (*argCursor != ',' && *argCursor != ')' && *argCursor != '\0')
        argCursor += firstFieldWidth(argCursor);

    freeString(tempRuleValue->type);
    tempRuleValue->type = newString(argCursor - declStart, declStart);

} else {
    warning(curFileNum, curLineNum,
      "Argument type not specified in call; int assumed");
    freeString(tempRuleValue->type);
    tempRuleValue->type = newString(DUP, SignedInt);
}

/*
** Create a temporary variable of the required parameter type and
** convert the argument to that type.
*/
tempArgName = newTempVariable(tempArgType);
convertType(tempRuleValue, tempArgType);

/*
** If the new value is a redundant conversion function call,
** replicate the argument of that function call into the
** temporary; otherwise replicate the new value.
*/
if (isRedundantConversion(tempRuleValue->value, tempArgType)) {
    argument = unparenthesize(tempRuleValue->value +
    strcspn(tempRuleValue->value, "("));
    replicate(tempArgType, argument, tempArgName);
    freeString(argument);

} else {
    replicate(tempArgType, tempRuleValue->value, tempArgName);
}

freeString(tempArgType);

/*
** Append the temporary name to the substitute argument list.
*/
oldTempArgList = tempArgList;
tempArgList = catenate3(FullSep, oldTempArgList, ",", tempArgName);
freeString(oldTempArgList);
freeString(tempArgName);
```

```
        /*
        ** Advance the parameter cursor to the start of the next parameter.
        */
        while (*cursor != ',' && *cursor != '\0')
            cursor += firstFieldWidth(cursor);

        cursor += strspn(cursor, " ,");         /* skip over delimiters */

        /*
        ** Advance the argument cursor to the start of the next argument.
        */
        while (*argCursor != ',' && *argCursor != '\0')
            argCursor += firstFieldWidth(argCursor);

        argCursor += strspn(argCursor, " ,");   /* skip over delimiters */
    }

    /*
    ** If the parameter specifications are not exhausted, issue a warning.
    */
    if (*cursor != '.' && *cursor != ')' && *cursor != '\0')
        warning(curLineNum, curFileNum,
          "Function called with too few arguments.");

    /*
    ** Emit the PIL for the function call.
    */
    freeString(funcDecls);
    directive = catenate5(FullSep, "call", funcName->value, "(",
      tempArgList, ") no alias");
    writePIL(directive);
    freeString(directive);
    freeString(tempArgList);
    writePIL("proc return");
    freeRuleValue(tempRuleValue);
    return result;
}


/*
** Function "prepareForUse" performs the following actions on a value that
** is about to be used:  If the type is NULL, it is changed to void.  If the
** type is array or function, it is changed to a pointer.  If the type is
** enumeration constant, the value is changed to the value of that constant.
*/
void
prepareForUse(ruleValue)
    YYSTYPE ruleValue;          /* rule value whose value is to be used */
{
    char *newType;              /* new type for rule value */
    char *newValue;             /* new value for rule value */


    /*
    ** Do nothing for a NULL rule value.
    */
    if (ruleValue == NULL)
        return;

    /*
    ** If the rule value has no type, assume void.
    */
    if (ruleValue->type == NULL) {
        ruleValue->type = newString(DUP, Void);
```

```
    /*
    ** If the rule value has no value, assume "0".
    */
    if (ruleValue->value == NULL)
        ruleValue->value = newString(DUP, "0");

    /*
    ** If the type is array or function, change it to pointer and change
    ** the value to the address of the array or function.
    */
    } else if (*ruleValue->type == '[' || *ruleValue->type == '(') {
        if (*ruleValue->type == '[')
            newType = catenate2(NoSep, "*", ruleValue->type +
                firstFieldWidth(ruleValue->type));
        else
            newType = catenate2(NoSep, "*", ruleValue->type);

        newValue = addressOf(ruleValue->value, ruleValue->type);
        freeString(ruleValue->type);
        ruleValue->type = newType;
        freeString(ruleValue->value);
        ruleValue->value = newValue;

    /*
    ** If the type is enumeration constant, replace the rule value with
    ** the value of the enumeration constant.
    */
    } else if (strncmp(ruleValue->type, "enum ", sizeof("enum ") - 1) == 0) {
        freeString(ruleValue->value);
        ruleValue->value = newString(DUP, strrchr(ruleValue->type, ' ') + 1);
        freeString(ruleValue->type);
        ruleValue->type = newString(DUP, SignedInt);
    }
}


/*
** Function "promote" promotes integral types whose size is smaller than
** that of a signed integer to either a signed integer (if it is big
** enough to hold all values of the type) or an unsigned integer.  If the
** function is called for a non-integral type, it does nothing other than
** return FALSE to indicate the error.
*/
BOOL                            /* TRUE if promotion successful */
promote(ruleValue)
    YYSTYPE ruleValue;          /* address of rule value to be promoted */
{
    int bitfieldSize;           /* size of a bit-field */


    /*
    ** Indicate failure if argument is NULL.
    */
    if (ruleValue == NULL)
        return FALSE;

    /*
    ** If type is missing, assume void.
    */
    if (ruleValue->type == NULL)
        ruleValue->type = newString(DUP, Void);

    /*
    ** If the value is a char, promote it to signed integer.
    */
    if (strcmp(ruleValue->type, SignedChar) == 0 ||
```

```
    if (strcmp(ruleValue->type, UnsignedChar) == 0)
        return convertType(ruleValue, SignedInt);

    /*
    ** If the value is a short, promote it to signed integer (if it fits)
    ** or unsigned integer.
    */
    if (strcmp(ruleValue->type, SignedShort) == 0)
        return convertType(ruleValue, SignedInt);

    if (strcmp(ruleValue->type, UnsignedShort) == 0) {
        if (sizeOfShort < sizeOfInt)
            return convertType(ruleValue, SignedInt);
        else
            return convertType(ruleValue, UnsignedInt);
    }

    /*
    ** If the value is a bit-field, promote it to signed integer (if it fits)
    ** or unsigned integer.
    */
    if (*ruleValue->type == ':') {
        bitfieldSize = atoi(ruleValue->type + 1);

        if (bitfieldSize < BITS_PER_BYTE*sizeOfInt ||
          strstr(ruleValue->type, "unsigned") == NULL)
            return convertType(ruleValue, SignedInt);
        else
            return convertType(ruleValue, UnsignedInt);
    }

    /*
    ** If we get here, there is nothing to do if the value is an integral
    ** type, and promotion is not possible if it is not an integral type.
    */
    return strcmp(ruleValue->type, SignedInt) == 0 ||
      strcmp(ruleValue->type, UnsignedInt) == 0 ||
      strcmp(ruleValue->type, SignedLong) == 0 ||
      strcmp(ruleValue->type, UnsignedLong) == 0;
}
```

jcomuzzi@pss2

~~c2pil.c~~ fns_q2t.c

SPARCprinter

Fri Oct 27 17:42:22 1995

NeWSprint 2.0

Openwin library 3

NeWSprint interpreter 3.000

NeWSprint 2.0

```
/**************************************************************/
/*                                                            */
/*      Copyright (c) 1995 Peritus Software Services, Inc.    */
/*        All Rights Reserved                                 */
/*                                                            */
/*      THIS IS UNPUBLISHED PROPRIETARY SOURCE CODE OF        */
/*      Peritus Software Services, Inc.                       */
/*                                                            */
/*      This program contains confidential and proprietary    */
/*      information of Peritus Software Services, Inc., and   */
/*      any reproduction, disclosure, or use in whole or in   */
/*      part is expressly prohibited, except as may be        */
/*      specifically authorized by prior written agreement or */
/*      permission of Peritus.                                */
/*                                                            */
/*      The copyright notice above does not evidence any      */
/*      actual or intended publication of such source code.   */
/*                                                            */
/**************************************************************/
```

```
/*
** This file contains those "c2pil" support functions whose name begin with
** the letters "q" through "t".
*/

#include <ctype.h>
#include <stdio.h>
#include <stdlib.h>
#include <string.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "scanner.h"


/*
** Function "replicate" is a recursive routine that emits the PIL code
** needed to copy a variable.  Arrays are copied an element at a time in a
** loop.  Structures are copied a member at a time.  Unions are copied as
** a monolithic block of memory.  It is the caller's responsibility to
** ensure that both the source and target exist and are of the specified
** type.
*/
void
replicate(type, sourceName, targetName)
    char *type;                         /* type that is to be replicated */
    char *sourceName;                   /* name of source object */
    char *targetName;                   /* name of target object */
{
    long  arrayBnd;                     /* type's first array bound */
    char *arrayIdxVar;                  /* name given to array index var */
    char *arraySize;                    /* number elements in an array */
    char *cursor;                       /* cursor for type definition */
    char *diagnostic;                   /* an error message */
    char *directive;                    /* a PIL directive */
    char *limit;                        /* limit value for a loop */
    char *memberName;                   /* name of a structure member */
    char *sourceAddr;                   /* PIL for location of source object */
    char *sourceBlock;                  /* PIL to treat source as mem block */
    char *sourceChildName;              /* full name of source struct member */
```

```
char *subscriptedSourceName;          /* PIL for a source array element */
char *subscriptedTargetName;          /* PIL for a target array element */
char *targetAddr;                     /* PIL for location of target object */
char *targetBlock;                    /* PIL to treat target as mem block */
char *targetChildName;                /* full name of target struct member */
char *unionCast;                      /* cast of a union to a char array */

/*
** Do nothing if any argument is NULL.
*/
if (type == NULL || sourceName == NULL || targetName == NULL)
    return;

/*
** If we are dealing with an array type, emit PIL code to replicate the
** elements of the array in a loop.
*/
cursor = type;

if (*cursor == '[') {
    startBlock();
    arrayIdxVar = newTempVariable(SignedInt);
    directive = catenate3(FullSep, "assign", arrayIdxVar, "= 0");
    writePIL(directive);
    freeString(directive);
    cursor += 1;
    arrayBnd = atol(cursor);
    cursor += strcspn(cursor, "]");
    cursor += strspn(cursor, "] ");
    startBlock();
    limit = longToString(arrayBnd);
    directive = catenate5(FullSep, "do (", arrayIdxVar, "<", limit, ")");
    writePIL(directive);
    freeString(directive);
    freeString(limit);
    subscriptedSourceName = subscriptedRef(sourceName, arrayIdxVar);
    subscriptedTargetName = subscriptedRef(targetName, arrayIdxVar);
    replicate(cursor, subscriptedSourceName, subscriptedTargetName);
    freeString(subscriptedTargetName);
    freeString(subscriptedSourceName);
    directive = catenate5(FullSep, "assign", arrayIdxVar, "=", arrayIdxVar,
      "+ 1");
    writePIL(directive);
    freeString(directive);
    terminateBlock("enddo");
    terminateBlock("endblock");
    freeString(arrayIdxVar);

/*
** If we are dealing with a structure, recursively replicate each member
** in its definition.
*/
} else if (strncmp(cursor, "struct ", sizeof("struct ") - 1) == 0) {
    /*
    ** Locate the structure's definition.
    */
    cursor = locateDefinition(cursor);

    if (cursor == NULL) {
        diagnostic = catenate2(NoSep, "Cannot find definition for ",
          sourceName);
        warning(curFileNum, curLineNum, diagnostic);
        freeString(diagnostic);
        return;      /* can't find a definition */
    }
```

```
        /*
        ** Iterate through the structure definition, replicating each member.
        */
        cursor += strspn(cursor, " ");   /* skip over any leading spaces */

        while (*cursor != '\0') {
            /*
            ** Replicate current member.
            */
            memberName = cursor;
            cursor += strcspn(cursor, ":");        /* skip over member name */
            memberName = newString(cursor - memberName, memberName);
            sourceChildName = catenate3(FullSep, sourceName, ".", memberName);
            targetChildName = catenate3(FullSep, targetName, ".", memberName);
            cursor += 1;                           /* skip over ':' */
            replicate(cursor, sourceChildName, targetChildName);
            freeString(targetChildName);
            freeString(sourceChildName);
            freeString(memberName);

            /*
            ** Advance cursor to next member.
            */
            while (*cursor != ';' && *cursor != '\0')
                cursor += firstFieldWidth(cursor);

            cursor += strspn(cursor, " ;");
        }

    /*
    ** If we are dealing with a union, replicate it as though it were a
    ** monolithic block of memory (i.e., cast the source and target unions
    ** to character arrays and use array assignment).
    */
    } else if (strncmp(cursor, "union ", sizeof("union ") - 1) == 0) {
        arraySize = longToString(sizeOfType(cursor));
        unionCast = catenate4(PartSep, "[", arraySize, "]", SignedChar);
        sourceAddr = catenate2(FullSep, "@", sourceName);
        sourceBlock = indirectRef(sourceAddr, "0", unionCast);
        targetAddr = catenate2(FullSep, "@", targetName);
        targetBlock = indirectRef(targetAddr, "0", unionCast);
        directive = catenate4(FullSep, "assign", targetBlock, "=", sourceBlock);
        writePIL(directive);
        freeString(directive);
        freeString(targetBlock);
        freeString(targetAddr);
        freeString(sourceBlock);
        freeString(sourceAddr);
        freeString(unionCast);
        freeString(arraySize);

    /*
    ** If we are not dealing with an array, structure or union, then a simple
    ** assignment is all that is needed to replicate the object.
    */
    } else {
        directive = catenate4(FullSep, "assign", targetName, "=", sourceName);
        writePIL(directive);
        freeString(directive);
    }
}


/*
** Function "setConstantPrecision" returns a string representing a
```

```
** constant as it would appear on the target processor.
**
** The result parameter holds the constant as a signed long
** on our host processor.  Now we have to convert it to the
** proper type for the target processor.  Since the target can
** have different sizes for variable types than our host,
** we use a left-shift (zero fill) right-shift (sign or zero extension)
** strategy to correct the precision.
**
** The return string is allocated on the heap.  It is the responsibility
** of the caller to free the storage once it is no longer needed.
*/
char *                          /* Constant represented as a string */
setConstantPrecision(value, type)
    long  value;                /* Value of constant */
    char *type;                 /* Constant type */
{
    int precision;              /* desired precision of result */
    int shift;                  /* a shift count */


    if (type == NULL)
        type = Void;            /* treat NULL type as "void" */

    if (*type == ':')           /* bit-field */
        precision = atoi(type + 1);
    else if (strcmp(type, SignedChar) == 0)
        precision = sizeOfChar*BITS_PER_BYTE;
    else if (strcmp(type, UnsignedChar) == 0)
        precision = sizeOfChar*BITS_PER_BYTE;
    else if (strcmp(type, SignedShort) == 0)
        precision = sizeOfShort*BITS_PER_BYTE;
    else if (strcmp(type, UnsignedShort) == 0)
        precision = sizeOfShort*BITS_PER_BYTE;
    else if (strcmp(type, SignedInt) == 0)
        precision = sizeOfInt*BITS_PER_BYTE;
    else if (strcmp(type, UnsignedInt) == 0)
        precision = sizeOfInt*BITS_PER_BYTE;
    else if (strcmp(type, SignedLong) == 0)
        precision = sizeOfLong*BITS_PER_BYTE;
    else if (strcmp(type, UnsignedLong) == 0)
        precision = sizeOfLong*BITS_PER_BYTE;
    else
        precision = sizeof(value)*BITS_PER_BYTE;

    shift = sizeof(value)*BITS_PER_BYTE - precision;

    if (strstr(type, "unsigned") == NULL)       /* signed value */
        return longToString((value << shift) >> shift);
    else                                        /* unsigned value */
        return unsignedLongToString(((unsigned long)value << shift) >> shift);
}


/*
** Function "setSourceLocation" records the current source file number and
** source line number in the private global variables "curFileNum" and
** "curLineNum" for subsequent use by functions such as "startBlock"
** "terminateBlock" and "writePIL".
*/
void
setSourceLocation(fileNum, lineNum)
    int fileNum;                /* new source file number */
    int lineNum;                /* new source line number */
{
    curFileNum = fileNum;
```

```
    curLineNum = lineNum;
}


/*
** Function "sizeOfType" calculates the number of bytes of storage required
** to hold an object of a specified type.  The type must be specified in the
** normalized internal representation.  The function returns -1 if it detects
** any errors in the type specification.
*/
long                            /* -1 or decimal size of specified type */
sizeOfType(type)
    char *type;                 /* internal representation of type */
{
    long bitSize;               /* size of "type" in bits */

    bitSize = bitSizeOfType(type, NULL);

    if (bitSize <= 0)
        return -1;

    return (bitSize + BITS_PER_BYTE - 1)/BITS_PER_BYTE;
}


/*
** Function "startBlock" starts a new block.  This consists of writing a
** "proc" directive then incrementing the block level index.
*/
void
startBlock()
{
    writePIL("proc");
    blockIdx += 1;

    if (blockIdx >= MAX_LEVELS)
        fatalError(curFileNum, curLineNum,
          "Internal block level limit exceeded.");
}


/*
** Function "startCaptureBlock" saves the current capture block on the capture
** stack, starts a new capture block and turns on the "capturePIL" global flag
** so that subsequent calls to the "writePIL" function will write to the new
** capture block.  Writing to the new capture block can be suspended at any
** time by turning off the "capturePIL" flag and can later be resumed by
** turning it on again.  When the "capturePIL" flag is off, "writePIL" writes
** to the end of the previous capture block (if one exists) or to the PIL
** output file.  When the new capture block is no longer needed, it is
** disposed of by calling "terminateCaptureBlock".  That function will either
** write the captured PIL to the PIL output file, return it in a dynamic
** string or just discard it, as well as restore the previous capture block
** (if there is one).
*/
void
startCaptureBlock()
{
    int  captureChar;           /* a character from the capture block file */
    long endOfBlock;            /* position of end of capture block file */
    long filePos;               /* file position of "captureChar" */
    long oldStackBase;          /* last block of stack file before a push */

    /*
```

```
** Create the capture block file if it has not already been created.
*/
if (captureBlockFile == NULL) {
    captureBlockFile = tmpfile();

    if (captureBlockFile == NULL)
        fatalError(curFileNum, curLineNum,
          "Cannot create PIL capture block file.");
}

/*
** Create the capture stack file if it has not already been created.
*/
if (captureStackFile == NULL) {
    captureStackBase = 0;
    captureStackFile = tmpfile();

    if (captureStackFile == NULL)
        fatalError(curFileNum, curLineNum,
          "Cannot create PIL capture stack file.");
}

/*
** If a capture block already exists, push it onto the end of the capture
** stack file.
*/
if (captureBlockCnt > 0) {
    /*
    ** Copy the values of "capturePIL" and "captureStackBase" to the end
    ** of the capture stack file.
    */
    oldStackBase = captureStackBase;
    captureStackBase = ftell(captureStackFile);

    if (fwrite(&capturePIL, sizeof(capturePIL), 1, captureStackFile) != 1 ||
      fwrite(&oldStackBase, sizeof(oldStackBase), 1, captureStackFile) != 1)
        fatalError(curFileNum, curLineNum,
          "Unable to write to PIL capture stack file.");

    /*
    ** Copy the current capture block to the end of the capture stack file.
    */
    endOfBlock = ftell(captureBlockFile);

    if (fseek(captureBlockFile, 0L, SEEK_SET) != 0)
        fatalError(curFileNum, curLineNum,
          "Unable to rewind PIL capture block file.");

    for (filePos = 0; filePos < endOfBlock; filePos += 1) {
        captureChar = fgetc(captureBlockFile);

        if (captureChar == EOF)
            fatalError(curFileNum, curLineNum,
              "Unable to read PIL capture block file.");

        if (fputc(captureChar, captureStackFile) == EOF)
            fatalError(curFileNum, curLineNum,
              "Unable to write PIL capture stack file.");
    }
}

/*
** Dispose of any data in the capture block file by rewinding it, then
** increment the capture block count and enable capturing.
*/
if (fseek(captureBlockFile, 0L, SEEK_SET) != 0)
```

```
        fatalError(curFileNum, curLineNum,
          "Unable to rewind PIL capture block file.");

    captureBlockNum += 1;
    capturePIL = TRUE;
}


/*
** Function "subscriptedRef" forms a PIL array reference.  The result string
** is allocated from the heap, so the caller is responsible for freeing it
** when it is no longer needed.
*/
char *                                  /* PIL array reference */
subscriptedRef(base, index)
    char *base;                         /* array that is to be subscripted */
    char *index;                        /* the subscript */
{
    char *baseHead;                     /* an initial substring of "base" */
    int   baseLen;                      /* length of "base" */
    char *result;                       /* PIL array reference */

    /*
    ** Return NULL if the arguments are obviously invalid.
    */
    if (base == NULL || base[strspn(base, " ")] == '\0')
        return NULL;

    if (index == NULL || index[strspn(index, " ")] == '\0')
        return NULL;

    /*
    ** If the base is already subscript, insert the index into it as another
    ** dimension.
    */
    baseLen = strlen(base);

    if (base[baseLen - 1] == ']') {
        baseHead = newString(baseLen - 1, base);
        result = catenate4(NoSep, baseHead, ", ", index, " ]");
        freeString(baseHead);

    /*
    ** If the last field of the base is not a subscript, then append the
    ** index to it as a subscript.
    */
    } else {
        result = catenate4(FullSep, base, "[", index, "]");
    }

    return result;
}


/*
** Function "terminateBlock" terminates the current block.  This consists of
** discarding all objects and tags defined in the block, incrementing the
** block number for the current block (so it is ready for the next time a
** block is entered at this level), decrementing the block level index and
** writing a "proc" PIL directive with a specified tag.
*/
void
terminateBlock(tag)
    char *tag;                  /* descriptive tag for the "proc" directive */
{
    char      directive[80];    /* the required "proc" directive */
```

```
    /*
    ** Discard all objects and tags that were declared in the block that
    ** is being terminated.  (Note that labels persist to the end of the
    ** function that declares them.)
    */
    discardSymbols(Objects);
    discardSymbols(Tags);

    /*
    ** Increment the block number for the current block, in case the parent
    ** block subsequently spawns a sibling to this block.
    */
    blockNum[blockIdx] += 1;

    /*
    ** If there is a higher block level, reset its block number since if it
    ** is subsequently entered, its parent will want it to start at zero
    ** rather than one more than whatever the current block's last child was.
    */
    if (blockIdx + 1 < MAX_LEVELS)
        blockNum[blockIdx + 1] = 0;

    /*
    ** Exit the current block by decrementing the block level index.
    */
    blockIdx -= 1;

    if (blockIdx < 0)
        fatalError(curFileNum, curLineNum,
          "Attempt to decrease block level past 0.");

    /*
    ** Write a "proc" directive with the specified tag.
    */
    strcpy(directive, "proc");

    if (tag != NULL && *tag != '\0') {
        strcat(directive, " ");
        strcat(directive, tag);
    }

    writePIL(directive);
}


/*
** Function "terminateCaptureBlock()" disposes of the current capture block
** and restores the previous capture block (if there was one) and the state
** of the "capturePIL" global flag.  The "disposition" argument determines
** whether the contents of the capture block are simply discarded, written
** out, or returned as the function value in a string allocated from the
** heap.  In the last case, the caller is responsible for freeing the
** string when it is no longer needed.
*/
char *                          /* NULL or contents of capture block */
terminateCaptureBlock(disposition)
    CapBlkDisp disposition;     /* DISCARD, EMIT or RETURN */
{
    int   captureChar;          /* a character from a capture file */
    long  endOfBlock;           /* logical end of capture block file */
    long  endOfStack;           /* logical end of capture stack file */
    long  filePos;              /* file position of "captureChar" */
    long  newEndOfStack;        /* end of capture stack file after a "pop" */
    char *returnValue;          /* function's return value */
```

```
FILE *targetFile;            /* capture stack file or PIL output file */

/*
** If no capture file has been established, disable capturing and return.
*/
returnValue = NULL;

if (captureBlockCnt < 1 || captureBlockFile == NULL) {
    capturePIL = FALSE;
    return returnValue;
}

/*
** If the contents of the capture block are to be written out, copy the
** current capture block to either the end of the previous capture block
** (if it exists) or the PIL output file.
*/
if (disposition == Emit) {
    if (captureBlockCnt > 1)
        targetFile = captureStackFile;
    else
        targetFile = pilFile;

    endOfBlock = ftell(captureBlockFile);

    if (fseek(captureBlockFile, 0L, SEEK_SET) != 0)
        fatalError(curFileNum, curLineNum,
          "Unable to rewind PIL capture block file.");

    for (filePos = 0; filePos < endOfBlock; filePos += 1) {
        captureChar = fgetc(captureBlockFile);

        if (captureChar == EOF)
            fatalError(curFileNum, curLineNum,
              "Unable to read PIL capture block file.");

        if (fputc(captureChar, targetFile) == EOF) {
            if (targetFile == captureStackFile)
                fatalError(curFileNum, curLineNum,
                  "Unable to write to capture stack file.");
            else
                fatalError(curFileNum, curLineNum,
                  "Unable to write to PIL output file.");
        }
    }

/*
** If the contents of the capture block are to be returned in a string,
** allocate the string and copy the capture block into it.
*/
} else if (disposition == Return) {
    endOfBlock = ftell(captureBlockFile);
    returnValue = newString(endOfBlock + 1, "");

    if (fseek(captureBlockFile, 0L, SEEK_SET) != 0)
        fatalError(curFileNum, curLineNum,
          "Unable to rewind PIL capture block file.");

    for (filePos = 0; filePos < endOfBlock; filePos += 1) {
        captureChar = fgetc(captureBlockFile);

        if (captureChar == EOF)
            fatalError(curFileNum, curLineNum,
              "Unable to read PIL capture block file.");
```

```
            returnValue[filePos] = captureChar;

    }

    /*
    ** Dispose of the current capture block by rewinding its file and
    ** decrementing the capture block count.  If the new block count shows
    ** that the capture stack is empty, disable capturing and return.
    */
    if (fseek(captureBlockFile, 0L, SEEK_SET) != 0)
        fatalError(curFileNum, curLineNum,
          "Unable to rewind PIL capture block file.");

    captureBlockCnt -= 1;

    if (captureBlockCnt == 0) {
        capturePIL = FALSE;
        return returnValue;
    }

    /*
    ** Pop the previous capture block from the capture stack file and copy
    ** it to the capture block file.
    */
    endOfStack = ftell(captureStackFile);
    newEndOfStack = captureStackBase;

    if (fseek(captureStackFile, captureStackBase, SEEK_SET) != 0)
        fatalError(curFileNum, curLineNum,
          "Unable to position PIL capture stack file.");

    if (fread(&capturePIL, sizeof(capturePIL), 1, captureStackFile) != 1 ||
      fread(&captureStackBase, sizeof(captureStackBase), 1, captureStackFile)
      != 1)
        fatalError(curFileNum, curLineNum,
          "Unable to read PIL capture stack file.");

    for (
      filePos = ftell(captureStackFile);
      filePos < endOfStack;
      filePos += 1) {
        captureChar = fgetc(captureStackFile);

        if (captureChar == EOF)
            fatalError(curFileNum, curLineNum,
              "Unable to read PIL capture stack file.");

        if (fputc(captureChar, captureBlockFile) == EOF)
            fatalError(curFileNum, curLineNum,
              "Unable to write to PIL capture block file.");
    }

    /*
    ** Position the capture stack file at the end of the new last stacked
    ** block.
    */
    if (fseek(captureStackFile, newEndOfStack, SEEK_SET) != 0)
        fatalError(curFileNum, curLineNum,
          "Unable to position PIL capture stack file.");

    return returnValue;
}

/*
** Function "terminateLogicalAnd" completes the PIL for the logical AND
```

```
** construct that was begun in "initiateLogicalAnd". The construct must
** be split between the two functions so that the PIL for the RHS can
** be properly placed in the outer if-then block created for the LHS,
** so that the RHS is never evaluated if the LHS determines the outcome
** of the entire expression. This function performs some optimization
** to eliminate unnecessary if-then blocks for cases when the LHS and/or
** RHS evaluate to constants.
**
** The result of the logical AND is returned as a new rule value allocated
** on the heap. It is the responsibility of the caller to free the space
** once it is no longer required.
*/
YYSTYPE                                     /* new rule value */
terminateLogicalAnd(leftRule, resultRule, rightRule)
    YYSTYPE  leftRule;                      /* left operand rule value */
    YYSTYPE  resultRule;                    /* temp variable rule */
    YYSTYPE  rightRule;                     /* right operand rule value */
{
    char *directive;                /* PIL directive */
    YYSTYPE eval;                   /* evaluated expression rule Value */
    BOOL  leftFlag;                 /* if TRUE, write PIL for left side */
    char *leftOp;                   /* left operand string */
    BOOL  rightFlag;                /* if TRUE, write PIL for right side */
    char *rightOp;                  /* right operand string */


    if (leftRule == NULL)
        fatalError( 0, 0, "Left expression missing on logical And\n");

    if (rightRule == NULL)
        fatalError( 0, 0, "Right expression missing on logical And\n");

    leftFlag = TRUE;
    rightFlag = TRUE;

    /*
    ** Convert the rule values and types to a boolean representation
    */
    if (strcmp(leftRule->type, Boolean) != 0)
        convertType(leftRule, Boolean);

    if (strcmp(rightRule->type, Boolean) != 0)
        convertType(rightRule, Boolean);

    /*
    ** Determine if the boolean values specify constants
    */
    if (strcmp(leftRule->value, "_TRUE") == 0 ||
      strcmp(leftRule->value, "_FALSE") == 0)
        leftFlag = FALSE;

    if (strcmp(rightRule->value, "_TRUE") == 0 ||
      strcmp(rightRule->value, "_FALSE") == 0)
        rightFlag = FALSE;

    leftOp = leftRule->value;
    rightOp = rightRule->value;

    /*
    ** Create the return rule value
    */
    eval = newRuleValue(leftRule->fileNum, leftRule->lineNum,
      SignedInt, resultRule->value );

    /*
    ** Determine whether both operands are constants, and evaluate the
```

```
** expression if this is so
*/
if (!leftFlag && !rightFlag) {
    if (strcmp(leftOp, "_TRUE") == 0 && strcmp(rightOp, "_TRUE") == 0)
        directive = catenate3(FullSep, "assign", eval->value, "= 1");

    else
        directive = catenate3(FullSep, "assign", eval->value, "= 0");

    writePIL(directive);
    freeString(directive);
}

/*
** Left operand is a constant; Check to see if entire expression
** evaluates to 0, and emit the appropriate PIL assign if so.
*/
else if (!leftFlag && strcmp(leftOp, "_FALSE") == 0) {
    directive = catenate3(FullSep, "assign", eval->value, "= 0");
    writePIL(directive);
    freeString(directive);
    rightFlag = FALSE;
}

/*
** Right operand is a constant; Check to see if entire expression
** evaluates to 0, and emit the appropriate PIL assign if so.
*/
else if (!rightFlag) {
    directive = (strcmp(rightOp, "_FALSE") == 0) ?
      catenate3(FullSep, "assign", eval->value, "= 0") :
      catenate3(FullSep, "assign", eval->value, "= 1");
    writePIL(directive);
    freeString(directive);
}

/*
** Convert the right half of the logical expression into an
** if-then-else PIL construct, if it is not a constant and the
** expression has not already been resolved.
*/
if (rightFlag)
    startBlock();
    directive = catenate3(FullSep, "if (", rightOp, ")");
    writePIL(directive);
    freeString(directive);
    directive = catenate3(FullSep, "assign", eval->value, "= 1");
    writePIL(directive);
    freeString(directive);
    advanceBlockNumber();
    directive = catenate3(FullSep, "if ^ (", rightOp, ")");
    writePIL(directive);
    freeString(directive);
    directive = catenate3(FullSep, "assign", eval->value, "= 0");
    writePIL(directive);
    freeString(directive);
    terminateBlock("endif");
}

/*
** Complete the PIL "if-else" construct begun in "initateLogicalAnd".
*/
advanceBlockNumber();
directive = catenate3(FullSep, "if ^ (", leftOp, ")");
writePIL(directive);
freeString(directive);
```

```
    directive = catenate3(FullSep, "assign", eval->value, "= 0");
    writePIL(directive);
    freeString(directive);
    terminateBlock("endif");

    return eval;
}

/*
** Function "terminateLogicalOr" completes the PIL for the logical OR
** construct that was begun in "initiateLogicalOr".  The construct must
** be split between the two functions so that the PIL for the RHS can
** be properly placed in the outer "if " block created for the LHS,
** so that the RHS is never evaluated if the LHS determines the outcome
** of the entire expression.  This function performs some optimization
** to eliminate unnecessary if-then blocks for cases when the LHS and/or
** RHS evaluate to constants.
**
** The result of "initiateLogicalOr" is always passed in as the LHS of
** the expression, so it is always a temporary variable value.
**
** The result of the logical AND is returned as a new rule value allocated
** on the heap.  It is the responsibility of the caller to free the space
** once it is no longer required.
*/
YYSTYPE                             /* new rule value */
terminateLogicalOr(leftRule, rightRule)
    YYSTYPE  leftRule;              /* left operand rule value */
    YYSTYPE  rightRule;             /* right operand rule value */
{
    char    *directive;             /* PIL directive */
    YYSTYPE eval;                   /* evaluated expression rule Value */
    BOOL    rightFlag;              /* if TRUE, write PIL for right side */
    char    *rightOp;               /* right operand string */

    if (leftRule == NULL)
        fatalError( 0, 0, "Left expression missing on logical Or\n");

    if (rightRule == NULL)
        fatalError( 0, 0, "Right expression missing on logical Or\n");

    rightFlag = TRUE;

    /*
    ** Create the return rule value
    */
    eval = newRuleValue(leftRule->fileNum, leftRule->lineNum,
        SignedInt, leftRule->value);

    /*
    ** Convert the rule values and types to a boolean representation
    */
    convertType(leftRule, Boolean);

    if (strcmp(rightRule->type, Boolean) != 0)
        convertType(rightRule, Boolean);

    if (strcmp(rightRule->value, "_TRUE") == 0 ||
        strcmp(rightRule->value, "_FALSE") == 0)
        rightFlag = FALSE;

    rightOp = rightRule->value;

    /*
```

```
    ** Right operand is a constant; Check to see if entire expression
    ** evaluates to 1, and emit the appropriate PIL assign if so.
    */
    if (!rightFlag) {
        directive = (strcmp(rightOp, "_TRUE") == 0) ?
            catenate3(FullSep, "assign", eval->value, "= 1") :
            catenate3(FullSep, "assign", eval->value, "= 0");
        writePIL(directive);
        freeString(directive);
    }

    /*
    ** Convert the right half of the logical expression into an
    ** if-then-else PIL construct, if it is not a constant and the
    ** expression has not already been resolved.
    */
    else {
        startBlock();
        directive = catenate3(FullSep, "if (", rightOp, ")");
        writePIL(directive);
        freeString(directive);
        directive = catenate3(FullSep, "assign", eval->value, "= 1");
        writePIL(directive);
        freeString(directive);
        advanceBlockNumber();
        directive = catenate3(FullSep, "if ^ (", rightOp, ")");
        writePIL(directive);
        freeString(directive);
        directive = catenate3(FullSep, "assign", eval->value, "= 0");
        writePIL(directive);
        freeString(directive);
        terminateBlock("endif");
    }

    /*
    ** Complete the PIL "if-else" construct begun in "initateLogicalOr".
    */
    terminateBlock("endif");

    return eval;
}

/*
** Function "transformValue" generates the required PIL code to convert a
** specified value from one type to another.  The function returns NULL if
** it is unable to perform the specified conversion.  The converted value
** is allocated from the heap, so it is the user's responsibility to free
** it when it is no longer needed.
*/
char *                          /* NULL or converted value */
transformValue(value, oldType, newType)
    char *value;                /* value to be converted */
    char *oldType;              /* old type of value */
    char *newType;              /* desired new type for value */
{
    char *argument;             /* argument of a conversion function call */
    int   bitfieldSize;         /* size of a bit-field */
    char *funcName;             /* name of required conversion function */
    char *newValue;             /* converted value */

    if (value == NULL || oldType == NULL || newType == NULL)
        return NULL;            /* invalid arguments */

    /*
```

```
** If the new type is "void", just return an empty string.
*
if (strcmp(newType, Void) == 0)
    return newString(DUP, "");

/*
** If the old type is enumeration constant, replace the value with the
** value of the enumeration constant.
*
if (strncmp(oldType, "enum ", sizeof("enum ") - 1) == 0) {
    value = strchr(oldType, ' ') + 1;
    oldType = SignedInt;
}

/*
** If the value already has the desired type, just copy it.
*
if (strcmp(oldType, newType) == 0)
    return newString(DUP, value);

/*
** If the old type is a boolean, generate the PIL to convert it
** to the new type.  Return NULL if the new type is not
** boolean compatible.
*
if (strcmp(oldType, Boolean) == 0)
    return convertFromBoolean(value, newType, NULL);

/*
** If the new type is a boolean, generate a PIL expression that
** evaluates to TRUE if the value is non-zero.  If the expression
** is an integer constant, then substitute the appropriate PIL
** boolean representation.
*/
if (strcmp(newType, Boolean) == 0) {
    if (value[strspn(value, INT_CONSTANT_CHARS)] == '\0')
        return (strcmp(value,"0") == 0) ?
          newString(DUP, "_FALSE") : newString(DUP, "_TRUE");

    else {
        if (isFloatingType(oldType))
            warningForFloatUsage();

        return (isIntegralType(oldType)) ?
          catenate2(FullSep, value, "^ = 0") :
          catenate2(FullSep, value, "^ = 0.0");
    }
}

/*
** If the new type is a pointer, attempt to convert the value to a
** pointer.  If it is a pointer of a different type, just copy it.
** If it is an array or function, return its address.  If it is the
** constant 0, change it to "_NULL".  If it is any other integer
** constant, just copy it.  If it is any other integral value, wrap
** the value in a "_ptr" conversion function.  Otherwise return NULL
** to indicate we don't know how to deal with it.
*/
if (*newType == '*') {
    if (*oldType == '*')
        newValue = newString(DUP, value);
    else if (*oldType == '[' || *oldType == '(')
        newValue = catenate2(FullSep, "@", value);
    else if (strcmp(value , "0") == 0)
        newValue = newString(DUP, "_NULL");
    else if (value[strspn(value, INT_CONSTANT_CHARS)] == '\0')
```

```
        newValue = newString(DUP, value);
    else if (isIntegralType(oldType))
        newValue = catenate3(FullSep, "_ptr (", value, ")");
    else
        newValue = NULL;

    return newValue;
}

/*
** If the new type is a bit-field, the old type must be an integral or
** floating point type.  If it is floating point, convert it to a
** signed or unsigned integer.  If it is an integer constant, fold it
** to the required precision.
*/
if (*newType == ':') {
    if (value[strspn(value, INT_CONSTANT_CHARS)] == '\0') {
        newValue = setConstantPrecision(convertStrToBin(value), newType);

    } else if (isFloatingType(oldType)) {
        warningForFloatUsage();

        if (strstr(newType, "unsigned") == NULL)
            newValue = catenate3(FullSep, "_f_to_int (", value, ")");
        else
            newValue = catenate3(FullSep, "_f_to_unsigned_int (", value,
              ")");

    } else if (!isIntegralType(oldType)) {
        newValue = NULL;
    }

    return newValue;
}

/*
** If the value is a bit-field, promote it to the smallest integral
** type that will hold its value before converting it to the target.
*/
if (*oldType == ':') {
    bitfieldSize = atoi(oldType + 1);

    if (bitfieldSize < BITS_PER_BYTE*sizeOfChar) {
        oldType = SignedChar;

    } else if (bitfieldSize == BITS_PER_BYTE*sizeOfChar) {
        if (strstr(oldType, "unsigned") == NULL)
            oldType = SignedChar;
        else
            oldType = UnsignedChar;

    } else if (bitfieldSize < BITS_PER_BYTE*sizeOfShort) {
        oldType = SignedShort;

    } else if (bitfieldSize == BITS_PER_BYTE*sizeOfShort) {
        if (strstr(oldType, "unsigned") == NULL)
            oldType = SignedShort;
        else
            oldType = UnsignedShort;

    } else if (bitfieldSize < BITS_PER_BYTE*sizeOfInt) {
        oldType = SignedInt;

    } else if (bitfieldSize == BITS_PER_BYTE*sizeOfInt) {
        if (strstr(oldType, "unsigned") == NULL)
            oldType = SignedInt;
```

```
        else
            oldType = UnsignedInt;

    } else if (strstr(oldType, "unsigned") == NULL) {
        oldType = SignedLong;

    } else {
        oldType = UnsignedLong;
    }
}

/*
** Determine the name of the conversion function needed.  No conversion
** function is needed if a value is being converted to a wider variety
** of the same type.
*/
if (strcmp(newType, LongDouble) == 0) {
    if (strcmp(oldType, LongDouble) == 0 ||
      strcmp(oldType, Double) == 0 ||
      strcmp(oldType, Float) == 0)
        funcName = NULL;
    else if (isIntegralType(oldType))
        funcName = "_i_to_long_double";
    else
        return NULL;          /* no conversion function for new type */

} else if (strcmp(newType, Double) == 0) {
    if (strcmp(oldType, Double) == 0 ||
      strcmp(oldType, Float) == 0)
        funcName = NULL;
    else if (strcmp(oldType, LongDouble) == 0)
        funcName = "_double";
    else if (isIntegralType(oldType))
        funcName = "_i_to_double";
    else
        return NULL;          /* no conversion function for new type */

} else if (strcmp(newType, Float) == 0) {
    if (strcmp(oldType, Float) == 0)
        funcName = NULL;
    else if (strcmp(oldType, LongDouble) == 0 ||
      strcmp(oldType, Double) == 0)
        funcName = "_float";
    else if (isIntegralType(oldType)) {
        warningForFloatUsage();
        funcName = "_i_to_float";
    }
    else
        return NULL;          /* no conversion function for new type */

} else if (strcmp(newType, UnsignedLong) == 0) {
    if (value[strspn(value, INT_CONSTANT_CHARS)] == '\0')
        return setConstantPrecision(convertStrToBin(value), UnsignedLong);
    else if (strcmp(oldType, UnsignedLong) == 0 ||
      strcmp(oldType, UnsignedInt) == 0 ||
      strcmp(oldType, UnsignedShort) == 0 ||
      strcmp(oldType, UnsignedChar) == 0)
        funcName = NULL;
    else if (*oldType == '*' || isIntegralType(oldType))
        funcName = "_unsigned_long";
    else if (isFloatingType(oldType)) {
        warningForFloatUsage();
        funcName = "_f_to_unsigned_long";
    }
    else
        return NULL;          /* no conversion function for new type */
```

```
} else if (strcmp(newType, SignedLong) == 0) {
    if (value[strspn(value, INT_CONSTANT_CHARS)] == '\0')
        return setConstantPrecision(convertStrToBin(value), SignedLong);
    else if (strcmp(oldType, SignedLong) == 0 ||
      (sizeOfLong > sizeOfInt &&
        strcmp(oldType, UnsignedInt) == 0) ||
      strcmp(oldType, SignedInt) == 0 ||
      (sizeOfLong > sizeOfShort &&
        strcmp(oldType, UnsignedShort) == 0) ||
      strcmp(oldType, SignedShort) == 0 ||
      strcmp(oldType, UnsignedChar) == 0 ||
      strcmp(oldType, SignedChar) == 0)
        funcName = NULL;
    else if (*oldType == '*' || isIntegralType(oldType))
        funcName = "_long";
    else if (isFloatingType(oldType)) {
        warningForFloatUsage();
        funcName = "_f_to_long";
    }
    else
        return NULL;         /* no conversion function for new type */

} else if (strcmp(newType, UnsignedInt) == 0) {
    if (value[strspn(value, INT_CONSTANT_CHARS)] == '\0')
        return setConstantPrecision(convertStrToBin(value), UnsignedInt);
    else if ((sizeOfInt >= sizeOfLong &&
        strcmp(oldType, UnsignedLong) == 0) ||
      strcmp(oldType, UnsignedInt) == 0 ||
      strcmp(oldType, UnsignedShort) == 0 ||
      strcmp(oldType, UnsignedChar) == 0)
        funcName = NULL;
    else if (*oldType == '*' || isIntegralType(oldType))
        funcName = "_unsigned_int";
    else if (isFloatingType(oldType)) {
        warningForFloatUsage();
        funcName = "_f_to_unsigned_int";
    }
    else
        return NULL;         /* no conversion function for new type */

} else if (strcmp(newType, SignedInt) == 0) {
    if (value[strspn(value, INT_CONSTANT_CHARS)] == '\0')
        return setConstantPrecision(convertStrToBin(value), SignedInt);
    else if ((sizeOfInt >= sizeOfLong &&
        strcmp(oldType, SignedLong) == 0) ||
      strcmp(oldType, SignedInt) == 0 ||
      (sizeOfInt > sizeOfShort &&
        strcmp(oldType, UnsignedShort) == 0) ||
      strcmp(oldType, SignedShort) == 0 ||
      strcmp(oldType, UnsignedChar) == 0 ||
      strcmp(oldType, SignedChar) == 0)
        funcName = NULL;
    else if (*oldType == '*' || isIntegralType(oldType))
        funcName = "_int";
    else if (isFloatingType(oldType)) {
        warningForFloatUsage();
        funcName = "_f_to_int";
    }
    else
        return NULL;         /* no conversion function for new type */

} else if (strcmp(newType, UnsignedShort) == 0) {
    if (value[strspn(value, INT_CONSTANT_CHARS)] == '\0')
        return setConstantPrecision(convertStrToBin(value), UnsignedShort);
    else if ((sizeOfShort >= sizeOfInt &&
```

```
        strcmp(oldType, UnsignedInt) == 0) ||
       strcmp(oldType, UnsignedShort) == 0 ||
       strcmp(oldType, UnsignedChar) == 0)
        funcName = NULL;
    else if (*oldType == '*' || isIntegralType(oldType))
        funcName = "_unsigned_short";
    else if (isFloatingType(oldType)) {
        warningForFloatUsage();
        funcName = "_f_to_unsigned_short";

    else
        return NULL;          /* no conversion function for new type */

} else if (strcmp(newType, SignedShort) == 0) {
    if (value[strspn(value, INT_CONSTANT_CHARS)] == '\0')
        return setConstantPrecision(convertStrToBin(value), SignedShort);
    else if ((sizeOfShort >= sizeOfInt &&
        strcmp(oldType, SignedInt) == 0) ||
       strcmp(oldType, SignedShort) == 0 ||
       strcmp(oldType, UnsignedChar) == 0 ||
       strcmp(oldType, SignedChar) == 0)
        funcName = NULL;
    else if (*oldType == '*' || isIntegralType(oldType))
        funcName = "_short";
    else if (isFloatingType(oldType)) {
        warningForFloatUsage();
        funcName = "_f_to_short";

    else
        return NULL;          /* no conversion function for new type */

} else if (strcmp(newType, UnsignedChar) == 0) {
    if (value[strspn(value, INT_CONSTANT_CHARS)] == '\0')
        return setConstantPrecision(convertStrToBin(value), UnsignedChar);
    else if (strcmp(oldType, UnsignedChar) == 0)
        funcName = NULL;
    else if (*oldType == '*' || isIntegralType(oldType))
        funcName = "_unsigned_char";
    else if (isFloatingType(oldType)) {
        warningForFloatUsage();
        funcName = "_f_to_unsigned_char";

    else
        return NULL;          /* no conversion function for new type */

} else if (strcmp(newType, SignedChar) == 0) {
    if (value[strspn(value, INT_CONSTANT_CHARS)] == '\0')
        return setConstantPrecision(convertStrToBin(value), SignedChar);
    else if (strcmp(oldType, SignedChar) == 0)
        funcName = NULL;
    else if (*oldType == '*' || isIntegralType(oldType))
        funcName = "_signed_char";
    else if (isFloatingType(oldType)) {
        warningForFloatUsage();
        funcName = "_f_to_signed_char";

    else
        return NULL;          /* no conversion function for new type */

} else {
    return NULL;     /* no conversion function for new type */
}

/*
** If no conversion is required, return a copy of the value; otherwise
** if the value is a redundant conversion function, return a conversion
```

```
    ** function call whose argument is the argument of the redundant
    ** conversion function; otherwise, return a conversion function call
    ** whose argument is the value.
    */
    if (funcName == NULL) {
        newValue = newString(DUF, value);

    } else if (isRedundantConversion(value, newType)) {
        argument = unparenthesize(value + strcspn(value, "("));
        newValue = catenate4(FullSep, funcName, "(", argument, ")");
        freeString(argument);

    } else {
        newValue = catenate4(FullSep, funcName, "(", value, ")");
    }

    return newValue;
}


/*
** Function "translateType" translates type specifications from C-style to
** PIL-style.  We should not encounter any type that we do not know how
** to translate, but if we do, we translate it to "UNKNOWN".  The returned
** string is allocated from the heap, so the caller must free it when it is
** no longer needed.
*/
char *                          /* translation of type */
translateType(type)
    char *type;                 /* internal C-style type specification */
{
    char *arrayBound;           /* an indirection array bound */
    char *cursor;               /* cursor for "indirections" */
    int   fieldWidth;           /* width of an "indirections" field */
    char *newIndirections;      /* PIL-style indirections */
    char *newSpecifiers;        /* translated PIL-style type specifiers */
    char *newType;              /* PIL translation of "type" */
    char *oldIndirections;      /* temp for expanding "newIndirections" */
    char *sizeField;            /* location of size field in specifiers */
    char *sizeSpec;             /* bit-field size specification */
    char *tagName;              /* tag name for a structure or union */


    if (type == NULL)
        type = "";              /* treat NULL type as empty */

    /*
    ** Translate any indirections present in the type specification.
    */
    newIndirections = NULL;
    cursor = type;

    while (*cursor == '*' || *cursor == '[' || *cursor == '(') {
        fieldWidth = firstFieldWidth(cursor);

        if (*cursor == '*') {
            oldIndirections = newIndirections;
            newIndirections = catenate2(FullSep, oldIndirections, "ptr");
            freeString(oldIndirections);

        } else if (*cursor == '[') {
            arrayBound = newString(fieldWidth - 2, cursor + 1);
            oldIndirections = newIndirections;
            newIndirections = catenate4(FullSep, oldIndirections, "[",
              arrayBound, ", 0 ]");
            freeString(oldIndirections);
```

```
        freeString(arrayBound);

    } else if (*cursor == '(') {
        oldIndirections = newIndirections;
        newIndirections = catenate2(FullSep, oldIndirections, "func");
        freeString(oldIndirections);
    }

    cursor += fieldWidth;
}

/*
** If there is a bit-field size specification, extract it and advance
** the cursor past it.
*/
sizeSpec = NULL;

if (*cursor == ':') {
    cursor += 1;                        /* skip over ':' */
    cursor += strspn(cursor, " ");     /* skip over delimiters */
    sizeField = cursor;
    cursor += strspn(sizeField, "0123456789");

    if (cursor > sizeField)
        sizeSpec = newString(cursor - sizeField, sizeField);

    cursor += strspn(cursor, " ");     /* skip over delimiters */
}

/*
** Compare the specifiers to the standard specifiers.  If a match is
** found, perform the required translation; otherwise, translate to the
** string "UNKNOWN".  Ignore any bit-field specification for nonintegral
** types.
*/
if (strcmp(cursor, Double) == 0) {
    sizeSpec = intToString(BITS_PER_BYTE*sizeOfDouble);
    newSpecifiers = catenate2(FullSep, "float", sizeSpec);

} else if (strcmp(cursor, Float) == 0) {
    sizeSpec = intToString(BITS_PER_BYTE*sizeOfFloat);
    newSpecifiers = catenate2(FullSep, "float", sizeSpec);

} else if (strcmp(cursor, LongDouble) == 0) {
    sizeSpec = intToString(BITS_PER_BYTE*sizeOfLongDouble);
    newSpecifiers = catenate2(FullSep, "float", sizeSpec);

} else if (strcmp(cursor, SignedChar) == 0) {
    if (sizeSpec == NULL)
        sizeSpec = intToString(BITS_PER_BYTE*sizeOfChar);

    newSpecifiers = catenate2(FullSep, "int", sizeSpec);

} else if (strcmp(cursor, SignedInt) == 0) {
    if (sizeSpec == NULL)
        sizeSpec = intToString(BITS_PER_BYTE*sizeOfInt);

    newSpecifiers = catenate2(FullSep, "int", sizeSpec);

} else if (strcmp(cursor, SignedLong) == 0) {
    if (sizeSpec == NULL)
        sizeSpec = intToString(BITS_PER_BYTE*sizeOfLong);

    newSpecifiers = catenate2(FullSep, "int", sizeSpec);

} else if (strcmp(cursor, SignedShort) == 0) {
```

```
    if (sizeSpec == NULL)
        sizeSpec = intToString(BITS_PER_BYTE*sizeOfShort);

    newSpecifiers = catenate2(FullSep, "int", sizeSpec);

} else if (strcmp(cursor, UnsignedChar) == 0) {
    if (sizeSpec == NULL)
        sizeSpec = intToString(BITS_PER_BYTE*sizeOfChar);

    newSpecifiers = catenate2(FullSep, "unsigned-int", sizeSpec);

} else if (strcmp(cursor, UnsignedInt) == 0) {
    if (sizeSpec == NULL)
        sizeSpec = intToString(BITS_PER_BYTE*sizeOfInt);

    newSpecifiers = catenate2(FullSep, "unsigned-int",
      sizeSpec);

} else if (strcmp(cursor, UnsignedLong) == 0) {
    if (sizeSpec == NULL)
        sizeSpec = intToString(BITS_PER_BYTE*sizeOfLong);

    newSpecifiers = catenate2(FullSep, "unsigned-int", sizeSpec);

} else if (strcmp(cursor, UnsignedShort) == 0) {
    if (sizeSpec == NULL)
        sizeSpec = intToString(BITS_PER_BYTE*sizeOfShort);

    newSpecifiers = catenate2(FullSep, "unsigned-int", sizeSpec);

} else if (strcmp(cursor, Void) == 0) {
    newSpecifiers = newString(DUP, "any");

} else if (strncmp(cursor, "enum ", sizeof("enum ") - 1) == 0) {
    if (sizeSpec == NULL)
        sizeSpec = intToString(BITS_PER_BYTE*sizeOfInt);

    newSpecifiers = catenate2(FullSep, "int", sizeSpec);

} else if (strncmp(cursor, "struct ", sizeof("struct ") - 1) == 0) {
    tagName = cursor + strcspn(cursor, " ");
    tagName += strspn(tagName, " ");
    tagName = newString(strcspn(tagName, " "), tagName);
    newSpecifiers = catenate2(NoSep, "type S$", tagName);
    freeString(tagName);

} else if (strncmp(cursor, "union ", sizeof("union ") - 1) == 0) {
    tagName = cursor + strcspn(cursor, " ");
    tagName += strspn(tagName, " ");
    tagName = newString(strcspn(tagName, " "), tagName);
    newSpecifiers = catenate2(NoSep, "type U$", tagName);
    freeString(tagName);

} else {
    newSpecifiers = newString(DUP, "UNKNOWN");
}

/*
** Form the PIL type by combining the translated indirections and
** specifiers.
*/
newType = catenate2(FullSep, newIndirections, newSpecifiers);
freeString(newSpecifiers);
freeString(sizeSpec);
freeString(newIndirections);
return newType;
```

jcomuzzi@pss2 ~~c2pit.c~~ fns_022.c

SPARCprinter
Fri Oct 27 17:42:22 1995

NeWSprint 2.0
Openwin library 3
NeWSprint interpreter 3.000

NeWSprint 2.0

```
/*************************************************************/
/*                                                           */
/*      Copyright (c) 1995 Peritus Software Services, Inc.   */
/*        All Rights Reserved                                */
/*                                                           */
/*      THIS IS UNPUBLISHED PROPRIETARY SOURCE CODE OF       */
/*      Peritus Software Services, Inc.                      */
/*                                                           */
/*      This program contains confidential and proprietary   */
/*      information of Peritus Software Services, Inc., and  */
/*      any reproduction, disclosure, or use in whole or in  */
/*      part is expressly prohibited, except as may be       */
/*      specifically authorized by prior written agreement or */
/*      permission of Peritus.                               */
/*                                                           */
/*      The copyright notice above does not evidence any     */
/*      actual or intended publication of such source code.  */
/*                                                           */
/*************************************************************/


/*
** This file contains those "c2pil" support functions whose name begin with
** the letters "u" through "z".
*/

#include <ctype.h>
#include <stdio.h>
#include <stdlib.h>
#include <string.h>
#include <time.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "scanner.h"
#include "version.h"

/*
** Macro Definitions
*/
#define DIGITS(N) ((241*sizeof(N) + 99)/100)     /* max decimal digits in N */


/*
** Function "unparenthesize" creates a copy of its argument with any outside
** parentheses removed.  For example, "a*(b + c)*d" is copied unchanged,
** but "((a + b)*(c + d))" is translated to "(a + b)*(c + d)" and "((a + b))"
** is translated to "a + b".  Any leading or trailing spaces in the source
** string are ignored.  The result string will not contain any leading or
** trailing spaces.  The result string is allocated from the heap so it is
** the caller's responsibility to free it when no longer needed.
*/
char *                                  /* unparenthesized result string */
unparenthesize(source)
    char *source;                       /* string to be unparenthesized */
{
    char *result;                       /* unparenthesized result string */
    int   resultLen;                    /* length of result string */
    int   skipCnt;                      /* number of characters to skip */
    int   sourceLen;                    /* length of source string */
```

```
    if (source == NULL)
        source = "";                        /* treat NULL source as empty string */

    /*
    ** Create a copy of the source string, suppressing any leading or trailing
    ** spaces.
    */

    source += strspn(source, " ");
    sourceLen = strlen(source);

    while (sourceLen > 0 && source[sourceLen - 1] == ' ')
        sourceLen -= 1;                 /* find last nonspace */

    result = newString(sourceLen, source);

    /*
    ** Delete any outside parentheses and associated spaces from result.
    */
    while (*result == '(' && result[firstFieldWidth(result)] == '\0') {
        /*
        ** Discard leading '(' and any following spaces.
        */
        skipCnt = 1 + strspn(result + 1, " ");

        for (resultLen = 0; result[resultLen + skipCnt] != '\0'; resultLen += 1)
            result[resultLen] = result[resultLen + skipCnt];

        result[resultLen] = '\0';

        /*
        ** If last character of result is ')', delete it.
        */
        if (resultLen > 0 && result[resultLen - 1] == ')') {
            resultLen -= 1;
            result[resultLen] = '\0';
        }

        /*
        ** Delete any trailing spaces from result.
        */
        while (resultLen > 0 && result[resultLen - 1] == ' ') {
            resultLen -= 1;
            result[resultLen] = '\0';
        }
    }

    return result;
}


/*
** Function "unprintableEscapeSeq" returns TRUE if an escape sequence is
** indicated and it represents an unprintable character, or FALSE
** in all other cases.
**
** Note that the string delimeter, double quote ("), is considered
** an unprintable character.
**
** If the escape character (\) is followed by an octal or hex escape
** sequence, then the indicated character is inserted into the string
** and the remainder of the string shifted left by the length of the
** octal/hex constant.  The new value is then evaluated as printable
** or unprintable.
**
```

```
** If the escape sequence is printable, the rest of the string is
** shifted left by one byte to remove the backslash character from
** the string.
*/
BOOL                                /* TRUE if unprintable escape sequence */
unprintableEscapeSeq(string)
    char *string;
{
    int   idx;                      /* string index */
    char *numStr;                   /* string for octal/hex esc. seq. */
    char *code;                     /* beginning of escape code */

    /*
    ** If this is not an escape sequence, just return
    */
    if (string == NULL || *string != '\\')
        return FALSE;

    numStr = NULL;
    string += 1;                            /* skip over the backslash */
    code = string;                          /* retain string start addr */

    /*
    ** Look for an octal or hex escape sequence, and if found
    ** substitute the indicated character for the character following
    ** the '\'.
    */
    if (*string >= '0' && *string <= '7') {      /* octal esc */
        numStr = newString(5, "0");              /* max 0nnn */
        strncat(numStr, string, 3);

        /*
        ** Find the end of the octal constant
        */
        for (idx = 1; numStr[idx] >= '0' && numStr[idx] <= '7'; idx++);
        numStr[idx] = 0;

        *string++ = (unsigned char) convertStrToBin(numStr);

    } else if (*string == 'x') {            /* hex escape sequence */
        numStr = newString(sizeOfLong*BITS_PER_BYTE, "0");   /* lots of room */
        strncat(numStr, string, sizeOfLong*BITS_PER_BYTE-1);

        /*
        ** Find the end of the hex constant
        */
        for (idx = 2; (numStr[idx] >= '0' && numStr[idx] <= '9') ||
          (toupper(numStr[idx]) >= 'A' && toupper(numStr[idx]) <= 'F'); idx++);
        numStr[idx] = 0;

        *string++ = (unsigned char) convertStrToBin(numStr);
    }

    /*
    ** Remove the numeric escape sequence, if we found one.
    */
    if (numStr != NULL) {
        idx = strlen(numStr)-2;
        while ((*string = *(string+idx)) != 0)
           string++;

        freeString(numStr);
    }

    /*
    ** If a printable char is detected following the escape character,
```

```
** just shift the remaining string one byte left.
*/
string = code;

if (*string == '\'' || *string == '?' || *string == '\\') {
    while ((*(string-1) = *string) != 0)
        string++;

    return FALSE;
}

return TRUE;
}


/*
** Function "unsignedLongToString" returns the decimal character string
** equivalent of an unsigned long binary integer number.  The return string
** is allocated from the heap, so the caller is responsible for freeing it
** when it is no longer needed.
*/
char *                          /* decimal string equivalent to num */
unsignedLongToString(number)
    unsigned long number;       /* number to convert */
{
    char result[DIGITS(number) + 1];    /* digits + EOS */


    sprintf(result, "%lu", number);
    return newString(DUP, result);
}


/*
** Function "warningFloat" calls function "warning" to alert the
** operator that floating point usage has been detected.  This
** function maintains the file and line number of the last float
** warning issued, and suppresses the message if one was already
** issued for the current line.
*/
void
warningForFloatUsage()
{
    static int localFileNum = -1;       /* File number for previous msg */
    static int localLineNum = -1;       /* Line number for previous msg */

    if (curFileNum != localFileNum || curLineNum != localLineNum) {
        warning(0, 0, "Floating point usage encountered.");
        localFileNum = curFileNum;
        localLineNum = curLineNum;
    }

    return;
}


/*
** Function "wrapExpr" places a transfer function around an expression
** that may evaluate differently under PIL and C due to the way the
** two languages handle precision overflow.  The new expression is
** allocated on the heap, so it is the responsibility of the caller to
** free the space when it is no longer required.
**
** The transfer function to use is determined from the type of the
** input expression.
*/
```

```
char *                                  /* Returns the new expression */
wrapExpr(expression, type)
    char *expression;                   /* expression to wrap */
    char *type;                         /* expression type */
{
    char *castName;                     /* name of the wrapper function */
    char *cursor;                       /* current position in a string */
    char *newExpression;                /* new expression value */

    /*
    ** Build the wrapper function name from the type string
    */
    castName = catenate2(NoSep, "_", type);

    /*
    ** Replace spaces in the cast function name with underscores
    */
    while ((cursor = strchr(castName, ' ')) != NULL)
        *cursor = '_';

    newExpression = catenate4(FullSep, castName, "(", expression, ")");
    freeString(castName);

    return(newExpression);
}


/*
** Function "writeCapturedPIL" writes captured PIL text to either the PIL
** output file, the capture stack file or the capture block file, according
** to the value of the "capturePIL" flag and how many capture blocks exist.
** If no capture blocks exist, the text is written to the PIL output file.
** If one capture block exists, the text is appended to the current capture
** block if "capturePIL" is true and to the PIL output file otherwise.  If
** more than one capture block exists, the text is appended to the current
** capture block if "capturePIL" is true and to the previous capture block
** otherwise.
*/
void
writeCapturedPIL(capturedPIL)
    char *capturedPIL;          /* text to be written */
{
    char *cursor;               /* cursor for "capturedPIL" */
    FILE *targetFile;           /* file to receive the text */


    /*
    ** Just return if there is nothing to write.
    */
    if (capturedPIL == NULL || capturedPIL[0] == '\0')
        return;

    /*
    ** Select target file.
    */
    if (capturePIL && captureBlockCnt > 0)
        targetFile = captureBlockFile;
    else if (captureBlockCnt > 1)
        targetFile = captureStackFile;
    else
        targetFile = pilFile;

    /*
    ** Write the captured text to the target file.
    */
    for (cursor = capturedPIL; *cursor != '\0'; cursor += 1) {
```

```
    if (fputc(*cursor, targetFile) == EOF) {
        if (targetFile == captureBlockFile)
            fatalError(curFileNum, curLineNum,
              "Unable to write to PIL capture block file.");
        else if (targetFile == captureStackFile)
            fatalError(curFileNum, curLineNum,
              "Unable to write to PIL capture stack file.");
        else
            fatalError(curFileNum, curLineNum,
              "Unable to write to PIL output file.");
    }
}

/*
** Function "writeConditionalJump" writes to the PIL output file the PIL
** directives needed to represent an
**             "if (<condition> == jumpIfTrue) goto <label>;"
** statement.  Note that the caller must first call "setSourceLocation"
** before calling this routine to ensure that the correct source location
** is emitted.  If "jumpIfTrue" is TRUE, then the PIL generated creates
** a jump when the condition evaluates to true.  If "jumpIfTrue" is
** FALSE, then the PIL generated creates a jump when the condition
** evaluates to FALSE.  This second type is useful for generating exit
** code for loops.
*/
void
writeConditionalJump(condition, label, jumpIfTrue)
    char *condition;            /* PIL expression for the jump condition */
    char *label;                /* PIL label that is target of the jump */
    BOOL  jumpIfTrue;           /* Controls jump code as per header comment */
{
    char *directive;            /* a PIL directive */

    startBlock();

    directive = catenate3(FullSep, "if (", condition, ")");
    writePIL(directive);
    freeString(directive);

    /*
    ** Generate jump or skip code based on the value of "jumpIfTrue"
    */
    directive = (jumpIfTrue) ?
      catenate2(FullSep, "goto", label) : newString(DUP, "proc skip");
    writePIL(directive);
    freeString(directive);

    advanceBlockNumber();
    directive = catenate3(FullSep, "if ^ (", condition, ")");
    writePIL(directive);
    freeString(directive);

    /*
    ** Generate jump or skip code based on the value of "jumpIfTrue"
    */
    directive = (jumpIfTrue) ?
      newString(DUP, "proc skip") : catenate2(FullSep, "goto", label);
    writePIL(directive);
    freeString(directive);
    terminateBlock("endif");
}
```

```c
/*
** Function "writeLProcedure" writes an "L procedure" directive to the PIL
** output file based on a function declaration of the form:
**
**      <func-name>:(<param-decl>,<param-decl>,...<param-decl>)<func-type>
**
** There need not be any parameter declarations in the function declaration,
** but if there are some, they are defined to be local variables to the
** function (which results in suitable "var" directives being emitted after
** the "l-procedure" directive).
*/
void
writeLProcedure(funcDeclaration)
    char *funcDeclaration;        /* function declaration (may not be NULL) */
{
    char *currentParam;           /* parameter extracted from list */
    char *cursor;                 /* field cursor for "funcDeclaration" */
    char *declStart;              /* start of a parameter declaration */
    char *directive;              /* the PIL L-procedure directive */
    int   fieldWidth;             /* width of a "funcDeclaration" field */
    int   funcDeclarationLen;     /* length of "funcDeclaration" */
    char *funcName;               /* function's name */
    char *funcType;               /* function's type */
    char *newParam;               /* new parameter to add to param name list */
    char *paramDecls;             /* list of parameter declarations */
    char *paramNames;             /* list of parameter names */
    char *subString;              /* declaration subset */

    /*
    ** Copy the function name, which is the first field in "funcDeclaration".
    */
    if (funcDeclaration == NULL)
        funcDeclaration = "";     /* treat NULL declaration as empty */

    fieldWidth = firstFieldWidth(funcDeclaration);
    funcName = newString(fieldWidth, funcDeclaration);

    /*
    ** Advance the cursor to the start of the parameter declarations, which
    ** begin after the first '(' in "funcDeclaration".
    */
    cursor = funcDeclaration + strcspn(funcDeclaration, "(");

    if (*cursor == '(')
        cursor += 1;              /* skip over '(' */

    /*
    ** Scan the parameter declarations to build a list of the parameter names
    ** separated by " , " and a list of the parameter declarations separated
    ** by semicolons instead of commas (so we can pass it to "declareSymbols",
    ** which expects multiple declarations to be separated by semicolons).
    ** Since structure parameters are expanded to list all their terminal
    ** members, there is no way to estimate the size of the parameter name
    ** list.
    */
    funcDeclarationLen = strlen(funcDeclaration);
    paramDecls = newString(funcDeclarationLen, "");
    paramNames = NULL;

    /*
    ** Build the parameter declaration list, which has the format
    **     name:type;name:type;...
    */
    while (*cursor != ')' && *cursor != '\0') {
```

```
    declStart = cursor;
    fieldWidth = firstFieldWidth(cursor);

    do {      /* locate end of parameter declaration */
        cursor += fieldWidth;
        fieldWidth = firstFieldWidth(cursor);
    } while (*cursor != ',' && *cursor != ')' && *cursor != '\0');

    strncat(paramDecls, declStart, cursor - declStart);
    strcat(paramDecls, ";");

    if (*cursor == ',')
        cursor += fieldWidth;          /* advance to next param decl */
}

/*
** Copy the function type, which follows the parameter declarations.
** Assume "int" if there is no type specifier.
*/
funcType = (*cursor != '\0') ? newString(DUP, cursor+1) :
                               newString(DUP, SignedInt);

/*
** Insert an extra parameter at the beginning of the parameter
** declarations to represent the return value.
*/
declStart = paramDecls;
paramDecls = (strcmp(funcType, Void) == 0) ?
  catenate4(NoSep, "void$$:", SignedInt, ";", declStart) :
  catenate4(NoSep, "result$$:", funcType, ";", declStart);
freeString(declStart);
freeString(funcType);

/*
** Set the cursor to the start of the parameter declarations to
** create the list of parameter names.  Note that for structures
** the parameter list will include all of the terminal elements of
** the structure definition.
*/
cursor = paramDecls;

while (*cursor != '\0') {
    fieldWidth = firstFieldWidth(cursor);

    if (*cursor != ':') {
        currentParam = newString(fieldWidth, cursor);

        while (*cursor == '[' || *cursor == '(')
            cursor += firstFieldWidth(cursor);

        newParam = newString(DUP, currentParam);
        freeString(currentParam);
        currentParam = paramNames;
        paramNames = (paramNames == NULL) ? newString(DUP, newParam) :
          catenate3(FullSep, currentParam, ",", newParam);
        freeString(currentParam);
        freeString(newParam);

    } else {                    /* anonymous parameter */
        currentParam = paramNames;
        paramNames = (paramNames == NULL) ? newString(DUP, "?") :
          catenate2(FullSep, currentParam, ", ?");
        freeString(currentParam);
    }

    do {     /* locate end of parameter declaration */
```

```
            cursor += fieldWidth;
            fieldWidth = firstFieldWidth(cursor);
        } while (*cursor != ';' && *cursor != ')' && *cursor != '\0');

        if (*cursor == ';')
            cursor += fieldWidth;        /* advance to next param decl */
    }

    /*
    ** Generate a warning for variable arguments, since these are not
    ** handled by the PIL back-end
    */
    if (strstr(paramNames, "...") != NULL)
        warning(0, 0, "Variable argument list found in function definition.");

    /*
    ** Create and emit the required "L-procedure" PIL directive.
    */
    directive = catenate5(FullSep, "L-procedure", funcName, "(",
      paramNames, ") no-alias");

    writePIL(directive);
    freeString(directive);
    freeString(funcName);

    if (paramNames != NULL)
        freeString(paramNames);

    /*
    ** Define any parameters to be local variables of the function and
    ** emit their PIL declarations (in declareSymbols)
    */
    if (paramDecls[0] != '\0' && strchr(paramDecls,':') != NULL) {

        /*
        ** Strip any array sizes from the declarations, since they
        ** do not cause any storage allocation to occur when included
        ** in the parameter declaration.  Empty array references are
        ** subsequently converted to pointers in "declareSymbols".
        */

        declStart = paramDecls;

        while ((declStart = strchr(declStart+1, ':')) != NULL) {
            cursor = declStart + 1;

            if (*cursor == '[' && *(cursor + 1) != ']') {
                cursor += 1;
                subString = strchr(cursor, ']');
                while ((*cursor++ = *subString++) != '\0');
            }
        }
    }

    declareSymbols(paramDecls);
    freeString(paramDecls);
}


/*
** Function "writePIL" writes a PIL directive to either the PIL output file,
** the capture stack file or the capture block file, according to the value
** of the "capturePIL" flag and how many capture blocks exist.  If no capture
** blocks exist, the directive is written to the PIL output file.  If one
** capture block exists, the directive is appended to the current capture
```

```
** block if "capturePIL" is true and to the PIL output file otherwise.  If
** more than one capture block exists, the directive is appended to the
** current capture block if "capturePIL" is true and to the previous capture
** block otherwise.
**
** The first call to this function also writes a version directive to
** the output file, in the form:
**
**              0 0 0 Version <ver> <lang> <info>
**
** where ver = the C2PIL program version (see version.h)
**       lang = the source language (C) and
**       info = command line arguments + translation date
**
** If the directive in the first call to this function is not a "file"
** directive, then the first line of the C source is not a "# LINE FILE"
** directive.  This means that the C source must not have been preprocessed,
** so we emit a "file" directive for the C source file.
*/
void
writePIL(directive)
    char *directive;              /* PIL directive to be written */
{
    static BOOL firstCall = TRUE;         /* TRUE till end of first call */

    int      argIdx;              /* cmd line argument index */
    int      level;               /* blockNum array index */
    FILE    *targetFile;          /* either pilFile or tempFile */
    time_t   now;                 /* time and date of translation */
    BOOL     writeFailed;         /* TRUE if write error detected */


    /*
    ** The first call to this function writes the version directive
    ** to the output file.
    */
    if (firstCall && !suppressVersion) {
        (void) fprintf(pilFile, "0 0 0 Version %s C", VERSION);
        now = time(NULL);

        for (argIdx = 1; argIdx < cmdArgCnt; argIdx += 1)
            (void) fprintf(pilFile, " %s", cmdArgVec[argIdx]);

        (void) fprintf(pilFile, " %s", ctime(&now));     /* time of translation */
    }

    /*
    ** If this is the first call and the directive to be written is not a
    ** "file" directive, emit such a directive for the C source file.
    */
    if (firstCall && strncmp(directive, "file ", sizeof("file ") - 1) != 0)
        (void) fprintf(pilFile, "0 0 0 file %s\n", cFileName);

    /*
    ** Select target file.
    */
    if (capturePIL && captureBlockCnt > 0)
        targetFile = captureBlockFile;
    else if (captureBlockCnt > 1)
        targetFile = captureStackFile;
    else
        targetFile = pilFile;

    /*
    ** Write file and line numbers.
    */
```

```
    writeFailed = FALSE;

    if (fprintf(targetFile, "%d %d", curFileNum, curLineNum) == EOF)
        writeFailed = TRUE;

    /*
    ** Write block level numbers.
    */
    for (level = 0; level <= blockIdx; level += 1) {
        if (fprintf(targetFile, "%c%d", (level == 0) ? ' ' : '.',
          blockNum[level]) == EOF)
            writeFailed = TRUE;
    }

    /*
    ** Write directive.
    */
    if (fprintf(targetFile, " %s\n", directive) == EOF)
        writeFailed = TRUE;

    /*
    ** Abort if any of the preceding writes failed.
    */
    if (writeFailed) {
        if (targetFile == captureBlockFile)
            fatalError(curFileNum, curLineNum,
              "Unable to write to PIL capture block file.");
        else if (targetFile == captureStackFile)
            fatalError(curFileNum, curLineNum,
              "Unable to write to PIL capture stack file.");
        else
            fatalError(curFileNum, curLineNum,
              "Unable to write to PIL output file.");
    }

    firstCall = FALSE;   /* first call now complete */
}


/*
** Function "writeTypeDefinition" writes a PIL "type" directive and one or
** more PIL "member" directives to define a structure or union type.  The
** name of the PIL type consists of the C tag name prefixed by either "S$"
** (for a structure) or "U$" (for a union).  The prefix allows us to support
** structures and unions that have the same tag name in the same scope.
*/
void
writeTypeDefinition(symbolName)
    char *symbolName;                  /* "struct ..." or "union ..." */
{
    int   bitsPerInt;                  /* bit size of an "int" */
    char *cursor;                      /* cursor for symbol's definition */
    char *directive;                   /* a PIL directive */
    int   memberBitAlignment;          /* bit alignment of a member */
    long  memberBitOffset;             /* bit offset of a member from start */
    long  memberBitSize;               /* bit size of a member */
    char *memberOffset;                /* PIL offset of a member */
    char *memberName;                  /* name of a member */
    char *memberType;                  /* internal C type of a member */
    char *packedAttribute;             /* PIL packed attribute for a member */
    char *tagName;                     /* tag name of structure or union */
    char *translatedType;              /* PIL type for a member */
    char *typeName;                    /* PIL type name for symbol */
    char *typeSize;                    /* size of structure or union */
```

```
/*
** Just return if the argument is obviously invalid.
*/
if (symbolName == NULL)
    return;

/*
** Isolate the tag name within the symbol name.
*/
if (strncmp(symbolName, "struct ", sizeof("struct ") - 1) == 0)
    tagName = symbolName + sizeof("struct ") - 1;
else if (strncmp(symbolName, "union ", sizeof("union ") - 1) == 0)
    tagName = symbolName + sizeof("union ") - 1;
else
    tagName = "";

if (tagName[strspn(tagName, " ")] == '\0')
    return;                     /* invalid symbol name */

/*
** Look up the definition of the structure or union.
*/
cursor = locateDefinition(symbolName);

/*
** Write a "type" directive for the structure or union.  If there is
** no definition, then this is a forward reference and we replace the
** size specification with the keyword "forward".
*/
if (cursor == NULL || cursor[strspn(cursor, " ")] == '\0') {
    cursor = "";
    typeSize = NULL;

} else {
    typeSize = longToString(sizeOfType(symbolName));
}

if (*symbolName == 's') {
    typeName = catenate2(NoSep, "S$", tagName);

    if (typeSize == NULL)
        directive = catenate3(FullSep, "type", typeName, "struct forward");
    else
        directive = catenate5(FullSep, "type", typeName, "struct", "size",
          typeSize);

} else {
    typeName = catenate2(NoSep, "U$", tagName);

    if (typeSize == NULL)
        directive = catenate3(FullSep, "type", typeName, "union forward");
    else
        directive = catenate5(FullSep, "type", typeName, "union", "size",
          typeSize);
}

writePIL(directive);
freeString(directive);
freeString(typeSize);

/*
** Write a "member" directive for each member of the structure or union.
*/
bitsPerInt = BITS_PER_BYTE*sizeOfInt;
cursor += strspn(cursor, " ");      /* skip over leading spaces */
memberBitAlignment = BITS_PER_BYTE; /* assume byte alignment */
```

```
memberBitOffset = 0;                /* offset of 1st member */
memberBitSize = 0;                  /* no previous member yet */

while (*cursor != '\0') {
    /*
    ** Isolate the name of the current member.
    */
    memberName = cursor;
    cursor += strcspn(cursor, ":"); /* skip over member name */
    memberName = newString(cursor - memberName, memberName);
    cursor += 1;                    /* skip over ':' following name */

    /*
    ** If this is a structure, calculate the bit offset of the member.
    */
    if (*symbolName == 's') {
        /*
        ** Advance the member bit offset past the previous member.
        */
        memberBitOffset += memberBitSize;
        memberBitSize = bitSizeOfType(cursor, NULL);

        /*
        ** Add padding to align the member, if needed.
        */
        memberBitAlignment = alignmentOfType(cursor)*BITS_PER_BYTE;

        if (memberBitAlignment <= 0) {
            /*
            ** Pad to the next "int" boundary if the bit-field member
            ** has zero size or would overflow the current word.
            */
            if ((memberBitOffset + memberBitSize + bitsPerInt - 1)/
              bitsPerInt != (memberBitOffset + bitsPerInt - 1)/bitsPerInt
              || memberBitSize == 0)
                memberBitOffset = (memberBitOffset + bitsPerInt - 1)/
                  bitsPerInt*bitsPerInt;

        } else {
            /*
            ** Pad to the required alignment boundary.
            */
            memberBitOffset = (memberBitOffset + memberBitAlignment - 1)/
              memberBitAlignment*memberBitAlignment;
        }
    }

    /*
    ** Isolate the type of the member.
    */
    memberType = cursor;

    while (*cursor != ';' && *cursor != '\0')
        cursor += firstFieldWidth(cursor);

    memberType = newString(cursor - memberType, memberType);

    /*
    ** If the member has a name, write a "member" directive describing it.
    */
    if (*memberName != '\0') {
        if (memberBitAlignment <= 0) {
            /*
            ** Form the offset description of a bit-field.
            */
            memberOffset = longToString(memberBitOffset/bitsPerInt);
```

```
                packedAttribute = longToString(memberBitOffset%bitsPerInt);
            } else {
                /*
                ** Form the offset description of a non-bit field.
                */
                memberOffset = longToString(memberBitOffset/BITS_PER_BYTE);
                packedAttribute = NULL;
            }

            translatedType = translateType(memberType);

            if (packedAttribute == NULL)
                directive = catenate6(FullSep, "member", memberName, typeName,
                  memberOffset, translatedType);
            else
                directive = catenate7(FullSep, "member", memberName, typeName,
                  memberOffset, "packed", packedAttribute, translatedType);

            writePIL(directive);
            freeString(directive);
            freeString(translatedType);
            freeString(packedAttribute);
            freeString(memberOffset);
        }

        /*
        ** Free strings for current member, then advance cursor to next member.
        */
        freeString(memberType);
        freeString(memberName);
        cursor += strspn(cursor, " ;");
    }

    freeString(typeName);
}


/*
** Function "writeVar" writes a "var" directive to the PIL output file
** to declare the name and type of a symbol.  As an example of the directives
** produced by this function, suppose it was called for the symbol "l"
** defined to be:
**
**    long *l[3];
**
** The following "var" directive would be produced to describe "l":
**
**    var l [ 3 , 0 ] ptr int 32
*/
void
writeVar(name, type)
    char *name;                 /* name of symbol being declared */
    char *type;                 /* internal C-style symbol type */
{
    char *directive;            /* a PIL "var" directive */
    char *translatedType;       /* PIL-style symbol type */


    /*
    ** Just return if arguments are obviously invalid.
    */
    if (name == NULL || name[strspn(name, " ")] == '\0')
        return;                 /* no name */

    if (type == NULL || type[strspn(type, " ")] == '\0')
```

```
        return;                      /* no type */

    /*
    ** Functions are not declared in PIL, so if this is a function
    ** declaration, just return.
    */
    if (*type == '(')
        return;

    /*
    ** Assemble and emit a PIL "var" directive for the symbol.
    */
    translatedType = translateType(type);
    directive = catenate3(FullSep, "var", name, translatedType);
    writePIL(directive);
    freeString(directive);
    freeString(translatedType);
}
```

jcomuzzi@pss2 parser.y

SPARCprinter
Fri Oct 27 17:57:02 1995

NeWSprint 2.0
Openwin library 3
NeWSprint interpreter 3.000

NeWSprint 2.0

```
%{

/***********************************************************************
 *                                                                     */
 *      Copyright (c) 19[illegible] Peritus Software Services, Inc.    */
 *        All Rights Reserved                                          */
 *                                                                     */
 *      THIS IS UNPUBLISHED PROPRIETARY SOURCE CODE OF                 */
 *      Peritus Software Services, Inc.                                */
 *                                                                     */
 *      This program contains confidential and proprietary             */
 *      information of Peritus Software Services, Inc., and            */
 *      any reproduction, disclosure, or use in whole or in            */
 *      part is expressly prohibited, except as may be                 */
 *      specifically authorized by prior written agreement or          */
 *      permission of Peritus.                                         */
 *                                                                     */
 *      The copyright notice above does not evidence any               */
 *      actual or intended publication of such source code.            */
 *                                                                     */
 ***********************************************************************/


/*
** This is a "yacc" parser for the C language, based on the grammar
** specification on pages 234 through 238 of "The C Programming Language
** (Second Edition)" by Brian W. Kernighan and Dennis M. Ritchie.  The
** routines needed to support the actions of the grammar rules are contained
** in the file "parser2.c" in order to keep this file at a reasonable size.
*/


#include <stdio.h>
#include <stdlib.h>
#include <string.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "parser.h"
#include "scanner.h"

/*
** Private Global Variables
*/
static int      anonTagCnt = 0;          /* no. of anonymous tags created */
static char    *breakLabel = NULL;       /* current "break" label */
static char    *caseLabels = NULL;       /* case labels for current "switch" */
static char    *condition;               /* a PIL logical expression */
static char    *continueLabel = NULL;    /* current "continue" label */
static char    *declaration;             /* internal form of a declaration */
static char    *diagnostic;              /* an error or warning message */
static char    *directive;               /* a PIL directive */
static int      doStmtCnt = 0;           /* no. of "do" statements so far */
static int      forStmtCnt = 0;          /* no. of "for" statements so far */
static char    *label;                   /* a PIL label */
static char    *name;                    /* a symbol's name */
static char    *number;                  /* string representation of a number */
static char    *rawType;                 /* an unnormalized type string */
static int      switchStmtCnt = 0;       /* no. of "switch" statements so far */
static SymInfo *symbolPtr;               /* a symbol table entry */
static char    *type;                    /* a symbol's type string */
```

```
static int      whileStmtCnt = 0;      /* no. of "while" statements so far */
static int      yydebug = FALSE;       /* parser debugging flag */

%}

%start translation_unit

%token ADD_ASSIGN AND_ASSIGN AND_OP AUTO BREAK CASE CHAR CHARACTER_CONSTANT
%token CONST CONTINUE DEC_OP DEFAULT DIV_ASSIGN DO DOUBLE ELLIPSIS ELSE
%token ENUM ENUMERATION_CONSTANT EQ_OP EXTERN FLOAT FLOATING_CONSTANT FOR
%token GE_OP GOTO IDENTIFIER IF INC_OP INT INTEGER_CONSTANT LEFT_ASSIGN
%token LEFT_OP LE_OP LONG MOD_ASSIGN MUL_ASSIGN NE_OP OR_ASSIGN OR_OP PTR_OP
%token REGISTER RETURN RIGHT_ASSIGN RIGHT_OP SHORT SIGNED SIZEOF SIZEOF
%token STATIC STRING_LITERAL STRUCT SUB_ASSIGN SWITCH TYPEDEF TYPEDEF_NAME
%token UNION UNSIGNED VOID VOLATILE WHILE XOR_ASSIGN

%%

translation_unit     /* type = NULL, value = NULL */
    : external_declaration
        {
            $$ = NULL;
            freeRuleValue($1);  /* external_declaration */
        }
    | translation_unit external_declaration
        {
            $$ = NULL;
            freeRuleValue($1);  /* translation_unit */
            freeRuleValue($2);  /* external_declaration */
        }
    ;

external_declaration     /* type = NULL, value = NULL */
    : function_definition
        {
            $$ = newRuleValue($1->fileNum, $1->lineNum, NULL, NULL);
            freeRuleValue($1);  /* function_definition */
        }
    | declaration
        {
            setSourceLocation($1->fileNum, $1->lineNum);
            declareSymbols($1->value);
            $$ = newRuleValue($1->fileNum, $1->lineNum, NULL, NULL);
            freeRuleValue($1);  /* declaration */
        }
    | ';'
        {
            $$ = newRuleValue($1->fileNum, $1->lineNum, NULL, NULL);
            freeRuleValue($1);  /* ';' */
        }
    ;

function_definition     /* type = NULL, value = NULL */
    : _function_declaration _function_body
        {
            writePIL("return stack");
            terminateBlock("endblock"); /* end param decls block */
            terminateBlock("endL-procedure");
            $$ = newRuleValue($1->fileNum, $1->lineNum, NULL, NULL);
            freeRuleValue($1);  /* _function_declaration */
            freeRuleValue($2);  /* _function_body */
        }
    ;

/*
** We introduced the new rule "_function_declaration" into the grammar in
```

```
** order to gain access to the parameter list and the explicit parameter
** declarations in an old style function declaration.  This is necessary
** in order to compare the two lists to determine if any parameters need
** to be assigned a default type of "int".
*/
_function_declaration     /* type = NULL, value = function declaration */
    : _function_header _parameter_declarations
        {
            setSourceLocation($1->fileNum, $1->lineNum);
            startBlock();

            if ($1->value != NULL && strchr($1->value, ':') == NULL) {
                mergeParameterDeclarations($1->type, $1->value, $2->value);

            } else {                    /* new-style function definition */
                writeEIProcedure($1->type);
                startBlock();
            }

            $$ = newRuleValue($1->fileNum, $1->lineNum, NULL, NULL);
            $$->value = catenate2(FullSep, $1->value, $2->value);
            freeRuleValue($1);   /* _function_header */
            freeRuleValue($2);   /* _parameter_declarations */
        }

/*
** We introduced the new rule "_function_header" into the grammar in
** order to define the function's type in the global scope and then emit
** the PIL code to open the function's block.
*/
_function_header     /* type = function declaration, value = param list */
    : declaration_specifiers declarator
        {
            setSourceLocation($2->fileNum, $2->lineNum);
            rawType = catenate2(PartSep, $2->type, $1->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            declaration = catenate3(NoSep, $2->value, ":", type);
            declareSymbols(declaration);
            $$ = newRuleValue($2->fileNum, $2->lineNum, declaration, NULL);

            if ($2->type != NULL) {      /* extract parameter list */
                freeString(declaration);
                declaration = newString(firstFieldWidth(strchr($2->type, '(')),
                  strchr($2->type, '('));
                $$->value = unparenthesize(declaration);
            }

            freeString(declaration);
            freeString(type);
            freeString(rawType);
            freeRuleValue($1);  /* declaration_specifiers */
            freeRuleValue($2);  /* declarator */
        }
    | declarator
        {
            setSourceLocation($1->fileNum, $1->lineNum);
            rawType = catenate2(PartSep, $1->type, SignedInt);
            type = normalizeDeclSpecifiers(rawType);
```

```
        if (type == NULL && rawType != NULL) {
            diagnostic = catenate2(NoSep,
              "Declaration specifiers invalid:  ", rawType);
            fatalError($1->fileNum, $1->lineNum, diagnostic);
            freeString(diagnostic);
        }

        declaration = catenate3(NoSep, $1->value, ":", type);
        declareSymbols(declaration);
        $$ = newRuleValue($1->fileNum, $1->lineNum, declaration, NULL);

        if ($1->type != NULL) {      /* extract parameter list */
            freeString(declaration);
            declaration = newString(firstFieldWidth(strchr($1->type, '(')),
              strchr($1->type, '('));
            $$->value = unparenthesize(declaration);
        }

        freeString(declaration);
        freeString(type);
        freeString(rawType);
        freeRuleValue($1);   /* declarator */

    ;

/*
** We introduced the new rule "_parameter_declarations" into the grammar
** so that we can define the parameters of an old-style function definition.
** Note that we begin another block whether or not there are any parameter
** declarations.  When there are parameter declarations, they will override
** (rather than conflict) with the default parameter declarations emitted by
** "_function_header".
*/
_parameter_declarations     /* type = NULL, value = declaration list */
    : declaration_list
        {
            setSourceLocation($1->fileNum, $1->lineNum);
            $$ = $1;     /* declaration_list */
        }
    | /* empty */
        {
            setSourceLocation($0->fileNum, $0->lineNum);
            $$ = newRuleValue(0, 0, NULL, NULL);
        }
    ;

/*
** We introduced the new rule "_function_body" (which is syntactically
** identical to "compound_statement") into the grammar so that we can
** prevent the opening '{' of a function body from starting a new block,
** since a function block is begun in "_function_header".
*/
_function_body     /* type = NULL, value = NULL */
    : '{' _local_declarations statement_list '}'
        {
            setSourceLocation($4->fileNum, $4->lineNum);
            $$ = newRuleValue($1->fileNum, $1->lineNum, NULL, NULL);
            freeRuleValue($1);  /* '{' */
            freeRuleValue($2);  /* _local_declarations */
            freeRuleValue($3);  /* statement_list */
            freeRuleValue($4);  /* '}' */
        }
    | '{' _local_declarations '}'
        {
            setSourceLocation($3->fileNum, $3->lineNum);
            $$ = newRuleValue($1->fileNum, $1->lineNum, NULL, NULL);
```

```
            freeRuleValue($1);   /* '{' */
            freeRuleValue($2);   /* _local_declarations */
            freeRuleValue($3);   /* '}' */

    | '{' statement_list '}'

            setSourceLocation($3->fileNum, $3->lineNum);
            $$ = newRuleValue($1->fileNum, $1->lineNum, NULL, NULL);
            freeRuleValue($1);   /* '{' */
            freeRuleValue($2);   /* statement_list */
            freeRuleValue($3);   /* '}' */

    | '{' '}'
        {
            setSourceLocation($2->fileNum, $2->lineNum);
            $$ = newRuleValue($1->fileNum, $1->lineNum, NULL, NULL);
            freeRuleValue($1);   /* '{' */
            freeRuleValue($2);   /* '}' */
        }
    ;

/*
** We introduced the new rule "_local_declarations" into the grammar in
** order to define a function's local variables in that function's block.
*/
_local_declarations     /* type = NULL, value = NULL */
    : declaration
        {
            setSourceLocation($1->fileNum, $1->lineNum);
            declareSymbols($1->value);
            $$ = newRuleValue($1->fileNum, $1->lineNum, NULL, NULL);
            freeRuleValue($1);   /* declaration */

    | _local_declarations declaration
        {
            setSourceLocation($2->fileNum, $2->lineNum);
            declareSymbols($2->value);
            $$ = newRuleValue($1->fileNum, $1->lineNum, NULL, NULL);
            $$->value = catenate3(NoSep, $1->value, ";", $2->value);
            freeRuleValue($1);   /* _local_declarations */
            freeRuleValue($2);   /* declaration */
        }
    ;

declaration     /* type = NULL, value = list of <var>:<type>[=<init>]; */
    : declaration_specifiers init_declarator_list ';'
        {
            allowTypedefName = TRUE;
            freeRuleValue($1);   /* _declaration_specifiers */
            $$ = $2;             /* init_declarator_list */
            freeRuleValue($3);   /* ';' */
        }

    | declaration_specifiers ';'
        {
            allowTypedefName = TRUE;
            $$ = newRuleValue($1->fileNum, $1->lineNum, NULL, NULL);
            $$->value = catenate2(NoSep, ":", $1->value);
            freeRuleValue($1);   /* declaration_specifiers */
            freeRuleValue($2);   /* ';' */
        }
    ;

declaration_list     /* type = NULL, value = list of <var>:<type>[=<init>]; */
    : declaration
        {
```

```
            $$ = $1;    /* declaration */
            }
    | declaration_list declaration
            {
            $$ = newRuleValue($1->fileNum, $1->lineNum, NULL, NULL);
            $$->value = catenate3(NoSep, $1->value, ";", $2->value);
            freeRuleValue($1);    /* declaration_list */
            freeRuleValue($2);    /* declaration */
            }
    ;

declaration_specifiers     /* type = 0, value = list of specifiers */
    : storage_class_specifier declaration_specifiers
            {
            $$ = newRuleValue($1->fileNum, $1->lineNum, NULL, NULL);
            $$->value = catenate2(PartSep, $1->value, $2->value);
            freeRuleValue($1);    /* storage_class_specifier */
            freeRuleValue($2);    /* declaration_specifiers */
            }
    | storage_class_specifier
            {
            $$ = $1;    /* storage_class_specifier */
            }
    | type_specifier declaration_specifiers
            {
            $$ = newRuleValue($1->fileNum, $1->lineNum, NULL, NULL);
            $$->value = catenate2(PartSep, $1->value, $2->value);
            freeRuleValue($1);  /* type_specifier */
            freeRuleValue($2);  /* declaration_specifiers */
            }
    | type_specifier
            {
            $$ = $1;    /* type_specifier */
            }
    | type_qualifier declaration_specifiers
            {
            $$ = newRuleValue($1->fileNum, $1->lineNum, NULL, NULL);
            $$->value = catenate2(PartSep, $1->value, $2->value);
            freeRuleValue($1);  /* type_qualifier */
            freeRuleValue($2);  /* declaration_specifiers */
            }
    | type_qualifier
            {
            $$ = $1;    /* type_qualifier */
            }
    ;

storage_class_specifier    /* type = NULL, value = NULL or specifier name */
    : AUTO
            {
            $$ = newRuleValue($1->fileNum, $1->lineNum, NULL, NULL);
            freeRuleValue($1);  /* AUTO */
            }
    | REGISTER
            {
            $$ = newRuleValue($1->fileNum, $1->lineNum, NULL, NULL);
            freeRuleValue($1);  /* REGISTER */
            }
    | STATIC
            {
            $$ = newRuleValue($1->fileNum, $1->lineNum, NULL, "static");
            freeRuleValue($1);  /* STATIC */
            }
    | EXTERN
            {
            $$ = newRuleValue($1->fileNum, $1->lineNum, NULL, NULL);
```

```
        freeRuleValue($1);   /* EXTERN */
        }
    | TYPEDEF
        {
        $$ = newRuleValue($1->fileNum, $1->lineNum, NULL, "typedef");
        freeRuleValue($1);   /* TYPEDEF */
        }
    ;
type_specifier      /* type = NULL, value = specifier name */
    : VOID
        {
        allowTypedefName = FALSE;
        $$ = newRuleValue($1->fileNum, $1->lineNum, NULL, "void");
        freeRuleValue($1);   /* VOID */
        }
    | CHAR
        {
        allowTypedefName = FALSE;
        $$ = newRuleValue($1->fileNum, $1->lineNum, NULL, "char");
        freeRuleValue($1);   /* CHAR */
        }
    | SHORT
        {
        allowTypedefName = FALSE;
        $$ = newRuleValue($1->fileNum, $1->lineNum, NULL, "short");
        freeRuleValue($1);   /* SHORT */
        }
    | INT
        {
        allowTypedefName = FALSE;
        $$ = newRuleValue($1->fileNum, $1->lineNum, NULL, "int");
        freeRuleValue($1);   /* INT */
        }
    | LONG
        {
        allowTypedefName = FALSE;
        $$ = newRuleValue($1->fileNum, $1->lineNum, NULL, "long");
        freeRuleValue($1);   /* LONG */
        }
    | FLOAT
        {
        allowTypedefName = FALSE;
        $$ = newRuleValue($1->fileNum, $1->lineNum, NULL, "float");
        freeRuleValue($1);   /* FLOAT */
        }
    | DOUBLE
        {
        allowTypedefName = FALSE;
        $$ = newRuleValue($1->fileNum, $1->lineNum, NULL, "double");
        freeRuleValue($1);   /* DOUBLE */
        }
    | SIGNED
        {
        allowTypedefName = FALSE;
        $$ = newRuleValue($1->fileNum, $1->lineNum, NULL, "signed");
        freeRuleValue($1);   /* SIGNED */
        }
    | UNSIGNED
        {
        allowTypedefName = FALSE;
        $$ = newRuleValue($1->fileNum, $1->lineNum, NULL, "unsigned");
        freeRuleValue($1);   /* UNSIGNED */
        }
    | struct_or_union_specifier
        {
```

```
            allowTypedefName = FALSE;
            $$ = $1;    /* struct_or_union_specifier */
        }
    | enum_specifier
        {
            allowTypedefName = FALSE;
            $$ = $1;    /* enum_specifier */
        }
    | TYPEDEF_NAME
        {
            allowTypedefName = FALSE;

            /*
            ** Replace the TYPEDEF_NAME with the type it represents.
            */
            $$ = newRuleValue($1->fileNum, $1->lineNum, NULL,
              $1->type + sizeof("typedef") - 1);
            freeRuleValue($1);  /* TYPEDEF_NAME */
        }
    ;

type_qualifier      /* type = NULL, value = NULL */
    : CONST
        {
            $$ = newRuleValue($1->fileNum, $1->lineNum, NULL, NULL);
            freeRuleValue($1);  /* CONST */
        }
    | VOLATILE
        {
            warning($1->fileNum, $1->lineNum, "Ignoring 'volatile' keyword.");
            $$ = newRuleValue($1->fileNum, $1->lineNum, NULL, NULL);
            freeRuleValue($1);  /* VOLATILE */
        }
    ;

struct_or_union_specifier     /* type = NULL, value = specifier */
    : struct_or_union _identifier '{' struct_declaration_list '}'
        {
            setSourceLocation($1->fileNum, $1->lineNum);
            defineStructOrUnion(*$1->value, $2->value, $4->value);
            $$ = newRuleValue($1->fileNum, $1->lineNum, NULL, NULL);
            number = intToString(blockIdx);
            $$->value = catenate3(PartSep, $1->value, $2->value, number);
            freeString(number);
            freeRuleValue($1);  /* struct_or_union */
            freeRuleValue($2);  /* _identifier */
            freeRuleValue($3);  /* '{' */
            freeRuleValue($4);  /* struct_declaration_list */
            freeRuleValue($5);  /* '}' */
        }
    | struct_or_union '{' struct_declaration_list '}'
        {
            setSourceLocation($1->fileNum, $1->lineNum);
            number = intToString(anonTagCnt += 1);
            name = catenate3(NoSep, "t", number, "$$");
            freeString(number);
            defineStructOrUnion(*$1->value, name, $3->value);
            $$ = newRuleValue($1->fileNum, $1->lineNum, NULL, NULL);
            number = intToString(blockIdx);
            $$->value = catenate3(PartSep, $1->value, name, number);
            freeString(number);
            freeString(name);
            freeRuleValue($1);  /* struct_or_union */
            freeRuleValue($2);  /* '{' */
            freeRuleValue($3);  /* struct_declaration_list */
            freeRuleValue($4);  /* '}' */
```

```
    | struct_or_union _identifier
            {
            $$ = newRuleValue($1->fileNum, $1->lineNum, NULL, NULL);
            name = catenate2(PartSep, $1->value, $2->value);
            symbolPtr = findSymbolInfo(name, Tags, MAX_LEVELS);

            if (symbolPtr == NULL) {
                /*
                ** Forward reference to as yet undefined container.
                */
                setSourceLocation($1->fileNum, $1->lineNum);
                defineStructOrUnion(*$1->value, $2->value, "");
                number = intToString(blockIdx);

            } else {
                /*
                ** Reference to previously defined container.
                */
                number = intToString(symbolPtr->blockIdx);
            }

            $$->value = catenate2(PartSep, name, number);
            freeString(number);
            freeString(name);
            freeRuleValue($1);    /* struct_or_union */
            freeRuleValue($2);    /* _identifier */
        }
    ;

/*
** We replaced the token IDENTIFIER with the new rule "_identifier"
** wherever the grammar references an identifier in a context where a
** typedef name cannot possibly occur (such as the tag name of a struct,
** union or enum) to handle the case where the scanner has obviously
** erroneously ** interpreted an identifier as a TYPEDEF_NAME.
*/
_identifier       /* type = identifier type, value = identifier name */
    : IDENTIFIER
        {
            $$ = $1;     /* IDENTIFIER */
        }
    | TYPEDEF_NAME
        {
            wasTypedefName = FALSE;
            freeString($1->type);
            $1->type = NULL;
            $$ = $1;     /* TYPEDEF_NAME */
        }
    ;

struct_or_union     /* type = NULL, value = "struct" or "union" */
    : STRUCT
        {
            $$ = newRuleValue($1->fileNum, $1->lineNum, NULL, "struct");
            freeRuleValue($1);  /* STRUCT */
        }
    | UNION
        {
            $$ = newRuleValue($1->fileNum, $1->lineNum, NULL, "union");
            freeRuleValue($1);  /* UNION */
        }
    ;

struct_declaration_list     /* type = NULL, value = list of dcl's */
    : struct_declaration
```

```
            {
            $$ = $1;        /* struct_declaration */
            }
    | struct_declaration_list struct_declaration
            {
            $$ = newRuleValue($1->fileNum, $1->lineNum, NULL, NULL);
            $$->value = catenate2(PartSep, $1->value, $2->value);
            freeRuleValue($1);    /* struct_declaration_list */
            freeRuleValue($2);    /* struct_declaration */
            }
    ;

/*
** NOTE:  The actions for the "init_declarator_list" rule reference "$0".
** The only other rule that references "init_declarator_list" is the
** "declaration" rule.  In that rule, "init_declarator_list" is always
** preceded by "declaration_specifiers".  Therefore, any use of "$0" in
** "init_declarator_list" references the value of "declaration_specifiers"
** Use of "$0" allows us to distribute the value of "declaration_specifiers"
** over each of the components of "init_declarator_list".
*/
init_declarator_list     /* type = NULL, value = list of <var>:<type>[=<init>]; */
    : init_declarator
            {
            allowTypedefName = FALSE;
            name = newString(strcspn($1->value, "="), $1->value);
            rawType = catenate2(PartSep, $1->type, $0->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->value = catenate4(NoSep, name, ":", type, $1->value +
              strlen(name));
            freeString(type);
            freeString(rawType);
            freeString(name);
            freeRuleValue($1);   /* init_declarator */
            }
    | init_declarator_list ',' init_declarator
            {
            allowTypedefName = FALSE;
            name = newString(strcspn($3->value, "="), $3->value);
            rawType = catenate2(PartSep, $3->type, $0->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->value = catenate6(NoSep, $1->value, ";", name, ":", type,
              $3->value + strlen(name));
            freeString(type);
            freeString(rawType);
            freeString(name);
            freeRuleValue($1);   /* init_declarator_list */
            freeRuleValue($2);   /* ',' */
```

```
                freeRuleValue($3);   /* init_declarator */
            }
        ;

init_declarator     /* type = indirections, value = <var>[=<init>] */
        : declarator
            {
                $$ = $1;        /* declarator */
            }
        | declarator _assign initializer
            {
                $$ = newRuleValue($1->fileNum, $1->lineNum, $1->type, NULL);
                $$->value = catenate3(NoSep, $1->value, "=", $3->value);
                freeRuleValue($1);   /* declarator */
                freeRuleValue($2);   /* '=' */
                freeRuleValue($3);   /* initializer */
            }
        ;

/*
** We introduced the new rule "_assign" into the grammar so that we can
** enable typedef name look up in initializers, as they can contain casts
** or "sizeof" operators.
*/
_assign     /* type = NULL, value = NULL */
        : '='
            {
                allowTypedefName = TRUE;
                $$ = newRuleValue($1->fileNum, $1->lineNum, NULL, NULL);
                freeRuleValue($1);    /* '=' */
            }
        ;

struct_declaration     /* type = NULL, value = struct dcl */
        : specifier_qualifier_list struct_declarator_list ';'
            {
                allowTypedefName = TRUE;
                $$ = newRuleValue($1->fileNum, $1->lineNum, NULL, NULL);
                $$->value = catenate2(NoSep, $2->value, ";");
                freeRuleValue($1);   /* specifier_qualifier_list */
                freeRuleValue($2);   /* struct_declarator_list */
                freeRuleValue($3);   /* ';' */
            }
        ;

specifier_qualifier_list
        : type_specifier specifier_qualifier_list
            {
                $$ = newRuleValue($1->fileNum, $1->lineNum, NULL, NULL);
                $$->value = catenate2(PartSep, $1->value, $2->value);
                freeRuleValue($1);   /* type_specifier */
                freeRuleValue($2);   /* specifier_qualifier_list */
            }
        | type_specifier
            {
                $$ = $1;     /* type_specifier */
            }
        | type_qualifier specifier_qualifier_list
            {
                $$ = newRuleValue($1->fileNum, $1->lineNum, NULL, NULL);
                $$->value = catenate2(PartSep, $1->value, $2->value);
                freeRuleValue($1);   /* type_qualifier */
                freeRuleValue($2);   /* specifier_qualifier_list */
            }
        | type_qualifier
```

```
            $$ = $1;     /* type qualifier */
        }
    ;

/*
** NOTE:  The actions for the "struct_declarator_list" rule reference "$0".
** The only other rule that references "struct_declarator_list" is the
** "struct_declaration" rule.  In that rule, "struct_declarator_list" is always
** preceded by "specifier_qualifier_list".  Therefore, any use of "$0" in
** "struct_declarator_list" references the value of "specifier_qualifier_list".
** Use of "$0" allows us to distribute the value of "specifier_qualifier_list"
** over each of the components of "struct_declarator_list".
*/
struct_declarator_list     /* type = NULL, value = list of <var>:<type>; */
    : struct_declarator
        {
            allowTypedefName = FALSE;
            rawType = catenate2(PartSep, $1->type, $0->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->value = catenate3(PartSep, $1->value, ":", type);
            freeString(type);
            freeString(rawType);
            freeRuleValue($1);   /* struct_declarator */
        }
    | struct_declarator_list ',' struct_declarator
        {
            allowTypedefName = FALSE;
            rawType = catenate2(PartSep, $3->type, $0->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->value = catenate5(PartSep, $1->value, ";", $3->value, ":",
              type);
            freeString(type);
            freeString(rawType);
            freeRuleValue($1);  /* struct_declarator */
            freeRuleValue($2);  /* ',' */
            freeRuleValue($3);  /* struct_declarator */
        }
    ;

struct_declarator     /* type = symbol type, value = symbol name */
    : declarator
        {
            $$ = $1;     /* declarator */
        }
    | declarator ':' constant_expression
        {
            $$ = newRuleValue($1->fileNum, $1->lineNum, NULL, $1->value);
            $$->type = catenate3(NoSep, $1->type, ":", $3->value);
```

```
            freeRuleValue($1);  /* declarator */
            freeRuleValue($2);  /* ':' */
            freeRuleValue($3);  /* constant expression */

    ':' constant expression

            $$ = newRuleValue($1->fileNum, $1->lineNum, NULL, NULL);
            $$->type = catenate2(NoSep, ":", $2->value);
            freeRuleValue($1);  /* ':' */
            freeRuleValue($2);  /* constant expression */

    ;

enum_specifier      /* type = NULL, value = specifier */
    : ENUM _identifier '{' enumerator_list '}'

            setSourceLocation($1->fileNum, $1->lineNum);
            defineEnum($2->value, $4->value);
            $$ = newRuleValue($1->fileNum, $1->lineNum, NULL, NULL);
            $$->value = catenate2(PartSep, "enum", $2->value);
            freeRuleValue($1);  /* ENUM */
            freeRuleValue($2);  /* _identifier */
            freeRuleValue($3);  /* '{' */
            freeRuleValue($4);  /* enumerator_list */
            freeRuleValue($5);  /* '}' */

    | ENUM _identifier '{' enumerator_list ',' '}'

            setSourceLocation($1->fileNum, $1->lineNum);
            defineEnum($2->value, $4->value);
            $$ = newRuleValue($1->fileNum, $1->lineNum, NULL, NULL);
            $$->value = catenate2(PartSep, "enum", $2->value);
            freeRuleValue($1);  /* ENUM */
            freeRuleValue($2);  /* _identifier */
            freeRuleValue($3);  /* '{' */
            freeRuleValue($4);  /* enumerator_list */
            freeRuleValue($5);  /* ',' */
            freeRuleValue($6);  /* '}' */

    | ENUM '{' enumerator_list '}'

            setSourceLocation($1->fileNum, $1->lineNum);
            number = intToString(anonTagCnt += 1);
            name = catenate3(NoSep, "t", number, "$$");
            freeString(number);
            defineEnum(name, $3->value);
            $$ = newRuleValue($1->fileNum, $1->lineNum, NULL, NULL);
            $$->value = catenate2(PartSep, "enum", name);
            freeString(name);
            freeRuleValue($1);  /* ENUM */
            freeRuleValue($2);  /* '{' */
            freeRuleValue($3);  /* enumerator_list */
            freeRuleValue($4);  /* '}' */

    | ENUM '{' enumerator_list ',' '}'

            setSourceLocation($1->fileNum, $1->lineNum);
            number = intToString(anonTagCnt += 1);
            name = catenate3(NoSep, "t", number, "$$");
            freeString(number);
            defineEnum(name, $3->value);
            $$ = newRuleValue($1->fileNum, $1->lineNum, NULL, NULL);
            $$->value = catenate2(PartSep, "enum", name);
            freeString(name);
            freeRuleValue($1);  /* ENUM */
            freeRuleValue($2);  /* '{' */
```

```
            freeRuleValue($3);  /* enumerator_list */
            freeRuleValue($4);  /* ',' */
            freeRuleValue($5);  /* ';' */
        }
    | ENUM _identifier
        {
            $$ = newRuleValue($1->fileNum, $1->lineNum, NULL, NULL);
            $$->value = catenate2(PartSep, "enum", $2->value);
            freeRuleValue($1);  /* ENUM */
            freeRuleValue($2);  /* _identifier */
        }
    ;

enumerator_list     /* type = NULL, value = list */
    : enumerator
        {
            $$ = $1;    /* enumerator */
        }
    | enumerator_list ',' enumerator
        {
            $$ = newRuleValue($1->fileNum, $1->lineNum, NULL, NULL);
            $$->value = catenate3(NoSep, $1->value, ",", $3->value);
            freeRuleValue($1);  /* enumerator_list */
            freeRuleValue($2);  /* ',' */
            freeRuleValue($3);  /* enumerator */
        }
    ;

enumerator    /* type = NULL, value = enumerator */
    : _identifier
        {
            $$ = $1;    /* _identifier */
        }
    | _identifier '=' constant_expression
        {
            $$ = newRuleValue($1->fileNum, $1->lineNum, NULL, NULL);
            $$->value = catenate3(NoSep, $1->value, "=", $3->value);
            freeRuleValue($1);  /* _identifier */
            freeRuleValue($2);  /* '=' */
            freeRuleValue($3);  /* constant_expression */
        }
    ;

declarator    /* type = symbol indirections, value = symbol name */
    : pointer direct_declarator
        {
            $$ = newRuleValue($1->fileNum, $1->lineNum, NULL, $2->value);
            $$->type = catenate2(PartSep, $2->type, $1->value);
            freeRuleValue($1);  /* pointer */
            freeRuleValue($2);  /* direct_declarator */
        }
    | direct_declarator
        {
            $$ = $1;    /* direct_declarator */
        }
    ;

direct_declarator    /* type = symbol indirections, value = symbol name */
    : IDENTIFIER
        {
            freeString($1->type);
            $1->type = NULL;
            $$ = $1;    /* IDENTIFIER */
        }
    | '(' declarator ')'
        {
```

```
            freeRuleValue($1);    /* '(' */
            $$ = $2;              /* declarator */
            freeRuleValue($3);    /* ')' */

    | direct_declarator _bound_lb constant_expression ']'
            {
            $$ = newRuleValue($1->fileNum, $1->lineNum, NULL, $1->value);
            $$->type = catenate4(NoSep, $1->type, "[", $3->value, "]");
            freeRuleValue($1);    /* direct_declarator */
            freeRuleValue($2);    /* _bound_lb */
            freeRuleValue($3);    /* constant_expression */
            freeRuleValue($4);    /* ']' */

    | direct_declarator _bound_lb ']'
            {
            $$ = newRuleValue($1->fileNum, $1->lineNum, NULL, $1->value);
            $$->type = catenate2(NoSep, $1->type, "[]");
            freeRuleValue($1);    /* direct_declarator */
            freeRuleValue($2);    /* _bound_lb */
            freeRuleValue($3);    /* ']' */

    | direct_declarator _param_lp parameter_type_list ')'

            $$ = newRuleValue($1->fileNum, $1->lineNum, NULL, $1->value);

            if (strcmp($3->value, ":void") == 0)
                $$->type = catenate2(NoSep, $1->type, "()");
            else
                $$->type = catenate4(NoSep, $1->type, "(", $3->value, ")");

            freeRuleValue($1);    /* direct_declarator */
            freeRuleValue($2);    /* _param_lp */
            freeRuleValue($3);    /* parameter_type_list */
            freeRuleValue($4);    /* ')' */

    | direct_declarator _param_lp identifier_list ')'

            $$ = newRuleValue($1->fileNum, $1->lineNum, NULL, $1->value);
            $$->type = catenate4(NoSep, $1->type, "(", $3->value, ")");
            freeRuleValue($1);    /* direct_declarator */
            freeRuleValue($2);    /* _param_lp */
            freeRuleValue($3);    /* identifier_list */
            freeRuleValue($4);    /* ')' */

    | direct_declarator _param_lp ')'

            $$ = newRuleValue($1->fileNum, $1->lineNum, NULL, $1->value);
            $$->type = catenate2(NoSep, $1->type, "()");
            freeRuleValue($1);    /* direct_declarator */
            freeRuleValue($2);    /* _param_lp */
            freeRuleValue($3);    /* ')' */
            }
    ;

/*
** We introduced the new rule "_bound_lb" into the grammar so that we can
** enable typedef name look-up in the scanner at the start of array bounds.
*/
_bound_lb     /* type = NULL, value = NULL */
    : '['
            {
            allowTypedefName = TRUE;
            }
    ;

/*
```

```
** We introduced the new rule "_param_lp" into the grammar so that we can
** enable typedef name look-up in the scanner at the start of parameter lists.
*/
_param_lp      /* type = NULL, value = NULL */
    : '('
        {
            allowTypedefName = TRUE;
        }
    ;

pointer     /* type = NULL, value = pointer */
    : '*' type_qualifier_list
        {
            $$ = newRuleValue($1->fileNum, $1->lineNum, NULL, NULL);
            $$->value = catenate2(NoSep, "*", $2->value);
            freeRuleValue($1);   /* '*' */
            freeRuleValue($2);   /* type_qualifier_list */
        }
    | '*'
        {
            $$ = newRuleValue($1->fileNum, $1->lineNum, NULL, "*");
            freeRuleValue($1);   /* '*' */
        }
    | '*' type_qualifier_list pointer
        {
            $$ = newRuleValue($1->fileNum, $1->lineNum, NULL, NULL);
            $$->value = catenate3(PartSep, "*", $2->value, $3->value);
            freeRuleValue($1);   /* '*' */
            freeRuleValue($2);   /* type_qualifier_list */
            freeRuleValue($3);   /* pointer */
        }
    | '*' pointer
        {
            $$ = newRuleValue($1->fileNum, $1->lineNum, NULL, NULL);
            $$->value = catenate2(NoSep, "*", $2->value);
            freeRuleValue($1);   /* '*' */
            freeRuleValue($2);   /* pointer */
        }
    ;

type_qualifier_list     /* type = NULL, value = qualifier list */
    : type_qualifier
        {
            $$ = $1;     /* type_qualifier */
        }
    | type_qualifier_list type_qualifier
        {
            $$ = newRuleValue($1->fileNum, $1->lineNum, NULL, NULL);
            $$->value = catenate2(PartSep, $1->value, $2->value);
            freeRuleValue($1);   /* type_qualifier_list */
            freeRuleValue($2);   /* type_qualifier */
        }
    ;

parameter_type_list     /* type = NULL, value = type list */
    : parameter_list
        {
            $$ = $1;     /* parameter_list */
        }
    | parameter_list ',' ELLIPSIS
        {
            $$ = newRuleValue($1->fileNum, $1->lineNum, NULL, NULL);
            $$->value = catenate2(NoSep, $1->value, ",...");
            freeRuleValue($1);   /* parameter_list */
            freeRuleValue($2);   /* ',' */
            freeRuleValue($3);   /* ELLIPSIS */
```

```
    ;

parameter_list      /* type = NULL, value = list of <var>:<type>, */
    : parameter_declaration
        {
            $$ = $1;        /* parameter_declaration */
        }
    | parameter_list ',' parameter_declaration
        {
            $$ = newRuleValue($1->fileNum, $1->lineNum, NULL, NULL);
            $$->value = catenate3(NoSep, $1->value, ",", $3->value);
            freeRuleValue($1);   /* parameter_list */
            freeRuleValue($2);   /* ',' */
            freeRuleValue($3);   /* parameter_declaration */
        }
    ;

parameter_declaration     /* type = NULL, value = <var>:<type> */
    : declaration_specifiers declarator
        {
            allowTypedefName = TRUE;
            rawType = catenate2(PartSep, $2->type, $1->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->value = catenate3(PartSep, $2->value, ":", type);
            freeString(type);
            freeString(rawType);
            freeRuleValue($1);   /* declaration_specifiers */
            freeRuleValue($2);   /* declarator */
        }
    | declaration_specifiers abstract_declarator
        {
            allowTypedefName = TRUE;
            rawType = catenate2(PartSep, $2->type, $1->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->value = catenate3(PartSep, $2->value, ":", type);
            freeString(type);
            freeString(rawType);
            freeRuleValue($1);   /* declaration_specifiers */
            freeRuleValue($2);   /* abstract_declarator */
        }
    | declaration_specifiers
        {
            allowTypedefName = TRUE;
            rawType = $1->value;
            type = normalizeDeclSpecifiers(rawType);

            if (type == NULL && rawType != NULL) {
```

```
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->value = catenate2(NoSep, ":", type);
            freeString(type);
            freeRuleValue($1);  /* declaration_specifiers */
        }
    ;

identifier_list     /* type = NULL, value = list */
    : IDENTIFIER
        {
            $$ = $1;     /* IDENTIFIER */
        }
    | identifier_list ',' identifier
        {
            $$ = newRuleValue($1->fileNum, $1->lineNum, NULL, NULL);
            $$->value = catenate3(NoSep, $1->value, ",", $3->value);
            freeRuleValue($1);  /* identifier list */
            freeRuleValue($2);  /* ',' */
            freeRuleValue($3);  /* _identifier */
        }
    ;

initializer     /* type = NULL, value = initializer */
    : assignment_expression
        {
            $$ = newRuleValue($1->fileNum, $1->lineNum, NULL, NULL);
            $$->value = catenate4(NoSep, "(", $1->type, ")", $1->value);
            freeRuleValue($1);  /* assignment_expression */
        }
    | '{' initializer_list '}'
        {
            $$ = newRuleValue($1->fileNum, $1->lineNum, NULL, NULL);
            $$->value = catenate3(NoSep, "{", $2->value, "}");
            freeRuleValue($1);  /* '{' */
            freeRuleValue($2);  /* initializer_list */
            freeRuleValue($3);  /* '}' */
        }
    | '{' initializer_list ',' '}'
        {
            $$ = newRuleValue($1->fileNum, $1->lineNum, NULL, NULL);
            $$->value = catenate3(NoSep, "{", $2->value, "}");
            freeRuleValue($1);  /* '{' */
            freeRuleValue($2);  /* initializer_list */
            freeRuleValue($3);  /* ',' */
            freeRuleValue($4);  /* '}' */
        }
    ;

initializer_list    /* type = NULL, value = initializer list */
    : initializer
        {
            $$ = $1;     /* initializer */
        }
    | initializer_list ',' initializer
        {
            $$ = newRuleValue($1->fileNum, $1->lineNum, NULL, NULL);
            $$->value = catenate3(NoSep, $1->value, ",", $3->value);
            freeRuleValue($1);  /* initializer_list */
            freeRuleValue($2);  /* ',' */
            freeRuleValue($3);  /* initializer */
```

```
    ;

type_name     /* type = type, value = NULL */
    : specifier_qualifier_list abstract_declarator
            {
            allowTypedefName = TRUE;
            rawType = catenate2(PartSep, $2->type, $1->value);
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->type = type;
            freeString(rawType);
            freeRuleValue($1);  /* specifier_qualifier_list */
            freeRuleValue($2);  /* abstract_declarator */
            }
    | specifier_qualifier_list
            {
            allowTypedefName = TRUE;
            rawType = $1->value;
            type = normalizeDeclSpecifiers(rawType);

            if (type == NULL && rawType != NULL) {
                diagnostic = catenate2(NoSep,
                  "Declaration specifiers invalid:  ", rawType);
                fatalError($1->fileNum, $1->lineNum, diagnostic);
                freeString(diagnostic);
            }

            $$ = newRuleValue($1->fileNum, $1->lineNum, NULL, NULL);
            $$->type = type;
            freeRuleValue($1);  /* specifier_qualifier_list */
            }
    ;

abstract_declarator     /* type = symbol type, value = NULL */
    : pointer
            {
            $$ = newRuleValue($1->fileNum, $1->lineNum, $1->value, NULL);
            freeRuleValue($1);  /* pointer */
            }
    | pointer direct_abstract_declarator
            {
            $$ = newRuleValue($1->fileNum, $1->lineNum, NULL, NULL);
            $$->type = catenate2(PartSep, $2->type, $1->value);
            freeRuleValue($1);  /* pointer */
            freeRuleValue($2);  /* direct_abstract_declarator */
            }
    | direct_abstract_declarator
            {
            $$ = $1;    /* direct_abstract_declarator */
            }
    ;

direct_abstract_declarator     /* type = symbol type, value = NULL */
    : '(' abstract_declarator ')'
            {
            freeRuleValue($1);  /* '(' */
            $$ = $2;    /* abstract_declarator */
```

```
        freeRuleValue($3);   /* ')' */
    }
| direct_abstract_declarator _bound_lb constant_expression ']'
    {
        $$ = newRuleValue($1->fileNum, $1->lineNum, NULL, NULL);
        $$->type = catenate4(NoSep, $1->type, "[", $3->value, "]");
        freeRuleValue($1);   /* direct_abstract_declarator */
        freeRuleValue($2);   /* _bound_lb */
        freeRuleValue($3);   /* constant_expression */
        freeRuleValue($4);   /* ']' */
    }
| direct_abstract_declarator _bound_lb ']'
    {
        $$ = newRuleValue($1->fileNum, $1->lineNum, NULL, NULL);
        $$->type = catenate2(NoSep, $1->type, "[]");
        freeRuleValue($1);   /* direct_abstract_declarator */
        freeRuleValue($2);   /* _bound_lb */
        freeRuleValue($3);   /* ']' */
    }
| _bound_lb constant_expression ']'
    {
        $$ = newRuleValue($1->fileNum, $1->lineNum, NULL, NULL);
        $$->type = catenate3(NoSep, "[", $2->value, "]");
        freeRuleValue($1);   /* _bound_lb */
        freeRuleValue($2);   /* constant_expression */
        freeRuleValue($3);   /* ']' */
    }
| _bound_lb ']'
    {
        $$ = newRuleValue($1->fileNum, $1->lineNum, "[]", NULL);
        freeRuleValue($1);   /* _bound_lb */
        freeRuleValue($2);   /* ']' */
    }
| direct_abstract_declarator _param_lp parameter_type_list ')'
    {
        $$ = newRuleValue($1->fileNum, $1->lineNum, NULL, NULL);
        $$->type = catenate4(NoSep, $1->type, "(", $3->value, ")");
        freeRuleValue($1);   /* direct_abstract_declarator */
        freeRuleValue($2);   /* _param_lp */
        freeRuleValue($3);   /* parameter_type_list */
        freeRuleValue($4);   /* ')' */
    }
| direct_abstract_declarator _param_lp ')'
    {
        $$ = newRuleValue($1->fileNum, $1->lineNum, NULL, NULL);
        $$->type = catenate2(NoSep, $1->type, "()");
        freeRuleValue($1);   /* direct_abstract_declarator */
        freeRuleValue($2);   /* _param_lp */
        freeRuleValue($3);   /* ')' */
    }
| _param_lp parameter_type_list ')'
    {
        $$ = newRuleValue($1->fileNum, $1->lineNum, NULL, NULL);
        $$->type = catenate3(NoSep, "(", $2->value, ")");
        freeRuleValue($1);   /* _param_lp */
        freeRuleValue($2);   /* parameter_type_list */
        freeRuleValue($3);   /* ')' */
    }
| _param_lp ')'
    {
        $$ = newRuleValue($1->fileNum, $1->lineNum, "()", NULL);
        freeRuleValue($1);   /* _param_lp */
        freeRuleValue($2);   /* ')' */
    }
;
```

```
/*
** In order to parse C with a "yacc" parser it is necessary to make the
** scanner identify typedef names.  Thus this grammar does not include
** the "typedef name: identifier" production included in the K&R grammar.
*/

statement
    : labeled_statement     /* type = NULL, value = NULL */
        {
            $$ = newRuleValue($1->fileNum, $1->lineNum, NULL, NULL);
            freeRuleValue($1);    /* labelled_statment */
        }
    | expression_statement     /* type = NULL, value = NULL */
        {
            $$ = newRuleValue($1->fileNum, $1->lineNum, NULL, NULL);
            freeRuleValue($1);   /* expression_statement */
        }
    | compound_statement     /* type = NULL, value = NULL */
        {
            $$ = newRuleValue($1->fileNum, $1->lineNum, NULL, NULL);
            freeRuleValue($1);   /* compound statement */
        }
    | selection_statement     /* type = NULL, value = NULL */
        {
            $$ = newRuleValue($1->fileNum, $1->lineNum, NULL, NULL);
            freeRuleValue($1);   /* selection_statement */
        }
    | iteration_statement     /* type = NULL, value = NULL */
        {
            $$ = newRuleValue($1->fileNum, $1->lineNum, NULL, NULL);
            freeRuleValue($1);   /* iteration_statement */
        }
    | jump_statement     /* type = NULL, value = NULL */
        {
            $$ = newRuleValue($1->fileNum, $1->lineNum, NULL, NULL);
            freeRuleValue($1);   /* jump_statement */
        }
    ;

labeled_statement     /* type = NULL, value = NULL */
    : _label__colon statement
        {
            $$ = newRuleValue($1->fileNum, $1->lineNum, NULL, NULL);
            freeRuleValue($1);   /* _label__colon */
            freeRuleValue($2);   /* statement */
        }
    | CASE _case_label ':' statement
        {
            $$ = newRuleValue($1->fileNum, $1->lineNum, NULL, NULL);
            freeRuleValue($1);   /* CASE */
            freeRuleValue($2);   /* _case_label */
            freeRuleValue($3);   /* ':' */
            freeRuleValue($4);   /* statement */
        }
    | _default ':' statement
        {
            $$ = newRuleValue($1->fileNum, $1->lineNum, NULL, NULL);
            freeRuleValue($1);   /*  default */
            freeRuleValue($2);   /* ':' */
            freeRuleValue($3);   /* statement */
        }
    ;

/*
** We introduced the new rule "_label__colon" (which matches a label followed
** by a colon) into the grammar so that we can emit a PIL "LABEL" directive
```

```
** before the PIL code for the statement to which the label is a prefix.
*
_label_col :     /* type = NULL, value = NULL */
    : _identifier ':'
            {
            setSourceLocation($1->fileNum, $1->lineNum);
            directive = createLabel($1->value);
            writePIL(directive);
            freeString(directive);
            $$ = newRuleValue($1->fileNum, $2->fileNum, NULL, NULL);
            freeRuleValue($1);    /* identifier */
            freeRuleValue($2);    /* ':' */
            }
    ;

/*
** We introduced the new rule "_case_label" into the grammar so that we can
** emit a PIL "LABEL" directive for the case before the PIL code for the
** statement to which the label is a prefix.
*/
_case_label      /* type = NULL, value = NULL */
    : constant_expression
            {
            setSourceLocation($1->fileNum, $1->lineNum);

            if (caseLabels == NULL) {
                warning($1->fileNum, $1->lineNum,
                  "Ignoring 'case' label outside of 'switch' statement.");

            } else {
                char *labelPrefix;        /* "switch" plus switch ordinal */
                char *labelText;          /* label annotation */
                char *oldCaseLabels;      /* old value of "caseLabels" */

                /*
                ** Save the case label in "caseLabels" then emit a true
                ** label whose name is of the form "switch12case34$$",
                ** where "12" represents the number of the "switch" and
                ** "34" represents the case number.  The "switch12" part
                ** is obtained from the beginning of "caseLabels", where
                ** it was placed by the "_switch" rule.
                */
                oldCaseLabels = caseLabels;
                caseLabels = catenate2(FullSep, oldCaseLabels, $1->value);
                freeString(oldCaseLabels);
                labelPrefix = newString(strcspn(caseLabels, " "), caseLabels);
                labelText = catenate4(NoSep, labelPrefix, "case",
                  $1->value, "$$");
                directive = createLabel(labelText);
                writePIL(directive);
                freeString(directive);
                freeString(labelText);
                freeString(labelPrefix);
            }

            $$ = newRuleValue($1->fileNum, $1->lineNum, NULL, NULL);
            freeRuleValue($1);  /* constant_expression */
            }
    ;

/*
** We introduced the new rule "_default" into the grammar so that we can
** emit a PIL "LABEL" directive for the default case before the PIL code for
** the statement to which the label is a prefix.
*/
_default     /* type = NULL, value = NULL */
```

```
    : DEFAULT
            {
            setSourceLocation($1->fileNum, $1->lineNum);

            if (caseLabels == NULL) {
                warning($1->fileNum, $1->lineNum,
                  "ignoring 'default' label outside of 'switch' statement.");

            } else {
                char *labelPrefix;        /* "switch" + switch ordinal */
                char *labelText;          /* label annotation */
                char *oldCaseLabels;      /* old value of "caseLabels" */

                /*
                ** Save the default label in "caseLabels" then emit a true
                ** label whose name is of the form "switch12default$$",
                ** where "12" represents the number of the "switch". The
                ** "switch12" part is obtained from the beginning of
                ** "caseLabels", where it was placed by the "_switch" rule.
                */
                oldCaseLabels = caseLabels;
                caseLabels = catenate2(FullSep, oldCaseLabels, "default");
                freeString(oldCaseLabels);
                labelPrefix = newString(strcspn(caseLabels, " "), caseLabels);
                labelText = catenate2(NoSep, labelPrefix, "default$$");
                directive = createLabel(labelText);
                writePIL(directive);
                freeString(directive);
                freeString(labelText);
                freeString(labelPrefix);
            }

            $$ = newRuleValue($1->fileNum, $1->lineNum, NULL, NULL);
            freeRuleValue($1);   /* DEFAULT */
            }
    ;

expression_statement     /* type = NULL, value = NULL */
    : expression ';'
            {
            setSourceLocation($2->fileNum, $2->lineNum);
            $$ = newRuleValue($1->fileNum, $1->lineNum, NULL, NULL);
            freeRuleValue($1);   /* expression */
            freeRuleValue($2);   /* ';' */
            }
    | ';'
            {
            setSourceLocation($1->fileNum, $1->lineNum);
            writePIL("proc skip");
            $$ = newRuleValue($1->fileNum, $1->lineNum, NULL, NULL);
            freeRuleValue($1);   /* ';' */
            }
    ;

compound_statement     /* type = NULL, value = NULL */
    : _block_lc _block_declarations statement_list _block_rc
            {
            $$ = newRuleValue($1->fileNum, $1->lineNum, NULL, NULL);
            freeRuleValue($1);   /* _block_lc */
            freeRuleValue($2);   /* _block_declarations */
            freeRuleValue($3);   /* statement_list */
            freeRuleValue($4);   /* _block_rc */
            }
    | _block_lc _block_declarations _block_rc
            {
            $$ = newRuleValue($1->fileNum, $1->lineNum, NULL, NULL);
```

```
            freeRuleValue($1);    /* _block_lc */
            freeRuleValue($2);    /* _block_declarations */
            freeRuleValue($3);    /* _block_rc */
        }
    | _block_lc statement_list _block_rc
        {
            $$ = newRuleValue($1->fileNum, $1->lineNum, NULL, NULL);
            freeRuleValue($1);    /* _block_lc */
            freeRuleValue($2);    /* statement_list */
            freeRuleValue($3);    /* _block_rc */
        }
    | _block_lc _block_rc
        {
            $$ = newRuleValue($1->fileNum, $1->lineNum, NULL, NULL);
            freeRuleValue($1);    /* _block_lc */
            freeRuleValue($2);    /* _block_rc */
        }
    ;

/*
** We introduced the new rule "_block_rc" into the grammar so that we can
** start a new block at the beginning of a compound statement.
*/
_block_lc     /* type = NULL, value = NULL */
    : '{'
        {
            setSourceLocation($1->fileNum, $1->lineNum);
            startBlock();
            $$ = newRuleValue($1->fileNum, $1->lineNum, NULL, NULL);
            freeRuleValue($1);    /* '{' */
        }
    ;

/*
** We introduced the new rule "_block_declarations" into the grammar so that
** we can define symbols local to a compound statement.
*/
_block_declarations     /* type = NULL, value = NULL */
    : declaration
        {
            setSourceLocation($1->fileNum, $1->lineNum);
            declareSymbols($1->value);
            $$ = newRuleValue($1->fileNum, $1->lineNum, NULL, NULL);
            freeRuleValue($1);    /* declaration */
        }
    | _block_declarations declaration
        {
            setSourceLocation($2->fileNum, $2->lineNum);
            declareSymbols($2->value);
            $$ = newRuleValue($1->fileNum, $1->lineNum, NULL, NULL);
            freeRuleValue($1);    /* _block_declarations */
            freeRuleValue($2);    /* declaration */
        }
    ;

/*
** We introduced the new rule "_block_lc" into the grammar so that we can
** terminate the current block at the end of a compound statement.
*/
_block_rc     /* type = NULL, value = NULL */
    : '}'
        {
            setSourceLocation($1->fileNum, $1->lineNum);
            terminateBlock("endblock");
            $$ = newRuleValue($1->fileNum, $1->lineNum, NULL, NULL);
            freeRuleValue($1);    /* '}' */
```

```
        ;

statement_list          /* type = NULL, value = NULL */
        : statement
                {
                $$ = newRuleValue($1->fileNum, $1->lineNum, NULL, NULL);
                freeRuleValue($1);      /* statement */
                }
        | statement_list statement
                {
                $$ = newRuleValue($1->fileNum, $1->lineNum, NULL, NULL);
                freeRuleValue($1);      /* statement_list */
                freeRuleValue($2);      /* statement */
                }
        ;

selection_statement     /* type = NULL, value = NULL */
        : IF '(' _if_test ')' statement
                {
                setSourceLocation($1->fileNum, $1->lineNum);
                advanceBlockNumber();
                directive = catenate3(FullSep, "if " (", $3->value, ")");
                writePIL(directive);
                freeString(directive);
                writePIL("proc skip");
                terminateBlock("endif");
                $$ = newRuleValue($1->fileNum, $1->lineNum, NULL, NULL);
                freeRuleValue($1);      /* IF */
                freeRuleValue($2);      /* '(' */
                freeRuleValue($3);      /* _if_test */
                freeRuleValue($4);      /* ')' */
                freeRuleValue($5);      /* statement */
                }
        | IF '(' _if_test ')' statement _else statement
                {
                setSourceLocation($1->fileNum, $1->lineNum);
                terminateBlock("endif");
                $$ = newRuleValue($1->fileNum, $1->lineNum, NULL, NULL);
                freeRuleValue($1);      /* IF */
                freeRuleValue($2);      /* '(' */
                freeRuleValue($3);      /* _if_test */
                freeRuleValue($4);      /* ')' */
                freeRuleValue($5);      /* statement */
                freeRuleValue($6);      /* _else */
                freeRuleValue($7);      /* statement */
                }
        | _switch '(' _switch_selector ')' statement
                {
                char *caseValue;                /* a case label value */
                BOOL haveDefaultCase;           /* TRUE if "default" case detected */
                char *labelPrefix;              /* "switch" + switch ordinal */
                int  stringIdx;                 /* "caseLabels" string index */

                /*
                ** Emit the "switch" statement's "break" label.
                */
                directive = createLabel(breakLabel);
                writePIL(directive);
                freeString(directive);

                /*
                ** Turn off PIL capturing and emit conditional jumps to the
                ** labels specified by "caseLabels". Note that "caseLabels"
                ** is a space separated list consisting of the label prefix
                ** followed by the labels for the cases encountered.
```

```
*/
capturePIL = FALSE;
setSourceLocation($1->fileNum, $1->lineNum);
stringIdx = strcspn(caseLabels, " ");
labelPrefix = newString(stringIdx, caseLabels);
stringIdx += strspn(&caseLabels[stringIdx], " ");
haveDefaultCase = FALSE;

while (caseLabels[stringIdx] != '\0') {
    caseValue = newString(strcspn(&caseLabels[stringIdx], " "),
      &caseLabels[stringIdx]);

    if (strcmp(caseValue, "default") == 0) {
        haveDefaultCase = TRUE;

    } else {
        condition = catenate3(FullSep, $3->value, "=", caseValue);
        label = catenate4(NoSep, labelPrefix, "case", caseValue,
          "$$");
        writeConditionalJump(condition, label, TRUE);
        freeString(condition);
        freeString(label);
    }

    stringIdx += strlen(caseValue);
    stringIdx += strspn(&caseLabels[stringIdx], " ");
    freeString(caseValue);
}

/*
** Finish up tests with a jump to either the default case label
** (if there is a default case) or the break label.
*/
directive = catenate3(NoSep, "goto ", labelPrefix,
  (haveDefaultCase) ? "default$$" : "exit$$");
writePIL(directive);
freeString(directive);
freeString(labelPrefix);

/*
** Emit and discard the captured "switch" statement body PIL code.
*/
(void) terminateCaptureBlock(Emit);

/*
** Discard the current "break" and "case" labels, restore
** the global "break" and "case" labels pointers to their
** previous values (which were stored in the "_switch"
** rule's "label" and "value" components) and cleanup.
*/
freeString(breakLabel);
freeString(caseLabels);
breakLabel = $1->type;
caseLabels = $1->value;
$1->type = NULL;
$1->value = NULL;
$$ = newRuleValue($1->fileNum, $1->lineNum, NULL, NULL);
freeRuleValue($1);  /* _switch */
freeRuleValue($2);  /* '(' */
freeRuleValue($3);  /* _switch_selector */
freeRuleValue($4);  /* ')' */
freeRuleValue($5);  /* statement */
}
;

/*
```

```
** We introduced the new rule "_switch" into the grammar so that we can
** save the locations of the current "break" and "case" labels, then create
** new "break" and "case" labels for use with this "switch" statement.  The
** new "caseLabels" string is initialized to the label prefix (consisting of
** "switch" followed by a unique integer) that will be used for all labels
** that are generated for this "switch" statement.  As "case" labels are
** subsequently encountered during translation of the body of the "switch"
** statement, they are appended to the caseLabels string (separated by a
** space).  Since neither the "type" nor the "value" components of the
** "_switch" rule are otherwise needed, we use them to record the locations
** of the previous "break" and "case" labels.
*/
_switch     /* type -> prev break label, value -> prev case labels */
    : SWITCH
        {
            $$ = newRuleValue($1->fileNum, $1->lineNum, NULL, NULL);
            $$->type = breakLabel;
            $$->value = caseLabels;
            number = intToString(switchStmtCnt += 1);
            breakLabel = catenate3(NoSep, "switch", number, "exit$$");
            caseLabels = catenate2(NoSep, "switch", number);
            freeString(number);
            freeRuleValue($1);    /* SWITCH */
        }
    ;

/*
** We introduced the new rule "_switch_selector" into the grammar so that
** we can assign the selector to a temporary if it is an expression and so
** we can begin a new capture block to capture the PIL for the body of the
** "switch" statement.  This allows us to determine the case labels that are
** used without emitting the PIL for the body of the "switch" statement.
** Then, when the PIL for the statement body has been completely captured,
** we can we can emit a series of conditional jumps to the various case
** labels before copying the captured PIL to the output file.
*/
_switch_selector     /* type -> selector type, value -> selector value */
    : expression
        {
            if (strchr($1->value, ' ') != NULL) {        /* an expression */
                $$ = newRuleValue($1->fileNum, $1->lineNum, $1->type, NULL);
                $$->value = newTempVariable($1->type);
                directive = catenate4(FullSep, "assign", $$->value, "=",
                  $1->value);
                writePIL(directive);
                freeString(directive);

            } else {
                $$ = newRuleValue($1->fileNum, $1->lineNum, $1->type,
                  $1->value);
            }

            freeRuleValue($1);  /* expression */
            startCaptureBlock();
        }
    ;

/*
** We introduced the new rule "_if_test" into the grammar so that we can
** emit the PIL code for an "if" statement's test expression.  The value
** of the test expression is returned as the "_if_test" value so that it
** can be referenced in the "if ^ (" PIL directive that will be emitted
** after the PIL for the "then" clause.
*/
_if_test     /* type = expression type, value = expression value */
    : expression
```

```
        ;
            setSourceLocation($1->fileNum, $1->lineNum);
            startBlock();

            if (strcmp($1->type, Boolean) != 0)
                convertType($1, Boolean);

            directive = catenate3(FullSep, "if (", $1->value, ")");
            writePIL(directive);
            freeString(directive);
            $$ = $1;      /* expression */
        }
    ;

/*
** We introduced the new rule "_else" into the grammar so that we can
** emit the PIL code for an "if" statement's "else" clause.  We use "$-2"
** to reference the value of the "_if_test" rule for inclusion in the
** "if ^ (" PIL directive.
*/
_else     /* type = NULL, value = NULL */
    : ELSE
        {
            setSourceLocation($1->fileNum, $1->lineNum);
            advanceBlockNumber();
            directive = catenate3(FullSep, "if ^ (", $-2->value, ")");
            writePIL(directive);
            freeString(directive);
            $$ = newRuleValue($1->fileNum, $1->lineNum, NULL, NULL);
            freeRuleValue($1);   /* ELSE */
        }
    ;

iteration_statement     /* type = NULL, value = NULL */
    : _while '(' _while_test ')' statement
        {
            /*
            ** Emit the loop's "continue" label if it has been referenced
            ** (i.e., if the leading '?' has been removed).
            */
            if (*continueLabel != '?') {
                directive = createLabel(continueLabel);
                writePIL(directive);
                freeString(directive);
            }

            /*
            ** Terminate the loop and emit its "break" label if it was used.
            */
            terminateBlock("enddo");

            if (*breakLabel != '?') {
                directive = createLabel(breakLabel);
                writePIL(directive);
                freeString(directive);
            }

            /*
            ** Discard the current "break" and "continue" labels, restore
            ** the global "break" and "continue" label pointers to their
            ** previous values (which were stored in the "_while" rule's
            ** "type" and "value" components) and cleanup.
            */
            freeString(breakLabel);
            freeString(continueLabel);
            breakLabel = $1->type;
```

```
    continueLabel = $1->value;
    $1->type = NULL;
    $1->value = NULL;
    $$ = newRuleValue($1->fileNum, $1->lineNum, NULL, NULL);
    freeRuleValue($1);  /* _while */
    freeRuleValue($2);  /* '(' */
    freeRuleValue($3);  /* _while_test */
    freeRuleValue($4);  /* ')' */
    freeRuleValue($5);  /* statement */

_do statement WHILE '(' _do_test ')' ';'

    /*
    ** Emit the loop's "continue" label if it has been referenced
    ** (i.e., if the leading '?' has been removed).
    */
    setSourceLocation($3->fileNum, $3->lineNum);

    if (*continueLabel != '?') {
        directive = createLabel(continueLabel);
        writePIL(directive);
        freeString(directive);
    }

    /*
    ** Terminate the loop and emit its "break" label.
    */
    terminateBlock("enddo");
    directive = createLabel(breakLabel);
    writePIL(directive);
    freeString(directive);

    /*
    ** Discard the current "break" and "continue" labels, restore
    ** the global "break" and "continue" label pointers to their
    ** previous values (which were stored in the "_do" rule's
    ** "type" and "value" components) and cleanup.
    */
    freeString(breakLabel);
    freeString(continueLabel);
    breakLabel = $1->type;
    continueLabel = $1->value;
    $1->type = NULL;
    $1->value = NULL;
    $$ = newRuleValue($1->fileNum, $1->lineNum, NULL, NULL);
    freeRuleValue($1);  /* _do */
    freeRuleValue($2);  /* statement */
    freeRuleValue($3);  /* WHILE */
    freeRuleValue($4);  /* '(' */
    freeRuleValue($5);  /* _do_test */
    freeRuleValue($6);  /* ')' */
    freeRuleValue($7);  /* ';' */

| _for '(' _for_init _for_test _for_incr ')' statement

    /*
    ** Emit the loop's "continue" label if it has been referenced
    ** (i.e., if the leading '?' has been removed).
    */
    if (*continueLabel != '?') {
        directive = createLabel(continueLabel);
        writePIL(directive);
        freeString(directive);
    }

    /*
```

```
        ** Insert the captured "_for_incr" PIL code in the PIL output file.
        */
        writeCapturedPIL($5->value);

        /*
        ** Terminate the loop and emit its "break" label if it was used.
        */
        terminateBlock("enddo");

        if (*breakLabel != '?') {
            directive = createLabel(breakLabel);
            writePIL(directive);
            freeString(directive);
        }

        /*
        ** Discard the current "break" and "continue" labels, restore
        ** the global "break" and "continue" label pointers to their
        ** previous values (which were stored in the "_for" rule's
        ** "type" and "value" components) and cleanup.
        */
        freeString(breakLabel);
        freeString(continueLabel);
        breakLabel = $1->type;
        continueLabel = $1->value;
        $1->type = NULL;
        $1->value = NULL;
        $$ = newRuleValue($1->fileNum, $1->lineNum, NULL, NULL);
        freeRuleValue($1);  /* FOR */
        freeRuleValue($2);  /* '(' */
        freeRuleValue($3);  /* _for_init */
        freeRuleValue($4);  /* _for_test */
        freeRuleValue($5);  /* _for_incr */
        freeRuleValue($6);  /* ')' */
        freeRuleValue($7);  /* statement */
      }
    ;

/*
** We introduced the new rule "_while" into the grammar so that we can emit
** the "do" PIL directive that heads the loop and so that we can save the
** locations of the current "break" and "continue" labels and then create
** new "break" and "continue" labels for use with this "while" statement.
** Since neither the "type" nor the "value" components of the "_while" rule
** are otherwise needed, we use them to record the locations of the labels.
*/
_while    /* type -> previous break label, value -> previous continue label */
    : WHILE
      {
        setSourceLocation($1->fileNum, $1->lineNum);
        startBlock();
        startCaptureBlock();  /* capture header & test PIL code */
        writePIL("do ( _TRUE )");
        $$ = newRuleValue($1->fileNum, $1->lineNum, NULL, NULL);
        $$->type = breakLabel;
        $$->value = continueLabel;
        number = intToString(whileStmtCnt += 1);
        breakLabel = catenate3(NoSep, "?while", number, "exit$$");
        continueLabel = catenate3(NoSep, "?while", number, "continue$$");
        freeString(number);
        freeRuleValue($1);  /* WHILE */
      }
    ;

/*
** We introduced the new rule "_while_test" into the grammar so that we can
```

```
** emit the PIL code for a "while" statement's test expression.
*/
_while_test     /* type = NULL, value = NULL */
    : expression
            {
            if (countCaptureBlockLines() > 1) { /* Multiple PIL lines in test */
                (void) terminateCaptureBlock(Emit);

                if (*breakLabel == '?')         /* Mark label as used */
                    strncpy(breakLabel, breakLabel + 1, strlen(breakLabel));

                setSourceLocation($1->fileNum, $1->lineNum);

                if (strcmp($1->type, Boolean) != 0)
                    convertType($1, Boolean);

                writeConditionalJump($1->value, breakLabel, FALSE);

            } else {
                (void) terminateCaptureBlock(Discard);
                setSourceLocation($1->fileNum, $1->lineNum);

                if (strcmp($1->type, Boolean) != 0)
                    convertType($1, Boolean);

                directive = catenate3(FullSep, "do (", $1->value, ")");
                writePIL(directive);
                freeString(directive);
            }

            $$ = newRuleValue($1->fileNum, $1->lineNum, NULL, NULL);
            freeRuleValue($1);  /* expression */
            }
    ;

/*
** We introduced the new rule "_do" into the grammar so that we can emit
** the "do" PIL directive that heads the loop and so that we can save the
** locations of the current "break" and "continue" labels and then create
** new "break" and "continue" labels for use with this "do" statement.
** Since neither the "type" nor the "value" components of the "_do" rule
** are otherwise needed, we use them to record the locations of the labels.
*/
_do     /* type -> previous break label, value -> previous continue label */
    : DO
            {
            setSourceLocation($1->fileNum, $1->lineNum);
            startBlock();
            writePIL("do ( _TRUE )");
            $$ = newRuleValue($1->fileNum, $1->lineNum, NULL, NULL);
            $$->type = breakLabel;
            $$->value = continueLabel;
            number = intToString(doStmtCnt += 1);
            breakLabel = catenate3(NoSep, "do", number, "exit$$");
            continueLabel = catenate3(NoSep, "?do", number, "continue$$");
            freeString(number);
            freeRuleValue($1);  /* DO */
            }
    ;

/*
** We introduced the new rule "_do_test" into the grammar so that we can
** emit the PIL code for a "do" statement's test expression.
*/
_do_test     /* type = NULL, value = NULL */
    : expression
```

```
            setSourceLocation($1->fileNum, $1->lineNum);

            if (strcmp($1->type, Boolean) != 0)
                convertType($1, Boolean);

            writeConditionalJump($1->value, breakLabel, FALSE);
            $$ = newRuleValue($1->fileNum, $1->lineNum, NULL, NULL);
            freeRuleValue($1);   /* expression */
        }
    ;

/*
** We introduced the new rule "_for" into the grammar so that we can save
** the locations of the current "break" and "continue" labels and then create
** new "break" and "continue" labels for use with this "for" statement.
** Since neither the "type" nor the "value" components of the "_for" rule
** are otherwise needed, we use them to record the locations of the labels.
*/
_for        /* type = previous break label, value -> previous continue label */
    : FOR
        {
            $$ = newRuleValue($1->fileNum, $1->lineNum, NULL, NULL);
            $$->type = breakLabel;
            $$->value = continueLabel;
            number = intToString(forStmtCnt += 1);
            breakLabel = catenate3(NoSep, "?for", number, "exit$$");
            continueLabel = catenate3(NoSep, "?for", number, "continue$$");
            freeString(number);
            freeRuleValue($1);   /* FOR */
        }
    ;

/*
** We introduced the new rule "_for_init" into the grammar so that we can
** identify the optional forms for the initialization expression.
*/
_for_init     /* type = NULL, value = NULL */
    : expression ';'
        {
            setSourceLocation($1->fileNum, $1->lineNum);
            startBlock();
            startCaptureBlock();   /* capture header & test PIL code */
            writePIL("do ( _TRUE )");
            $$ = newRuleValue($1->fileNum, $1->lineNum, NULL, NULL);
            freeRuleValue($1);   /* expression */
            freeRuleValue($2);   /* ';' */
        }
    | ';'
        {
            setSourceLocation($1->fileNum, $1->lineNum);
            startBlock();
            startCaptureBlock();   /* capture header & test PIL code */
            writePIL("do ( _TRUE )");
            $$ = newRuleValue(0, 0, NULL, NULL);
            freeRuleValue($1);   /* ';' */
        }
    ;

/*
** We introduced the new rule "_for_test" into the grammar so that we can
** emit the "do" PIL code to mark the head of the loop, complete with the
** test expression.
*/
_for_test     /* type = NULL, value = NULL */
    : expression ';'
```

```
        if (countCaptureBlockLines() > 1) { /* Multiple PIL lines in test */
            (void) terminateCaptureBlock(Emit);

            if (*breakLabel == '?')          /* Mark label as used */
                strncpy(breakLabel, breakLabel + 1, strlen(breakLabel));

            setSourceLocation($1->fileNum, $1->lineNum);

            if (strcmp($1->type, Boolean) != 0)
                convertType($1, Boolean);

            writeConditionalJump($1->value, breakLabel, FALSE);

        } else {
            (void) terminateCaptureBlock(Discard);
            setSourceLocation($1->fileNum, $1->lineNum);

            if (strcmp($1->type, Boolean) != 0)
                convertType($1, Boolean);

            directive = catenate3(FullSep, "do (", $1->value, ")");
            writePIL(directive);
            freeString(directive);
        }

        startCaptureBlock();         /* capture "_for_incr" expression */
        $$ = newRuleValue($1->fileNum, $1->lineNum, NULL, NULL);
        freeRuleValue($1);   /* expression */
        freeRuleValue($2);   /* ';' */
        }
    | ';'
        {
        (void) terminateCaptureBlock(Emit);
        startCaptureBlock();         /* capture "_for_incr" expression */
        $$ = newRuleValue($1->fileNum, $1->lineNum, NULL, NULL);
        freeRuleValue($1);   /* ';' */
        }
    ;

/*
** We introduced the new rule "_for_incr" into the grammar so that we can
** capture the PIL code for a "for" statement's increment expression.
*/
_for_incr     /* type = NULL, value = PIL for increment expression */
    : expression
        {
        $$ = newRuleValue($1->fileNum, $1->lineNum, NULL, NULL);
        $$->value = terminateCaptureBlock(Return);
        freeRuleValue($1);   /* expression */
        }
    | /* empty */
        {
        $$ = newRuleValue(0, 0, NULL, NULL);
        $$->value = terminateCaptureBlock(Return);
        }
    ;

jump_statement     /* type = NULL, value = NULL */
    : GOTO _identifier ';'
        {
        setSourceLocation($1->fileNum, $1->lineNum);
        directive = catenate2(FullSep, "goto", $2->value);
        writePIL(directive);
        freeString(directive);
        $$ = newRuleValue($1->fileNum, $1->lineNum, NULL, NULL);
```

```
        freeRuleValue($1);  /* GOTO */
        freeRuleValue($2);  /* identifier */
        freeRuleValue($3);  /* ';' */
    }
| CONTINUE ';'
    {
        if (continueLabel == NULL) {
            warning($1->fileNum, $1->lineNum,
              "Ignoring 'continue' statement outside of loop.");

        } else {
            /*
            ** Continue labels are only emitted if they are referenced.
            ** In order to mark the current continue label as referenced,
            ** we must remove the leading '?' the first time we use it.
            */
            if (*continueLabel == '?')
                strncpy(continueLabel, continueLabel + 1,
                  strlen(continueLabel));

            setSourceLocation($1->fileNum, $1->lineNum);
            directive = catenate2(FullSep, "goto", continueLabel);
            writePIL(directive);
            freeString(directive);
        }

        $$ = newRuleValue($1->fileNum, $1->lineNum, NULL, NULL);
        freeRuleValue($1);  /* CONTINUE */
        freeRuleValue($2);  /* ';' */
    }
| BREAK ';'
    {
        if (breakLabel == NULL) {
            warning($1->fileNum, $1->lineNum,
              "Ignoring 'break' statement outside of loop or switch.");

        } else {
            /*
            ** Break labels in loops are only emitted if referenced.
            ** In order to mark the current break label as referenced,
            ** we must remove the leading '?' the first time we use it.
            */
            if (*breakLabel == '?')
                strncpy(breakLabel, breakLabel + 1,
                  strlen(breakLabel));

            setSourceLocation($1->fileNum, $1->lineNum);
            directive = catenate2(FullSep, "goto", breakLabel);
            writePIL(directive);
            freeString(directive);
        }

        $$ = newRuleValue($1->fileNum, $1->lineNum, NULL, NULL);
        freeRuleValue($1);  /* BREAK */
        freeRuleValue($2);  /* ';' */
    }
| RETURN expression ';'
    {
        setSourceLocation($1->fileNum, $1->lineNum);
        replicate($2->type, $2->value, "result$$");
        writePIL("return stack");
        $$ = newRuleValue($1->fileNum, $1->lineNum, NULL, NULL);
        freeRuleValue($1);  /* RETURN */
        freeRuleValue($2);  /* expression */
        freeRuleValue($3);  /* ';' */
    }
```

```
    RETURN ';'
        {
            setSourceLocation($1->fileNum, $1->lineNum);
            writePI("return stack");
            $$ = newRuleValue($1->fileNum, $1->lineNum, NULL, NULL);
            freeRuleValue($1);   /* RETURN */
            freeRuleValue($2);   /* ';' */
        }
    ;

expression      /* type = type of expression, value = value of expression */
    : assignment_expression
        {
            setSourceLocation($1->fileNum, $1->lineNum);
            $$ = $1;             /* assignment_expression */
        }
    | expression ',' assignment_expression
        {
            freeRuleValue($1);   /* expression */
            freeRuleValue($2);   /* ',' */
            $$ = $3;             /* assignment_expression */
        }
    ;

assignment_expression     /* type = type of expression, value = value of expression */
    : conditional_expression
        {
            setSourceLocation($1->fileNum, $1->lineNum);
            $$ = $1;     /* conditional_expression */
        }
    | unary_expression '=' assignment_expression
        {
            setSourceLocation($1->fileNum, $1->lineNum);
            performAssignment($1, '=', $3);
            $$ = $1;             /* unary_expression */
            freeRuleValue($2);   /* '=' */
            freeRuleValue($3);   /* assignment_expression */
        }
    | unary_expression MUL_ASSIGN assignment_expression
        {
            setSourceLocation($1->fileNum, $1->lineNum);
            performAssignment($1, MUL_ASSIGN, $3);
            $$ = $1;             /* unary_expression */
            freeRuleValue($2);   /* MUL_ASSIGN */
            freeRuleValue($3);   /* assignment_expression */
        }
    | unary_expression DIV_ASSIGN assignment_expression
        {
            setSourceLocation($1->fileNum, $1->lineNum);
            performAssignment($1, DIV_ASSIGN, $3);
            $$ = $1;             /* unary_expression */
            freeRuleValue($2);   /* DIV_ASSIGN */
            freeRuleValue($3);   /* assignment_expression */
        }
    | unary_expression MOD_ASSIGN assignment_expression
        {
            setSourceLocation($1->fileNum, $1->lineNum);
            performAssignment($1, MOD_ASSIGN, $3);
            $$ = $1;             /* unary_expression */
            freeRuleValue($2);   /* MOD_ASSIGN */
            freeRuleValue($3);   /* assignment_expression */
        }
    | unary_expression ADD_ASSIGN assignment_expression
        {
            setSourceLocation($1->fileNum, $1->lineNum);
            performAssignment($1, ADD_ASSIGN, $3);
```

```
        $$ = $1;            /* unary_expression */
        freeRuleValue($2);  /* ADD_ASSIGN */
        freeRuleValue($3);  /* assignment_expression */

    | unary_expression SUB_ASSIGN assignment_expression

        setSourceLocation($1->fileNum, $1->lineNum);
        performAssignment($1, SUB_ASSIGN, $3);
        $$ = $1;            /* unary_expression */
        freeRuleValue($2);  /* SUB_ASSIGN */
        freeRuleValue($3);  /* assignment_expression */

    | unary_expression LEFT_ASSIGN assignment_expression

        setSourceLocation($1->fileNum, $1->lineNum);
        performAssignment($1, LEFT_ASSIGN, $3);
        $$ = $1;            /* unary_expression */
        freeRuleValue($2);  /* LEFT_ASSIGN */
        freeRuleValue($3);  /* assignment_expression */

    | unary_expression RIGHT_ASSIGN assignment_expression

        setSourceLocation($1->fileNum, $1->lineNum);
        performAssignment($1, RIGHT_ASSIGN, $3);
        $$ = $1;            /* unary_expression */
        freeRuleValue($2);  /* RIGHT_ASSIGN */
        freeRuleValue($3);  /* assignment_expression */

    | unary_expression AND_ASSIGN assignment_expression

        setSourceLocation($1->fileNum, $1->lineNum);
        performAssignment($1, AND_ASSIGN, $3);
        $$ = $1;            /* unary_expression */
        freeRuleValue($2);  /* AND_ASSIGN */
        freeRuleValue($3);  /* assignment_expression */

    | unary_expression XOR_ASSIGN assignment_expression

        setSourceLocation($1->fileNum, $1->lineNum);
        performAssignment($1, XOR_ASSIGN, $3);
        $$ = $1;            /* unary_expression */
        freeRuleValue($2);  /* XOR_ASSIGN */
        freeRuleValue($3);  /* assignment_expression */

    | unary_expression OR_ASSIGN assignment_expression

        setSourceLocation($1->fileNum, $1->lineNum);
        performAssignment($1, OR_ASSIGN, $3);
        $$ = $1;            /* unary_expression */
        freeRuleValue($2);  /* OR_ASSIGN */
        freeRuleValue($3);  /* assignment_expression */

    ;

conditional_expression    /* type = type of expression, value = value of expression */
    : logical_OR_expression

        setSourceLocation($1->fileNum, $1->lineNum);
        $$ = $1;     /* logical_OR_expression */

    | logical_OR_expression _question_mark expression _colon conditional_expression

        setSourceLocation($1->fileNum, $1->lineNum);
        $$ = newRuleValue($1->fileNum, $1->lineNum, NULL, NULL);

        if (strcmp($3->type, $5->type) != 0) {  /* op2 & op3 types are diff. */
```

```
            $4->value = newTempVariable(NULL);  /* reserve op 4 name */
            replicate($5->type, $5->value, $4->value);
            terminateBlock("endif");
            capturePIL = FALSE;
            writeVar($4->type, $3->type);
            writeVar($4->value, $5->type);
            (void) terminateCaptureBlock(Emit);
            freeString($3->value);
            $3->value = newString(DUP, $4->type);
            freeString($5->value);
            $5->value = newString(DUP, $4->value);
            convertToCommonType($3, $5);
            $$->value = newTempVariable($3->type);
            $$->type = newString(DUP, $3->type);
            freeString($1->value);
            freeString($2->type);
            $2->type = newString(DUP, SignedInt);
            convertType($2, Boolean);
            $1->value = unparenthesize($2->value);
            startBlock();
            directive = catenate3(FullSep, "if (", $1->value, ")");
            writePIL(directive);
            freeString(directive);
            performAssignment($$, '=', $3);
            directive = catenate3(FullSep, "if ^ (", $1->value, ")");
            writePIL(directive);
            freeString(directive);
            performAssignment($$, '=', $5);
            terminateBlock("endif");

        } else {    /* type of operand 2 & operand 3 are the same */
            replicate($3->type, $5->value, $4->type);
            terminateBlock("endif");
            capturePIL = FALSE;
            writeVar($4->type, $3->type);
            (void) terminateCaptureBlock(Emit);
            $$->value = newString(DUP, $4->type);
            $$->type = newString(DUP, $3->type);
        }

        freeRuleValue($1);   /* logical_OR_expression */
        freeRuleValue($2);   /* _question_mark */
        freeRuleValue($3);   /* expression */
        freeRuleValue($4);   /* _colon */
        freeRuleValue($5);   /* conditional_expression */

    ;

/*
** We introduced the new rule "_question_mark" in order to emit the
** PIL for operand 1 (boolean expression) in a C conditional statement.
** In order to perform the conditional assignment correctly, we must
** generate a temporary variable to hold the results of operand 2
** before generating the PIL that evaluates it.  However, at
** this point we cannot determine the type of operand 2, so we
** must reserve a temporary variable name in this rule and start the
** capture buffer to trap the PIL emitted for the evaluation of operands
** 2 and 3.  The capture buffer contents are emitted once the entire
** conditional expression rule is matched.
*/
_question_mark      /* type = operand 2 temp., value = operand 1 temp. */
    : '?'

        setSourceLocation($1->fileNum, $1->lineNum);
        $$ = newRuleValue($1->fileNum, $1->lineNum, NULL, NULL);
        $$->value = newTempVariable(SignedInt);
```

```
            $$->type = newTempVariable(NULL);
            startCaptureBlock();
            startBlock();
            freeString($1->value);
            convertType($0, Boolean);
            $1->value = unparenthesize($0->value);
            directive = catenate3(FullSep, "if (", $1->value, ")");
            writePIL(directive);
            freeString(directive);
            replicate(SignedInt, "1", $$->value);
            freeRuleValue($1);      /* '?' */
        }
    ;

/*
** We introduced the new rule "_colon" in order to emit the assignment
** PIL for operand 2 and the "if ^" directive that precedes the
** evaluation and assignment of operand 3.
*/
_colon      /* type = operand 2 temp., value = NULL */
    : ':'
        {
            setSourceLocation($1->fileNum, $1->lineNum);
            $$ = newRuleValue($1->fileNum, $1->lineNum, NULL, NULL);
            $$->type = newString(DUP, $-1->type);
            replicate($0->type, $0->value, $$->type);
            advanceBlockNumber();
            freeString($1->value);
            $1->value = unparenthesize($-2->value);
            directive = catenate3(FullSep, "if ^ (", $1->value, ")");
            writePIL(directive);
            freeString(directive);
            replicate(SignedInt, "0", $-1->value);
            freeRuleValue($1);      /* ':' */
        }
    ;

constant_expression     /* type - type of expression, value = value of expression */
    : conditional_expression
        {
            setSourceLocation($1->fileNum, $1->lineNum);
            $$ = $1;    /* conditional_expression */
        }
    ;

logical_OR_expression     /* type = type of expression, value = value of expression */
    : logical_AND_expression
        {
            setSourceLocation($1->fileNum, $1->lineNum);
            $$ = $1;    /* logical_AND_expression */
        }
    | logical_OR_expression _OR_OP logical_AND_expression
        {
            setSourceLocation($1->fileNum, $1->lineNum);
            $$ = terminateLogicalOr($2, $3);
            freeRuleValue($1);  /* logical_OR_expression */
            freeRuleValue($2);  /* _OR_OP */
            freeRuleValue($3);  /* logical_AND_expression */
        }
    ;

/*
** We introduced the new rule "_OR_OP" into the grammar so that we can
** detect a logical OR condition and then return the result of evaluating
** the LHS.
*/
```

```
_OR_OP
    : OR_OP
        {
            setSourceLocation($1->fileNum, $1->lineNum);
            $$ = initiateLogicalOr($0);

            /* Our new rule must replace the LHS of the "||" expression,
            ** so we must eliminate it from the stack.
            */
            freeRuleValue($1);          /* OR_OP */
        }
    ;

logical_AND_expression    /* type = type of expr, value = value of expr */
    : inclusive_OR_expression
        {
            setSourceLocation($1->fileNum, $1->lineNum);
            $$ = $1;    /* inclusive_OR_expression */
        }
    | logical_AND_expression _AND_OP inclusive_OR_expression
        {
            /*
            ** _AND_OP rule value is overloaded with the temporary
            ** variable name
            */
            setSourceLocation($1->fileNum, $1->lineNum);
            $$ = terminateLogicalAnd($1, $2, $3);
            freeRuleValue($1);  /* logical_AND_expression */
            freeRuleValue($2);  /* _AND_OP */
            freeRuleValue($3);  /* inclusive_OR_expression */
        }
    ;

/*
** We introduced the new rule "_AND_OP" into the grammar so that we can
** detect a logical AND condition and then return the result of evaluating
** the LHS.
*/
_AND_OP
    : AND_OP
        {
            setSourceLocation($1->fileNum, $1->lineNum);
            $$ = initiateLogicalAnd($0);
            freeRuleValue($1);          /* AND_OP */
        }
    ;

inclusive_OR_expression    /* type = type of expr, value = value of expr */
    : exclusive_OR_expression
        {
            setSourceLocation($1->fileNum, $1->lineNum);
            $$ = $1;    /* exclusive_OR_expression */
        }
    | inclusive_OR_expression '|' exclusive_OR_expression
        {
            $$ = evalBinaryExpr($1, '|', $3);
            freeRuleValue($1);  /* inclusive_OR_expression */
            freeRuleValue($2);  /* '|' */
            freeRuleValue($3);  /* exclusive_OR_expression */
        }
    ;

exclusive_OR_expression    /* type = type of expr, value = value of expr */
    : AND_expression
        {
```

```
            setSourceLocation($1->fileNum, $1->lineNum);
            $$ = $1;     /* AND_expression */
        }
    | exclusive_OR_expression '^' AND_expression
        {
            $$ = evalBinaryExpr($1, '^', $3);
            freeRuleValue($1);  /* exclusive_OR_expression */
            freeRuleValue($2);  /* '^' */
            freeRuleValue($3);  /* AND_expression */
        }
    ;

AND_expression      /* type = type of expr, value = value of expr */
    : equality_expression
        {
            setSourceLocation($1->fileNum, $1->lineNum);
            $$ = $1;     /* equality_expression */
        }
    | AND_expression '&' equality_expression
        {
            $$ = evalBinaryExpr($1, '&', $3);
            freeRuleValue($1);  /* AND_expression */
            freeRuleValue($2);  /* '&' */
            freeRuleValue($3);  /* equality_expression */
        }
    ;

equality_expression     /* type = type of expr, value = value of expr */
    : relational_expression
        {
            setSourceLocation($1->fileNum, $1->lineNum);
            $$ = $1;     /* relational_expression */
        }
    | equality_expression EQ_OP relational_expression
        {
            setSourceLocation($1->fileNum, $1->lineNum);
            $$ = evalComparison($1, "=", $3);
            freeRuleValue($1);  /* relational_expression */
            freeRuleValue($2);  /* EQ_OP */
            freeRuleValue($3);  /* shift_expression */
        }
    | equality_expression NE_OP relational_expression
        {
            setSourceLocation($1->fileNum, $1->lineNum);
            $$ = evalComparison($1, "^=", $3);
            freeRuleValue($1);  /* relational_expression */
            freeRuleValue($2);  /* NE_OP */
            freeRuleValue($3);  /* shift_expression */
        }
    ;

relational_expression     /* type = type of expr, value = value of expr */
    : shift_expression
        {
            setSourceLocation($1->fileNum, $1->lineNum);
            $$ = $1;     /* shift_expression */
        }
    | relational_expression '<' shift_expression
        {
            setSourceLocation($1->fileNum, $1->lineNum);
            $$ = evalComparison($1, "<", $3);
            freeRuleValue($1);  /* relational_expression */
            freeRuleValue($2);  /* '<' */
            freeRuleValue($3);  /* shift_expression */
```

```
    | relational_expression '>' shift_expression
        {
            setSourceLocation($1->fileNum, $1->lineNum);
            $$ = evalComparison($1, ">", $3);
            freeRuleValue($1);  /* relational_expression */
            freeRuleValue($2);  /* '>' */
            freeRuleValue($3);  /* shift_expression */
        }
    | relational_expression LE_OP shift_expression
        {
            setSourceLocation($1->fileNum, $1->lineNum);
            $$ = evalComparison($1, "< =", $3);
            freeRuleValue($1);  /* relational_expression */
            freeRuleValue($2);  /* LE_OP */
            freeRuleValue($3);  /* shift_expression */
        }
    | relational_expression GE_OP shift_expression
        {
            setSourceLocation($1->fileNum, $1->lineNum);
            $$ = evalComparison($1, "> =", $3);
            freeRuleValue($1);  /* relational_expression */
            freeRuleValue($2);  /* GE_OP */
            freeRuleValue($3);  /* shift_expression */
        }
    ;

shift_expression    /* type = type of expr, value = value of expr */
    : additive_expression
        {
            setSourceLocation($1->fileNum, $1->lineNum);
            $$ = $1;    /* additive_expression */
        }
    | shift_expression LEFT_OP additive_expression
        {
            $$ = evalBinaryExpr($1, LEFT_OP, $3);
            freeRuleValue($1);  /* shift_expression */
            freeRuleValue($2);  /* LEFT_OP */
            freeRuleValue($3);  /* additive_expression */
        }
    | shift_expression RIGHT_OP additive_expression
        {
            $$ = evalBinaryExpr($1, RIGHT_OP, $3);
            freeRuleValue($1);  /* shift_expression */
            freeRuleValue($2);  /* RIGHT_OP */
            freeRuleValue($3);  /* additive_expression */
        }
    ;

additive_expression    /* type = type of expr, value = value of expr */
    : multiplicative_expression
        {
            setSourceLocation($1->fileNum, $1->lineNum);
            $$ = $1;    /* multiplicative_expression */
        }

    | additive_expression '+' multiplicative_expression
        {
            $$ = evalBinaryExpr($1, '+', $3);
            freeRuleValue($1);  /* additive_expression */
            freeRuleValue($2);  /* '+' */
            freeRuleValue($3);  /* multiplicative_expression */
        }

    | additive_expression '-' multiplicative_expression
        {
```

```
            $$ = evalBinaryExpr($1, '-', $3);
            freeRuleValue($1);  /* additive_expression */
            freeRuleValue($2);  /* '-' */
            freeRuleValue($3);  /* multiplicative_expression */
        }
    ;

multiplicative_expression    /* type = type of expr, value = value of expr */
    : cast_expression
        {
            setSourceLocation($1->fileNum, $1->lineNum);
            $$ = $1;     /* case expression */
        }

    | multiplicative_expression '*' cast_expression
        {
            $$ = evalBinaryExpr($1, '*', $3);
            freeRuleValue($1);  /* multiplicative_expression */
            freeRuleValue($2);  /* '*' */
            freeRuleValue($3);  /* cast_expression */
        }

    | multiplicative_expression '/' cast_expression
        {
            $$ = evalBinaryExpr($1, '/', $3);
            freeRuleValue($1);  /* multiplicative_expression */
            freeRuleValue($2);  /* '/' */
            freeRuleValue($3);  /* cast_expression */
        }

    | multiplicative_expression '%' cast_expression
        {
            $$ = evalBinaryExpr($1, '%', $3);
            freeRuleValue($1);  /* multiplicative_expression */
            freeRuleValue($2);  /* '%' */
            freeRuleValue($3);  /* cast_expression */
        }
    ;

cast_expression    /* type = type of expr, value = value of expr */
    : unary_expression
        {
            setSourceLocation($1->fileNum, $1->lineNum);
            $$ = $1;     /* unary_expression */
        }

    | '(' type_name ')' cast_expression
        {
            setSourceLocation($2->fileNum, $2->lineNum);
            $$ = newRuleValue($2->fileNum, $2->lineNum, $4->type, $4->value);
            convertType($$, $2->type);
            freeRuleValue($1);  /* '(' */
            freeRuleValue($2);  /* type name */
            freeRuleValue($3);  /* ')' */
            freeRuleValue($4);  /* cast_expression */
        }
    ;

unary_expression    /* type = type of expr, value = value of expr */
    : postfix_expression
        {
            setSourceLocation($1->fileNum, $1->lineNum);
            $$ = $1;     /* postfix_expression */
        }

    | INC_OP unary_expression
        {
```

```
            setSourceLocation($2->fileNum, $2->lineNum);
            $$ = evalUnaryExpr($2, "b++");
            freeRuleValue($1);  /* INC_OP */
            freeRuleValue($2);  /* unary_expression */
        }

    | DEC_OP unary_expression
        {
            setSourceLocation($2->fileNum, $2->lineNum);
            $$ = evalUnaryExpr($2, "b--");
            freeRuleValue($1);  /* DEC_OP */
            freeRuleValue($2);  /* unary_expression */
        }

    | unary_operator cast_expression
        {
            setSourceLocation($2->fileNum, $2->lineNum);
            $$ = evalUnaryExpr($2, $1->value);
            freeRuleValue($1);  /* unary_operator */
            freeRuleValue($2);  /* cast_expression */
        }

    | SIZEOF unary_expression
        {
            $$ = newRuleValue($1->fileNum, $1->lineNum, UnsignedLong, NULL);
            $$->value = longToString(sizeOfType($2->type));

            if (strcmp($$->value, "-1") == 0) {
                diagnostic = catenate2(NoSep, "Invalid 'sizeof' argument:  ",
                  $2->value);
                warning($1->fileNum, $1->lineNum, diagnostic);
                freeString(diagnostic);
                freeString($$->value);
                $$->value = catenate3(NoSep, "SIZEOF(", $2->type, ")");
            }

            freeRuleValue($1);  /* sizeof */
            freeRuleValue($2);  /* cast_expression */
        }

    | SIZEOF '(' type_name ')'
        {
            $$ = newRuleValue($1->fileNum, $1->lineNum, UnsignedLong, NULL);
            $$->value = longToString(sizeOfType($3->type));

            if (strcmp($$->value, "-1") == 0) {
                diagnostic = catenate2(NoSep, "Invalid 'sizeof' argument:  ",
                  $3->type);
                warning($1->fileNum, $1->lineNum, diagnostic);
                freeString(diagnostic);
                freeString($$->value);
                $$->value = catenate3(NoSep, "SIZEOF(", $3->type, ")");
            }

            freeRuleValue($1);  /* sizeof */
            freeRuleValue($2);  /* '(' */
            freeRuleValue($3);  /* type_name */
            freeRuleValue($4);  /* ')' */
        }
    ;

unary_operator
    : '&'
        {
            $$ = newRuleValue($1->fileNum, $1->lineNum, NULL, "&");
            freeRuleValue($1);  /* '&' */
```

```
    | '*'
        {
            $$ = newRuleValue($1->fileNum, $1->lineNum, NULL, "*");
            freeRuleValue($1);  /* '*' */
        }
    | '+'
        {
            $$ = newRuleValue($1->fileNum, $1->lineNum, NULL, "+");
            freeRuleValue($1);  /* '+' */
        }
    | '-'
        {
            $$ = newRuleValue($1->fileNum, $1->lineNum, NULL, "-");
            freeRuleValue($1);  /* '-' */
        }
    | '~'
        {
            $$ = newRuleValue($1->fileNum, $1->lineNum, NULL, "~");
            freeRuleValue($1);  /* '~' */
        }
    | '!'
        {
            $$ = newRuleValue($1->fileNum, $1->lineNum, NULL, "!");
            freeRuleValue($1);  /* '!' */
        }
    ;
postfix_expression     /* type = type of expr, value = value of expr */
    : primary_expression
        {
            setSourceLocation($1->fileNum, $1->lineNum);
            $$ = $1;     /* primary_expression */
        }
    | postfix_expression '[' expression ']'
        {
            $$ = evalSubscript($1, $3);
            freeRuleValue($1);  /* postfix expression */
            freeRuleValue($2);  /* '[' */
            freeRuleValue($3);  /* expression */
            freeRuleValue($4);  /* ']' */
        }
    | postfix_expression '(' _argument_expression_list ')'
        {
            setSourceLocation($1->fileNum, $1->lineNum);
            $$ = performCall($1, $3);
            freeRuleValue($1);  /* postfix_expression */
            freeRuleValue($2);  /* '(' */
            freeRuleValue($3);  /* _argument_expression_list */
            freeRuleValue($4);  /* ')' */
        }
    | postfix_expression '.' _identifier
        {
            $$ = evalDotOrArrowExpr($1, '.', $3);
            freeRuleValue($1);  /* postfix_expression */
            freeRuleValue($2);  /* '.' */
            freeRuleValue($3);  /* _identifier */
        }
    | postfix_expression PTR_OP _identifier
        {
            $$ = evalDotOrArrowExpr($1, PTR_OP, $3);
```

```
            freeRuleValue($1);   /* postfix_expression */
            freeRuleValue($2);   /* PTR_OP */
            freeRuleValue($3);   /* _identifier */
        }
    | postfix_expression INC_OP
        {
            setSourceLocation($1->fileNum, $1->lineNum);
            $$ = evalUnaryExpr($1, "a++");
            freeRuleValue($1);   /* postfix_expression */
            freeRuleValue($2);   /* INC_OP */
        }
    | postfix_expression DEC_OP
        {
            setSourceLocation($1->fileNum, $1->lineNum);
            $$ = evalUnaryExpr($1, "a--");
            freeRuleValue($1);   /* postfix_expression */
            freeRuleValue($2);   /* DEC_OP */
        }
    ;

/*
** We introduced the new rule "_argument_expression_list" into the grammar
** to simplify handling of function calls by combining empty and nonempty
** argument lists into a single rule.
*/
_argument_expression_list    /* type = NULL, value = argument list */
    : /* empty */
        {
            $$ = newRuleValue($0->fileNum, $0->lineNum, NULL, "");
        }
    | argument_expression_list
        {
            $$ = $1;    /* argument_expression_list */
        }
    ;

primary_expression    /* type = type of expr, value = value of expr */
    : IDENTIFIER
        {
            SymInfo *sym;

            setSourceLocation($1->fileNum, $1->lineNum);
            checkVar($1->value);
            $$ = $1;    /* IDENTIFIER */
        }
    | constant
        {
            setSourceLocation($1->fileNum, $1->lineNum);
            $$ = $1;    /* CONSTANT */
        }
    | STRING_LITERAL
        {
            setSourceLocation($1->fileNum, $1->lineNum);
            $$ = newRuleValue($1->fileNum, $1->lineNum, $1->type, NULL);
            $$->value = evalStringLiteral($1->value, $1->type);
            freeRuleValue($1);  /* STRING_LITERAL */
        }
    | '(' expression ')'
        {
            if (isAtomic($2->value))
                $$ = $2;        /* expression */

            else {
                $$ = newRuleValue($1->fileNum, $1->lineNum, $2->type, NULL);
                $$->value = catenate3(FullSep, "(", $2->value, ")");
```

```
            freeRuleValue($2);        /* expression */
        }

        freeRuleValue($1);    /* '(' */
        freeRuleValue($4);    /* ')' */
    }
    ;

argument_expression_list    /* type = NULL, value = arg list */
    : assignment_expression
        {
        prepareForUse($1);
        $$ = newRuleValue($1->fileNum, $1->lineNum, NULL, NULL);

        if (strcmp($1->type, Boolean) == 0)
            convertType($1, SignedInt);

        /*
        ** Append the type information to the parameter so that it
        ** is available when the PIL "call" directive is generated
        ** in "performCall".  Enclose the value in parentheses in
        ** case it contains a ':'.
        */
        $$->value = catenate4(NoSep, "(", $1->value, "):", $1->type);
        freeRuleValue($1);    /* assignment_expression */
        }
    | argument_expression_list ',' assignment_expression
        {
        prepareForUse($3);
        $$ = newRuleValue($1->fileNum, $1->lineNum, NULL, NULL);

        if (strcmp($3->type, Boolean) == 0)
            convertType($3, SignedInt);

        /*
        ** Append the type information to the parameter so that it
        ** is available when the PIL "call" directive is generated
        ** in "performCall".  Enclose the value in parentheses in
        ** case it contains a ':'.
        */
        $$->value = catenate5(NoSep, $1->value, ",(", $3->value, "):",
          $3->type);
        freeRuleValue($1);    /* argument_expression_list */
        freeRuleValue($2);    /* ',' */
        freeRuleValue($3);    /* assignment_expression */
        }
    ;

constant    /* type = type of constant, value = value of constant */
    : INTEGER_CONSTANT
        {
        $$ = $1;      /* INTEGER_CONSTANT */
        }
    | CHARACTER_CONSTANT
        {
        /*
        ** NOTE:  This rule will never actually be executed, since the
        ** scanner converts character constants into integer constants.
        */
        $$ = $1;      /* CHARACTER_CONSTANT */
        }
    | FLOATING_CONSTANT
        {
        $$ = $1;      /* FLOATING_CONSTANT */
```

```
| ENUMERATION_CONSTANT
    {
        /*
        ** NOTE:  This rule will never actually be executed, since the
        ** scanner does not detect enumeration constants.  Instead,
        ** enumeration constants are detected in the actions for the
        ** "primary_expression : IDENTIFIER" production.
        */
        $$ = $1;     /* ENUMERATION_CONSTANT */
    }
  ;
%%
```

jcomuzzi@pss2 scanner.l

SPARCprinter
Fri Oct 27 18:02:59 1995

NeWSprint 2.0
Openwin library 3
NeWSprint interpreter 3.000

NeWSprint 2.0

%p 357.

%{

```
/*************************************************************/
/*                                                         */
/*      Copyright (c) 1995 Peritus Software Services, Inc.  */
/*        All Rights Reserved                               */
/*                                                         */
/*      THIS IS UNPUBLISHED PROPRIETARY SOURCE CODE OF      */
/*      Peritus Software Services, Inc.                     */
/*                                                         */
/*      This program contains confidential and proprietary */
/*      information of Peritus Software Services, Inc., and */
/*      any reproduction, disclosure, or use in whole or in */
/*      part is expressly prohibited, except as may be     */
/*      specifically authorized by prior written agreement or */
/*      permission of Peritus.                             */
/*                                                         */
/*      The copyright notice above does not evidence any   */
/*      actual or intended publication of such source code. */
/*                                                         */
/*************************************************************/

/*
**  This is a lexical analyzer for the C language.
*/

#include <assert.h>
#include <ctype.h>
#include <stdio.h>
#include <stdlib.h>
#include <string.h>

#include "c2pil.h"
#include "fns_a2d.h"
#include "fns_e2h.h"
#include "fns_i2l.h"
#include "fns_m2p.h"
#include "fns_q2t.h"
#include "fns_u2z.h"
#include "parser.h"
#include "scanner.h"
#include "tokens.h"

/*
**  General Constants
*/
#   define EOS          0
#   define PATHLEN      256

/*
**  Macro Definitions
*/
#define LASTCHAR(val)            (strlen(val)-((strlen(val)>0)? 1:0))
#define NEXTTOLASTCHAR(val)      (strlen(val)-((strlen(val)>1)? 2:1))

/*
**  Calculations for Target Integer Constant Size.  The largest unsigned
**  int calculation is dependent on the sizes of ints and longs on the
**  target machine, so it is held in a local variable in integerConstant.
*/
#   define LARGEST_SIGNED_INT    ((1L << (sizeOfInt*BITS_PER_BYTE-1))-1)
#   define LARGEST_SIGNED_LONG   ((1L << (sizeOfLong*BITS_PER_BYTE-1))-1)
```

```
/*
**  Local Typedefs
*/
typedef char fileInfo[PATHLEN];

/*
** Public Global Variables
*/
BOOL allowTypedefName = TRUE;          /* controls typedef name look-up */
BOOL wasTypedefName = FALSE;           /* last token seen was typedef name? */
/*
** Private Global Variables
*/
static int       fileNum = 0;          /* Current source file number */
static fileInfo *fileName = NULL;      /* List of source file names */
static int       lineNum = 1;          /* Current line number in source */
static int       maxFiles = 20;        /* Initial default for include files */
                                       /* increased automatically if needed */
static char     *msg;                  /* message buffer */

/*
** Local Function Prototypes
*/
static int   charConstant ARGS((char *value));
static int   floatingConstant ARGS((char *value));
static void  flushComment ARGS((void));
static int   identifier ARGS((char *value));
static int   integerConstant ARGS((char *value));
static int   stringLiteral ARGS((char *value));
static int   token ARGS((int tag));
static void  updateFileInfo ARGS((void));
static int   yywrap ARGS((void));

%}

D                    [0-9]
L                    [a-zA-Z_]
H                    [a-fA-F0-9]
E                    [Ee][+-]?{D}+
FS                   (f|F|l|L)
IS                   (u|U|l|L)*

%%

"cdecl"              { ;     /* Borland Preprocessor Workaround - RRW */ }
"_Cdecl"             { ;     /* Borland Preprocessor Workaround - RRW */ }

"/*"                 { flushComment(); }

"auto"               { wasTypedefName = FALSE; return(token(AUTO)); }
"break"              { wasTypedefName = FALSE; return(token(BREAK)); }
"case"               { wasTypedefName = FALSE; return(token(CASE)); }
"char"               { wasTypedefName = FALSE; return(token(CHAR)); }
"const"              { wasTypedefName = FALSE; return(token(CONST)); }
"continue"           { wasTypedefName = FALSE; return(token(CONTINUE)); }
"default"            { wasTypedefName = FALSE; return(token(DEFAULT)); }
"do"                 { wasTypedefName = FALSE; return(token(DO)); }
"double"             { wasTypedefName = FALSE; return(token(DOUBLE)); }
"else"               { wasTypedefName = FALSE; return(token(ELSE)); }
"enum"               { wasTypedefName = FALSE; return(token(ENUM)); }
"extern"             { wasTypedefName = FALSE; return(token(EXTERN)); }
"float"              { wasTypedefName = FALSE; return(token(FLOAT)); }
"for"                { wasTypedefName = FALSE; return(token(FOR)); }
"goto"               { wasTypedefName = FALSE; return(token(GOTO)); }
"if"                 { wasTypedefName = FALSE; return(token(IF)); }
"int"                { wasTypedefName = FALSE; return(token(INT)); }
```

```
"long"                  { wasTypedefName = FALSE; return(token(LONG)); }
"register"              { wasTypedefName = FALSE; return(token(REGISTER)); }
"return"                { wasTypedefName = FALSE; return(token(RETURN)); }
"short"                 { wasTypedefName = FALSE; return(token(SHORT)); }
"signed"                { wasTypedefName = FALSE; return(token(SIGNED)); }
"sizeof"                { wasTypedefName = FALSE; return(token(SIZEOF)); }
"static"                { wasTypedefName = FALSE; return(token(STATIC)); }
"struct"                { wasTypedefName = FALSE; return(token(STRUCT)); }
"switch"                { wasTypedefName = FALSE; return(token(SWITCH)); }
"typedef"               { wasTypedefName = FALSE; return(token(TYPEDEF)); }
"union"                 { wasTypedefName = FALSE; return(token(UNION)); }
"unsigned"              { wasTypedefName = FALSE; return(token(UNSIGNED)); }
"void"                  { wasTypedefName = FALSE; return(token(VOID)); }
"volatile"              { wasTypedefName = FALSE; return(token(VOLATILE)); }
"while"                 { wasTypedefName = FALSE; return(token(WHILE)); }

{L}({L}|{D})*           { return(identifier(yytext)); }

0[xX]{H}+{IS}?          { wasTypedefName = FALSE; return(integerConstant(yytext)); }
0{D}+{IS}?              { wasTypedefName = FALSE; return(integerConstant(yytext)); }
{D}+{IS}?               { wasTypedefName = FALSE; return(integerConstant(yytext)); }
'(\\.|[^\\'])+'         { wasTypedefName = FALSE; return(charConstant(yytext)); }

{D}+{E}{FS}?            { wasTypedefName = FALSE; return(floatingConstant(yytext)); }
{D}*"."{D}+({E})?{FS}?  { wasTypedefName = FALSE; return(floatingConstant(yytext)); }
{D}+"."{D}*({E})?{FS}?  { wasTypedefName = FALSE; return(floatingConstant(yytext)); }

(\"(\\.|[^\\"])*\"[ \t\v\n\f]*)+ { wasTypedefName = FALSE; return(stringLiteral(yytext)); }

"..."                   { wasTypedefName = FALSE; return(token(ELLIPSIS)); }
">>="                   { wasTypedefName = FALSE; return(token(RIGHT_ASSIGN)); }
"<<="                   { wasTypedefName = FALSE; return(token(LEFT_ASSIGN)); }
"+="                    { wasTypedefName = FALSE; return(token(ADD_ASSIGN)); }
"-="                    { wasTypedefName = FALSE; return(token(SUB_ASSIGN)); }
"*="                    { wasTypedefName = FALSE; return(token(MUL_ASSIGN)); }
"/="                    { wasTypedefName = FALSE; return(token(DIV_ASSIGN)); }
"%="                    { wasTypedefName = FALSE; return(token(MOD_ASSIGN)); }
"&="                    { wasTypedefName = FALSE; return(token(AND_ASSIGN)); }
"^="                    { wasTypedefName = FALSE; return(token(XOR_ASSIGN)); }
"|="                    { wasTypedefName = FALSE; return(token(OR_ASSIGN)); }
">>"                    { wasTypedefName = FALSE; return(token(RIGHT_OP)); }
"<<"                    { wasTypedefName = FALSE; return(token(LEFT_OP)); }
"++"                    { wasTypedefName = FALSE; return(token(INC_OP)); }
"--"                    { wasTypedefName = FALSE; return(token(DEC_OP)); }
"->"                    { wasTypedefName = FALSE; return(token(PTR_OP)); }
"&&"                    { wasTypedefName = FALSE; return(token(AND_OP)); }
"||"                    { wasTypedefName = FALSE; return(token(OR_OP)); }
"<="                    { wasTypedefName = FALSE; return(token(LE_OP)); }
">="                    { wasTypedefName = FALSE; return(token(GE_OP)); }
"=="                    { wasTypedefName = FALSE; return(token(EQ_OP)); }
"!="                    { wasTypedefName = FALSE; return(token(NE_OP)); }
";"                     { wasTypedefName = FALSE; return(token(';')); }
"{"                     { wasTypedefName = FALSE; return(token('{')); }
"}"                     { wasTypedefName = FALSE; return(token('}')); }
","                     { wasTypedefName = FALSE; return(token(',')); }
":"                     { wasTypedefName = FALSE; return(token(':')); }
"="                     { wasTypedefName = FALSE; return(token('=')); }
"("                     { wasTypedefName = FALSE; return(token('(')); }
")"                     { wasTypedefName = FALSE; return(token(')')); }
"["                     { wasTypedefName = FALSE; return(token('[')); }
"]"                     { wasTypedefName = FALSE; return(token(']')); }
"."                     { wasTypedefName = FALSE; return(token('.')); }
"&"                     { wasTypedefName = FALSE; return(token('&')); }
"!"                     { wasTypedefName = FALSE; return(token('!')); }
"~"                     { wasTypedefName = FALSE; return(token('~')); }
"-"                     { wasTypedefName = FALSE; return(token('-')); }
```

```
"+"                          { wasTypedefName = FALSE; return(token('+')); }
"*"                          { wasTypedefName = FALSE; return(token('*')); }
"/"                          { wasTypedefName = FALSE; return(token('/')); }
"%"                          { wasTypedefName = FALSE; return(token('%')); }
"<"                          { wasTypedefName = FALSE; return(token('<')); }
">"                          { wasTypedefName = FALSE; return(token('>')); }
"^"                          { wasTypedefName = FALSE; return(token('^')); }
"|"                          { wasTypedefName = FALSE; return(token('|')); }
"?"                          { wasTypedefName = FALSE; return(token('?')); }
^[ \t]*#[ \t]*[0-9]+.*       { updateFileInfo(); }
^[ \t]*#[ \t]*define.*       { yyerror("Preprocessor Directive \"define\" Found"); }
^[ \t]*#[ \t]*undef.*        { yyerror("Preprocessor Directive \"undef\" Found"); }
^[ \t]*#[ \t]*include.*      { yyerror("Preprocessor Directive \"include\" Found"); }
^[ \t]*#[ \t]*if.*           { yyerror("Preprocessor Directive \"if\" Found"); }
^[ \t]*#[ \t]*ifdef.*        { yyerror("Preprocessor Directive \"ifdef\" Found"); }
^[ \t]*#[ \t]*ifndef.*       { yyerror("Preprocessor Directive \"ifndef\" Found"); }
^[ \t]*#[ \t]*else.*         { yyerror("Preprocessor Directive \"else\" Found"); }
^[ \t]*#[ \t]*endif.*        { yyerror("Preprocessor Directive \"endif\" Found"); }
^[ \t]*#[ \t]*elif.*         { yyerror("Preprocessor Directive \"elif\" Found"); }
^[ \t]*#[ \t]*ident.*        { /* Ignore #ident directives */ }
^[ \t]*#.+                   { /* ignore unknown cpp directives & print warning */
                               msg = newString(DUP, catenate2(NoSep,
                                 "Ignoring Directive: ", yytext));
                               warning( fileNum, lineNum, msg);
                               freeString(msg);
                             }
"\n"                         { lineNum += 1; }
[ \t\r\v\f]                  { /* ignore whitespace */ }
.                            { /* ignore bad characters & print warning */

                               if (isprint(yytext[0]))
                                   msg = newString(DUP, catenate2(NoSep,
                                     "Ignoring Character: ", yytext));

                               else {
                                   char value[4];

                                   sprintf(value, "%d", yytext[0]);
                                   msg = newString(DUP, catenate2(NoSep,
                                     "Ignoring Unprintable Character: ASCII ",
                                     value));
                               }

                               warning( fileNum, lineNum, msg);
                               freeString(msg);
                             }

%%

/*------------------------------ Public Functions ------------------------------*/

/*
** Function "fatalError" issues a diagnostic to "stderr" and then terminates
** the program.  Although this routine supports the parser rather than the
** scanner, it is located here rather than in "parser2.c" so that it can
** access the array of source file names that the scanner maintains.
*/
void
fatalError(fileNumber, lineNumber, diagnostic)
    int    fileNumber;
    int    lineNumber;
    char  *diagnostic;
{
    /*
    **  Flush "stdout", then write the diagnostic to "stderr".
    */
```

```
    fflush(stdout);
    fprintf(stderr, "ERROR:  %s\n", diagnostic);

    /*
    ** If the location for the error has an invalid line number, the caller
    ** must not know where the error occurred, so use the scanner's current
    ** location.
    */
    if (lineNumber < 1) {
        fileNumber = fileNum;
        lineNumber = lineNum;
    }

    /*
    ** Write the location of the error to "stderr" and terminate the program.
    */
    if (fileNumber >= 0 && fileNumber < maxFiles && fileName != NULL &&
      fileName[fileNumber][0] != '\0')
        fprintf(stderr, "        Detected on line %d in file %s.\n",
          lineNumber, fileName[fileNumber]);
    else
        fprintf(stderr, "        Detected on line %d.\n", lineNumber);

    exit(1);
}


/*
** Function "warning" issues a warning diagnostic to "stderr".  Although this
** routine supports the parser rather than the scanner, it is located here
** rather than in "parser1.c" so that it can access the array of source file
** names that the scanner maintains.
*/
void
warning(fileNumber, lineNumber, diagnostic)
    int   fileNumber;
    int   lineNumber;
    char *diagnostic;
{
    /*
    **  Flush "stdout", then write the diagnostic to "stderr".
    */
    fflush(stdout);
    fprintf(stderr, "WARNING:  %s\n", diagnostic);

    /*
    ** If the location for the error has an invalid line number, the caller
    ** must not know where the error occurred, so use the scanner's current
    ** location.
    */
    if (lineNumber < 1) {
        fileNumber = fileNum;
        lineNumber = lineNum;
    }

    /*
    ** Write the location of the error to "stderr".
    */
    if (fileNumber >= 0 && fileNumber < maxFiles && fileName != NULL &&
      fileName[fileNumber][0] != '\0')
        fprintf(stderr, "          Detected on line %d in file %s.\n",
          lineNumber, fileName[fileNumber]);
    else
        fprintf(stderr, "          Detected on line %d.\n", lineNumber);
}
```

```
/*
** Function "yyerror" is called by the "yacc" generated code to handle
** any errors detected in the input source.  It simply issues a diagnostic
** and aborts the program.  Normally this routine would be contained in
** the parser support module (parser2.c), but it has been moved here to
** gain access to the global source file and line number values to
** augment the diagnostic message.
*/
void
yyerror(diagnostic)
    char *diagnostic;           /* description of error */
{
    fflush(stdout);
    fprintf(stderr, "ERROR:  %s\n", diagnostic);

    if (fileName == NULL)
        fprintf(stderr,
          "    .   Detected on line %d at token '%s'.\n",
          lineNum, yytext);
    else
        fprintf(stderr,
          "        Detected on line %d in file %s at token '%s'.\n",
          lineNum, fileName[fileNum], yytext);

    exit(1);
}

/*---------------------------- Local Functions ----------------------------*/

/*
** Function "charConstant" converts a character constant into an integer
** and creates a new parser rule value for an integer constant.
*/
static int                      /* Integer Constant designator */
charConstant(value)
    char *value;                /* string representing the constant */
{
    int   idx;                  /* string index */
    char *numStr;               /* string to hold octal/hex esc. */

    yylval = newRuleValue(fileNum, lineNum, SignedInt, NULL);

    if (strlen(value) < 3)      /* indicates "''" */
        yylval->value = newString(DUP, "0");

    else if (value[1] != '\\')  /* indicates single char */
        yylval->value = intToString((int) value[1]);

    /*
    ** Look for an octal or hex escape sequence, and
    ** substitute the indicated character code
    */
    else if (value[2] >= '0' && value[2] <= '7') {      /* octal esc */
        numStr = newString(strlen(value), "0");
        strncat(numStr, &(value[2]), 3);
        for (idx = 1; numStr[idx] >= '0' && numStr[idx] <= '7'; idx++);
        numStr[idx] = 0;
        yylval->value =
          setConstantPrecision(convertStrToBin(numStr), SignedChar);
        freeString(numStr);
    }

    else if (value[2] == 'x') { /* hex escape sequence */
        numStr = newString(strlen(value), "0");
        strcat(numStr, &(value[2]));
```

```
        for (idx = 2; (numStr[idx] >= '0' && numStr[idx] <= '9') ||
                              (toupper(numStr[idx]) >= 'A' &&
                               toupper(numStr[idx]) <= 'F'); idx++);
        numStr[idx] = 0;
        yylval->value =
          setConstantPrecision(convertStrToBin(numStr), SignedChar);
        freeString(numStr);
    }

    else {        /* Character escape sequence */
        yylval->value = intToString(
               (value[2] == 'a') ? 7 :      /* Alert (bell) */
               (value[2] == 'b') ? 8 :      /* Backspace */
               (value[2] == 'f') ? 12 :     /* Form feed */
               (value[2] == 'n') ? 10 :     /* New line */
               (value[2] == 'r') ? 13 :     /* Carriage return */
               (value[2] == 't') ? 9 :      /* Horizontal tab */
               (value[2] == 'v') ? 11 :     /* Vertical tab */
               (value[2] == '\"') ? 34 :    /* Double quote char */
               (value[2] == '\'') ? 39 :    /* Single quote char */
               (value[2] == '\?') ? 63 :    /* Question mark char */
               (value[2] == '\\') ? 92 :    /* Backslash char */
               (int) value[2]);             /* Default: Ascii value */
    }

    return INTEGER_CONSTANT;
}

/*
** Function "floatingConstant" creates a new parser rule value for a
** floating constant.  The type of the constant (i.e., float, double
** or long double) is determined by the suffix.  A constant without a
** suffix defaults to type Double.
**
** The rule value's address is stored in the parser's "yylval" variable.
*/
static int                          /* Float Constant designator */
floatingConstant(value)
    char *value;                    /* string representing the constant */
{
    char *type;                     /* type code for constant */

    assert(strlen(value) > 0);   /* value cannot be a null string */

    /*
    ** Set the constant type based on the suffix.  If there is no
    ** suffix, then the constant defaults to Double.
    */
    if (toupper(value[LASTCHAR(value)]) == 'L')
        type = newString(DUP, LongDouble);

    else if (toupper(value[LASTCHAR(value)]) == 'F')
        type = newString(DUP, Float);

    else
        type = newString(DUP, Double);

    /*
    ** Create the new rule.  Strip any suffix from the value string.
    */
    yylval = newRuleValue(fileNum, lineNum, type, NULL);
    yylval->value =
       newString((strcmp(type, Double) == 0) ? strlen(value) :
                                                LASTCHAR(value), value);
    freeString(type);
```

```
    return FLOATING_CONSTANT;
}


/*
** Function "flushComment" reads and discards input characters until either
** '*' followed immediately by '/' is detected or the input is exhausted.
** The current line number is updated whenever an end-of-line character is
** flushed.
*/
static void
flushComment()
{
    char curChar;
    char prevChar;

    curChar = '\0';

    while (TRUE) {
        prevChar = curChar;
        curChar = input();

        if (curChar == 0)
            break;              /* end-of file encountered */

        if (prevChar == '*' && curChar == '/')
            break;              /* end-of-comment detected */

        if (curChar == '\n')
            lineNum += 1;       /* end-of-line detected */
    }
}


/*
** Function "identifier" creates a new parser rule value for an identifier
** token.  If the global flag "allowTypedefName" (which is controlled by
** the parser and is set FALSE whenever the parser detects a situation in
** which a typedef name may be redefined) is TRUE, the function consults the
** symbol table to determine if this is a typedef name instead of just a
** regular identifier.  The return value is set accordingly.  The rule value's
** address is stored in the parser's "yylval" variable.
**
** LIMITATION:  The strategy used for determining when an identifier is in
** fact a typedef name does not correctly handle all cases.  It does not
** take into account the name space that the identifier will be assigned
** to.  Thus, if the identifier is a label or the tag for an enum, struct
** or union, this function will erroneously return TYPEDEF_NAME if the
** symbol table indicates there is a typedef with that name.  This is not
** a problem since the parser grammar has been altered to catch this.
**
** Lookahead problem: In certain instances the above strategy does not
** work correctly due to lookahead, which can prevent allowTypedefName
** from being set correctly.  The current solution has been to observe
** that a legal (ANSI) C program cannot contain two adjacent
** occurrences of a TYPEDEF_NAME - the second occurrence, if legal,
** must refer to an IDENTIFIER.  Thus, a global variable,
** wasTypedefName, has been added to ensure that the scanner never
** returns two adjacent TYPEDEF_NAMEs.  This has the unfortunate
** consequence of requiring the addition of a statement to reset
** wasTypedefName to almost all lexical actions, and in the cases where
** an IDENTIFIER has incorrectly been seen as a TYPEDEF_NAME (see
** _identifier in parser.y).
*/
static int                      /* IDENTIFIER or TYPEDEF_NAME */
identifier(value)
```

```
    char *value;
{
    char *symbolType;              /* identifier's type if in symbol table */
    int   tokenType;               /* IDENTIFIER or TYPEDEF_NAME */

    symbolType = locateSymbolType(value, Objects, MAX_LEVELS);

    if (symbolType == NULL) {
        tokenType = IDENTIFIER;
    } else {
        if (!wasTypedefName && allowTypedefName &&
          strncmp(symbolType, "typedef", sizeof("typedef") - 1) == 0) {
            tokenType = TYPEDEF_NAME;
            wasTypedefName = TRUE;
        }
        else {
            tokenType = IDENTIFIER;
            wasTypedefName = FALSE;
        }
    }

    yylval = newRuleValue(fileNum, lineNum, symbolType, value);
    return tokenType;
}


/*
** Function "integerConstant" creates a new parser rule value for an
** integer constant.  The type of the constant (i.e., int, unsigned int,
** long or unsigned long) is determined from the size of the constant,
** the radix of the constant, and any suffixes that may be present.
**
** When type selection is based on the size of the constant, rather
** than on any suffixes, a global constant (ansi) determines whether
** to use the ANSI standard or the traditional (K&R) rules.  However,
** this function does allow the non-standard usage of the 'U' or 'u'
** suffix even when ANSI mode is not selected.
**
** The constant is passed in as a string representation in octal,
** hexadecimal or decimal base.  The value is converted to a string
** of decimal digits without any suffix characters.  The input value
** cannot be the NULL string.
**
** The rule value's address is stored in the parser's "yylval" variable.
*/
static int                          /* Integer Constant designator */
integerConstant(value)
    char *value;                    /* string representing the constant */
{
    BOOL          decimal;          /* TRUE if constant is base 10 */
    unsigned long largestUnsignedInt;   /* largest unsigned int on the target */
    unsigned long num;              /* value string converted to binary */
    BOOL          suffixLong;       /* TRUE if constant ends in L */
    BOOL          suffixUnsigned;   /* TRUE if constant ends in U or UL */
    char         *type;             /* type code for constant */

    assert(strlen(value) > 0);      /* value cannot be a null string */
    assert(value[0] != '-');        /* value cannot be negative */

    /*
    ** Calculate the value of the largest unsigned integer on the target
    ** machine.  We must avoid shifting by the entire length of a long,
    ** since the results are implementation-dependent.
    */
    largestUnsignedInt = (sizeof(long) > sizeOfInt) ?
```

```c
        (unsigned long)(1L << (sizeOfInt*BITS_PER_BYTE))-1 :
        (unsigned long)(1L << (sizeOfInt*BITS_PER_BYTE-1) >> (sizeOfInt*BITS_PER_BYTE-1));

    /*
    ** Determine the constant radix;
    */
    decimal = (value[0] != '0');

    /*
    ** Look for a Long and/or Unsigned suffix value
    */
    suffixLong =    (toupper(value[LASTCHAR(value)]) == 'L') ||
                    (toupper(value[NEXTTOLASTCHAR(value)]) == 'L');
    suffixUnsigned = (toupper(value[LASTCHAR(value)]) == 'U') ||
                    (toupper(value[NEXTTOLASTCHAR(value)]) == 'U');

    /*
    ** Convert the input string to its binary representation (base 10).
    ** Ensure the result field has plenty of room for converting Hex values
    ** to their potentially longer binary equivalents. The conversion
    ** routine will not return if the input value is too large to be
    ** represented by the host processor.
    */
    num = (unsigned long) convertStrToBin(value);

    /*
    ** If we are using the ANSI standard rules which allow unsigned long,
    ** use the size of the converted input value to see if the suffix
    ** fields should be set. Don't turn off a flag that is already set.
    */
    if (ansi && num > LARGEST_SIGNED_LONG)
        suffixUnsigned = TRUE;

    /*
    ** Promote a decimal integer that has the sign bit set to a long.
    */
    if (num > largestUnsignedInt || (decimal && num > LARGEST_SIGNED_INT))
        suffixLong = TRUE;

    /*
    ** Determine the type of the integer constant.
    */

    if (suffixLong && suffixUnsigned)
        type = newString(DUP, UnsignedLong);

    else if (suffixLong)
        type = newString(DUP, SignedLong);

    else if ((suffixUnsigned) || (ansi && num > LARGEST_SIGNED_INT))
        type = newString(DUP, UnsignedInt);

    else
        type = newString(DUP, SignedInt);

    yylval = newRuleValue(fileNum, lineNum, type, NULL);
    yylval->value = setConstantPrecision((long)num, type);
    freeString(type);

    return INTEGER_CONSTANT;
}

/*
** Function "stringLiteral" creates a new parser rule value for a string
```

```
** literal.  The rule value's address is stored in the parser's "yylval"
** variable.
*/
static int
stringLiteral(value)
    char *value;
{
    char *cursor;                /* cursor for string literal */
    BOOL  inString;              /* TRUE when inside a string literal */
    int   stringLen;             /* number of characters in string literal */
    char *stringSize;            /* size of string */


    /*
    ** Determine the number of characters represented by the string literal.
    */
    stringLen = 0;
    inString = FALSE;
    cursor = value;

    while (*cursor != '\0') {
        if (*cursor == '"') {
            inString = !inString;

        } else if (inString) {
            stringLen += 1;

            if (*cursor == '\\') {                /* escape sequence */
                cursor += 1;                      /* skip over backslash */

                if (*cursor >= '0' && *cursor <= '7') { /* octal escape seq */
                    if (cursor[1] >= '0' && cursor[1] <= '7') {
                        cursor += 1;              /* skip over 1st digit */

                        if (cursor[1] >= '0' && cursor[1] <= '7')
                            cursor += 1;          /* skip over 2nd digit */
                    }

                } else if (*cursor == 'x') {      /* hex escape sequence */
                    cursor += 1;                  /* skip over 'x' */

                    if (isxdigit(cursor[1]))
                        cursor += 1;              /* skip over 1st digit */
                }
            }
        }

        cursor += 1;
    }

    /*
    ** Create a new rule value to represent the string literal.  The value
    ** is the character representation of the literal and the type is an
    ** array of characters whose length is one more than the number of
    ** characters in the literal (to accomodate the end-of-string character).
    */
    yylval = newRuleValue(fileNum, lineNum, NULL, value);
    stringSize = intToString(stringLen + 1);
    yylval->type = catenate4(NoSep, "[", stringSize, "]",
      (charIsSigned) ? SignedChar : UnsignedChar);
    freeString(stringSize);
    return STRING_LITERAL;
}


/*
```

```
** Function "token" creates a new parser rule value for a token that has
** no type.  The rule value's address is stored in the parser's "yylval"
** variable.  The rule value will have a NULL "type" and "value" field.
*/
static int                  /* parser's tag for the token */
token(tag)
    int tag;                /* parser's tag for the token */
{
    yylval = newRuleValue(fileNum, lineNum, NULL, NULL);
    return tag;
}


/*
** Function "updateFileInfo" keeps track of the current source file and
** the current line number of that file.  As each new source file is
** found, its name is saved in an array and the file number is assigned
** the array index.  The array is searched for a known file name each
** time, and if found the current file and line numbers are set.  If
** not found the new name is added to the array.  Space for the file
** names is allocated on the heap; if the allocation fails the program
** terminates with an error message.
**
** If the function is successful and the file name found is one that
** has not previously been seen, a PIL file directive is emitted.
*/
static void
updateFileInfo()
{
    char  buffer[PATHLEN-5];       /* Buffer for PIL file directive */
    BOOL  emitDirective;           /* True = emit a new file directive */
    int   idx;                     /* Index into fileName list */
    char *str;                     /* Temporary string pointer */

    assert (strchr(yytext, '#') != NULL);

    emitDirective = TRUE;          /* Assume a PIL directive is needed */

    /*
    ** Allocate filename space on the very first call
    */
    idx = 0;                          /* Initialize local file number */

    if (fileName == NULL) {
        fileName = (fileInfo *) calloc(maxFiles, sizeof(fileInfo));

        if (fileName == NULL)
            fatalError(0, 0, "fileName allocation failed (heap exhausted)");

        str = strrchr(yytext, '"');       /* Isolate the file name */

        if (str == NULL)
            fatalError(0, 0, "File name has been omitted and is unknown");

        *str = EOS;
        str = strchr(yytext, '"');
        str++;

    } else {                              /* Search the known file names */
        str = strrchr(yytext, '"');       /* Isolate the file name */

        /*
        ** If a file name is specified in the directive, use it.  Otherwise,
        ** we will use the current file number.
        */
        if (str != NULL) {
```

```
        *str = EOS;
        str = strchr(yytext, '"');
        str++;

        for ( idx = 0; idx < maxFiles && fileName[idx][0] != EOS; idx++ ) {
            if (strcmp(str, fileName[idx]) == 0) {
                emitDirective = FALSE;  /* File already known; no PIL */
                break;                  /* We have a match */
            }
        }

    } else
        emitDirective = FALSE;          /* No file name, no PIL */
}

if ( idx == maxFiles ) {        /* More file name space is needed */
    maxFiles *= 2;
    fileName = (fileInfo *) realloc(fileName, sizeof(fileInfo)*maxFiles);

    if (fileName == NULL)
        fatalError(0, 0, "fileName reallocation failed (heap exhausted)");

    /*
    ** Initialize the new filename elements.
    */
    while (idx < maxFiles) {
        fileName[idx][0] = EOS;
        idx += 1;
    }

    idx = maxFiles / 2;
}

if (str != NULL) {                      /* File name specified in directive */
    fileNum = idx;                      /* Set the file number */
    strcpy(fileName[fileNum], str);     /* Save the file name */
}

str = strchr(yytext, '#');              /* Locate the indicated line number */
lineNum = atoi(++str)-1;                /* Set the line number */

/*
** Emit the PIL file directive if necessary
*/
if (emitDirective) {
    setSourceLocation(fileNum, lineNum);
    sprintf(buffer, "file %s", fileName[fileNum]);
    writePIL(buffer);
}
}


/*
** Boolean function "yywrap" is called by the lex-generated code when the
** current source file is exhausted to have the next source file (if any)
** opened.  The function returns FALSE if it opened another source file
** and TRUE if there is no more source.
*/
static BOOL                     /* TRUE if no more source */
yywrap()
{
        free(fileName);         /* release space for the source file list */
        fileName = NULL;
        return TRUE;
}
```

jcomuzzi@pss2 c2pil.h

SPARCprinter NeWSprint 2.0

Fri Oct 27 18:04:23 1995 Openwin library 3

NeWSprint interpreter 3.000

NeWSprint 2.0

```
/*****************************************************************
/*                                                               *
/*      Copyright (c) 1995 Peritus Software Services, Inc.       *
/*        All Rights Reserved                                    *
/*                                                               *
/*      THIS IS UNPUBLISHED PROPRIETARY SOURCE CODE OF           *
/*      Peritus Software Services, Inc.                          *
/*                                                               *
/*      This program contains confidential and proprietary       *
/*      information of Peritus Software Services, Inc., and      *
/*      any reproduction, disclosure, or use in whole or in      *
/*      part is expressly prohibited, except as may be           *
/*      specifically authorized by prior written agreement or    *
/*      permission of Peritus.                                   *
/*                                                               *
/*      The copyright notice above does not evidence any         *
/*      actual or intended publication of such source code.      *
/*                                                               *
/*****************************************************************

#ifndef C2PIL_H
#   define C2PIL_H

#   include <stdio.h>

#   include "mach_dep.h"

    /*
    ** General Named Constants
    */
#   define BITS_PER_BYTE 8
#   define CALC_LEN -1           /* pseudo-string-length => use strlen() */
#   define INT_CONSTANT_CHARS "+-0123456789"  /* valid chars in an int const */
#   define DUP -1                /* newString(DUP, string) copies string */
#   define FALSE 0
#   define HASH_TBL_SIZE 499     /* hash table size should be prime */
#   define MAX_LEVELS 100        /* maximum no. of active blocks allowed */
#   define TRUE 1

    /*
    ** Parser Type Name Constants
    */
#   define ArrayOf               "[]"
#   define Boolean               "boolean"
#   define Double                "double"
#   define Float                 "float"
#   define FunctionReturning     "()"
#   define LongDouble            "long double"
#   define PointerTo             "*"
#   define SignedChar            "signed char"
#   define SignedInt             "int"
#   define SignedLong            "long"
#   define SignedShort           "short"
#   define UnsignedChar          "unsigned char"
#   define UnsignedInt           "unsigned int"
#   define UnsignedLong          "unsigned long"
#   define UnsignedShort         "unsigned short"
#   define Void                  "void"

    /*
    ** Target type size constants
    */
#   define SIZE_OF_CHAR     1    /* sizeof(char) for target machine */
#   define SIZE_OF_DBL      8    /* sizeof(double) for target machine */
#   define SIZE_OF_FLOAT    4    /* sizeof(float) for target machine */
```

```
# define SIZE_OF_INT     4   /* sizeof(int) for target machine */
# define SIZE_OF_LONG    4   /* sizeof(long) for target machine */
# define SIZE_OF_L_DBL   8   /* sizeof(long double) for target machine */
# define SIZE_OF_SHORT   2   /* sizeof(short) for target machine */

/*
** Global Type Definitions
*/
# define BOOL int

typedef enum CapBlkDisp {    /* captured block dispositions */
    Discard = 1,             /* discard contents of captured block */
    Emit,                    /* write out contents of captured block */
    Return                   /* return contents in a dynamic string */
} CapBlkDisp;

typedef enum CatSep {        /* types of catenation separation */
    FullSep = 1,             /* separate all components */
    NoSep,                   /* separate no components */
    PartSep                  /* separate consecutive alphanumerics */
} CatSep;

typedef enum NameSpace {     /* types of symbol name spaces */
    Labels = 1,              /* labels */
    Objects,                 /* vars, funcs, typedefs, enums */
    Tags                     /* enum, struct & union tags */
} NameSpace;

typedef enum StorageClass { /* storage classes of Objects */
    None = 1,                /* symbol is not an Object */
    Typedef,                 /* object is a typedef */
    Extern,                  /* object has external linkage */
    Static,                  /* object has static linkage (file scope)/
                                lifetime is static (block scope) */
    Auto,                    /* lifetime is automatic (block scope) */
    Register,                /* lifetime is automatic, in register (block scope) */
    Enum                     /* object is enum constant */
} StorageClass;

typedef struct RV {          /* RV is short for Rule Value */
    int   fileNum;           /* source file number */
    int   lineNum;           /* source line number */
    char *type;              /* type of rule value */
    char *value;             /* value of rule */
} *RVP;                      /* RVP is short for Rule Value Pointer */

typedef struct SymInfo {             /* symbol information */
    int            blockIdx;         /* index of block symbol declared in */
    char          *name;             /* name of symbol */
    BOOL           pilWritten;       /* PIL declaration of this symbol
                                        been output */
    NameSpace      nameSpace;        /* name space symbol belongs to */
    StorageClass   storageClass;     /* storage class */
    struct SymInfo *siblingPtr;      /* next symbol in chain */
    char          *type;             /* type of symbol */
} SymInfo;

typedef struct TypeSeen {           /* types seen during size computation */
    char            *type;          /* type seen */
    struct TypeSeen *previous;      /* pointer to previous types seen */
} TypeSeen, *TypeSeenPtr;

# define YYSTYPE RVP

/*
** Global Variables
```

```
*/
extern BOOL      ansi;                        /* resolve conflicts in favor of ANSI */
extern int       blockIdx;                    /* index of current block level */
extern int       blockNum[MAX_LEVELS];        /* number of each active block */
extern int       captureBlockCnt;             /* number of capture blocks */
extern FILE     *captureBlockFile;            /* current capture block */
extern BOOL      capturePIL;                  /* controls target of writePIL() */
extern long      captureStackBase;            /* file pos of last stack block */
extern FILE     *captureStackFile;            /* stack of prev capture blocks */
extern char     *cFileName;                   /* C source file name */
extern BOOL      charIsSigned;                /* do chars default to signed? */
extern int       cmdArgCnt;                   /* count of cmd line args */
extern char    **cmdArgVec;                   /* address of cmd arg vector */
extern int       curFileNum;                  /* current source file number */
extern int       curLineNum;                  /* current source line number */
extern SymInfo  *hashTbl[HASH_TBL_SIZE];      /* hash table for symbol info */
extern FILE     *pilFile;                     /* PIL output file */
extern char     *pilFileName;                 /* PIL output file name */
extern int       sizeOfChar;                  /* sizeof(char) for target */
extern int       sizeOfDouble;                /* sizeof(double) for target */
extern int       sizeOfFloat;                 /* sizeof(float) for target */
extern int       sizeOfInt;                   /* sizeof(int) for target */
extern int       sizeOfLong;                  /* sizeof(long) for target */
extern int       sizeOfLongDouble;            /* sizeof(long double) for target */
extern int       sizeOfPointer;               /* sizeof(*type) for target */
extern int       sizeOfShort;                 /* sizeof(short) for target */
extern BOOL      suppressVersion;             /* suppress version info for testing */

/*
** Global Function Prototypes
*/
extern int       main ARGS((int argCnt, char *argVec[]));

#endif /* C2PIL_H */
```

jcomuzzi@pss2

~~c2pil.h~~ tns_a2d.h

SPARCprinter

Fri Oct 27 18:04:23 1995

NeWSprint 2.0
Openwin library 3
NeWSprint interpreter 3.000

NeWSprint 2.0

```
/*****************************************************************/
/*                                                               */
/*      Copyright (c) 1995 Peritus Software Services, Inc.       */
/*        All Rights Reserved                                    */
/*                                                               */
/*      THIS IS UNPUBLISHED PROPRIETARY SOURCE CODE OF           */
/*      Peritus Software Services, Inc.                          */
/*                                                               */
/*      This program contains confidential and proprietary       */
/*      information of Peritus Software Services, Inc., and      */
/*      any reproduction, disclosure, or use in whole or in      */
/*      part is expressly prohibited, except as may be           */
/*      specifically authorized by prior written agreement or    */
/*      permission of Peritus.                                   */
/*                                                               */
/*      The copyright notice above does not evidence any         */
/*      actual or intended publication of such source code.      */
/*                                                               */
/*****************************************************************/
```

```
#ifndef FNS_A2D_H
#   define FNS_A2D_H

#   include "c2pil.h"
#   include "mach_dep.h"

    extern char *addressOf ARGS((char *object, char *type));
    extern void  advanceBlockNumber ARGS((void));
    extern int   alignmentOfType ARGS((char *type));
    extern long  bitSizeOfType ARGS((char *type, TypeSeenPtr typeSeen));
    extern char *catenate2 ARGS((CatSep separation, char *string1,
                     char *string2));
    extern char *catenate3 ARGS((CatSep separation, char *string1,
                     char *string2, char *string3));
    extern char *catenate4 ARGS((CatSep separation, char *string1,
                     char *string2, char *string3, char *string4));
    extern char *catenate5 ARGS((CatSep separation, char *string1,
                     char *string2, char *string3, char *string4,
                     char *string5));
    extern char *catenate6 ARGS((CatSep separation, char *string1,
                     char *string2, char *string3, char *string4,
                     char *string5, char *string6));
    extern char *catenate7 ARGS((CatSep separation, char *string1,
                     char *string2, char *string3, char *string4,
                     char *string5, char *string6, char *string7));
    extern void  checkVar ARGS((char *identifier));
    extern void  combineStrings ARGS((char *str));
    extern char *convertFromBoolean ARGS((char *value, char *newType,
                     char *assignValue));
    extern long  convertStrToBin ARGS((char *value));
    extern BOOL  convertToCommonType ARGS((YYSTYPE one, YYSTYPE two));
    extern BOOL  convertType ARGS((YYSTYPE ruleValue, char *newType));
    extern long  countCaptureBlockLines ARGS((void));
    extern char *createLabel ARGS((char *name));
    extern void  declareSymbols ARGS((char *declarations));
    extern void  defineEnum ARGS((char *tag, char *definition));
    extern void  defineObject ARGS((char *name, StorageClass storageClass,
                     char *indirections, char *specifiers));
    extern void  defineStructOrUnion ARGS((int kind, char *tag,
                     char *definition));
    extern BOOL  defineSymbol ARGS((char *name, NameSpace nameSpace,
                     StorageClass storageClass, char *type));
    extern void  discardSymbols ARGS((NameSpace nameSpace));

#endif /* FNS_A2D_H */
```

jcomuzzi@pss2

~~c2pil.h~~
fns_c2H.h

SPARCprinter
Fri Oct 27 18:04:23 1995

NeWSprint 2.0
Openwin library 3
NeWSprint interpreter 3.000

NeWSprint 2.0

```c
/***************************************************************/
/*                                                             */
/*      Copyright (c) 1995 Peritus Software Services, Inc.     */
/*        All Rights Reserved                                  */
/*                                                             */
/*      THIS IS UNPUBLISHED PROPRIETARY SOURCE CODE OF         */
/*      Peritus Software Services, Inc.                        */
/*                                                             */
/*      This program contains confidential and proprietary     */
/*      information of Peritus Software Services, Inc., and    */
/*      any reproduction, disclosure, or use in whole or in    */
/*      part is expressly prohibited, except as may be         */
/*      specifically authorized by prior written agreement or  */
/*      permission of Peritus.                                 */
/*                                                             */
/*      The copyright notice above does not evidence any       */
/*      actual or intended publication of such source code.    */
/*                                                             */
/***************************************************************/

#ifndef FNS_E2H
#   define FNS_E2H

#   include "c2pil.h"
#   include "mach_dep.h"

    extern YYSTYPE  evalBinaryExpr ARGS((YYSTYPE leftOp, int operation,
                       YYSTYPE rightOp));
    extern YYSTYPE  evalComparison ARGS((YYSTYPE leftOp, char *operation,
                       YYSTYPE rightOp));
    extern YYSTYPE  evalDotOrArrowExpr ARGS((YYSTYPE leftOp, int operation,
                       YYSTYPE rightOp));
    extern char    *evalStringLiteral ARGS((char *literal, char *type));
    extern YYSTYPE  evalSubscript ARGS((YYSTYPE leftOperand,
                       YYSTYPE rightOperand));
    extern YYSTYPE  evalUnaryExpr ARGS((YYSTYPE operand, char *operation));
    extern SymInfo *findSymbolInfo ARGS((char *symbolName,
                       NameSpace nameSpace, int maxBlockIdx));
    extern int      firstFieldWidth ARGS((char *string));
    extern void     freeRuleValue ARGS((YYSTYPE ruleValue));
    extern void     freeString ARGS((char *string));
    extern void     freeSymbol ARGS((SymInfo *symbolPtr));
    extern unsigned hash ARGS((char *string, int stringLen,
                       unsigned hashTblSize));

#endif /* FNS_E2H */
```

jcomuzzi@pss2

~~c2pil.h~~
fns_i2c.h

SPARCprinter
Fri Oct 27 18:04:23 1995

NeWSprint 2.0
Openwin library 3
NeWSprint interpreter 3.000

NeWSprint 2.0

```
/******************************************************************/
/*                                                                */
/*      Copyright (c) 1995 Peritus Software Services, Inc.        */
/*        All Rights Reserved                                     */
/*                                                                */
/*      THIS IS UNPUBLISHED PROPRIETARY SOURCE CODE OF            */
/*      Peritus Software Services, Inc.                           */
/*                                                                */
/*      This program contains confidential and proprietary        */
/*      information of Peritus Software Services, Inc., and       */
/*      any reproduction, disclosure, or use in whole or in       */
/*      part is expressly prohibited, except as may be            */
/*      specifically authorized by prior written agreement or     */
/*      permission of Peritus.                                    */
/*                                                                */
/*      The copyright notice above does not evidence any          */
/*      actual or intended publication of such source code.       */
/*                                                                */
/******************************************************************/

#ifndef FNS_I2L_H
#   define FNS_I2L_H

#   include "mach_dep.h"

    extern char     *indirectRef ARGS((char *base, char *offset, char *type));
    extern int       initializeVariable ARGS((char *name, char *type,
                        char *initializer));
    extern YYSTYPE  initiateLogicalAnd ARGS((YYSTYPE leftRuleValue));
    extern YYSTYPE  initiateLogicalOr ARGS((YYSTYPE leftRuleValue));
    extern char     *intToString ARGS((int number));
    extern BOOL      isAtomic ARGS((char *value));
    extern BOOL      isFloatingType ARGS((char *type));
    extern BOOL      isGlobalVar ARGS((SymInfo *sym));
    extern BOOL      isIntegralType ARGS((char *type));
    extern BOOL      isRedundantConversion ARGS((char *value, char *newType));
    extern char     *locateContentsType ARGS((char *type));
    extern char     *locateDefinition ARGS((char *specifier));
    extern char     *locateSymbolType ARGS((char *symbolName,
                        NameSpace nameSpace, int maxBlockIdx));
    extern char     *longToString ARGS((long number));

#endif /* FNS_I2L_H */
```

jcomuzzi@pss2

~~e2pil.h~~

SPARCprinter

Fri Oct 27 18:04:23 1995

NeWSprint 2.0
Openwin library 3
NeWSprint interpreter 3.000

NeWSprint 2.0

```
/*************************************************************/
/*                                                           */
/*      Copyright (c) 1995 Peritus Software Services, Inc.   */
/*        All Rights Reserved                                */
/*                                                           */
/*      THIS IS UNPUBLISHED PROPRIETARY SOURCE CODE OF       */
/*      Peritus Software Services, Inc.                      */
/*                                                           */
/*      This program contains confidential and proprietary   */
/*      information of Peritus Software Services, Inc., and  */
/*      any reproduction, disclosure, or use in whole or in  */
/*      part is expressly prohibited, except as may be       */
/*      specifically authorized by prior written agreement or */
/*      permission of Peritus.                               */
/*                                                           */
/*      The copyright notice above does not evidence any     */
/*      actual or intended publication of such source code.  */
/*                                                           */
/*************************************************************/
```

```
#ifndef FNS_M2F_H
#   define FNS_M2F_H

#   include "c2pil.h"
#   include "mach_dep.h"
    extern void     mergeParameterDeclarations ARGS((char *funcDecl,
                      char *paramList, char *paramDecls));
    extern BOOL     needSeparator ARGS((CatSep separation, char *firstString,
                      char *secondString));
    extern YYSTYPE  newRuleValue ARGS((int fileNum, int lineNum, char *type,
                      char *value));
    extern char    *newString ARGS((int length, char *value));
    extern SymInfo *newSymbol ARGS((char *name, NameSpace nameSpace,
                      StorageClass storageClass, char *type));
    extern char    *newTempVariable ARGS((char *type));
    extern char    *normalizeDeclSpecifiers ARGS((char *specifiers));
    extern void     performAssignment ARGS((YYSTYPE leftOperand,
                      int operation, YYSTYPE rightOperand));
    extern YYSTYPE  performCall ARGS((YYSTYPE funcName, YYSTYPE argList));
    extern void     prepareForUse ARGS((YYSTYPE ruleValue));
    extern BOOL     promote ARGS((YYSTYPE ruleValue));

#endif /* FNS_M2F_H */
```

jcomuzzi@pss2

~~c2pil.h~~
rws_q2t.h

SPARCprinter

Fri Oct 27 18:04:23 1995

NeWSprint 2.0
Openwin library 3
NeWSprint interpreter 3.000

NeWSprint 2.0

```
/*****************************************************************/
/*                                                               */
/*      Copyright (c) 1995 Peritus Software Services, Inc.       */
/*        All Rights Reserved                                    */
/*                                                               */
/*      THIS IS UNPUBLISHED PROPRIETARY SOURCE CODE OF           */
/*      Peritus Software Services, Inc.                          */
/*                                                               */
/*      This program contains confidential and proprietary       */
/*      information of Peritus Software Services, Inc., and      */
/*      any reproduction, disclosure, or use in whole or in      */
/*      part is expressly prohibited, except as may be           */
/*      specifically authorized by prior written agreement or    */
/*      permission of Peritus.                                   */
/*                                                               */
/*      The copyright notice above does not evidence any         */
/*      actual or intended publication of such source code.      */
/*                                                               */
/*****************************************************************/

#ifndef FNS_Q2T_H
#   define FNS_Q2T_H

#   include "c2pil.h"
#   include "mach_dep.h"

    extern void      replicate ARGS((char *type, char *sourceName,
                       char *targetName));
    extern char     *setConstantPrecision ARGS((long value, char *type));
    extern void      setSourceLocation ARGS((int fileNum, int lineNum));
    extern long      sizeOfType ARGS((char *type));
    extern void      startBlock ARGS((void));
    extern void      startCaptureBlock ARGS((void));
    extern char     *subscriptedRef ARGS((char *base, char *index));
    extern void      terminateBlock ARGS((char *tag));
    extern char     *terminateCaptureBlock ARGS((CapBlkDisp disposition));
    extern YYSTYPE   terminateLogicalAnd ARGS((YYSTYPE leftRule,
                       YYSTYPE resultRule, YYSTYPE rightRule));
    extern YYSTYPE   terminateLogicalOr ARGS((YYSTYPE left, YYSTYPE right));
    extern char     *transformValue ARGS((char *value, char *oldType,
                       char *newType));
    extern char     *translateType ARGS((char *type));

#endif /* FNS_Q2T_H */
```

jcomuzzi@pss2 c2pil.h fns_c2z.h

SPARCprinter

Fri Oct 27 18:04:23 1995

NeWSprint 2.0
Openwin library 3
NeWSprint interpreter 3.000

NeWSprint 2.0

```
/**************************************************************/
/*                                                            */
/*      Copyright (c) 1995 Peritus Software Services, Inc.   */
/*        All Rights Reserved                                 */
/*                                                            */
/*      THIS IS UNPUBLISHED PROPRIETARY SOURCE CODE OF        */
/*      Peritus Software Services, Inc.                       */
/*                                                            */
/*      This program contains confidential and proprietary    */
/*      information of Peritus Software Services, Inc., and   */
/*      any reproduction, disclosure, or use in whole or in   */
/*      part is expressly prohibited, except as may be        */
/*      specifically authorized by prior written agreement or */
/*      permission of Peritus.                                */
/*                                                            */
/*      The copyright notice above does not evidence any      */
/*      actual or intended publication of such source code.   */
/*                                                            */
/**************************************************************/
```

```
#ifndef FNS_U2Z_H
#   define FNS_U2Z_H

#   include "c2pil.h"
#   include "mach_dep.h"

    extern char *unparenthesize ARGS((char *source));
    extern BOOL  unprintableEscapeSeq ARGS((char *string));
    extern char *unsignedLongToString ARGS((unsigned long number));
    extern void  warningForFloatUsage ARGS((void));
    extern char *wrapExpr ARGS((char *expr, char *type));
    extern void  writeCapturedPIL ARGS((char *capturedPIL));
    extern void  writeConditionalJump ARGS((char *condition, char *label,
                   BOOL jumpIfTrue));
    extern void  writeLProcedure ARGS((char *funcDeclaration));
    extern void  writePIL ARGS((char *directive));
    extern void  writeTypeDefinition ARGS((char *symbolName));
    extern void  writeVar ARGS((char *name, char *type));

#endif /* FNS_U2Z_H */
```

jcomuzzi@pss2 c2pil.h

Mach dep. 4

SPARCprinter

Fri Oct 27 18:04:23 1995

NeWSprint 2.0
Openwin library 3
NeWSprint interpreter 3.000

NeWSprint 2.0

```
/**********************************************************************/
/*                                                                    */
/*      Copyright (c) 1995 Peritus Software Services, Inc.           */
/*        All Rights Reserved                                         */
/*                                                                    */
/*      THIS IS UNPUBLISHED PROPRIETARY SOURCE CODE OF                */
/*      Peritus Software Services, Inc.                               */
/*                                                                    */
/*      This program contains confidential and proprietary            */
/*      information of Peritus Software Services, Inc., and           */
/*      any reproduction, disclosure, or use in whole or in           */
/*      part is expressly prohibited, except as may be                */
/*      specifically authorized by prior written agreement or         */
/*      permission of Peritus.                                        */
/*                                                                    */
/*      The copyright notice above does not evidence any              */
/*      actual or intended publication of such source code.           */
/*                                                                    */
/**********************************************************************/
```

```
#ifndef MACH_DEP_H
#   define MACH_DEP_H

#   if __STDC__
#       define ARGS(args) args
#   endif

#   if __cplusplus
#       define ARGS(args) args
#    endif

#   ifndef ARGS
#       define ARGS(args) ()
#       define SEEK_SET 0
#   endif

#endif /* MACH_DEP_H */
```

jcomuzzi@pss2

~~c2pil.h~~ Parser.h

SPARCprinter

Fri Oct 27 18:04:23 1995

NeWSprint 2.0
Openwin library 3
NeWSprint interpreter 3.000

NeWSprint 2.0

```
/*************************************************************/
/*                                                           */
/*      Copyright (c) 1995 Peritus Software Services, Inc.   */
/*        All Rights Reserved                                */
/*                                                           */
/*      THIS IS UNPUBLISHED PROPRIETARY SOURCE CODE OF       */
/*      Peritus Software Services, Inc.                      */
/*                                                           */
/*      This program contains confidential and proprietary   */
/*      information of Peritus Software Services, Inc., and  */
/*      any reproduction, disclosure, or use in whole or in  */
/*      part is expressly prohibited, except as may be       */
/*      specifically authorized by prior written agreement or */
/*      permission of Peritus.                               */
/*                                                           */
/*      The copyright notice above does not evidence any     */
/*      actual or intended publication of such source code.  */
/*                                                           */
/*************************************************************/

#ifndef PARSER_H
#   define PARSER_H

#   include "mach_dep.h"

    /*
    ** Externally Accessible Variables.
    */
    extern YYSTYPE yylval;      /* value of most recently scanned token */


    /*
    ** Externally Accessible Parser Function Prototypes
    */
    extern int yyparse ARGS((void));

#endif /* PARSER_H */
```

jcomuzzi@pss2

~~c2pll.h~~

Scanner.h

SPARCprinter

Fri Oct 27 18:04:23 1995

NeWSprint 2.0

Openwin library 3

NeWSprint interpreter 3.000

NeWSprint 2.0

```
/*************************************************************************/
/*                                                                       */
/*      Copyright (c) 1995 Peritus Software Services, Inc.              */
/*        All Rights Reserved                                            */
/*                                                                       */
/*      THIS IS UNPUBLISHED PROPRIETARY SOURCE CODE OF                   */
/*      Peritus Software Services, Inc.                                  */
/*                                                                       */
/*      This program contains confidential and proprietary               */
/*      information of Peritus Software Services, Inc., and              */
/*      any reproduction, disclosure, or use in whole or in              */
/*      part is expressly prohibited, except as may be                   */
/*      specifically authorized by prior written agreement or            */
/*      permission of Peritus.                                           */
/*                                                                       */
/*      The copyright notice above does not evidence any                 */
/*      actual or intended publication of such source code.              */
/*                                                                       */
/*************************************************************************/

#ifndef SCANNER_H
#   define SCANNER_H

#   include "mach_dep.h"


    extern BOOL  allowTypedefName;
    extern BOOL  wasTypedefName;
    extern FILE *yyin;
    extern int   yylineno;
    extern char  yytext[];

    extern void fatalError ARGS((int fileNumber, int lineNumber,
                          char *diagnostic));
    extern void warning ARGS((int fileNumber, int lineNumber,
                          char *diagnostic));
    extern int  yyback ARGS((int *, int));
    extern void yyerror ARGS((char *));
    extern int  yylex ARGS((void));
    extern int  yylook ARGS((void));

#endif /* SCANNER_H */
```

jcomuzzi@pss2 c2pil.h
version 6

SPARCprinter
Fri Oct 27 18:04:23 1995

NeWSprint 2.0
Openwin library 3
NeWSprint interpreter 3.000

NeWSprint 2.0

```
/*************************************************************/
/*                                                           */
/*      Copyright (c) 1995 Peritus Software Services, Inc.   */
/*        All Rights Reserved                                */
/*                                                           */
/*      THIS IS UNPUBLISHED PROPRIETARY SOURCE CODE OF       */
/*      Peritus Software Services, Inc.                      */
/*                                                           */
/*      This program contains confidential and proprietary   */
/*      information of Peritus Software Services, Inc., and  */
/*      any reproduction, disclosure, or use in whole or in  */
/*      part is expressly prohibited, except as may be       */
/*      specifically authorized by prior written agreement or */
/*      permission of Peritus.                               */
/*                                                           */
/*      The copyright notice above does not evidence any     */
/*      actual or intended publication of such source code.  */
/*                                                           */
/*************************************************************/

#ifndef VERSION_H
#   define VERSION_H
/*
** Program Version number used with the "-v" command line option.
*/
#   define VERSION "0.20"
#   define VERSIONDATE "[August 24, 1995]"

#endif /* VERSION_H */
```

jcomuzzi@pss2 Makefile

SPARCprinter
Fri Oct 27 18:08:37 1995

NeWSprint 2.0
Openwin library 3
NeWSprint interpreter 3.000

NeWSprint 2.0

```
CC = cc
CFLAGS = -g

LDFLAGS =

YACC = yacc
YFLAGS = -dvt

LEX = lex
LFLAGS =

SRCS =  c2pil.c         fns_i2l.c       fns_u2z.c       \
        fns_a2d.c       fns_m2p.c       parser.y        \
        fns_e2h.c       fns_q2t.c       scanner.l

HDRS =  c2pil.h         fns_i2l.h       fns_u2z.h       scanner.h       \
        fns_a2d.h       fns_m2p.h       mach_dep.h      fns_e2h.h       \
        fns_q2t.h       parser.h        version.h

OBJS =  c2pil.o         fns_e2h.o       fns_m2p.o       fns_u2z.o       \
        scanner.o       fns_a2d.o       fns_i2l.o       fns_q2t.o       \
        parser.o

TMPS =  parser.c        scanner.c       tokens.h

c2pil:  c2pil.o fns_a2d.o fns_e2h.o fns_i2l.o fns_m2p.o fns_q2t.o \
        fns_u2z.o parser.o scanner.o
        $(CC) $(CFLAGS) -o $@ $(OBJS)

c2pil.o: c2pil.c c2pil.h fns_a2d.h fns_e2h.h fns_i2l.h fns_m2p.h \
        fns_q2t.h fns_u2z.h scanner.h mach_dep.h parser.h scanner.h \
        version.h

fns_a2d.o: fns_a2d.c c2pil.h fns_a2d.h fns_e2h.h fns_i2l.h fns_m2p.h \
        fns_q2t.h fns_u2z.h scanner.h mach_dep.h parser.h scanner.h

fns_e2h.o: fns_e2h.c c2pil.h fns_a2d.h fns_e2h.h fns_i2l.h fns_m2p.h \
        fns_q2t.h fns_u2z.h scanner.h mach_dep.h parser.h scanner.h \
        tokens.h

fns_i2l.o: fns_i2l.c c2pil.h fns_a2d.h fns_e2h.h fns_i2l.h fns_m2p.h \
        fns_q2t.h fns_u2z.h scanner.h mach_dep.h parser.h scanner.h

fns_m2p.o: fns_m2p.c c2pil.h fns_a2d.h fns_e2h.h fns_i2l.h fns_m2p.h \
        fns_q2t.h fns_u2z.h scanner.h mach_dep.h parser.h scanner.h

fns_q2t.o: fns_q2t.c c2pil.h fns_a2d.h fns_e2h.h fns_i2l.h fns_m2p.h \
        fns_q2t.h fns_u2z.h scanner.h mach_dep.h parser.h scanner.h

fns_u2z.o: fns_u2z.c c2pil.h fns_a2d.h fns_e2h.h fns_i2l.h fns_m2p.h \
        fns_q2t.h fns_u2z.h scanner.h mach_dep.h parser.h scanner.h \
        version.h

parser.o: parser.c c2pil.h fns_a2d.h fns_e2h.h fns_i2l.h fns_m2p.h \
        fns_q2t.h fns_u2z.h scanner.h mach_dep.h parser.h scanner.h

scanner.o: scanner.c c2pil.h fns_a2d.h fns_e2h.h fns_i2l.h fns_m2p.h \
        fns_q2t.h fns_u2z.h scanner.h mach_dep.h parser.h scanner.h

tokens.h parser.c: parser.y
        $(YACC) $(YFLAGS) parser.y
        mv y.tab.c parser.c
        mv y.tab.h tokens.h
        rm y.output

scanner.c: scanner.l tokens.h
```

```
        $(LEX) $(LFLAGS) scanner.l
        mv lex.yy.c scanner.c

clean:
        rm -rf $(OBJS) $(TMPS) *~
```

Attorney Docket No. 1052-30-137

APPENDIX B

CODE ANALYZER

Inventors:

Ashraf Afifi, a citizen of the United States, residing at 20 Maryvale Road, Burlington, Massachusetts 01803;

Dominic Chan, a citizen of the United States, residing at 1196 North Road, Carlisle, Massachusetts 01741;

Joseph J. Comuzzi, a citizen of the United States, residing at 14 Bayberry Road, Groton, Massachusetts 01450;

Johnson M. Hart, a citizen of the United States, residing at 7 Pond Brook Circle, Weston, Massachusetts 02193;

Antonio Pizzarello, a citizen of the United States, residing at 4647 Calle Del Norte, Phoenix, Arizona 85018

Assignee:

Peritus Software Services, Inc.
304 Concord Road
Billerica, Massachusetts 01821-3485

Hale and Dorr
60 State Street
Boston, Massachusetts 02109
(617) 526-6000

BEST AVAILABLE COPY

Specification of PIL

Version: 0.4.4
Date: 15-Sep-1995

1.0 Overview

The Peritus Intermediate Language is the representation of a program used to perform weakest precondition calculations, slicing analysis and code reengineering by the Peritus Code Analyzer (PCA). It is essentially an implementation of Dijkstra guarded commands, which sufficient additional features to easily permit the representation of real programs implemented in real languages. In general, PIL is created by a utility which accepts source and generates PIL. This utility is referred to as the language specific translator or front-end. PIL is consumed by the PCA analysis engine (sometimes referred to as the back-end) and by code visualization tools, which display source and PIL.

Ideally, PIL would use only pure Dijkstra guarded commands (if...fi, do...od, etc.) However, as a simplification to ease the implementation of language specific translators, several programming language constructs such as 'goto's' and procedures are specified. Eventually, these could be translated by a (yet to be created) program into pure Dijkstra guarded commands.

PIL is a type-safe language. All variables, including language translator generated temporaries, must be declared. Currently, the only atomic types that exist are integer and pointer. Characters are considered small integers.

2.0 Specification of PIL format

PIL statements and, in particular, PIL keywords are case sensitive. If translating from a language which is not case sensitive, the language specific translator must construct PIL with a consistent case for source variable names.

PIL statements consist of four fields separated by white space. A typical PIL statement is:

```
0 23 0.0.1.2 assign x = y + 3
```

The four fields are:

0 The zero based file number of the source file. Source files are introduced by file statements (See 4.14)

23 The one based line number of the source file. This is the source file that corresponds to (or generated) this PIL statement. The line number 0 is used only in file statements or when generating code which doesn't have a corresponding source statement.

0.0.1.2
The source block. Block numbers are unique id's assigned to sections of code by the language specific front-end and interpreted by the back-end. See Chapter 3.

assign x = y + 3
The statement operation. See the lists of statements in Chapter 4.

BEST AVAILABLE COPY

A complete UNIX egrep regular expression description of the first three fields of a legal PIL statement is:

```
[0-9]+ [illegible]
```

The fourth field is formally specified in the grammar of Appendix A. Almost all tokens in this grammar are delimited by white-space. (The sole exception is that character strings may contain embedded white space). This essentially eliminates the need for a lexical analysis in consumers of PIL.

3.0 Blocks Levels
-- ------

Block numbers are sequences of decimal numbers separated by periods. The block numbers of two different source code blocks are always different (that is, block numbers must be unique.) Block numbers which represent sub-blocks of a given block have block numbers with the same leading fields as the parent block. Blocks which are siblings differ only in the last field. This permits block parent, child and sibling relationships to be quickly tested using string compare operations. Blocks are also used to delimit variable scopes, see Chapter 5.

New block numbers are created at "if" statements, "do" statements, source language blocks and procedures. "if" statements and "do" statements always create new blocks with unique numbers (within the parent block). Specifically, if the current block level is "0.1.2" and an "if" is encountered, the condition and the code in the "then" clause will get a block number of "0.1.2.n" and the condition and code in the "else" clause will get a block number of "0.1.2.n+1", where n is a previously unused decimal number at that level.

Procedures create new blocks. A "." is appended followed by a previously unused decimal number at that level. Unnamed blocks within the code (such as C's '{...}') are equivalent to blocks and can be implemented as a pair of proc statements.

If the backend supports multiple PIL files, block numbers must be considered implicitly qualified by PIL file. Thus block 0.3.2 in one PIL file has no relation to block 0.3.2 in a second PIL file. Note, this does not mean that block numbers are implicitly qualified by file number (which refer to source files). In an given PIL file there might be statements such as:

```
0 23 0...2 ...
1 1 0.1.2 ...
```

These would both be construed as the same block.

The block number of the global scope is "0". The global scope is the sole exception to the rule that block numbers are implicitly qualified by file. The global scope is considered global across all PIL files.

Executable statements with different block number from the preceding (executable) statement add or subtract at most one level from the immediately preceding (executable) statement. Executable statements consist of all statements except var, member, type, LABEL, L-procedure and L-entry statements.

Note, there is no requirement that the space of block levels be 'dense'. A perfectly acceptable implementation would be to maintain a single global counter in the language specific translator and use the incremented counter as the new number whenever a new subblock must be created. However, this is not a requirement, another acceptable implementation would be to maintain a separate counter for each level and use the next available number within that block/level.

4.0 Specification of Statement Types

The following is a complete list of PIL statement types:

assign
if
do
var
type
member
call
goto
return
proc
LABEL
L-entry
L procedure
file
Version
null
setRet
SetNull The first four are straight out of Dijkstra's guarded commands (though Dijkstra's original formalization does not embellish assignment statements with a keyword.) The remaining statement types are created to ease the translation of real program constructs. The last three statement types are specific to COBOL.

4.1 assign

The assign statement is the basic assignment. Currently it permits only the assignment of a single variable of atomic type (that is, it permits neither the multiple assignment statement nor does it permit assignment of aggregate types   structures or arrays.

Syntax:

```
<f> <l> <b> assign <ref> := <exp>
```

where <f> is the file number of the current source file.

<l> is the line number of the current source line.

<b> is the block number of the current block.

<ref> is a reference to the variable being assigned to, see Chapter 6. Valid examples of references include:

```
x
_Mem ( p + 20 , int 32 )
array [ i ]
_Mem ( pfoo, type foo ) . member
```

<exp> is an expression, see Chapter 7. The result type of this expression must match the type of the variable being assigned to. Note, the types of valid expressions in assignment statements are currently limited to integer or pointer. In the future floating point is expected to be added. Specifically excluded currently is the assignment of Boolean expressions. If it is necessary to assign a Boolean expression, it must be converted into an if (exp), if ^ (exp) sequence. When assigning integers the expression is evaluated using infinite precision arithmetic, this result is truncated to match the precision of the target.

The syntax "<ref> := <exp>" and "<ref> = <exp>" are both accepted for historical reasons.

4.2 if

The PIL if statement is closer to the conventional if-then-else than Dijkstra's alternation. If statements always occur in matched pairs. First a block implementing the 'if-then' part, followed by a second block implementing the 'else' part.

Syntax:

```
<f> <l> <b>.<n0> if ( <cond> )

<f> <l> <b>.<n1> if ^ ( <cond> )
```

where <f> is the file number of the current source file.

<l> is the line number of the current source line.

<b> is the block number of the previous current block.

<n0> is a previously unused number within block <b>. Note, entering a if statement always changes the block number by adding a new level. This becomes the new block number until the 'else' part of the if is generated.

<n1> is a previously unused number within block <b>. This become the new block number. It reverts back to the old level at the proc statement following the end of the 'else' part.

<cond> is the condition. This must be an expression that can be evaluated to yield either _TRUE or _FALSE. Note, the constant conditions are specifically permitted.

This first statement must be immediately preceded by a 'proc' statement specifying the old block level. This rule exists to ensure that there is always at least one PIL statement at the old level before an if statement is started. The clause beginning 'if ^' must always be present, even if the source contains no 'else', in which case the body of the clause consists entirely of 'proc skip'. Similarly, the 'else' part must be followed by an 'proc endif' statement again specifying the old level.

Note, do not make the mistake of assuming that the semantics of PIL 'if-then' and 'else' are sequential execution. Specifically, in the PIL fragment:

```
if ( a = 0 )
assign a = 1
if ^ ( a = 0 )
assign b = 1
```

The assignment to b only happens if a is not equal to zero above the first if statement. (This would not be true in a conventional programming language! The implementation of this depends on the existence of block level numbers, this is what makes the PIL 'if' look like Dijkstra's alternation. N.B. as part of a planned future extension (to full alternation statements), the condition on the 'else' part is required and is actually used by the back-end).

4.3 do

This is the standard iteration construction. It basically implements a test at the top of the loop, just like Dijkstra's repetition statement.

Syntax:

<f> <l> <b>.<n> do [illegible] )

where <f> is the file number of the current source file.

<l> is the line number of the current source line.

<b> is the block number of the previous current block.

<n> is a previously unused number within block <b>. Note, entering a do loop always changes the block number by adding a new level. This becomes the new block number for the duration of the do loop. It reverts back to the old level at the 'proc enddo' statement following the end of the loop.

<cond> is the condition. This must be an expression that can be evaluated to yield either _TRUE or _FALSE. Note, the constant _TRUE is specifically permitted to implement unbounded loops.

This statement must be immediately preceded by a 'proc' statement specifying the old block level for basically the same reason as for if statements and the end of the loop must be followed by a 'proc enddo' statement again specifying the old block level.

4.4 var var statements are used to declare variables (of either atomic types or structured types, members of structures are specified using member statements see section 4.6) in the PIL. The scope of variables is the block level specified.

Syntax:

<f> <l> <b> var <name> <dcl> where <f> is the file number of the current source file.

<l> is the line number of the current source line.

<b> is the block number of the variable's scope. Note, for some languages, in some situations, this might not be the same as the current block number. Specifically, if the language declared all variables as global, but permitted variable declarations anywhere in the program, this would have to be the global scope.

<name> is the name of the variable being declared.

<dcl> is the type and storage declaration of the variable. See section 5.1.

4.5 type

The type statement specifies type information. It is needed because some languages permit pointers to complex objects for which there are no explicitly declared variables.

Syntax:

<f> <l> <b> type <name> <dcl> where <f> is the file number of the current source file.

<l> is the line number of the current source line.

<b> is the block number of the type's scope. Note, for some languages, in some situations, this might not be the same as the current block number. Specifically, if the language declared all variables as global, but permitted variable declarations anywhere in the program, type statements might have to have the global scope.

<name> is the name of the variable being declared. This will typically be constructed from the name of a type or structure in the source language.

<tdcl> is the type declaration of the type. See section 5.1.

4.6 member

The member statement declares a member of a structured type (these are called fields in some languages). Members must be members of struct's or unions's.

<f> <l> <b> member <name> <parnt> <offst> <dcl> where <f> is the file number of the current source file.

<l> is the line number of the current source line.

<b> is the block number of the containing type's scope (member statements really represent refinements of the information in type statements).

<name> is the name of the member being declared.

<parnt> is the name of parent (or containing) type. It refers to a previously declared (at this scope) name appearing in a type statement. The type specified must be a struct or union.

<offst> is the offset of the member being declared from the start of the parent type, expressed in address units. An offset of '-1' indicates the offset is unknown.

<dcl> is the type declaration of the member. See section 5.1.

4.7 call

This is the classic 'call' statement. It is included to ease the implementation of language specific translators. For additional information on the semantics of PIL procedures and procedure calls, see section 9.0.

Syntax:

<f> <l> <b> call <lab> ( <args> ) <flag> where <f> is the file number of the current source file.

<l> is the line number of the current source line.

<b> is the block number of the current block.

<lab> is the name of the called procedure.

<args> is the argument list of the called procedure. Each argument that represent a valid PIL reference, they are separated by commas. Note, arguments are passed by reference - if the language semantics specifies call by value for the given variable, create a PIL temporary in the caller and copy the actual argument into it. Call by name, should it ever be necessary, could probably be handled by passing pointers to thunks.

<flag> The keyword "no alias" indicating that the called procedure's arguments (as argument list entries) can not be aliased at entry. This means specifically, that no two arguments can be aliased with each other, nor can any argument be aliased with any outer scope variables that would be accessible to the called routine. In general this flag will be set by language translators for which the source language semantics specifies "call by value" for all formal arguments. It may also be set at any call statement if the language translator can determine that none of the references in the actual argument list can be aliased. This is an optimization. Note, that the no-alias flag applies only to the arguments themselves, not to indirect data for pointer arguments.

Note the ()'s are required if there are no arguments. Source language functions are modeled in PIL, by adding an additional (first) argument. This argument is conventionally named result$$, see section 9.3 for details.

4.8 goto

This is the classic 'goto' statement. It is included to remove responsibility of goto elimination from language specific translators.

Syntax:

<f> <l> <b> goto <lab> where <f> is the file number of the current source file.

<l> is the line number of the current source line.

<b> is the block number of the current block.

<lab> is the label to jump to. Note, for languages which use numeric labels (FORTRAN, BASIC), a variable whose name is constructed from the label number is used, that is, the FORTRAN statement: " GOTO 37" might generate:

0 524 0.0.3.7 goto _label$37$$

Note, ideally goto statements would be eliminated and replaced with conditional or loop constructs if that is possible.

4.9 return

This is the classic 'return' statement. It is included to remove responsibility for procedure elimination from language specific translators. No value can be returned using this statement. If translating a function which returns a value to its caller, assign to the function return argument (usually named result$$) prior to the return statement.

Syntax:

<f> <l> <b> return <token> where <f> is the file number of the current source file.

<l> is the line number of the current source line.

<b> is the block number of the current block.

token is either "stack" or "all". The token "stack" indicates a return to the caller. The token "all" indicates a return to the caller of the main procedure (that is, it is semantically equivalent to the STOP statement in COBOL or FORTRAN).

Note, ideally return statements would be eliminated (as would all procedure boundaries).

4.10 proc

This is really a general purpose no-op statement. It is mostly used to adjust block levels, or ensure that there is always some code at a given block level. It is required in several situations, outlined below. It is also the natural translation of { block delimiters }, etc.

Syntax:

<f> <l> <b> proc <comment> where <f> is the file number of the current source file.

<l> is the line number of the current source line.

<b> is the block number of the current block.

<comment> is a comment field, which is ignored by the back-end.

proc statements are required just before 'if' and 'do' statements. They are required after the else part of an if construct, by convention these are "proc endif" statements. They are also required after a do loop, these are by convention "proc enddo" statements. The statement "proc skip" is conventionally generated in situations where PIL requires a statement, for example, in the 'else' part of a PIL if statement when translating an source 'if' statement with no else clause.

4.11 LABEL

This statement defines a label in the PIL. It is included to remove responsibility for goto elimination from language specific translators.

Syntax:

<f> <l> <b> LABEL <lab> where <f> is the file number of the current source file.

<l> is the line number of the current source line.

<b> is the block number of the label's scope. This may or may not be the current block number (typically it will not).

<lab> is the label of this statement. Note, for languages which use numeric labels (FORTRAN, BASIC), a variable whose name is constructed from the label number is used, that is, the FORTRAN statement: " 37 X=Y" might generate:

```
0 524 0.0.3.7 LABEL _label$37$$
0 524 0.0.3.7 assign x = y
```

Note, ideally unreferenced labels would be eliminated. Goto elimination, would (in principle) permit the elimination of all statement labels.

4.12 L-entry

L-entry statements introduce labeled procedure entries. The leading 'L' permits the group of 'L' statements (LABEL, L-entry and L-procedure) to be dispatched with a single test. Again, the L-entry statement is included to ease the translation burden on language specific translators. For additional information on the semantics of PIL procedures and procedure calls, see section 9.0.

Syntax:

<f> <l> <b> L-entry <lab> ( <args> ) <flag> where <f> is the file number of the current source file.

<l> is the line number of the current source line.

<b> is the block number of the scope of the procedure entry.

<lab> is the name of the entry.

<args> is the argument list of the entry. Each argument must represented by a variable name, they are separated by commas. Note, arguments are passed by reference, consumers of PIL must deal with the possibility that formal arguments are aliases.

<flag> The keyword "no-alias" indicating that the called procedure's arguments (as argument list entries) can not be aliased at entry. This means specifically, that no two arguments can be aliased with each other, nor can any argument be aliased with any outer scope variables that would be accessible to the called routine. In general this flag will be set by language translators for which the source language semantics specifies "call by value" for all formal arguments. Commonly the optimization noted under the call statement for non-"call by value" languages will not be possible, since the translator will not have knowledge about all potential callers. Note, that the no-alias flag applies only to the arguments themselves, not to indirect data for pointer arguments.

Note the ()'s are required if there are no arguments. Source language functions are modeled in PIL by adding an additional (first) argument. This argument is conventionally named result$$, see section 9.3 for details.

4.13 L-procedure

L-procedure statements introduce labeled procedures. The leading 'L' permits the group of 'L' statements (LABEL, L-entry and L-procedure) to be dispatched with a single test. It is included to remove responsibility for procedure elimination from language specific translators. Again, the L-procedure statement is included to ease the translation burden on language specific translators. For additional information on the semantics of PIL procedures and procedure calls, see section 9.0.

Syntax:

<f> <l> <b> L-procedure <lab> ( <args> ) <flag> where <f> is the file number of the current source file.

<l> is the line number of the current source line.

<b> is the block number of the scope of procedure label. Note, the executable code of a procedure must always be in a new block.

<name> is the name of the procedure.

<args> is the argument list of the entry. Each argument must be represented by a variable name; they are separated by commas. Note, arguments are passed by reference; consumers of PIL must deal with the possibility that formal arguments are aliases.

<flag> the keyword "no alias" indicating that the called procedure's arguments (as argument list entries) can not be aliased. In general this flag will be set by language translators for which the source language semantics specifies "call by value" for all formal arguments. Commonly the optimization noted under the call statement for non "call by value" languages will not be possible, since the translator will not have knowledge about all potential callers. Note, that the no alias flag applies only to the arguments themselves, not to indirect data for pointer arguments.

Note the ()'s are required if there are no arguments. Source language functions are modeled in PIL by adding an additional (first) argument. This argument is conventionally named result$$, see section 9.3 for details.

4.14 file

File statements are used to introduce new source files, both main source files when multiple source files are being analyzed together and also include files.

Syntax:

<f> <l> <b> file <name> where <f> is the file number of the new file. File numbers are assigned sequentially, starting at 0.

<l> is the line number of the current source line. This is zero for source files, but for include statements it is the line number of the include statement in the parent file.

<b> is the current block number. Entering an include file does not of itself change the block number. Entering a new main source file may or may not, depending the semantics of variable scoping in that language (for C, there is the concept of global to a file, thus entering a new file defines a new block).

<name> is the name of the source file. Storing file systems names within PIL files introduces the well-known problems with stored names. This is exactly analogous to the problem of stored source filenames in debuggers. The standardly accepted solution is to store names relative to the current directory at the time of translation and permit the source directory to be specified at runtime.

4.15 Version

Version statements convey information about the version of the language specific translator which produced them, the language it was translating and the date and time of translation. In general, Version statements are optional, but if present, they should be the first statements of the PIL file. Multiple version statements are permitted in a single file.

Syntax:

0.0.0 Version <PIL> <ver> <lang> <info> where <PIL> is the version of the PIL language specification this PIL file complies with. This should be a constant built into the language specific translator. The format of this version is: [0-9]+.([0-9]+)?([0-9]+.[0-9]+)

<ver> is the version of the language translator that generated this PIL file. The format of translator version numbers is: [0-9]+.([0-9]+)?([0-9]+.[0-9]+)

<lang> is a string which specifies the source language, typically a single name such as C, PL/1, COBOL, FORTRAN, etc. The only requirement is that the name contain no embedded whitespace.

<info> is a string (which may contain whitespace) which defines additional information, such as: the date of translation, the OS the translation was done on, any options specified in the translation, or anything else the language translator implementation can usefully and easily include.

4.16 Null

This statement is unspecified and is reserved for the COBOL language translator.

4.17 SetRef

This statement is unspecified and is reserved for the COBOL language translator.

4.18 SetNull

This statement is unspecified and is reserved for the COBOL language translator.

5.0 Specification of Declarations

Essentially all attributes of a variable in any programming language fall into one of four categories:

Type
Scope
Lifetime
Storage

Type refers to the type of the variable. This includes not just the basic types (integer, real, Boolean, character, packed decimal) but also structured types (complex reals, arrays, structure or records) and access mechanisms (pointers). Also included in this class are auxiliary attributes which refine the type, such as 'unsigned' or 'const' in C, precision specifications in PL/1, etc.

The scope of a variable defines the portion of a program for which the variable is visible. Keyword examples include 'extern' in C, 'COMMON' variables in FORTRAN, etc., but scope information is commonly implicit, for example, variable declared within a block in PL/I are only visible within that block and are distinct from similarly named variables declared in an outer block.

Lifetime refers to the duration of the existence of the variable and it's contained data. Keyword examples include 'static' in C and again 'COMMON' in FORTRAN (since FORTRAN mixes global scope with static lifetime). C's volatile is a lifetime attribute, since it indicates a variable might be asynchronously initialized or modified. The major application of lifetime information for PCA would be the detection of uninitialized variables.

Finally, storage refers to all the attributes specific to the actual allocation of memory for the variable. These include alignment requirements (which may be implicit or declared by keywords) and the memory pool from which memory for this variable is allocated (stack, heap, static, register). Also in this category is any attributes which force the current variable to share memory with any other variables. Keyword examples include 'EQUIVALENCE' in FORTRAN, 'union' in C, 'defines' in PL/I and 'redefines' in COBOL.

5.1 Variable Declarations 5.1.1 Type and storage information

The <decl> field of a var, type or member statement specifies the type and some of the storage information of a variable or type. A regular expression for the syntax of the <decl> field is:

```
indirect specifier>*
        (<base-specifier  <storage-specifier>)|<type specifier>
```

that is, zero or more indirect specifiers followed by a base specifier and a storage-specifier or zero or more indirect speciteres followed by a type-specifier.

Legal base-specifiers consist of the following:

```
int <n>
unsigned int <n>
fixed <n> <p> [radix 10]            /* Not yet supported */
float 32                            /* Not yet supported */
float 64                            /* Not yet supported */
struct
union
packed <bitpos> int <n>
packed <bitpos> unsigned-int <n>
```

Where <n> is the size in digits of the integer or fixed point type. For fixed point types, the <p> specifies the position of the radix point. A value of <p> can be positive or negative. Positive values indicate the radix point is to the rightmost digit of a value (that is, that the value is a fraction). The value zero indicates the values represents an integer. The optional specifier radix, specifies the radix of the fixed pointer number (For example, COBOL packed decimal, would be "radix 10"). The default radix is 2. The size <n> will typically be 8 bits for character data, 16, 32 or 64 for integer data, though for languages which permit specification of precision (PL/1), this might be a value derived form the language declaration construct. Currently, the analysis engine can not support integer sizes larger than 32.

The keyword struct indicates a structure or record consisting of several member elements. A union is similar, but the members are all at the same offset, thus it models a C union or PASCAL variant record. The keyword packed can only appear in a member declaration and indicates that this member is not necessarily address aligned, it is typically used for bit fields in C or packed bit-strings in PL/1. <bitpos> specifies the bit offset from the start of the address unit specified earlier in the declaration. Multiple packed members are assumed to occupy successive bit positions. Padding if present, should be simulated by creating translator generated variables to occupy the padded bits. <<Need bit numbering conventions>>

Legal storage specifiers consist of the following:

```
size <size>
loc <loc>
```

The keyword size specifiers the size of this object in address units (usually bytes). A size of -1 indicates the size is unspecified, that is that the size is unknown to the language translator. This permits the creation of language translators which are not aware of details of record and field alignment in the target implementation. In general, the size is defaulted from the number of bits specified for the object. For "int" and "unsigned-int", the size is calculated according to: (<n>+7)/8. For "fixed" the size is defaulted to (<n>+7)/8 if the radix is binary and to (4*<n>+7)/8 if the radix is decimal. For "float 32", the size is 4, for "float 64", the size is 8. Note, in non-byte addressable implementation, these defaults will not be correct this is the reason for having both precision information and size information. Also, most implementations of packed decimal hardware require an extra nibble to store the sign. It is the responsibility of the language translator to generate a size clause if the implementation doesn't match the default. The size defaults to -1 for struct and union declarations. The size attribute is not applicable, and cannot be specified for bit fields.

The keyword loc specifies location information for the given object. Location information is an expression, usually expressing the address of one variable in terms of another, though absolute addresses are explicitly permitted. A typical loc clause might appear as:

```
loc ( @ x - 3 )
```

The loc keyword is intended to support FORTRAN EQUIVALENCE, PL/1 DEFINED or COBOL REDEFINES.

Legal indirect-specifiers will consist of the following:

```
'[' <size> , <lowbound> ']'
ptr
ptr <storage specifier>
```

size is the size, in elements of this array, lowbound is the lower bound for this array element. For many languages this will always be a constant. For instance for C, the lowbound would always be 0, for FORTRAN/66 it would always be 1. Note, multi dimensional arrays are specified by using multiple array-specifiers, one for each dimension. Arrays elements are specified in row major order. This means that for C and PL/1, PIL arrays are in the natural order For Fortran, the array element list would need to be reversed in translation to PIL. Note, pointers are specifically permitted to take storage specifiers, the default size of a pointer is 4.

Legal type-specifiers will consist of the following:

```
type <typename>
```

The keyword type indicates a reference to a previously declared PIL type (that is, a name appearing in a type statement), this permits simplifying declarations in some cases.

5.1.2 Lifetime information

Variable lifetime information is not currently available in PIL. As noted above, its only major use for TCA would be the detection of uninitialized variables.

5.1.3 Scope information

The scope of variable declarations is the block specified in the declaring var statement. var statements do not need to appear at the beginning of the block, but must occur before the first use of the variable. (This rule is designed to permit the translation in one pass of languages for which variables are not declared).

Identically named variables in inner blocks hide the definitions in outer blocks. Thus in the PIL fragment:

```
0 23 0.0.1.3 var i int 32
0 28 0.0.1.3.0 proc
0 29 0.0.1.3.0 assign i [illegible]
0 33 0.0.1.3.0 proc
0 34 0.0.1.3.1 proc
0 35 0.0.1.3.1 var i type foo
```

The definition of "i" as a "foo" in the inner block completely hides the definition of "i" as an integer. The inner definition of "i" applies to all blocks which are descendants of 0.0.1.3.1, that is, blocks of the form: 0.0.1.3.1.3, 0.0.1.3.1.3.2.7, etc. unless, of course, it is redefined again at an inner level. The assignment of the constant "7" to "i", assigns to the variable "i" of block 0.0.1.[illegible].

6.0 Specification of References
-------- - -----------

References may consist of simple references, array references, structure references, union references, pointer references or a combination of the above. Simple references consist of a name of a (current scope) atomic variable. Array references add (one or more) array indexes, delimited by square brackets. A structure reference consists of a reference followed by "." followed by a member name. A union reference consists of a reference followed by ":" followed by a member name. A pointer reference specifies using an area of memory pointed at by the reference.

Simple references are atomic names of variables, which must be in the current scope. <<size restriction, character set of variable names>>

An array reference consists of a reference followed by '[' followed by one or more expressions (separated by ','s) followed by ']'. Array indexes must be of type integer. The number of indexes must match the number in the variable declaration. For languages that permit polymorphic arrays (APL is an example), this latter requirement may be met by adding additional constant subscripts equal to the lower bound, until the required number of subscripts exist. <<more on array references>>

Structure references permit the creation of complex, user specified types. Members of a structure reference usually follow each other sequentially in memory, but there is no assumption that any particular alignment of structure members exists, except for members declared 'packed' in the PIL declaration. These are assumed not to be aligned, and are designed to mimic C fields, PL/I packed bit-fields, etc. In general, members of a structure are treated as independent variables from the point of view of PIL.

Union references model the concept of static data-aliasing in programming languages. Specifically, C unions and PASCAL variant records.

Pointer or indirect references are not modeled in PIL as the application of an operator. Instead, they are treated like an intrinsic (named _Mem). The advantage of the intrinsic approach is the opportunity to capture type information in the reference (so that it can be compared in subsequent preconditions.) The general structure of a pointer reference is:

```
_Mem ( <ptr> , <type> )
```

where: <ptr> is a reference to a variable of type pointer.

<type> is a PIL type declaration. Specifically, the <dcl> field described in section 5.1.1.

Specifically, the C construct:

```
*((long *)p+8)
```

would be represented as:

```
Mem ( p+32 , int 32 )
```

on a machine where longs are 4 bytes. The PL/1 construct:

```
PTR->FOO
```

would be represented as:

```
Mem ( PTR , <type> ) . FOO
```

where <type> is the typename of the PL/1 structure containing foo. Several features of references that exist in various programming languages (in particular PL/1) are not permitted in PIL. Specifically, PL/1 permits substantial freedom in the specification of array elements of structure members. For instance, assuming the PL/1 declaration:

```
DCL 1 FOO(5),
      2 LOC,
        3 X FIXED BIN(31),
        3 Y FIXED BIN(31);
```

References to the X member of the 1st FOO structure can be specified as either:

```
FOO(1).LOC.X or FOO.LOC.X(1)
```

Only the equivalent of the first form would be permitted in PIL, specifically:

```
FOO [ 1 ] . LOC . X
```

(That is, array subscripts must occur at the same point as in the declaration.) Similarly PL/1 permits partially specified structure members. Indeed, for the above declaration:

```
FOO(1).X
```

would represent a valid PL/1 reference (to FOO(1).LOC.X). Again this is not permitted in PIL, all structure references MUST include all intermediate structure members. Finally, the languages constructs that permit implicit pointers (Such as the BASED attribute in PL/1 or the PASCAL WITH statement), must be translated into explicit pointer references. These requirements essentially force language specific translators to maintain symbol information as part of translation.

7.0 Specification of Expressions

There are essentially two types of expressions in PIL: Integer expressions, and Boolean expressions. They are used in different contexts. Integer expressions are used on the right hand side of assignment statements or as members of intrinsic's argument lists. Boolean expressions are used as the conditions of if or do statements.

7.1 Precedence of operators

| | | |
|---|---|---|
| . | Structure membership | left to right |
| [illegible] | Union membership | left to right |
| @ | Address-of operator | non-associative |
| * | Signed Multiply operator | left to right |
| [illegible] | Signed Division (quotient) operator | left to right |
| [illegible] | Signed Remainder operator | left to right |
| + | Unary plus operator | non-associative |
| [illegible] | Unary minus operator | non-associative |
| + | Binary plus operator | left to right |
| [illegible] | Binary minus operator | left to right |
| [illegible] | Logical not operator | non-associative |
| & | Logical and operator | left to right |
| [illegible] | Logical or operator | left to right |
| [illegible] | Equality operator | non-associative |
| [illegible] | Inequality operator | non-associative |
| > | Greater than operator | non-associative |
| >= | Greater/Equal operator | non-associative |
| < | Less than operator | non associative |
| <= | Less/Equal operator | non-associative |

Note, for backward compatibility, the following two token versions of some of the above operators are permitted: "^ =", "> =" and "< =". These have the same semantics as their one token counterparts.

7.2 Semantics of operators

All integer arithmetic in PIL is infinite precision. This means that PIL variables never overflow. The sum, product and difference of two integers have their obvious meanings. Division and Remainder however, requires detailed definition in the presence of negative quantities. PIL's Division operator always rounds towards zero, thus:

(-5)/2 = -2 and

5/(-2) = -2

The remainder obeys the identity:

b*(a/b) + a%b = a

Thus:

(-5)%2 = -1 and

5%(-2) = 1

If the source language and/or hardware implementation do not conform to these conventions, source division and remainder operations should be translated into the appropriate PIL intrinsics.

8.0 Specification of Labels

PIL labels exist solely to ease the translation of language constructs into PIL. The scope of labels is the block number specified in the statement prefix. This rule implies that labels (and L-procedure and L-entry) statements must be an exception to the rule that the block level changes by at most one level per statement.

In general, transfers are permitted to a label from anywhere within the scope of the label. Note, this means that transfers INTO a do loop, or if construct ARE permitted.

9.0 Procedures and Functions

PIL procedures exist to ease the translation of language constructs into PIL and also to permit analysis in the absence of complete sources (which are almost never available for system supplied libraries, etc.). In an ideal implementation of Dijkstra guarded commands, all procedural code would be inlined in the caller. This, however, is problematical for external procedures and simply impossible is the source is not available.

9.1 Procedures

PIL procedure call semantics are "call by reference", that is, the formal arguments of a PIL procedure is an alias of the actual parameter passed in the caller. Source languages which use "call by value" for some or all arguments, must generate PIL temporaries in the caller and explicitly copy the actual arguments into them. Formal arguments are associated one to one with the actual argument list of the caller, and must match in number and type. In general, analysis of the called routine must assume that data aliasing can occur between any two arguments, or any argument and any non-local scope variable unless the "no alias" keyword is present.

Formal arguments must be explicitly declared in the called routine. The declarations (var statements) must immediately follow the L-procedure statement. This is an explicit exception to the rule that variables must be declared before their first use in PIL.

<<Variable argument lists>>

9.2 Entries

Variables in Entry statements must be explicitly declared in the called routine. Declarations of variables in entry statements may immediately follow the L-entry statement, but declarations of formal arguments shared with other entry statements or an L-procedure statements should not be repeated. Each formal arguments should be declared immediately after the first L-entry or L-procedure statement in which it appears.

9.3 Functions

All PIL procedures are procedures. However, since PIL uses "call by reference" functions can be modeled in PIL using an explicit first argument, by convention named 'result$$'. This argument, as all PIL arguments, is passed by reference. The function return value is typed, by the usual argument typing and the return value is available to the caller for the lifetime of the caller's actual argument.

9.4 Pointers to procedures

[illegible] Procedure pointers [illegible]

9.5 Recursion

PIL procedures are explicitly permitted to recurse. However, the analysis of recursive procedures by the backend is essentially equivalent to the problem of analyzing do loops - that is, a user will likely have to provide an invariant.

10.0 Constants

Integer constants are expressed in decimal. They may be either signed or unsigned, currently they are restricted to the range -231 to 232-1. Boolean constants are either _TRUE or _FALSE. The null pointer is represented as _NULL. Character string constants do not contain language specific escape mechanisms, they are permitted to contain only characters from the ASCII character set, specifically in the range 32 to 126 excluding 34 ("). They are delimited by double quotes (") and may contain embedded white space. When translating string constants in the source language into PIL, any escape or quoting mechanisms must be removed. Specifically, when translating the C string initialization:

```
p[]   "This is a slash: \\ a quote: \"\nThis is the next line\n"
```

the following sequence of assignments should be generated:

```
assign _Mem ( @ p , [ 23 , 0 ] int 8 ) = "This is a slash:   a quote: "
assign _Mem ( @ p + 28 , int 8 ) = 34
assign _Mem ( @ p + 29 , int 8 ) = 10
assign _Mem ( @ p + 30 , [ 21 , 0 ] int 8 ) = "This is the next line"
assign _Mem ( @ p + 51 , int 8 ) = 10
assign _Mem ( @ p + 52 , int 8 ) = 0
```

11.0 Mechanical translation to PIL

Several issues are unique to the problem of mechanically translating programming languages into PIL. One is the generation of temporary variables, another is the generation of labels.

For most cases, generating temporary variables with a lifetime limited to a single source statement is not a problem. This commonly has to happen when the language semantics defines implicit data-conversions. However, temporary variables which span source statements become visible to the user in WP calculations. In general, these should be avoided if possible. As a refinement of the previous statement, it is not the creation or initialization of translator generated temporaries that is the problem, but subsequent references. Thus, code generation strategies which create temporaries, but avoid subsequently referencing them, unless necessary, are preferable.

Generating labels should be avoided if possible, since they add computational complexity to the analysis. Backward branches should especially be avoided, since these induce loops in the code graph.

A.0 PIL grammar

A.1 Operators:

| | |
|---|---|
| [illegible] | Logical or operator |
| & | Logical and operator |
| [illegible] | Logical not operator |

|   |   |
|---|---|
| * | Unary or binary minus operator |
| + | Unary or binary plus operator |
| * | Signed Multiply operator |
| / | Signed Division (quotient) operator |
| % | Signed Remainder operator |
| . | Structure membership |
| : | Union membership |
| @ | Address-of operator |
| = | Equality operator |
| ~ | Inequality operator |
| > | Greater than operator |
| >= | Greater/Equal operator |
| < | Less than operator |
| <= | Less/Equal operator |

A.6 Grammar

Note, the language generated by the following grammar contains many strings which are not PIL. However, if it isn't generated by this grammar, it isn't PIL. All tokens in PIL are delimited by whitespace, all PIL statements are a single line.

```
PIL             : Statement
                | Group
                | PIL Statement
                | PIL Group

Statement       : AssignStmt
                | VarStmt
                | TypeStmt
                | MemberStmt
                | CallStmt
                | GotoStmt
                | ReturnStmt
                | ProcStmt
                | LabelStmt
                | LentryStmt
                | LprocStmt
                | FileStmt
                | VersionStmt
                | NullStmt
                | SetRetStmt
                | SetNullStmt

Group           : IfStmt PIL NegIfStmt PIL ProcStmt 'endif'
                | DoStmt PIL ProcStmt 'enddo'

AssignStmt      : StmtPrefix Ref ':' IntExp
                  StmtPrefix Ref ':=' IntExp

IfStmt          : StmtPrefix 'if' '(' BoolExp ')'

NegIfStmt       : StmtPrefix 'if' '~' '(' BoolExp ')'

DoStmt          : StmtPrefix 'do' '(' BoolExp ')'

VarStmt         : StmtPrefix 'var' Var Declaration

TypeStmt        : StmtPrefix 'type' Type Declaration

MemberStmt      : StmtPrefix 'member' Var Type DecConst Declaration

CallStmt        : StmtPrefix 'call' Entry '(' ')'
                | StmtPrefix 'call' Entry '(' ')' 'no-alias'
                | StmtPrefix 'call' Entry '(' ActArgList ')'
```

BEST AVAILABLE COPY

```
                     | StmtPrefix 'call' Entry '(' ActArgList ')' 'no alias'

GotoStmt             : StmtPrefix 'goto' Label

ReturnStmt           : StmtPrefix 'return' 'value'
                     | StmtPrefix 'return' 'null'

ProcStmt             : StmtPrefix 'proc'
                     | StmtPrefix 'proc' Comment

LabelStmt            : StmtPrefix 'LABEL' Label
                     | StmtPrefix 'LABEL' Label Block

IentryStmt           : StmtPrefix 'I entry' ProcEntry

IprocStmt            : StmtPrefix 'I procedure' ProcEntry

FileStmt             : StmtPrefix 'file' FileName

VersionStmt          : StmtPrefix 'version' Ident Vers Comment

NullStmt             : StmtPrefix 'null'

SetRetStmt           : StmtPrefix 'SetRet'

SetNullStmt          : StmtPrefix 'SetNull'

IntExp               : Ref
                     | '@' Ref
                     | DecConst
                     | StrConst
                     | '(' IntExp ')'
                     | '+' IntExp
                     | '-' IntExp
                     | IntExp '+' IntExp
                     | IntExp '-' IntExp
                     | IntExp '*' IntExp
                     | IntExp '/' IntExp
                     | IntExp '\' IntExp
                     | Intrinsic '(' IntArgList ')'

BoolExp              : '^' BoolExp
                     | BoolExp '|' BoolExp
                     | BoolExp '&' BoolExp
                     | '(' BoolExp ')'
                     | '_TRUE'
                     | '_FALSE'
                     | IntExp CompOp IntExp

CompOp               : '='
                     | '^' '='
                     | '>'
                     | '>' '='
                     | '<'
                     | '<' '='
                     | '^='
                     | '>='
                     | '<='

Ref                  : SmplRef
                     | SmplRef '[' DimList ']'

SmplRef              : Var
                     | Ref '.' Var
                     | Ref ':' Var
                     | '_Mem' '(' IntExp ',' Declaration ')'
```

BEST AVAILABLE COPY

```
DimList         : IntExp
                  IntExp ',' DimList

IntArgl         : IntExp
                  IntExp ',' IntArgList

[illegible]     : Entry '(' ')'
                  Entry '(' ')' '[illegible]'
                  Entry '(' FrmlArgList ')'
                  Entry '(' FrmlArglist ')' '[illegible]'

ActArgList      : Ref
                  Ref ',' ActArgList

FrmlArgList     : Var
                | Var ',' FrmlArglist

Declaration     : SmplDcl
                | SmplDcl StoreDcl
                | 'type' Type
                | IndirDcl Declaration
                | IndirDcl StoreDcl Declaration

IndirDcl        : 'ptr'
                | '[' IntExp ',' IntExp ']'

SmplDcl         : 'packed' DecConst IntDcl
                  IntDcl
                  FixDcl
                  'float' '32'
                  'float' '64'
                  'struct'
                  'union'

IntDcl          : 'int' DecConst
                  'unsigned-int' DecConst

FixDcl          : 'fixed' DecConst DecConst
                  'fixed' DecConst DecConst 'radix' '10'

StoreDcl        : SizeDcl
                  LocDcl
                  SizeDcl LocDcl
                  LocDcl SizeDcl

SizeDcl         : 'size' DecConst
                | 'size' '(' IntExp ')'

LocDcl          : 'loc' DecConst
                | 'loc' '(' IntExp ')'

Lang            :       /* Language specifier */

Vers            :       /* Version specifier */

DecConst        :       /* Decimal integer constant */

StrConst        :       /* String constant */

Var             :       /* PIL variable */

Type            :       /* Type name */

Block           :       /* Block number specifier (that is, 3rd part of
                           StmtPrefix) */
```

```
Entry          :    /* Procedure or Entry name */
Label          :    /* Label */
Comment        :    /* Text string delimited by carriage return */
FileNam        :    /* Source file name */
Intrinsi       :    /* PIL intrinsic, see F.3 */
Stmtprefix     :    /* Fixed portion of PIL statement, see 2.0 */
```

F.3 Intrinsic Functions

The following intrinsic are viewed as fundamental, and useful for all languages. Additional intrinsics will be defined on a per language basis, consult the relevant language translator specification. Note, in keeping with the principles of Dijkstra guarded commands, no PIL intrinsic is ever permitted to have side effects.

| | |
|---|---|
| _Abs ( a ) | Returns the absolute value of a |
| _bAnd ( a , b ) | Returns the bitwise AND of a and b |
| _bOr ( a , b ) | Returns the bitwise OR of a and b |
| _bNot ( a ) | Returns the bitwise negation of a |
| _bXor ( a , b ) | Returns the bitwise XOR of a and b |
| _lShift ( a , b ) | Returns the signed quantity a shifted to the left (more significant) b bits |
| _luShift ( a , b ) | Returns the unsigned quantity a shifted to the left (more significant) b bits |
| _Max ( a , b ) | Returns the maximum of a and b |
| _Mem ( a , b ) | Returns the contents of memory at location a considered as a type "b". Note, this intrinsic functions as a pseudo-variable and may appear on the left side of an assigment statement |
| _Min ( a , b ) | Returns the minimum of a and b |
| _rShift ( a , b ) | Returns the signed quantity a shifted to the right (less significant) b bits |
| _ruShift ( a , b ) | Returns the unsigned quantity a shifted to the right (less significant) b bits |

Z.0 Issues

This appendix captures existing issues in the PIL language specification. Issues whose resolutions interact are assigned sub-numbers within a larger issue. Thus Z.3.1 and Z.3.2 are sub-issues whose resolution (may) interact with each other.

Z.1 Source Line Specifier

Z.1.1 Ranges for lines

PIL statements currently can only express that they were generated by
one line of source. This may be inadequate if, in fact, the PIL corresponds
to a single source statement which spanned source lines. Specifically
consider the PL/1 statement:

X = Y + LONG_VARIABLE_NAME +
             ANOTHER_LONG_NAME;

this might well generate the PIL statements:

0 23 0.0.1.2 assign X = Y + LONG_VARIABLE_NAME + ANOTHER_LONG_NAME as if all source had come from a single source statement. This can lead to
unexpected behavior in the analysis engine if statement 23 is used as the
statement number of a postcondition specification. It can also cause problems
in code visualization tools which rely on the PIL to capture the source
language statement boundaries.

One possible fix for this problem is to extend the syntax of the line
number field to permit the specification of a range. The above example
would be represented in PIL as:

0 23-24 0.0.1.2 assign X = Y + LONG_VARIABLE_NAME + ANOTHER_LONG_NAME

Another possible fix (which is upward compatible with existing consumers of
PIL) is to require the insertion of a PIL skip statement specifying line
24. I.e., the above example would generate:

0 23 0.0.1.2 assign X = Y + LONG_VARIABLE_NAME + ANOTHER_LONG_NAME
0 24 0.0.1.2 proc skip This option is complicated however by the need to specify additional
rules for when 'proc skip' statements may be eliminated as part of code
slicing. (Obviously in the current example, the 'proc skip' statement
could only be eliminated if the assignment was also eliminated). This
solution does fix the code visualization problem.

Z.1.2  Multiple source statements per line.

Consider the perfectly legal PL/1 statements:

if (x = y) then do; x = z; y = z; end;

Currently, all of these PL/1 statements will be represented in the
PIL with the same source line number, as if they had been generated by
the same source statement. This means that it is impossible to ask for
a pre-condition calculation starting at either the statement "x = z;" or
"y = z;".

It is possible to fix this by extending the syntax for line numbers
in PIL to include a character position within the line. For instance
the PIL statement corresponding to the PL/1 statement 'x = z;' could
be represented as:

0 429.20 0.1.2.1 assign x = z

An alternative fix for this, which might also resolve issue Z.1.1 is switching
to a character position within the source file, rather than a line number.
This would have significant implications on the existing PCA user interface
however.

Z.1.3 Size limitation on source line numbers.

Currently, there are no limitations on valid values for line numbers in the specification. Clearly, there are limitations in the various implementations. At the very least, no current implementation will function if there are more than 2**32 lines. Some reasonable restriction should be documented.

Z.1.4 Line number in file statement

The current specification of what line number to generate in a file statement which represents an include statement is somewhat questionable. Currently, the line number of the corresponding include statement in the source is placed there, however, the file number corresponds to the file number of the included file - this violates the rule that the file number, line number pair can be used to get to the source statement (in this case, the file number from the previous statement and line number from this statement, gets you to the include statement. This seems bogus.)

Z.2 PIL Statement size limit

Currently, there is no limitation on the limit of the size of valid PIL statements. Again, it seems clear that existing implementation will fail if presented with arbitrarily large PIL statements. Some reasonable restriction should be chosen and documented.

Z.3 Size limitation on source file numbers.

There is currently no limit specified for the maximum number of source files a backend must support. This limitation might be kept flexible, but a minimum should still be specified. (For example, All consumers of PIL must support at least 10 files).

Z.4 Structures

Z.4.1 Structure assignment

Structure assignment is not currently supported in PIL. This requires all front-ends to generate individual member assignments for all structure members when the original source contains a structure assignment. It would be much simpler for front-ends if structure assignments were supported.

Z.4.2 Array assignment

Array assignment is a special case of structure assignment, though it is significant since the number of elements in an array could make simple PIL generation strategies untenable. Array assignments could be converted into 'do' loops, by additional work in the language specific translator - but adding array assignments to PIL might make more sense.

Z.4.3 Union assignment

It is unclear how to translate assignment of C unions or PASCAL variant records into PIL (short of just generating a memory copy - this is very unsatisfing).

Z.5 Constant declaration

No mechanism exists in PIL to specify constants. This includes both user defined constants (both variables and enumeration tags) and environment defined constants (such as the default size of an integer). Having this latter capability would simplify various portability issues in the backend.

The simplest fix for this issue is the addition of a new statement operation (CONST?) which would mimic the var statement, but which would only be used only for immutable objects.

Z.6 Generality of scoping mechanism

The scoping mechanism assumes that all variable types have the same scoping rules. I'm concerned, in particular, about label and regular variables. It seems plausible to me that for some language, there might be different scoping rules for these two objects, which might require a more general mechanism.

Another problem is that some languages (C++) permit some level of explicit scope control. Worse, some code transformations we'd like to be able to make in PIL (inlining procedures) might require explicit scope control on a per variable basis.

Z.7 Restriction on size of variable names

There is no currently documented restriction on the size of variable names in PIL. Some reasonable size should be selected and documented. Possibly, some mechanism could be added to PIL to specify this. This would permit the passing of variable names as they actually appear in the source, but still permit the analysis engine to correctly reflect the language syntax. (A defect might be a result of two variables NOT being unique in the first N characters, as the language requires).

Z.8 Valid characters in variable names

The set of valid characters in variable names needs to be documented. There is one specific problem which should be addressed by any solution to this issue. COBOL considers "-" a valid character in variable names (The hyphen must not be the first or last character of a variable name). This complicates the backend, since "-" is normally an operator. Thus consider the string "A-B". For PL/I this would clearly mean A minus B, while for COBOL this would be a variable named "A-B". Now for PIL this isn't itself a problem since tokens are delimited by white space (The PL/I language translator would have to generate "A - B" in PIL.) Backend's however, must accept conditions from user input (where it unreasonable to assume that tokens will be delimited by white space), and hence will have the ambiguity problem.

Possible solutions to this problem include some form of name mangling or a different user interface for COBOL.

Z.9 Operator overloading

Adding new base types, such as floating point arithmetic may require overloading the semantics of PIL operators, that is, will the same operators be used for integer and floating point arithmetic operations? (specifically, will "+" sometimes mean integer addition and sometimes floating point addition?) Even without additional types it might be desirable to permit additional operator types (for example, for unsigned integer division). One, possible solution (since PIL tokens are delimited by white-space) would be to extend the space of operators. For instance, define "+F" to mean floating addition and "/U" to mean unsigned division. (Currently, unsigned division is handled using a PIL intrinsic").

Using such constructs would be acceptable for PIL, but they would be unwieldy in conditions.

2.10 Visibility of temporary variables

It's becoming clear that it is impossible to translate certain language constructs into PIL without creating temporary variables which span statement boundaries. Such variables can not be hidden from the user in WP calculations.

2.11 Pointer semantics

The existing partial design of pointers in PIL may not generalize to architectures with multiple pointer types. This includes both PC's (with their numerous memory models) and certain leading edge architectures (dataflow machines, etc.) Some analysis of this should be undertaken.

2.12 Additional variable declaration information 2.12.1 Variable lifetime information Lifetime information for variables is not currently expressed in PIL. If it existed, it would permit the detection of uninitialized variables in certain circumstances (specifically, when a precondition referenced a variable that was at the beginning of it's lifetime!) This should be added. However, there are complexities with lifetime information in some languages. In C++ and ADA, the lifetime of a variable depends on the execution history of the program. It is unclear how (or even whether) this needs to be expressed in PIL.

2.12.2 Support for C register declaration

The C language declaration "register" permits the compiler to associate the corresponding variable with a machine register. One interesting side effect of this is that such a variable cannot be modified by a dereferenced pointer assignment (at least it can't if it has in fact been bound to a register). Thus, use of this information would permit simplification in the resulting precondition in WP calculation involving pointers.

2.12.3 Static variables

Even without a general solution to the lifetime issue, there is a need to support the concept of static variables from the point of view of initialization. Currently, C language static variables which are initialized are not initialized in PIL, since there is no way to express the one-time only nature of their initialization.

2.13 Formal argument declarations

It is unclear how or where procedure formal arguments should be declared. Specifically, We need more clarity about what block we're in at each point around a procedure statement. Clearly the formal variable's scope wants to be limited to the procedure.

2.14 Rules on 'goto'

It is unclear if goto's are permitted from an outer block to an inner block. Specifically, what happens if a goto is executed whose target label is inside an if block? Will the backend survive this?

2.15 Dynamic path execution

Z.16.1 Pointers to functions

C (and other languages) support pointers to functions, where the actual function that is invoked is dependent on the value of the pointer variable at run time. No mechanism exists to express such concepts in PIL.

Z.16.2 Label arrays

PL/1 has the concept of an array of Labels, where the program can execute goto l(i), where i is a variable. This is similar to (but much simpler than) the problem of function pointers. Note, PL/I's label array mechanism includes a "label(*):" syntax, this is the default label to be used if the expression in the goto statement specifies a value which does not match any explicit label.

Z.16.3 Label variables

FORTRAN has the concept of label variables. These are similar to function pointers in C, but transfers of control are limited to a single procedure (FORTRAN FUNCTION or SUBROUTINE). Again, there is no way to model this concept in PIL.

Z.16.4 setjmp()/longjmp() in C

These C routines are problimatical since then do not obey the usual rules around procedure. Some study needs to be conducted of this issue.

Z.19 Variable argument lists

Some languages like C support the concept of variable argument lists (worse, the language depends on this feature to implement I/O). We need a mechanism to express this in PIL.

Z.20 Procedure overloading

Some languages like C++ permit the overloading of procedure names to support multiple different argument lists. This is not currently supported in PIL. Supporting this would require either some form of name mangling or implicitly qualifying all procedure names with the types of its argument list. The later solution is problematical for non-ANSI C.

Attorney Docket No. 1052-30-137

APPENDIX C

CODE ANALYZER

Inventors:

Ashraf Afifi, a citizen of the United States, residing at 20 Maryvale Road, Burlington, Massachusetts 01803;

Dominic Chan, a citizen of the United States, residing at 1196 North Road, Carlisle, Massachusetts 01741;

Joseph J. Comuzzi, a citizen of the United States, residing at 14 Bayberry Road, Groton, Massachusetts 01450;

Johnson M. Hart, a citizen of the United States, residing at 7 Pond Brook Circle, Weston, Massachusetts 02193;

Antonio Pizzarello, a citizen of the United States, residing at 4647 Calle Del Norte, Phoenix, Arizona 85018

Assignee:

Peritus Software Services, Inc.
304 Concord Road
Billerica, Massachusetts 01821-3485

Hale and Dorr
60 State Street
Boston, Massachusetts 02109
(617) 526-6000

Peritus Code Analyzer
Internal Pil and Symbol Table Design

1. Functions supported in the internal pil and the symbol table

The internal pil will provide routines for building itself from the external pil.

The symbol table will support symbol entry and lookup for routines building and manipulating the pil as well as for routines called interactively through the user interface. It will handle variables, free variables, procedures, labels, and types.

The internal pil will support weakest precondition analysis and postcondition analysis. It will do this first by representing boolean and other expressions in easily manipulated tree form. Expressions represented as trees can be easily modified and simplified, and so the expressions in the internal pil don't have to be translated into a different format for pre- and post-condition analysis. The internal pil and the symbol table together should also provide a reasonably efficient mechanism for storing the very large expressions that we will encounter in weakest precondition analysis.

The internal pil will provide routines to do expression simplification, including constant folding.

The internal pil will provide a mechanism for easily identifying control flow constructs. It will also be flexible enough to make it possible to perform analyses such as lifetime analysis, data flow analysis, and dependence analysis. Data flow analysis propagates information throughout the flow graph. Dependence analysis has two flavors: control dependence analysis determines for a given statement S which statements determine whether S is executed, and data dependence analysis determines relationships between definition points and use points.

The internal pil and symbol table will provide a mechanism for being saved to disk and retrieved later.

2. Overview of the internal pil.

This document proposes that the internal pil statements be trees, and that there exist a graph of basic block nodes from which we can obtain either a forward or backward traversal of statements. From any basic block we can also obtain a list of its predecessors or successors. Furthermore, it proposes the building of a control tree, a structure which would group basic blocks into do-loop or if-then-else constructs. If we use a control tree then any basic block should be able to tell us its parent in the control tree (and the parent would tell us that if this block belongs to a loop or an if-then-else).

A procedure is represented by an "a_procedure" object. From a procedure one can get the basic block which is the entry to the procedure and the basic block which is the procedure's exit node. (If a procedure has more than one exit node, each will be turned into a goto to a node N which will then represent the procedure's only exit node.) From a basic block one can obtain a list of its predecessors, a list of its successors, and a list of its statements in forwards or backwards order, as mentioned above. The statements themselves are "a_ptree" nodes. A ptree node can be of kind statement or expression, and can be queried as to what kind it is. A statement can be of kind assignment, if, do, call, goto, return, or block (meaning begin-block), an expression can be of kind leaf or operator, and a leaf can be of kind literal, variable, free identifier, or bound identifier. Statements, expressions, and leaves can all be asked what kind they are. All expressions have a type of a_type_kind, which can be retrieved by calling *type_kind()* on them.

An "a_procedure" node also has a scope pointer. The scope node supplies a save_and_delete_scope() routine which writes the scope's symbols to disk and removes them from the symbol table, and it also provides a read and restore scope() routine which enters a scope's symbols into the table (this would be called after reading the scope in from disk).

Given a slice identifier, a basic block will iterate forwards or backwards through the statements which are in the slice and are also in the basic block. We are still discussing exactly how slices will be represented.

The top-level structure is an_internal_pil. There is one an_internal_pil per executable program. An_internal_pil has access to the symbol table node representing the main procedure, if such a node exists (we can ask this by calling main_found()). It also has access to the scope nodes which represents file scopes. From a file scope node one can obtain a list of the symbol table nodes representing the procedures declared at that file scope. From the symbol table node for a procedure one can get the scope node for that procedure. The scope node will yield a list of the symbols declared in that scope (and for PL/1 the procedures nested in that scope as well).

The strings representing names in the symbol table will be in a separate string table, and will be represented by an index in the symbol table.

2.1 expression nodes

Expressions can be operators or leaves. Expression nodes can be asked which kind they are. They can also be asked what type they are.

```
struct an_expression;
/*                                                    */
/* routines to find out whether this is a leaf or an operation */
/*                                                    */
enum an_expression_kind expression_kind( struct an_expression *this_expression );
bool is_leaf( struct an_expression *this_expression );
bool is_operation( struct an_expression *this_expression );
```

The type of an expression can be retrieved by calling *get_type_kind()*.

```
/*                                   */
/* every expression has a type       */
/*                                   */

enum a_type_kind get_type_kind(struct an_expression *this_expression);

/*                                   */
/* Add a sibling to an expression.   */
/*                                   */
void add_sibling( struct an_expression *this_expr, struct an_expression *sibling_expr );
```

2.2 leaf nodes.

The function get_leaf_kind tells us whether this leaf is a variable, literal, tree identifier, or bound variable.

```
/*                                                              */
/* if this is a leaf, then the following routines tell us which kind of leaf */
/*                                                              */
enum a_leaf_kind {lk_variable, lk_literal, lk_free_identifier, lk_bound_identifier};
enum a_leaf_kind get_leaf_kind( struct a_leaf *this_leaf );
```

```
bool is_variable( struct an_expression *this_expression );
bool is_literal( struct an_expression *this_expression );
bool is_free_identifier( struct an_expression *this_expression );
bool is_bound_identifier( struct an_expression *this_expression );
```

2.2.1 literal nodes

A literal node can be a char, string, integer, float, fixed, or possibly boolean and can be asked what type it is by calling *type_kind*, which resides in the base class *an_expression*. (Note: if we do initialization with assignment rather than with loops, then we will need a literal node for structures as well—i.e., struct foo x = {7, "bar"}.) A literal node is constructed from the value of the literal it represents. That literal value can later be retrieved by calling *get_literal* on the literal node, and the length of the literal can be retrieved by calling *get_length*.

A literal node is constructed with the literal it represents. In the case of integer, fixed point, and floating point numbers, however, our representation of the literal must be able to accomodate infinite-precision arithmetic. Therefore we will represent integer, floating point, and fixed point numbers with the classes "pil_integer", "pil_float", and "pil_fixed" respectively.

```
/*                                              */
/* constructors                                 */
/*                                              */
an_expression *construct_a_string_literal(STRING);
an_expression *construct_an_integer_literal( struct pil_integer * );
an_expression *construct_a_boolean_literal( bool );
an_expression *construct_a_char_literal(char);
/* floating point and fixed point */
an_expression *construct_a_float_literal( struct pil_float *);
an_expression *construct_a_fixed_literal( struct pil_fixed *);
void destruct_an_expression( an_expression *this_literal );
```

The type of a literal can be queried by calling *type_kind()*, which belongs to its base class *an_expression*. The value that a literal node was constructed from can be retrieved by calling *get_literal()*.

```
/*                                              */
/* get literal values from literal node         */
/*                                              */
STRING get_string_literal( struct an_expression *this_literal );
struct pil_integer *get_integer_literal( struct an_expression *this_literal );
bool get_boolean_literal( struct an_expression *this_literal );
char get_char_literal( struct an_expression *this_literal );
struct pil_float *get_float_literal( struct an_expression *this_literal );
struct pil_fixed *get_fixed_literal( struct an_expression *this_literal );
```

The length of the literal in bytes can be retrieved by calling *get_length()*.

```
/*                                              */
/* get length in bytes of literal               */
/*                                              */
int get_length( struct an_expression *this_literal);
```

2.2.2 variable nodes

An *a_variable* is a leaf which represents a program variable. It can be constructed with a pointer to a symbol table node, or with a name and a type pointer. We can retrieve the leaf's corresponding symbol table entry by calling *get_symbol_node()*. We can also ask about the variable's type and linkage (these are set in the symbol node). Questions about the type—i.e., what is the size of the type and what is its alignment—can be asked of the a_variable directly.
Alternatively we can get the type node from the a_variable.

We find out that this is a variable node by calling *get_leaf_kind()*.

We construct a variable node from a name and a type node or from a symbol table node.

```
//
// constructors
//
/* construct_a_variable_and_stnode constructs both an an_expression node representing the */
/* variable and a symbol table node. It returns the an_expression node representing the */
/* variable, and the expression node points to the symbol table node (which can be retrieved */
/* by calling get_symbol_node). */
/* */
struct an_expression *construct_a_variable_and_stnode( STRING name, a_type *type );
/* */
/* construct_a_variable is the constructor to call when a symbol table node already exists. */
/* */
struct an_expression *construct_a_variable( a_symbol *var_id );
```

We can retrieve the symbol table node corresponding to this node by calling *get_symbol_node()*.

```
//
// get symbol table info for this entry
//
struct a_symbol_node get_symbol_node( an_expression *this_variable );
```

We can retrieve the size, alignment, and linkage of this variable.

```
//
// get size, alignment, linkage
//
int get_size( an_expression *this_variable ); // size in bytes
int get_alignment( an_expression *this_variable );
a_linkage get_linkage( an_expression *this_variable );
an_extent get_extent( an_expression *this_variable );
```

2.2.3 bound identifiers and free identifiers

Say the following predicate *p1* is entered in the context of procedure *foo*:
(ForAll i: n < i < m: i*x == 6)
Then *m* is a free identifier and is entered into the symbol table with global scope and with type integer. It is printed out as simply as "m", since it is global. If *foo* has a local variable *n*, then *n* will not be a free identifier but rather a local of *foo*. While we are in *foo* it will be printed out as "n", but once we leave *foo* it will be printed out as "foo\n." (If there is a global *n* as well, then maybe we should always print out foo's *n* as "foo\n.")

Since i on the other hand is a bound variable, it is not entered into the symbol table. It is kept as a string in an *a_bound_identifier* node within *p1*, since it is local to *p1*. It does, however, have a type pointer (which points to type integer). The bound identifier i is printed out as "p1i".

A free identifier or a predicate can't share a name with a global identifier in the source. Maybe we should give the user a dictionary of names and allow him to ask: have I already used m? Or: what is m? (Is it a free identifier, a global variable, etc.) Or when a user needs a free identifier name or a predicate name she could ask PCA to supply it.
Since the source code we read may already contain a variable with the same name as an input file, file names have to constitute a separate name space. Therefore the user should be able to reuse a file name for a predicate or free identifier.

```
//
// a bound identifier is constructed from a string and a type
//
struct an_expression *construct_a_bound_identifier( STRING name, a_type_kind type_kind);
//
// the name can be retrieved by calling get_name.
//
STRING get_bound_identifier_name( struct an_expression *this_bound_identifier );
/*                                                                    */
/* The type can be retrieved by calling get type on the leaf base class. */
/*                                                                    */
//
// a bound identifier can be asked whether it is an integer
//
bool bound_identifier_is_integer( struct a_bound_identifier *this_bound_identifier );;


//
// a free identifier is constructed from a name and a type
//
struct an_expression *construct_a_free_identifier( STRING name, a_type_kind type_kind );
/*                                                                    */
/* get_leaf_kind can be called on a pointer to a free identifier if it is cast to a type a_leaf *.  */
/* get_leaf_kind will then return lk_free_identifier.                 */
//
// the name can be retrieved.
//
STRING get name( struct an_expression *this_free_identifier );
//
// the free identifier can be asked whether it is an integer
//
bool is_integer( struct an_expression *this_free_identifier );
```

2.3 operator nodes

Epression nodes also represent unary and binary operators. Expression which are operators can be constructed with an operator and 1 or 2 operands, where the operands are *an_expressions*. Operator nodes can be asked how many operands they have.. One can retrieve from an operator node its child, and from any child C one can retrieve C's sibling, if it has one..

Constant folding is performed on operator expressions as they are constructed. If we decide to do constant propagation, then we will want to have *an_expression* supply a fold() routine to do constant folding explicitly, although we won't need this for version 1
Operators include are represented by the enumerated type OP, and its values include:
1. Binary operators:

*enum operators{ add_op, subtract_op, div_op, mul_op, rem_op, and_op, or_op, equals_op,*

| | |
|---|---|
| add_op: | represents the sum of its operands |
| subtract_op: | represents operand1 - operand2 |
| div_op: | represents operand1/operand2 |
| mul_op: | represents operand1 * operand2 |
| rem_op: | represents operand1 % operand2 |
| and_op: | represents operand & operand2 |
| or_op: | represents operand1 \| operand2 |
| equals_op: | represents (operand1 == operand2) |

*nequals_op, greater_op, less_op, ge_op, le_op, union_ref_op, array_ref_op, struct_ref_op,*

| | |
|---|---|
| nequals_op: | represents (operand1 != operand2) |
| greater_op: | represents (operand1 > operand2) |
| less_op: | represents (operand1 < operand2) |
| ge_op: | represents (operand1 >= operand2) |
| le_op: | represents (operand1 <= operand2) |
| union_ref_op | This takes as its argument 1) an expression node representing a union data structure and 2) a variable node representing a member of the union |
| array_ref_op: | This takes an array and an index as operands. |
| struct_ref_op | This takes as operands 1) an expression representing a structure in the source code and 2) a variable node representing a member of the structure.. (For the purposes of alias analysis we will want to view both array_ref_op and struct_ref_op as an address and offset—i.e., the two will look exactly the same from the point of view of alias analysis. But for the purposes of wp analysis we want to keep these constructs at a higher level.) |

*dereference_op, intrinsic_op, assign_mem_op, bit_and_op, bit_or_op, bit_xor_op, lshift_op,*

| | |
|---|---|
| dereference_op | This takes a pointer and a possible offset (in bytes) as operands. |
| // the following ops implement intrinsics | |
| intrinsic_op | This is to deal with intrinsics that the back end doesn't know about yet. It takes as arguments 1) a leaf node representing a string which is the intrinsic's name and 2) an *nk_expression_list* node to represent the intrinsic's arguments (since we don't know how many arguments the intrinsic will have). |
| assign_mem_op | implements the assign_Mem intrinsic and takes an address_op and an an expression as operands. |
| bit_and_op: | represents (operand1 && operand2) |
| bit_or_op: | represents (operand1 \|\| operand2) |
| bit_xor_op: | represents the exclusive or of its operands |
| lshift_op: | has same semantics as application of lshift intrinsic (see external PIl. spec) |

*lushift_op, max_op, min_op, rshift_op, rushift_op, udiv_op, umul_op, urem_op,*

| | |
|---|---|
| lushift_op: | has same semantics as application of lushift intrinsic |
| max_op: | has same semantics as application of _Max intrinsic. |

| | |
|---|---|
| min_op: | has same semantics as application of _Min intrinsic |
| rshift_op: | has same semantics as application of _rShift intrinsic |
| rushift_op: | has same semantics as application of _ruShift intrinsic |
| udiv_op: | has same semantics as application of _uDiv intrinsic |
| umul_op: | has same semantics as application of _uMult intrinsic |
| urem_op: | has same semantics as application of _uRem intrinsic |

*neg_op, plus_op, not_op, op_address, convert_op, abs_op, bit_not_op };*

2. unary ops.

| | |
|---|---|
| neg_op: | represents the unary minus of its operand |
| plus_op: | represents the unary plus of its operand |
| not_op: | represents the bitwise negation of its operand |
| op_address: | represents the address of its operand |
| convert_op: | This is used for type conversion. The type being converted to is the type of the operator node containing the *convert_op*. The type being converted from is the type of the child of the *convert_op*. |
| abs_op: | has same semantics as application of the _Abs intrinsic. |
| bit_not_op: | has same semantics as application of the _bNot intrinsic. |

The type of the operator—i.e., whether it is a floating point add or an integer add—can be ascertained by asking the operator node what its type is. This is also the way to find out what a convert_op is converting to (to find out what it is converting from, ask for the type of its child).

Examples.

_Mem( ptr1, type1). This will be translated into a *dereference_op*, which will have a type of *type1* (expression nodes have types). Its first argument will be *ptr1*, which will have a type of whatever *ptr1* has been declared to be. So we will have the type of the pointer in the *ptr1* node and the type of the pointer in the *dereference_op* node.

_assign_Mem(ptr1, type1). This will be translated into an *assign_mem_op* with the same arguments as the assign_Mem intrinsic.

_Mem( PTR1, type1).FOO would be translated as: *struct_ref_op( dereference_op* ( PTR1 0), FOO). The type of *dereference_op* would be type1. The type of the struct_ref_op would be the type of FOO.

FOO(1).LOC.X would be translated as:
*struct_ref_op ( struct_ref_op ( array_ref_op* ( FOO, 1), LOC ), X )

An operation node is constructed from its operator and arguments.

```
//
// constructors and destructor
//
struct an_expression *construct_binary_operation( enum operators op, struct an_expression
*left, struct an_expression *right );

/* For a unary expression call construct an_operation. For an n-ary operator, call    */
/* construct_an_operation and then add_sibling.                                          */
struct an_expression *construct an operation( enum operators, struct an_expression *child );
```

```
void destruct_an_operation( struct an_expression *this_expression );
```

The function n_operands tells us whether this is a binary operator.

```
//
// n_operands gives us the number of operands
//
bool n_operands( struct an_expression *this_operation );
```

Routines to retrieve the operator and operands.

```
//
// get operator and traverse tree.
//
enum operators get_ operator( struct an_expression *this_operation );
struct an_expression *get_child( struct an_expression *this_operation );
struct an_expression *get_sibling( struct an_expression *this_operation );
```

2.4 types

Types are represented by a_type_node nodes, which (unlike most of the internal pil) are not ptree nodes. PCA3 will create type nodes for the builtin types before it starts processing the external pil. For complicated types like structs and unions, PCA3 will have to create type information on the fly. An a_type object provides a constructor and routines for adding fields to structs, unions, and enums

```
enum a_type_kind { tk_struct, tk_union, tk_array, tk_float,tk_double, tk_long_double,
tk_fixed,tk_short, tk_ushort, tk_int,tk_uint, tk_long, tk_ulong, tk_bool, tk_char, tk_string,
tk_enum, tk_void, tk_ptr, tk_func, tk_type };

struct a_type;
```

a_type is constructed by passing the name of the type to the constructor. If the type is anonymous, a null string is passed in, in which case the type is not hashed into the symbol table. It will, however, be pointed at by some declaration (otherwise it would not have occurred in the external pil)

```
//
// constructor
//
struct a_type *construct_a_type(STRING type_name, a_type_kind, int len );
void destruct_a_type( struct a_type *);
```

The routine *kind* returns the type kind of this type (see the declaration of *a_type_kind* above).

```
//
// kind returns the type kind.
//
a_type_kind get_type_kind( struct a_type *this_type );
```

The size in bytes of the type is returned by *get_size*.

```
//
// get the size in bytes of this type.
//
```

*int get_type_size( struct a_type *this_type );*
*void set_type_size( int size );*

2.4.1 structures

A structure is represented by a type node with a *type_kind* of *tk_struct*. It's constructor is similar to *a_type_node* 's constructor shown above, and fields are entered with the routine *add_struct_field* shown below. The arguments to *add_struct_field* are the name of the field, its type, and its offset in bytes from the beginning of the structure.

```
struct a_type *construct_a_struct_type( STRING structure_name );
//
void add_struct_field( struct a_type *struct_type, STRING field_name, struct a_type *field_type, int offset);
//
```

The fields of a structure can be accessed in three ways. First, a field can be accessed by name. *get_struct_field* takes a field name as an incoming argument, returns the field's offset in its second argument, and returns the field's symbol table node as its return value.

*struct a_symbol *get_struct_field( struct a_type struct_type, STRING field name, int *offset );*

Secondly, the fields of a structure can be iterated through by 1) declaring an a symbol_iterator and initializing it with a call to init_struct_iterator, 2) calling *first_struct_field*, which returns the symbol table node of the first field in the structure and 3) then iteratively calling *next struct_field*, which returns the symbol table node of the next field in the structure. *next_struct_field* will return 0 after it is called for the last field in a structure. The number of fields can be retrieved by calling n_fields.

```
int n_fields( struct a_type *this_type );
struct a_symbol_iterator;
struct a_symbol_iterator init_a_struct_field_iterator( struct a_type *this_type );
a_symbol *first_symbol( struct a_symbol_iterator *iterator );
a_symbol *next_symbol( struct a_symbol iterator *iterator );
```

Thirdly, a field of a structure can be accessed by its offset. If the offset given does not correspond to a field in the corresponding structure, a null symbol node is returned.

*a_symbol *get_field_at_offset( struct a_type *struct_type, int offset );*

2.4.2 unions

Unions are constructed by passing the union's name to its constructor (see a_type's constructor above). The overlapping elements of the union are then entered into the symbol table by calling add union field passing in the name of the field and a pointer to its type.

```
struct a_type *construct_a_union( STRING union_name );
void add_union_field( struct a_type *this_union, STRING field_name, a type *field_type);
```

A field of a union is accessed by passing the field's name to *get union_field*.

*a_symbol *get_union_field( struct a_type *this union STRING field_name );*

The fields of a union can be iterated through by 1) declaring an a_symbol_iterator and initializing it by calliing initialize_a_union_field_iterator, 2) calling first_symbol on the iterator, and 3) calling next_symbol on the iterator until next_symbol returns null.

```
int n_fields( struct a_type *this_type );
struct a_symbol_iterator;
struct a_symbol_iterator init_a_union_field_iterator( struct a_type *this_type );
a_symbol *first_symbol( struct a_symbol_iterator *iterator );
a_symbol *next_symbol( struct a_symbol_iterator *iterator );
```

2.4.3 arrays

An array type points to its element type and contains pointers to expressions representing 1) the lower bound for this dimension and 2) the number of elements in this dimension. N-dimensional arrays are represented internally as arrays of arrays — i.e., an array type node's element is another array type node.

An array type is constructed with the number of elements and the lower bound:

```
struct a_type *construct_an_array_type( int n_elements, int lower_bound );
```

Both the number of elements and the lower bound can be retrieved.

```
int n_array_elements( struct a_type *this_array_type );
int get_array_lower_bound( struct a_type *this_array_type );
```

Dimensions are added by passing the number of elements in the new dimension and the lower bound of the new dimension to *add_dimension*.

```
void add_array_dimension( struct a_type *this_array_type, int n_elements, int lower_bound );
```

The number of dimensions can be retrieved, as can the total number of elements in an array.

```
int n_array_dimensions( struct a_type *this_array_type );
int n_array_elements( struct a_type *this_array_type );
```

The type of the array element is set last (since this occurs last in the external pil):

```
void set_array_element_type( struct a_type *this_array_type, a_type *element_type );
```

The element type can be retrieved with *get_element_type*. The total size of the array in bytes can be determined by multiplying the size in bytes of the element type (call *get_size* on the element type) by the number of elements in the array (see *n_elements* above).

```
a_type *get_array_element_type( struct a_type *this_array_type );
```

2.4.4 float, double, long double, short, unsigned short, int, unsigned int, long, unsigned long, boolean, char, unsigned char, string, and void.

A type node to represent each of these types will be created as the type is encountered in the external pil. It will be a standard type node with nothing but a type kind and a type size.

There will also be a pre defined type of integer with indeterminate size. This is to be used for bound variables and free identifiers.

2.4.5 fixed

A node representing a fixed point type is constructed with the length of the integer part and the length of the fraction part.

```
struct a_type *construct_a_fixed_type( int integer_len, int frac_len );
```

These same numbers can be later retrieved.

```
int get_fixed_fraction_length( struct a_type *this_fixed_type );
int get_fixed_integer_length( struct a_type *this_fixed_type );
```

2.4.6 enumerated types

The names of the enumerated constants are not passed to the back end by c2pil and enumerated types are passed to us as integers. Therefore there are currently no enumerated types in the internal pil.

2.4.7 pointers

Pointer types are constructed with the pointed-to type. The pointed-to type can be retrieved again by calling *get_pointed_to_type*.

```
struct a_type *construct_a_pointer_type( a_type *pointed_to_type );
struct a_type *get_pointed_to_type( struct a_type *this_type );
```

2.4.8 procedure types

Procedure type nodes hang off of *a_procedure* nodes (see section 2.8 below). They are really only needed for externally visible routines; they are used when linking external pil files, to determine whether file a's call to routine foo in file b is legal.

Procedure types are constructed with no arguments. Parameter information is added by calling *add_procedure_type_parameter* on the constructed procedure typenode and passing in the parameter type.

```
a_type *construct_a_procedure_type( );
```

*add_procedure_type_parameter* is called by *set_parameter_type* in class *a_procedure*.

```
void add_procedure_type_parameter( struct a_type *this_routine_type, int which_param, a_type *param_type );
//
// retrieve ith routine parameter
//
struct a_type *get_procedure_ith_parameter_type( struct a_type *this_routine_type, int i );
```

2.4.9 typedefs

A typedef is constructed with a name and a pointer to the type it refers to. Thus

*typedef foo int;* would be constructed with the string "foo" and a pointer to the *a_type* node representing "int". The underlying type can also be retrieved by calling *get_underlying_type*. The underlying type of a typedef to a typedef to a typedef (and so on) can be retrieved by calling *get_most_underlying_type*.

```
struct a_type *construct_a_typedef_type( STRING type_name, a_type *refed_type );
struct a_type *get_typedef_underlying_type( struct a_type *this_typedef_type );
a_type *get_typedef_most_underlying_type( struct a_type *this_typedef_type );
```

2.6 statements

Statements can be queried as to what kind they are. They can be of kind assign, if, do, call, goto, return_stack, or return_all. A statement can be asked what source file and line number it corresponds to.

Each kind of statement (assign, if, do, call, goto, return, and block) has its own derived class. For each statement kind there is a routine to fetch the operands of the statement.

```
typedef int an_extpil_line_number;
typedef int src_line_number;
struct a_source_location; // includes source file description and line number
struct an_extpil_location; // includes external pil file description and line number

struct a_statement;
```

The function *statement_kind()* tells us which kind of statement this is.

```
//
// statement_kind returns the kind of statement this is.
//
enum a_statement_kind { sk_assign, sk_if, sk_do, sk_call, sk_goto, sk_return_stack,
sk_return_all };
enum a_statement_kind get_statement_kind( struct a_statement *this_statement );
```

A statement is constructed from its statement kind, its operands, its source location, and its location in the external pil file.

```
//
// constructor
//
struct a_statement *construct_a_statement( enum a_statement_kind kind, struct an_expression
  *left, struct an_expression right, struct an_extpil_location);

void destruct_a_statement( struct a_statement *this_statement );
```

Routines to retrieve the external pil file info.

```
//
// source info
//
struct an_extpil_location get_extpil_loc( struct a_statement *this_statement );
char *get_pil_file_name( struct a_statement *this_statement );
struct an_extpil_line_number get_pil_line_number( struct a_statement *this_statement );

//
// get operands
//
an_expression get_left();
an_expression get_right();
```

Assignment statements:

```
struct a_statement *construct_an_assignment_statement( struct an_expression *left,
  struct an_expression *right, struct a_source_location *, struct an_expil_location * );

//
// if a statement is of kind sk_assign, we can get its type by calling get_type()
// and the length in bytes of the items being assigned by calling get_length().
//
a_type_kind get_assignment_type( struct a_statement *assign_statement );
int get_assignment_length( struct a_statement *assign_statement );
```

The target of an if statement is stored in the successor list of the if statement's basic block, and therefore doesn't have to be stored in the if statement itself. Maybe a statement which alters the flow of control should point to its basic block, so that it can retrieve the target info.

```
struct a_statement *construct_an_if_statement( struct an_expression *condition,
  struct a_source_location *, struct an_expil_location *);
//
// get operand
//
struct an_expression *get_ifstmt_condition( struct a_statement *ifstmt );;
a_statement *get_stmt_true_successor( struct_a_statement *ifstmt);
a_statement *get_stmt_false_successor( struct a_statement *ifstmt );
void set_stmt_true_successor( struct a_statement *, struct a_basic_block *);
void set_stmt_false_successor( struct a_statement *, struct a_basic_block *);
```

The body of the do loop will be the first successor of its basic block.

```
struct a_statement *construct_a_do_statement( an_expression condition,a_source_location,
an_expil_location );
enum an_operator get_dostmt_condition( struct a_statement *dostmt );
```

Call statements:

```
struct a_statement *construct_a_call_statement( struct a_symbol *called_routine,
  struct a_source_location *, struct an_expil_location *);
void add_call_argument( struct an_expression * );
//
// access to operands and associated info
//
struct a_symbol* get_called_routine( struct a_statement *call_stmt );
an_expression get_call_first_arg( struct a_statement *call_stmt );
an_expression get_call_next_arg( struct a_statement *call_stmt );
bool is_noalias_call( struct a_statement *call_stmt );
}; // end class a_call_statement
```

NOV-13-1995 16:56 FROM ITUS S/W SERVICES TO 16175265000 P.15

The target of a goto will be stored in the successor list of the goto's basic block, and therefore doesn't have to be stored in the goto statement itself. Maybe a statement which alters the flow of control should point to its basic block, since that way the statement can retrieve the target info.

```
struct a_statement *construct_a_goto_statement(struct a_basic_block *this_block,
  struct a_symbol * target, struct a_source_location *, struct an_expil_location *);

//
// get operand
//
struct a_statement *get_goto_target( struct a_statement *goto_stmt );
```

Return statements:

```
struct a_statement *construct_a_return_statement(a_source_location, an_expil_location);


struct a_statement *construct_an_exit_statement( a_source_location, an_expil_location);
```

2.6 basic blocks

A basic block provides routines we can use to iterate forwards or backwards through its statements, as well as routines to iterate through its predecessors and successors. It also provides routines which will attach or retrieve a precondition or postcondition, although we may change this. Given a slice S, a basic block provides a routine to iterate through the statements which are in the basic block and which are also in S.

A basic block is a control tree node. It can be constructed from its initial statement. It can also be made a predecessor or successor of another block.

```
struct a_ctnode;
typedef a_ctnode a_basic_block;

//
// construct a basic block from an initial statement
//
struct a_basic_block *construct_a_basic_block( struct a_statement *);
```

*add_statement* adds a statement to the end of the list of statements in this basic block. Its only argument is the statement to be added.

```
//
// add a statement to the end of the list of statements
// in this basic block.
//
void add_statement_to_block( a_statement *);
```

Predecessor-successor relationships are established with calls to *predecessor* and *successor*. If we call *predecessor* on the current basic block (say A) and pass it another basic block (say B) as its argument, then it establishes that B is A's predecessor and A is B's successor. Similarly, if *successor* is called on basic block A and is passed basic block B, it establishes that B is A's successor and A is B's predecessor.

```
//
// create predecessor-successor relationships
//
```

```
void add_predecessor( struct a_basic_block *);
void add_successor( struct a_basic_block *);
//
// If this basic block ends in a conditional branch, we call "set_condition",
// passing it 1) the condition for the branch, 2) the successor branched to when
// the condition is true, and 3) the successor branched to when the condition is
// false.
//
void set_branch_condition( struct a_basic_block *this_block, struct an_expression *condition,
  struct a_basic_block *true_successor, struct a_basic_block *false_successor);
//
// If this basic block starts a do loop, we call "set_loop_condition," passing it
// 1) a pointer to the condition for the loop and 2) the basic block representing the
// body of the loop
void set_loop_condition( struct a_basic_block *this_block, struct an_expression *condition,
  struct a_basic_block *body );
```

We can iterate forward through the statements of a basic block by calling *first_statement* and then iteratively calling *next_statement*, until it returns null.

```
//
// To iterate forward through the statements of a basic block B:
//   1) declare a variable X of type a_statement_iterator and initialize it by calling
//        X = initialize_a_statement_iterator( B );
//   2) call first_statement( &X ) which returns a pointer to the first statement of the
//        basic block
//   3) iteratively call next_statement( &X ) until it returns null.
//
struct a_statement_iterator;
struct a_statement_iterator initialize_a_statement_iterator( struct a_basic_block *);

struct a_statement *get_first_statement(   struct a_statement_iterator * );
struct a_statement *next_statement( struct a_statement_iterator * );
```

Similarly, to iterate backwards we call *last_statement*, and then iteratively call *prev_statement* until it returns null.

```
//
// To iterate backwards through the statements of a basic block B.
//   1) declare a variable X of type a_statement_iterator and initialize it by calling
//        X = initialize_a_statement_iterator( B );
//   2) call last_statement( X ), which returns a pointer to the last statement
//        of the basic block
//   3) iteratively call prev_statement( X ) until it returns null
//
struct a_statement *last_statement( struct a_statement_iterator * );
a_statement *prev_statement( struct a_statement_iterator *);
//
// Basic blocks only have two successors, so one can retrieve them as follows.
//   1) call first_successor( a_basic_block *), which returns a pointer to the first successor
//   2) call second_successor( a_basic_block *), which returns a pointer to the next successor
//
int get_n_successors( struct a_basic_block *this_block );
struct a_basic_block *get_first_successor( struct a_basic_block *this_block );
struct a_basic_block *get_second_successor( struct a_basic_block *next_block );
//
// Since a basic block B can have many predecessors, one iterates through them by:
//   1) declare a variable X of type a_control_tree_iterator and initialize it by calling
//        X = initialize_a_predecessor_list( B ); (or initialize_a_successor_list)
```

```
// 2) call first predecessor( &X ).
// 3) call next_predecessor( &X ) until it returns null.

struct a_control_tree_iterator initialize_a_predecessor list( struct a_basic_block *);
struct a basic_block *get_first_predecessor( struct a_control_tree_iterator *);
struct a_basic_block *get_next_predecessor( struct a_control_tree_iterator *);

//
// Routines to test whether this is basic block has a condition (which it does if it
// ends with a conditional branch or a do statement), , get the condition, get the
// successor corresponding to the state in which the condition is true, and get the successor
// corresponding to the state in which the condition is false.
//
bool has_condition( struct a basic_block *this_block);
an_expression *get_block_condition( struct a_basic_block *this_block);
a_basic_block *get_block true_successor( struct a_basic_block *this_block );
a_basic_block *get_block_false_successor( struct a_basic_block *this_block);
//
// Basic blocks can have a preconditions or postconditions attached to them.
//
// attach precondition and postcondition for slice s.
//
void attach_precondition( SLICE_ID s, struct a predicate *p);
void attach_postcondition( SLICE_ID s, struct a_predicate *p);
//
// in_slice returns true if this basic block has any statements in slice s.
//
bool has_statements_in_slice( struct a_basic_block *this_block, SLICE_ID s);
//
// Iterate through the statements of slice s. This needs more work.
//
struct a_slice_statement_iterator;
struct a_slice_statement iterator initialize_a_slice_statement_iterator( SLICE ID s,
   struct a_basic_block * );
struct a_statement *first slice_statement( struct a_slice_statement_iterator *);
struct a_statement *next_slice_statement( struct a_slice statement_iterator * );
struct a_statement *last slice_statement( struct a_slice_statement_iterator * );
struct a_statement *prev_slice_statement( struct a slice_statement_iterator * );
//
// A visited flag for computing wps
//
bool block_visited( struct a_basic_block *),
void set_block visited( struct a_basic_block *);
void reset_block_visited( struct a_basic block *);
```

2.7 Intrinsics

Intrinsics are translated into operators in the internal pil, mainly for efficiency reasons (see operators in section 2.4 above).

To cover intrinsics that may be added by the front-end that the back-end doesn't know about yet, there is an *intrinsic_op* (again, see operators in section 2.4 above).. This operator takes a table of kind

*nk_expression_list* as an argument, since for any new intrinsic we won't know how many arguments it has.

2.8 The control tree

The control tree consists of several levels of flow graphs. The bottom level consists of basic blocks. The next level up is a flow graph of the flow graph, and is constructed by Sharir's algorithm (described in M. Sharir, "Structural Analysis. A New Approach to Flow Analysis in Optimizing Compilers", *Computer Languages*, Vol. 5, pp. 141 to 153). Each graph beyond the lowest level consists of control tree nodes which are essentially interval nodes, where each interval has a "kind" as described below. Each control tree node has a successor list, a predecessor list, and a list of children in reverse postorder.

A control tree node has one of the following "kinds":

- Block: this represents a sequence of nodes A1, A2, ... An where for each node Aj, Aj+1 is its only successor and Aj is the only predecessor of Aj+1
- IfThen: this represents and "if A1 then A2" construct. A1 and A2 are single-entry single exit structures. A1 has two successors, one of which is A2, and one of which is, say, S1. A2 has exactly one predecessor, which is A1, and it has only one successor, which is S1.
- IfThenElse: this represents "if A1 then A2 else A3". A1, A2, and A3 are single-entry, single-exit structures. A1 has two successors, which are A2 and A3. A1 is the only predecessor of both A2 and A3. Both A2 and A3 have one and the same successor.
- WhileLoop: this represents while A1 do A2. A1 and A2 are single-entry, single-exit structures. A2 has A1 as its only predecessor and successor, and A1 has one other successor.
- Loop: this represents a node A1 which has itself as one of its successors
- PropInt: this represents a general strongly-connected graph I having a single entry node x ∈ I and having the property that all cycles within I pass through x.
- ImpropInt: this represents a strongly-connected subgraph containing multiple-entry subcycles.
- PropOutInt: this represents a general single-entry acyclic flow graph
- ImpropOutInt: this represents a general single-entry graph containing only multiple-entry cycles.

A control tree node can be constructed with its kind and its entry node. More nodes can be added to it one at a time. Its kind can be retrieved. It supplies a means of iterating through its children in the order in which it acquired them. If it is an IfThenElse node then it supplies a) its condition b) its "true" successor and c) its "false" successor. If it is a do-loop node then it supplies a) its test and b) its invariant if it knows it. It follows that it should also supply a routine with which we can tell it what its invariant is.

A control tree node can be asked for a given slice whether any of its children have any statements in that slice.

```
struct a_ctnode;

// A control tree node has a type:
//
enum a_control_tree_type { basic_block_type, block_type, ifthen_type, ifthenelse_type,
while_type, loop_type, propint_type, improprint_type, propoutint_type, impropoutint_type };

// A control tree node can be queried as to what type it is.
//
enum a_control_tree_type get_control_tree_type(
  struct a_ctnode *);

// A control tree node has a "visited" flag which can be set, reset, or queried.
```

```
//
void set_visited( struct a_ctnode *this_node );
void reset_visited( struct a_ctnode *this_node );
bool visited( struct a_ctnode *this_node );

//
// Control tree nodes can only have two successors, so one can retrieve them as follows.
//   1) call first_successor( a_ctnode *), which returns a pointer to the first successor
//   2) call second_successor( a_ctnode *), which returns a pointer to the next successor
//
int get_n_successors( struct a_ctnode *);
struct a_ctnode *get_first_successor( struct a_ctnode *this_block );
struct a_ctnode *get_second_successor( struct a_ctnode *next_block );
//
// Since a control tree node B can have many predecessors, one iterates through them by:
//   1) declare a variable X of type a_ctnode_iterator and initialize it by calling
//        X = initialize_a_predecessor_list( B ); (or initialize_a_successor_list)
//   2) call first_predecessor( &X );
//   3) call next_predecessor( &X ) until it returns null.

struct a_ctnode_iterator initialize_a_predecessor_list( struct a_ctnode *);
struct a_ctnode *get_first_predecessor( struct a_control_tree_iterator *);
struct a_ctnode *get_next_predecessor( struct a_control_tree_iterator *);
//
// if this is a control tree node corresponding to an if, an ifthen, or a loop, then
// it has a condition attached to it. We can test for that fact and retrieve the condition,
// the successor corresponding to "true", the successor corresponding to "false", or the
// successor corresponding to the loop body.
//
bool ct_node_has_condition( struct a_ctnode *this_node);
struct an_expression *get_ct_node_condition( struct a_ctnode *this_node);
struct a_ctnode *get_ct_node_true_successor( struct a_ctnode *this_node );
struct a_ctnode *get_ct_node_false_successor( struct a_ctnode *this_node);
struct a_ctnode *get_ct_node_loop_body( struct a_ctnode *this_node );
```

2.9 external pil file info and source file info.

There is an *an_extpil_file* class which corresponds to an external pil file. It is constructed with the file name, and once this has been accomplished it can be passed to the constructor for *an_internal_pil*. This causes the external pil in question to be translated into internal pil, and the function *has_been_translated* tells us whether this translation has been performed. This class also provides an *open* function and a *has_been_opened* query, and a routine to provide the file's time stamp.

Responsibility for opening files, associating a file number with each file, remembering time stamps, etc. now resides with the agent layer.

```
typedef int an_extpil_line_number;
typedef int a_src_line_number;
typedef int an_extpil_file;
```

Find out whether an external pil file has been translated to internal pil.

```
//
```

```
// has_been_translated returns true if the external pil file
// represented by this object has been translated to internal pil
//
bool has_been_translated( an_extpil_file this_file ); // has been translated to internal pil
```

There are structs to represent source file locations and external pil file locations.

```
struct a_source_location;

struct a_source_location *construct_a_source_location( a_source_file *, src_line_number);
struct a_source_file *get_source_file( struct a_source_location *this_location);
src_line_number *get_line_number( struct a_source_location *this_location );
void destruct_a_source_location( struct a_source_location *this_location ).

struct an_extpil_location.

struct an_extpil_location *construct_an_extpil_location( an_extpil_file *,
an_extpil_line_number );
struct an_extpil_file *get_extpil_file( struct an_extpil_location *this_loc ),
an_extpil_line_number get_line_number( struct an_extpil_location *this_loc );
void destruct_an_extpil_location( struct an_extpil_location *this_loc ).
```

2.10 an internal_pil

The *an_internal_pil* structure corresponds to the entire executable being analyzed. The constructor is passed an external pil file, which it parses, causing the corresponding internal pil to be built. Another external pil file can be translated and "linked" by calling *an_internal_pil*'s routine *more_pil*, passing it another external pil file name. We can ask an_internal_pil for the *a_scope* structure representing the global scope. Given a file name, we can ask it for the file scope for that file. We can also ask it for any procedure by name (although if the procedure has internal linkage, its name must be qualified with the name of the file in which it resides – i.e., "file1\foo"). We can also ask *an_internal_pil* for the main procedure, provided that the main procedure has been read in (this is tested by calling main_found()).

```
struct an_external_pil;
struct an_internal_pil;
//
// an_internal_pil is built in the process of parsing the external_pil
//
struct an_internal_pil *construct_an_internal_pil( struct an_external_pil * );
void destruct_an_internal_pil( struct an_internal_pil *);
//
// we may be parsing more than one external pil file, however.
//
void more_pil( FILE filename );
//
// we can retrieve the global scope from the internal pil
//
struct a_scope * get_global_scope( );
void set_global_scope( struct a_scope *),
//
// get file scope
```

```
//
struct a_scope * get_file_scope( FILE_ID );
void set_file_scope( FILE_ID, struct a_scope * );
//
// if we have processed the main procedure, we can get it as well.
//
bool main_found( );
struct a_procedure *get_main( );
```

2.11 Predicates

A predicate is an operator node in the internal pil. If it has no quantifiers, it is represented as an operator node with a boolean valued operator (i.e., greater-than, equals, etc.). If it has a quantifier, then it is represented as an operator node with the *predicate_op* operator. This has a symbol table pointer (if the user supplies no name for a predicate, it is given a default name) and two arguments: 1) the quantifier and 2) an expression with a boolean-valued operator.

The quantifier is represented as an *a_quantifier*. This node contains an enumeration field which tells us which quantifier this node represents, and it has two operands: 1) the bound identifier and 2) the range.

The bound identifier is represented as an *a_bound_identifier* leaf, which contains a pointer to a string which represents the bound identifier name. It has no symbol table entry, since its scope is limited to the predicate. It is printed out for the user in qualified form—i.e., if bound identifier i occurs in predicate *p1* then it can be printed out as "p1\i" or maybe "p$p1\i" where the "p$" means that "p1" is a predicate and not a file.

The range is represented with a boolean-valued expression node (i.e., "i> 10" or "i == x*y", where *i* is the CSE'd bound identifier leaf and *x* and *y* are free identifier leaves) or with a "range_op". A "range_op" has two operands, both of which are expressions: 1) the lower end of the range and 2) the upper end of the range. Both operands may contain free identifier leaves. (We could dispense with the range_op and just represent a range as an "and" of two boolean-valued operators.)

Going back to the top of this tree, the second operand of the *predicate_op* is an expression using *i*. It could use the *bound_identifier* leaf for *i* or it could point to the *quantifier_op* (if we wanted to have the information about the bound variable immediately accessible to us when processing expressions using it).

```
enum quantifier_kind{ for_all, there_exists, number_of };
struct a_predicate;
struct a_quantifier;
//
// construct either with a single boolean-valued expression or
//
struct a_predicate *construct_a_predicate( struct an_expression * );
//
// Say we have the quantifier ∃ a, b |∀ i,j | 0 <= i <= j <= 10
// First we create bound_variable nodes for i and j.
// Then we construct the expressions (0 <= i) and (i <= j).
// Then we call build_a_quantifier_range with the two
// expressions, which gives us a new expression E1. Then we construct the
// expression (j <= 10), and pass this expression along with E1 to
// build_a_quantifier_range. This gives us expression E2. We then
// call construct_a_quantifier( forall_kind, E2 ).
//
struct an_expression *build_a_quantifier_range( struct an_expression *,
                                               struct an_expression * );
struct an_expression *construct_a_quantifier( enum quantifier_kind,
                                             struct an_expression *range );
```

```
struct a_predicate *construct_a_quantified_predicate( struct a_quantifier *,
                                                      struct an_expression *);
//
// get information about the quantifier. get_quantifier_kind tells us whether this is a
// for_all, there_exists, or number_of quantifier.
//
enum quantifier_kind get_quantifier_kind( struct a_predicate *);
//
// get_quantifier_range_expression gets the range expression for the quantifier.
//
struct an_expression *get_quantifier_range( struct a_predicate *);
//
// get_predicate_expression gets the boolean-valued expression part of the predicate.
//
struct an_expression *get_predicate_expression( struct a_predicate *);
```

2.12 working code sets and slices

Working code sets and slices have similar representations, the only difference being that the representation of a slice includes information about statements that have been omitted. Thus a working code set is represented by the class *a_code_set*, and a slice is represented by a class derived from it. A slice has an identifier that corresponds to a name that the user sees.

The working code set can be added to by calling *add_to_code_set* with two *an_extpil_locations*, one for a starting point and one for an ending point. A working code set can also be added to with an *an_extpil_file* argument, in which case every line of code in the external pil file is included in the working code set. A working code set can have code removed from it in either by passing in two *an_external_pil_locations*, or by passing in the name of the file to be removed.

```
void add_to_code_set( FILE extpil_file );
void add_to_code_set( struct an_extpil_location *start_loc,
  struct an_extpil_location *endloc );
void remove_from_code_set( struct an_extpil location *start_loc,
  struct an_extpil_location *endloc );
void remove_from_code_set( FILE extpil_file );


typedef int slice_id;

slice_id create_a_designated_code_fragment( an_extpil_location *start_loc,
  an_extpil_location *end_loc );

void remove_from_designated_code_fragment(slice_id fragment_id,
  an_extpil_location *start_loc, an_extpil_location *end_loc );

void discard_designated_code_fragment( slice_id fragment_id );
```

A slice can be initially created from a designated code fragment, or it can be constructed with the same arguments used to construct a designated code fragment.

```
enum a_slice_kind{ wp_slice, semantic_slice, syntactic_slice, syntactic_closure_slice};
slice_id create_a_slice( struct an_extpil_location *start_loc,
```

Internal Pd Specification 11/13/95

```
struct an_expil_location *end_loc, enum a_slice_kind kind );
slice_id create_slice_from_fragment( slice_id base_slice, enum a_slice_kind kind );
void remove_stmt_from_slice( slice_id id, struct an_expil_location *deleted_stmt);
```

A weakest-precondition slice is then created by calling *compute_wp_slice*, passing in a postcondition
```
void compute_wp_slice( struct a_slice *this_slice, a_predicate postcondition );
```

For a syntactic slice, on the other hand, seed variables are added to it by calling *add_seed*, and *compute_syntactic_slice* is called to create the actual slice.
```
void add_seed( struct a_slice *this_slice, a_variable seed_var );
void compute_syntactic_slice( struct a_slice *this_slice );
void compute_syntactic_slice_with_closure( struct a_slice *this_slice );
```

The slice can be asked which kind of slice it is. If it is syntactic, it can be asked whether a given variable is one of its seeds, and if it is syntactic with transitive closure, it can also be asked whether a variable is one of its working variables. If it is a wp slice, the initial postcondition can be retrieved.

```
a_slice_kind get_slice_kind( struct a_slice *this_slice );

bool is_seed( struct a_slice *this_slice, a_variable this_var );
bool is_working_var( struct a_slice *this_slice, a_variable this_var );
a_predicate get_postcondition( struct a_slice *this_slice );
```

3. Overview of the symbol table.

The symbol table is implemented in the standard way with a hash table. Names are hashed by turning their letters into digits and performing the computation for $ii = 1, n$ ( $h[ii] = h[ii-1] * alpha + number(ii)$ )

where number(ii) is the digit representing the iith letter of the symbol name and hashnumber = $(n[n] \bmod$ symbol_table_size) is the hash number used to enter the symbol into the symbol table. Alpha is some number to be determined.

Hash numbers for expressions could be computed, as Ive suggested, as follows:

$a*b+c$ is computed as hashno(a) * hashno(b) + hashno(c). This insures that $a*(b+c)$ hashes into the same number as $(a*b) + (a*c)$ Expressions containing division are a special case. This is because 1) division produces fractions, and we want integers for hash numbers, and 2) div is not distributive over addition. Thus the hash number for the expression $a / (b+c)$ could be set equal to hashno(a * (b+c))

or, if this is a performance problem, then some variation on this expression, such as hashno(a*(b+c))+1

Similarly, the hashnumber for (a+b)/c would be equal to hashno((a+b) * c) [+ or minus a constant]

After a hash number is computed for a symbol it is linked into the list beginning at the hashnumber"th element of the symbol table. It is also linked into the list of variables or types declared within the current scope (see the discussion of scope objects below). Keeping the symbol on the scope list makes it easier to remove it from the symbol table when we exit its scope. It also makes it possible to save away the symbol table information for a given procedure, and then retrieve it and re-enter its symbols into the table when the user chooses to re-examine that procedure. When entries are made into the linked lists of the hash table, the most recent items are entered at the beginning of the list. This ensures that, for a name which occurs in more than one scope, it wil be found in the innermost scope first.

*3.1 scope*

A scope can be a routine scope, a file scope, or the global scope. A scope can be asked which kind it is. Routine scopes hang off of a_procedure nodes., and the global scope and file scope hangs off of the an_internal_pil node. The scope class provides routines called enter_<scope_kind>_scope which create a scope of the appropriate kind and make it the current scope.

Each scope has an external pil scope number (SCOPE_ID). It also has a child pointer, and a sibling pointer to aid in finding a scope based on its external pil block number. For example, the scope representing "0.1" would have a child pointer which points to scope "0.1.0", which would have a sibling pointer pointing to scope "0.1.1". File and procedure scopes provide the routine save_and_delete() to write the scope's symbol table and pil to disk and then delete all of its symbols from the symbol table.

Because we will be reading in more than one external pil file, the routines which enter symbols into the symbol table will have to check for duplicates and produce an error message if duplicates exist.

```
enum a_scope_kind{ sck_file, sck_func, sck_global};
struct a_scope;

//
// constructor
//
struct a_scope *construct_a_scope(a_scope_kind SCOPE_ID scope_num);
//
// the enter_scope routines enter a scope of the appropriate kind in the symbol table, make it the
// current scope.   There is no need for an enter_global_scope routine because the global scope
// is created by an_internal_pil's constructor.
//
struct a_scope * enter_routine_scope(a_symbol *func_symbol,SCOPE_ID scope_num );
a_scope * enter_file_scope( STRING file_name );
//
// Routine to save scope's symbols and code to disk, then remove its symbols from the symbol
table.
//
void save_and_delete_scope( struct a_scope *this_scope,FILE filename );
//
// Routine to restore scope to symbol table after reading it in from disk
//
void read_and_restore_scope( struct a_scope *this_scope1,FILE filename);
//
// Routines related to the mapping of external pil "block" numbers to
```

```
// internal pil scopes. First: get this scope's digit in the external pil
// "block" number.
//
SCOPE_ID get_scope_num( struct a_scope *);
//
// get the first scope at the next level down (i.e., if this is "0.1",
// get "0.1.0"
//
struct a_scope * get_child_scope( struct a_scope *);
//
// get the next scope at this level (i.e., if this is "0.1", get "0.2"
//
struct a_scope *get_sibling_scope( struct a_scope *);
```

3.2 symbol table.

A symbol table object provides routines for recording and retrieving information about identifiers and types, including the type, size, and alignment of a variable and whether two variables overlap. It also provides a mechanism for entering and retrieving source file information. It supplies the entry point of a procedure given its name, and the basic block corresponding to a label given the label's name.

```
struct symbol_table ;
/*
 * symbol table routines
 */
//
// Setting the current xternal pil file location
//
void set_expil_loc( struct an_expil_location );
void update_expil_loc( struct an_expil_line_number pil_line );
//
// entering label information
//
// scope_num is the label's scope number as specified in the external pil , name is its name,
// and basic_block is its target.
//
struct a_symbol*enter_label(SCOPE_ID scope_num, STRING name, struct a_basic_block
basic_block).
//
// Entering type names
//
// first: entering structures
//
struct a_symbol * enter_struct( SCOPE_ID scope_num,STRING name,
   struct a_type *struct_type_node);
//
// entering unions
//
struct a_symbol * enter_union( SCOPE_ID scope_num, STRING name,
   struct a_type *union_type_node);
//
// entering arrays
//
```

```
struct a_symbol * enter_array( SCOPE_ID scope_num, STRING name, int size,
  struct a_type *element_type_node );
//
// entering enumerated types
//
struct a_symbol * enter_enum( SCOPE_ID scope_num, STRING name, struct a_type
*enum_type_node );
//
// entering pointer types
//
struct a_symbol * enter_pointer( SCOPE_ID scope_num, STRING name, struct a_symbol *
pointed_to_type, );
//
// entering typedefs
//
struct a_symbol * enter_typedef( SCOPE_ID scope_num, STRING name, struct a_symbol *
referenced_type );
//
// end of entering types
//
// Entering identifiers
//
// first, entering procedure identifiers. enter_procedure creates a symbol node and a procedure
// node for the procedure in question. It returns the symbol node.
// As we encounter parameter names we call add_parameter on the procedure node.
//
struct a_symbol * enter_procedure(SCOPE_ID scope_num, STRING name );
struct a_procedure *get_procedure( a_symbol * proc_symbol );
//
// entering variables
//
struct a_symbol * enter_var( SCOPE_ID scope_num, STRING name, STORAGE_CLASS,
a_linkage );

//
//
// Finding identifiers and types
//
// given a symbol name, return its symbol table id
//
struct a_symbol *find_symbol( STRING name, SCOPE_ID scope_num );
//
// A label can have the same name as a variable in the same scope. Therefore to find
// a label we have to specify that it is a label.
//
struct a_symbol *find_label( STRING name, SCOPE_ID scope_num );
//
//
// find a type
//
boolean find_type( STRING name, SCOPE_ID scope_num, struct a_symbol *type_id);
//
// Routines for entering expressions on the fly
//
```

```
// enter an expression. For interactively generated input, the UI will have to parse the input,
// but it should call ptree routines to build the tree.
//
struct a_symbol * enter_expr( SCOPE_ID scope_num, a_ptree * );
//
// retrieve an expression entered
//
struct an_expression *get_expr( SCOPE_ID scope_num );
//
// enter a free variable
//
struct a_symbol * enter_free_identifier( STRING name );
//
// Deleting nodes from the symbol table
//
//
// delete a node (given its symbol node)
//
void delete_symbol( struct a_symbol * var_id );
//
// find the code pointed to by a label, given the label's name
//
boolean find_labeled_code( STRING name, struct a_basic_block *bb);

enum a_linkage {intern, extern, none};
enum an_extent {static, local, dynamic};
```

3.3 symbol nodes

```
struct a_symbol ;

enum a_symbol_kind{ sk_label, sk_variable, sk_free_identifier, sk_procedure, sk_type};

struct a_symbol *construct_a_symbol(char * name, int name_len, enum symbol_kind );
void destruct_a_symbol( struct a_symbol *this_symbol );

enum a_symbol_kind get_symbol_kind( struct a_symbol *);
char *get_symbol_name( struct a_symbol *);
void set_symbol_type( struct a_symbol *this_symbol, struct a_type *);
//
// Queries
//
// get the type of an identifier
//
struct a_type * get_symbol_type( struct a_symbol *);
//
// get sizes of types and variables
//
int type_size( struct a_symbol *);
int var_size( struct a_symbol *);
//
// for variables and types, get alignment
```

```
//
int type_alignment( struct a_symbol *);
int type_size( struct a_symbol *);
//
// for variables, types and procedures get linkage and extent
//
void set_linkage( struct a_symbol *,a_linkage);
void set_extent( struct a_symbol *,an_extent);
enum a_linkage get_linkage( struct a_symbol *);
enum an_extent get_extent( struct a_symbol *);
//
// aliasing queries
//
bool overlap( struct a_symbol *this_var, struct a_symbol * other_var );
bool may_be_aliased( struct a_symbol *this_var, struct a_symbol *other_var );
bool must_be_aliased( struct a_symbol *this_var, struct a_symbol *other_var );
//
// get the basic block corresponding to a procedure entry
//
a_basic_block get_proc_entry(  struct a_symbol *proc_symbol );
//
// get the scope corresponding to a procedure
//
a_scope * get_proc_scope( struct a_symbol *proc_symbol );
```

3.4 procedure info nodes

A procedure info node hangs off of a symbol table node. It is constructed with its name, and it provides routines to add parameter information, as well as routines with which we can iterate through its parameters. We can set the entry and exit block nodes of a procedure and we can then retrieve them again. The procedure node also supplies the routine *read_and_restore_procedure_scope()*, which is used when the internal pil for the procedure has just been read in from disk and we want to restore its symbols to the symbol table.

```
struct a_procedure_info;
//
// construct an a_procedure node from its name
//
struct a_procedure *construct_a_procedure( STRING proc_name );
//
// add a parameter name to this procedure's parameter list
//
void add_parameter( struct a_procedure *this_routine,a_variable *);
//
// add type information about a parameter whose name we already know.
//
void set_parameter_type( struct a_procedure *this_routine, a_variable * parameter_name,
                         a_type * parameter_type );
//
// n_params tells us the number of arguments the procedure has. If has_var_args()
// is true, then n_params should produce an error.
//
int n_params( struct a_procedure *this_routine );
//
```

```
// to iterate through the parameters of a procedure
//   1) declare a variable X of type an_expression_iterator and initialize it with
//      X = initialize_a_parameter_list( struct a_procedure *this_proc );
//   2) call get_first_param, which returns a pointer to the first formal parameter
//   3) iteratively call get_next_param until it returns null
struct an_expression_iterator;
struct an_expression_iterator initialize_a_parameter_list( struct a_procedure *this_proc );
struct an_expression *get_procedure_first_param( struct an_expression_iterator *);
struct an_expression *get_next_param( struct an_expression_iterator *);
//
// get the scope for this routine.
//
struct a_scope *get_procedure_scope( struct a_procedure *);
//
// a procedure has an entry block (maybe more?) and an exit block.
// provide routines to set them and retrieve them.
//
void set_procedure_entry( struct a_procedure *this_routine, struct a_basic_block *entry_block
);
void set_procedure_exit( struct a_procedure *this_routine, struct a_basic_block *exit_blbock );

struct a_basic_block *get_procedure_entry( struct a_procedure *this_routine );
struct a_basic_block *get_procedure_exit( struct a_procedure *this_routine );

//
// A procedure has a scope. we would want to access this if we adopt the policy of writing
// internal pil out to disk and reading it back in again. In that case, after reading in the
// internal pil for a procedure P, we will want to add its declarations to our symbol table before
// examining P's code. We do this by calling read_and_restore_procedure_scope.
//
read_and_restore_procedure_scope( struct a_procedure *this_routine, FILE filename); .
```

4. Open Issues

We probably need to think more about the issues involved with reading in more than one pil file at a time and "linking" them.

5. Stuff that needs to be developed

A mechanism for saving internal pil to disk (includes saving pointers).

Attorney Docket No. 1052-30-137

APPENDIX D

CODE ANALYZER

Inventors:

Ashraf Afifi, a citizen of the United States, residing at 20 Maryvale Road, Burlington, Massachusetts 01803;

Dominic Chan, a citizen of the United States, residing at 1196 North Road, Carlisle, Massachusetts 01741;

Joseph J. Comuzzi, a citizen of the United States, residing at 14 Bayberry Road, Groton, Massachusetts 01450;

Johnson M. Hart, a citizen of the United States, residing at 7 Pond Brook Circle, Weston, Massachusetts 02193;

Antonio Pizzarello, a citizen of the United States, residing at 4647 Calle Del Norte, Phoenix, Arizona 85018

Assignee:

Peritus Software Services, Inc.
304 Concord Road
Billerica, Massachusetts 01821-3485

Hale and Dorr
60 State Street
Boston, Massachusetts 02109
(617) 526-6000

1. Introduction

This document describes the weakest precondition (WP) calculations that will be implemented in Version 1 of PCA 3. Modes of operation are discussed, and their impact on the calculation. Three general aspects are covered: non-iterative code; looping constructs; and procedures.

1.1 Overview Of Weakest Precondition

The WP calculation forms the basis of the analysis technique to be used in the Peritus Code Analysis Engine (PCAE) [Dieterich]. At a high level, the weakest precondition calculation accepts a statement S and a predicate P as input. P represents a set of possible states that the program may be in after S has been executed. The goal of the WP calculation is to compute a corresponding predicate that represents all possible states that the program may be in immediately before executing statement S, such that the result of executing S on any of those states results in a state described by P.

Within the PCAE, the statements comprising a program are in PIL, a variant of Dijkstra's guarded command language [Gries, Cohen] with extensions to permit real programs to be easily described [Comuzzi]. The remainder of this document describes the adaptation of the WP calculation for Dijkstra's language to PIL.

OCT 27 '95 12:29 FROM TO 5150867C 2 PAGE.005/012

2. Non-Iterative Code

The general form of the specification for the WP calculation is as follows:

WP.stmt.post-condition = pre-condition

*2.1 Preliminaries*

The WP calculation for Dijkstra's guarded command language form the basis for the WP calculation in PIL [Dieterich]. The WP function as described in [Cohen] is the basic reference, and the relevant material reviewed in this section.

1. Conditional

WP."if (C) S1;if ^(C) S2".P = (C ==> WP."S1".P & ^C ==> WP."S2".P)

1. Composition

WP."S1;S2".P = WP.S1.(WP.S2.P)

Unfortunately, the WP calculations for assignment described by Cohen may not be employed without modification due to the inherent complications of PIL to allow real programs to be analyzed.

*2.2 Assignment statement*

The heart of the WP calculation is the computation of the WP of an assignment statement, because this is the only statement that has a side effect in memory. Due to the complexity of the PIL, and the possibility of aliasing, this computation is non-trivial. In its most basic form, the calculation involves the substitution of the right hand side (RHS) of the assignment for all occurrences of the left hand side (LHS) in the post-condition [Gries, Cohen]. PIL, however, allows more complicated l-values than simple variables to appear on the LHS of an assignment. Furthermore, addresses of variables may appear in post-conditions, which also require special care. The basic strategy for dealing with these values is described in this section, as is the approach to aliasing.

It is assumed that the post-condition has been simplified as much as possible by performing following re-writes:

_Mem( @ X, type ) --> X

@ _Mem( X, type ) --> X

This allows references to objects to be easily determined.

2.3 General Mechanism

In the general case, the possibility of aliasing implies that an arbitrary assignment can affect any variable referenced in the post-condition. A general mechanism allowing a correct WP to be computed in the presence of such assignments is to treat memory as a large array using the _Mem intrinsic. Furthermore, this array is treated as a function during the WP calculation [Bijlsma, Gries].

First, we introduce the following notation:

```
(M; A, T: V)
```

where M is a memory function, A is a (byte) address in the memory function, T is the data type of the value being written and V is the value being written to that address. The new function has the following semantics:

```
(M; A, T: V).A1.T1 =
    case T = T1 && A = A1 -> V
    case T = T1 && A ^= A1 && _Over. (A,T).(A1,T) -> mangled.M.(A,T).(A1,T1).V
    case T = T1 && ^_Over. (A,T).(A1,T) -> M.A1.T
    case T ^= T1 && _Over. (A,T).(A1,T1) -> mangled.M.(A,T).(A1,T1).V
    case T ^= T1 && ^_Over. (A,T).(A1,T1) -> M.A1.T1
```

where

```
_Over. (A1,T1).(A2,T2) =
    set_intersection(addresses.(A1,T1), addresses.(A2,T2)) ^= {}
```

addresses.(A,T) = the set of all addresses modified when an object of type T is written at byte address A [Typically: addresses.(A,T) = { A+I || 0 <= I < sizeof(T) } ]

mangled.M.(A1,T1).(A2,T2).V returns an unused free function identifier indicating that the object of type T2 starting at address A2 was mangled by the write of value V of type T1 to the object of type T1 at address A1

Computing the effect of an assignment on a postcondition may now be easily stated in terms of the above notation:

```
WP."X := Y".Q =
    step 1: replace all occurrences of
        _Mem.A.T
        in Q with
        (_Mem; @X, typeof(X): Y).A.T
        giving Q'
    step 2: expand all occurrences of
        (_Mem; @X, typeof(X): Y).A.T
        in Q' using the semantics indicated above respecting the current user mode bits
```

Perlnus                                                                    WP Specification Notes:

- The expansion in step 2 cannot contain conditional expressions - they need to be expanded across the relations in which the occurrences of (_Mem; @X, typeof(X): Y) appear. This may result in a considerable amount of tree replication.

- Parts of the case analysis are "static" in the sense that they can be computed during the WP calculation and need not wait for simplification. These include the type test, the overlaps check, and the address check. This static information can be combined with user assertions, provided in the form of "modes" for Version 1 of PCA3, to permit a variety of simplifications. Some of the modes defined for PCAE are documented in the PCAE specifications [Dieterich] in section 4.2.3. The modes that will be implemented for Version 1 of PCA 3 as well as some future modes are listed below in section 2.8. A mode that is not included in specifications but may also be considered for future implementation is:

- simplification when simple variables cannot possibly be the allocated at the same location – this involves using the symbol table to perform the address test

2.4 Array references

The most direct approach to dealing with assignments to array elements is to use the method described above in 2.3 "General Mechanism". In future versions of PCA 3 a "disjoint arrays mode bit" would allow the assertion that an array named in the postcondition can not be changed by an assignment to a different array.

An additional complication is whether or not to include array bounds conjuncts - this can be controlled by an "array bounds check user mode bit" in a future version of PCA 3. If the assignment is to a member of a variable declared as an array (as opposed to a pointer), then conjuncts constraining the index to the declared array bounds can be added.

When the two objects in a possible aliasing relationship are from the same array, it is possible to simplify the address equivalence expression by comparing indices directly. Thus, $$(@\ A[e1][e2][e3] = @\ A[f1][f2][f3])$$

may be converted to:

$$(e1 = f1\ \&\ e2 = f2\ \&\ e3 = f3)$$

and, similarly:

$$(@\ A[e1][e2][e3] \mathrel{\wedge}= @\ A[f1][f2][f3])$$

ACTC Technologies                              5                          October 27, 1995 may be converted to:

^(e1 = f1 & e2 = f2 & e3 = f3)

Together, these transformations yield the expected array handling. Note that the correctness of these transformations assumes that all indices are in bounds. *The preceding transformation will be handled by the simplifier as it is unnecessary for the purposes of the WP calculation.*

2.5 Structure and union field references

Fields of structures and unions are essentially treated as arrays indexed by field names (that is, offsets). That is, the field reference "a.b" is handled as "_Mem(@a + offsetof(b), typeof(b))".

2.6 Bit field references

Bit fields are handled using the standard address and overlap tests.

2.7 String copying

String copying is handled using the standard address and overlap tests. A string copy is treated as a single multiple byte transfer, rather than as a sequence of single byte transfers.

2.8 Summary of User Modes

This section summarizes all of the user modes pertaining to non-iterative code that will be implemented in Version 1 and future versions of PCA 3. These modes are either defined above or in the Product Features Specification for the Peritus Code Analysis Engine [Dieterich].

2.8.1 Version 1 Modes

1. "type-safe" mode - documented in [Dieterich]
   - ON: PCAE assumes that a pointer always points to a data item whose type is consistent with the type declared for the pointer.
   - OFF: PCAE assumes that pointer can point to an item of any date type.

2. "verbose" mode - documented in [Dieterich]
   - ON: PCAE assumes it is possible for variables of the same type to overlay each other in a non-obvious way.
   - OFF: PCAE assumes that variables of the same type can either overlay each other exactly or not at all.

2.8.2 Future Version Modes

1. "disjoint-arrays" mode
   ON: PCAE assumes that different arrays never overlap.
   OFF: PCAE assumes that references to different arrays may overlap.

2. "arrays-bounds-check" mode
   ON: PCAE adds conjuncts to array references constraining the index to the declared array bounds.
   OFF: No array bounds conjuncts are added.

3. "defined-expressions-precondition" mode
   ON: PCAE adds conjuncts to expressions that restrict variable values to valid numerical ranges for the expression (for instance, disallowing divisors to be zero).
   OFF: No such conjuncts are added.

5. References

[Bijlsma] Bijlsma, A. Calculating with Pointers. Science of Computer Programming, Vol. 12, 1989, pp. 191-205.

[Cohen] Cohen, E. Programming in the 1990s, Springer-Verlag, 1990.

[Comuzzi] Comuzzi, J. Specification of PIL, Peritus Software Services, Inc., 1995.

[Dieterich] Dieterich, E. Product Features Specification: Peritus Code Analysis Engine, Peritus Software Services, Inc., 1995.

[Gries] Gries, D. The Science of Programming, Springer-Verlag, 1981.

What is claimed is:

1. A digital computer system comprising:

translating means for translating a source code file into an intermediate language (IL) file, wherein said IL file includes a plurality of IL statements;

a memory unit, coupled to said translating means, for holding said source code file and IL file, each of said plurality of IL statements being maintained in a data structure providing a connectivity to neighboring IL statements;

a user interface, coupled to said translating means, for selecting a starting point at a first IL statement and an ending point at a second IL statement thereby defining a portion of said IL file; and analysis means, coupled to said user interface, for analyzing said portion of said IL file by traversing said portion in forward executable order pursuant to said connectivity to identify a plurality of paths, and by subsequently traversing said plurality of paths in reverse executable order pursuant to said connectivity to generate a plurality of weakest preconditions for said plurality of paths, wherein said plurality of weakest preconditions are combined to form a single weakest precondition of said portion.

2. The digital computer system of claim 1 further comprising:

means for providing a slicing predicate comprising one or more variables; and means for slicing said plurality of IL statements to identify and remove a subset of one or more statements having no effect on said slicing predicate as determined from one or more weakest preconditions associated with said subset.

3. The digital computer system of claim 2 further comprising a means for simplifying said weakest precondition of said portion.

4. The digital computer system of claim 3 wherein said each of said IL statements includes a first data field containing a line number from said source code file and a second data field containing a source block number.

5. The digital computer system of claim 2 wherein said means for slicing removes all IL statements disposed between a third IL statement and a fourth IL statement when weakest preconditions of said third and fourth statements are the same.

6. The digital computer system of claim 2 wherein said means for slicing removes a particular IL statement having an associated weakest precondition and an associated postcondition that are the same.

7. The digital computer system of claim 1 wherein said translating means includes a filter for canceling select lines of code from the source code file prior to being translated into said IL file.

8. The digital computer system of claim 1 further comprising a format generator, said generator being capable of transforming a segment of said IL file into a Unity computational model.

9. The digital computer system of claim 1 further comprising a monitor for displaying code undergoing analysis, said monitor including a first display window for displaying a select portion of source code and a second display window for displaying select IL statements corresponding to said select portion of source code.

10. In an appropriately programmed digital computer, a method of analyzing source code comprising the steps of:

inputting a source code file into said computer, said source code file containing a plurality of source statements;

translating said plurality of source statements into a plurality of intermediate-language (IL) statements disposed within an IL file, said IL file being held in memory in said computer;

constructing a plurality of data structures from said plurality of IL statements, each data structure containing at least one of said IL statements and providing connectivity to neighboring IL statements;

selecting a starting point and an ending point within said IL file to identify a set of select IL statements undergoing analysis;

providing a slicing predicate comprising one or more variables;

determining a weakest precondition of each of said select IL statements while traversing said select IL statements in reverse executable order pursuant to said connectivity; and slicing said set of select IL statements to identify and remove a subset of one or more statements having no effect on said slicing predicate as determined from one or more weakest preconditions associated with said subset.

11. The method of claim 10 wherein said slicing step comprises the step of slicing all select IL statements disposed between a first select IL statement having a first weakest precondition and a second select IL statement having a second weakest precondition when said first and second weakest preconditions are equal.

12. The method of claim 10 wherein said slicing step comprises the step of slicing a select IL statement having an associated weakest precondition and an associated postcondition that are equal.

13. The method of claim 10 further comprising the steps of:

selecting a direction to traverse said sliced set of IL statements; and performing a forward analysis of said sliced set of IL statements when the direction is forward and performing a backward analysis when the direction is backward.

14. The method of claim 13 wherein said backward analysis comprises the step of substituting a select IL statement with a skip statement when said select IL statement is an alternation statement and fails to assign a new value to a variable contained in an associated postcondition.

15. The method of claim 14 wherein said backward analysis further comprises the steps of:

supplying an invariance for evaluating an iterating select IL statement;

simplifying a predicate generated from weakest precondition analysis, wherein said invariance functions as a postcondition for said analysis; and determining whether said invariance is true.

16. The method of claim 15 wherein the step of simplifying said predicate comprises accessing a library of lemmas.

17. The method of claim 14 further comprising the steps of:

isolating an iterating segment of code; and converting said iterating segment into a Unity computational model.

18. The method of claim 17 wherein said forward analysis comprises the step of identifying all statements on an execution path disposed within said sliced set of IL statements.

19. The method of claim 10 further comprising the step of displaying concurrently on a computer monitor screen a portion of said plurality of source statements in a first window, a portion of said plurality of IL statements in a second, window and a portion of a flow graph corresponding to one or more statements displayed in said first and second windows.

20. In an appropriately programmed digital computer, a method for analyzing source code comprising the steps of:

inputting a source code file into said computer, said source code file containing a plurality of source statements;

translating said plurality of source statements into a plurality of intermediate-language (IL) statements disposed within an IL file, said IL file being held in memory in said computer;

constructing a plurality of data structures from said plurality of IL statements, each data structure containing at least one of said IL statements and providing connectivity to neighboring IL statements;

partitioning said plurality of IL statements into a plurality of segments, wherein each segment includes at least one IL statement;

traversing said plurality of IL statements in reverse executable order pursuant to said connectivity; and generating a plurality of weakest preconditions for said plurality of segments, wherein said plurality of weakest preconditions may be logically combined to form a single weakest precondition representing multiple segments.

21. The method of claim 20 further comprising the step of equating a source-code variable with a free variable; and wherein said step of generating a plurality of weakest preconditions is based upon an initial postcondition of said source-code variable being equated with said free variable, said generating step thereby extracting information from each of said IL statements to collectively form the meaning of said source code variable.

22. The method of claim 20 further comprising the step of providing a defect predicate that represents an observed defect in said source code file; and wherein said step of generating a plurality of weakest preconditions is based upon an initial postcondition of said defect predicate, said generating step thereby providing information related to said observed defect.

* * * * *